US005754805A

United States Patent [19]

Gallup et al.

[11] Patent Number: 5,754,805

[45] Date of Patent: May 19, 1998

[54] INSTRUCTION IN A DATA PROCESSING SYSTEM UTILIZING EXTENSION BITS AND METHOD THEREFOR

[75] Inventors: Michael G. Gallup; L. Rodney Goke; Robert W. Seaton, Jr., all of Austin, Tex.

[73] Assignee: Motorola Inc., Schaumburg, Ill.

[21] Appl. No.: 401,610

[22] Filed: Mar. 9, 1995

Related U.S. Application Data

[62] Division of Ser. No. 40,779, Mar. 31, 1993.

[51] Int. Cl.[6] ........ G06F 9/302

[52] U.S. Cl. ........ 395/376

[58] Field of Search ........ 395/376, 800.01; 364/736.5

[56] References Cited

U.S. PATENT DOCUMENTS

| | | | |
|---|---|---|---|
| 3,287,703 | 11/1966 | Slotnick | 340/172.5 |
| 3,796,992 | 3/1974 | Nakamura et al. | 340/147 LP |
| 4,463,445 | 7/1984 | Grimes | 364/900 |
| 4,470,112 | 9/1984 | Dimmick | 364/200 |
| 4,488,218 | 12/1984 | Grimes | 364/200 |
| 4,546,428 | 10/1985 | Morton | 364/200 |
| 4,809,169 | 2/1989 | Sfarti et al. | 364/200 |
| 4,890,253 | 12/1989 | Jabusch . | |
| 5,029,069 | 7/1991 | Sakamura | 395/375 |
| 5,067,095 | 11/1991 | Peterson et al. | 395/24 |
| 5,072,418 | 12/1991 | Boutaud | 364/715.06 |
| 5,073,867 | 12/1991 | Murphy et al. | 395/27 |
| 5,083,285 | 1/1992 | Shima et al. | 395/24 |
| 5,086,405 | 2/1992 | Chung et al. | 364/748 |
| 5,140,523 | 8/1992 | Frankel et al. | 364/420 |
| 5,140,530 | 8/1992 | Guha et al. | 395/13 |
| 5,140,670 | 8/1992 | Chua et al. | 395/24 |
| 5,146,420 | 9/1992 | Vassiliadis et al. | 364/757 |
| 5,148,515 | 9/1992 | Vassiliadis et al. | 395/27 |

(List continued on next page.)

FOREIGN PATENT DOCUMENTS

| | | |
|---|---|---|
| 1303773 | 5/1984 | European Pat. Off. . |
| 1815163 | 10/1985 | European Pat. Off. . |
| 395349a2 | 4/1990 | European Pat. Off. . |
| 1416562 | 9/1964 | France . |

OTHER PUBLICATIONS

Patent Abstracts of Japan, Publication #JP4107731, Application #JP900227717.

K.Asanovic,et al.,"SPERT:a VLIW/SIMD microprocessor for artificial neural network computations", published in 1992 by IEEE Computer Society Press, Conference Paper, pp. 178–190.

K.Asanovic, "SPERT:a VLIW/SIMD neuro-microprocessor", published in 1992 by IEEE, vol. 4, pp. 577–582.

Daniel P. Siewiorek et al., "Computer Structures: Principles and Examples", Chapter 20, The Illiac IV System, Subsetted from Proc. IEEE, Apr. 1972, pp. 369–388, pub. by McGraw-Hill Book Co.

C. Gordon Bell et al., "Computer Structures: Readings and Examples", Chapter 27, The Illiac IV computer, IEEE Trans., C-17, vol. 8, pp. 746–757, Aug.,1968, pub. by McGraw-Hill Book Co.

(List continued on next page.)

*Primary Examiner*—David Y. Eng
*Attorney, Agent, or Firm*—Susan C. Hill

[57] ABSTRACT

A data processing system (55) and method thereof includes one or more data processors (10). Data processor (10) is capable of performing both vector operations and scalar operations. Using a single microsequencer (22), data processor (10) is capable of executing both vector instructions and scalar instructions. Data processor (10) also has a memory circuit (14) capable of storing both vector operands and scalar operands. The data processing system (55) includes a plurality of instructions which include and utilize an extension bit during execution. In one embodiment, a plurality of instructions, both arithmetic and non-arithmetic, use extension bits for preliminary and non-preliminary instructions in order to accommodate large data widths.

16 Claims, 196 Drawing Sheets

U.S. PATENT DOCUMENTS

| | | | |
|---|---|---|---|
| 5,150,327 | 9/1992 | Matsushima et al. | 365/189 |
| 5,150,328 | 9/1992 | Aichelmann, Jr. | 365/189 |
| 5,151,874 | 9/1992 | Jeong et al. | 364/752 |
| 5,151,971 | 9/1992 | Jousselin et al. | 395/27 |
| 5,152,000 | 9/1992 | Hillis | 395/800 |
| 5,155,389 | 10/1992 | Furtek | 307/465 |
| 5,155,699 | 10/1992 | Chung et al. | 364/766 |
| 5,165,009 | 11/1992 | Watanabe et al. | 395/27 |
| 5,165,010 | 11/1992 | Masuda et al. | 395/27 |
| 5,167,008 | 11/1992 | Engeler | 395/27 |
| 5,168,573 | 12/1992 | Fossum et al. | 395/800 |
| 5,175,858 | 12/1992 | Hammerstrom | 395/800 |
| 5,182,794 | 1/1993 | Gasperi et al. | 395/23 |
| 5,197,030 | 3/1993 | Akaogi et al. | 365/200 |
| 5,197,130 | 3/1993 | Chen et al. | 395/325 |
| 5,226,171 | 7/1993 | Hall et al. | 395/800 |
| 5,230,057 | 7/1993 | Shido et al. | 395/800 |

OTHER PUBLICATIONS

"The Design of a Neuro–Microprocessor", published in IEEE Transactions on Neural Networks, on May 1993, vol. 4, No. 3, ISSN 1045–9227, pp. 394 through 399.

"ILLIAC IV Systems Characteristics and Programming Manual" published by Burroughs Corp. on Jun. 30, 1970, IL4–PM1, Change No. 1.

"Neural Networks Primer Part I" published in AI Expert in Dec. 1987 and written by Maureen Caudill, pp. 46 through 52.

"Neural Networks Primer Part II" published in AI Expert in Feb. 1988 and written by Maureen Caudill, pp. 55 through 61.

"Neural Networks Primer Part III" published in AI Expert in Jun. 1988 and written by Maureen Caudill, pp. 53 through 59.

"Neural Networks Primer Part IV" published in AI Expert in Aug. 1988 and written by Maureen Caudill, pp. 61 through 67.

"Neural Networks Primer Part V" published in AI Expert in Nov. 1988 and written by Maureen Caudill, pp. 57 through 65.

"Neural Networks Primer Part VI" published in AI Expert in Feb. 1989 and written by Maureen Caudill, pp. 61 through 67.

"Neural Networks Primer Part VII" published in AI Expert in May 1989 and written by Maureen Caudill, pp. 51 through 58.

"Neural Networks Primer Part VIII" published in AI Expert in Aug. 1989 and written by Maureen Caudill, pp. 61 through 67.

"Fast Spheres,Shadows,Textures,Transparencies, and Image Enhancements in Pixel Planes" by H. Fuchs et al. and published in Computer Graphics, vol. 19, No. 3, Jul. 1985, pp. 111–120.

"Pixel–Planes: Building a VLSI–Based Graphic System" by J. Poulton et al. and published in the proceedings of the 1985 Chapel Hill Conference on VLSI, pp. 35–60.

"Pixel–Planes 5: A Heterogeneous Multiprocessor Graphics System Using Processor–Enhanced Memories" by Fuchs et al. and published in Computer Graphics,vol. 23,No. 3,Jul. 1989,pp. 79–88.

"Parallel Processing In Pixel–Planes, a VLSI logic–enhanced memory for raster graphics" by Fuchs et al. published in the proceedings of ICCD' 85 held in Oct., 1985, pp. 193–197.

"Building a 512×512 Pixel–Planes System" by J. Poulton et al. and published in Advanced Research in VLSI, Proceedings of the 1987 Stanford Conference, pp. 57–71.

"Coarse–grain & fine–grain parallelism in the next generation Pixel–planes graphic sys." by Fuchs et al. and published in Parallel Processing for Computer Vision and Display, pp. 241–253.

"Pixel Planes: A VLSI–Oriented Design for 3–D Raster Graphics" by H. Fuchs et al. and publ. in the proc. of the 7th Canadian Man–Computer Comm. Conference, pp. 343–347.

"The Torus Routing Chip" published in Journal of Distributed Computing, vol. 1, No. 3, 1986, and written by W. Dally et al. pp. 1–17.

"A Microprocessor–based Hypercube Supercomputer" written by J. Hayes et al. and published in IEEE MICRO in Oct. 1986, pp. 6–17.

"ILLIAC IV Software and Application Programming" written by David J. Kuck and published in IEEE Transactions on Computers, vol. C–17, No. 8, Aug. 1968, pp. 758–770.

"An Introduction to the ILLIAC IV Computer" written by D. McIntyre and published in Datamation, Apr., 1970, pp. 60–67.

"The ILLIAC IV Computer" written by G. Barnes et al. and published in IEEE Transactions on Computers, vol. C–17, No. 8, Aug. 1968, pp. 746–757.

The ILLIAC IV The First Supercomputer written by R. Michael Hord and published by Computer Science Press, pp. 1–69.

MC6800 8–/16–/32– Bit Microprocessor User's Manual, Eighth Edition, pp. 4–1 through 4–4; 4–8 through 4–12.

MC68020 32–Bit Microprocessor User's Manual, Fourth Edition, pp. 3–12 through 3–23.

Introduction to Computer Architecture written by Harold S. Stone et al. and published by Science Research Associates, Inc. in 1975, pp. 326 through 355.

A VLSI Architecture for High–Performance, Low–Cost, On–chip Learning by D. Hammerstrom for Adaptive Solutions, Inc., Feb. 28, 1990, pp. II–537 through II–544.

"CNAPS–1064 Preliminary Data CNAPS–1064 Digital Neural Processor" published by Adaptive Solutions, Inc. pp. 1–8.

DSP56000/DSP56001 Digital Signal Processor User's Manual, Rev. 1, published by Motorola, Inc. pp. 2–9 through 2–14, 5–1 through 5–21, 7–8 through 7–18.

"M–Structures: Ext. a Parallel, Non–strict, Functional Lang. with State" Barth et al., Comp. Struct. Group Memo 327 (MIT), Mar. 18, 1991, pp. 1–21.

"A Pipelined, Shared Resource MIMD Computer" by B. Smith et al. and published in the Proceedings of the 1978 International Conference on Parallel Processing, pp. 6–8.

M68000 Family Programmer's Reference Manual published by Motorola, Inc. in 1989, pp. 2–71 through 2–78.

"The DSP is being reconfigured" by Chappell Brown and published in Electronic Engineering Times, Monday, Mar. 22, 1993, Issue 738, p. 29.

DSP56000/56001 Digital Signal Processor User's Manual published by Motorola, Inc. pp. 2–4 through 2–5, 4–6 and 4–7.

MC68340 Integrated Processor User's Manual published by Motorola, Inc. in 1990, pp. 6–1 through 6–22.

Transputer Architecture Technical Overview published by INMOS in Sep. 1985.

Product Description of the IMS T414 Transputer published by INMOS in Sep. 1985.

Product Description of the IMS T212 Transputer published by INMOS in Sep. 1985.
Proceedings from the INMOS Transputer Seminar tour conducted in 1986, published in Apr. 1986.
"Control Data STAR–100 Processor Design" written by R.G. Hintz et al. and published in the Innovative Architecture Digest of Papers for COMPCOM 72 in 1972, pp. 1 through 4.

RANDOM ACCESS ADDRESS

AE IDENTIFICATION REGISTER (AIR) 330

| | 7 | 6 | 5 | 4 | 3 | 2 | 1 | 0 |
|---|---|---|---|---|---|---|---|---|
| $0000 | 0 | 0 | 0 | 0 | 0 | 0 | 0 | 0 |
| RESET | N.C. | N.C. | N.C. | N.C. | N.C. | N.C. | N.C. | N.C. |

N.C. Indicates No Change

*FIG.2-11*

RANDOM ACCESS ADDRESS

ARITHMETIC CONTROL REGISTER (ACR) 172

| | 7 | 6 | 5 | 4 | 3 | 2 | 1 | 0 |
|---|---|---|---|---|---|---|---|---|
| $0001 | 0 | 0 | 0 | 0 | 0 | 0 | VSGN 176 | SSGN 174 |
| RESET | N.C. | N.C. | N.C. | N.C. | N.C. | N.C. | 0 | 0 |

N.C. Indicates No Change

Bit 0–SSGN–Scalar Signed/Unsigned Arithmetic
Bit 1–VSGN–Vector Signed/Unsigned Arithmetic

*FIG.2-12*

RANDOM ACCESS ADDRESS

EXCEPTION STATUS REGISTER (ESR) 332

| | 7 | 6 | 5 | 4 | 3 | 2 | 1 | 0 |
|---|---|---|---|---|---|---|---|---|
| $0002 | ICE | PEE | IOE | PCE | VDE | SDE | VVE | SVE |
| RESET | 0 | 0 | 0 | 0 | 0 | 0 | 0 | 0 |

Bit 0–SVE–Scalar Overflow Exception
Bit 1–VVE–Vector Overflow Exception
Bit 2–SDE–Scalar Divide-by-Zero Exception
Bit 3–VDE–Vector Divide-by-Zero Exception
Bit 4–PCE–PC Out-of-Bounds Exception
Bit 5–IOE–Illegal Opcode Exception
Bit 6–PEE–Port Error Exception
Bit 7–ICE–Instruction-based IDR Contention Exception

*FIG.2-13*

RANDOM ACCESS ADDRESS

EXCEPTION MASK REGISTER (EMR) 334

| | 7 | 6 | 5 | 4 | 3 | 2 | 1 | 0 |
|---|---|---|---|---|---|---|---|---|
| $0003 | ICEM | PEEM | IOEM | PCEM | VDEM | SDEM | VVEM | SVEM |
| RESET | 0 | 0 | 0 | 1 | 0 | 0 | 0 | 0 |

Bit 0–SVEM–Scalar Overflow Exception Mask
Bit 1–VVEM–Vector Overflow Exception Mask
Bit 2–SDEM–Scalar Divide-by-Zero Exception Mask
Bit 3–VDEM–Vector Divide-by-Zero Exception Mask
Bit 4–PCEM–PC Out-of-Bounds Exception Mask
Bit 5–IOEM–Illegal Opcode Exception Mask
Bit 6–PEEM–Port Error Exception Mask
Bit 7–ICEM–Instruction-based IDR Contention Exception Mask

FIG. 2-14

RANDOM ACCESS ADDRESS

PROCESSING ELEMENT SELECT REGISTER (PESR) 220

| | 7 | 6 | 5 | 4 | 3 | 2 | 1 | 0 |
|---|---|---|---|---|---|---|---|---|
| $0004 | 0 | 0 | PE | PE | PE | PE | PE | PE |
| RESET | N.C. | N.C. | 1 | 1 | 1 | 1 | 1 | 1 |

N.C. Indicates No Change

FIG. 2-15

RANDOM ACCESS ADDRESS

PORT CONTROL REGISTER (PCR) 52

| | 7 | 6 | 5 | 4 | 3 | 2 | 1 | 0 |
|---|---|---|---|---|---|---|---|---|
| $0005 | 0 | FM 76 | NSS 74 | EWS 72 | NT 70 | ET 68 | ST 66 | WT 64 |
| RESET | N.C. | 0 | 1 | 1 | 1 | 1 | 1 | 1 |

N.C. Indicates No Change

Bit 0–WT–West Tap Bit
Bit 1–ST–South Tap Bit
Bit 2–ET–East Tap Bit
Bit 3–NT–North Tap Bit
Bit 4–EWS–East-West Switch Bit
Bit 5–NSS–North-South Switch Bit
Bit 6–FM–IDR Filling Mode

FIG. 2-16

Bit 0–EW–External West Port Write
Bit 1–ES–External South Port Write
Bit 2–EE–External East Port Write
Bit 3–EN–External North Port Write
Bit 4–IW–Internal West Port Write
Bit 5–IS–Internal South Port Write
Bit 6–IS–Internal South Port Write
Bit 7–IN–Internal North Port Write (NORTH/WEST IDR CONTENTION)

(EAST PORT COLLISION)

(SOUTH PORT INTERLEAVE)

(EAST-WEST SWITCH CONTENTION)

RANDOM ACCESS ADDRESS

GENERAL PURPOSE PORT REGISTER (GPPR) 338

| | 7 | 6 | 5 | 4 | 3 | 2 | 1 | 0 |
|---|---|---|---|---|---|---|---|---|
| $0007 | 0 | 0 | 0 | 0 | 0 | 0 | PA1 | PA0 |
| RESET | N.C. | N.C. | N.C. | N.C. | N.C. | N.C. | N.C. | N.C. |

N.C. Indicates No Change

FIG. 2-21

RANDOM ACCESS ADDRESS

GENERAL PURPOSE DIRECTION REGISTER (GPDR) 340

| | 7 | 6 | 5 | 4 | 3 | 2 | 1 | 0 |
|---|---|---|---|---|---|---|---|---|
| $0008 | 0 | 0 | 0 | 0 | 0 | 0 | DIR1 | DIR0 |
| RESET | N.C. | N.C. | N.C. | N.C. | N.C. | N.C | 0 | 0 |

N.C. Indicates No Change

FIG. 2-22

RANDOM ACCESS ADDRESS

IDR POINTER REGISTER (IPR) 132

| | 7 | 6 | 5 | 4 | 3 | 2 | 1 | 0 |
|---|---|---|---|---|---|---|---|---|
| $0009 | 0 | 0 | PTR | PTR | PTR | PTR | PTR | PTR |
| RESET | 0 | 0 | 0 | 0 | 0 | 0 | 0 | 0 |

PTR BITS 142

FIG. 2-23

RANDOM ACCESS ADDRESS

IDR COUNT REGISTER (ICR) 136

| | 7 | 6 | 5 | 4 | 3 | 2 | 1 | 0 |
|---|---|---|---|---|---|---|---|---|
| $000A | 0 | CNT | CNT | CNT | CNT | CNT | CNT | CNT |
| RESET | N.C. | 1 | 0 | 0 | 0 | 0 | 0 | 0 |

CNT BITS 146

N.C. Indicates No Change

FIG. 2-24

RANDOM ACCESS ADDRESS

IDR LOCATION MASK REGISTER (ILMR) 134

| | 7 | 6 | 5 | 4 | 3 | 2 | 1 | 0 | |
|---|---|---|---|---|---|---|---|---|---|
| $000C | 0 | 0 | M | M | M | M | M | M | M BITS 144 |
| RESET | 0 | 0 | 0 | 0 | 0 | 0 | 0 | 0 | |

FIG.2-25

RANDOM ACCESS ADDRESS

IDR INITIAL OFFSET REGISTER (IOR) 130

| | 7 | 6 | 5 | 4 | 3 | 2 | 1 | 0 | |
|---|---|---|---|---|---|---|---|---|---|
| $000E | $IO_H$ | $IO_H$ | $IO_H$ | $IO_H$ | $IO_H$ | $IO_H$ | $IO_H$ | $IO_H$ | IO BITS 140 |
| $000F | $IO_L$ | $IO_L$ | $IO_L$ | $IO_L$ | $IO_L$ | $IO_L$ | $IO_L$ | $IO_L$ | |
| RESET | 0 | 0 | 0 | 0 | 0 | 0 | 0 | 0 | |

FIG.2-26

RANDOM ACCESS ADDRESS

HOST STREAM SELECT REGISTER (HSSR) 100

| | 7 | 6 | 5 | 4 | 3 | 2 | 1 | 0 |
|---|---|---|---|---|---|---|---|---|
| $0010 | 0 | 0 | HSP1 | HSP0 | LS3 | LS2 | LS1 | LS0 |
| RESET | N.C. | N.C. | 0 | 1 | 1 | 1 | 1 | 1 |

N.C. Indicates No Change

Bit 0–LS0–Logical Address Select Bit #0
Bit 1–LS1–Logical Address Select Bit #1
Bit 2–LS2–Logical Address Select Bit #2
Bit 3–LS3–Logical Address Select Bit #3
Bit 4–HSP0–Host Stream Port Bit #0
Bit 5–HSP1–Host Stream Port Bit #1

FIG.2-27

RANDOM ACCESS ADDRESS

HOST STREAM OFFSET REGISTER (HSOR) 222

| | 7 | 6 | 5 | 4 | 3 | 2 | 1 | 0 |
|---|---|---|---|---|---|---|---|---|
| $0012 | $OFF_H$ | $OFF_H$ | $OFF_H$ | $OFF_H$ | $OFF_H$ | $OFF_H$ | $OFF_H$ | $OFF_H$ |
| $0013 | $OFF_L$ | $OFF_L$ | $OFF_L$ | $OFF_L$ | $OFF_L$ | $OFF_L$ | $OFF_L$ | $OFF_L$ |

RESET VALUE=$0000

FIG.2-28

EAST-WEST HOLDING REGISTER (EWHR) 92

RANDOM ACCESS ADDRESS

| | | 7 | 6 | 5 | 4 | 3 | 2 | 1 | 0 |
|---|---|---|---|---|---|---|---|---|---|
| \$0018 | | 0 | 0 | 0 | 0 | 0 | SRC | DIR | V |
| | RESET | N.C. | N.C. | N.C. | N.C. | N.C. | 0 | 0 | 0 |

N.C. Indicates No Change

Bit 0–V–Valid Bit
Bit 1–DIR–Direction Bit
Bit 2–SRC–Source Indication

| | | 7 | 6 | 5 | 4 | 3 | 2 | 1 | 0 |
|---|---|---|---|---|---|---|---|---|---|
| \$0019 | | D | D | D | D | D | D | D | D |
| | RESET | 0 | 0 | 0 | 0 | 0 | 0 | 0 | 0 |

FIG.2-32

OFFSET ADDRESS REGISTER #1 (OAR1) 96

RANDOM ACCESS ADDRESS

| | 7 | 6 | 5 | 4 | 3 | 2 | 1 | 0 |
|---|---|---|---|---|---|---|---|---|
| \$0020 | $OF1_H$ | $OF1_H$ | $OF1_H$ | $OF1_H$ | $OF1_H$ | $OF1_H$ | $OF1_H$ | $OF1_H$ |
| \$0021 | $OF1_L$ | $OF1_L$ | $OF1_L$ | $OF1_L$ | $OF1_L$ | $OF1_L$ | $OF1_L$ | $OF1_L$ |

RESET VALUE=\$0000

FIG.2-33

DEPTH CONTROL REGISTER #1 (DCR1) 97

RANDOM ACCESS ADDRESS

| | 7 | 6 | 5 | 4 | 3 | 2 | 1 | 0 |
|---|---|---|---|---|---|---|---|---|
| \$0024 | $DC1_H$ | $DC1_H$ | $DC1_H$ | $DC1_H$ | $DC1_H$ | $DC1_H$ | $DC1_H$ | $DC1_H$ |
| \$0025 | $DC1_L$ | $DC1_L$ | $DC1_L$ | $DC1_L$ | $DC1_L$ | $DC1_L$ | $DC1_L$ | $DC1_L$ |

RESET VALUE=\$14FF

FIG.2-34

RANDOM ACCESS ADDRESS

OFFSET ADDRESS REGISTER #2 (OAR2) 98

| | 7 | 6 | 5 | 4 | 3 | 2 | 1 | 0 |
|---|---|---|---|---|---|---|---|---|
| $0028 | 0 | 0 | OF2 | OF2 | OF2 | OF2 | OF2 | OF2 |

RESET VALUE=$00

FIG.2-35

RANDOM ACCESS ADDRESS

DEPTH CONTROL REGISTER #2 (DCR2) 99

| | 7 | 6 | 5 | 4 | 3 | 2 | 1 | 0 |
|---|---|---|---|---|---|---|---|---|
| $002C | 0 | 0 | DC2 | DC2 | DC2 | DC2 | DC2 | DC2 |

RESET VALUE=$3F

FIG.2-36

RANDOM ACCESS ADDRESS

INTERRUPT STATUS REGISTER #1 (ISR1) 342

| | 7 | 6 | 5 | 4 | 3 | 2 | 1 | 0 |
|---|---|---|---|---|---|---|---|---|
| $0030 | ICI | PEI | IOI | PCI | VDI | SDI | VVI | SVI |
| RESET | 0 | 0 | 0 | 0 | 0 | 0 | 0 | 0 |

Bit 0–SVI–Scalar Overflow Interrupt
Bit 1–VVI–Vector Overflow Interrupt
Bit 2–SDI–Scalar Divide-by-Zero Interrupt
Bit 3–VDI–Vector Divide-by-Zero Interrupt
Bit 4–PCI–PC Out-of-Bounds Interrupt
Bit 5–IOI–Illegal Opcode Interrupt
Bit 6–PEI–Port Error Interrupt
Bit 7–ICI–Instruction-based IDR Contention Interrupt

FIG.2-37

RANDOM ACCESS ADDRESS

INTERRUPT MASK REGISTER #1 (IMR1) 344

| | 7 | 6 | 5 | 4 | 3 | 2 | 1 | 0 |
|---|---|---|---|---|---|---|---|---|
| $0034 | ICIM | PEIM | IOIM | PCIM | VDIM | SDIM | VVIM | SVIM |
| RESET | 0 | 0 | 0 | 0 | 0 | 0 | 0 | 0 |

Bit 0–SVIM–Scalar Overflow Interrupt Mask
Bit 1–VVIM–Vector Overflow Interrupt Mask
Bit 2–SDIM–Scalar Divide-by-Zero Interrupt Mask
Bit 3–VDIM–Vector Divide-by-Zero Interrupt Mask
Bit 4–PCIM–PC Out-of-Bounds Interrupt Mask
Bit 5–IOIM–Illegal Opcode Interrupt Mask
Bit 6–PEIM–Port Error Interrupt Mask
Bit 7–ICIM–Instruction-based IDR Contention Interrupt Mask

*FIG. 2-38*

RANDOM ACCESS ADDRESS

INTERRUPT STATUS REGISTER #2 (ISR2) 346

| | 7 | 6 | 5 | 4 | 3 | 2 | 1 | 0 |
|---|---|---|---|---|---|---|---|---|
| $0038 | 0 | 0 | 0 | 0 | SI2 | SI1 | SI0 | HLTI |
| RESET | N.C. | N.C. | N.C. | N.C. | 0 | 0 | 0 | 0 |

N.C. Indicates No Change

Bit 0–HLTI–Halt Instruction Interrupt
Bit 1–SI0–Software Interrupt, Bit #0
Bit 2–SI1–Software Interrupt, Bit #1
Bit 3–SI2–Software Interrupt, Bit #2

*FIG. 2-39*

RANDOM ACCESS ADDRESS

INTERRUPT MASK REGISTER #2 (IMR2) 348

| | 7 | 6 | 5 | 4 | 3 | 2 | 1 | 0 |
|---|---|---|---|---|---|---|---|---|
| $003C | 0 | 0 | 0 | 0 | SIM2 | SIM1 | SIM0 | HLTM |
| RESET | N.C. | N.C. | N.C. | N.C. | 0 | 0 | 0 | 0 |

N.C. Indicates No Change

Bit 0–HLTM–Halt Instruction Interrupt Mask
Bit 1–SIM0–Software Interrupt Mask, Bit #0
Bit 2–SIM1–Software Interrupt Mask, Bit #1
Bit 3–SIM2–Software Interrupt Mask, Bit #2

*FIG. 2-40*

RANDOM ACCESS ADDRESS

MICROSEQUENCER CONTROL REGISTER (MCR) 188

| | 7 | 6 | 5 | 4 | 3 | 2 | 1 | 0 |
|---|---|---|---|---|---|---|---|---|
| $0040 | 0 | IL | RPLF 200 | RELF 198 | FLSF | STKF | RSA | SS |
| RESET | N.C. | 0 | 0 | 0 | 0 | 1 | 0 | 0 |

N.C. Indicates No Change

Bit 0–SS–Single Step
Bit 1–RSA–Reset SIMD Array
Bit 2–STKF–Stack Flag
Bit 3–FLSF–First Level Stack Flag
Bit 4–RELF–Repeate Loop Flag
Bit 5–RPLF–Repeat Loop Flag
Bit 6–IL–Instruction Lock

FIG.2-41

RANDOM ACCESS ADDRESS

MICROSEQUENCER STATUS REGISTER (MSR) 350

| | 7 | 6 | 5 | 4 | 3 | 2 | 1 | 0 |
|---|---|---|---|---|---|---|---|---|
| $0044 | 0 | 0 | 0 | EXE2 | EXE1 | EXE0 | R | 0 |
| RESET | N.C. | N.C. | N.C. | 1 | 1 | 1 | 0 | 0 |

N.C. Indicates No Change

Bit 0–Not Used
Bit 1–R–Microsequencer Running
Bit 2–EXE0–Internal Execution Status Bit #0
Bit 3–EXE1–Internal Execution Status Bit #1
Bit 4–EXE2–Internal Execution Status Bit #2

FIG.2-43

RANDOM ACCESS ADDRESS

SCALAR PROCESS CONTROL REGISTER (SPCR) 208

| | 7 | 6 | 5 | 4 | 3 | 2 | 1 | 0 |
|---|---|---|---|---|---|---|---|---|
| $0048 | 0 | 0 | 0 | 0 | SD 216 | SV 214 | SX1 212 | SX0 210 |
| RESET | N.C. | N.C. | N.C. | N.C. | 0 | 0 | 0 | 0 |

N.C. Indicates No Change

Bit 0–SX0–Scalar Extension Bit #0
Bit 1–SX1–Scalar Extension Bit #1
Bit 2–SV–Scalar Overflow Bit
Bit 3–SD–Scalar Overflow Direction Bit

FIG.2-44

RANDOM ACCESS ADDRESS

INSTRUCTION REGISTER (IR) 352

| | 7 | 6 | 5 | 4 | 3 | 2 | 1 | 0 |
|---|---|---|---|---|---|---|---|---|
| $0050 | $IR_H$ | $IR_H$ | $IR_H$ | $IR_H$ | $IR_H$ | $IR_H$ | $IR_H$ | $IR_H$ |
| $0051 | $IR_L$ | $IR_L$ | $IR_L$ | $IR_L$ | $IR_L$ | $IR_L$ | $IR_L$ | $IR_L$ |
| RESET | N.C. | N.C. | N.C. | N.C. | N.C. | N.C. | N.C. | N.C. |

N.C. Indicates No Change

*FIG.2-45*

RANDOM ACCESS ADDRESS

INSTRUCTION CACHE LINE VALID REGISTER (ICVR) 354

| | 7 | 6 | 5 | 4 | 3 | 2 | 1 | 0 |
|---|---|---|---|---|---|---|---|---|
| $0054 | 0 | 0 | 0 | 0 | ICV3 | ICV2 | ICV1 | ICV0 |
| RESET | 0 | 0 | 0 | 0 | 0 | 0 | 0 | 0 |

*FIG.2-46*

RANDOM ACCESS ADDRESS

PROGRAM COUNTER (PC) 186

| | 7 | 6 | 5 | 4 | 3 | 2 | 1 | 0 |
|---|---|---|---|---|---|---|---|---|
| $0058 | $PC_H$ | $PC_H$ | $PC_H$ | $PC_H$ | $PC_H$ | $PC_H$ | $PC_H$ | $PC_H$ |
| $0059 | $PC_L$ | $PC_L$ | $PC_L$ | $PC_L$ | $PC_L$ | $PC_L$ | $PC_L$ | $PC_L$ |

RESET VALUE=(EPPC)

*FIG.2-47*

RANDOM ACCESS ADDRESS

PC BOUNDS REGISTER (PBR) 356

| | 7 | 6 | 5 | 4 | 3 | 2 | 1 | 0 |
|---|---|---|---|---|---|---|---|---|
| $005C | $PC_H$ | $PC_H$ | $PC_H$ | $PC_H$ | $PC_H$ | $PC_H$ | $PC_H$ | $PC_H$ |
| $005D | $PC_L$ | $PC_L$ | $PC_L$ | $PC_L$ | $PC_L$ | $PC_L$ | $PC_L$ | 0 |

RESET VALUE=$FFFE

*FIG.2-48*

RANDOM ACCESS ADDRESS

INSTRUCTION CACHE TAG #0 (ICT0) 358

| | 7 | 6 | 5 | 4 | 3 | 2 | 1 | 0 |
|---|---|---|---|---|---|---|---|---|
| $0060 | IT0 | IT0 | IT0 | IT0 | IT0 | IT0 | IT0 | IT0 |

RESET VALUE=NO CHANGE

FIG.2-49

RANDOM ACCESS ADDRESS

INSTRUCTION CACHE TAG #1 (ICT1) 360

| | 7 | 6 | 5 | 4 | 3 | 2 | 1 | 0 |
|---|---|---|---|---|---|---|---|---|
| $0064 | IT1 | IT1 | IT1 | IT1 | IT1 | IT1 | IT1 | IT1 |

RESET VALUE=NO CHANGE

FIG.2-50

RANDOM ACCESS ADDRESS

INSTRUCTION CACHE TAG #2 (ICT2) 362

| | 7 | 6 | 5 | 4 | 3 | 2 | 1 | 0 |
|---|---|---|---|---|---|---|---|---|
| $0068 | IT2 | IT2 | IT2 | IT2 | IT2 | IT2 | IT2 | IT2 |

RESET VALUE=NO CHANGE

FIG.2-51

RANDOM ACCESS ADDRESS

INSTRUCTION CACHE TAG #3 (ICT3) 364

| | 7 | 6 | 5 | 4 | 3 | 2 | 1 | 0 |
|---|---|---|---|---|---|---|---|---|
| $006C | IT3 | IT3 | IT3 | IT3 | IT3 | IT3 | IT3 | IT3 |

RESET VALUE=NO CHANGE

FIG.2-52

RANDOM ACCESS ADDRESS

STACK POINTER (SP) 366

| | 7 | 6 | 5 | 4 | 3 | 2 | 1 | 0 |
|---|---|---|---|---|---|---|---|---|
| $0070 | $SP_H$ | $SP_H$ | $SP_H$ | $SP_H$ | $SP_H$ | $SP_H$ | $SP_H$ | $SP_H$ |
| $0071 | $SP_L$ | $SP_L$ | $SP_L$ | $SP_L$ | $SP_L$ | $SP_H$ | $SP_H$ | $SP_H$ |

RESET VALUE=(EPSP)

FIG.2-53

RANDOM ACCESS ADDRESS

FIRST LEVEL STACK (FLS) 368

| | 7 | 6 | 5 | 4 | 3 | 2 | 1 | 0 |
|---|---|---|---|---|---|---|---|---|
| $0074 | $PC_H$ | $PC_H$ | $PC_H$ | $PC_H$ | $PC_H$ | $PC_H$ | $PC_H$ | $PC_H$ |
| $0075 | $PC_L$ | $PC_L$ | $PC_L$ | $PC_L$ | $PC_L$ | $PC_L$ | $PC_L$ | $PC_L$ |

RESET VALUE=NO CHANGE

FIG.2-54

RANDOM ACCESS ADDRESS

REPEAT BEGIN REGISTER (RBR) 180

| | 7 | 6 | 5 | 4 | 3 | 2 | 1 | 0 |
|---|---|---|---|---|---|---|---|---|
| $0080 | $PC_H$ | $PC_H$ | $PC_H$ | $PC_H$ | $PC_H$ | $PC_H$ | $PC_H$ | $PC_H$ |
| $0081 | $PC_L$ | $PC_L$ | $PC_L$ | $PC_L$ | $PC_L$ | $PC_L$ | $PC_L$ | $PC_L$ |

RESET VALUE=NO CHANGE

FIG.2-55

RANDOM ACCESS ADDRESS

REPEAT END REGISTER (RER) 182

| | 7 | 6 | 5 | 4 | 3 | 2 | 1 | 0 |
|---|---|---|---|---|---|---|---|---|
| $0084 | $PC_H$ | $PC_H$ | $PC_H$ | $PC_H$ | $PC_H$ | $PC_H$ | $PC_H$ | $PC_H$ |
| $0085 | $PC_L$ | $PC_L$ | $PC_L$ | $PC_L$ | $PC_L$ | $PC_L$ | $PC_L$ | $PC_L$ |

RESET VALUE=NO CHANGE

FIG.2-56

RANDOM ACCESS ADDRESS

REPEAT COUNT REGISTER (RCR) 184

| | 7 | 6 | 5 | 4 | 3 | 2 | 1 | 0 |
|---|---|---|---|---|---|---|---|---|
| $0088 | D | D | D | D | D | D | D | D |

RESET VALUE=NO CHANGE

GLOBAL DATA REGISTERS (G[0]–G[7]) 302

| RANDOM ACCESS ADDRESS | 7 | 6 | 5 | 4 | 3 | 2 | 1 | 0 |
|---|---|---|---|---|---|---|---|---|
| $0090 | G0 | G0 | G0 | G0 | G0 | G0 | G0 | G0 |
| $0091 | 0 | 0 | 0 | 0 | 0 | 0 | 0 | 0 |
| $0092 | 0 | 0 | 0 | 0 | 0 | 0 | 0 | 0 |
| $0093 | 0 | 0 | 0 | 0 | 0 | 0 | 0 | 0 |
| $0094 | G1 | G1 | G1 | G1 | G1 | G1 | G1 | G1 |
| $0095 | 0 | 0 | 0 | 0 | 0 | 0 | 0 | 0 |
| $0096 | 0 | 0 | 0 | 0 | 0 | 0 | 0 | 0 |
| $0097 | 0 | 0 | 0 | 0 | 0 | 0 | 0 | 0 |
| ⋮ | | | | ⋮ | | | | |
| $00AC | G7 | G7 | G7 | G7 | G7 | G7 | G7 | G7 |
| $00AD | 0 | 0 | 0 | 0 | 0 | 0 | 0 | 0 |
| $00AE | 0 | 0 | 0 | 0 | 0 | 0 | 0 | 0 |
| $00AF | 0 | 0 | 0 | 0 | 0 | 0 | 0 | 0 |

FIG. 2-59

GLOBAL POINTER REGISTERS (P[0]–P[7]) 300

| RANDOM ACCESS ADDRESS | 7 | 6 | 5 | 4 | 3 | 2 | 1 | 0 |
|---|---|---|---|---|---|---|---|---|
| $00B0 | P0 | P0 | P0 | P0 | P0 | P0 | P0 | P0 |
| $00B1 | 0 | 0 | 0 | 0 | 0 | 0 | 0 | 0 |
| $00B2 | 0 | 0 | 0 | 0 | 0 | 0 | 0 | 0 |
| $00B3 | 0 | 0 | 0 | 0 | 0 | 0 | 0 | 0 |
| $00B4 | P1 | P1 | P1 | P1 | P1 | P1 | P1 | P1 |
| $00B5 | 0 | 0 | 0 | 0 | 0 | 0 | 0 | 0 |
| $00B6 | 0 | 0 | 0 | 0 | 0 | 0 | 0 | 0 |
| $00B7 | 0 | 0 | 0 | 0 | 0 | 0 | 0 | 0 |
| ⋮ | | | | ⋮ | | | | |
| $00CC | P7 | P7 | P7 | P7 | P7 | P7 | P7 | P7 |
| $00CD | 0 | 0 | 0 | 0 | 0 | 0 | 0 | 0 |
| $00CE | 0 | 0 | 0 | 0 | 0 | 0 | 0 | 0 |
| $00CF | 0 | 0 | 0 | 0 | 0 | 0 | 0 | 0 |

EXCEPTION POINTER TABLE 370

| RANDOM ACCESS ADDRESS | 7 | 6 | 5 | 4 | 3 | 2 | 1 | 0 | |
|---|---|---|---|---|---|---|---|---|---|
| $00E0 | $PC_H$ | $PC_H$ | $PC_H$ | $PC_H$ | $PC_H$ | $PC_H$ | $PC_H$ | $PC_H$ | EPPC |
| $00E1 | $PC_L$ | $PC_L$ | $PC_L$ | $PC_L$ | $PC_L$ | $PC_L$ | $PC_L$ | $PC_L$ | |
| $00E2 | $PC_H$ | $PC_H$ | $PC_H$ | $PC_H$ | $PC_H$ | $PC_H$ | $PC_H$ | $PC_H$ | EPSP |
| $00E3 | $PC_L$ | $PC_L$ | $PC_L$ | $PC_L$ | $PC_L$ | $PC_L$ | $PC_L$ | $PC_L$ | |
| $00E4 | $PC_H$ | $PC_H$ | $PC_H$ | $PC_H$ | $PC_H$ | $PC_H$ | $PC_H$ | $PC_H$ | EPSV |
| $00E5 | $PC_L$ | $PC_L$ | $PC_L$ | $PC_L$ | $PC_L$ | $PC_L$ | $PC_L$ | $PC_L$ | |
| $00E6 | $PC_H$ | $PC_H$ | $PC_H$ | $PC_H$ | $PC_H$ | $PC_H$ | $PC_H$ | $PC_H$ | EPVV |
| $00E7 | $PC_L$ | $PC_L$ | $PC_L$ | $PC_L$ | $PC_L$ | $PC_L$ | $PC_L$ | $PC_L$ | |
| $00E8 | $PC_H$ | $PC_H$ | $PC_H$ | $PC_H$ | $PC_H$ | $PC_H$ | $PC_H$ | $PC_H$ | EPSZ |
| $00E9 | $PC_L$ | $PC_L$ | $PC_L$ | $PC_L$ | $PC_L$ | $PC_L$ | $PC_L$ | $PC_L$ | |
| $00EA | $PC_H$ | $PC_H$ | $PC_H$ | $PC_H$ | $PC_H$ | $PC_H$ | $PC_H$ | $PC_H$ | EPVZ |
| $00EB | $PC_L$ | $PC_L$ | $PC_L$ | $PC_L$ | $PC_L$ | $PC_L$ | $PC_L$ | $PC_L$ | |
| $00EC | $PC_H$ | $PC_H$ | $PC_H$ | $PC_H$ | $PC_H$ | $PC_H$ | $PC_H$ | $PC_H$ | EPOB |
| $00ED | $PC_L$ | $PC_L$ | $PC_L$ | $PC_L$ | $PC_L$ | $PC_L$ | $PC_L$ | $PC_L$ | |
| $00EE | $PC_H$ | $PC_H$ | $PC_H$ | $PC_H$ | $PC_H$ | $PC_H$ | $PC_H$ | $PC_H$ | EPIO |
| $00EF | $PC_L$ | $PC_L$ | $PC_L$ | $PC_L$ | $PC_L$ | $PC_L$ | $PC_L$ | $PC_L$ | |
| $00F0 | $PC_H$ | $PC_H$ | $PC_H$ | $PC_H$ | $PC_H$ | $PC_H$ | $PC_H$ | $PC_H$ | EPPE |
| $00F1 | $PC_L$ | $PC_L$ | $PC_L$ | $PC_L$ | $PC_L$ | $PC_L$ | $PC_L$ | $PC_L$ | |
| $00F2 | $PC_H$ | $PC_H$ | $PC_H$ | $PC_H$ | $PC_H$ | $PC_H$ | $PC_H$ | $PC_H$ | EPIC |
| $00F3 | $PC_L$ | $PC_L$ | $PC_L$ | $PC_L$ | $PC_L$ | $PC_L$ | $PC_L$ | $PC_L$ | |

RESET VALUE=NO CHANGE

*FIG.2-60*

VECTOR PROCESS CONTROL REGISTER (VPCR) 102

| RANDOM ACCESS ADDRESS | 7 | 6 | 5 | 4 | 3 | 2 | 1 | 0 | |
|---|---|---|---|---|---|---|---|---|---|
| $0A00 | 0 | VID 114 | VH 112 | VT 110 | VD 108 | VV 106 | VX1 105 | VX0 104 | PE #0 |
| $0A01 | 0 | VID 114 | VH 112 | VT 110 | VD 108 | VV 106 | VX1 105 | VX0 104 | PE #1 |
| $0A02 | 0 | VID 114 | VH 112 | VT 110 | VD 108 | VV 106 | VX1 105 | VX0 104 | PE #2 |
| $0A03 | 0 | VID 114 | VH 112 | VT 110 | VD 108 | VV 106 | VX1 105 | VX0 104 | PE #3 |
| $0A04 | 0 | VID 114 | VH 112 | VT 110 | VD 108 | VV 106 | VX1 105 | VX0 104 | PE #4 |
| $0A05 | 0 | VID 114 | VH 112 | VT 110 | VD 108 | VV 106 | VX1 105 | VX0 104 | PE #5 |
| $0A06 | 0 | VID 114 | VH 112 | VT 110 | VD 108 | VV 106 | VX1 105 | VX0 104 | PE #6 |
| $0A07 | 0 | VID 114 | VH 112 | VT 110 | VD 108 | VV 106 | VX1 105 | VX0 104 | PE #7 |
| ⋮ | | | | ⋮ | | | | | ⋮ |
| $0A3C | 0 | VID 114 | VH 112 | VT 110 | VD 108 | VV 106 | VX1 105 | VX0 104 | PE #60 |
| $0A3D | 0 | VID 114 | VH 112 | VT 110 | VD 108 | VV 106 | VX1 105 | VX0 104 | PE #61 |
| $0A3E | 0 | VID 114 | VH 112 | VT 110 | VD 108 | VV 106 | VX1 105 | VX0 104 | PE #62 |
| $0A3F | 0 | VID 114 | VH 112 | VT 110 | VD 108 | VV 106 | VX1 105 | VX0 104 | PE #63 |
| RESET | N.C. | 0 | 0 | 1 | 0 | 0 | 0 | 0 | |

N.C. Indicates No Change

Bit 0–VX0–Vector Extension Bit #0
Bit 1–VX1–Vector Extension Bit #1
Bit 2–VV–Vector Overflow
Bit 3–VD–Vector Overflow Direction
Bit 4–VT–Vector Condition True Bit
Bit 5–VH–Vector Condition History Bit
Bit 6–VID–Input Data Valid Bit

*FIG.2-64*

```
        MOVI #8, G0
LOOP:   REPEAT #ENDL, G0
        NOP
        NOP
        NOP
        NOP
ENDL:   BRA/JMPRI/JMPMI
NEXTI:  NOP
```

THE CONTENTS OF THE LOOP ARE EXECUTED ONLY ONCE, AND THE BRANCH AT THE END OF THE LOOP IS TAKEN.

*FIG. 2-76*

```
        MOVI #8, G0
LOOP:   REPEAT #ENDL, G0
        NOP
        NOP
        NOP
        NOP
ENDL:   BSR/JMPRI/JMPMI
NEXTI:  NOP
```

IF RCR (THE REPEAT LOOP COUNT) IS NON-ZERO, THE RETURN ADDRESS PLACED ON THE STACK WILL BE "LOOP", WHICH IS EQUIVALENT TO RBR.

IF RCR IS EQUAL TO ZERO, THEN THE RETURN ADDRESS PLACED ON THE STACK WILL BE "NEXTI", WHICH IS EQUIVALENT TO RER+2.

*FIG. 2-77*

```
      MOVI #8, G0
LOOP: REPEAT #ENDL, G0
      VADD V0, V1
      VADD V0, V1
      VADD V0, V1
      VADD V0, V1
ENDL: VENDIF
```

IS FUNCTIONALLY EQUIVALENT TO

```
      MOVI #8, G0
LOOP: REPEATE #ENDL, G0
      VADD V0, V1
      VADD V0, V1
      VADD V0, V1
ENDL: VADD V0, V1
```

FIG.2-78

```
      MOVI #8, G0
LOOP: REPEAT #ENDL, G0
      VADD V0, V1
      VADD V0, V1
      VADD V0, V1
ENDL: VECTOR CONDITIONAL
      NOP
```

IS FUNCTIONALLY EQUIVALENT TO

```
      MOVI #8, G0
LOOP: REPEAT #ENDL, G0
      VADD V0, V1
      VADD V0, V1
      VADD V0, V1
      VECTOR CONDITIONAL
ENDL: NOP
```

FIG.2-79

```
      MOVI #8, G0
LOOP: REPEATE #ENDL, G0
      VADD V0, V1
      VADD V0, V1
      VADD V0, V1
      VADD V0, V1
ENDL: VECTOR CONDITIONAL
```

IS FUNCTIONALLY EQUIVALENT TO

```
      MOVI #8, G0
LOOP: REPEATE #ENDL, G0
      VADD V0, V1
      VADD V0, V1
      VADD V0, V1
      VADD V0, V1
ENDL: NOP
```

FIG.2-80

```
ADD G0, P1
VMOV CMA[P1], V0
```

DATA PROCESSING SYSTEM 57.2

DATA PROCESSING SYSTEM 55.1

STOP MODE SOUTH STREAM ACCESSES

DATA PROCESSING SYSTEM 55.2

PRIOR ART APPROACH USING SINGLE INSTRUCTION MULTIPLE DATA (SIMD) PROCESSOR INSTRUCTION STEPS:

1. COPY VECTOR
2. SHIFT COPY 1 PE DOWNWARD
3. ADD SHIFTED COPY TO VECTOR
4. COPY TO VECTOR
5. SHIFT COPY 2 PEs DOWNWARD
6. ADD SHIFTED COPY TO VECTOR
7. COPY VECTOR
8. SHIFT COPY 4 PEs DOWNWARD
9. ADD SHIFTED COPY TO VECTOR

| CONTENTS OF A PORTION OF PROCESSING ELEMENT 16 | STEP 1 | STEP 2 | STEP 3 | FINAL VECTOR AGGREGATION RESULT |
|---|---|---|---|---|
| CONTENTS OF PROCESSING ELEMENT #0 | A | | | A |
| CONTENTS OF PROCESSING ELEMENT #1 | B | A+B | | A+B |
| CONTENTS OF PROCESSING ELEMENT #2 | C | | A+B+C | A+B+C |
| CONTENTS OF PROCESSING ELEMENT #3 | D | C+D | A+B+C+D | A+B+C+D |
| CONTENTS OF PROCESSING ELEMENT #4 | E | | | A+B+C+D+E |
| CONTENTS OF PROCESSING ELEMENT #5 | F | E+F | | A+B+C+D+E+F |
| CONTENTS OF PROCESSING ELEMENT #6 | G | | E+F+G | A+B+C+D+E+F+G |
| CONTENTS OF PROCESSING ELEMENT #7 | H | G+H | E+F+G+H | A+B+C+D+E+F+G+H |

DATA PROCESSOR 10
INSTRUCTION SEQUENCE:

1. 1–PLACE DOWNWARD ADD, DADD #0 (SEE FIG.5–14)
2. 2–PLACE DOWNWARD ADD, DADD #1 (SEE FIG.5–15)
3. 4–PLACE DOWNWARD ADD, DADD #2 (SEE FIG.5–16)

*FIG.5-13*

| 8-BIT BINARY VALUE INITIALLLY STORED IN EACH PROCESSING ELEMENT | VALUE OF VT BITS 110 AFTER EACH OF THE EIGHT WIRE-OR STEPS | | | | | | | | DESIRED VALUE OF VT BITS 110 AFTER LAST WIRE-OR STEP |
|---|---|---|---|---|---|---|---|---|---|
| | 1 | 2 | 3 | 4 | 5 | 6 | 7 | 8 | |
| PE #0= 0 1 0 0 0 0 0 0 | 1 | 1 | 1 | 0 | 0 | 0 | 0 | 0 | 0 |
| PE #1= 0 0 0 0 0 0 0 0 | 1 | 0 | 0 | 0 | 0 | 0 | 0 | 0 | 0 |
| PE #2= 0 1 0 1 0 0 0 0 | 1 | 1 | 1 | 1 | 1 | 1 | 1 | 1 | 1 |
| PE #3= 0 1 0 0 0 0 0 0 | 1 | 1 | 1 | 0 | 0 | 0 | 0 | 0 | 0 |
| PE #4= 0 1 0 1 0 0 0 0 | 1 | 1 | 1 | 1 | 1 | 1 | 1 | 1 | 1 |
| PE #5= 0 0 1 0 0 0 0 0 | 1 | 0 | 0 | 0 | 0 | 0 | 0 | 0 | 0 |
| PE #6= 0 1 0 0 0 0 0 0 | 1 | 1 | 1 | 0 | 0 | 0 | 0 | 0 | 0 |
| PE #7= 0 0 1 1 0 0 0 0 | 1 | 0 | 0 | 0 | 0 | 0 | 0 | 0 | 0 |

FIG.5-27

| STEP NUMBER | 1 | 2 | 3 | 4 | 5 | 6 | 7 | 8 |
|---|---|---|---|---|---|---|---|---|
| LOGIC STATE OF THE WIRE-OR LINE 158 | 0 | 1 | 0 | 1 | 0 | 0 | 0 | 0 |

| SIGNAL SUMMARY | | | | |
|---|---|---|---|---|
| GROUP | SIGNAL NAME | MNEMONIC | DIR. | FUNCTION |
| PORT SIGNALS | NORTH DATA/ ADDRESS | ND | I/O | BI-DIRECTIONAL 8-BIT DATA OR LSB ADDRESS PORT |
| | NORTH CONTROL OUTPUT | $\overline{NCO}$ | O | DATA ON NORTH PORT IS VALID OUTPUT |
| | NORTH CONTROL INPUT | $\overline{NCI}$ | I | DATA ON NORTH PORT IS VALID INPUT |
| | SOUTH DATA | SD | I/O | BI-DIRECTIONAL 8-BIT DATA PORT |
| | SOUTH CONTROL OUTPUT | $\overline{SCO}$ | O | DATA ON SOUTH PORT IS VALID OUTPUT |
| | SOUTH CONTROL INPUT | $\overline{SCI}$ | I | DATA ON SOUTH PORT IS VALID INPUT |
| | EAST DATA | ED | I/O | BI-DIRECTIONAL 8-BIT DATA PORT |
| | EAST CONTROL OUTPUT | $\overline{ECO}$ | O | DATA ON EAST PORT IS VALID OUTPUT |
| | EAST CONTROL INPUT | $\overline{ECI}$ | I | DATA ON EAST PORT IS VALID INPUT |
| | WEST DATA/ ADDRESS | WD | I/O | BI-DIRECTIONAL 8-BIT DATA OR MSB ADDRESS PORT |
| | WEST CONTROL OUTPUT | $\overline{WCO}$ | O | DATA ON WEST PORT IS VALID OUTPUT |
| | WEST CONTROL INPUT | $\overline{WCI}$ | I | DATA ON WEST PORT IS VALID INPUT |
| HOST ACCESS CONTROL | READ/WRITE CONTROL | R/$\overline{W}$ | I | HOST READ WRITE CONTROL INPUT |
| | ACCESS TYPE | OP | I | HOST ACCESS SELECT |
| | DATA ENABLE | $\overline{EN}$ | I | DATA ENABLE FOR HOST ACCESSS |
| SYSTEM ORCH. SIGNALS | RUN/STOP CONTROL | R/$\overline{S}$ | I | RUN/STOP CONTROLS HOST ACCESS AND PROGRAM EXECUTION |
| | BUSY CONTROL | $\overline{BUSY}$ | O | BUSY CONTROL FOR PROGRAM SYNCHRONIZATION BETWEEN AEs |
| ROW/COLUMN SIGNALS | ROW CONTROL | $\overline{ROW}$ | I/O | HOST ROW SELECT INPUT AND ROW MIN/MAX CONTROL |
| | COLUMN CONTROL | $\overline{COL}$ | I/O | HOST COLUMN SELECT INPUT AND COLUMN MIN/MAX CONTROL |

*FIG. 6-1-2*

| SIGNAL SUMMARY | | | | |
|---|---|---|---|---|
| GROUP | SIGNAL NAME | MNEMONIC | DIR. | FUNCTION |
| MISC. SIGNALS | SYSTEM CLOCK | CLK | I | CLOCK INPUT TO DERIVE ALL BUS SIGNAL TIMING |
| | SYSTEM RESET | $\overline{\text{RESET}}$ | I | AE RESET INPUT |
| | INTERRUPT | $\overline{\text{INTR}}$ | O | AE INTERRUPT LINE |
| | PROCESSOR STATUS | PSTAT[2:0] | O | STATUS STATES OF AE PROCESSOR |
| | GENERAL I/O | PA[1:0] | I/O | GENERAL PURPOSE PROGRAM INPUT/OUTPUT |
| TEST SIGNALS | TEST CLOCK | TCK | I | CLOCK SIGNAL FOR THE IEEE 1149.1 TEST ACCESS PORT (TAP) |
| | TEST RESET | $\overline{\text{TRST}}$ | I | TEST RESET INPUT FOR THE TAP |
| | TEST DATA INPUT | TDI | I | SERIAL DATA INPUT |
| | TEST DATA OUTPUT | TDO | O | SERIAL DATA OUTPUT |
| | TEST MODE SELECT | TMS | I | SELECTS THE OPERATIONS OF THE TEST-SUPPORT CIRCUITRY |
| SUPPLY | POWER SUPPLY | VDD | – | POWER SUPPLY |
| | GROUND | VSS | – | GROUND |

*FIG. 6-2*

| SIGNAL FUNCTIONALITY BASED ON RUN/STOP MODE | | |
|---|---|---|
| SIGNAL | RUN MODE | STOP MODE |
| ND, WD | PROGRAM WRITE DATA | HOST ADDRESS INPUT OR HOST DATA INPUT/OUTPUT |
| SD, ED | PROGRAM WRITE DATA | HOST DATA INPUT/OUTPUT |
| $\overline{\text{NCO}}$, $\overline{\text{SCO}}$, $\overline{\text{WCO}}$, $\overline{\text{ECO}}$ | ND,SD,WD,ED OUTPUT DATA IS VALID | ND,SD,WD,ED OUTPUT DATA IS VALID |
| $\overline{\text{NCI}}$, $\overline{\text{SCI}}$, $\overline{\text{WCI}}$, $\overline{\text{ECI}}$ | ND,SD,WD,ED INPUT DATA IS VALID | ND,SD,WD,ED INPUT DATA IS VALID |
| $\overline{\text{EN}}$, OP, R/$\overline{\text{W}}$ | DON'T CARE | ND,SD,WD,ED OUTPUT DATA IS VALID |
| ROW, COL | ROW AND COLUMN MINIMUM AND MAXIMUM FUNCTIONS | ROW AND COLUMN CHIP SELECTS |

| ENCODING FOR THE PROCESSOR STATUS SIGNALS | | | |
|---|---|---|---|
| PSTAT[2] | PSTAT[1] | PSTAT[0] | STATUS |
| 0 | 0 | 0 | AE STALLED ON IDR REFERENCE (STAGE #3 PIPE STALL) |
| 0 | 0 | 1 | ANY OF THE WRITE, VWRITE INSTRUCTIONS IS BEING EXECUTED |
| 0 | 1 | 0 | ANY, EXCEPT VWRITE, OF THE VECTOR INSTRUCTIONS IS BEING EXECUTED |
| 0 | 1 | 1 | ANY, EXCEPT WRITE, OF THE SCALAR INSTRUCTIONS IS BEING EXECUTED |
| 1 | 0 | 0 | ANY OF THE VIF, VELSE, VENDIF INSTRUCTIONS IS BEING EXECUTED |
| 1 | 0 | 1 | EXCEPTION PROCESSING |
| 1 | 1 | 0 | BRANCH TAKEN |
| 1 | 1 | 1 | BRANCH NOT TAKEN |

FIG. 6-3

| AE D.C. ELECTRICAL CHARACTERISTICS | | | |
|---|---|---|---|
| CHARACTERISTIC | MIN | MAX | UNIT |
| INPUT HIGH VOLTAGE (VIH) | 0.7 $V_{DD}$ | $V_{DD}$ | V |
| INPUT LOW VOLTAGE | $V_{SS}$ | 0.2 $V_{DD}$ | V |
| INPUT LEAKAGE CURRENT | −2.5 | 2.5 | μA |
| TRI-STATE LEAKAGE | −20 | 20 | μA |
| OUTPUT HIGH VOLTAGE | $V_{DD}$ − 0.8 | $V_{DD}$ | V |
| OUTPUT LOW VOLTAGE | $V_{SS}$ | 0.4 | V |
| OUTPUT HIGH CURRENT | | 0.4 | mA |
| OUTPUT LOW CURRENT | | 3.2 | mA |
| LOAD CAPACITANCE | | 60 | pF |
| INPUT CAPACITANCE | | 20 | pF |

FIG. 6-4

"MOVC SPACE" OF HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| AE IDENTIFICATION REGISTER | AIR | R/O | $0000 | 1 x (1) | 1 | 1 | 1 | 1 | 1 | 1 | 1 | 1 |
| ARITHMETIC CONTROL REGISTER | ACR | R/W | $0001 | 1 x (1) | 0 | 0 | 0 | 0 | 0 | 0 | VSGN | SSGN |
| EXCEPTION STATUS REGISTER | ESR | R/O | $0002 | 1 x (1) | ICE | PEE | IOE | PCE | VDE | SDE | VVE | SVE |
| EXCEPTION MASK REGISTER | EMR | R/W | $0003 | 1 x (1) | ICEM | PEEM | IOEM | PCEM | VDEM | SDEM | VVEM | SVEM |
| PROCESSING ELEMENT SELECT | PESR | R/W | $0004 | 1 x (1) | 0 | 0 | PE | PE | PE | PE | PE | PE |
| PORT CONTROL REGISTER | PCR | R/W | $0005 | 1 x (1) | 0 | FM | NSS | EWS | NT | ET | ST | WT |
| AE PORT MONITOR REGISTER | APMR | R/O | $0006 | 1 x (1) | IN | IE | IS | IW | ON | OE | OS | OW |

FIG. 6-5-1

"MOVC SPACE" OF HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| GENERAL PURPOSE PORT | GPPR | R/W | $0007 | 1 x (1) | 0 | 0 | 0 | 0 | 0 | 0 | PA1 | PA0 |
| GENERAL PURPOSE DIRECTION | GPDR | R/W | $0008 | 1 x (1) | 0 | 0 | 0 | 0 | 0 | 0 | DIR1 | DIR0 |
| IDR POINTER REGISTER | IPR | R/W | $0009 | 1 x (1) | 0 | 0 | PTR | PTR | PTR | PTR | PTR | PTR |
| IDR COUNT REGISTER | ICR | R/W | $000A | 1 x (1) | 0 | CNT | CNT | CNT | CNT | CNT | CNT | CNT |
| IDR LOCATION MASK REGISTER | ILMR | R/W | $000C | 1 x (1) | 0 | 0 | M | M | M | M | M | M |
| IDR INITIAL OFFSET REGISTER | IOR | R/W | $000E–$000F | 1 x (2) | $IO_H$ | $IO_H$ | $IO_H$ | $IO_H$ | $IO_H$ | $IO_H$ | $IO_H$ | $IO_H$ |
| | | | | | $IO_L$ | $IO_L$ | $IO_L$ | $IO_L$ | $IO_L$ | $IO_L$ | $IO_L$ | $IO_L$ |

*FIG. 6-5-2*

HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| HOST STREAM SELECT REGISTER | HSSR | R/W | $0010 | 1 x (1) | 0 | 0 | HSP1 | HSP0 | LS3 | LS2 | LS1 | LS0 |
| HOST STREAM OFFSET REGISTER | HSOR | R/W | $0012–$0013 | 1 x (2) | $OFF_H$ | $OFF_H$ | $OFF_H$ | $OFF_H$ | $OFF_H$ | $OFF_H$ | $OFF_H$ | $OFF_H$ |
| | | | | | $OFF_L$ | $OFF_L$ | $OFF_L$ | $OFF_L$ | $OFF_L$ | $OFF_L$ | $OFF_L$ | $OFF_L$ |
| N–S HOLDING REGISTER | NSHR | R/W | $0014–$0015 | 1 x (2) | 0 | 0 | 0 | 0 | 0 | SRC | DIR | V |
| | | | | | D | D | D | D | D | D | D | D |
| E–W HOLDING REGISTER | EWHR | R/W | $0018–$0019 | 1 x (2) | 0 | 0 | 0 | 0 | 0 | SRC | DIR | V |
| | | | | | D | D | D | D | D | D | D | D |
| OFFSET ADDRESS REGISTER #1 | OAR1 | R/W | $0020–$0021 | 1 x (2) | $OF1_H$ | $OF1_H$ | $OF1_H$ | $OF1_H$ | $OF1_H$ | $OF1_H$ | $OF1_H$ | $OF1_H$ |
| | | | | | $OF1_L$ | $OF1_L$ | $OF1_L$ | $OF1_L$ | $OF1_L$ | $OF1_L$ | $OF1_L$ | $OF1_L$ |

FIG. 6-6-1

| HOST MODE RANDOM ACCESS MAP | | | | | | | | | | | | |
|---|---|---|---|---|---|---|---|---|---|---|---|---|
| REGISTER NAME | ABBREV. | ACCESS | ADDRESS | USABLE LOCATIONS (BYTES) | BIT FIELDS | | | | | | | |
| DEPTH CONTROL REGISTER #1 | DCR1 | R/W | $0024–$0025 | 1 x (2) | $DC1_H$ | $DC1_H$ | $DC1_H$ | $DC1_H$ | $DC1_H$ | $DC1_H$ | $DC1_H$ | $DC1_H$ |
| | | | | | $DC1_L$ | $DC1_L$ | $DC1_L$ | $DC1_L$ | $DC1_L$ | $DC1_L$ | $DC1_L$ | $DC1_L$ |
| OFFSET ADDRESS REGISTER #2 | OAR2 | R/W | $0028 | 1 x (1) | 0 | 0 | OF2 | OF2 | OF2 | OF2 | OF2 | OF2 |
| DEPTH CONTROL REGISTER #2 | DCR2 | R/W | $002C | 1 x (1) | 0 | 0 | DC2 | DC2 | DC2 | DC2 | DC2 | DC2 |
| INTERRUPT STATUS REGISTER #1 | ISR1 | R/O | $0030 | 1 x (1) | ICI | PEI | IOI | PCI | VDI | SDI | VVI | SVI |
| INTERRUPT MASK REGISTER #1 | IMR1 | R/W | $0034 | 1 x (1) | ICIM | PEIM | IOIM | PCIM | VDIM | SDIM | VVIM | SVIM |
| INTERRUPT STATUS REGISTER #2 | ISR2 | R/W | $0038 | 1 x (1) | 0 | 0 | 0 | 0 | SI2 | SI1 | SI0 | HLTI |
| INTERRUPT MASK REGISTER #2 | IMR2 | R/W | $003C | 1 x (1) | 0 | 0 | 0 | 0 | SIM2 | SIM1 | SIM0 | HLTM |

FIG. 6-6-2

HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| MICROSEQUENCER CONTROL REGISTER | MCR | R/W | $0040 | 1 x (1) | 0 | ILF | RPLF | RELF | FLSF | STKF | RSA | SS |
| MICROSEQUENCER STATUS REGISTER | MSR | R/O | $0044 | 1 x (1) | 0 | 0 | 0 | EXE2 | EXE1 | EXE0 | R | 0 |
| SCALAR PROCESS CONTROL REGISTER | SPCR | R/W | $0048 | 1 x (1) | 0 | 0 | 0 | 0 | SD | SV | SX1 | SX0 |
| INSTRUCTION REGISTER | IR | R/W | $0050–$0051 | 1 x (2) | $IR_H$ | $IR_H$ | $IR_H$ | $IR_H$ | $IR_H$ | $IR_H$ | $IR_H$ | $IR_H$ |
| | | | | | $IR_L$ | $IR_L$ | $IR_L$ | $IR_L$ | $IR_L$ | $IR_L$ | $IR_L$ | $IR_L$ |
| INSTRUCTION CACHE LINE VALID REGISTER | ICVR | R/W | $0054 | 1 x (1) | 0 | 0 | 0 | 0 | ICV3 | ICV2 | ICV1 | ICV0 |
| PROGRAM COUNTER | PC | R/W | $0058–$0059 | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |

FIG.6-6-3

HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| PC BOUNDS REGISTER | PBR | R/W | \$005C–\$005D | 1 x (1) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | 0 |
| INSTRUCTION CACHE TAG #0 | ICT0 | R/W | \$0060 | 1 x (1) | IT0 | IT0 | IT0 | IT0 | IT0 | IT0 | IT0 | IT0 |
| INSTRUCTION CACHE TAG #1 | ICT1 | R/W | \$0064 | 1 x (1) | IT1 | IT1 | IT1 | IT1 | IT1 | IT1 | IT1 | IT1 |
| INSTRUCTION CACHE TAG #2 | ICT2 | R/W | \$0068 | 1 x (1) | IT2 | IT2 | IT2 | IT2 | IT2 | IT2 | IT2 | IT2 |
| INSTRUCTION CACHE TAG #3 | ICT3 | R/W | \$006C | 1 x (1) | IT3 | IT3 | IT3 | IT3 | IT3 | IT3 | IT3 | IT3 |
| STACK POINTER | SP | R/W | \$0070–\$0071 | 1 x (2) | $SP_H$ | $SP_H$ | $SP_H$ | $SP_H$ | $SP_H$ | $SP_H$ | $SP_H$ | $SP_H$ |
| | | | | | $SP_L$ | $SP_L$ | $SP_L$ | $SP_L$ | $SP_L$ | $SP_L$ | $SP_L$ | $SP_L$ |

*FIG. 6-6-4*

HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| FIRST LEVEL STACK | FLS | R/W | \$0074–\$0075 | 1 x (1) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| REPEAT BEGIN REGISTER | RBR | R/W | \$0080–\$0081 | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| REPEAT END REGISTER | RER | R/W | \$0084–\$0085 | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| REPEAT COUNT REGISTER | RCR | R/W | \$0088 | 1 x (1) | D | D | D | D | D | D | D | D |
| GLOBAL DATA REGISTERS | G[0]–G[7] | R/W | \$0090–\$00AF | 8 x (1) | D | D | D | D | D | D | D | D |
| GLOBAL POINTER REGISTERS | P[0]–P[7] | R/W | \$00B0–\$00CF | 8 x (1) | D | D | D | D | D | D | D | D |

*FIG.6-6-5*

| HOST MODE RANDOM ACCESS MAP | | | | | |
|---|---|---|---|---|---|
| REGISTER NAME | ABBREV. | ACCESS | ADDRESS | USABLE LOCATIONS (BYTES) | BIT FIELDS |
| RESET INITIAL PROGRAM COUNTER | EPPC | R/W | $00E0–$00E1 | 1 x (2) | $PC_H$ $PC_H$ $PC_H$ $PC_H$ $PC_H$ $PC_H$ $PC_H$ $PC_H$<br>$PC_L$ $PC_L$ $PC_L$ $PC_L$ $PC_L$ $PC_L$ $PC_L$ $PC_L$ |
| RESET INITIAL STACK POINTER | EPSP | R/W | $00E2–$00E3 | 1 x (2) | $PC_H$ $PC_H$ $PC_H$ $PC_H$ $PC_H$ $PC_H$ $PC_H$ $PC_H$<br>$PC_L$ $PC_L$ $PC_L$ $PC_L$ $PC_L$ $PC_L$ $PC_L$ $PC_L$ |
| SCALAR OVERFLOW EXCEPTION POINTER | EPSV | R/W | $00E4–$00E5 | 1 x (2) | $PC_H$ $PC_H$ $PC_H$ $PC_H$ $PC_H$ $PC_H$ $PC_H$ $PC_H$<br>$PC_L$ $PC_L$ $PC_L$ $PC_L$ $PC_L$ $PC_L$ $PC_L$ $PC_L$ |
| VECTOR OVERFLOW EXCEPTION POINTER | EPVV | R/W | $00E6–$00E7 | 1 x (2) | $PC_H$ $PC_H$ $PC_H$ $PC_H$ $PC_H$ $PC_H$ $PC_H$ $PC_H$<br>$PC_L$ $PC_L$ $PC_L$ $PC_L$ $PC_L$ $PC_L$ $PC_L$ $PC_L$ |
| SCALAR DIVIDE-BY-ZERO EXCEPTION POINTER | EPSZ | R/W | $00E8–$00E9 | 1 x (2) | $PC_H$ $PC_H$ $PC_H$ $PC_H$ $PC_H$ $PC_H$ $PC_H$ $PC_H$<br>$PC_L$ $PC_L$ $PC_L$ $PC_L$ $PC_L$ $PC_L$ $PC_L$ $PC_L$ |

*FIG.6-6-6*

| HOST MODE RANDOM ACCESS MAP | | | | | | | | | | | | |
|---|---|---|---|---|---|---|---|---|---|---|---|---|
| REGISTER NAME | ABBREV. | ACCESS | ADDRESS | USABLE LOCATIONS (BYTES) | BIT FIELDS | | | | | | | |
| VECTOR DIVIDE-BY-ZERO EXCEPTION POINTER | EPVZ | R/W | $00EA–$00EB | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| PC OUT-OF-BOUNDS EXCEPTION POINTER | EPOB | R/W | $00EC–$00ED | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| ILLEGAL OPCODE EXCEPTION POINTER | EPIO | R/W | $00EE–$00EF | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| PORT ERROR EXCEPTION POINTER | EPPE | R/W | $00F0–$00F1 | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |
| INSTRUCTION-BASED IDR CONTENTION EXCEPTION POINTER | EPIC | R/W | $00F2–$00F3 | 1 x (2) | $PC_H$ | $PC_H$ | $PC_H$ | $PC_H$ | $PC_H$ | $PC_H$ | $PC_H$ | $PC_H$ |
| | | | | | $PC_L$ | $PC_L$ | $PC_L$ | $PC_L$ | $PC_L$ | $PC_L$ | $PC_L$ | $PC_L$ |

FIG.6-6-7

HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| INPUT DATA REGISTERS | IDR | R/W | $0100–$013F | 64 x (1) | D | D | D | D | D | D | D | D |
| VECTOR DATA REGISTERS #0 | V[0] | R/W | $0200–$023F | 64 x (1) | D | D | D | D | D | D | D | D |
| VECTOR DATA REGISTERS #1 | V[1] | R/W | $0300–$033F | 64 x (1) | D | D | D | D | D | D | D | D |
| VECTOR DATA REGISTERS #2 | V[2] | R/W | $0400–$043F | 64 x (1) | D | D | D | D | D | D | D | D |
| VECTOR DATA REGISTERS #3 | V[3] | R/W | $0500–$053F | 64 x (1) | D | D | D | D | D | D | D | D |
| VECTOR DATA REGISTERS #4 | V[4] | R/W | $0600–$063F | 64 x (1) | D | D | D | D | D | D | D | D |
| VECTOR DATA REGISTERS #5 | V[5] | R/W | $0700–$073F | 64 x (1) | D | D | D | D | D | D | D | D |
| VECTOR DATA REGISTERS #6 | V[6] | R/W | $0800–$083F | 64 x (1) | D | D | D | D | D | D | D | D |

FIG. 6-6-8

HOST MODE RANDOM ACCESS MAP

| REGISTER NAME | ABBREV. | ACCESS | ADDRESS | USABLE LOCATIONS (BYTES) | BIT FIELDS | | | | | | | |
|---|---|---|---|---|---|---|---|---|---|---|---|---|
| VECTOR DATA REGISTERS #7 | V[7] | R/W | \$0900–\$093F | 64 x (1) | D | D | D | D | D | D | D | D |
| VECTOR PROCESS CONTROL REGISTERS | VPCR | R/W | \$0A00–\$0A3F | 64 x (1) | 0 | VID | VH | VT | VD | VV | VX1 | VX0 |
| INPUT TAG REGISTERS | ITR | R/W | \$0B00–\$0B7F | 64 x (2) | $ITR_H$<br>$ITR_L$ | $ITR_H$<br>$ITR_L$ | $ITR_H$<br>$ITR_L$ | $ITR_H$<br>$ITR_L$ | $ITR_H$<br>$ITR_L$ | $ITR_H$<br>$ITR_L$ | $ITR_H$<br>$ITR_L$ | $ITR_H$<br>$ITR_L$ |
| INSTRUCTION CACHE | IC | R/W | \$0D00–\$0DFF | 128 x (2) | $I_H$<br>$I_L$ | $I_H$<br>$I_L$ | $I_H$<br>$I_L$ | $I_H$<br>$I_L$ | $I_H$<br>$I_L$ | $I_H$<br>$I_L$ | $I_H$<br>$I_L$ | $I_H$<br>$I_L$ |
| COEFFICIENT MEMORY ARRAY | CMA | R/W | \$1000–\$1FFF | 64 x (64) | D | D | D | D | D | D | D | D |

| ACR BIT DEFINITIONS | | | | |
|---|---|---|---|---|
| BIT POSITION | BIT | DEFINITION | STATE | DESCRIPTION |
| 0 | SSGN (174) | SCALAR SIGNED/ UNSIGNED | 0 | SIGNED ARITHMETIC IS PERFORMED IN THE SCALAR ENGINE |
| | | | 1 | UNSIGNED ARITHMETIC IS PERFORMED IN THE SCALAR ENGINE |
| 1 | VSGN (176) | VECTOR SIGNED/ UNSIGNED | 0 | SIGNED ARITHMETIC IS PERFORMED IN THE VECTOR ENGINE |
| | | | 1 | UNSIGNED ARITHMETIC IS PERFORMED IN THE VECTOR ENGINE |

FIG. 6-8

| ESR BIT DEFINITIONS | | | | |
|---|---|---|---|---|
| BIT POSITION | BIT | DEFINITION | STATE | DESCRIPTION |
| 0 | SVE | SCALAR OVERFLOW EXCEPTION | 0 | A SCALAR OVERFLOW HAS NOT OCCURED |
| | | | 1 | A SCALAR OVERFLOW HAS OCCURED |
| 1 | VVE | VECTOR OVERFLOW EXCEPTION | 0 | A VECTOR OVERFLOW HAS NOT OCCURED |
| | | | 1 | A VECTOR OVERFLOW HAS OCCURED |
| 2 | SDE | SCALAR DIVIDE-BY -ZERO EXCEPTION | 0 | A SCALAR DIVIDE-BY-ZERO HAS NOT OCCURED |
| | | | 1 | A SCALAR DIVIDE-BY-ZERO HAS OCCURED |
| 3 | VDE | VECTOR DIVIDE-BY -ZERO EXCEPTION | 0 | A VECTOR DIVIDE-BY-ZERO HAS NOT OCCURED |
| | | | 1 | A VECTOR DIVIDE-BY-ZERO HAS OCCURED |
| 4 | PCE | PC OUT-OF-BOUNDS EXCEPTION | 0 | A PC OUT-OF-BOUNDS HAS NOT OCCURED |
| | | | 1 | A PC OUT-OF-BOUNDS HAS OCCURED |
| 5 | IOE | ILLEGAL OPCODE EXCEPTION | 0 | AN ILLEGAL OPCODE HAS NOT OCCURED |
| | | | 1 | AN ILLEGAL OPCODE HAS OCCURED |
| 6 | PEE | PORT ERROR EXCEPTION | 0 | A PORT ERROR HAS NOT OCCURED |
| | | | 1 | A PORT ERROR HAS OCCURED |
| 7 | ICE | INSTRUCTION BASED IDR CONTENTION | 0 | AN INSTRUCTION-BASED IDR CONTENTION HAS NOT OCCURED |
| | | | 1 | AN INSTRUCTION-BASED IDR CONTENTION HAS OCCURED |

| EMR BIT DEFINITIONS | | | | |
|---|---|---|---|---|
| BIT POSITION | BIT | DEFINITION | STATE | DESCRIPTION |
| 0 | SVEM | SCALAR OVERFLOW EXCEPTION MASK | 0 | A SCALAR OVERFLOW WILL GENERATE AN EXCEPTION |
| | | | 1 | A SCALAR OVERFLOW WILL NOT GENERATE AN EXCEPTION |
| 1 | VVEM | VECTOR OVERFLOW EXCEPTION MASK | 0 | A VECTOR OVERFLOW WILL GENERATE AN EXCEPTION |
| | | | 1 | A VECTOR OVERFLOW WILL NOT GENERATE AN EXCEPTION |
| 2 | SDEM | SCALAR DIVIDE-BY-ZERO EXCEPTION MASK | 0 | A SCALAR DIVIDE-BY-ZERO WILL GENERATE AN EXCEPTION |
| | | | 1 | A SCALAR DIVIDE-BY-ZERO WILL NOT GENERATE AN EXCEPTION |
| 3 | VDEM | VECTOR DIVIDE-BY-ZERO EXCEPTION MASK | 0 | A VECTOR DIVIDE-BY-ZERO WILL GENERATE AN EXCEPTION |
| | | | 1 | A VECTOR DIVIDE-BY-ZERO WILL NOT GENERATE AN EXCEPTION |
| 4 | PCEM | PC OUT-OF-BOUNDS EXCEPTION MASK | 0 | A PC OUT-OF-BOUNDS CONDITION WILL GENERATE AN EXCEPTION |
| | | | 1 | A PC OUT-OF-BOUNDS CONDITION WILL NOT GENERATE AN EXCEPTION |
| 5 | IOEM | ILLEGAL OPCODE EXCEPTION MASK | 0 | AN ILLEGAL OPCODE WILL GENERATE AN EXCEPTION |
| | | | 1 | AN ILLEGAL OPCODE WILL NOT GENERATE AN EXCEPTION |
| 6 | PEEM | PORT ERROR EXCEPTION MASK | 0 | A PORT ERROR WILL GENERATE AN EXCEPTION |
| | | | 1 | A PORT ERROR WILL NOT GENERATE AN EXCEPTION |
| 7 | ICEM | INSTRUCTION-BASED IDR CONTENTION EXCEPTION MASK | 0 | AN INSTRUCTION-BASED IDR CONTENTION WILL GENERATE AN EXCEPTION |
| | | | 1 | AN INSTRUCTION-BASED IDR CONTENTION WILL NOT GENERATE AN EXCEPTION |

*FIG. 6-9*

| PCR BIT DEFINITIONS | | | | |
|---|---|---|---|---|
| BIT POSITION | BIT | DEFINITION | STATE | DESCRIPTION |
| 0 | WT (64) | WEST TAP BIT | 0 | WEST TAP DISCONNECTED |
| | | | 1 | WEST TAP CONNECTED. EXTERNAL WRITES TO THE WEST PORT WILL BE SENT TO THE IDR |
| 1 | ST (66) | SOUTH TAP BIT | 0 | SOUTH TAP DISCONNECTED |
| | | | 1 | SOUTH TAP CONNECTED. EXTERNAL WRITES TO THE SOUTH PORT WILL BE SENT TO THE IDR |
| 2 | ET (68) | EAST TAP BIT | 0 | EAST TAP DISCONNECTED |
| | | | 1 | EAST TAP CONNECTED. EXTERNAL WRITES TO THE EAST PORT WILL BE SENT TO THE IDR |
| 3 | NT (70) | NORTH TAP BIT | 0 | NORTH TAP DISCONNECTED |
| | | | 1 | NORTH TAP CONNECTED. EXTERNAL WRITES TO THE NORTH PORT WILL BE SENT TO THE IDR |
| 4 | EWS (72) | EAST-WEST SWITCH BIT | 0 | EAST-WEST SWITCH DISCONNECTED |
| | | | 1 | EAST-WEST SWITCH CONNECTED |
| 5 | NSS (74) | NORTH-SOUTH SWITCH BIT | 0 | NORTH-SOUTH SWITCH DISCONNECTED |
| | | | 1 | NORTH-SOUTH SWITCH CONNECTED |
| 6 | FM (76) | FILLING MODE | 0 | INPUT INDEXING MODE |
| | | | 1 | INPUT TAGGING MODE |

*FIG. 6-10*

| APMR BIT DEFINITIONS | | | | |
|---|---|---|---|---|
| BIT POSITION | BIT | DEFINITION | STATE | DESCRIPTION |
| 0 | EW | (EXTERNAL) WEST PORT WRITE | 0 | A WRITE FROM WEST PORT TO WEST PORT WAS NOT DETECTED |
| | | | 1 | A WRITE FROM WEST PORT TO WEST PORT WAS DETECTED |
| 1 | ES | (EXTERNAL) SOUTH PORT WRITE | 0 | A WRITE FROM SOUTH PORT TO SOUTH PORT WAS NOT DETECTED |
| | | | 1 | A WRITE FROM SOUTH PORT TO SOUTH PORT WAS DETECTED |
| 2 | EE | (EXTERNAL) EAST PORT WRITE | 0 | A WRITE FROM EAST PORT TO EAST PORT WAS NOT DETECTED |
| | | | 1 | A WRITE FROM EAST PORT TO EAST PORT WAS DETECTED |
| 3 | EN | (EXTERNAL) NORTH PORT WRITE | 0 | A WRITE FROM NORTH PORT TO NORTH PORT WAS NOT DETECTED |
| | | | 1 | A WRITE FROM NORTH PORT TO NORTH PORT WAS DETECTED |
| 4 | IW | (INTERNAL) WEST PORT WRITE | 0 | NO WRITE TO THE WEST PORT DUE TO A MICROCODE WRITEW WAS DETECTED |
| | | | 1 | A WRITE TO THE WEST PORT DUE TO A MICROCODE WRITEW INSTRUCTION WAS DETECTED |
| 5 | IS | (INTERNAL) SOUTH PORT WRITE | 0 | NO WRITE TO THE SOUTH PORT DUE TO A MICROCODE WRITES WAS DETECTED |
| | | | 1 | A WRITE TO THE SOUTH PORT DUE TO A MICROCODE WRITES INSTRUCTION WAS DETECTED |
| 6 | IE | (INTERNAL) EAST PORT WRITE | 0 | NO WRITE TO THE EAST PORT DUE TO A MICROCODE WRITEE WAS DETECTED |
| | | | 1 | A WRITE TO THE EAST PORT DUE TO A MICROCODE WRITEE INSTRUCTION WAS DETECTED |
| 7 | IN | (INTERNAL) NORTH PORT WRITE | 0 | NO WRITE TO THE NORTH PORT DUE TO A MICROCODE WRITEN WAS DETECTED |
| | | | 1 | A WRITE TO THE NORTH PORT DUE TO A MICROCODE WRITEN INSTRUCTION WAS DETECTED |

| GPDR BIT DEFINITIONS | | | | |
|---|---|---|---|---|
| BIT POSITION | BIT | DEFINITION | STATE | DESCRIPTION |
| 0 | DIR0 | DIRECTION | 0 | PA[0] OPERATES AS INPUT |
| | | | 1 | PA[0] OPERATES AS OUTPUT |
| 1 | DIR1 | DIRECTION | 0 | PA[1] OPERATES AS INPUT |
| | | | 1 | PA[1] OPERATES AS OUTPUT |

FIG. 6-13

| HSSR BIT DEFINITIONS | | | | |
|---|---|---|---|---|
| BIT POSITION | BIT | DEFINITION | STATE | DESCRIPTION |
| 3:0 | LS[3:0] | LOGICAL ADDRESS SELECT | PLEASE SEE DEFINITION OF LS BITS IN FIG.6-14 | |
| 5:4 | HSP[1:0] | HOST STREAM PORT SELECT | PLEASE SEE DEFINITION OF HSP BITS IN FIG.6-15 | |

FIG. 6-14

| LS BIT DEFINITIONS | | | | |
|---|---|---|---|---|
| LS3 | LS2 | LS1 | LS0 | SPACE SELECTED |
| 0 | 0 | 0 | 0 | IDR |
| 0 | 0 | 0 | 1 | ITR |
| 0 | 0 | 1 | 0 | MMA |
| 0 | 0 | 1 | 1 | CMA |
| 0 | 1 | 0 | 0 | V[0] |
| 0 | 1 | 0 | 1 | V[1] |
| 0 | 1 | 1 | 0 | V[2] |
| 0 | 1 | 1 | 1 | V[3] |
| 1 | 0 | 0 | 0 | V[4] |
| 1 | 0 | 0 | 1 | V[5] |
| 1 | 0 | 1 | 0 | V[6] |
| 1 | 0 | 1 | 1 | V[7] |
| 1 | 1 | 0 | 0 | VPCR |
| 1 | 1 | 0 | 1 | IC |
| 1 | 1 | 1 | 0 | RESERVED |
| 1 | 1 | 1 | 1 | ENTIRE REGISTER SET ($0000-$1FFF) |

| HSP BIT DEFINITIONS | | |
|---|---|---|
| HSP1 | HSP0 | STREAM DIRECTION |
| 0 | 0 | THIS DEVICE DOES NOT ALTER THE DATA STREAM, BUT PASSES ANY DATA PRESENTED AT ONE PORT TO THE OPPOSING PORT |
| 0 | 1 | HOST STREAM DATA IS PRESENTED AT THE SOUTH PORT |
| 1 | 0 | HOST STREAM DATA IS PRESENTED AT THE EAST PORT |
| 1 | 1 | RESERVED |

FIG. 6-15

| NSHR BIT DEFINITIONS | | | | |
|---|---|---|---|---|
| BIT POSITION | BIT | DEFINITION | STATE | DESCRIPTION |
| 0 | V | VALID DATA | 0 | THE DATA BYTE OF THE NSHR DOES NOT CONTAIN VALID DATA |
| | | | 1 | THE DATA BYTE OF THE NSHR DOES CONTAIN VALID DATA |
| 1 | DIR | TRANSFER DIRECTION | 0 | THE DATA CONTAINED IN THE DATA BYTE OF THE NSHR WAS WRITTEN OUT THE NORTH PORT |
| | | | 1 | THE DATA CONTAINED IN THE DATA BYTE OF THE NSHR WAS WRITTEN OUT THE SOUTH PORT |
| 2 | SRC | SOURCE INDICATION | 0 | THE DATA CONTAINED IN THE DATA BYTE OF THE NSHR IS THE RESULT OF AN EXTERNAL WRITE THROUGH THIS DEVICE |
| | | | 1 | THE DATA CONTAINED IN THE DATA BYTE OF THE NSHR IS A RESULT OF A MICROCODE WRITEN, WRITES, VWRITEN OR VWRITES BY THIS DEVICE |

FIG. 6-16

| EWHR BIT DEFINITIONS | | | | |
|---|---|---|---|---|
| BIT POSITION | BIT | DEFINITION | STATE | DESCRIPTION |
| 0 | V | VALID DATA | 0 | THE DATA BYTE OF THE EWHR DOES NOT CONTAIN VALID DATA |
| | | | 1 | THE DATA BYTE OF THE EWHR DOES CONTAIN VALID DATA |
| 1 | DIR | TRANSFER DIRECTION | 0 | THE DATA CONTAINED IN THE DATA BYTE OF THE EWHR WAS WRITTEN OUT THE EAST PORT |
| | | | 1 | THE DATA CONTAINED IN THE DATA BYTE OF THE EWHR WAS WRITTEN OUT THE WEST PORT |
| 2 | SRC | SOURCE INDICATION | 0 | THE DATA CONTAINED IN THE DATA BYTE OF THE EWHR IS THE RESULT OF AN EXTERNAL WRITE THROUGH THIS DEVICE |
| | | | 1 | THE DATA CONTAINED IN THE DATA BYTE OF THE EWHR IS A RESULT OF A MICROCODE WRITEE, WRITEW, VWRITEE OR VWRITEW BY THIS DEVICE |

*FIG. 6-17*

| SKIPPED ADDRESSES IN RANDOM ACCESS MAP | |
|---|---|
| ADDRESS RANGES | |
| \$0140–\$01FF | \$0740–\$07FF |
| \$0240–\$02FF | \$0840–\$08FF |
| \$0340–\$03FF | \$0940–\$09FF |
| \$0440–\$04FF | \$0A40–\$0AFF |
| \$0540–\$05FF | \$0B80–\$0CFF |
| \$0640–\$06FF | \$0E00–\$0FFF |

*FIG. 6-18*

| ISR1 BIT DEFINITIONS | | | | |
|---|---|---|---|---|
| BIT POSITION | BIT NAME | BIT DEFINITION | STATE | DESCRIPTION |
| 0 | SVI | SCALAR ENGINE OVERFLOW | 0 | A SCALAR ENGINE OVERFLOW DID NOT OCCUR. |
| | | | 1 | A SCALAR ENGINE OVERFLOW OCCURED SINCE THE LAST READ OF ISR1. |
| 1 | VVI | VECTOR ENGINE OVERFLOW | 0 | A VECTOR ENGINE OVERFLOW DID NOT OCCUR. |
| | | | 1 | A VECTOR ENGINE OVERFLOW OCCURED SINCE THE LAST READ OF ISR1. |
| 2 | SDI | SCALAR ENGINE DIVIDE-BY-ZERO | 0 | A SCALAR ENGINE DIVIDE-BY-ZERO DID NOT OCCUR. |
| | | | 1 | A SCALAR ENGINE DIVIDE-BY-ZERO OCCURED SINCE THE LAST READ OF ISR1. |
| 3 | VDI | VECTOR ENGINE DIVIDE-BY-ZERO | 0 | A VECTOR ENGINE DIVIDE-BY-ZERO DID NOT OCCUR. |
| | | | 1 | A VECTOR ENGINE DIVIDE-BY-ZERO OCCURED SINCE THE LAST READ OF ISR1. |
| 4 | PCI | PC OUT-OF-BOUNDS | 0 | THE PC HAS NOT EXCEEDED ITS BOUNDS SINCE THE LAST READ OF ISR1. |
| | | | 1 | INDICATES THAT THE PROGRAM COUNTER (PC) HAS EXCEEDED ITS BOUNDS. |
| 5 | IOI | ILLEGAL OPCODE | 0 | INDICATES THAT AN ILLEGAL OPCODE HAS NOT BEEN EXECUTED SINCE THE LAST READ OF ISR1. |
| | | | 1 | INDICATES THAT AN ILLEGAL OPCODE WAS EXECUTED. |
| 6 | PEI | PORT ERROR | 0 | A PORT ERROR DID NOT OCCUR. |
| | | | 1 | A PORT ERROR OCCURED. |
| 7 | ICI | INSTRUCTION-BASED IDR CONTENTION | 0 | AN INSTRUCTION-BASED IDR CONTENTION DID NOT OCCUR. |
| | | | 1 | AN INSTRUCTION-BASED IDR CONTENTION OCCURED. |

*FIG. 6-19*

| IMR1 BIT DEFINITIONS | | | | |
|---|---|---|---|---|
| BIT POSITION | BIT NAME | BIT DEFINITION | STATE | DESCRIPTION |
| 0 | SVIM | SCALAR OVERFLOW INTERRUPT MASK | 0 | SCALAR ENGINE OVERFLOW WILL GENERATE AN EXTERNAL INTERRUPT. |
| | | | 1 | SCALAR ENGINE OVERFLOW WILL NOT GENERATE AN EXTERNAL INTERRUPT. |
| 1 | VVIM | VECTOR OVERFLOW INTERRUPT MASK | 0 | VECTOR ENGINE OVERFLOW WILL GENERATE AN EXTERNAL INTERRUPT. |
| | | | 1 | VECTOR ENGINE OVERFLOW WILL NOT GENERATE AN EXTERNAL INTERRUPT. |
| 2 | SDIM | SCALAR DIVIDE-BY-ZERO INTERRUPT MASK | 0 | SCALAR ENGINE DIVIDE-BY-ZERO WILL GENERATE AN EXTERNAL INTERRUPT. |
| | | | 1 | SCALAR ENGINE DIVIDE-BY-ZERO WILL NOT GENERATE AN EXTERNAL INTERRUPT. |
| 3 | VDIM | VECTOR DIVIDE-BY-ZERO INTERRUPT MASK | 0 | VECTOR ENGINE DIVIDE-BY-ZERO WILL GENERATE AN EXTERNAL INTERRUPT. |
| | | | 1 | VECTOR ENGINE DIVIDE-BY-ZERO WILL NOT GENERATE AN EXTERNAL INTERRUPT. |
| 4 | PCIM | PC OUT-OF-BOUNDS INTERRUPT MASK | 0 | PC OUT-OF BOUNDS WILL GENERATE AN EXTERNAL INTERRUPT IF THE PCI BIT OF ISR1 IS SET. |
| | | | 1 | PC OUT-OF-BOUNDS WILL NOT GENERATE AN EXTERNAL INTERRUPT. |
| 5 | IOIM | ILLEGAL OPCODE INTERRUPT MASK | 0 | THE EXECUTION OF AN ILLEGAL OPCODE WILL GENERATE AN EXTERNAL INTERRUPT. |
| | | | 1 | THE EXECUTION OF AN ILLEGAL OPCODE WILL NOT GENERATE AN EXTERNAL INTERRUPT. |
| 6 | PEIM | PORT ERROR INTERRUPT MASK | 0 | AN ERROR CONDITION AT A PORT WILL GENERTAE AN EXTERNAL INTERRUPT. |
| | | | 1 | AN ERROR CONDITION AT A PORT WILL NOT GENERATE AN EXTERNAL INTERRUPT. |
| 7 | ICIM | INSTRUCTION-BASED IDR CONTENTION INTERRUPT MASK | 0 | AN INSTRUCTION-BASED IDR CONTENTION WILL GENERATE AN EXTERNAL INTERRUPT. |
| | | | 1 | AN INSTRUCTION-BASED IDR CONTENTION WILL NOT GENERATE AN EXTERNAL INTERRUPT. |

*FIG. 6-20*

| ISR2 BIT DEFINITIONS | | | | |
|---|---|---|---|---|
| BIT POSITION | BIT NAME | BIT DEFINITION | STATE | DESCRIPTION |
| 0 | HLTI | HALT EXECUTED | 0 | INDICATES THAT A HALT INSTRUCTION HAS NOT BEEN EXECUTED SINCE THE READ OF THE REGISTER. |
| | | | 1 | A HALT INSTRUCTION HAS BEEN EXECUTED. |
| 3:1 | SI [2:0] | SOFTWARE INTERRUPT | PLEASE SEE THE DESCRIPTION OF THE SI[2:0] BITS IN FIG.6-22 | |

FIG. 6-21

| SOFTWARE INTERRUPT STATUS BIT ENCODING | | | |
|---|---|---|---|
| SI2 | SI1 | SI0 | DESCRIPTION |
| 0 | 0 | 0 | NO SOFTWARE INTERRUPT WAS GENERATED. |
| 0 | 0 | 1 | THE INTR #1 MICROCODE INSTRUCTION WAS EXECUTED. |
| 0 | 1 | 0 | THE INTR #2 MICROCODE INSTRUCTION WAS EXECUTED. |
| 0 | 1 | 1 | THE INTR #3 MICROCODE INSTRUCTION WAS EXECUTED. |
| 1 | 0 | 0 | THE INTR #4 MICROCODE INSTRUCTION WAS EXECUTED. |
| 1 | 0 | 1 | THE INTR #5 MICROCODE INSTRUCTION WAS EXECUTED. |
| 1 | 1 | 0 | THE INTR #6 MICROCODE INSTRUCTION WAS EXECUTED. |
| 1 | 1 | 1 | THE INTR #7 MICROCODE INSTRUCTION WAS EXECUTED. |

FIG. 6-22

| IMR2 BIT DEFINITIONS | | | | |
|---|---|---|---|---|
| BIT POSITION | BIT NAME | BIT DEFINITION | STATE | DESCRIPTION |
| 0 | HLTM | HALT INTERRUPT MASK | 0 | THE EXECUTION OF A HALT INSTRUCTION WILL GENERATE AN EXTERNAL INTERRUPT IF THE HLTI BIT OF ISR2 IS SET. |
| | | | 1 | THE EXECUTION OF A HALT INSTRUCTION WILL NOT GENERATE AN EXTERNAL INTERRUPT. |
| 3:1 | SIM [2:0] | SOFTWARE INTERRUPT MASK | PLEASE SEE THE DESCRIPTION OF THE SIM[2:0] BITS IN FIG.6-24 | |

*FIG.6-23*

| SOFTWARE INTERRUPT MASK BIT ENCODINGS | | | |
|---|---|---|---|
| SIM2 | SIM1 | SIM0 | DESCRIPTION |
| 0 | 0 | 0 | SOFTWARE INTERRUPT #1–#7 WILL GENERATE AN EXTERNAL INTERRUPT. |
| 0 | 0 | 1 | SOFTWARE INTERRUPT #2–#7 WILL GENERATE AN EXTERNAL INTERRUPT. |
| 0 | 1 | 0 | SOFTWARE INTERRUPT #3–#7 WILL GENERATE AN EXTERNAL INTERRUPT. |
| 0 | 1 | 1 | SOFTWARE INTERRUPT #4–#7 WILL GENERATE AN EXTERNAL INTERRUPT. |
| 1 | 0 | 0 | SOFTWARE INTERRUPT #5–#7 WILL GENERATE AN EXTERNAL INTERRUPT. |
| 1 | 0 | 1 | SOFTWARE INTERRUPT #6–#7 WILL GENERATE AN EXTERNAL INTERRUPT. |
| 1 | 1 | 0 | SOFTWARE INTERRUPT #7 WILL GENERATE AN EXTERNAL INTERRUPT. |
| 1 | 1 | 1 | ALL SOFTWARE INTERRUPTS (INTR #1 THRU INTR #7) ARE MASKED OUT. NO EXTERNAL INTERRUPTS ARE GENERATED. |

*FIG.6-24*

| MCR BIT DEFINITIONS | | | | |
|---|---|---|---|---|
| BIT POSITION | BIT | DEFINITION | STATE | DESCRIPTION |
| 0 | SS | SINGLE STEP | 0 | DO NOT RUN SINGLE STEP. |
| | | | 1 | EXECUTE THE SINGLE INSTRUCTION POINTED TO BY THE PROGRAM COUNTER (PC). |
| 1 | RSA | RESET SIMD ARRAY | 0 | THE SIMD ARRAY IS NOT RESET |
| | | | 1 | THE VT BITS IN EACH VPCR ARE SET AND THE VH BITS IN EACH VPCR ARE CLEARED. ONCE THE VT BITS ARE SET AND THE VH BITS ARE CLEARED THE RSA BIT IS CLEARED. |
| 2 | STKF | CMA STACK FLAG | 0 | THE ENCODING OF THE STKF AND FLSF BITS IS SHOWN IN FIG.6-26 |
| | | | 1 | |
| 3 | FLSF | FIRST LEVEL STACK FLAG | 0 | |
| | | | 1 | |
| 4 | RELF (198) | REPEATE LOOP FLAG | 0 | A REPEATE LOOP IS NOT CURRENTLY BEING EXECUTED. |
| | | | 1 | A REPEATE LOOP IS CURRENTLY BEING EXECUTED. |
| 5 | RPLF (200) | REPEAT LOOP FLAG | 0 | A REPEAT LOOP IS NOT CURRENTLY BEING EXECUTED. |
| | | | 1 | A REPEAT LOOP IS CURRENTLY BEING EXECUTED. |
| 6 | ILF | INSTRUCTION LOCK | 0 | MICROSEQUENCER IS ENABLED. |
| | | | 1 | MICROSEQUENCER IS DISABLED. |

FIG.6-25

| ENCODINGS FOR STKF AND FLSF BITS | | |
|---|---|---|
| FLSF | STKF | DESCRIPTION |
| 0 | 1 | RESET CONDITION. THE FLS REGISTER IS MARKED INVALID. THE CMA STACK IS EMPTY. |
| 1 | 1 | THE FLS REGISTER CONTAINS A VALID RETURN ADDRESS. THE CMA STACK IS EMPTY. |
| 1 | 0 | THE FLS REGISTER CONTAINS A VALID RETURN ADDRESS. THE CMA STACK CONTAINS AT LEAST ONE VALID RETURN ADDRESS. |
| 0 | 0 | INVALID RETURN ADDRESS IN FLS. |

*FIG. 6-26*

| MSR BIT DEFINITIONS | | | | |
|---|---|---|---|---|
| BIT POSITION | BIT | DEFINITION | STATE | DESCRIPTION |
| 1 | R | MICRO-SEQUENCER RUNNING | 0 | THE SIMD INSTRUCTION SEQUENCER WAS NOT EXECUTING AN INSTRUCTION WHEN THE R/$\overline{S}$ LINE TRANSITIONED TO THE STOP STATE. THIS CAN OCCUR IF THE AE HAD EXECUTED A DONE OR HALT INSTRUCTION PRIOR TO THE R/$\overline{S}$ LINE GOING TO THE STOP STATE. |
| | | | 1 | THE SIMD INSTRUCTION SEQUENCER WAS EXECUTING AN INSTRUCTION WHEN THE R/$\overline{S}$ LINE TRANSITIONED TO THE STOP STATE. |
| 4:2 | EXE [2:0] | INTERNAL EXECUTION STATUS | PLEASE SEE FIG.6-28 FOR A DESCRIPTION OF THE EXE[2:0] BITS. | |

*FIG. 6-27*

| EXE[2:0] BIT DEFINITIONS | | | |
|---|---|---|---|
| EXE[2] | EXE[1] | EXE[0] | DESCRIPTION |
| 0 | 0 | 0 | AE STALLED ON IDR REFERENCE (STAGE #3 PIPE STALL). |
| 0 | 0 | 1 | ANY OF THE WRITE, VWRITE INSTRUCTIONS IS BEING EXECUTED. |
| 0 | 1 | 0 | ANY, EXCEPT VWRITE, OF THE VECTOR INSTRUCTIONS IS BEING EXECUTED. |
| 0 | 1 | 1 | ANY, EXCEPT WRITE, OF THE SCALAR INSTRUCTIONS IS BEING EXECUTED. |
| 1 | 0 | 0 | ANY OF THE VIF, VELSE, VENDIF INSTRUCTIONS IS BEING EXECUTED. |
| 1 | 0 | 1 | SCALAR PROGRAM FLOW CHANGE OCCURED. |
| 1 | 1 | 0 | EXCEPTION PROCESSING IS IN PROGRESS OTHER THAN RESET. |
| 1 | 1 | 1 | RESET STATE. |

FIG. 6-28

| SPCR BIT DEFINITIONS | | | | |
|---|---|---|---|---|
| BIT POSITION | BIT | DEFINITION | STATE | DESCRIPTION |
| 1:0 | SX [1:0] | SCALAR EXTENSION BITS | PLEASE SEE DESCRIPTION BELOW. | |
| 2 | SV | SCALAR OVERFLOW BIT | 0 | NO OVERFLOW OCCURRED. |
| | | | 1 | THE PREVIOUS ARITHMETIC OPERATION GENERATED AN OVERFLOW. |
| 3 | SD | SCALAR OVERFLOW DIRECTION BIT | 0 | IF AN OVERFLOW OCCURED, THE OVERFLOW WAS IN THE NEGATIVE DIRECTION. |
| | | | 1 | IF AN OVERFLOW OCCURED, THE OVERFLOW WAS IN THE POSITIVE DIRECTION. |

FIG. 6-29

| ICVR BIT DEFINITIONS | | | | |
|---|---|---|---|---|
| BIT POSITION | BIT | DEFINITION | STATE | DESCRIPTION |
| 0 | ICV0 | INSTRUCTION CACHE LINE #0 VALID | 0 | CACHE LINE #0 IS INVALID |
| | | | 1 | CACHE LINE #0 IS VALID |
| 1 | ICV1 | INSTRUCTION CACHE LINE #1 VALID | 0 | CACHE LINE #1 IS INVALID |
| | | | 1 | CACHE LINE #1 IS VALID |
| 2 | ICV2 | INSTRUCTION CACHE LINE #2 VALID | 0 | CACHE LINE #2 IS INVALID |
| | | | 1 | CACHE LINE #2 IS VALID |
| 3 | ICV3 | INSTRUCTION CACHE LINE #3 VALID | 0 | CACHE LINE #3 IS INVALID |
| | | | 1 | CACHE LINE #3 IS VALID |

FIG. 6-30

| SPCR REGISTER BIT DESCRIPTIONS | |
|---|---|
| BIT | DESCRIPTION |
| SX[1:0] | SCALAR EXTENSION BITS. THESE BITS ARE USED TO EXTEND THE PRECISION OF CERTAIN ARITHMETIC AND LOGICAL INSTRUCTIONS. DEPENDING ON THE OPERATION THESE TWO BITS WILL HAVE DIFFERENT. MEANINGS REFER TO SECTION 2.5.19 DESCRIPTION OF MULTI-BYTE OPERATION FOR MORE INFORMATION. |
| SV | THE SCALAR OVERFLOW BIT (SV) AND THE SCALAR OVERFLOW DIRECTION BIT (SD). THESE BITS ARE USED TO INDICATE BOTH THE OCCURRENCE OF OVERFLOW IN THE PREVIOUS ARITHMETIC OPERATION, AND, IF OVERFLOW OCCURRED, THE DIRECTION IN WHICH OVERFLOW WAS TAKEN. FOR A MORE COMPLETE DESCRIPTION OF HOW THE SV AND SD BITS ARE SET AND USED, PLEASE SEE A DESCRIPTION OF THE SPCR BITS IN SECTION 2.3.28. |
| SD | |

FIG. 6-33

| VPCR BIT DEFINITIONS | | | | |
|---|---|---|---|---|
| BIT POSITION | BIT | DEFINITION | STATE | DESCRIPTION |
| 1:0 | VX[1:0] (104, 105) | VECTOR EXTENSION BIT | USED TO EXTENDED VECTOR ARITHMETIC OPERATIONS. | |
| 2 | VV (106) | VECTOR OVERFLOW BIT | 0 | NO OVERFLOW OCCURRED. |
| | | | 1 | THE PREVIOUS ARITHMETIC OPERATION GENERATED AND OVERFLOW. |
| 3 | VD (108) | VECTOR DIRECTION BIT | 0 | IF AN OVERFLOW OCCURRED, THE OVERFLOW WAS IN THE NEGATIVE DIRECTION. |
| | | | 1 | IF AN OVERFLOW OCCURRED, THE OVERFLOW WAS IN THE POSITIVE DIRECTION. |
| 4 | VT (110) | VECTOR CONDITIONAL TRUE BIT | 0 | SHELF INACTIVE. |
| | | | 1 | SHELF ACTIVE. |
| 5 | VH (112) | VECTOR CONDITIONAL HISTORY BIT | 0 | INDICATES THAT THIS PROCESSING ELEMENT HAS NOT WON A CONDITIONAL STATEMENT SINCE THE LAST VENDIF INSTRUCTION WAS EXECUTED. |
| | | | 1 | INDICATES THAT THIS PROCESSING ELEMENT HAS WON A CONDITIONAL STATEMENT SINCE THE LAST VENDIF INSTRUCTION WAS EXECUTED. |
| 6 | VID (114) | VECTOR INPUT DATA VALID BIT | 0 | CORRESPONDING LOCATION IN INPUT DATA REGISTER (IDR) IS NOT VALID. |
| | | | 1 | CORRESPONDING LOCATION IN INPUT DATA REGISTER (IDR) IS VALID. |

*FIG. 6-31*

| VPCR REGISTER BIT DESCRIPTIONS | |
|---|---|
| BIT | DESCRIPTION |
| VX[1:0] | VECTOR ENGINE EXTENSION BIT. THIS BIT IS SET TO THE VALUE OF THE CARRY AND SIGN FROM THE LAST ARITHMETIC OPERATION. THE PRIMARY USE FOR THIS BIT IS TO EXTEND THE PRECISION OF THE ARITHMETIC OPERATION IN THE VECTOR ENGINES. THESE BITS ARE USED TO HOLD EXTENSION INFORMATION FOR MULTI-BYTE OPERATIONS. DEPENDING ON THE INSTRUCTIONS, THESE TWO BITS WILL HAVE DIFFERENT MEANINGS. REFER TO SECTION 2.5.19 DESCRIPTION OF MULTI-BYTE OPERATIONS FOR MORE INFORMATION. |
| VV<br>VD | THE VECTOR OVERFLOW BIT (VV) AND THE VECTOR OVERFLOW DIRECTION BIT (VD). THESE BITS ARE USED TO INDICATE BOTH THE OCCURRENCE OF OVERFLOW IN THE PREVIOUS VECTOR ARITHMETIC OPERATION, AND, IF OVERFLOW OCCURRED, THE DIRECTION IN WHICH OVERFLOW WAS TAKEN. FOR A MORE COMPLETE DESCRIPTION OF HOW THE VV AND VD BITS ARE SET AND USED, PLEASE SEE A DESCRIPTION OF THE VPCR BITS IN SECTION 2.3.47. |
| VT | TRUE BIT. THIS IS A PROCESSING MASK BIT. WHEN SET IT ALLOWS THE DESTINATION OPERAND OF THE MICROCODE OPERATION TO BE UPDATED (INCLUDING THE VX BIT). WHEN THIS BIT IS CLEARED, THE UPDATE OF THE DESTINATION REGISTER IS BLOCKED. THIS ALLOWS SOME OF THE PROCESSING ELEMENTS TO COMPUTE WHILE OTHERS ESSENTIALLY SIT IDLE. THIS BIT CAN BE MODIFIED BY THE VIF, VELSE, VROTRT, COLMIN, COLMAX, ROWMIN, ROWMAX, LOCMIN, AND LOCMAX INSTRUCTIONS. |
| VH | HISTORY BIT. THIS BIT IS USED IN CONJUNCTION WITH THE VT BIT TO ALLOW THE VELSE-VIF STRUCTURE TO WORK PROPERLY. THIS BIT RECORDS WHETHER OR NOT THIS PROCESSING ELEMENT HAS EVALUATED AN VIF STATEMENT TO BE TRUE. IF THIS BIT IS SET, THE VT BIT WILL NOT BE SET UNTIL AFTER THE EXECUTION OF AN VENDIF INSTRUCTION. THIS BIT CAN BE MODIFIED BY THE VELSE, VROTRH VENDIF AND VROTRH INSTRUCTION. |
| VID | INPUT DATA VALID. IF THIS BIT IS SET, IT INDICATES THAT VALID DATA IS AT THE CORRESPONDING LOCATION IN THE IDR. THAT IS, IF THE VID BIT OF PROCESSING ELEMENT 14 IS SET, THEN THE DATA LOCATED IN IDR[14] IS VALID. OTHERWISE, DATA IN THE IDR IS CONSIDERED INVALID. EACH TIME DATA IS WRITTEN TO THE IDR BY AN EXTERNAL SOURCE, THE CORRESPONDING VID BIT IS SET. ALL VID BITS CAN BE CLEARED USING THE CLEARV INSTRUCTION. |

*FIG. 6-32*

| CLASSIFICATION OF INSTRUCTIONS BY TYPE | | | | | | |
|---|---|---|---|---|---|---|
| SECTION 2.5.10 AE SYSTEMS CONTROL OPERATIONS | | | | | | |
| CLEARV | HALT | INTR | RESTART | | | |
| DONE | ILLEGAL | NOP | SETV | | | |
| SECTION 2.5.11 VECTOR ENGINE DATA MOVEMENT | | | | | | |
| DROTMOV | VMOV | VSTORE | VSTOREI | VWRITEL | VWRITES | |
| DSROT | VMOVTV | VSTOREA | VWRITEE | VWRITEN | VWRITEW | |
| SECTION 2.5.12 VECTOR ENGINE DATA OPERATIONS | | | | | | |
| DADD | VABS | VBCNT | VMIN | VRAND | VSUBP | |
| DADDP | VADD | VDIV | VMINP | VROTRV | VSUBSX | |
| DMAX | VADDP | VISHFT | VMUL | VRSHFT | VSUBSXP | |
| DMAXP | VADDSX | VISHFTV | VNEG | VRSHFTP | VXOR | |
| DMIN | VADDSXP | VMAX | VNEGP | VSAT | | |
| DMINP | VAND | VAMAXP | VOR | VSUB | | |
| SECTION 2.5.13 VECTOR ENGINE CONDITIONAL OPERATIONS | | | | | | |
| COLMAX | LOCMIN | VCOMPP | VIFEQ | VIFLE | VIFNV | VISHFTT |
| COLMIN | ROWMAX | VELSE | VIFGE | VIFLT | VIFV | VROTRH |
| LOCMAX | ROWMIN | VENDIF | VIFGT | VIFNE | VISHFTH | VROTRT |
| SECTION 2.5.14 SCALAR ENGINE DATA MOVEMENT | | | | | | |
| GET | LOADR | MOVFC | MOVFSP | PUSH | STORE | WRITEN |
| GETPE | MOV | MOVTC | MOVTSP | PUT | WRITEE | WRITES |
| LOADA | MOVCI | MOVI | POP | STOREA | WRITEL | WRITEW |
| SECTION 2.5.15 SCALAR ENGINE DATA OPERATIONS | | | | | | |
| ABS | AND | DECSP | LSHFT | MUL | RAND | SUBP |
| ADD | BCNT | DIV | MAX | NEG | RSHFT | SUBSX |
| ADDP | COMPP | INC | MAXP | NEGP | RSHFTP | SUBSXP |
| ADDSX | DEC | INCP | MIN | NOT | SAT | XOR |
| ADDSXP | DECP | INCSP | MINP | OR | SUB | |
| SECTION 2.5.16 SCALAR ENGINE PROGRAM FLOW CONTROL OPERATIONS | | | | | | |
| BRA | DSKIPE | JSRMI | REPEATE | SKIPEQ | SKIPLE | SKIPNV |
| BSR | JMPMI | JSRRI | RETURN | SKIPGE | SKIPLT | SKIPNVT |
| DSKIP | JMPRI | REPEAT | RTE | SKIPGT | SKIPNE | SKIPV |

| NOTATION EQUIVALENCES | |
|---|---|
| NOTATIONS | MEANING |
| $VREG1_S$ | VECTOR REGISTER SET #1 USED AS THE INSTRUCTION SOURCE. (PLEASE SEE FIG.6-36-1 AND FIG.6-36-2) |
| $VREG1_D$ | VECTOR REGISTER SET #1 USED AS THE INSTRUCTION DESTINATION. (PLEASE SEE FIG.6-36-1 AND FIG.6-36-2) |
| $VREG2_S$ | VECTOR REGISTER SET #2 USED AS THE INSTRUCTION SOURCE. (PLEASE SEE FIG.6-37) |
| $VREG2_D$ | VECTOR REGISTER SET #2 USED AS THE INSTRUCTION DESTINATION. (PLEASE SEE FIG.6-37) |
| $SREG_S$ | THE SCALAR REGISTER SET USED AS THE INSTRUCTION SOURCE. (PLEASE SEE FIG.6-38) |
| $SREG_D$ | THE SCALAR REGISTER SET USED AS THE INSTRUCTION DESTINATION. (PLEASE SEE FIG.6-38) |
| PC | PROGRAM COUNTER. |
| SP | STACK POINTER REGISTER. |
| VT | VPCR TRUE BIT. |
| VH | VPCR HISTORY BIT. |
| VV, SV | VECTOR AND SCALAR OVERFLOW BIT. |
| VD, SD | VECTOR AND SCALAR OVERFLOW/SATURATION DIRECTION BIT. |
| VX[1:0],SX[1:0] | VECTOR AND SCALAR EXTENSION BITS. |
| #U | 8-BIT UNSIGNED IMMEDIATE VALUE. |
| #S | 8-BIT SIGNED (TWO's COMPLEMENT) IMMEDIATE VALUE. |
| #A | 7-BIT UNSIGNED IMMEDIATE VALUE. |
| #R | 7-BIT SIGNED (TWO's COMPLEMENT) IMMEDIATE VALUE. |
| #PE | 6-BIT PROCESSING ELEMENT NUMBER. |
| #C | 4-BIT CONTROL REGISTER NUMBER. |
| #N | 3-BIT IMMEDIATE VALUE. |
| + | ARITMETIC ADDITION OPERATOR. |
| ++ | POST INCREMENT OPERATOR. |
| − | ARITHMETIC SUBTRACTION OPERATOR. |
| * | ARITHMETIC MULTIPLICATION. |
| / | ARITHMETIC DIVISION. |

<table>
<tr><th colspan="2">NOTATION EQUIVALENCES</th></tr>
<tr><th>NOTATIONS</th><th>MEANING</th></tr>
<tr><td>|></td><td>ARITHMETIC SHIFT RIGHT.</td></tr>
<tr><td><|</td><td>ARITHMETIC SHIFT LEFT.</td></tr>
<tr><td>&</td><td>LOGICAL AND.</td></tr>
<tr><td>|</td><td>LOGICAL OR.</td></tr>
<tr><td>^</td><td>LOGICAL XOR.</td></tr>
<tr><td>~</td><td>LOGICAL NEGATION.</td></tr>
</table>

FIG. 6-35-2

| VECTOR REGISTERS FOR THE VREG1 FIELD | |
|---|---|
| VREG1 | DESCRIPTION |
| V0 THRU V7 | REGISTER DIRECT ADDRESSING. USE THE SPECIFIED SIMD VECTOR REGISTER. |
| G0 THRU G7 | REGISTER DIRECT ADDRESSING. USE THE SPECIFIED SCALAR REGISTER FOR ALL PROCESSING ELEMENTS. |
| P0 THRU P7 | REGISTER DIRECT ADDRESSING. USE THE SPECIFIED SCALAR REGISTER FOR ALL PROCESSING ELEMENTS. |
| CMA[P0] THRU CMA[P7] | REGISTER INDIRECT ADDRESSING. USE THE CMA COLUMN POINTED TO BY THE SELECTED P REGISTER. |
| CMA[P0++] THRU CMA[P7++] | REGISTER INDIRECT ADDRESSING. USE THE CMA COLUMN POINTED TO BY THE SELECTED P REGISTER. INCREMENT THE VALUE OF THE P REGISTER AFTER THE INSTRUCTION. |
| IDR[P0] THRU IDR[P7] | REGISTER INDIRECT ADDRESSING. USE THE IDR BYTE POINTED TO BY THE SELECTED P REGISTER. |
| IDR[P0++] THRU IDR[P7++] | REGISTER INDIRECT ADDRESSING. USE THE IDR BYTE POINTED TO BY THE SELECTED P REGISTER. INCREMENT THE VALUE OF THE P REGISTER AFTER THE INSTRUCTION. |
| IDR | USE THE ENTIRE CONTENTS OF THE IDR AS THE VECTOR REGISTER. |

| VECTOR REGISTERS FOR THE VREG1 FIELD | |
|---|---|
| VREG1 | DESCRIPTION |
| IDRC | USE THE ENTIRE CONTENTS OF THE IDR AS THE VECTOR REGISTER. CLEAR ALL VPCR VID BITS AND RUN MODE SHADOW REGISTERS AFTER THE INSTRUCTION, REGARDLESS OF THE SETTING OF THE VT BIT. |
| #PE | USE THE PROCESSING ELEMENT NUMBER AS THE VECTOR SOURCE. |
| #-128 | USE A VECTOR CONSTANT OF -128 AS THE SOURCE VALUE (HEX VALUE $80). |
| #-1 | USE A VECTOR CONSTANT OF -1 AS THE SOURCE VALUE (HEX VALUE $FF). |
| #0 | USE A VECTOR CONSTANT OF 0 AS THE SOURCE VALUE (HEX VALUE $00). |
| #1 | USE A VECTOR CONSTANT OF 1 AS THE SOURCE VALUE (HEX VALUE $01). |
| #127 | USE A VECTOR CONSTANT OF 127 AS THE SOURCE VALUE (HEX VALUE $7F). |

FIG. 6-37

| VECTOR REGISTERS FOR THE VREG2 FIELD | |
|---|---|
| VREG2 | DESCRIPTION |
| V0 THRU V7 | REGISTER DIRECT ADDRESSING. THE CONTENTS OF THE SPECIFIED VECTOR DATA REGISTER WILL BE UPDATED BY THE INSTRUCTION. |

FIG. 6-38

| SCALAR REGISTERS FOR THE SREG FIELD | |
|---|---|
| SREG | DESCRIPTION |
| P0 THRU P7 | REGISTER DIRECT ADDRESSING. THE CONTENTS OF THE SPECIFIED GLOBAL POINTER REGISTER CONTAINS THE SOURCE OPERAND OF THE INSTRUCTION. |
| G0 THRU G7 | REGISTER DIRECT ADDRESSING. THE CONTENTS OF THE SPECIFIED GLOBAL DATA REGISTER CONTAINS THE SOURCE OPERAND OF THE INSTRUCTION. |

| VPCR REGISTER BIT DESCRIPTIONS | |
|---|---|
| BIT | DESCRIPTION |
| VX[1:0] | VECTOR ENGINE EXTENSION BIT. THIS BIT IS SET TO THE VALUE OF THE CARRY AND SIGN FROM THE LAST ARITHMETIC OPERATION. THE PRIMARY USE FOR THIS BIT IS TO EXTEND THE PRECISION OF THE ARITHMETIC OPERATION IN THE VECTOR ENGINES. THESE BITS ARE USED TO HOLD EXTENSION INFORMATION FOR MULTI-BYTE OPERATIONS. DEPENDING ON THE INSTRUCTIONS, THESE TWO BITS WILL HAVE DIFFERENT MEANINGS. REFER TO SECTION 2.5.18 EXTENSION BITS AND PERFORMING MULTI-BYTE OPERATIONS FOR MORE INFORMATION. |
| VV<br>VD | THE VECTOR OVERFLOW BIT (VV) AND THE VECTOR OVERFLOW DIRECTION BIT (VD). THESE BITS ARE USED TO INDICATE BOTH THE OCCURRENCE OF OVERFLOW IN THE PREVIOUS VECTOR ARITHMETIC OPERATION, AND, IF OVERFLOW OCCURRED, THE DIRECTION IN WHICH OVERFLOW WAS TAKEN. FOR A MORE COMPLETE DESCRIPTION OF HOW THE VV AND VD BITS ARE SET AND USED, PLEASE SEE A DESCRIPTION OF THE VPCR BITS IN SECTION 2.3.47. |
| VT | TRUE BIT. THIS IS A PROCESSING MASK BIT. WHEN SET IT ALLOWS THE DESTINATION OPERAND OF THE MICROCODE OPERATION TO BE UPDATED (INCLUDING THE VX BIT). WHEN THIS BIT IS CLEARED, THE UPDATE OF THE DESTINATION REGISTER IS BLOCKED. THIS ALLOWS SOME OF THE PROCESSING ELEMENTS TO COMPUTE WHILE OTHERS ESSENTIALLY SIT IDLE. THIS BIT CAN BE MODIFIED BY THE VIF, VELSE, VROTRT, COLMIN, COLMAX, ROWMIN, ROWMAX, LOCMIN, AND LOCMAX INSTRUCTIONS. |
| VH | HISTORY BIT. THIS BIT IS USED IN CONJUNCTION WITH THE VT BIT TO ALLOW THE VELSE-VIF STRUCTURE TO WORK PROPERLY. THIS BIT RECORDS WHETHER OR NOT THIS PROCESSING ELEMENT HAS EVALUATED AN VIF STATEMENT TO BE TRUE. IF THIS BIT IS SET, THE VT BIT WILL NOT BE SET UNTIL AFTER THE EXECUTION OF AN VENDIF INSTRUCTION. THIS BIT CAN BE MODIFIED BY THE VELSE, VROTRH VENDIF AND VROTRH INSTRUCTION. |
| VID | INPUT DATA VALID. IF THIS BIT IS SET, IT INDICATES THAT VALID DATA IS AT THE CORRESPONDING LOCATION IN THE IDR. THAT IS, IF THE VID BIT OF PROCESSING ELEMENT 14 IS SET, THEN THE DATA LOCATED IN IDR[14] IS VALID. OTHERWISE, DATA IN THE IDR IS CONSIDERED INVALID. EACH TIME DATA IS WRITTEN TO THE IDR BY AN EXTERNAL SOURCE, THE CORRESPONDING VID BIT IS SET. ALL VID BITS CAN BE CLEARED USING THE CLEARV INSTRUCTION. |

*FIG. 6-39*

| SPCR REGISTER BIT DESCRIPTIONS | |
|---|---|
| BIT | DESCRIPTION |
| SX[1:0] | SCALAR EXTENSION BITS. THESE BITS ARE USED TO EXTEND THE PRECISION OF CERTAIN ARITHMETIC AND LOGICAL INSTRUCTIONS. DEPENDING ON THE OPERATION THESE TWO BITS WILL HAVE DIFFERENT MEANINGS. REFER TO SECTION 2.5.18 EXTENSION BITS AND PERFORMING MULTI-BYTE OPERATIONS FOR MORE INFORMATION |
| SV<br>SD | THE SCALAR OVERFLOW BIT (SV) AND THE SCALAR OVERFLOW DIRECTION BIT (SD). THESE BITS ARE USED TO INDICATE BOTH THE OCCURRENCE OF OVERFLOW IN THE PREVIOUS ARITHMETIC OPERATION, AND, IF OVERFLOW OCCURRED, THE DIRECTION IN WHICH OVERFLOW WAS TAKEN. FOR A MORE COMPLETE DESCRIPTION OF HOW THE SV AND SD BITS ARE SET AND USED, PLEASE SEE A DESCRIPTION OF THE SPCR BITS IN SECTION 2.3.28. |

*FIG. 6-40*

| AE SYSTEMS CONTROL OPERATION INSTRUCTIONS | | |
|---|---|---|
| INSTRUCTION | SYNTAX | OPERATION |
| CLEARV | CLEARV | CLEAR ALL IDR VALID BITS. |
| DONE | DONE | SIGNAL THE AE SYSTEMS THAT THE MICROPROGRAM IS DONE. THIS INSTRUCTION WILL NEGATE THE BUSY SIGNAL PIN AND WILL RESET THE RUN MODE SHADOW REGISTERS. |
| HALT | HALT | HALT THE MICRO PROGRAM. IF ENABLED, THIS CAN CAUSE AN EXTERNAL INTERRUPT. THE PC IS LEFT POINTING TO THE NEXT EXECUTABLE INSTRUCTION. TO GET THE AE STARTED AGAIN (AT THE CURRENT INSTRUCTION) THE R/$\overline{S}$ LINE NEEDS TO TRANSITION FROM THE RUN STATE TO THE STOP STATE BACK TO THE RUN STATE. |
| ILLEGAL | ILLEGAL | THIS INSTRUCTION WILL ALWAYS GENERATE AN ILLEGAL INSTRUCTION EXCEPTION WHEN EXECUTED. |
| INTR | INTR #N | AE GENERATED SOFTWARE INTERRUPT. SET THE INTERRUPT LEVEL TO #N. IF ENABLED, THIS CAN GENERATE AN EXTERNAL INTERRUPT. |
| NOP | NOP | NO OPERATION. |

| AE SYSTEMS CONTROL OPERATION INSTRUCTIONS | | |
|---|---|---|
| INSTRUCTION | SYNTAX | OPERATION |
| RESTART | RESTART | THIS OPERATION SIMULATES THE RESET PIN BEING TOGGLED, BUT DOES NOT RESET ANY OF THE CONTROL REGISTERS (OTHER THAN SPCR AND VPCR). SPECIFICALLY, THIS INSTRUCTION DOES THE FOLLOWING:<br>VT <- 1 (FOR ALL PEs)<br>VH <- 0 (FOR ALL PEs)<br>VID <- 0 (FOR ALL PEs)<br>VX0 <- 0 (FOR ALL PEs) SX0 <- 0<br>VX1 <- 0 (FOR ALL PEs) SX1 <- 0<br>VV <- 0 (FOR ALL PEs) SV <- 0<br>VD <- 0 (FOR ALL PEs) SD <- 0<br>PC <- EPPC SP <- EPSP<br>FLS REGISTER FLAGS ARE INVALIDATED<br>REPEAT INSTRUCTION FLAGS ARE INVALIDATED |
| SETV | SETV | SET ALL IDR VALID BITS. |

FIG. 6-42-1

| VECTOR ENGINE DATA MOVEMENT INSTRUCTIONS | | |
|---|---|---|
| INSTRUCTION | SYNTAX | OPERATION |
| DROTMOV | DROTMOV $VREG2_S$*, $VREG2_D$ | DOWNWARD ROTATE $VREG2_S$ BY ONE PE POSITION. THIS HAS THE EFFECT OF MOVING DATA FROM PE N TO PE N+1. AFTER THE DOWNWARD ROTATE, MOVE THE VALUE OF $VREG2_S$ TO $VREG2_D$. THIS HAS THE EFFECT OF A DOWNWARD SHIFT AND VECTOR MOVE. REFER TO SECTION 2.5.11.1 CLARIFICATION OF THE DROTMOV INSTRUCTION FOR MORE INFORMATION.<br>* - $VREG2_S$ INCLUDES ONLY REGISTERS V0-V7 |
| DSROT | DSROT #N, VREG2 | PERFORM A SPARSE DOWNWARD ROTATE OF VREG2. REFER TO SECTION 2.5.12.3 CLARIFICATION OF THE VMIN/VMAX INSTRUCTIONS FOR MORE INFORMATION. |
| VMOV | VMOV $VREG1_S$, $VREG2_D$ | MOVE THE VALUE OF $VREG1_S$ TO $VREG2_D$. NOTE THAT THIS IS A 64 ELEMENT MOVE (DEPENDING ON THE VT BIT). |
| VMOVTV | VMOVTV | MOVE THE VALUE OF THE PE VT-BIT INTO THE VID-BIT. |

| VECTOR ENGINE DATA MOVEMENT INSTRUCTIONS | | |
|---|---|---|
| INSTRUCTION | SYNTAX | OPERATION |
| VSTORE | VSTORE VREG1, CMA[Pn]<br>VSTOREA VREG1, CMA[Pn++]<br>VSTOREI VREG1, IDR | MOVE THE VALUE OF VREG1 TO THE SELECTED CMA OR IDR LOCATION. NOTE THAT THIS IS A 64 ELEMENT MOVE (AND DEPENDS UPON THE VT BIT). |
| VWRITEE | VWRITEE #N, VREG2 | WRITE OUT THE EAST PORT THE CONTENTS OF VREG2 STARTING AT THE #0 PE AND ENDING AT THE PE WHOSE ADDRESS IS CONTAINED IN THE REGISTER P(N). PEs WITH THE VT-BIT CLEARED ARE SKIPPED AND NO DATA IS WRITTEN. |
| VWRITEL | VWRITEL #N, VREG2 | WRITE THE CONTENTS OF VREG2 STARTING AT THE #0 PE AND ENDING AT THE PE WHOSE ADDRESS IS CONTAINED IN THE REGISTER $P_N$. THE DESTINATION OF THE WRITE OPERATION IS THE LOCAL IDR REGISTER. PEs WITH THE VT-BIT CLEARED ARE SKIPPED AND NO DATA IS WRITTEN. THIS HAS THE EFFECT OF A COMPRESSIVE MOVE TO THE IDR. |
| VWRTITEN | VWRITEN #N, VREG2 | WRITE OUT THE NORTH PORT THE CONTENTS OF VREG2 STARTING AT THE #0 PE AND ENDING AT THE PE WHOSE ADDRESS IS CONTAINED IN THE REGISTER P(N). PEs WITH THE VT-BIT CLEARED ARE SKIPPED AND NO DATA IS WRITTEN. |
| VWRITES | VWRITES #N, VREG2 | WRITE OUT THE SOUTH PORT THE CONTENTS OF VREG2 STARTING AT THE #0 PE AND ENDING AT THE PE WHOSE ADDRESS IS CONTAINED IN THE REGISTER P(N). PEs WITH THE VT-BIT CLEARED ARE SKIPPED AND NO DATA IS WRITTEN. |
| VWRITEW | VWRITEW #N, VREG2 | WRITE OUT THE WEST PORT THE CONTENTS OF VREG2 STARTING AT THE #0 PE AND ENDING AT THE PE WHOSE ADDRESS IS CONTAINED IN THE REGISTER P(N). PEs WITH THE VT-BIT CLEARED ARE SKIPPED AND NO DATA IS WRITTEN. |

FIG. 6-42-2

| SEVERAL EXAMPLES OF THE DSROT INSTRUCTION | | | | | |
|---|---|---|---|---|---|
| PE # | INITIAL VALUE (V1) | AFTER DSROT #0, V1 | AFTER DSROT #1, V1 | AFTER DSROT #2, V1 | AFTER DSROT #3, V1 |
| 0000 | X0 | X15 | X15 | X15 | X15 |
| 0001 | X1 | X0 | X15 | X15 | X15 |
| 0010 | X2 | X1 | X1 | X15 | X15 |
| 0011 | X3 | X2 | X1 | X15 | X15 |
| 0100 | X4 | X3 | X3 | X3 | X15 |
| 0101 | X5 | X4 | X3 | X3 | X15 |
| 0110 | X6 | X5 | X5 | X3 | X15 |
| 0111 | X7 | X6 | X5 | X3 | X15 |
| 1000 | X8 | X7 | X7 | X7 | X7 |
| 1001 | X9 | X8 | X7 | X7 | X7 |
| 1010 | X10 | X9 | X9 | X7 | X7 |
| 1011 | X11 | X10 | X9 | X7 | X7 |
| 1100 | X12 | X11 | X11 | X11 | X7 |
| 1101 | X13 | X12 | X11 | X11 | X7 |
| 1110 | X14 | X13 | X13 | X11 | X7 |
| 1111 | X15 | X14 | X13 | X11 | X7 |

FIG. 6-43

| VECTOR ENGINE DATA OPERATION INSTRUCTIONS | | |
|---|---|---|
| INSTRUCTION | SYNTAX | OPERATION |
| DADD | DADD #N, VREG2 | ADD VREG2 IN PE(N), TO VREG2 IN PE(M), AND STORE THE RESULT IN VREG2 OF PE(M). THE RESULTS OF THIS INSTRUCTION WILL SATURATE. BASED ON VSGN CONTROL BIT THE SATURATION VALUE WILL BE DIFFERENT. THE VALUES OF N AND M ARE BASED ON #N. REFER TO SECTION 2.5.12.2 CLARIFICATION OF THE DOWNWARD SHIT OPERATIONS FOR MORE INFROMATION. |

FIG. 6-44-1

| VECTOR ENGINE DATA OPERATION INSTRUCTIONS | | |
|---|---|---|
| INSTRUCTION | SYNTAX | OPERATION |
| DADDP | DADDP #N, VREG2 | ADD (PRELIMINARY) VREG2 IN PE(N), TO VREG2 IN PE(M), AND STORE THE RESULT IN VREG2 OF PE(M). THE RESULTS OF THIS INSTRUCTION WILL NOT SATURATE. THE INSTRUCTION IS USED WITH THE DADD INSTRUCTION FOR SUPPORTING MULTI-BYTE OPERATIONS. THE VALUES OF N AND M ARE BASED ON #N. REFER TO SECTION 2.5.12.2 CLARIFICATION OF THE DOWNWARD SHIFT OPERATIONS FOR MORE INFORMATION. |
| DMAX | DMAX #N, VREG2 | DETERMINE THE MAXIMA BETWEEN VREG2 IN PE(N) TO VREG2 IN PE(M) AND STORE THE RESULT IN VREG2 OF PE(M). THE VALUES OF N AND M ARE BASED ON #N. REFER TO SECTION 2.5.12.2 CLARIFICATION OF THE DOWNWARD SHIFT OPERATIONS FOR MORE INFORMATION. |
| DMAXP | DMAXP #N, VREG2 | DETERMINE (PRELIMINARY) THE MAXIMA OF VREG2 IN PE(N) TO VREG2 IN PE(M) AND STORE THE RESULT IN VREG2 OF PE(M). THE VALUES OF N AND M ARE BASED ON #N. REFER TO SECTION 2.5.12.2 CLARIFICATION OF THE DOWNWARD SHIFT OPERATIONS FOR MORE INFORMATION. |
| DMIN | DMIN #N, VREG2 | DETERMINE THE MINIMA OF VREG2 IN PE(N) TO VREG2 IN PE(M) AND STORE THE RESULT IN VREG2 OF PE(M). THE VALUES OF N AND M ARE BASED ON #N. REFER TO SECTION 2.5.12.2 CLARIFICATION OF THE DOWNWARD SHIFT OPERATIONS FOR MORE INFORMATION. |
| DMINP | DMINP #N, VREG2 | DETERMINE (PRELIMINARY) THE MINIMA OF VREG2 IN PE(N) TO VREG2 IN PE(M) AND STORE THE RESULT IN VREG2 OF PE(M). THE VALUES OF N AND M ARE BASED ON #N. REFER TO SECTION 2.5.12.2 CLARIFICATION OF THE DOWNWARD SHIFT OPERATIONS FOR MORE INFORMATION. |
| VABS | VABS VREG2 | TAKE THE ABSOLUTE VALUE OF VREG2. NOTE THAT-128 SATURATES TO 127. |
| VADD | VADD $VREG1_S$, $VREG2_D$ | ADD $VREG1_S$ TO $VREG2_D$ AND STORE THE RESULT IN $VREG2_D$. THE RESULTS OF THIS INSTRUCTION WILL SATURATE. BASED ON THE VSGN CONTROL BIT THE SATURATION VALUE WILL BE DIFFERENT. |

| VECTOR ENGINE DATA OPERATION INSTRUCTIONS | | |
|---|---|---|
| INSTRUCTION | SYNTAX | OPERATION |
| VADDP | VADDP $VREG1_S$, $VREG2_D$ | ADD (PRELIMINARY) $VREG1_S$ TO $VREG2_D$ AND STORE THE RESULT IN $VREG2_D$. THE RESULTS OF THIS INSTRUCTION WILL NOT SATURATE. THIS INSTRUCTION IS USED WITH THE VADD INSTRUCTION FOR SUPPORTING MULTI-BYTE OPERATIONS. |
| VADDSX | VADDSX VREG2 | ADD WITH SIGN EXTENSION TO VREG2 AND STORE THE RESULT IN VREG2. THIS INSTRUCTION IS USED FOR ADDING ANY CARRY INFORMATION (WITH EXTENSION) INTO A MULTI-BYTE SUMMATION. THE RESULTS OF THIS INSTRUCTION WILL SATURATE. |
| VADDSXP | VADDSXP VREG2 | ADD (PRELIMINARY) WITH SIGN EXTENSION TO VREG2 AND STORE THE RESULT IN VREG2. THIS INSTRUCTION IS USED FOR ADDING ANY CARRY INFORMATION (WITH EXTENSION) INTO A MULTI-BYTE SUMMATION. THE RESULTS OF THIS INSTRUCTION WILL NOT SATURATE. |
| VAND | VAND $VREG1_S$, $VREG2_D$ | LOGICALLY AND $VREG1_S$ AND $VREG2_D$ AND STORE THE RESULT IN $VREG2_D$. |
| VBCNT | VBCNT VREG2 | COUNT THE NUMBER OF SET BITS IN VREG2 AND STORE THE RESULT IN VREG2. |
| VDIV | VDIV $VREG1_S$, $VREG2_D$* | DIVIDE THE CONTENTS OF $VREG1_S$ BY THE CONTENTS OF $VREG2_D$ AND STORE THE 8-BIT QUOTIENT AND 8-BIT REMAINDER IN THE REGISTER PAIR SPECIFIED BY $VREG2_D$. $VREG2_D$ MUST BE AN EVEN NUMBER REGISTER WITH THE QUOTIENT IN THE EVEN REGISTER AND THE REMAINDER IN THE ODD (EVEN+1) REGISTER. * – $VREG2_D$ INCLUDES ONLY THE EVEN V REGISTERS (V0, V2, V4, V6). |
| VLSHFT | VLSHFT VREG2 | LEFT SHIFT THE CONTENTS OF VREG2 AND STORE THE RESULT IN VREG2. THE MSBIT OF EACH VREG2 WILL BE PLACED INTO THE LSBIT OF $VREG2_D$. |
| VLSHFTV | VLSHFTV $VREG2_D$ | LEFT SHIFT THE VALUE OF THE VPCR VID-BIT INTO THE LS BIT OF VREG2. |
| VMAX | VMAX $VREG1_S$, $VREG2_D$ | DETERMINE THE MAXIMUM BETWEEN THE $VREG1_S$ AND $VREG2_D$ REGISTERS AND STORE THE RESULT IN $VREG2_D$. |

FIG. 6-44-4

| VECTOR ENGINE DATA OPERATION INSTRUCTIONS | | |
|---|---|---|
| INSTRUCTION | SYNTAX | OPERATION |
| VMAXP | VMAXP $VREG1_S$, $VREG2_D$ | DETERMINE THE MAXIMUM (PRELIMINARY) BETWEEN THE $VREG1_S$ AND $VREG2_D$ REGISTERS AND STORE THE RESULT IN $VREG2_D$. |
| VMIN | VMIN $VREG1_S$, $VREG2_D$ | DETERMINE THE MINIMUM BETWEEN THE $VREG1_S$ AND $VREG2_D$ REGISTERS AND STORE THE RESULT IN $VREG2_D$. |
| VMINP | VMINP $VREG1_S$, $VREG2_D$ | DETERMINE THE MINIMUM (PRELIMINARY) BETWEEN THE $VREG1_S$ AND $VREG2_D$ REGISTERS AND STORE THE RESULT IN $VREG2_D$. |
| VMUL | VMUL $VREG1_S$, $VREG2_D$ | MULTIPLY THE CONTENTS OF $VREG1_S$ TO THE CONTENTS OF $VREG2_D$ AND STORE THE RESULTS IN THE REGISTER PAIR SPECIFIED BY $VREG2_D$. $VREG2_D$ MUST BE AN EVEN NUMBER REGISTER. THE MSB OF THE PRODUCT WILL BE PLACED IN THE EVEN REGISTER AND LSB OF THE PRODUCT WILL BE PLACED IN THE ODD (EVEN+1) REGISTER. |
| VNEG | VNEG VREG2 | NEGATE (TWO'S COMPLEMENT) THE CONTENTS OF VREG2 AND STORE THE RESULTS IN VREG2. THE RESULTS OF THIS INSTRUCTION WILL SATURATE. |
| VNEGP | VNEGP VREG2 | NEGATE (TWO'S COMPLEMENT) THE CONTENTS OF VREG2 AND STORE THE RESULTS IN VREG2. THE NEGP INSTRUCTION IS USED FOR SUPPORTING MULTI-BYTE NEGATION. THE RESULTS OF THIS INSTRUCTION WILL NOT SATURATE. |
| VOR | VOR $VREG1_S$, $VREG2_D$ | LOGICALLY OR THE CONTENTS OF $VREG1_S$ TO THE CONTENTS OF $VREG2_D$ AND STORE THE RESULTS IN $VREG2_D$. |
| VRAND | VRAND $VREG1_S$, $VREG2_D$ | GENERATE THE RANDOM NUMBER. THIS INSTRUCTION WILL TAKE A SEED VALUE IN $VREG2_D$, LOGICALLY AND THE MASK VALUE CONTAINED IN $VREG1_S$ TO THE SEED VALUE, BIT-WISE EXCLUSIVE OR THE RESULT, SHIFTING THE RESULTANT LS BIT VALUE INTO THE MOST SIGNIFICANT BIT POSITION OF $VREG2_D$. |
| VROTRV | VROTRV VREG2 | RIGHT ROTATE THE LS BIT OF VREG2 INTO THE VPCR VID-BIT. |
| VRSHFT | VRSHFT VREG2 | RIGHT SHIFT THE CONTENTS OF VREG2 BY ONE POSITION. REFER TO FIG.6-60 FOR MORE INFORMATION. |

| VECTOR ENGINE DATA OPERATION INSTRUCTIONS | | |
|---|---|---|
| INSTRUCTION | SYNTAX | OPERATION |
| VRSHFTP | VRSHFTP VREG2 | RIGHT SHIFT (PRELIMINARY) THE CONTENTS OF VREG2 BY ONE POSITION. REFER TO FIG.6-60 FOR MORE INFORMATION. |
| VSAT | VSAT VREG2 | SATURATE THE CONTENTS OF VREG2 BASED ON THE STATE OF THE SATURATION/OVERFLOW BITS. IF THE PREVIOUS RESULT OVERFLOWED THEN THE SATURATION OPERATION WILL OCCUR. OTHERWISE NO CHANGE WILL BE MADE. THE SATURATION DIRECTION BIT WILL DETERMINE THE VALUE THAT IS SATURATED TO. |
| VSUB | VSUB $VREG1_S$, $VREG2_D$ | SUBTRACT THE CONTENT OF $VREG1_S$ FROM THE CONTENTS OF $VREG2_D$ AND STORE THE RESULTS IN $VREG2_D$. THE RESULTS OF THIS INSTRUCTION WILL SATURATE AND ARE DEPENDENT ON THE VSGN CONTROL BIT. |
| VSUBP | VSUBP $VREG1_S$, $VREG2_D$ | SUBTRACT (PRELIMINARY) THE CONTENTS OF $VREG1_S$ FROM THE CONTENTS OF $VREG2_D$ AND STORE THE RESULTS IN $VREG2_D$. THE RESULTS OF THIS INSTRUCTION WILL NOT SATURATE. |
| VSUBSX | VSUBSX VREG2 | SUBTRACT WITH SIGN EXTENSION TO VREG2 AND STORE THE RESULT IN VREG2. THIS INSTRUCTION IS USED FOR SUBTRACTING ANY BORROW INFORMATION (WITH SIGN EXTENSION) INTO A MULTI-BYTE SUBTRACTION. THE RESULTS OF THIS INSTRUCTION WILL SATURATE. |
| VSUBSXP | VSUBSXP VREG2 | SUBTRACT (PRELIMINARY) WITH SIGN EXTENSION TO VREG2 AND STORE THE RESULT IN VREG2. THIS INSTRUCTION IS USED FOR SUBTRACTING ANY BORROW INFORMATION (WITH SIGN EXTENSION) INTO A MULTI-BYTE SUBTRACTION. THE RESULTS OF THIS INSTRUCTION WILL NOT SATURATE. |
| VXOR | VXOR $VREG1_S$, $VREG2_D$ | LOGICALLY EXCLUSIVE-OR THE CONTENTS OF $VREG1_S$ TO THE CONTENTS OF $VREG2_D$ AND STORE THE RESULTS IN $VREG2_D$. |

*FIG.6-44-5*

| SEVERAL EXAMPLES OF THE DADD INSTRUCTION | | | | | |
|---|---|---|---|---|---|
| PE # | INITIAL VALUE | AFTER DADD #0, VN | AFTER DADD #1, VN | AFTER DADD #2, VN | AFTER DADD #3, VN |
| 0000 | X0 | X0 | X0 | X0 | X0 |
| 0001 | X1 | X1+X0 | X1 | X1 | X1 |
| 0010 | X2 | X2 | X2+X1 | X2 | X2 |
| 0011 | X3 | X3+X2 | X3+X1 | X3 | X3 |
| 0100 | X4 | X4 | X4 | X4+X3 | X4 |
| 0101 | X5 | X5+X4 | X5 | X5+X3 | X5 |
| 0110 | X6 | X6 | X6+X5 | X6+X3 | X6 |
| 0111 | X7 | X7+X6 | X7+X5 | X7+X3 | X7 |
| 1000 | X8 | X8 | X8 | X8 | X8+X7 |
| 1001 | X9 | X9+X8 | X9 | X9 | X9+X7 |
| 1010 | X10 | X10 | X10+X9 | X10 | X10+X7 |
| 1011 | X11 | X11+X10 | X11+X9 | X11 | X11+X7 |
| 1100 | X12 | X12 | X12 | X12+X11 | X12+X7 |
| 1101 | X13 | X13+X12 | X13 | X13+X11 | X13+X7 |
| 1110 | X14 | X14 | X14+X13 | X14+X11 | X14+X7 |
| 1111 | X15 | X15+X14 | X15+X13 | X15+X11 | X15+X7 |

FIG. 6-47-1

| VECTOR ENGINE CONDITIONAL OPERATION INSTRUCTIONS | | | |
|---|---|---|---|
| INSTRUCTION | SYNTAX | TEST | OPERATION |
| COLMAX | COLMAX #N, VREG2 | N/A | N-STEP MAXIMUM OF THE CONTENTS OF VREG2 ACROSS AN AE COLUMN. THIS INSTRUCTION USES THE $\overline{COL}$ SIGNAL TO RESOLVE THE MAXIMA ACROSS AE DEVICE BOUNDARIES. THE PEs THAT HAVE THE MAXIMA SET THE VPCR VT-BIT TO A ONE. ALL OTHERS CLEAR THE VPCR VT BIT. |
| COLMIN | COLMIN #N, VREG2 | N/A | N-STEP MINIMUM OF THE CONTENTS OF VREG2 ACROSS AN AE COLUMN. THIS INSTRUCTION USES THE $\overline{COL}$ SIGNAL TO RESOLVE THE MINIMA ACROSS AE DEVICE BOUNDARIES. THE PEs THAT HAVE THE MINIMA SET THE VPCR VT-BIT TO A ONE. ALL OTHERS CLEAR THE VPCR VT BIT. |
| LOCMAX | LOCMAX #N, VREG2 | N/A | N-STEP MAXIMUM OF THE CONTENTS OF VREG2 LOCAL TO THE AE. THE PE THAT HAS THE MAXIMA IN ITS SETS THE VPCR VT-BIT TO A ONE. ALL OTHERS CLEAR THE VPCR VT BIT. |
| LOCMIN | LOCMIN #N, VREG2 | N/A | N-STEP MINIMUM OF THE CONTENTS OF VREG2 LOCAL TO THE AE. THE PEs THAT HAVE THE MINIMA SET THE VPCR VT-BIT TO A ONE. ALL OTHERS CLEAR THE VPCR VT BIT. |
| ROWMAX | ROWMAX #N, VREG2 | N/A | N-STEP MAXIMUM OF THE CONTENTS OF VREG2 ACROSS AN AE ROW. THIS INSTRUCTION USES THE $\overline{ROW}$ SIGNAL TO RESOLVE THE MAXIMA ACROSS AE DEVICE BOUNDARIES. THE PEs THAT HAVE THE MAXIMA SET THE VPCR VT-BIT TO A ONE. ALL OTHERS CLEAR THE VPCR VT BIT. |
| ROWMIN | ROWMIN #N, VREG2 | N/A | N-STEP MINIMUM OF THE CONTENTS OF VREG2 ACROSS AN AE ROW. THIS INSTRUCTION USES THE $\overline{ROW}$ SIGNAL TO RESOLVE THE MINIMA ACROSS AE DEVICE BOUNDARIES. THE PEs THAT HAVE THE MINIMA SET THE VPCR VT-BIT TO A ONE. ALL OTHERS CLEAR THE VPCR VT BIT. |
| VCOMPP | VCOMPP $VREG1_S$, $VREG2_D$ | N/A | COMPARE (PRELIMINARY) THE CONTENTS OF $VREG1_S$ TO THE CONTENTS OF $VREG2_D$. SET THE EXTENSION BITS BASED ON THE RESULT. |

FIG. 6-47-2

| VECTOR ENGINE CONDITIONAL OPERATION INSTRUCTIONS | | | |
|---|---|---|---|
| INSTRUCTION | SYNTAX | TEST | OPERATION |
| VELSE | VELSE | N/A | ELSE CLAUSE FOR THE VIF INSTRUCTION. REFER TO SECTION 2.5.13.1 EFFECT OF CONDITIONAL INSTRUCTIONS ON THE VT AND VH BITS FOR MORE INFORMATION. |
| VENDIF | VENDIF | N/A | END VIF BLOCK. VT=1; 0->VH |
| VIFEQ | VIFEQ $VREG1_S$, $VREG2_D$ | $VREG1_S$== $VREG2_D$ | IF $VREG1_S$ IS EQUAL TO $VREG2_D$, VT=1 OTHERWISE VT=0 |
| VIFGE | VIFGE $VREG1_S$, $VREG2_D$ | $VREG1_S$>= $VREG2_D$ | IF $VREG1_S$ IS GREATER THAN OR EQUAL TO $VREG2_D$, VT=1 OTHERWISE VT=0 |
| VIFGT | VIFGT $VREG1_S$, $VREG2_D$ | $VREG1_S$> $VREG2_D$ | IF $VREG1_S$ GREATER THAN $VREG2_D$, VT=1 OTHERWISE VT=0 |
| VIFLE | VIFLE $VREG1_S$, $VREG2_D$ | $VREG1_S$<= $VREG2_D$ | IF $VREG1_S$ IS LESS THAN OR EQUAL TO $VREG2_D$, VT=1 OTHERWISE VT=0 |
| VIFLT | VIFLT $VREG1_S$, $VREG2_D$ | $VREG1_S$< $VREG2_D$ | IF $VREG1_S$ IS LESS THAN $VREG2_D$, VT=1 OTHERWISE VT=0 |
| VIFNE | VIFNE $VREG1_S$, $VREG2_D$ | $VREG1_S$!= $VREG2_D$ | IF $VREG1_S$ IS NOT EQUAL TO $VREG2_D$, VT=1 OTHERWISE VT=0 |
| VIFNV | VIFNV | N/A | IF OVERFLOW INDICATOR IS NOT TRUE, VT=1 OTHERWISE VT=0 |
| VIFV | VIFV | N/A | IF OVERFLOW INDICATOR IS TRUE, VT=1 OTHERWISE VT=0 |
| VLSHFTH | VLSHFTH VREG2 | N/A | LEFT SHIFT THE VALUE OF THE VPCR VH-BIT INTO THE LSBIT OF VREG2. |
| VLSHFTT | VLSHFTT VREG2 | N/A | LEFT SHIFT THE VALUE OF THE VPCR VT-BIT INTO THE LSBIT OF VREG2. |
| VROTRH | VROTRH VREG2 | N/A | RIGHT ROTATE THE LSBIT OF THE VREG2 INTO THE VPCR VH-BIT. |
| VROTRT | VROTRT VREG2 | N/A | RIGHT ROTATE THE LSBIT OF THE VREG2 INTO THE VPCR VT-BIT. |

<table>
<tr><th colspan="6">VPCR VT AND VH BIT NEXT STATE TRANSITION TABLE</th></tr>
<tr><th rowspan="2">STATE</th><th colspan="2">Q<sub>N+1</sub></th><th colspan="2">Q<sub>N</sub></th><th rowspan="2">CONDITIONAL</th></tr>
<tr><th>VT</th><th>VH</th><th>VT</th><th>VH</th></tr>
<tr><td>1</td><td>0</td><td>0</td><td>0</td><td>0</td><td>VIF IS EXECUTED</td></tr>
<tr><td>2</td><td>0</td><td>1</td><td>0</td><td>1</td><td>VIF IS EXECUTED</td></tr>
<tr><td>3</td><td>1</td><td>0</td><td rowspan="2">1</td><td rowspan="2">0</td><td>VIF IS TRUE</td></tr>
<tr><td>4</td><td>0</td><td>0</td><td>VIF IS FALSE</td></tr>
<tr><td>5</td><td>1</td><td>0</td><td>0</td><td>0</td><td>VELSE IS EXECUTED</td></tr>
<tr><td>6</td><td>0</td><td>1</td><td>0</td><td>1</td><td>VELSE IS EXECUTED</td></tr>
<tr><td>7</td><td>0</td><td>1</td><td>1</td><td>0</td><td>VELSE IS EXECUTED</td></tr>
<tr><td>8</td><td rowspan="3">1</td><td rowspan="3">0</td><td>0</td><td>0</td><td>VENDIF IS EXECUTED</td></tr>
<tr><td>9</td><td>0</td><td>1</td><td>VENDIF IS EXECUTED</td></tr>
<tr><td>10</td><td>1</td><td>0</td><td>VENDIF IS EXECUTED</td></tr>
</table>

*FIG. 6-48*

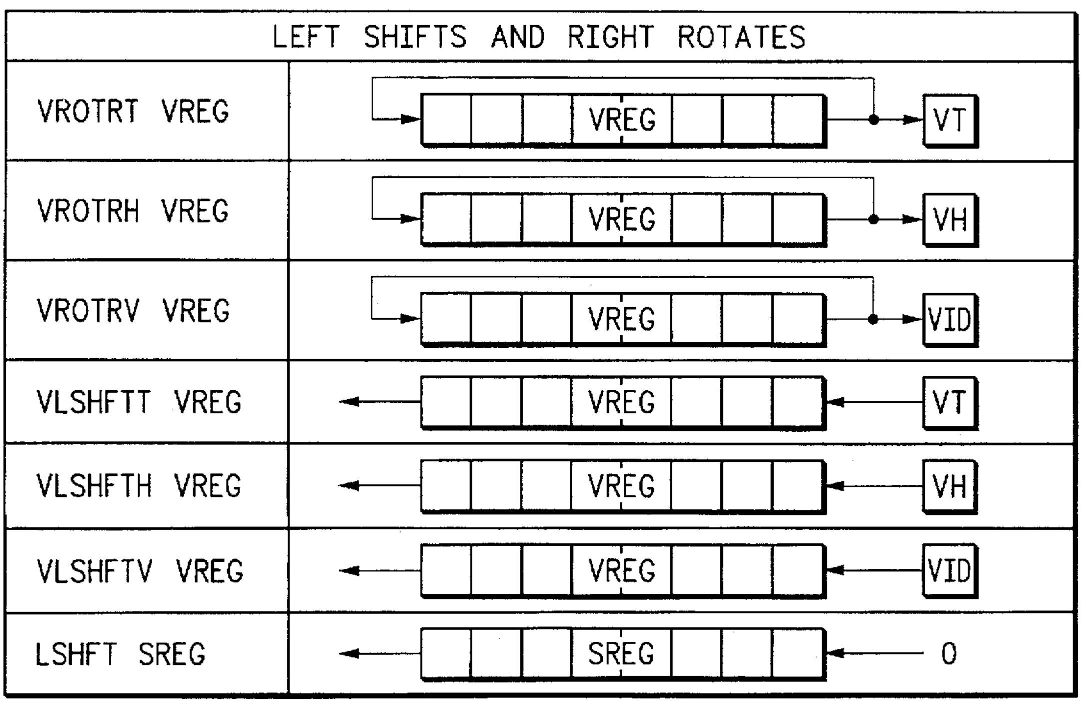

| SCALAR ENGINE DATA MOVEMENT INSTRUCTIONS | | |
|---|---|---|
| INSTRUCTION | SYNTAX | OPERATION |
| GET | GET VREG*, SREG**, SREG | GET THE VALUE OF VREG1 IN THE PE POINTED TO BY THE CONTENTS OF SREG AND PLACE THE RESULT INTO SREG.<br>* - VREG1 IS LIMITED TO THE V REGISTERS.<br>** - SREG IS LIMITED TO THE P REGISTERS. |
| GETPE | GETPE SREG | GET THE ADDRESS OF THE FIRST PE WITH THE VT-BIT SET AND PLACE THE RESULTS IN SREG. IF 64 VT BITS ARE CLEAR, THEN SV IS SET, AND THE VALUE IN SREG IS THE VALUE OF THE LAST PROCESSING ELEMENT ($3F). |
| LOADA | LOADA #A, $SREG_D$ | LOAD ABSOLUTE FROM CMA MEMORY. LOAD $SREG_D$ FROM THE ADDRESS SPECIFIED BY #A IN THE FIRST 128 BYTES OF CMA MEMORY. |
| LOADR | LOADR #R, $SREG_D$ | LOAD RELATIVE FROM CMA MEMORY. THE ADDRESS OF THE DATA LOADED IS THE SUM OF THE CURRENT SP VALUE AND THE SIGNED 7-BIT IMMEDIATE VALUE #R. DATA IS LOADED INTO $SREG_D$. |
| MOV | MOV $SREG_S$, $SREG_D$ | MOVE THE VALUE FROM $SREG_S$ TO $SREG_D$. |
| MOVCI | MOVCI #U, #C | MOVE THE IMMEDIATE VALUE #U TO THE CONTROL REGISTER #C. |
| MOVFC | MOVFC #C, $SREG_D$ | MOVE THE VALUE OF THE CONTROL REGISTER #C TO $SREG_D$. |
| MOVTC | MOVTC $SREG_S$, #C | MOVE THE VALUE OF $SREG_S$ REGISTER TO CONTROL REGISTER #C. |
| MOVI | MOVI #U, $SREG_D$ | MOVE THE IMMEDIATE VALUE TO $SREG_D$ REGISTER. |
| MOVFSP | MOVFSP SREG | MOVE THE SP REGISTER TO A REGISTER PAIR SPECIFIED BY SREG. THE MSB OF THE REGISTER PAIR IS SPECIFIED BY SREG. THE LSB IS SREG+1 (I.E. IF SREG=G0, THEN G0 HOLDS THE MSB, AND G1 HOLDS THE LSB). |
| MOVTSP | MOVTSP SREG | MOVE A REGISTER PAIR TO SP REGISTER. A REGISTER PAIR IS DEFINED AS THE EVEN REGISTER HOLDING THE MS BYTE AND THE ODD REGISTER HOLDING THE LS BYTE. |

| SCALAR ENGINE DATA MOVEMENT INSTRUCTIONS | | |
|---|---|---|
| INSTRUCTION | SYNTAX | OPERATION |
| POP | POP SREG | POP A VALUE OFF OF THE STACK AND PLACE IT INTO SREG. THE STACK POINTER (SP) IS INCREMENTED AFTER THE DATA IS WRITTEN TO THE STACK. |
| PUSH | PUSH SREG | PUSH THE VALUE OF SREG ONTO THE STACK. THE STACK POINTER (SP) IS DECREMENTED BEFORE THE DATA IS READ FROM THE STACK. |
| PUT | PUT $SREG_S$, SREG*, $VREG2_D$ | PUT THE VALUE OF $SREG_S$ INTO THE $VREG2_D$ REGISTER OF THE PE POINTED TO BY THE CONTENTS OF SREG. * - SREG IS LIMITED TO THE P REGISTERS. |
| STOREA | STOREA $SREG_S$, #A | STORE ABSOLUTE TO CMA MEMORY. STORE $SREG_S$ TO THE ADDRESS SPECIFIED AS #A IN THE FIRST 128 BYTES OF THE CMA. |
| STORER | STORER $SREG_S$, #R | STORE RELATIVE TO CMA MEMORY. THE ADDRESS OF THE DATA STORED IS THE SUM OF THE CURRENT SP VALUE WITH THE SIGNED 7-BIT IMMEDIATE VALUE #R. DATA IS TAKEN FROM $SREG_S$. |
| WRITEE | WRITEE $SREG_S$ | WRITE THE VALUE OF $SREG_S$ OUT THE EAST PORT. |
| WRITEL | WRITEL $SREG_S$ | WRITE THE VALUE OF $SREG_S$ TO THE LOCAL IDR REGISTER. |
| WRITEN | WRITEN $SREG_S$ | WRITE THE VALUE OF $SREG_S$ OUT THE NORTH PORT. |
| WRITES | WRITES $SREG_S$ | WRITE THE VALUE OF $SREG_S$ OUT THE SOUTH PORT. |
| WRITEW | WRITEW $SREG_S$ | WRITE THE VALUE OF $SREG_S$ OUT THE WEST PORT. |

| SCALAR ENGINE DATA OPERATION INSTRUCTIONS | | |
|---|---|---|
| INSTRUCTION | SYNTAX | OPERATION |
| ABS | ABS SREG | TAKE THE ABSOLUTE VALUE OF SREG. NOTE THAT-128 SATURATES TO 127. |
| ADD | ADD $SREG_S$, $SREG_D$ | ADD THE CONTENTS OF $SREG_S$ TO THE CONTENTS OF $SREG_D$ AND STORE THE RESULT INTO $SREG_D$. THE RESULTS OF THIS INSTRUCTION WILL SATURATE. BASED ON SSGN CONTROL BIT, THE SATURATION VALUE WILL BE DIFFERENT. |
| ADDP | ADDP $SREG_S$, $SREG_D$ | ADD (PRELIMINARY) THE CONTENTS OF $SREG_S$ TO THE CONTENTS OF $SREG_D$ AND STORE THE RESULTS IN THE $SREG_D$. THE RESULTS OF THIS INSTRUCTION WILL NOT SATURATE. THIS INSTRUCTION IS USED WITH THE ADD INSTRUCTION FOR SUPPORTING MULTI-BYTE OPERATIONS. |
| ADDSX | ADDSX SREG | ADD SIGN EXTENSION TO AN SREG REGISTER AND STORE THE RESULT IN THE SAME SREG REGISTER. THIS INSTRUCTION IS USED FOR ADDING ANY CARRY INFORMATION (WITH SIGN EXTENSION) INTO A MULTI-BYTE SUMMATION. THE RESULTS OF THIS INSTRUCTION WILL SATURATE. |
| ADDSXP | ADDSXP SREG | ADD (PRELIMINARY) SIGN EXTENSION TO AN SREG REGISTER AND STORE THE RESULT IN THE SAME SREG REGISTER. THIS INSTRUCTION IS USED FOR ADDING ANY CARRY INFORMATION (WITH EXTENSION) INTO A MULTI-BYTE SUMMATION. THE RESULTS OF THIS INSTRUCTION WILL NOT SATURATE. |
| AND | AND $SREG_S$, $SREG_D$ | LOGICALLY AND THE CONTENTS OF $SREG_S$ WITH THE CONTENTS OF $SREG_D$ AND STORE THE RESULT IN THE $SREG_D$. |
| BCNT | BCNT SREG | COUNT THE NUMBER OF SET BITS IN SREG AND STORE THE RESULT IN SREG. |
| COMPP | COMPP $SREG_S$, $SREG_D$ | COMPARE (PRELIMINARY) THE CONTENTS OF $SREG_S$ TO THE CONTENTS OF $SREG_D$. SET THE EXTENSION BITS BASED ON THE RESULT. |
| DEC | DEC #N, $SREG_D$ | DECREMENT $SREG_D$ BY #N AND STORE THE RESULT IN $SREG_D$. THE DEC INSTRUCTION DOES NOT DEPEND ON THE SSGN CONTROL BIT AND IT DOES NOT SATURATE. IT IS INTENDED FOR GENERAL POINTER MANIPULATION. |

FIG. 6-51-2

| SCALAR ENGINE DATA OPERATION INSTRUCTIONS | | |
|---|---|---|
| INSTRUCTION | SYNTAX | OPERATION |
| DECP | DECP #N, SREG | DECREMENT (PRELIMINARY) SREG BY #N AND STORE THE RESULT IN SREG. THE DECP INSTRUCTION DOES NOT DEPEND ON THE SSGN CONTROL BIT AND IT DOES NOT SATURATE. IT IS INTENDED FOR GENERAL POINTER MANIPULATION. |
| DECSP | DECSP | DECREMENT THE STACK POINTER BY 1. |
| DIV | DIV $SREG_S$, $SREG_D$ | DIVIDE THE CONTENTS OF AN SREG BY THE CONTENTS OF ANOTHER $SREG_S$ AND STORE THE 8-BIT REMAINDER IN AN $SREG_D$ PAIR. THE $SREG_D$ SPECIFIED MUST BE AN EVEN NUMBER REGISTER WITH THE QUOTIENT PLACED IN THE ODD REGISTER AND THE REMAINDER PLACED IN THE EVEN (ODD-1) REGISTER. |
| INC | INC #N, SREG | INCREMENT SREG BY #N AND STORE THE RESULT IN SREG. THE INC INSTRUCTION DOES NOT DEPEND ON THE SSGN CONTROL BIT AND IT DOES NOT SATURATE. IT IS INTENDED FOR GENERAL POINTER MANIPULATION. |
| INCP | INCP #N, SREG | INCREMENT (PRELIMINARY) SREG BY #N AND STORE THE RESULT IN SREG. THE INCP INSTRUCTION DOES NOT DEPEND ON THE SSGN CONTROL BIT AND IT DOES NOT SATURATE. IT IS INTENDED FOR MULTI-BYTE POINTER MANIPULATION. |
| INCSP | INCSP | INCREMENT THE STACK POINTER BY 1. |
| LSHFT | LSHFT SREG | LEFT SHIFT CONTENTS OF SREG AND STORE THE RESULT IN SREG. THE LEAST SIGNIFICANT BIT IS SET TO ZERO. |
| MAX | MAX $SREG_S$, $SREG_D$ | DETERMINE THE MAXIMUM BETWEEN TWO SREG'S AND STORE THE RESULT IN $SREG_D$. |
| MAXP | MAXP $SREG_S$, $SREG_D$ | DETERMINE THE MAXIMUM (PRELIMINARY) BETWEEN TWO SREG'S AND STORE THE RESULT IN $SREG_D$. |
| MIN | MIN $SREG_S$, $SREG_D$ | DETERMINE THE MINIMUM BETWEEN TWO SREG'S AND STORE THE RESULT IN $SREG_D$. |
| MINP | MINP $SREG_S$, $SREG_D$ | DETERMINE THE MINIMUM (PRELIMINARY) BETWEEN TWO SREG'S AND STORE THE RESULT IN $SREG_D$. |

| SCALAR ENGINE DATA OPERATION INSTRUCTIONS | | |
|---|---|---|
| INSTRUCTION | SYNTAX | OPERATION |
| MUL | MUL $SREG_S$, $SREG_D$ | MULTIPLY THE CONTENTS OF $SREG_S$ BY THE CONTENTS OF $SREG_D$ AND STORE THE RESULTS INTO A REGISTER PAIR SPECIFIED BY $SREG_D$. $SREG_D$ MUST BE AN EVEN NUMBER REGISTER WITH THE MSB PRODUCT IN THE EVEN REGISTER AND THE LSB PRODUCT IN THE ODD (EVEN+1) REGISTER. |
| NEG | NEG SREG | NEGATE THE CONTENTS OF SREG AND STORE THE RESULTS IN SREG. THE RESULTS OF THIS INSTRUCTION WILL SATURATE. NEGATING THE MOST NEGATIVE TWO'S COMPLEMENT VALUE (−128) PRODUCES 127 WITH AN OVERFLOW. |
| NEGP | NEGP SREG | NEGATE THE CONTENTS OF SREG AND STORE THE RESULTS IN SREG. THE NEGP INSTRUCTION IS USED FOR SUPPORTING MULTI-BYTE NEGATION. THE RESULTS OF THIS INSTRUCTION WILL NOT SATURATE. |
| NOT | NOT SREG | LOGICALLY COMPLEMENT (1'S COMPLEMENT) SREG AND STORE THE RESULT IN SREG. |
| OR | OR $SREG_S$, $SREG_D$ | LOGICALLY OR THE CONTENTS OF $SREG_S$ WITH THE CONTENTS OF $SREG_D$ AND STORE THE RESULTS INTO $SREG_D$. |
| RAND | RAND $SREG_S$, $SREG_D$ | GENERATE A RANDOM NUMBER. THIS INSTRUCTION WILL TAKE A SEED VALUE CONTAINED IN $SREG_S$, LOGICALLY AND THE MASK VALUE CONTAINED IN THE SECOND $SREG_D$ TO THE SEED VALUE, AND THEN SHIFT THE EXCLUSIVE-OR OF THESE 8-BITS (1'S TALLEY) INTO THE MOST SIGNIFICANT BIT POSITION OF SREG. |
| RSHFT | RSHFT SREG | RIGHT SHIFT THE CONTENTS OF SREG BY ONE POSITION. REFER TO FIG.6-60 FOR MORE INFORMATION. |
| RSHFTP | RSHFTP SREG | RIGHT SHIFT (PRELIMINARY) THE CONTENTS OF SREG BY ONE POSITION. REFER TO FIG.6-60 FOR MORE INFORMATION. |

FIG. 6-51-3

| SCALAR ENGINE DATA OPERATION INSTRUCTIONS | | |
|---|---|---|
| INSTRUCTION | SYNTAX | OPERATION |
| SAT | SAT SREG | SATURATE THE CONTENTS OF SREG BASED ON THE STATE OF THE SATURATION DIRECTION (SD) AND OVERFLOW BITS (SV) IN THE SPCR. IF THE PREVIOUS RESULT OVERFLOWED THEN THE SATURATION OPERATION WILL OCCUR. OTHERWISE NO CHANGE WILL BE MADE. THE SATURATION DIRECTION BIT WILL DETERMINE THE VALUE THAT SREG SATURATED TO. |
| SUB | SUB $SREG_S$, $SREG_D$ | SUBTRACT THE CONTENT OF $SREG_S$ FROM THE CONTENTS OF $SREG_D$ AND STORE THE RESULTS IN $SREG_D$. THE RESULTS OF THIS INSTRUCTION WILL SATURATE AND ARE DEPENDENT ON THE SSGN CONTROL BIT. |
| SUBP | SUBP $SREG_S$, $SREG_D$ | SUBTRACT (PRELIMINARY) THE CONTENT OF $SREG_S$ FROM THE CONTENTS OF $SREG_D$, AND STORE THE RESULTS IN $SREG_D$. THE RESULTS OF THIS INSTRUCTION WILL NOT SATURATE. |
| SUBSX | ADDSX SREG | SUBTRACT SIGN EXTENSION FROM SREG AND STORE THE RESULT IN SREG. THIS INSTRUCTION IS USED FOR SUBTRACTING ANY BORROW INFORMATION (WITH SIGN EXTENSION) INTO A MULTI-BYTE SUBTRACTION. THE RESULTS OF THIS INSTRUCTION WILL SATURATE. |
| SUBSXP | SUBSXP SREG | SUBTRACT (PRELIMINARY) SIGN EXTENSION FROM SREG AND STORE THE RESULT IN SREG. THIS INSTRUCTION IS USED FOR SUBTRACTING ANY BORROW INFORMATION (WITH SIGN EXTENSION) INTO A MULTI-BYTE SUBTRACTION. THE RESULTS OF THIS INSTRUCTION WILL NOT SATURATE. |
| XOR | XOR $SREG_S$, $SREG_D$ | LOGICALLY EXCLUSIVE-OR THE CONTENTS OF $SREG_S$ TO THE CONTENTS OF $SREG_D$ AND STORE THE RESULTS INTO $SREG_D$. |

| SCALAR ENGINE PROGRAM FLOW CONTROL OPERATION INSTRUCTIONS | | |
|---|---|---|
| INSTRUCTION | SYNTAX | OPERATION |
| BRA | BRA #S | BRANCH PC-RELATIVE TO NEXT INSTRUCTION. |
| BSR | BSR #S | BRANCH PC-RELATIVE TO SUBROUTINE. THE CURRENT PC IS SAVED ON THE STACK AND THE NEW INSTRUCTION ADDRESS IS USED. |
| DSKIP | DSKIP SREG | DECREMENT THE CONTENTS OF SREG AND SKIP NEXT INSTRUCTION IF SREG IS $FF. |
| DSKIPE | DSKIPE SREG | DECREMENT THE CONTENTS OF SREG AND SKIP NEXT INSTRUCTION IF SREG IS $FF. ADDITIONALLY PERFORM THE SAME FUNCTION AS AN VENDIF INSTRUCTION WOULD AT THE END OF EACH ITERATION IN THE LOOP. |
| JMPMI | JMPMI (#U) | JUMP MEMORY INDIRECT. JUMP TO THE INSTRUCTION WHOSE ADDRESS IS CONTAINED IN THE MEMORY LOCATION SPECIFIED BY [#U:#U+1]. #U REFERENCES THE MSB OF THE ADDRESS PAIR IN THE CMA. #U+1 REFERENCES THE LSB OF THE ADDRESS PAIR. THIS UNSIGNED 7-BIT NUMBER CAN BE EVEN OR ODD. THUS A MEMORY INDIRECT "JUMP TABLE" MUST EXIST IN THE FIRST 128 BYTES OF THE CMA. |
| JMPRI | JMPRI SREG | JUMP REGISTER INDIRECT. THE CONTENTS OF THE REGISTER PAIR SPECIFIED BY SREG(I.E. [SREG:SREG+1]) IS LOADED INTO THE PC. SREG MUST BE AN EVEN REGISTER (G0, G2, G4, G6, P0, P2, P4, P6). |
| JSRMI | JSRMI (#U) | JUMP TO SUBROUTINE MEMORY INDIRECT. JUMP TO THE INSTRUCTION WHOSE ADDRESS IS CONTAINED IN THE MEMORY LOCATION SPECIFIED BY [#U:#U+1]. #U REFERENCES THE MSB OF THE ADDRESS PAIR IN THE CMA. #U+1 REFERENCES THE LSB OF THE ADDRESS PAIR. THE CURRENT PC IS SAVED ON THE STACK AND THE NEW INSTRUCTION ADDRESS IS USED. THIS UNSIGNED 7-BIT NUMBER CAN BE EVEN OR ODD. THUS A MEMORY INDIRECT "JUMP TABLE" MUST EXIST IN THE FIRST 128 BYTES OF THE CMA. |
| JSRRI | JSRRI SREG | JUMP REGISTER INDIRECT. THE CURRENT PC IS SAVED ON THE STACK AND THE CONTENTS OF THE REGISTER PAIR SPECIFIED BY SREG(I.E. [SREG:SREG+1]) IS LOADED INTO THE PC. SREG MUST BE AN EVEN REGISTER (G0, G2, G4, G6, P0, P2, P4, P6). |

FIG. 6-52-2

| SCALAR ENGINE PROGRAM FLOW CONTROL OPERATION INSTRUCTIONS | | |
|---|---|---|
| INSTRUCTION | SYNTAX | OPERATION |
| REPEAT | REPEAT #U, SREG* | REPEAT THE NEXT #U INSTRUCTIONS SREG NUMBER OF TIMES. THE SREG REGISTER CONTENTS ARE USED AS THE LOOP COUNT FOR THE REPEAT INSTRUCTION. THE REPEAT INSTRUCTION DOES NOT MODIFY THE CONTENTS OF SREG. UPON EXECUTION OF THE REPEAT INSTRUCTION THE CONTENTS OF SREG ARE TRANSFERRED TO THE RCR REGISTER. THE CONTENTS OF SREG IS INTERPRETED AS AN UNSIGNED VALUE. IF THE VALUE IS ZERO THE REPEAT INSTRUCTION WILL CAUSE THE NEXT #U INSTRUCTION TO BE SKIPPED. * - SREG IS LIMITED TO THE G REGISTERS |
| REPEATE | REPEATE #U, SREG* | REPEAT THE NEXT #U INSTRUCTIONS SREG NUMBER OF TIMES WITH AN IMPLICIT VENDIF AT THE END OF EACH ITERATION. THE CONTENTS OF SREG ARE USED AS THE LOOP AS THEY ARE FOR THE REPEAT INSTRUCTION. * - SREG IS LIMITED TO THE G REGISTERS |
| RETURN | RETURN | RETURN FROM SUBROUTINE. PLACE THE TOP TWO BYTES ON THE STACK (POINTED TO BY SP) INTO THE PC REGISTER. |
| RTE | RTE | RETURN FROM EXCEPTION. RETURN TO THE INSTRUCTION FOLLOWING THE INSTRUCTION THAT CAUSED THE EXCEPTION. NOTE THAT FOR EXCEPTION CAUSED WHILE THE AE IS IN A DONE OR HALT STATE, THE AE RETURNS TO THAT STATE UNTIL THE R/$\overline{S}$ LINE TOGGLED. |
| SKIPEQ | SKIPEQ $SREG_S$, $SREG_D$ | SKIP THE NEXT INSTRUCTION IF $SREG_S$ AND $SREG_D$ ARE EQUAL. |
| SKIPGE | SKIPGE $SREG_S$, $SREG_D$ | SKIP THE NEXT INSTRUCTION IF $SREG_S$ IS GREATER THAN OR EQUAL TO $SREG_D$. |
| SKIPGT | SKIPGT $SREG_S$, $SREG_D$ | SKIP THE NEXT INSTRUCTION IF $SREG_S$ IS GREATER THAN $SREG_D$. |
| SKIPLE | SKIPLE $SREG_S$, $SREG_D$ | SKIP THE NEXT INSTRUCTION IF $SREG_S$ IS LESSER THAN OR EQUAL TO $SREG_D$. |
| SKIPLT | SKIPLT $SREG_S$, $SREG_D$ | SKIP THE NEXT INSTRUCTION IF $SREG_S$ IS LESSER THAN $SREG_D$. |
| SKIPNE | SKIPNE $SREG_S$, $SREG_D$ | SKIP THE NEXT INSTRUCTION IF $SREG_S$ AND $SREG_D$ ARE NOT EQUAL. |
| SKIPNV | SKIPNV | SKIP THE NEXT INSTRUCTION IF THE OVERFLOW BIT IS CLEAR. |
| SKIPNVT | SKIPNVT | SKIP THE NEXT INSTRUCTION IF ANY OF THE VPCR: VT BITS IN THE VECTOR ENGINE ARE CLEAR. |
| SKIPV | SKIPV | SKIP THE NEXT INSTRUCTION IF THE OVERFLOW BIT IS SET. |

| EXTENSION BIT DESCRIPTION FOR ADD PRELIMINARY (ADDP, VADDP) | | | |
|---|---|---|---|
| xX1 | xX0 | INPUT TO OPERATION | RESULT OF OPERATION |
| 0 | 0 | NO CARRY INTO ADDITION. SIGN BIT OF THE SOURCE OPERAND IS 0. | NO CARRY FROM THE ADDITION WAS GENERATED. SIGN BIT OF THE SOURCE OPERAND IS 0. |
| 0 | 1 | A CARRY INTO THIS BYTE WAS GENERATED. SIGN BIT OF THE SOURCE OPERAND IS 0. | A CARRY WAS GENERATED AS A RESULT OF THE ADDITION. SIGN BIT OF THE SOURCE OPERAND IS 0. |
| 1 | 0 | NO CARRY INTO ADDITION. SIGN BIT OF THE SOURCE OPERAND IS 1. | NO CARRY FROM THE ADDITION WAS GENERATED. SIGN BIT OF THE SOURCE OPERAND IS 1. |
| 1 | 1 | A CARRY INTO THIS BYTE WAS GENERATED. SIGN BIT OF THE SOURCE OPERAND IS 1. | A CARRY WAS GENERATED AS A RESULT OF THE ADDITION. SIGN BIT OF THE SOURCE OPERAND IS 1. |

*FIG. 6-53*

| EXTENSION BIT DESCRIPTION FOR SIGN EXTENTED ADD PRELIMINARY | | | |
|---|---|---|---|
| xX1 | xX0 | INPUT TO OPERATION | RESULT OF OPERATION |
| 0 | 0 | NO CARRY INTO ADDITION. SIGN EXTEND THE SOURCE OPERAND BY 0. | NO CARRY FROM THE ADDITION WAS GENERATED. THE xX1 BIT IS NOT ALTERED. |
| 0 | 1 | A CARRY INTO THIS BYTE WAS GENERATED. SIGN EXTEND THE SOURCE OPERAND BY 0. | A CARRY WAS GENERATED AS A RESULT OF THE ADDITION. THE xX1 BIT IS NOT ALTERED. |
| 1 | 0 | NO CARRY INTO ADDITION. SIGN EXTEND THE SOURCE OPERAND BY 1. | NO CARRY FROM THE ADDITION WAS GENERATED. THE xX1 BIT IS NOT ALTERED. |
| 1 | 1 | A CARRY INTO THIS BYTE WAS GENERATED. SIGN EXTEND THE SOURCE OPERAND BY 1. | A CARRY WAS GENERATED AS A RESULT OF THE ADDITION. THE xX1 BIT IS NOT ALTERED. |

*FIG. 6-54*

| EXTENSION BIT DESCRIPTION FOR SUB PRELIMINARY (SUBP, VSUBP) | | | |
|---|---|---|---|
| xX1 | xX0 | INPUT TO OPERATION | RESULT OF OPERATION |
| 0 | 0 | NO BORROW INTO SUBTRACTION. SIGN BIT OF THE SOURCE OPERAND IS 0. | NO BORROW FROM THE SUBTRACTION WAS GENERATED. SIGN BIT OF THE SOURCE OPERAND IS 0. |
| 0 | 1 | A BORROW FROM THIS BYTE WAS GENERATED. SIGN BIT OF THE SOURCE OPERAND IS 0. | A BORROW WAS GENERATED AS A RESULT OF THE SUBTRACTION. SIGN BIT OF THE SOURCE OPERAND IS 0. |
| 1 | 0 | NO BORROW INTO SUBTRACTION. SIGN BIT OF THE SOURCE OPERAND IS 1. | NO BORROW FROM THE SUBTRACTION WAS GENERATED. SIGN BIT OF THE SOURCE OPERAND IS 1. |
| 1 | 1 | A BORROW INTO THIS BYTE WAS GENERATED. SIGN BIT OF THE SOURCE OPERAND IS 1. | A BORROW WAS GENERATED AS A RESULT OF THE SUBTRACTION. SIGN BIT OF THE SOURCE OPERAND IS 1. |

*FIG. 6-55*

| EXTENSION BIT DESCRIPTION FOR SIGN EXTENTED SUBTRACTION PRELIMINARY | | | |
|---|---|---|---|
| xX1 | xX0 | INPUT TO OPERATION | RESULT OF OPERATION |
| 0 | 0 | NO BORROW FROM SUBTRACTION. SIGN EXTEND THE SOURCE OPERAND BY 0. | NO BORROW FROM THE SUBTRACTION WAS GENERATED. THE xX1 BIT IS NOT ALTERED. |
| 0 | 1 | A BORROW FROM THIS BYTE WAS GENERATED. SIGN EXTEND THE SOURCE OPERAND BY 0. | A BORROW WAS GENERATED AS A RESULT OF THE SUBTRACTION. THE xX1 BIT IS NOT ALTERED. |
| 1 | 0 | NO BORROW FROM SUBTRACTION. SIGN EXTEND THE SOURCE OPERAND BY 1. | NO BORROW FROM THE SUBTRACTION WAS GENERATED. THE xX1 BIT IS NOT ALTERED. |
| 1 | 1 | A BORROW FROM THIS BYTE WAS GENERATED. SIGN EXTEND THE SOURCE OPERAND BY 1. | A BORROW WAS GENERATED AS A RESULT OF THE SUBTRACTION. THE xX1 BIT IS NOT ALTERED. |

*FIG. 6-56*

| EXTENSION BIT DESCRIPTION FOR COMPARE PRELIMINARY (COMPP, VCOMPP) | | | |
|---|---|---|---|
| xX1 | xX0 | INPUT TO OPERATION | RESULT OF OPERATION |
| 0 | 0 | NULL. PERFORM COMPARE OPERATION, ASSUMING THAT THIS IS THE MOST SIGNIFICANT BYTE OF A MULTI-BYTE OPERATION. | N/A |
| 0 | 1 | PREVIOUS OPERATION RESULTED IN VREG1 < VREG2. EXTENSION BITS ARE NOT CHANGED. | VREG1 < VREG2 |
| 1 | 0 | PREVIOUS OPERATION RESULTED IN VREG1 > VREG2. EXTENSION BITS ARE NOT CHANGED. | VREG1 > VREG2 |
| 1 | 1 | PREVIOUS COMPARE RESULTED IN EQUAL VALUES. CONTINUE TO COMPARE BYTES. | VREG1 == VREG2 |

*FIG. 6-57*

| EXTENSION BIT DESCRIPTION FOR MAXIMUM PRELIMINARY (MAXP, VMAXP) | | | |
|---|---|---|---|
| xX1 | xX0 | INPUT TO OPERATION | RESULT OF OPERATION |
| 0 | 0 | NULL. PERFORM COMPARE OPERATION, ASSUMING THAT THIS IS THE MOST SIGNIFICANT BYTE OF A MULTI-BYTE OPERATION. | xX1:xX0 == 00 IS NOT POSSIBLE RESULT OF A MAXP OR VMAXP INSTRUCTION. |
| 0 | 1 | PREVIOUS OPERATION RESULTED IN VREG1 < VREG2. EXTENSION BITS ARE NOT CHANGED. | VREG1 < VREG2; VREG2 REMAINS UNCHANGED. |
| 1 | 0 | PREVIOUS OPERATION RESULTED IN VREG1 > VREG2. EXTENSION BITS ARE NOT CHANGED. | VREG1 > VREG2; MOVE THE VREG1 OPERAND TO VREG2. |
| 1 | 1 | PREVIOUS COMPARE RESULTED IN EQUAL VALUES. CONTINUE TO COMPARE BYTES. | VREG1 == VREG2; VREG2 REMAINS UNCHANGED. |

| EXTENSION BIT DESCRIPTION FOR MINIMUM PRELIMINARY (MINP, VMINP) | | | |
|---|---|---|---|
| xX1 | xX0 | INPUT TO OPERATION | RESULT OF OPERATION |
| 0 | 0 | PERFORM COMPARE OPERATION, ASSUMING THAT THIS IS THE MOST SIGNIFICANT BYTE OF A MULTI-BYTE OPERATION. | xX1:xX0 == 00 IS NOT POSSIBLE RESULT OF A MINP OR VMINP INSTRUCTION. |
| 0 | 1 | PREVIOUS OPERATION RESULTED IN VREG1 < VREG2. EXTENSION BITS ARE NOT CHANGED. | VREG1 < VREG2; MOVE THE VREG1 OPERAND TO VREG2. |
| 1 | 0 | PREVIOUS OPERATION RESULTED IN VREG1 > VREG2. EXTENSION BITS ARE NOT CHANGED. | VREG1 > VREG2; VREG2 REMAINS UNCHANGED. |
| 1 | 1 | PREVIOUS COMPARE RESULTED IN EQUAL VALUES. CONTINUE TO COMPARE BYTES. | VREG1 == VREG2; VREG2 REMAINS UNCHANGED. |

FIG. 6-60

| EXTENSION BIT DESCRIPTION FOR RIGHT SHIFT PRELIMINARY | | | |
|---|---|---|---|
| xX1 | xX0 | INPUT TO OPERATION | RESULT OF OPERATION |
| 0 | 0 | xX1=0 IMPLIES THAT THIS IS THE MOST SIGNIFICANT BYTE OF A MULTI-BYTE SHIFT OPERATION AND xX0 IS IGNORED. IF THE xSGN BIT IS A 1(UNSIGNED), RIGHT SHIFT A 0 INTO THE MOST SIGNIFICANT BIT POSITION. IF THE xSGN IS A 0 (SIGNED), THEN SHIFT IN THE MSBIT (RIGHT SHIFT WITH SIGN EXTENSION). | N/A – RIGHT SHIFT PRELIMINARY WILL NOT GENERATE THIS xX1:xX0 COMBINATION AS AN OUTPUT. |
| 0 | 1 | xX1=0 IMPLIES THAT THIS IS THE MOST SIGNIFICANT BYTE OF A MULTI-BYTE SHIFT OPERATION AND xX0 IS IGNORED. IF THE xSGN BIT IS A 1(UNSIGNED), RIGHT SHIFT A 0 INTO THE MOST SIGNIFICANT BIT POSITION. IF THE xSGN IS A 0 (SIGNED), THEN SHIFT IN THE MSBIT (RIGHT SHIFT WITH SIGN EXTENSION). | N/A – RIGHT SHIFT PRELIMINARY WILL NOT GENERATE THIS xX1:xX0 COMBINATION AS AN OUTPUT. |
| 1 | 0 | RIGHT SHIFT A LOGICAL 0 INTO THE MOST SIGNIFICANT BIT POSITION. | A LOGICAL 0 WAS SHIFTED OUT OF THE LEAST SIGNIFICANT BIT POSITION. |
| 1 | 1 | RIGHT SHIFT A LOGICAL 1 INTO THE MOST SIGNIFICANT BIT POSITION. | A LOGICAL 1 WAS SHIFTED OUT OF THE LEAST SIGNIFICANT BIT POSITION. |

| EXTENSION BIT DESCRIPTION FOR NEGATE PRELIMINARY | | | |
|---|---|---|---|
| xX1 | xX0 | INPUT TO OPERATION | RESULT OF OPERATION |
| 0 | 0 | NO BORROW INTO NEGATION.<br>xX1 - DON'T CARE | N/A |
| 0 | 1 | A BORROW FROM THIS BYTE WAS GENERATED.<br>xX1 - DON'T CARE | N/A |
| 1 | 0 | NO BORROW INTO NEGATION.<br>xX1 - DON'T CARE | NO BORROW FROM THE NEGATION WAS GENERATED.<br>xX1 = 1; |
| 1 | 1 | A BORROW FROM THIS BYTE WAS GENERATED.<br>xX1 - DON'T CARE | A BORROW WAS GENERATED AS A RESULT OF THE NEGATION.<br>xX1 = 1; |

FIG. 6-61

| EXTENSION BIT DESCRIPTION FOR INCREMENT PRELIMINARY (INCP) | | | |
|---|---|---|---|
| SX1 | SX0 | INPUT TO OPERATION | RESULT OF OPERATION |
| 0 | 0 | NO CARRY INTO ADDITION.<br>SX1 - DON'T CARE. | NO CARRY FROM THE ADDITION WAS GENERATED.<br>SIGN BIT OF THE SOURCE OPERAND IS 0. |
| 0 | 1 | A CARRY INTO THIS BYTE WAS GENERATED.<br>SX1 - DON'T CARE | A CARRY WAS GENERATED AS A RESULT OF THE ADDITION.<br>SIGN BIT OF THE SOURCE OPERAND IS 0. |
| 1 | 0 | NO CARRY INTO ADDITION.<br>SX1 - DON'T CARE. | N/A |
| 1 | 1 | A CARRY INTO THIS BYTE WAS GENERATED.<br>SX1 - DON'T CARE | N/A |

FIG. 6-62

| EXTENSION BIT DESCRIPTION FOR DECREMENT PRELIMINARY (DECP) | | | |
|---|---|---|---|
| xX1 | xX0 | INPUT TO OPERATION | RESULT OF OPERATION |
| 0 | 0 | NO BORROW INTO SUBTRACTION. SX1 - DON'T CARE. | N/A |
| 0 | 1 | A BORROW INTO THIS BYTE WAS GENERATED. SX1 - DON'T CARE | N/A |
| 1 | 0 | NO BORROW INTO SUBTRACTION. SX1 - DON'T CARE. | NO BORROW FROM THE SUBTRACTION WAS GENERATED. SIGN BIT OF THE SOURCE OPERAND IS 1. |
| 1 | 1 | A BORROW FROM THIS BYTE WAS GENERATED. SX1 - DON'T CARE | A BORROW WAS GENERATED AS A RESULT OF THE SUBTRACTION. SIGN BIT OF THE SOURCE OPERAND IS 1. |

FIG. 6-63

| PROCESS CONTROL BIT SUMMARY BY INSTRUCTION | | | | | | | | | | |
|---|---|---|---|---|---|---|---|---|---|---|
| INSTRUCTION | VX [1:0] | SX [1:0] | VT | VH | VID | VV | SV | VD | SD | SPECIAL DEFINITION |
| ABS | 00 | 00 | – | – | – | 0 | ‡ | 0 | ‡ | ‡SV=CIN[7] ^ COUT[7]; ‡SD=SV |
| ADD | 00 | 00 | – | – | – | 0 | # | 0 | ‡ | ‡SD=1 FOR POSITIVE OVERFLOW, ‡SD=0 FOR NEGATIVE OVERFLOW. |
| ADDP | 00 | †† | – | – | – | 0 | # | 0 | ‡ | †PLEASE SEE FIG.6-53 ‡SD=1 FOR POSITIVE OVERFLOW, ‡SD=0 FOR NEGATIVE OVERFLOW. |
| ADDSX | 00 | 00 | – | – | – | 0 | # | 0 | ‡ | ‡SD=1 FOR POSITIVE OVERFLOW, ‡SD=0 FOR NEGATIVE OVERFLOW. |
| ADDSXP | 00 | †† | – | – | – | 0 | # | 0 | ‡ | †PLEASE SEE FIG.6-54 ‡SD=1 FOR POSITIVE OVERFLOW, ‡SD=0 FOR NEGATIVE OVERFLOW. |
| AND | 00 | 00 | – | – | – | 0 | 0 | 0 | 0 | |
| BCNT | 00 | 00 | – | – | – | 0 | 0 | 0 | 0 | |
| BRA | 00 | 00 | – | – | – | 0 | 0 | 0 | 0 | |

| PROCESS CONTROL BIT SUMMARY BY INSTRUCTION | | | | | | | | | | |
|---|---|---|---|---|---|---|---|---|---|---|
| INSTRUCTION | VX [1:0] | SX [1:0] | VT | VH | VID | VV | SV | VD | SD | SPECIAL DEFINITION |
| BSR | 00 | 00 | – | – | – | 0 | 0 | 0 | 0 | |
| CLEARV | 00 | 00 | – | – | 0 | 0 | 0 | 0 | 0 | |
| COLMAX | 00 | 00 | ‡ | – | – | 0 | – | 0 | 0 | ‡IF MAX VT=1 ELSE VT=0 |
| COLMIN | 00 | 00 | ‡ | – | – | 0 | – | 0 | 0 | ‡IF MIN VT=1 ELSE VT=0 |
| COMPP | 00 | †† | – | – | – | 0 | 0 | 0 | 0 | †PLEASE SEE FIG.6-57 |
| DADD | 00 | 00 | – | – | – | # | 0 | ‡ | 0 | ‡VD=1 FOR POSITIVE OVERFLOW, ‡VD=0 FOR NEGATIVE OVERFLOW. |
| DADDP | †† | 00 | – | – | – | # | 0 | ‡ | 0 | †PLEASE SEE FIG.6-53 ‡VD=1 FOR POSITIVE OVERFLOW, ‡VD=0 FOR NEGATIVE OVERFLOW. |
| DEC | 00 | 00 | – | – | – | 0 | 0 | 0 | 0 | |
| DECP | 00 | 1† | – | – | – | 0 | 0 | 0 | 0 | †PLEASE SEE FIG.6-55 |
| DECSP | 00 | 00 | – | – | – | 0 | 0 | 0 | 0 | |
| DIV | 00 | 00 | – | – | – | 0 | ‡ | 0 | 0 | ‡DIVIDE BY ZERO SETS OVERFLOW |
| DMAX | 00 | 00 | – | – | – | 0 | 0 | 0 | 0 | |
| DMAXP | †† | 00 | – | – | – | 0 | 0 | 0 | 0 | †PLEASE SEE FIG.6-58 |
| DMIN | 00 | 00 | – | – | – | 0 | 0 | 0 | 0 | |
| DMINP | †† | 00 | – | – | – | 0 | 0 | 0 | 0 | †PLEASE SEE FIG.6-59 |
| DONE | – | – | – | – | 0 | – | – | – | – | |
| DROTMOV | 00 | 00 | – | – | – | 0 | 0 | 0 | 0 | |
| DSKIP | 00 | 00 | – | – | – | 0 | 0 | 0 | 0 | |
| DSKIPE | 00 | 00 | 1 | 0 | – | 0 | 0 | 0 | 0 | |
| DSROT | 00 | 00 | – | – | – | 0 | 0 | 0 | 0 | |
| GET | 00 | 00 | – | – | – | 0 | 0 | 0 | 0 | |
| GETPE | 00 | 00 | – | – | – | 0 | ‡ | 0 | 0 | ‡SV IS SET IF ALL 64 VT==0 |
| HALT | – | – | – | – | – | – | – | – | – | |
| ILLEGAL | – | – | – | – | – | – | – | – | – | |
| INC | 00 | 00 | – | – | – | 0 | 0 | 0 | 0 | |
| INCP | 00 | 0† | – | – | – | 0 | 0 | 0 | 0 | †PLEASE SEE FIG.6-53 |

FIG. 6-64-3

| PROCESS CONTROL BIT SUMMARY BY INSTRUCTION | | | | | | | | | | |
|---|---|---|---|---|---|---|---|---|---|---|
| INSTRUCTION | VX [1:0] | SX [1:0] | VT | VH | VID | VV | SV | VD | SD | SPECIAL DEFINITION |
| INCSP | 00 | 00 | – | – | – | 0 | 0 | 0 | 0 | |
| INTR | 00 | 00 | – | – | – | 0 | 0 | 0 | 0 | |
| JMPMI | 00 | 00 | – | – | – | 0 | 0 | 0 | 0 | |
| JMPRI | 00 | 00 | – | – | – | 0 | 0 | 0 | 0 | |
| JSRMI | 00 | 00 | – | – | – | 0 | 0 | 0 | 0 | |
| JSRRI | 00 | 00 | – | – | – | 0 | 0 | 0 | 0 | |
| LOADA | 00 | 00 | – | – | – | 0 | 0 | 0 | 0 | |
| LOADR | 00 | 00 | – | – | – | 0 | 0 | 0 | 0 | |
| LOCMAX | 00 | 00 | ‡ | – | – | 0 | 0 | 0 | 0 | ‡IF MAX VT=1 ELSE VT=0 |
| LOCMIN | 00 | 00 | ‡ | – | – | 0 | 0 | 0 | 0 | ‡IF MIN VT=1 ELSE VT=0 |
| LSHFT | 00 | 00 | – | – | – | 0 | 0 | 0 | 0 | |
| MAX | 00 | 00 | – | – | – | 0 | 0 | 0 | 0 | |
| MAXP | 00 | †† | – | – | – | 0 | 0 | 0 | 0 | †PLEASE SEE FIG.6-58 |
| MIN | 00 | 00 | – | – | – | 0 | 0 | 0 | 0 | |
| MINP | 00 | †† | – | – | – | 0 | 0 | 0 | 0 | †PLEASE SEE FIG.6-59 |
| MOV | 00 | 00 | – | – | – | 0 | 0 | 0 | 0 | |
| MOVI | 00 | 00 | – | – | – | 0 | 0 | 0 | 0 | |
| MOVCI | 00 | 00 | – | – | – | 0 | 0 | 0 | 0 | |
| MOVFC | 00 | 00 | – | – | – | 0 | 0 | 0 | 0 | |
| MOVTC | 00 | 00 | – | – | – | 0 | 0 | 0 | 0 | |
| MOVFSP | 00 | 00 | – | – | – | 0 | 0 | 0 | 0 | |
| MOVTSP | 00 | 00 | – | – | – | 0 | 0 | 0 | 0 | |
| MUL | 00 | 00 | – | – | – | 0 | 0 | 0 | 0 | |
| NEG | 00 | 00 | – | – | – | 0 | ‡ | 0 | ‡ | ‡NEG OF −128 GENERATES SV=1 AND SD=1 |
| NEGP | 00 | 1† | – | – | – | 0 | 0 | 0 | 0 | †PLEASE SEE FIG.6-61 |
| NOP | 00 | 00 | – | – | – | 0 | 0 | 0 | 0 | |
| NOT | 00 | 00 | – | – | – | 0 | 0 | 0 | 0 | |
| OR | 00 | 00 | – | – | – | 0 | 0 | 0 | 0 | |

FIG. 6-64-4

PROCESS CONTROL BIT SUMMARY BY INSTRUCTION

| INSTRUCTION | VX [1:0] | SX [1:0] | VT | VH | VID | VV | SV | VD | SD | SPECIAL DEFINITION |
|---|---|---|---|---|---|---|---|---|---|---|
| POP | 00 | 00 | – | – | – | 0 | 0 | 0 | 0 | |
| PUSH | 00 | 00 | – | – | – | 0 | 0 | 0 | 0 | |
| PUT | 00 | 00 | – | – | – | 0 | 0 | 0 | 0 | |
| RAND | 00 | 00 | – | – | – | 0 | 0 | 0 | 0 | |
| REPEAT | 00 | 00 | – | – | – | 0 | 0 | 0 | 0 | |
| REPEATE | 00 | 00 | – | – | – | 0 | 0 | 0 | 0 | |
| RESTART | 00 | 00 | 1 | 0 | 0 | 0 | 0 | 0 | 0 | |
| RETURN | 00 | 00 | – | – | – | 0 | 0 | 0 | 0 | |
| ROWMAX | 00 | 00 | ‡ | – | – | 0 | 0 | 0 | 0 | ‡IF MAX VT=1 ELSE VT=0 |
| ROWMIN | 00 | 00 | ‡ | – | – | 0 | 0 | 0 | 0 | ‡IF MIN VT=1 ELSE VT=0 |
| RTE | – | – | – | – | – | – | – | – | – | |
| RSHFT | 00 | 00 | – | – | – | 0 | 0 | 0 | 0 | |
| RSHFTP | 00 | 1† | – | – | – | 0 | 0 | 0 | 0 | †PLEASE SEE FIG.6-60 |
| SAT | 00 | – | – | – | – | 0 | – | 0 | – | |
| SETV | 00 | 00 | – | – | 1 | 0 | 0 | 0 | 0 | |
| SKIPEQ | 00 | 00 | – | – | – | 0 | 0 | 0 | 0 | |
| SKIPGE | 00 | 00 | – | – | – | 0 | 0 | 0 | 0 | |
| SKIPGT | 00 | 00 | – | – | – | 0 | 0 | 0 | 0 | |
| SKIPLE | 00 | 00 | – | – | – | 0 | 0 | 0 | 0 | |
| SKIPLT | 00 | 00 | – | – | – | 0 | 0 | 0 | 0 | |
| SKIPNE | 00 | 00 | – | – | – | 0 | 0 | 0 | 0 | |
| SKIPNV | 00 | 00 | – | – | – | 0 | 0 | 0 | 0 | |
| SKIPNVT | 00 | 00 | – | – | – | 0 | 0 | 0 | 0 | |
| SKIPV | 00 | 00 | – | – | – | 0 | 0 | 0 | 0 | |
| STOREA | 00 | 00 | – | – | – | 0 | 0 | 0 | 0 | |
| STORER | 00 | 00 | – | – | – | 0 | 0 | 0 | 0 | |
| SUB | 00 | 00 | – | – | – | 0 | # | 0 | ‡ | ‡SD=0 FOR OVERFLOW |
| SUBP | 00 | †† | – | – | – | 0 | # | 0 | ‡ | †PLEASE SEE FIG.6-55<br>‡SD=0 FOR OVERFLOW |

FIG. 6-64-5

PROCESS CONTROL BIT SUMMARY BY INSTRUCTION

| INSTRUCTION | VX [1:0] | SX [1:0] | VT | VH | VID | VV | SV | VD | SD | SPECIAL DEFINITION |
|---|---|---|---|---|---|---|---|---|---|---|
| SUBSX | 00 | 00 | – | – | – | 0 | # | 0 | ‡ | ‡SD=0 FOR OVERFLOW |
| SUBSXP | 00 | †† | – | – | – | 0 | # | 0 | ‡ | †PLEASE SEE FIG.6-56<br>‡SD=0 FOR OVERFLOW |
| VABS | 00 | 00 | – | – | – | ‡ | 0 | 0 | 0 | ‡VV=1 IF $VREG1_S$=–128 |
| VADD | 00 | 00 | – | – | – | # | 0 | ‡ | 0 | ‡VD=1 FOR POSITIVE OVERFLOW,<br>‡VD=0 FOR NEGATIVE OVERFLOW. |
| VADDP | †† | 00 | – | – | – | # | 0 | ‡ | 0 | †PLEASE SEE FIG.6-53<br>‡VD=1 FOR POSITIVE OVERFLOW,<br>‡VD=0 FOR NEGATIVE OVERFLOW. |
| VADDSX | 00 | 00 | – | – | – | # | 0 | ‡ | 0 | ‡VD=1 FOR POSITIVE OVERFLOW,<br>‡VD=0 FOR NEGATIVE OVERFLOW. |
| VADDSXP | †† | 00 | – | – | – | # | 0 | ‡ | 0 | †PLEASE SEE FIG.6-54<br>‡VD=1 FOR POSITIVE OVERFLOW,<br>‡VD=0 FOR NEGATIVE OVERFLOW. |
| VAND | 00 | 00 | – | – | – | 0 | 0 | 0 | 0 | |
| VBCNT | 00 | 00 | – | – | – | 0 | 0 | 0 | 0 | |
| VCOMPP | †† | 00 | – | – | – | 0 | 0 | 0 | 0 | †PLEASE SEE FIG.6-57 |
| VDIV | 00 | 00 | – | – | – | ‡ | 0 | 0 | 0 | ‡DIVIDE BY ZERO SETS OVERFLOW |
| VELSE | 00 | 00 | ‡ | ‡ | – | 0 | 0 | 0 | 0 | ‡SEE SECTION 2.5.13.1 EFFECT OF CONDITIONAL INSTRUCTIONS ON THE VT AND VH BITS FOR MORE INFORMATION |
| VENDIF | 00 | 00 | 1 | 0 | – | 0 | 0 | 0 | 0 | |
| VIFEQ | 00 | 00 | ‡ | – | – | 0 | 0 | 0 | 0 | ‡IF TRUE VT=1 ELSE VT=0 |
| VIFGE | 00 | 00 | ‡ | – | – | 0 | 0 | 0 | 0 | ‡IF TRUE VT=1 ELSE VT=0 |
| VIFGT | 00 | 00 | ‡ | – | – | 0 | 0 | 0 | 0 | ‡IF TRUE VT=1 ELSE VT=0 |
| VIFLE | 00 | 00 | ‡ | – | – | 0 | 0 | 0 | 0 | ‡IF TRUE VT=1 ELSE VT=0 |
| VIFLT | 00 | 00 | ‡ | – | – | 0 | 0 | 0 | 0 | ‡IF TRUE VT=1 ELSE VT=0 |
| VIFNE | 00 | 00 | ‡ | – | – | 0 | 0 | 0 | 0 | ‡IF TRUE VT=1 ELSE VT=0 |
| VIFNV | 00 | 00 | ‡ | – | – | 0 | 0 | 0 | 0 | ‡IF TRUE VT=1 ELSE VT=0 |
| VIFV | 00 | 00 | ‡ | – | – | 0 | 0 | 0 | 0 | ‡IF TRUE VT=1 ELSE VT=0 |
| VLSHFT | 00 | 00 | – | – | – | 0 | 0 | 0 | 0 | |

FIG.6-64-6

| PROCESS CONTROL BIT SUMMARY BY INSTRUCTION | | | | | | | | | | |
|---|---|---|---|---|---|---|---|---|---|---|
| INSTRUCTION | VX [1:0] | SX [1:0] | VT | VH | VID | VV | SV | VD | SD | SPECIAL DEFINITION |
| VLSHFTH | 00 | 00 | – | ‡ | – | 0 | 0 | 0 | 0 | ‡VH->LSB OF VREG |
| VLSHFTT | 00 | 00 | ‡ | – | – | 0 | 0 | 0 | 0 | ‡VT->LSB OF VREG |
| VLSHFTV | 00 | 00 | – | – | ‡ | 0 | 0 | 0 | 0 | ‡VID->LSB OF VREG |
| VMAX | 00 | 00 | – | – | – | 0 | 0 | 0 | 0 | |
| VMAXP | †† | 00 | – | – | – | 0 | 0 | 0 | 0 | †PLEASE SEE FIG.6-58 |
| VMIN | 00 | 00 | – | – | – | 0 | 0 | 0 | 0 | |
| VMINP | †† | 00 | – | – | – | 0 | 0 | 0 | 0 | †PLEASE SEE FIG.6-59 |
| VMOV | 00 | 00 | – | – | – | 0 | 0 | 0 | 0 | |
| VMOVTV | 00 | 00 | – | – | – | 0 | 0 | 0 | 0 | ‡IF VT=1 THEN VT->VID |
| VMUL | 00 | 00 | – | – | – | 0 | 0 | 0 | 0 | |
| VNEG | 00 | 00 | – | – | – | ‡ | 0 | ‡ | 0 | ‡VNEG OF –128 GENERATES VV=1 AND VD=1 |
| VNEGP | 1† | 00 | – | – | – | 0 | 0 | 0 | 0 | †PLEASE SEE FIG.6-61 |
| VOR | 00 | 00 | – | – | – | 0 | 0 | 0 | 0 | |
| VRAND | 00 | 00 | – | – | – | 0 | 0 | 0 | 0 | |
| VROTRH | 00 | 00 | – | ‡ | – | 0 | 0 | 0 | 0 | ‡LS BIT OF VREG->VH |
| VROTRT | 00 | 00 | ‡ | – | – | 0 | 0 | 0 | 0 | ‡LS BIT OF VREG->VT |
| VROTRV | 00 | 00 | – | – | ‡ | 0 | 0 | 0 | 0 | ‡LS BIT OF VREG->VID |
| VRSHFT | 00 | 00 | – | – | – | 0 | 0 | 0 | 0 | |
| VRSHFTP | 1† | 00 | – | – | – | 0 | 0 | 0 | 0 | †PLEASE SEE FIG.6-60 |
| VSAT | – | 00 | – | – | – | – | 0 | – | 0 | |
| VSUB | 00 | 00 | – | – | – | # | 0 | ‡ | 0 | ‡VD=0 FOR OVERFLOW |
| VSUBP | †† | 00 | – | – | – | # | 0 | ‡ | 0 | †PLEASE SEE FIG.6-55<br>‡VD=0 FOR OVERFLOW |
| VSUBSX | 00 | 00 | – | – | – | # | 0 | ‡ | 0 | ‡VD=0 FOR OVERFLOW |
| VSUBSXP | †† | 00 | – | – | – | # | 0 | ‡ | 0 | †PLEASE SEE FIG.6.56<br>‡VD=0 FOR OVERFLOW |
| VSTORE | 00 | 00 | – | – | – | 0 | 0 | 0 | 0 | |
| VSTOREA | 00 | 00 | – | – | – | 0 | 0 | 0 | 0 | |

| PROCESS CONTROL BIT SUMMARY BY INSTRUCTION | | | | | | | | | | |
|---|---|---|---|---|---|---|---|---|---|---|
| INSTRUCTION | VX [1:0] | SX [1:0] | VT | VH | VID | VV | SV | VD | SD | SPECIAL DEFINITION |
| VSTOREI | 00 | 00 | – | – | ‡ | 0 | 0 | 0 | 0 | ‡VID=1 WHEN IDR LOCATION IS WRITTEN. |
| VWRITEE | 00 | 00 | – | – | – | 0 | 0 | 0 | 0 | |
| VWRITEL | 00 | 00 | – | – | ‡ | 0 | 0 | 0 | 0 | ‡VID=1 WHEN IDR LOCATION IS WRITTEN. |
| VWRITEN | 00 | 00 | – | – | – | 0 | 0 | 0 | 0 | |
| VWRITES | 00 | 00 | – | – | – | 0 | 0 | 0 | 0 | |
| VWRITEW | 00 | 00 | – | – | – | 0 | 0 | 0 | 0 | |
| VXOR | 00 | 00 | – | – | – | 0 | 0 | 0 | 0 | |
| WRITEE | 00 | 00 | – | – | – | 0 | 0 | 0 | 0 | |
| WRITEL | 00 | 00 | – | – | ‡ | 0 | 0 | 0 | 0 | ‡VID=1 WHEN IDR LOCATION IS WRITTEN. |
| WRITEN | 00 | 00 | – | – | – | 0 | 0 | 0 | 0 | |
| WRITES | 00 | 00 | – | – | – | 0 | 0 | 0 | 0 | |
| WRITEW | 00 | 00 | – | – | – | 0 | 0 | 0 | 0 | |
| XOR | 00 | 00 | – | – | – | 0 | 0 | 0 | 0 | |

– = NOT EFFECT
† = SEE SPECIAL DEFINITION
‡ = SEE SPECIAL DEFINITION
D = DESTINATION
S = SOURCE
R = RESULT OF THE OPERATION
& = LOGICAL AND
| = LOGICAL OR
^ = EXCLUSIVE OR
$\bar{D}$ = LOGICAL NOT D
# = OVERFLOW SET BASED ON SIGNED/UNSIGNED OPERATION. FOR SIGNED OVERFLOW = CIN[7] ^ COUT[7]. FOR UNSIGNED OVERFLOW = COUT[7].

FIG. 6-64-7

| MICROCODE INSTRUCTION DEPENDENCE ON VH, VT BITS | |
|---|---|
| INSTRUCTION | EXECUTION |
| ABS, ADD, ADDP, ADDSX, ADDSXP, AND, BCNT, BRA, BSR, COMPP, CLEARV, DEC, DECP, DECSP, DIV, DONE, DSKIP, DSKIPE, GET, GETPE, HALT, ILLEGAL, INC, INCP, INCSP, INTR, JMPMI, JMPRI, JSRMI, JSRRI, LOADA, LOADR, LSHFT, MAX, MAXP, MIN, MINP, MOV, MOVCI, MOVFC, MOVTC, MOVI, MOVFSP, MOVTSP, MUL, NEG, NEGP, NOP, NOT, OR, POP, PUSH, PUT, RAND, REPEAT, REPEATE, RESTART, RETURN, RSHFT, RSHFTP, RTE, SAT, SETV, SKIPEQ, SKIPGE, SKIPGT, SKIPLE, SKIPLT, SKIPNE, SKIPNV, SKIPNVT, SKIP, STOREA, STORER, SUB, SUBP, SUBSX, SUBSXP, VELSE, VENDIF, VLSHFTH, VLSHFTT, VROTRH, VROTRT, WRITEE, WRITEL, WRITEN, WRITES, WRITEW, XOR | THESE INSTRUCTION WILL EXECUTE INDEPENDENTLY OF THE VPCR VH OR VPCR VT BITS STATES. |

| MICROCODE INSTRUCTION DEPENDENCE ON VH, VT BITS | |
|---|---|
| INSTRUCTION | EXECUTION |
| COLMAX, COLMIN, DADD, DADDP, DMAX, DMAXP, DMIN, DMINP, DROTMOV, DSROT, LOCMAX, LOCMIN, ROWMAX, ROWMIN, VABS, VADD, VADDP, VADDSX, VADDSXP, VAND, VBCNT, VCOMPP, VDIV, VIFEQ, VIFGE, VIFGT, VIFLE, VIFLT, VIFNE, VIFNV, VIFV, VLSHFT, VLSHFTV, VMAX, VMAXP, VMIN, VMINP, VMOV, VMOVTV, VNEG, VNEGP, VOR, VRAND, VROTRV, VRSHFT, VRSHFTP, VSAT, VSUB VSUBP, VSUBSX, VSUBSXP, VSTORE, VSTOREA, VSTOREI, VWRITEE, VWRITEL, VWRITEN, VWRITES, VWRITEW, VXOR | THESE INSTRUCTION ARE DEPENDENT ON THE STATES OF THE VPCR VH OR VPCR VT BITS FOR EXECUTION. |

FIG. 6-66-1

| EXECUTION TIME SUMMARY | | |
|---|---|---|
| INSTRUCTION | MINIMUM CYCLE TIME | MAXIMUM CYCLE TIME |
| ABS | 2 | 2 |
| ADD | 1 | 1 |
| ADDP | 1 | 1 |
| ADDSX | 1 | 1 |
| ADDSXP | 1 | 1 |
| AND | 1 | 1 |
| BCNT | 1 | 1 |
| BRA | 2 | 2 |
| BSR | 2 | 3 |

FIG. 6-66-2

| EXECUTION TIME SUMMARY | | |
|---|---|---|
| INSTRUCTION | MINIMUM CYCLE TIME | MAXIMUM CYCLE TIME |
| CLEARV | 1 | 1 |
| COLMAX | 2+N | 2+N |
| COLMIN | 2+N | 2+N |
| COMPP | 1 | 1 |
| DADD | 2 | 2+M |
| DADDP | 2 | 2+M |
| DEC | 1 | 1 |
| DECP | 1 | 1 |
| DECSP | 1 | 1 |
| DIV | 20 | 20 |
| DMAX | 2 | 2+M |
| DMAXP | 2 | 2+M |
| DMIN | 2 | 2+M |
| DMINP | 2 | 2+M |
| DONE | 1 | 1 |
| DROTMOV | 1 | 1 |
| DSKIP | 2 | 2 |
| DSKIPE | 2 | 2 |
| DSROT | 1 | 1+M |
| GET | 2 | 2 |
| GETPE | 2 | 2 |
| HALT | 1 | 1 |
| ILLEGAL | 1 | 1 |
| INC | 1 | 1 |
| INCP | 1 | 1 |
| INCSP | 1 | 1 |
| INTR | 1 | 1 |
| JMPMI | 3 | 3 |
| JMPRI | 3 | 3 |
| JSRMI | 6 | 7 |
| JSRRI | 5 | 6 |
| LOADA | 3 | 3 |
| LOADR | 3 | 3 |
| LOCMAX | 2+N | 2+N |
| LOCMIN | 2+N | 2+N |

FIG. 6-66-3

| EXECUTION TIME SUMMARY | | |
|---|---|---|
| INSTRUCTION | MINIMUM CYCLE TIME | MAXIMUM CYCLE TIME |
| LSHFT | 1 | 1 |
| MAX | 1 | 1 |
| MAXP | 1 | 1 |
| MIN | 1 | 1 |
| MINP | 1 | 1 |
| MOV | 1 | 1 |
| MOVCI | 2 | 2 |
| MOVFC | 2 | 2 |
| MOVTC | 2 | 2 |
| MOVI | 2 | 2 |
| MOVFSP | 2 | 2 |
| MOVTSP | 2 | 2 |
| MUL | 6 | 6 |
| NEG | 1 | 1 |
| NEGP | 1 | 1 |
| NOP | 1 | 1 |
| NOT | 1 | 1 |
| OR | 1 | 1 |
| POP | 2 | 2 |
| PUSH | 2 | 2 |
| PUT | 2 | 2 |
| RAND | 2 | 2 |
| REPEAT | 3 | 3 |
| REPEATE | 3 | 3 |
| RESTART | 3 | 3 |
| RETURN | 2 | 3 |
| ROWMAX | 2+N | 2+N |
| ROWMIN | 2+N | 2+N |
| RTE | 2 | 3 |
| RSHFT | 1 | 1 |
| RSHFTP | 1 | 1 |
| SAT | 1 | 1 |
| SETV | 1 | 1 |
| SKIPEQ | 2 | 2 |
| SKIPGE | 2 | 2 |

FIG. 6-66-4

| EXECUTION TIME SUMMARY | | |
|---|---|---|
| INSTRUCTION | MINIMUM CYCLE TIME | MAXIMUM CYCLE TIME |
| SKIPGT | 2 | 2 |
| SKIPLE | 2 | 2 |
| SKIPLT | 2 | 2 |
| SKIPNE | 2 | 2 |
| SKIPNV | 2 | 2 |
| SKIPNVT | 2 | 2 |
| SKIPV | 2 | 2 |
| STOREA | 2 | 2 |
| STORER | 2 | 2 |
| SUB | 1 | 1 |
| SUBP | 1 | 1 |
| SUBSX | 1 | 1 |
| SUBSXP | 1 | 1 |
| VABS | 2 | 2 |
| VADD | 1 | 1 |
| VADDP | 1 | 1 |
| VADDSX | 1 | 1 |
| VADDSXP | 1 | 1 |
| VAND | 1 | 1 |
| VBCNT | 1 | 1 |
| VCOMPP | 1 | 1 |
| VDIV | 20 | 20 |
| VELSE | 1 | 1 |
| VENDIF | 1 | 1 |
| VIFEQ | 1 | 1 |
| VIFGE | 1 | 1 |
| VIFGT | 1 | 1 |
| VIFLE | 1 | 1 |
| VIFLT | 1 | 1 |
| VIFNE | 1 | 1 |
| VIFNV | 1 | 1 |
| VIFV | 1 | 1 |
| VLSHFT | 1 | 1 |
| VLSHFTH | 1 | 1 |
| VLSHFTT | 1 | 1 |

FIG. 6-66-5

| EXECUTION TIME SUMMARY | | |
|---|---|---|
| INSTRUCTION | MINIMUM CYCLE TIME | MAXIMUM CYCLE TIME |
| VMAX | 1 | 1 |
| VMAXP | 1 | 1 |
| VMIN | 1 | 1 |
| VMINP | 1 | 1 |
| VMOV | 1 | 1 |
| VMOVTV | 1 | 1 |
| VMUL | 6 | 6 |
| VNEG | 1 | 1 |
| VNEGP | 1 | 1 |
| VOR | 1 | 1 |
| VRAND | 2 | 2 |
| VROTRH | 1 | 1 |
| VROTRT | 1 | 1 |
| VRSHFT | 1 | 1 |
| VRSHFTP | 1 | 1 |
| VSAT | 1 | 1 |
| VSTORE | 2 | 2 |
| VSTOREA | 2 | 2 |
| VSTOREI | 2 | 2 |
| VSUB | 1 | 1 |
| VSUBP | 1 | 1 |
| VSUBSX | 1 | 1 |
| VSUBSXP | 1 | 1 |
| VWRITEE | 3 | 3+K |
| VWRITEL | 3 | 3+K |
| VWRITEN | 3 | 3+K |
| VWRITES | 3 | 3+K |
| VWRITEW | 3 | 3+K |
| VXOR | 1 | 1 |
| WRITEE | 3 | 3 |
| WRITEL | 3 | 3 |
| WRITEN | 3 | 3 |
| WRITES | 3 | 3 |
| WRITEW | 3 | 3 |
| XOR | 1 | 1 |

| MULTI-FUNCTION INSTRUCTIONS | |
|---|---|
| DESIRED INSTRUCTION | ACTUAL INSTRUCTION |
| LSHFTP SREG | ADDP SREG, SREG |
| VLSHFTP VREG2 | VADDP VREG2, VREG2 |
| VNOT VREG2 | VXOR #-1, VREG2 |
| ROTR VREG2 | RAND $VREG2_S$, $VREG2_D$ WITH ($VREG2_S$=$01) |

FIG. 6-67

| STAGES OF THE PIPE | | |
|---|---|---|
| PIPE STAGE | STAGE NAME | DESCRIPTION |
| 1 | INSTRUCTION PREFETCH | THE PRIMARY FUNCTION OF THE PIPELINE STAGE IS TO PREFETCH INSTRUCTIONS AND SET-UP FOR THE NEXT INSTRUCTION PREFETCH. |
| 2 | DATA PREFETCH | THE PRIMARY FUNCTION OF THE DATA PREFETCH STAGE OF THE PIPELINE IS TO ACCESS DATA WHICH WILL BE USED DURING INSTRUCTION EXECUTION. A DATA PREFETCH IS USED BY ONLY A FEW VECTOR INSTRUCTION ADDRESSING MODES. THESE INSTRUCTIONS ARE:<br>- IDR SCALAR ACCESS (VADD IDR[P1],V1);<br>- CMA VECTOR DATA (VADD CMA[P3],V2); OR<br>- SCALAR DATA BROADCAST TO VECTOR ENGINE (VADD G1,V1). |
| 3 | INSTRUCTION EXECUTION | THE LAST STAGE IS USED FOR DATA EXECUTION. IN THIS STAGE THE OPERAND THAT WERE ACCESSED IN THE SECOND STAGE AND ADDITIONAL OPERANDS ARE COMBINED TOGETHER TO FORM THE RESULT OF THE INSTRUCTION. |

FIG. 7-1

| STALL PRIORITIES | | |
|---|---|---|
| | PRIORITY | STAGE |
| HIGHEST | 1 | STAGE #1 |
| | 2 | STAGE #3 <- |
| LOWEST | 3 | STAGE #2 |

FIG. 7-2

| INPUT SEQUENCE WHEN ILMR=0 | | | | | | | | | | | |
|---|---|---|---|---|---|---|---|---|---|---|---|
| IDR | TIME | | | | | | | | | | |
| | $T_0$ | $T_1$ | $T_2$ | $T_3$ | $T_4$ | $T_5$ | $T_6$ | $T_7$ | $T_8$ | $T_9$ | $T_{10}$ |
| $00 | 10 | 10 | 10 | 10 | 10 | 10 | 10 | 10 | 10 | 10 | 10 |
| $01 | X | 23 | 23 | 23 | 23 | 23 | 23 | 23 | 23 | 23 | 23 |
| $02 | X | X | 57 | 57 | 57 | 57 | 57 | 57 | 57 | 57 | 57 |
| $03 | X | X | X | 128 | 128 | 128 | 128 | 128 | 128 | 128 | 128 |
| $04 | X | X | X | X | 14 | 14 | 14 | 14 | 14 | 14 | 14 |
| $05 | X | X | X | X | X | 44 | 44 | 44 | 44 | 44 | 44 |
| $06 | X | X | X | X | X | X | 89 | 89 | 89 | 89 | 89 |
| $07 | X | X | X | X | X | X | X | 67 | 67 | 67 | 67 |
| $08 | X | X | X | X | X | X | X | X | 32 | 32 | 32 |
| $09 | X | X | X | X | X | X | X | X | X | 17 | 17 |
| $0A | X | X | X | X | X | X | X | X | X | X | 11 |

FIG. 7-3

| INPUT SEQUENCE FOR ILMR=3 | | | | | | | | | | | |
|---|---|---|---|---|---|---|---|---|---|---|---|
| IDR | TIME | | | | | | | | | | |
| | $T_0$ | $T_1$ | $T_2$ | $T_3$ | $T_4$ | $T_5$ | $T_6$ | $T_7$ | $T_8$ | $T_9$ | $T_{10}$ |
| $00 | 10 | 10 | 10 | 10 | 10 | 10 | 10 | 10 | 10 | 10 | 10 |
| $01 | 10 | 10 | 10 | 10 | 10 | 10 | 10 | 10 | 10 | 10 | 10 |
| $02 | 10 | 10 | 10 | 10 | 10 | 10 | 10 | 10 | 10 | 10 | 10 |
| $03 | 10 | 10 | 10 | 10 | 10 | 10 | 10 | 10 | 10 | 10 | 10 |
| $04 | X | 23 | 23 | 23 | 23 | 23 | 23 | 23 | 23 | 23 | 23 |
| $05 | X | 23 | 23 | 23 | 23 | 23 | 23 | 23 | 23 | 23 | 23 |
| $06 | X | 23 | 23 | 23 | 23 | 23 | 23 | 23 | 23 | 23 | 23 |
| $07 | X | 23 | 23 | 23 | 23 | 23 | 23 | 23 | 23 | 23 | 23 |
| $08 | X | X | 57 | 57 | 57 | 57 | 57 | 57 | 57 | 57 | 57 |
| $09 | X | X | 57 | 57 | 57 | 57 | 57 | 57 | 57 | 57 | 57 |
| $0A | X | X | 57 | 57 | 57 | 57 | 57 | 57 | 57 | 57 | 57 |
| $0B | X | X | 57 | 57 | 57 | 57 | 57 | 57 | 57 | 57 | 57 |
| $0C | X | X | X | 128 | 128 | 128 | 128 | 128 | 128 | 128 | 128 |
| $0D | X | X | X | 128 | 128 | 128 | 128 | 128 | 128 | 128 | 128 |
| $0E | X | X | X | 128 | 128 | 128 | 128 | 128 | 128 | 128 | 128 |
| $0F | X | X | X | 128 | 128 | 128 | 128 | 128 | 128 | 128 | 128 |

FIG. 7-4

| INPUT SEQUENCE FOR ILMR=$4 | | | | | | | | | | | |
|---|---|---|---|---|---|---|---|---|---|---|---|
| IDR | TIME | | | | | | | | | | |
| | $T_0$ | $T_1$ | $T_2$ | $T_3$ | $T_4$ | $T_5$ | $T_6$ | $T_7$ | $T_8$ | $T_9$ | $T_{10}$ |
| $00 | 10 | 10 | 10 | 10 | 14 | 14 | 14 | 14 | 14 | 14 | 14 |
| $01 | X | 23 | 23 | 23 | 23 | 44 | 44 | 44 | 44 | 44 | 44 |
| $02 | X | X | 57 | 57 | 57 | 57 | 89 | 89 | 89 | 89 | 89 |
| $03 | X | X | X | 128 | 128 | 128 | 128 | 67 | 67 | 67 | 67 |
| $04 | 10 | 10 | 10 | 10 | 14 | 14 | 14 | 14 | 14 | 14 | 14 |
| $05 | X | 23 | 23 | 23 | 23 | 44 | 44 | 44 | 44 | 44 | 44 |
| $06 | X | X | 57 | 57 | 57 | 57 | 89 | 89 | 89 | 89 | 89 |
| $07 | X | X | X | 128 | 128 | 128 | 128 | 67 | 67 | 67 | 67 |
| $08 | X | X | X | X | X | X | X | X | 32 | 32 | 32 |
| $09 | X | X | X | X | X | X | X | X | X | 17 | 17 |
| $0A | X | X | X | X | X | X | X | X | X | X | 11 |
| $0B | X | X | X | X | X | X | X | X | X | X | X |
| $0C | X | X | X | X | X | X | X | X | 32 | 32 | 32 |
| $0D | X | X | X | X | X | X | X | X | X | 17 | 17 |
| $0E | X | X | X | X | X | X | X | X | X | X | 11 |
| $0F | X | X | X | X | X | X | X | X | X | X | X |

*FIG. 7-5*

| POSSIBLE PORT ERROR EXCEPTIONS | | | | | | | | | | | | | | |
|---|---|---|---|---|---|---|---|---|---|---|---|---|---|---|
| PCR | | | | | | APMR | | | | | | | | DESCRIPTION |
| NSS | EWS | NT | ET | ST | WT | IN | IE | IS | IW | EN | EE | ES | EW | |
| X | X | X | X | X | X | 0 | 0 | 0 | 0 | 0 | 0 | 0 | 0 | NO ERROR ON PORT |
| X | X | X | X | 1 | 1 | 0 | 0 | 0 | 0 | 0 | 0 | 1 | 1 | PORT CONTENTION WITH IDR RESOURCE |
| X | X | X | 1 | X | 1 | 0 | 0 | 0 | 0 | 0 | 1 | 0 | 1 | |
| X | X | X | 1 | 1 | X | 0 | 0 | 0 | 0 | 0 | 1 | 1 | 0 | |
| X | X | X | 1 | 1 | 1 | 0 | 0 | 0 | 0 | 0 | 1 | 1 | 1 | |
| X | X | 1 | X | X | 1 | 0 | 0 | 0 | 0 | 1 | 0 | 0 | 1 | |
| X | X | 1 | X | 1 | X | 0 | 0 | 0 | 0 | 1 | 0 | 1 | 0 | |
| X | X | 1 | X | 1 | 1 | 0 | 0 | 0 | 0 | 1 | 0 | 1 | 1 | |
| X | X | 1 | 1 | X | X | 0 | 0 | 0 | 0 | 1 | 1 | 0 | 0 | |
| X | X | 1 | 1 | X | 1 | 0 | 0 | 0 | 0 | 1 | 1 | 0 | 1 | |

*FIG. 7-6-1*

| POSSIBLE PORT ERROR EXCEPTIONS | | | | | | | | | | | | | | |
|---|---|---|---|---|---|---|---|---|---|---|---|---|---|---|
| PCR | | | | | | APMR | | | | | | | | DESCRIPTION |
| NS S | EW S | NT | ET | ST | WT | IN | IE | IS | IW | EN | EE | ES | EW | |
| X | X | 1 | 1 | 1 | X | 0 | 0 | 0 | 0 | 1 | 1 | 1 | 0 | PORT CONTENTION WITH IDR RESOURCE |
| X | X | 1 | 1 | 1 | 1 | 0 | 0 | 0 | 0 | 1 | 1 | 1 | 1 | |
| X | X | X | X | X | X | 0 | 0 | 0 | 1 | 0 | 0 | 0 | 1 | PORT COLLISION |
| X | X | X | X | X | X | 0 | 0 | 1 | 0 | 0 | 0 | 1 | 0 | |
| X | X | X | X | X | X | 0 | 1 | 0 | 0 | 0 | 1 | 0 | 0 | |
| X | X | X | X | X | X | 1 | 0 | 0 | 0 | 1 | 0 | 0 | 0 | |
| X | 1 | X | X | X | X | 0 | 0 | 0 | 0 | 0 | 1 | 0 | 1 | SWITCH EXCEPTION |
| 1 | X | X | X | X | X | 0 | 0 | 0 | 0 | 1 | 0 | 1 | 0 | |
| X | 1 | X | X | X | X | 0 | 1 | 0 | 0 | 0 | 0 | 0 | 1 | PORT INTERLEAVE |
| 1 | X | X | X | X | X | 1 | 0 | 0 | 0 | 0 | 0 | 1 | 0 | |
| X | 1 | X | X | X | X | 0 | 0 | 0 | 1 | 0 | 1 | 0 | 0 | |
| 1 | X | X | X | X | X | 0 | 0 | 1 | 0 | 1 | 0 | 0 | 0 | |

FIG. 7-6-2

| APMR BIT DEPENDENCIES | | | | | | | | | | | | | | |
|---|---|---|---|---|---|---|---|---|---|---|---|---|---|---|
| PCR | | | | | | APMR | | | | | | | | INTERPRETATION |
| NS S | EW S | NT | ET | ST | WT | IN | IE | IS | IW | EN | EE | ES | EW | |
| 0 | 0 | 0 | 0 | 0 | 1 | X | X | X | X | X | 1 | X | 1 | BITS OF THE APMR WHICH ARE "CARED" WHEN THE PCR: WT BITS IS SET. |
| 0 | 0 | 0 | 0 | 1 | 0 | X | X | X | X | 1 | X | 1 | X | BITS OF THE APMR WHICH ARE "CARED" WHEN THE PCR: ST BITS IS SET. |
| 0 | 0 | 0 | 1 | 0 | 0 | X | X | X | X | X | 1 | X | 1 | BITS OF THE APMR WHICH ARE "CARED" WHEN THE PCR: ET BITS IS SET. |
| 0 | 0 | 1 | 0 | 0 | 0 | X | X | X | X | 1 | X | 1 | X | BITS OF THE APMR WHICH ARE "CARED" WHEN THE PCR: NT BITS IS SET. |
| 0 | 1 | 0 | 0 | 0 | 0 | X | 1 | X | 1 | X | 1 | X | 1 | BITS OF THE APMR WHICH ARE "CARED" WHEN THE PCR: EWS BITS IS SET. |
| 1 | 0 | 0 | 0 | 0 | 0 | 1 | X | 1 | X | 1 | X | 1 | X | BITS OF THE APMR WHICH ARE "CARED" WHEN THE PCR: NWS BITS IS SET. |

FIG. 7-7

| BITS ACTIVE IN EXAMPLE #1 | | | | | | | | | | | | | | |
|---|---|---|---|---|---|---|---|---|---|---|---|---|---|---|
| PCR | | | | | | APMR | | | | | | | | IMPLIES |
| NS S | EW S | NT | ET | ST | WT | IN | IE | IS | IW | EN | EE | ES | EW | |
| 0 | 0 | 1 | 0 | 0 | 1 | 0 | 0 | 0 | 0 | 1 | 0 | 0 | 1 | N-W IDR CONTENTION |

FIG. 7-8

| BITS ACTIVE IN EXAMPLE #2 | | | | | | | | | | | | | | |
|---|---|---|---|---|---|---|---|---|---|---|---|---|---|---|
| PCR | | | | | | APMR | | | | | | | | IMPLIES |
| NS S | EW S | NT | ET | ST | WT | IN | IE | IS | IW | EN | EE | ES | EW | |
| 0 | 0 | 1 | 0 | 0 | 1 | 0 | 0 | 0 | 0 | 1 | 0 | 0 | 1 | N-W IDR CONTENTION |
| 0 | 1 | 0 | 0 | 0 | 0 | 0 | 1 | 0 | 0 | 0 | 0 | 0 | 1 | E PORT INTERLEAVE |
| 0 | 1 | 1 | 0 | 0 | 1 | 0 | 1 | 0 | 0 | 1 | 1 | 0 | 1 | RESULT OF MULTIPLE PORT ERRORS |

FIG. 7-9

| BITS ACTIVE IN EXAMPLE #3 | | | | | | | | | | | | | | |
|---|---|---|---|---|---|---|---|---|---|---|---|---|---|---|
| PCR | | | | | | APMR | | | | | | | | IMPLIES |
| NS S | EW S | NT | ET | ST | WT | IN | IE | IS | IW | EN | EE | ES | EW | |
| 0 | 0 | 1 | 0 | 0 | 1 | 0 | 0 | 0 | 0 | 1 | 0 | 0 | 1 | N-W IDR CONTENTION |
| 0 | 1 | 0 | 0 | 0 | 0 | 0 | 0 | 0 | 0 | 0 | 1 | 0 | 1 | E SWITCH CONTENTION |
| 0 | 1 | 1 | 0 | 0 | 1 | 0 | 0 | 0 | 0 | 1 | 1 | 0 | 1 | RESULT OF MULTIPLE PORT ERRORS |

FIG. 7-10

| BITS ACTIVE IN EXAMPLE #4 | | | | | | | | | | | | | | |
|---|---|---|---|---|---|---|---|---|---|---|---|---|---|---|
| PCR | | | | | | APMR | | | | | | | | IMPLIES |
| NS S | EW S | NT | ET | ST | WT | IN | IE | IS | IW | EN | EE | ES | EW | |
| 0 | 1 | 0 | 0 | 0 | 0 | 0 | 1 | 0 | 0 | 0 | 0 | 0 | 1 | E PORT INTERLEAVE |
| 0 | 0 | 0 | 0 | 0 | 0 | 0 | 1 | 0 | 0 | 0 | 1 | 0 | 0 | E PORT COLLISION |
| 0 | 1 | 0 | 0 | 0 | 0 | 0 | 0 | 0 | 0 | 0 | 1 | 0 | 1 | E-W SWITCH CONTENTION |
| 0 | 1 | 0 | 0 | 0 | 0 | 0 | 1 | 0 | 0 | 0 | 1 | 0 | 1 | RESULT OF MULTIPLE PORT ERRORS |

*FIG. 7-11*

| BITS ACTIVE IN EXAMPLE #5 | | | | | | | | | | | | | | |
|---|---|---|---|---|---|---|---|---|---|---|---|---|---|---|
| PCR | | | | | | APMR | | | | | | | | IMPLIES |
| NS S | EW S | NT | ET | ST | WT | IN | IE | IS | IW | EN | EE | ES | EW | |
| 0 | 0 | 1 | 0 | 0 | 1 | 0 | 0 | 0 | 0 | 1 | 0 | 0 | 1 | N-W IDR CONTENTION |
| 0 | 1 | 0 | 0 | 0 | 0 | 0 | 1 | 0 | 0 | 0 | 0 | 0 | 1 | E PORT INTERLEAVE |
| 0 | 0 | 0 | 0 | 0 | 0 | 0 | 1 | 0 | 0 | 0 | 1 | 0 | 0 | E PORT COLLISION |
| 0 | 1 | 0 | 0 | 0 | 0 | 0 | 0 | 0 | 0 | 0 | 1 | 0 | 1 | E-W SWITCH CONTENTION |
| 0 | 1 | 1 | 0 | 0 | 1 | 0 | 1 | 0 | 0 | 1 | 1 | 0 | 1 | RESULT OF MULTIPLE PORT ERRORS |

*FIG. 7-12*

| FOUR PROCESSING ELEMENT EXAMPLE | | | | | | | | | | | | |
|---|---|---|---|---|---|---|---|---|---|---|---|---|
| | PE1 | | | PE2 | | | PE3 | | | PE4 | | |
| CODE | VT | VH | STATE | VT | VH | STATE | VT | VH | STATE | VT | VH | STATE |
| OPCODE1 | 1 | 0 | – | 1 | 0 | – | 1 | 0 | – | 1 | 0 | – |
| OPCODE2 | 1 | 0 | – | 1 | 0 | – | 1 | 0 | – | 1 | 0 | – |
| VIFEQ V0, V4 | 1 | 0 | 3 | 1 | 0 | 4 | 1 | 0 | 4 | 1 | 0 | 4 |
| OPCODE3 | 1 | 0 | – | 0 | 0 | – | 0 | 0 | – | 0 | 0 | – |
| VELSE | 1 | 0 | 7 | 0 | 0 | 5 | 0 | 0 | 5 | 0 | 0 | 5 |
| OPCODE4 | 0 | 1 | – | 1 | 0 | – | 1 | 0 | – | 1 | 0 | – |
| VIFEQ V1, V4 | 0 | 1 | 2 | 1 | 0 | 3 | 1 | 0 | 4 | 1 | 0 | 4 |
| OPCODE5 | 0 | 1 | – | 1 | 0 | – | 0 | 0 | – | 0 | 0 | – |
| VELSE | 0 | 1 | 6 | 1 | 0 | 7 | 0 | 0 | 5 | 0 | 0 | 5 |
| OPCODE6 | 0 | 1 | – | 0 | 1 | – | 1 | 0 | – | 1 | 0 | – |
| VIFEQ V2, V4 | 0 | 1 | 2 | 0 | 1 | 2 | 1 | 0 | 3 | 1 | 0 | 4 |
| OPCODE7 | 0 | 1 | – | 0 | 1 | – | 1 | 0 | – | 0 | 0 | – |
| VELSE | 0 | 1 | 6 | 0 | 1 | 6 | 1 | 0 | 7 | 0 | 0 | 5 |
| OPCODE8 | 0 | 1 | – | 0 | 1 | – | 0 | 1 | – | 1 | 0 | – |
| VENDIF | 0 | 1 | 9 | 0 | 1 | 9 | 0 | 1 | 9 | 1 | 0 | 10 |
| OPCODE9 | 1 | 0 | – | 1 | 0 | – | 1 | 0 | – | 1 | 0 | – |

*FIG. 7-13*

| CONTENTS OF PROCESSING ELEMENT REGISTERS | | | | | |
|---|---|---|---|---|---|
| | V0 | V1 | V2 | V3 | V4 |
| PE 1 | 0 | 1 | 1 | 1 | 0 |
| PE 2 | 1 | 0 | 1 | 1 | 0 |
| PE 3 | 1 | 1 | 0 | 1 | 0 |
| PE 4 | 1 | 1 | 1 | 0 | 0 |

*FIG. 7-14*

| TIMING DIAGRAM QUICK REFERENCE | |
|---|---|
| FIGURE 4–2 | HOST RANDOM ACCESS READ AND WRITE TIMING |
| FIGURE 4–3 | HOST RANDOM ACCESS ADDRESS TRANSFER TIMING |
| FIGURE 4–4 | HOST RANDOM ACCESS ADDRESS/DATA TRANSFER TIMING |
| FIGURE 4–5 | HOST RANDOM ACCESS ADDRESS/DATA TRANSFER WITH EARLY TERMINATION |
| FIGURE 4–6 | HOST STREAM ACCESS READ TIMING |
| FIGURE 4–7 | HOST STREAM WRITE ACCESS |
| FIGURE 4–8 | RUN MODE WRITE OPERATION FROM DEVICE #2 |
| FIGURE 4–9 | RUN MODE WRITE OPERATION FROM DEVICE #2 WITH INACTIVE PEs |
| FIGURE 4–10 | AE WRITE OPERATION COLLISION TIMING |
| FIGURE 4–12 | AE R/S TO BUSY OUTPUT TIMING |
| FIGURE 4–12 | AE R/S TO BUSY OUTPUT TIMING |
| FIGURE 4–13 | AE WRITE TIMING WITH RUN/STOP INTERVENTION |
| FIGURE 4–14 | INTERRUPT TIMING |
| FIGURE 4–15 | RESET TIMING |
| FIGURE 4–16 | IEEE 1149.1 PORT TIMING |

*FIG. 8*

INSTRUCTION IN A DATA PROCESSING SYSTEM UTILIZING EXTENSION BITS AND METHOD THEREFOR

This is a divisional of application Ser. No. 08/040,779 filed Mar. 31, 1993.

FIELD OF THE INVENTION

The present invention relates in general to data processing, and more particularly to a data processing system and method thereof.

BACKGROUND OF THE INVENTION

Fuzzy logic, neural networks, and other parallel, array oriented applications are becoming very popular and important in data processing. Most digital data processing systems today have not been designed with fuzzy logic, neural networks, and other parallel, array oriented applications specifically in mind. Thus there are considerable performance and cost benefits to be gained in designing digital data processing systems which are especially adapted and designed to meet the requirements of fuzzy logic, neural networks, and other parallel, array oriented applications.

Saturation Protection

Certain arithmetic operations, such as addition and subtraction, may result in overflow in either the positive or negative direction. "Overflow" refers to a situation in which the resulting value from the arithmetic operation exceeds the maximum value which the destination register can store (e.g. attempting to store a result of %100000001 in an 8-bit register). "Saturation" or "saturation protection" refers to a method of handling overflow situations in which the value in the register is replaced with an upper or lower boundary value, for example $FF for an 8-bit unsigned upper boundary value. In general, there are two common ways to handle overflow. First, the result may be allowed to roll over, i.e. $01 may be stored in the destination register (non-saturating approach). Second, the result value may be replaced by either an upper bound value or a lower bound value (saturating approach).

A common problem in data processors is the need to perform arithmetic computations on data values which are wider, i.e. have more bits, than can be accommodated by the available registers and by the available Arithmetic Logic Unit (ALU) circuitry. For example, it is not uncommon for a data processor to be required to add two 32-bit data values using a 16-bit ALU. An approach was needed which would efficiently support saturation protection for extended length operations.

Communications Between Data Processors

It is desirable for fuzzy logic, neural networks, and other parallel, array oriented applications to utilize a multi-dimensional array of integrated circuits. Thus, the communications between integrated circuits in fuzzy logic, neural networks, and other parallel, array oriented applications is often quite important.

In some prior art data processing systems, such as, for example the transputer, the communications between integrated circuits is controlled interactively by the execution of instructions within the integrated circuits. Thus one or more instructions are required to transfer data to other integrated circuits, and one or more instructions are required to receive data from other integrated circuits. In yet other prior art data processing systems, such as telephone switching networks and certain computer networks, the data itself which is being transferred contains routing information regarding which integrated circuits are the intended recipients of the data.

The goal for fuzzy logic, neural networks, and other parallel, array oriented applications is to develop an integrated circuit communications technique and an integrated circuit pin architecture which will allow versatile data passing capabilities between integrated circuits, yet which: (1) will not require a significant amount of circuitry external to the array of integrated circuits; (2) will not require significant software overhead for data passing capabilities; and (3) which will require as few dedicated integrated circuit pins as possible.

Extended Length Operations in a Data Processor

A common problem in data processors is the need to perform arithmetic computations on data values which are wider, i.e. have more bits, than can be accommodated by the available Arithmetic Logic Unit (ALU) circuitry in one ALU cycle. For example, it is not uncommon for a data processor to be required to add two 32-bit data values using a 16-bit ALU. Prior art data processors typically support such extended arithmetic by providing a single "carry" or "extension" bit and by providing two versions of computation instructions in order to specify whether or not the carry bit is used as an input to the instruction (e.g., "add" and "add with carry", "subtract" and "subtract with borrow", "shift right" and "shift right with extension", etc.). This traditional approach is adequate for a limited repertoire of operations, but it does not efficiently support other extended length operations. An approach was needed which would efficiently support an expanded repertoire of extended length operations.

Data Movement Operations in a Data Processor

A common problem in data processors using vectors is the need to calculate the sum, or total, of the elements of a vector. In some applications, only a scalar result (i.e. the total of all vector elements) is required. In other applications, a vector of cumulative sums must be calculated. The need for combining vector elements into a single overall aggregate value or into a vector of cumulative partial aggregates is not limited to addition. Other aggregation operations, such as minimum and maximum, are also required for some applications. A more effective technique and mechanism for combining vector elements into a single overall aggregate value is required.

Multi-Level Conditional Execution of Instructions

Conditional execution of instructions is a very useful feature in all types of data processors. In many data processors, conditional branch instructions have been used to implement conditional execution of instructions. However, in SIMD (Single Instruction Multiple Data) processors, enable or mask bits alone are not suitable for complex decision trees which require the next state of the enable or mask bits to be calculated using a series of complex logical operations. A solution is needed which will allow the conditional execution of instructions to be implemented in a more straightforward manner.

Data Processor Architecture

SISD (Single Instruction Single Data) processors are most useful for performing certain types of data processing tasks. SIMD (Single Instruction Multiple Data) processors are most useful for performing other types of data processing tasks. Some applications, such as fuzzy logic, neural networks, and other parallel, array oriented applications tend to utilize some data processing tasks that are best performed by SISD processors, as well as some data processing tasks that are best performed by SIMD processors.

Loading Incoming Data into a Data Processor

It is desirable for fuzzy logic, neural networks, and other parallel, array oriented applications to utilize a multi-dimensional array of integrated circuits which require the transfer of considerable amounts of data. Thus the technique used by integrated circuits to select and store incoming data is of considerable importance in fuzzy logic, neural networks, and other parallel, array oriented applications. The technique used by integrated circuits to select and store incoming data must be flexible in order to allow incoming data to be selected and stored in a variety of patterns, depending upon the particular requirements of the data processing system.

In the related prior art, DMA (Direct Memory Access) is a technique whereby an input/output device is given direct access to memory across an address and data bus; the input/output device therefore does not have to access memory by means of a processor. Also in the related prior art, processors of various types internally generate addresses in response to instructions which utilize various addressing modes.

Stalling Technique and Mechanism for a Data Processor

An integrated circuit used in fuzzy logic, neural networks, and other parallel, array oriented applications may be executing instructions at the same time that the integrated circuit is receiving data from an external source. The problem that arises is data coherency. The integrated circuit must have a mechanism to determine the validity of the data which is to be used during the execution of an instruction. The use of invalid data is generally a catastrophic problem, and is thus unacceptable in most data processing systems.

In the related prior art, many techniques are used to ensure data coherency. There are many software data passing or synchronization techniques, such as for example, semaphores. In addition, there are many hardware data passing techniques, such as status bits at data interfaces. Unfortunately, with hardware status bits, a polling or interrupt software routine may be required, or alternately a queuing scheme may be required.

For fuzzy logic, neural networks, and other parallel, array oriented applications, a data coherency technique and mechanism is needed which ensures data coherency for both vector and scalar instructions, which requires minimal software overhead, and which can be implemented using minimal circuitry.

Maximum and Minimum Determinations

A common operation required by fuzzy logic, neural networks, and other parallel, array oriented applications is a comparison operation to determine which data value or data values in a group of two or more data values equal the maximum value. Likewise, a common operation required by fuzzy logic, neural networks, and other parallel, array oriented applications is a comparison operation to determine which data value or data values in a group of two or more data values equal the minimum value.

It is desirable to support both signed (2's complement) and unsigned numbers. Also, it is desirable to support extended length (multi-byte) operands. Because it is desirable for fuzzy logic, neural networks, and other parallel, array oriented applications to utilize a multi-dimensional array of integrated circuits, it is additionally desirable to be able to perform such maximum and minimum comparisons across the boundaries of integrated circuits.

A software routine which performs a maximum determination or a minimum determination could alternatively be implemented using prior art software instructions. However, such a software routine would involve a long sequence of instructions and it would take a long time to execute. In addition, it would be difficult to extend a software implementation across the boundaries of integrated circuits running different software programs.

BRIEF DESCRIPTION OF THE DRAWINGS

FIG. 2-1-1 illustrates a traditional representation of a 42×35 Feedforward Network.

FIG. 2-1-2 illustrates a logical representation of a 42×35 Feedforward Network.

FIG. 2-1-3 illustrates a physical representation of a 42×35 Feedforward Network.

FIG. 2-2-1 illustrates a traditional representation of a 102×35 Feedforward Network.

FIG. 2-2-2 illustrates a logical representation of a 102×35 Feedforward Network.

FIG. 2-2-3 illustrates a physical representation of a 102×35 Feedforward Network.

FIG. 2-3-1 illustrates a traditional representation of a 42×69 Feedforward Network.

FIG. 2-3-2 illustrates a logical representation of a 42×69 Feedforward Network.

FIG. 2-3-3 illustrates a physical representation of a 42×69 Feedforward Network.

FIG. 2-4-1 illustrates a traditional representation of a 73×69 Feedforward Network.

FIG. 2-4-2 illustrates a logical representation of a 73×69 Feedforward Network.

FIG. 2-4-3 illustrates a physical representation of a 73×69 Feedforward Network.

FIG. 2-5-1 illustrates a traditional representation of a 63×20×8 Feedforward Network.

FIG. 2-5-2 illustrates a logical representation of a 63×20×8 Feedforward Network.

FIG. 2-5-3 illustrates a physical representation of a 63×20×8 Feedforward Network.

FIG. 2-6 illustrates an Association Engine Subsystem.

FIG. 2-7 illustrates the Association Engine division of the Input Data Vector.

FIG. 2-8 illustrates a plurality of Association Engine Functional Signal Groups.

FIG. 2-9 illustrates a Stream write operation using the ECO and $\overline{WCI}$ control signals.

FIG. 2-10 illustrates an Association Engine Pin Assignment.

FIG. 2-11 illustrates an Association Engine Identification Register.

FIG. 2-12 illustrates an Arithmetic Control Register.

FIG. 2-13 illustrates an Exception Status Register.

FIG. 2-14 illustrates an Exception Mask Register.

FIG. 2-15 illustrates a Processing Element Select Register.

FIG. 2-16 illustrates a Port Control Register.

FIG. 2-17 illustrates Run mode Input Indexing (FM=0).

FIG. 2-18 illustrates Run mode Input Tagging (FM=1).

FIG. 2-19 illustrates an Association Engine Port Monitor Register.

FIG. 2-20 illustrates a plurality of Port Error Examples.

FIG. 2-21 illustrates a General Purpose Port Register.

FIG. 2-22 illustrates a Processing Element Select Register.

FIG. 2-23 illustrates an IDR Pointer Register.

FIG. 2-24 illustrates an IDR Count Register.

FIG. 2-25 illustrates an IDR Location Mask Register.

FIG. 2-26 illustrates an IDR Initial Offset Register.

FIG. 2-27 illustrates a Host Stream Select Register.

FIG. 2-28 illustrates a Host Stream Offset Register.

FIG. 2-29 illustrates an Example #1: Simple Distribution of Data during Stream Write.

FIG. 2-30 illustrates an Example #2: Re-order and Overlapped Distribution of Data.

FIG. 2-31 illustrates a North-South Holding Register.

FIG. 2-32 illustrates a North-South Holding Register.

FIG. 2-33 illustrates an Offset Address Register #1.

FIG. 2-34 illustrates a Depth Control Register #1.

FIG. 2-35 illustrates an Offset Address Register #2.

FIG. 2-36 illustrates a Depth Control Register #2.

FIG. 2-37 illustrates an Interrupt Status Register #1.

FIG. 2-38 illustrates an Interrupt Mask Register #1.

FIG. 2-39 illustrates an Interrupt Status Register #2.

FIG. 2-40 illustrates an Interrupt Mask Register #2.

FIG. 2-41 illustrates a Microsequencer Control Register.

FIG. 2-42 illustrates the FLS, Stack, FSLF and STKF.

FIG. 2-43 illustrates a Microsequencer Status Register.

FIG. 2-44 illustrates a Scalar Process Control Register.

FIG. 2-45 illustrates an Instruction Register.

FIG. 2-46 illustrates a plurality of Instruction Cache Line Valid Registers.

FIG. 2-47 illustrates a Program Counter.

FIG. 2-48 illustrates a Program Counter Bounds Register.

FIG. 2-49 illustrates an Instruction Cache Tag #0.

FIG. 2-50 illustrates an Instruction Cache Tag #1.

FIG. 2-51 illustrates an Instruction Cache Tag #2.

FIG. 2-52 illustrates an Instruction Cache Tag #3.

FIG. 2-53 illustrates a Stack Pointer.

FIG. 2-54 illustrates a First Level Stack.

FIG. 2-55 illustrates a Repeat Begin Register.

FIG. 2-56 illustrates a Repeat End Register.

FIG. 2-57 illustrates a Repeat Count Register.

FIG. 2-58 illustrates a plurality of Global Data Registers.

FIG. 2-59 illustrates a plurality of Global Pointer Registers.

FIG. 2-60 illustrates an Exception Pointer Table.

FIG. 2-61 illustrates an Exception Processing Flow Diagram.

FIG. 2-62 illustrates a plurality of Input Data Registers.

FIG. 2-63 illustrates a plurality of Vector Data Registers (V0–V7).

FIG. 2-64 illustrates a Vector Process Control Register.

FIG. 2-65 illustrates a plurality of Input Tag Registers.

FIG. 2-65-1 illustrates an Instruction Cache.

FIG. 2-66 illustrates a Coefficient Memory Array.

FIG. 2-67 illustrates a microcode programmer's model.

FIG. 2-68 illustrates a plurality of Vector Engine Registers.

FIG. 2-68-1 illustrates a plurality of Vector Engine Registers.

FIG. 2-69 illustrates a plurality of Microsequencer Registers.

FIG. 2-70 illustrates a plurality of Scalar Engine Registers.

FIG. 2-71 illustrates a plurality of Association Engine Control Registers.

FIG. 2-72 illustrates a Conceptual Implementation of the IDR.

FIG. 2-73 illustrates an example of the drotmov operation.

FIG. 2-74 illustrates the vmin and vmax instructions.

FIG. 2-75 illustrates a VPCR VT and VH bit State Transition Diagram.

FIG. 2-76 illustrates a bra/jmpri/jmpmi at the end of a repeat loop.

FIG. 2-77 illustrates a bsr/jsrriijsrmi at the end of a repeat loop.

FIG. 2-78 illustrates a repeate loop identity.

FIG. 2-79 illustrates a Vector Conditional at the end of a repeat loop.

FIG. 2-80 illustrates a Vector Conditional at the end of a repeate loop.

FIG. 3-1 illustrates a Typical Neural Network Configuration.

FIG. 3-2 illustrates an Association Engine Implementation for the Hidden Layer (h) in FIG. 3-1.

FIG. 3-3 illustrates an Input Layer to Hidden Layer Mapping.

FIG. 3-4 illustrates a Simplified diagram of Microsequencer.

FIG. 3-5 illustrates a Single-cycle instruction Pipeline Timing.

FIG. 3-6 illustrates a Two-cycle instruction timing.

FIG. 3-7 illustrates a Stage #2 stalling example.

FIG. 3-8 illustrates CMA and MMA Equivalent Memory Maps.

FIG. 3-9 illustrates a Pictorial Representation of Direct and Inverted CMA Access.

FIG. 3-10 illustrates a CMA Layout for Example #2.

FIG. 3-11 illustrates an IC, a CMA and Pages.

FIG. 3-12 illustrates a Program Counter and Cache Tag.

FIG. 3-13 illustrates a CMA Layout for Example #3.

FIG. 3-14 illustrates a CMA Layout for Example #4.

FIG. 3-15 illustrates a CAMA Layout for Example #5.

FIG. 3-16 illustrates a CMA Layout for Example #6.

FIG. 3-17 illustrates a CMA Layout for Example #7.

FIG. 3-18 illustrates a CMA Layout for Example #8.

FIG. 3-19 illustrates Host Access Functions For the Four Ports.

FIG. 3-20 illustrates a one Dimensional Stream Operations.

FIG. 3-21 illustrates two Dimensional Stream Operations.

FIG. 3-22 illustrates an example Input Data Stream.

FIG. 3-23 illustrates an example of Using Input Tagging.

FIG. 3-24 illustrates a Host Memory Map.

FIG. 3-25 illustrates Association Engine Internal Organization.

FIG. 3-26 illustrates an Association Engine Macro Flow.

FIG. 3-27 illustrates an Input Data Register and associated Valid bits.

FIG. 3-28 illustrates an Association Engine Stand alone Fill then Compute Flow Diagram.

FIG. 3-29 illustrates an Association Engine Stand alone Compute While Filling Flow Diagram.

FIG. 3-30 illustrates a Host, Association Engine, and Association Engine' Interaction.

FIG. 3-31 illustrates a Microcode Instruction Flow.

FIG. 3-32 illustrates movement of data in Example #1.

FIG. 3-33 illustrates movement of data in Example #2.

FIG. 3-34 illustrates movement of data in Example #3.

FIG. 3-35 illustrates movement of data in Example #4.

FIG. 3-36 illustrates movement of data in Example #5.

FIG. 3-37 illustrates a Sum of Products Propagation Routine.

FIG. 3-38 illustrates a Multiple Looping Routine.

FIG. 3-39 illustrates an example Association Engine routine for multiple Association Engine Semaphore Passing.

FIG. 3-40 illustrates an Association Engine Port Switch and Tap Structure.

FIG. 3-41 illustrates an Association Engine Ring Configuration.

FIG. 3-42-1 illustrates an Association Engine Ring Configuration Example.

FIG. 3-42-2 illustrates an Association Engine Ring Configuration Example.

FIG. 3-43 illustrates a Two Dimensional Array of Association Engines.

Figure 1:
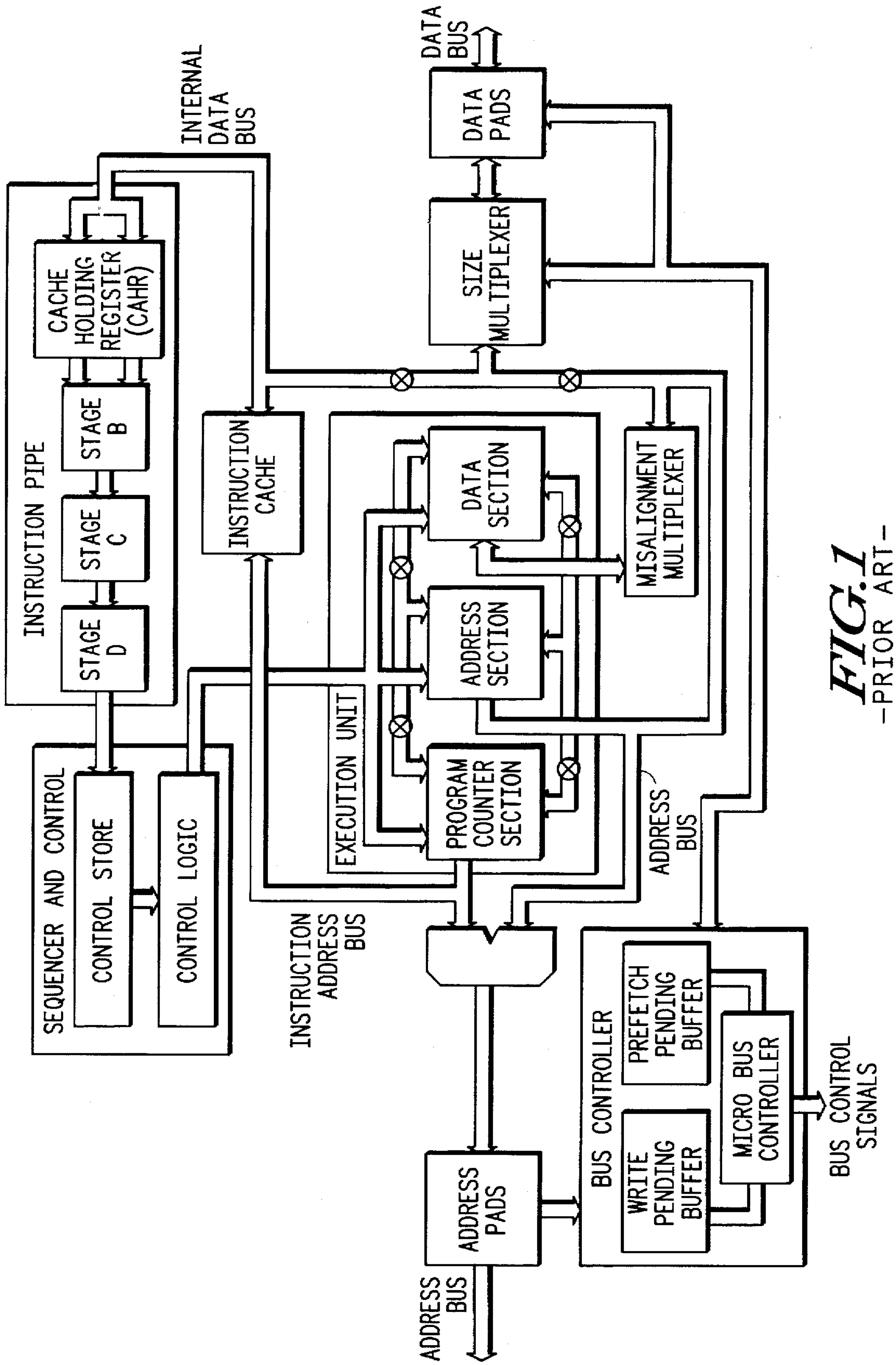
FIG. 1 illustrates a prior art data processing system.
Figures 1, 2:
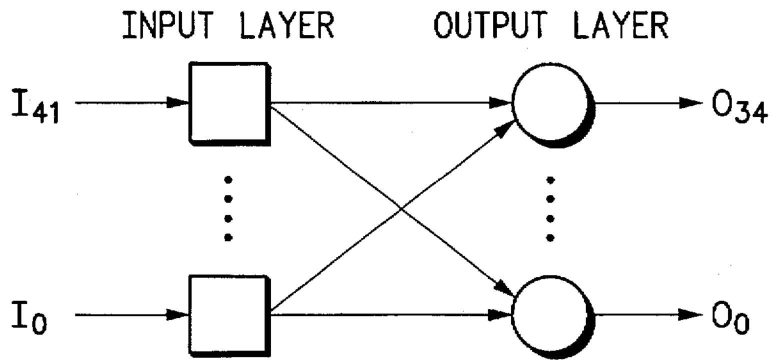
Figures 1, 2:
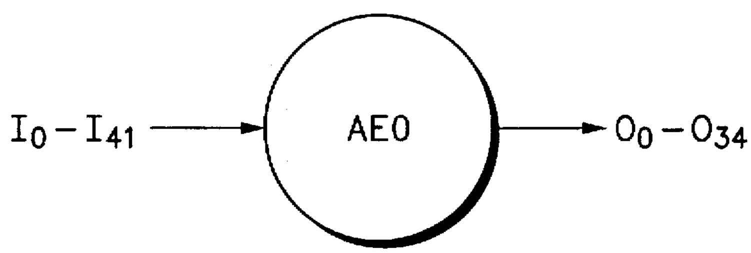
Figures 1, 2, 3:
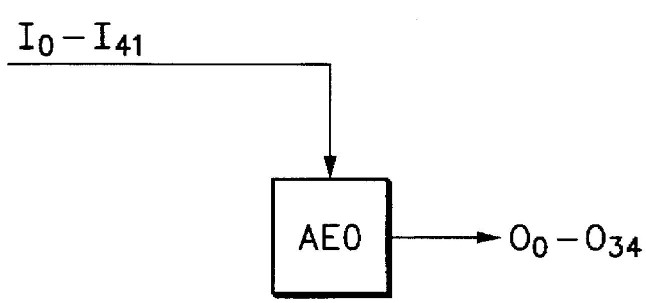
Figures 1, 2:
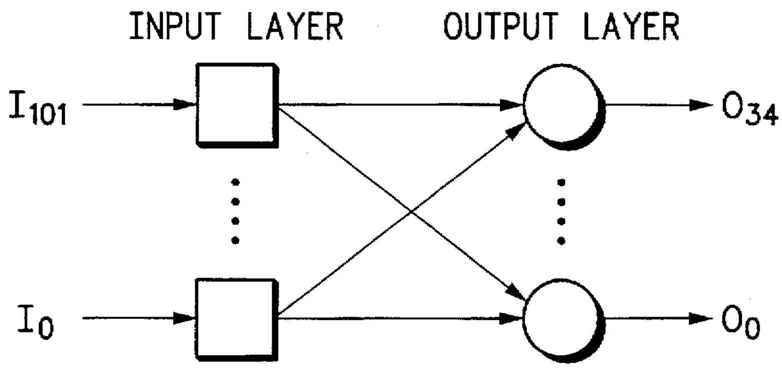
Figure 2:
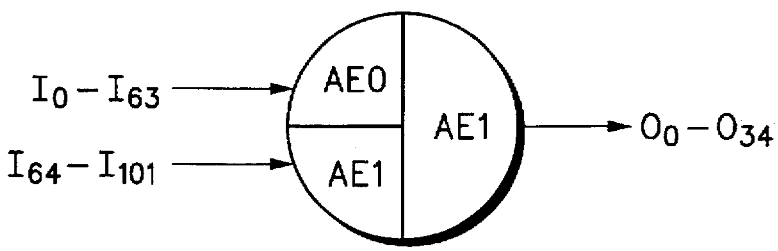
Figures 2, 3:
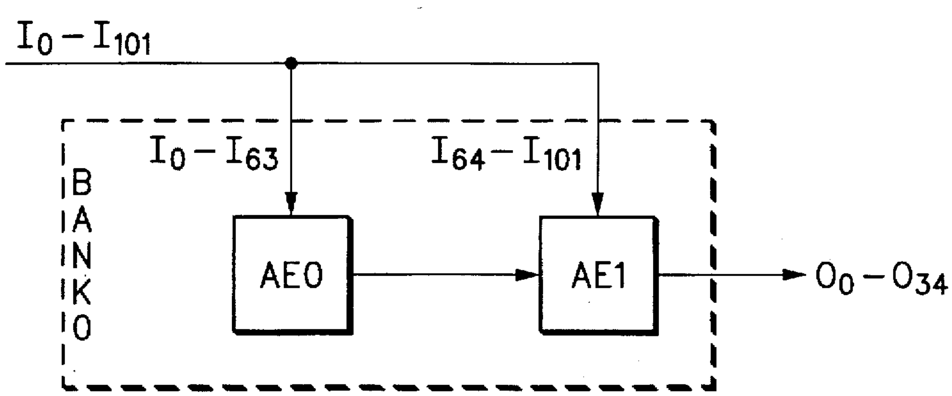
Figures 1, 2, 3:
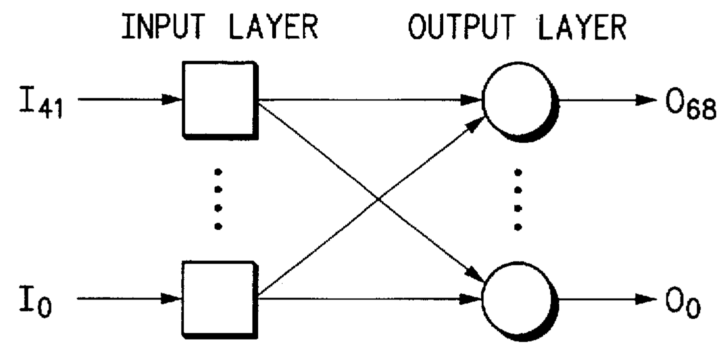
Figures 2, 3:
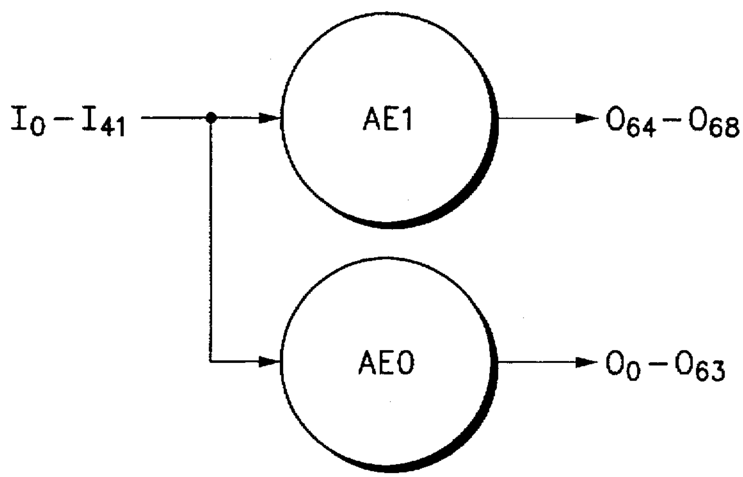
Figures 2, 3:
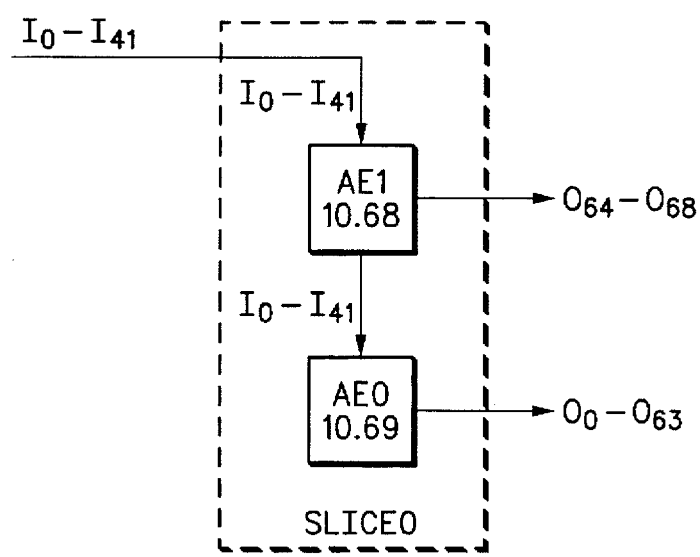
Figures 1, 2, 3, 4:
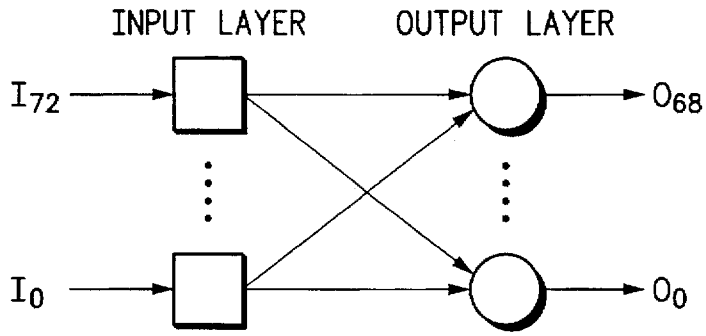
Figures 2, 3, 4:
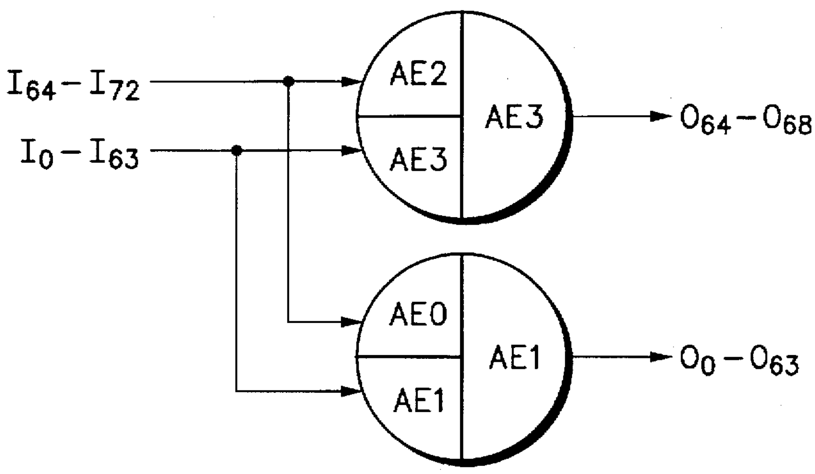
Figures 2, 3, 4:
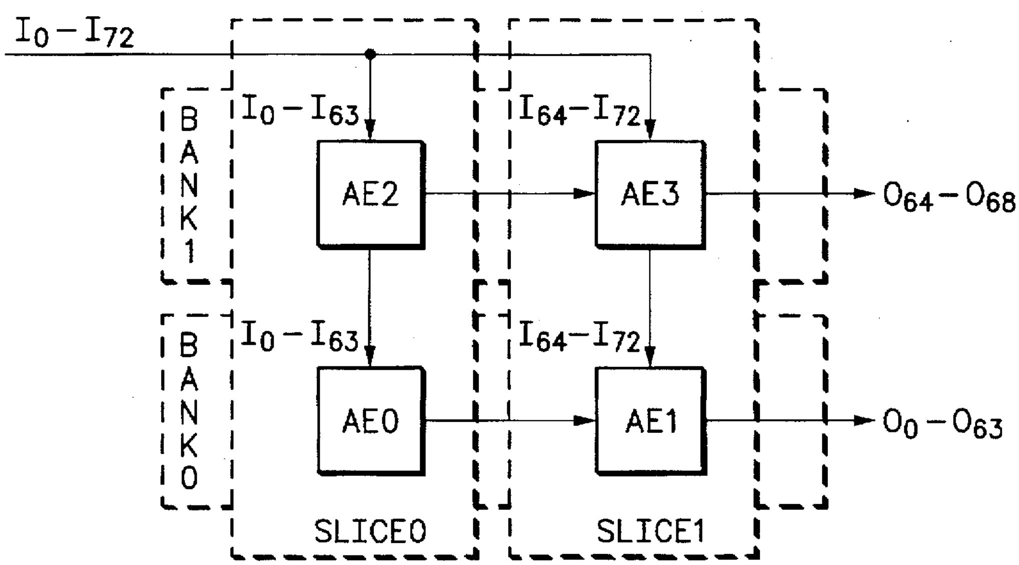

FIG. 4-1 illustrates a Two Dimensional Array of Association Engines.

FIG. 4-2-1 illustrates Host Random Access Read and Write Timing.

FIG. 4-2-2 illustrates Host Random Access Read and Write Timing.

FIG. 4-3-1 illustrates Host Random Access Address Transfer Timing.

FIG. 4-3-2 illustrates Host Random Access Address Transfer Timing.

FIG. 4-4-1 illustrates Host Random Access Address/Data transfer Timing.

FIG. 4-4-2 illustrates Host Random Access Address/Data Transfer Timing.

Figures 1, 2, 3, 4, 5:
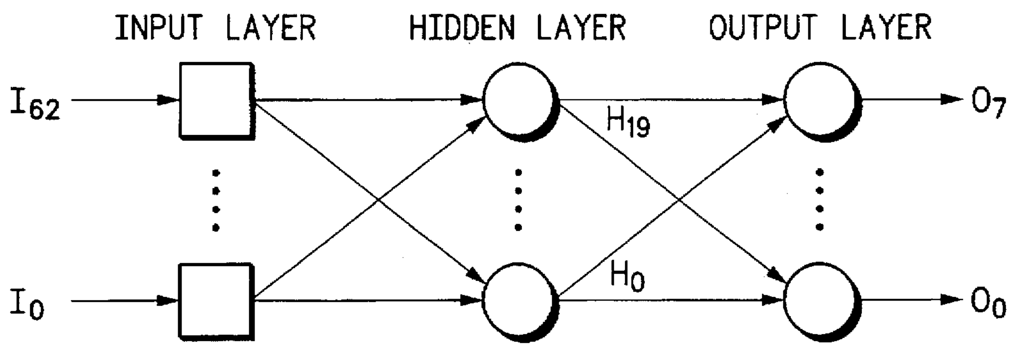
Figures 2, 3, 4, 5:
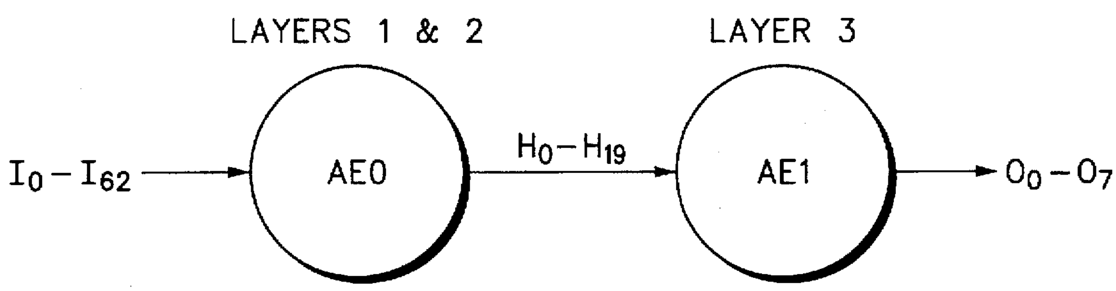
Figures 2, 3, 4, 5:
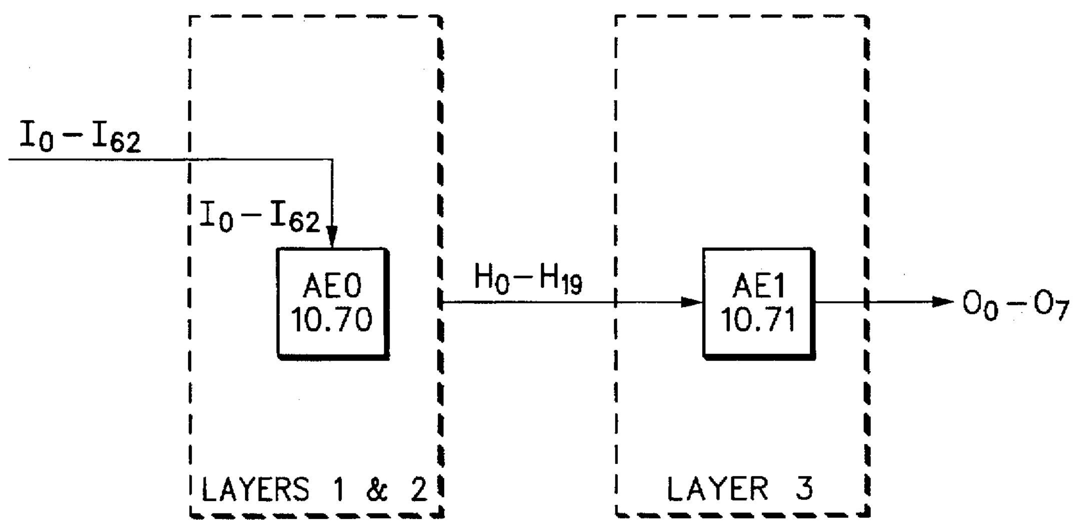

FIG. 4-5-1 illustrates a Host Random Access Address/ Data transfer with Early Termination.

FIG. 4-5-2 illustrates Host Random Addess Address/Data Transfer Timing.

FIG. 4-6-1 illustrates Host Stream Access Read Timing.

FIG. 4-6-2 illustrates Host Random Access Address/Data Transfer with Early Termination.

FIG. 4-7-1 illustrates a Host Stream Write Access.

FIG. 4-7-2 illustrates a Host Stream Write Access.

FIG. 4-8-1 illustrates a Run Mode Write Operation from Device #2.

FIG. 4-8-2 illustrates a Run Mode Write Operation from Device #2.

FIG. 4-9-1 illustrates a Run Mode Write Operation from Device #2 with Inactive PEs.

FIG. 4-9-2 illustrates a Run Mode Write Operation from Device #2 with Inactive PEs.

FIG. 4-10-1 illustrates Association Engine Write Operation Collision Timing.

FIG. 4-10-2 illustrates Association Engine Write Operation Collision Timing.

FIG. 4-11 illustrates Association Engine done to $\overline{\text{BUSY}}$ Output Timing.

FIG. 4-12 illustrates Association Engine R/$\overline{\text{S}}$ to $\overline{\text{BUSY}}$ Output Timing.

FIG. 4-13-1 illustrates Association Engine Write Timing with Run/Stop Intervention.

FIG. 4-13-2 illustrates Association Engine Write Timing with Run/Stop Intervention.

FIG. 4-14 illustrates Interrupt Timing.

FIG. 4-15 illustrates Reset Timing.

FIG. 4-16 illustrates IEEE 1149.1 Port Timing.

FIG. 5-1-1 illustrates a diagram representing an example which uses a saturation instruction.

FIG. 5-1-2 illustrates a flow chart of a saturating instruction.

FIG. 5-2-1 and FIG. 5-2-2 together illustrate a block diagram of four data processors.

FIG. 5-3 illustrates a block diagram of a data processor in a Stop mode of operation.

FIG. 5-4 illustrates a block diagram of a data processor in a Run mode of operation.

FIG. 5-5 illustrates a block diagram of a data processor in a Stop mode of operation and in Random access mode.

Figures 2, 3, 4, 5, 6:
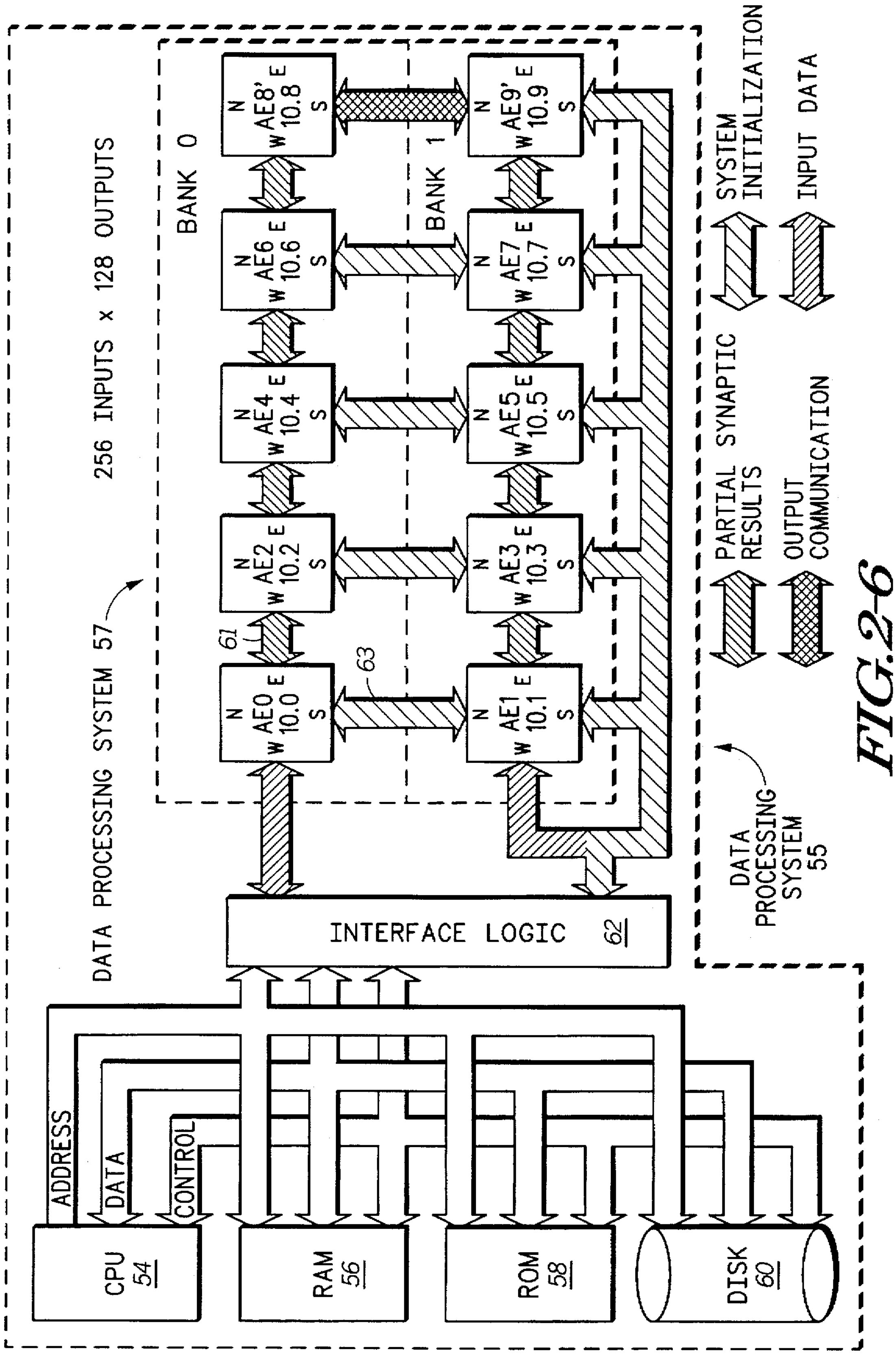

FIG. 5-6 illustrates a block diagram of a data processor in a Stop mode of operation and in Stream access mode.

Figures 2, 3, 4, 5, 6, 7:
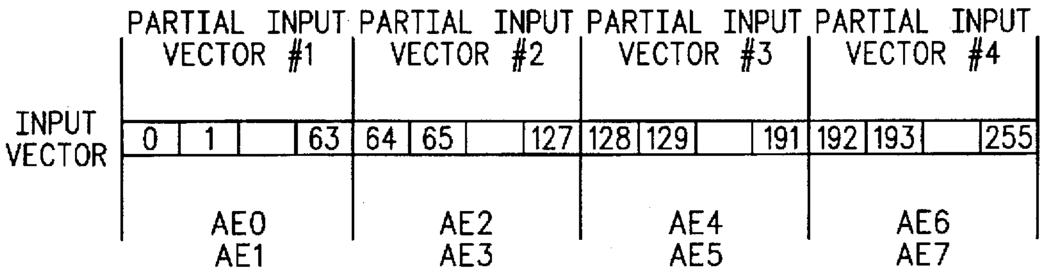

FIG. 5-7 illustrates a block diagram of a data processor in a Run mode of operation.

FIG. 5-8 illustrates a diagram representing an example which executes a series of addition instructions.

FIG. 5-9 illustrates a flow chart of a shift instruction.

FIG. 5-10 illustrates a flow chart of a comparative instruction.

FIG. 5-11 illustrates a flow chart of an arithmetic instruction.

FIG. 5-12 illustrates a diagram representing a prior art vector aggregation approach.

FIG. 5-13 illustrates a diagram representing an aggregation approach in accordance with one embodiment of the present invention.

FIG. 5-14 illustrates a block diagram of a portion of several processing elements.

FIG. 5-15 illustrates a block diagram of a portion of several processing elements.

FIG. 5-16 illustrates a block diagram of a portion of several processing elements.

FIG. 5-17 illustrates a flow chart of a skip instruction.

FIG. 5-18-1 and FIG. 5-18-2 illustrate a flow chart of a repeat instruction.

FIG. 5-19 illustrates a diagram representing an example of the Index Filling Mode.

FIG. 5-20 illustrates a diagram representing an example of the Tag Filling Mode.

FIG. 5-21 illustrates a block diagram of a portion of a data processor.

FIG. 5-22-1 and FIG. 5-22-2 illustrate a flow chart of a data coherency technique involving stalling.

FIG. 5-23 illustrates a block diagram representing an example of the use of a data coherency technique involving stalling.

FIG. 5-24 illustrates a block diagram representing an example of the use of a data coherency technique involving stalling.

FIG. 5-25 illustrates a block diagram representing an example of the use of a data coherency technique involving stalling.

FIG. 5-26 illustrates a block diagram of a portion of a data processor.

FIG. 5-27 and FIG. 5-28 illustrate, in tabular form, an example of a maximum determination.

FIG. 5-29 illustrates a block diagram of a portion of a data processing system.

FIG. 5-30-1 and FIG. 5-30-2 illustrate a flow chart of a comparison instruction.

FIG. 5-31 illustrates a diagram representing an example which uses a series of comparative instructions.

FIG. 5-32 illustrates a diagram representing an example which uses a series of comparative instructions.

FIG. 5-33 illustrates a block diagram of a portion of a data processing system.

FIG. 6-1-1 illustrates Table 2.1 relating to a data processing system.

FIG. 6-1-2 illustrates Table 2.1 relating to a data processing system.

FIG. 6-2 illustrates Table 2.2 relating to a data processing system.

FIG. 6-3 illustrates Table 2.3 relating to a data processing system,

FIG. 6-4 illustrates Table 2.4 relating to a data processing system.

FIG. 6-5-1 illustrates Table 2.5 relating to a data processing system.

FIG. 6-5-2 illustrates Table 2.5 relating to a data processing system.

FIG. 6-6-1 illustrates Table 2.6 relating to a data processing system.

FIG. 6-6-2 illustrates Table 2.6 relating to a data processing system.

FIG. 6-6-3 illustrates Table 2.6 relating to a data processing system.

FIG. 6-6-4 illustrates Table 2.6 relating to a data processing system.

FIG. 6-6-5 illustrates Table 2.6 relating to a data processing system.

FIG. 6-6-6 illustrates Table 2.6 relating to a data processing system.

FIG 6-6-7 illustrates Table 2.6 relating to a data processing system.

Figures 2, 3, 4, 5, 6, 7, 8:
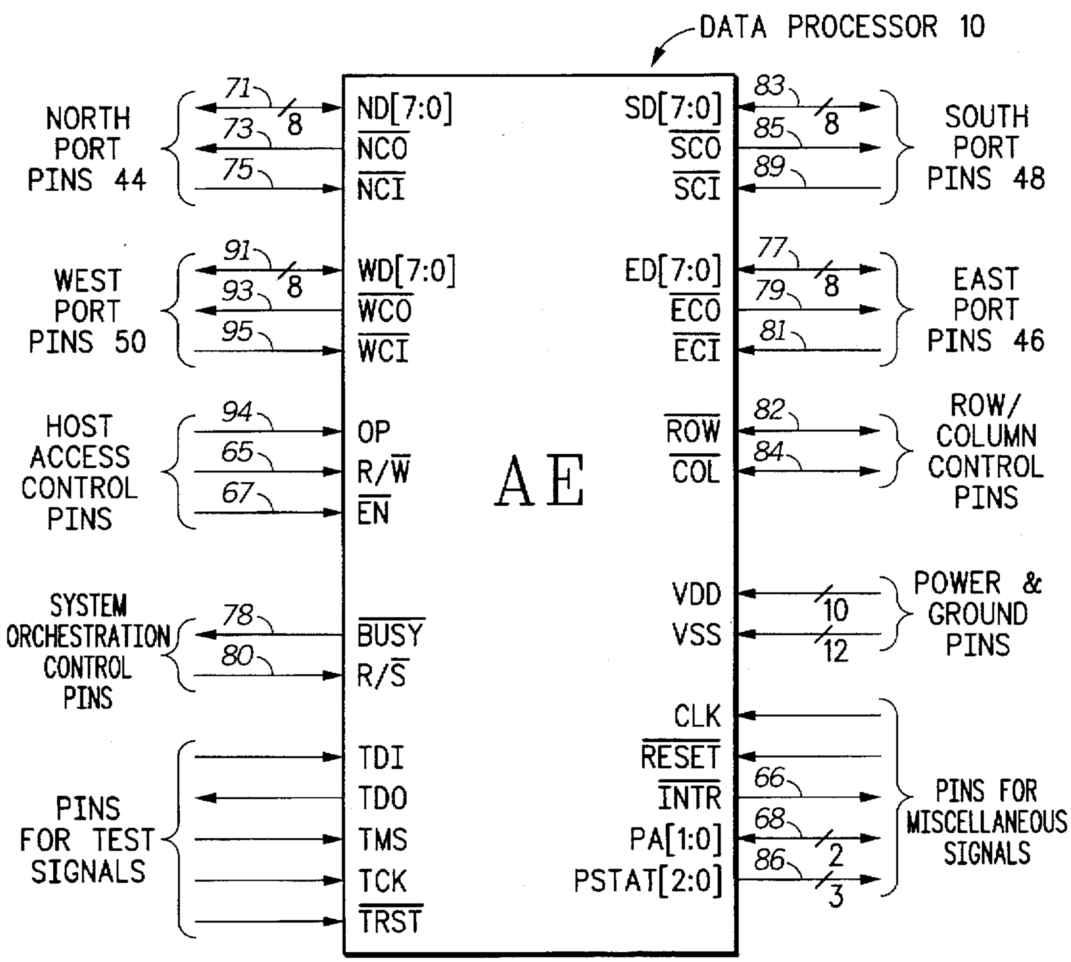

FIG. 6-6-8 illustrates Table 2.6 relating to a data processing system.

Figures 2, 3, 4, 5, 6, 7, 8, 9:
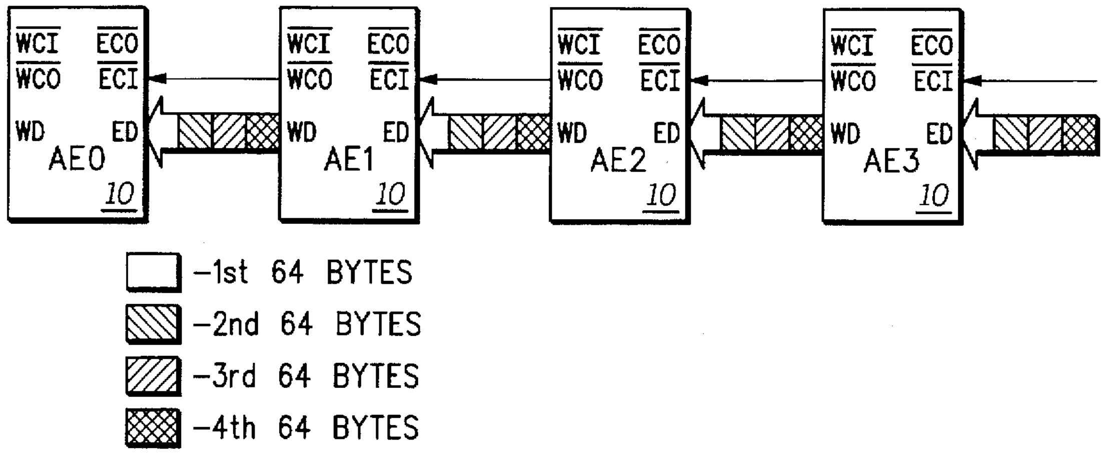
Figures 2, 3, 4, 5, 6, 7, 8, 9, 10:
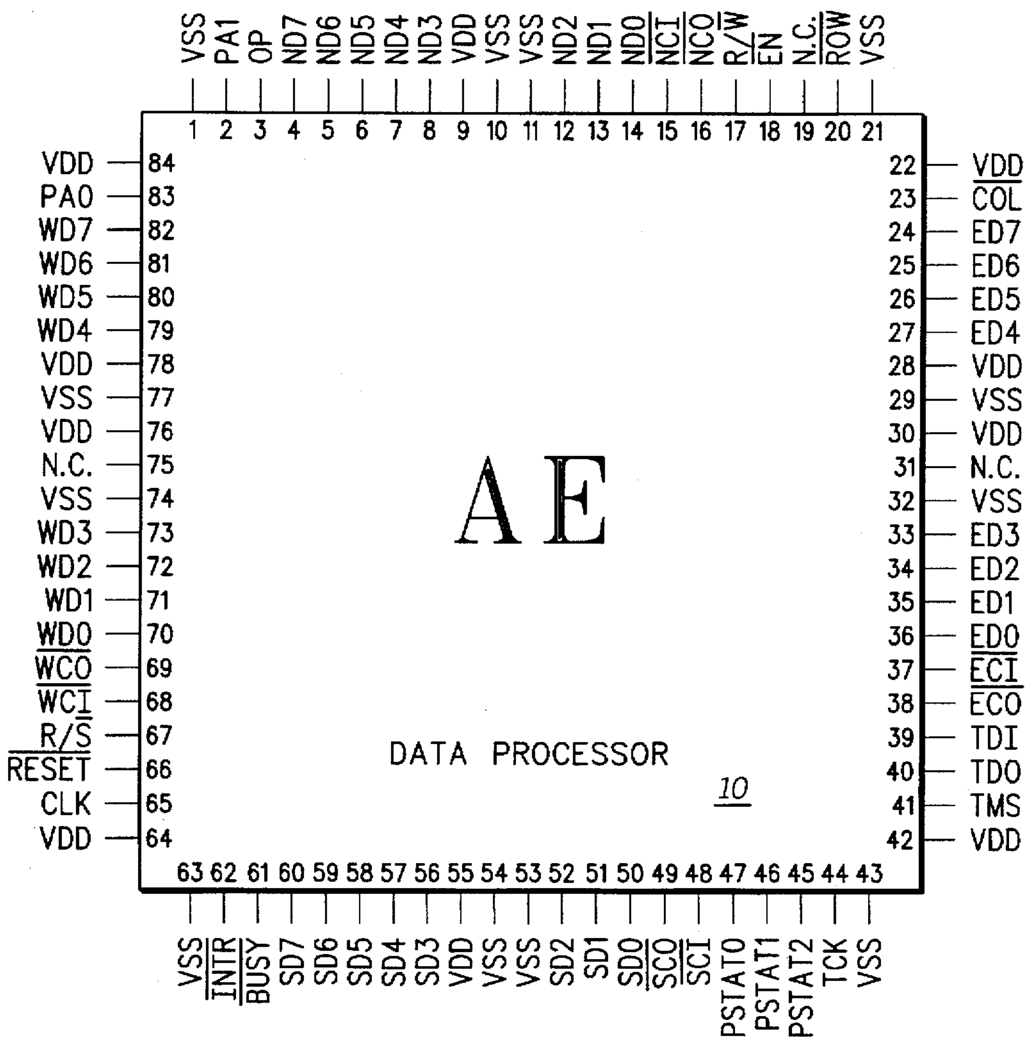
Figures 2, 3, 4, 5, 6, 7, 8, 9, 10, 11, 12, 13, 14, 15, 16, 17:
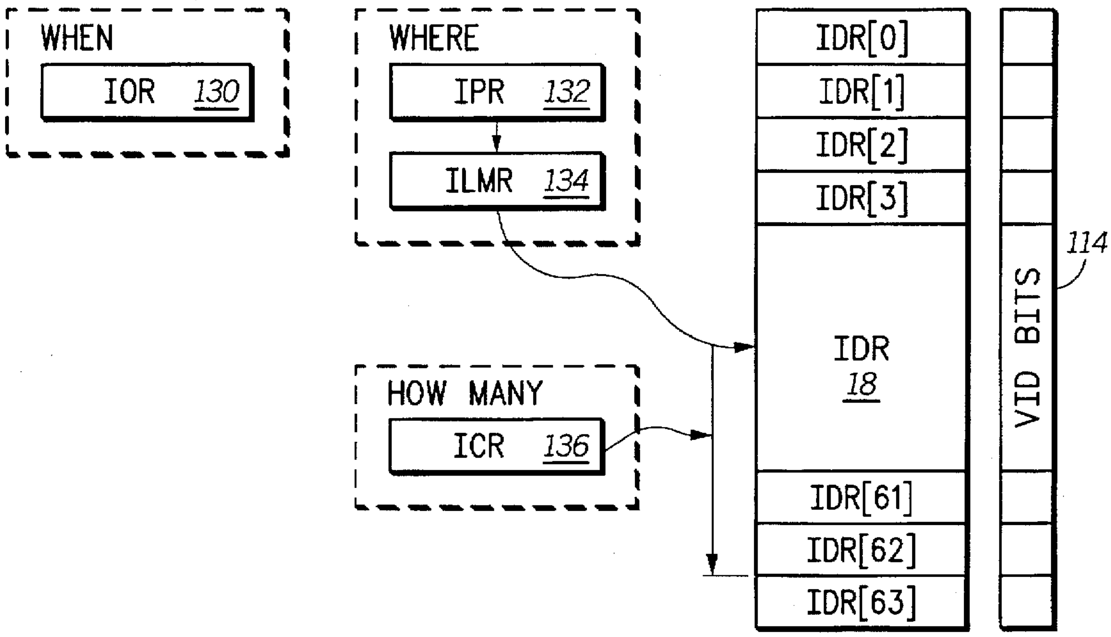
Figures 2, 3, 4, 5, 6, 7, 8, 9, 10, 11, 12, 13, 14, 15, 16, 17, 18:
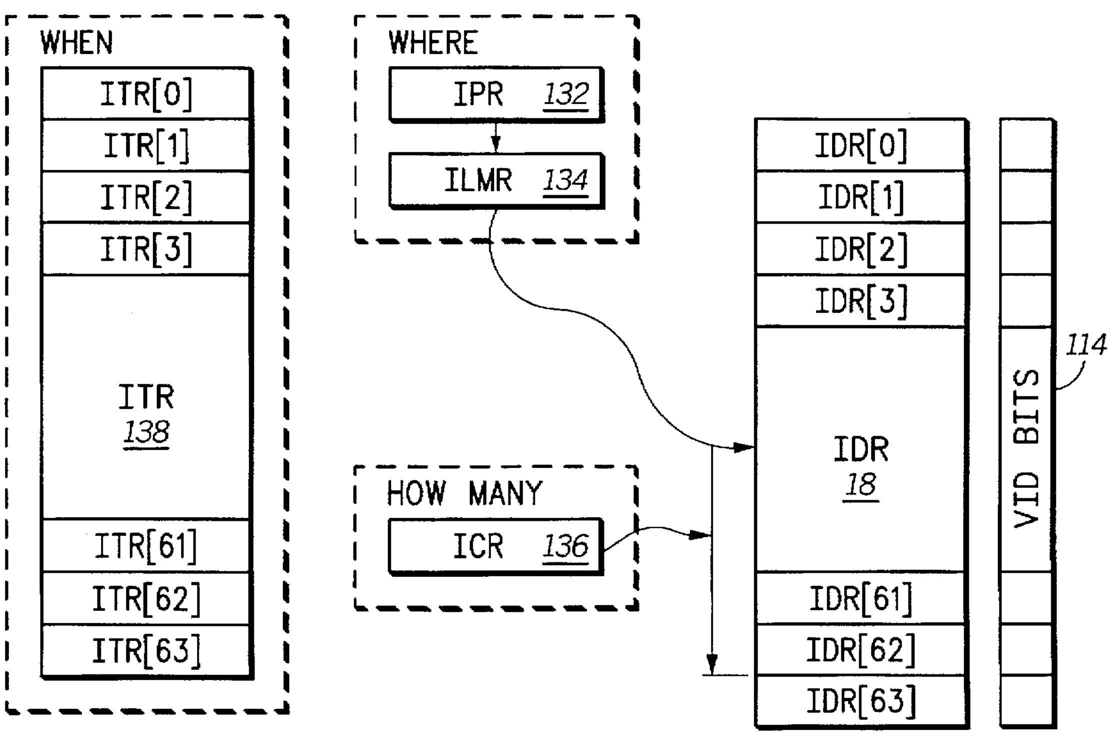
Figures 2, 3, 4, 5, 6, 7, 8, 9, 10, 11, 12, 13, 14, 15, 16, 17, 18, 19:
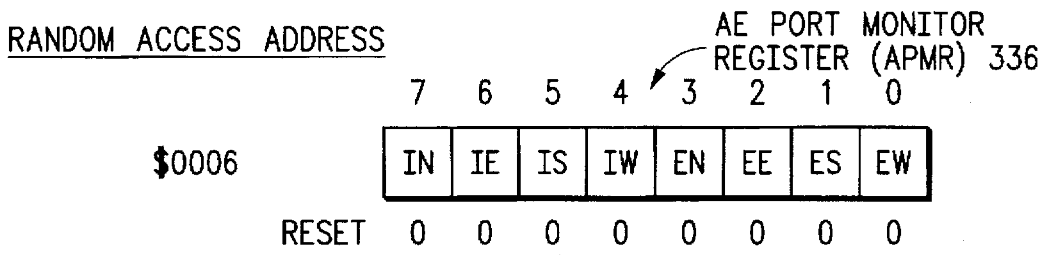
Figures 2, 3, 4, 5, 6, 7, 8, 9, 10, 11, 12, 13, 14, 15, 16, 17, 18, 19, 20:
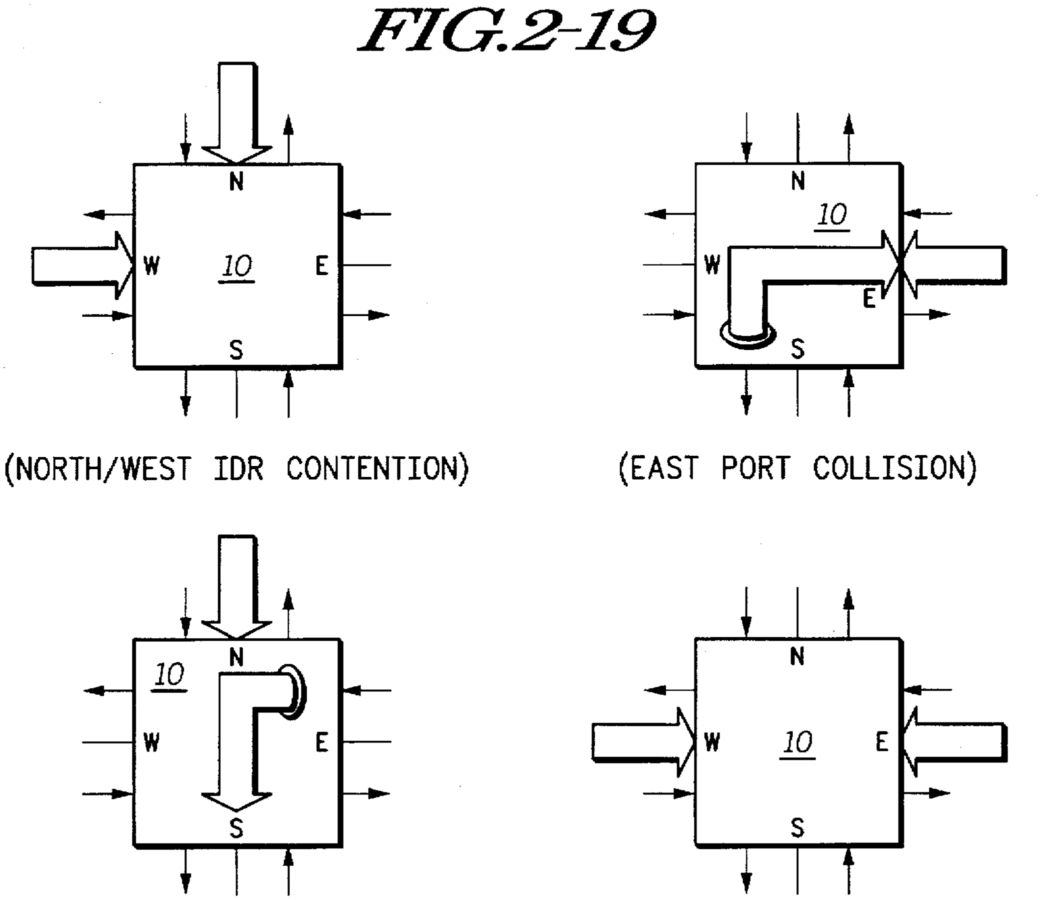
Figures 2, 3, 4, 5, 6, 7, 8, 9, 10, 11, 12, 13, 14, 15, 16, 17, 18, 19, 20, 21, 22, 23, 24, 25, 26, 27, 28, 29:
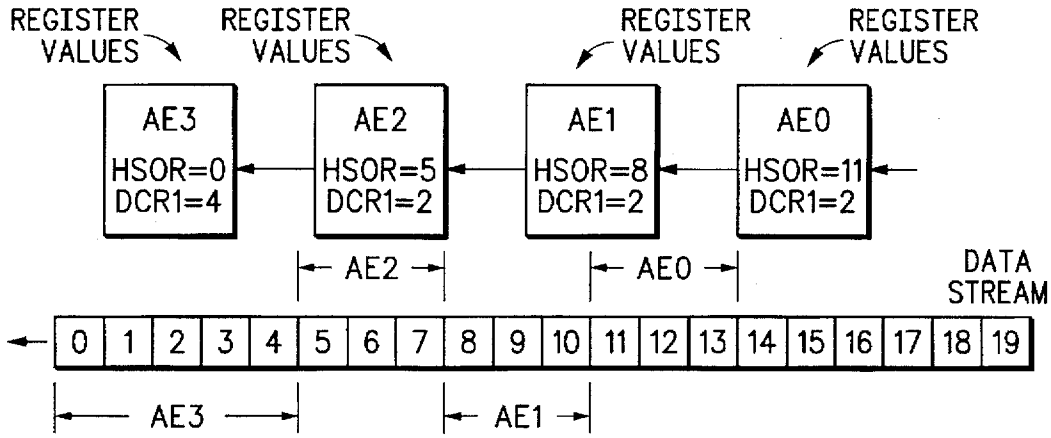
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30:
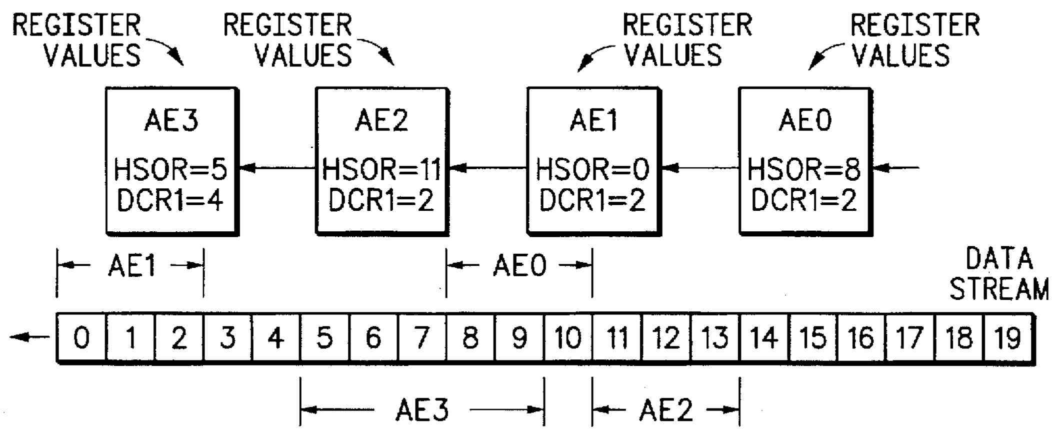
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31:
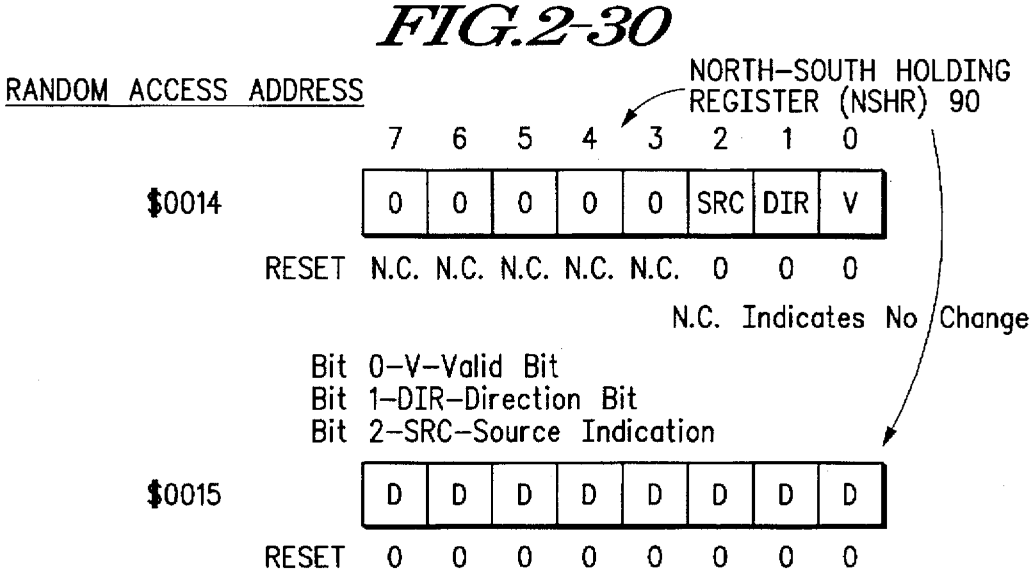

FIG. 6-6-9 illustrates Table 2.6 relating to a data processing system.

FIG. 6-7 illustrates Table 2.7 relating to a data processing system.

FIG. 6-8 illustrates Table 2.8 relating to a data processing system.

FIG. 6-9 illustrates Table 2.9 relating to a data processing system.

FIG. 6-10 illustrates Table 2.10 relating to a data processing system.

FIG. 6-11 illustrates Table 2.11 relating to a data processing system.

FIG. 6-12 illustrates Table 2.12 relating to a data processing system.

FIG. 6-13 illustrates Table 2.13 relating to a data processing system.

FIG. 6-14 illustrates Table 2.14 relating to a data processing system.

FIG. 6-15 illustrates Table 2.15 relating to a data processing system.

FIG. 6-16 illustrates Table 2.16 relating to a data processing system.

FIG. 6-17 illustrates Table 2.17 relating to a data processing system.

FIG. 6-18 illustrates Table 2.18 relating to a data processing system.

FIG. 6-19 illustrates Table 2.19 relating to a data processing system.

FIG. 6-20 illustrates Table 2.20 relating to a data processing system.

FIG. 6-21 illustrates Table 2.21 relating to a data processing system.

FIG. 6-22 illustrates Table 2.22 relating to a data processing system.

FIG. 6-23 illustrates Table 2.23 relating to a data processing system.

FIG. 6-24 illustrates Table 2.24 relating to a data processing system.

FIG. 6-25 illustrates Table 2.25 relating to a data processing system.

FIG. 6-26 illustrates Table 2.26 relating to a data processing system.

FIG. 6-27 illustrates Table 2.27 relating to a data processing system.

FIG. 6-28 illustrates Table 2.28 relating to a data processing system.

FIG. 6-29 illustrates Table 2.29 relating to a data processing system.

FIG. 6-30 illustrates Table 2.30 relating to a data processing system.

FIG. 6-31 illustrates Table 2.31 relating to a data processing system.

FIG. 6-32 illustrates Table 2.32 relating to a data processing system.

FIG. 6-33 illustrates Table 2.33 relating to a data processing system.

FIG. 6-34 illustrates Table 2.34 relating to a data processing system.

FIG. 6-35-1 illustrates Table 2.35 relating to a data processing system.

FIG. 6-35-2 illustrates Table 2.35 relating to a data processing system.

FIG. 6-36-1 illustrates Table 2.36 relating to a data processing system.

FIG. 6-36-2 illustrates Table 2.36 relating to a data processing system.

FIG. 6-37 illustrates Table 2.37 relating to a data processing system

FIG. 6-38 illustrates Table 2.38 relating to a data processing system.

FIG. 6-39 illustrates Table 2.39 relating to a data processing system,

FIG. 6-40 illustrates Table 2.40 relating to a data processing system.

FIG. 6-41-1 illustrates Table 2.41 relating to a data processing system,

FIG. 6-41-2 illustrates Table 2.41 relating to a data processing system.

FIG. 6-42-1 illustrates Table 2.42 relating to a data processing system.

FIG. 6-42-2 illustrates Table 2.42 relating to a data processing system.

FIG. 6-43 illustrates Table 2.43 relating to a data processing system.

FIG. 6-44-1 illustrates Table 2.44 relating to a data processing system.

FIG. 6-44-2 illustrates Table 2.44 relating to a data processing system.

FIG. 6-44-3 illustrates Table 2.44 relating to a data processing system.

FIG. 6-44-4 illustrates Table 2.44 relating to a data processing system.

FIG. 6-44-5 illustrates Table 2.44 relating to a data processing system.

FIG. 6-45 illustrates Table 2.45 relating to a data processing system.

FIG. 6-46 illustrates Table 2.46 relating to a data processing system.

FIG. 6-47-1 illustrates Table 2.47 relating to a data processing system.

FIG. 6-47-2 illustrates Table 2.47 relating to a data processing system.

FIG. 6-48 illustrates Table 2.48 relating to a data processing system,

FIG. 6-49 illustrates Table 2.49 relating to a data processing system.

FIG. 6-50-1 illustrates Table 2.50 relating to a data processing system.

FIG. 6-50-2 illustrates Table 2.50 relating to a data processing system.

FIG. 6-51-1 illustrates Table 2.51 relating to a data processing system.

FIG. 6-51-2 illustrates Table 2.51 relating to a data processing system.

FIG. 6-51-3 illustrates Table 2.51 relating to a data processing system.

FIG. 6-51-4 illustrates Table 2.51 relating to a data processing system.

FIG. 6-52-1 illustrates Table 2.52 relating to a data processing system.

FIG. 6-52-2 illustrates Table 2.52 relating to a data processing system.

FIG. 6-53 illustrates Table 2.53 relating to a data processing system.

FIG. 6-54 illustrates Table 2.54 relating to a data processing system.

FIG. 6-55 illustrates Table 2.55 relating to a data processing system.

FIG. 6-56 illustrates Table 2.56 relating to a data processing system.

FIG. 6-57 illustrates Table 2.57 relating to a data processing system.

FIG. 6-58 illustrates Table 2.58 relating to a data processing system.

FIG. 6-59 illustrates Table 2.59 relating to a data processing system.

FIG. 6-60 illustrates Table 2.60 relating to a data processing system.

Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
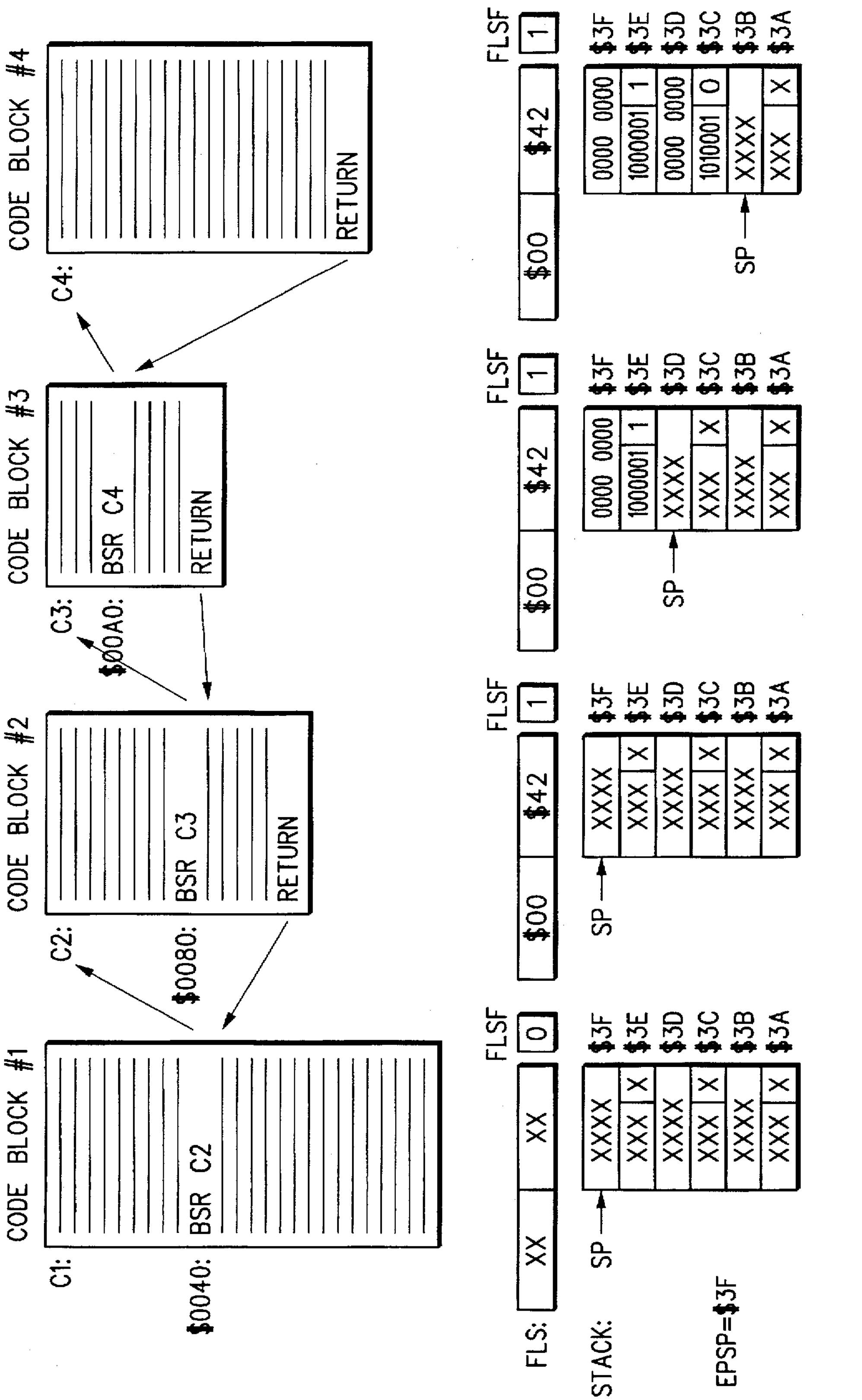
Figures 2, 61:
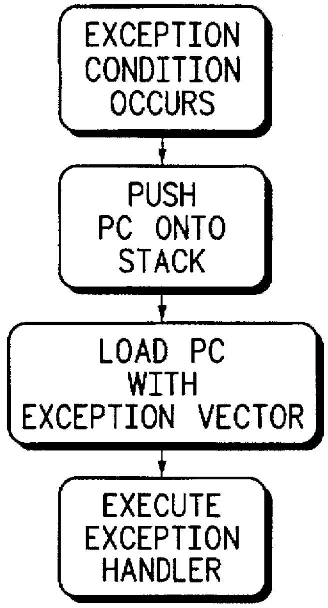

FIG. 6-61 illustrates Table 2.61 relating to a data processing system.

Figures 2, 62:
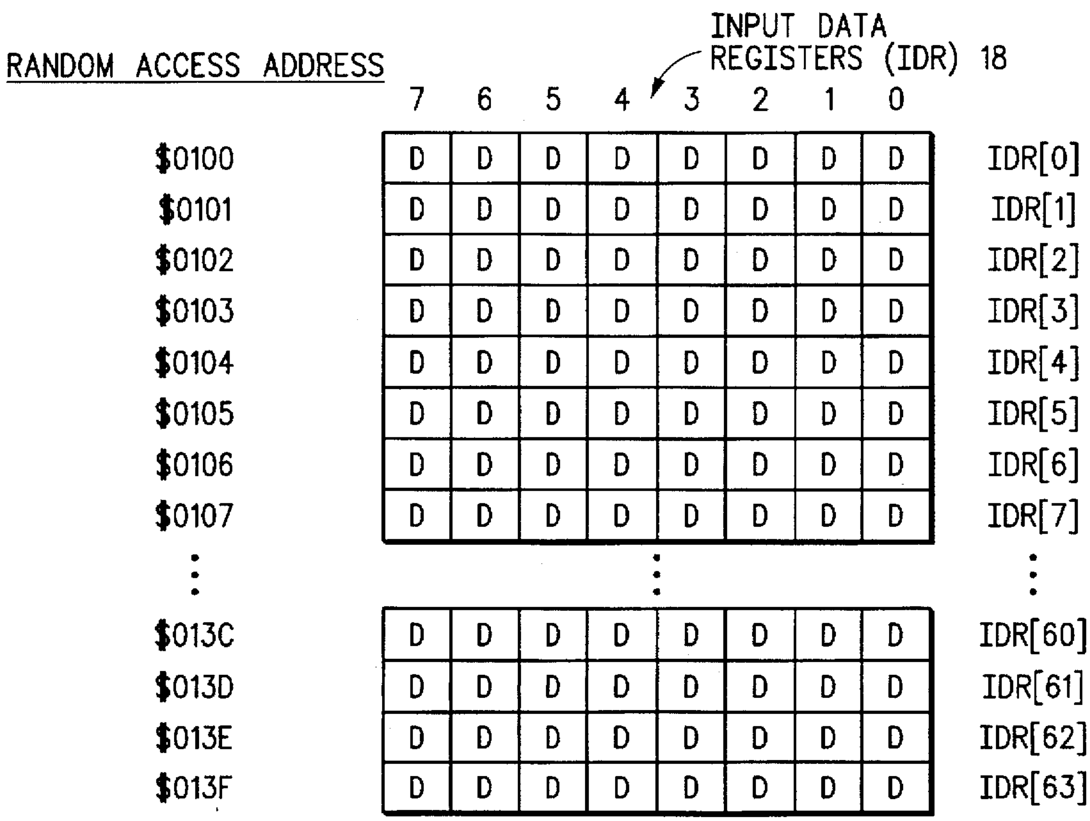

FIG. 6-62 illustrates Table 2.62 relating to a data processing system.

Figures 2, 63:
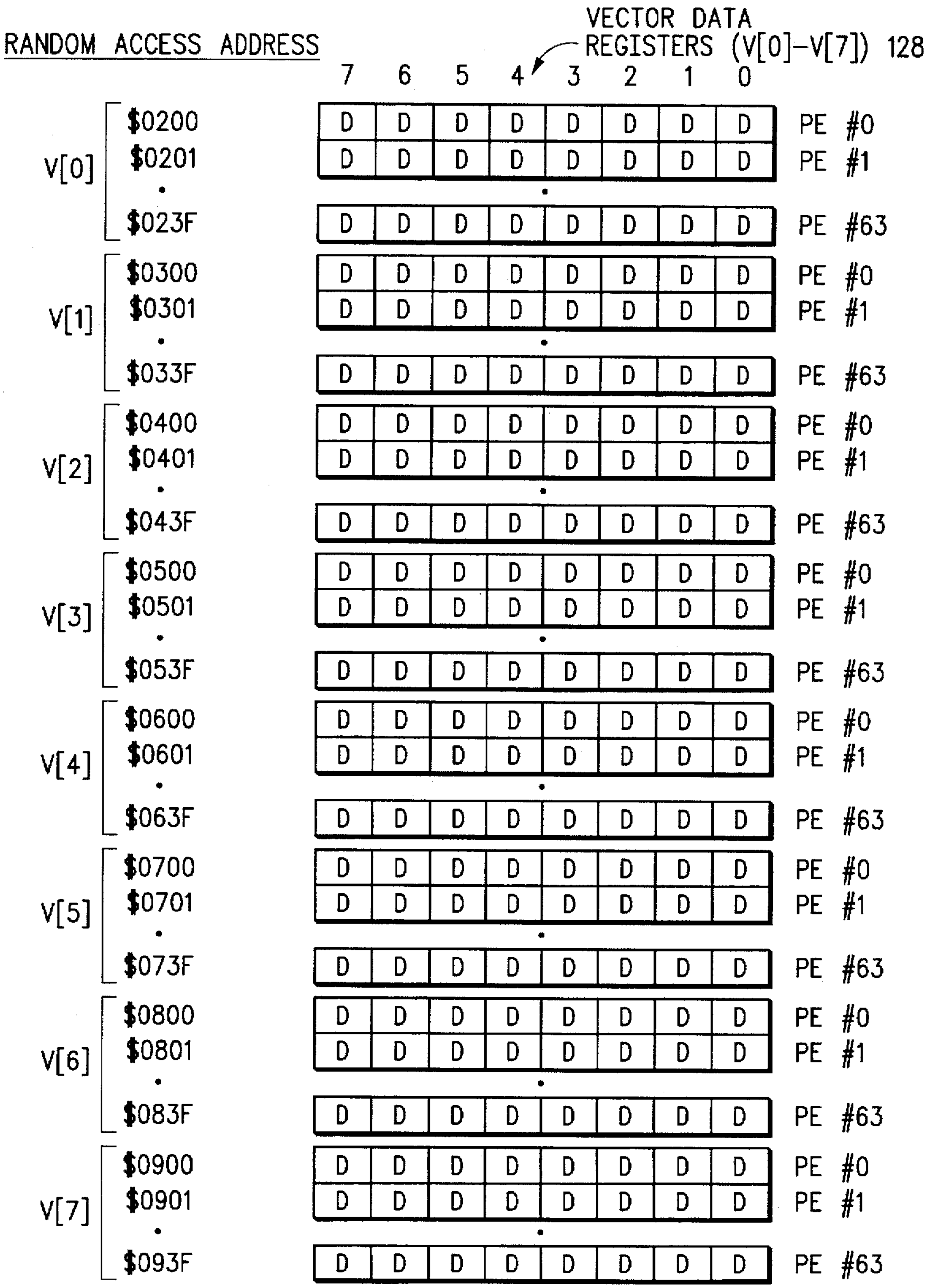

FIG. 6-63 illustrates Table 2.63 relating to a data processing system.

FIG. 6-64-1 illustrates Table 2.64 relating to a data processing system.

FIG. 6-64-2 illustrates Table 2.64 relating to a data processing system.

FIG. 6-64-3 illustrates Table 2.64 relating to a data processing system.

FIG. 6-64-4 illustrates Table 2.64 relating to a data processing system.

FIG. 6-64-5 illustrates Table 2.64 relating to a data processing system.

FIG. 6-64-6 illustrates Table 2.64 relating to a data processing system.

FIG. 6-64-7 illustrates Table 2.64 relating to a data processing system.

Figures 2, 65:
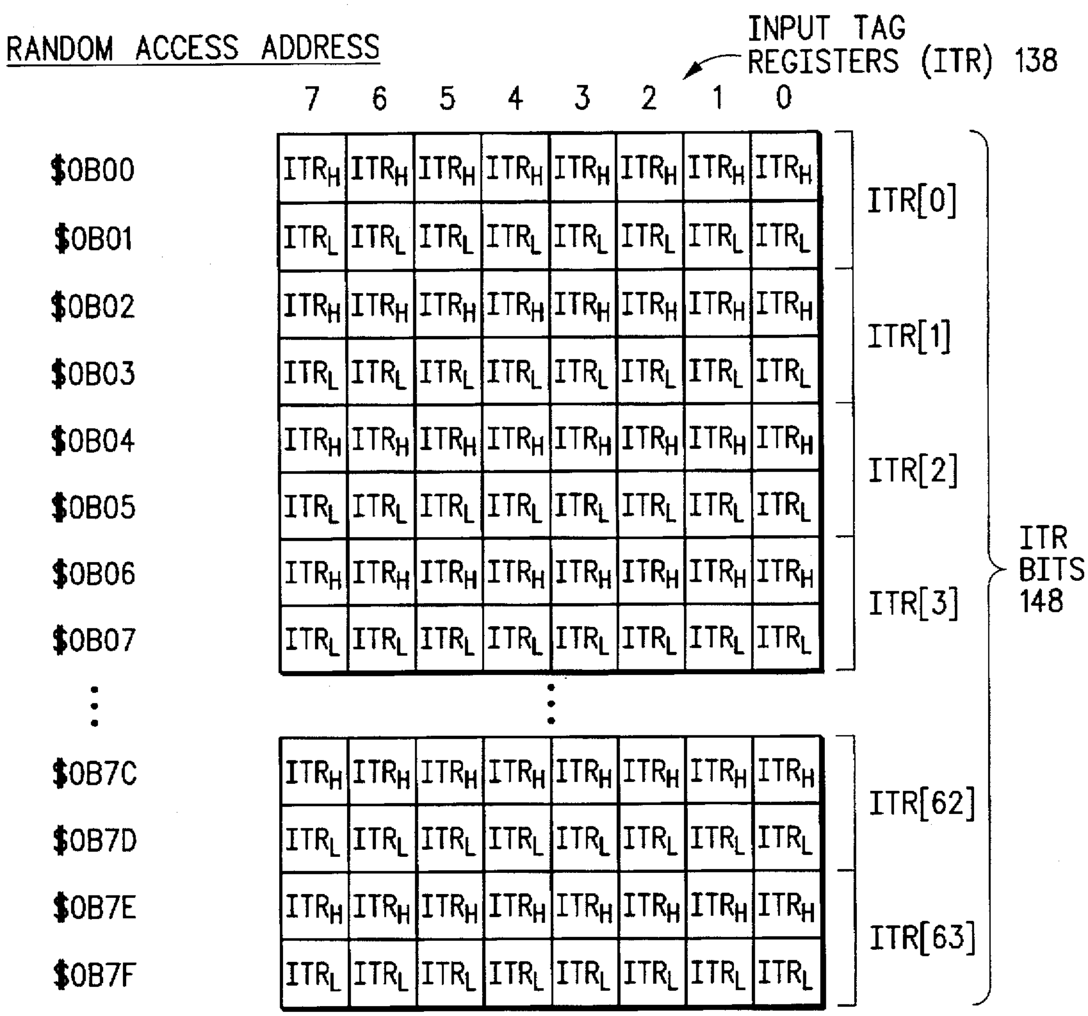
Figures 1, 2, 65:
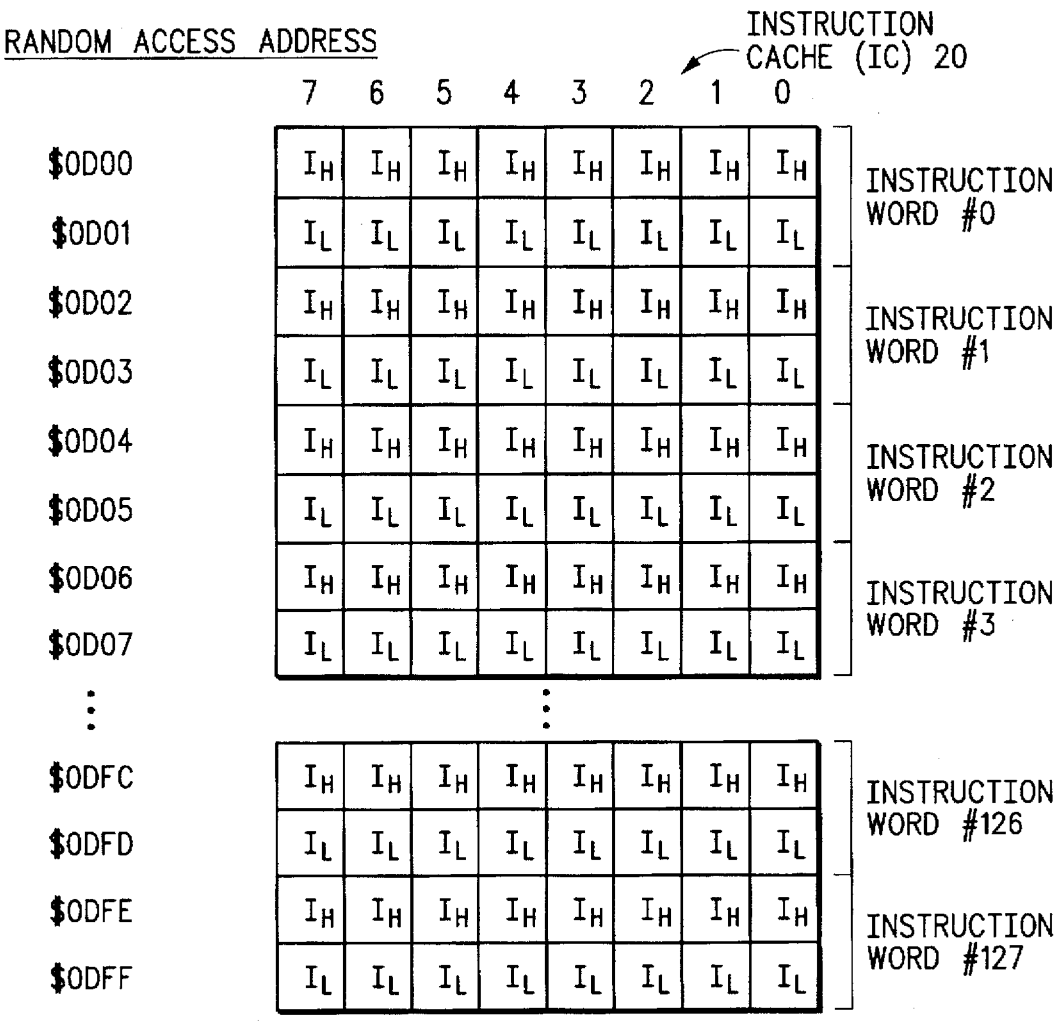

FIG. 6-65-1 illustrates Table 2.65 relating to a data processing system.

FIG. 6-65-2 illustrates Table 2.65 relating to a data processing system.

Figures 2, 66:
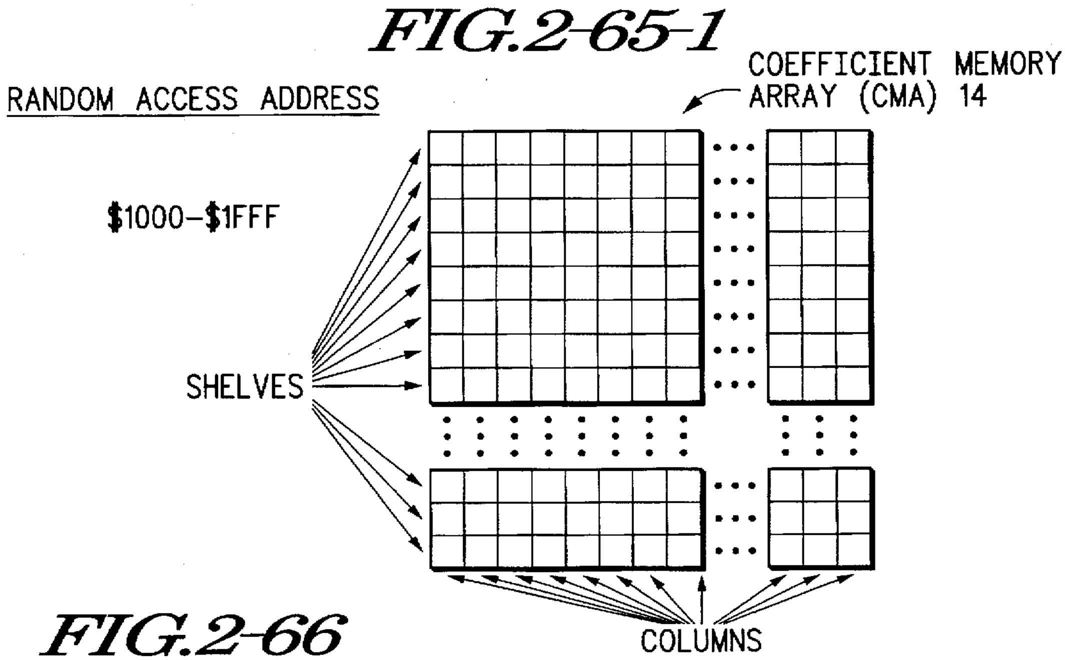

FIG. 6-66-1 illustrates Table 2.66 relating to a data processing system.

FIG. 6-66-2 illustrates Table 2.66 relating to a data processing system.

FIG. 6-66-3 illustrates Table 2.66 relating to a data processing system.

FIG. 6-66-4 illustrates Table 2.66 relating to a data processing system.

FIG. 6-66-5 illustrates Table 2.66 relating to a data processing system.

Figures 2, 67:
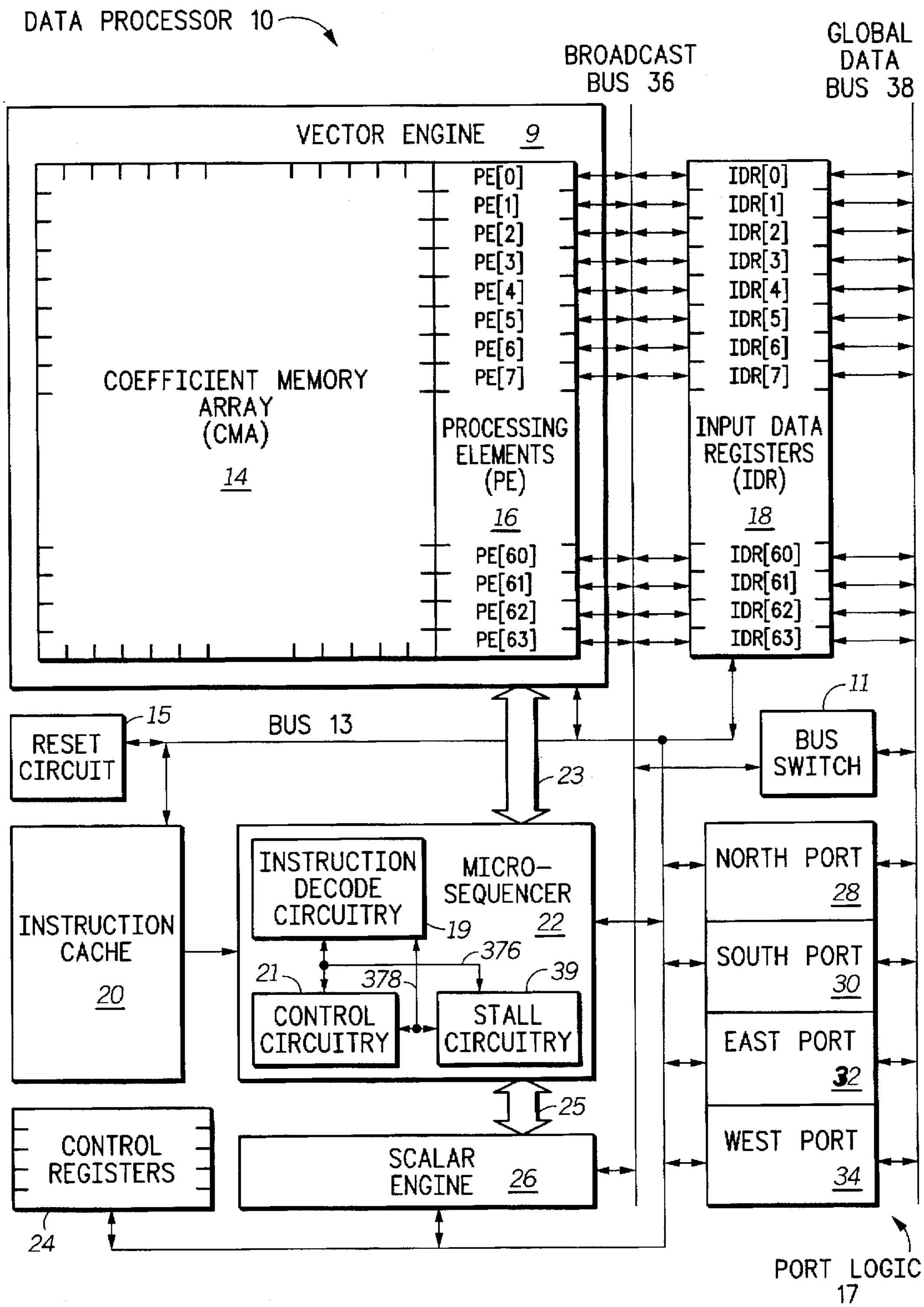

FIG. 6-67 illustrates Table 2.67 relating to a data processing system.

FIG. 7-1 illustrates Table 3.1 relating to a data processing system.

FIG. 7-2 illustrates Table 3.2 relating to a data processing system.

FIG. 7-3 illustrates Table 3.3 relating to a data processing system.

FIG. 7-4 illustrates Table 3.3 relating to a data processing system.

FIG. 7-5 illustrates Table 3.5 relating to a data processing system.

FIG. 7-6-1 illustrates Table 3.6 relating to a data processing system.

FIG. 7-6-2 illustrates Table 3.6 relating to a data processing system.

FIG. 7-7 illustrates Table 3.7 relating to a data processing system.

FIG. 7-8 illustrates Table 3.8 relating to a data processing system.

FIG. 7-9 illustrates Table 3.9 relating to a data processing system.

FIG. 7-10 illustrates Table 3.10 relating to a data processing system.

FIG. 7-11 illustrates Table 3.11 relating to a data processing system.

FIG. 7-12 illustrates Table 3.12 relating to a data processing system.

FIG. 7-13 illustrates Table 3.13 relating to a data processing system,

FIG. 7-14 illustrates Table 3.14 relating to a data processing system.

FIG. 8 illustrates Table 4.1 relating to a data processing system.

SUMMARY OF THE INVENTION

The previously mentioned needs are fulfilled and other advantages achieved with the present invention. In one form, the present invention includes a method of executing an arithmetic instruction in a data processor. In one embodiment, the method includes the steps of; receiving the arithmetic instruction the arithmetic instruction being associated with a source operand and a destination operand; decoding the arithmetic instruction to provide a plurality of control signals; accessing a first extension bit from a first storage location during execution of the arithmetic instruction, the first extension bit providing a status information value; accessing a second extension bit from a second storage location during execution of the arithmetic instruction, the second extension bit providing a sign value corresponding to the source operand of the arithmetic instruction; executing an arithmetic operation in response to the plurality of control signals, both the first extension bit and the second extension bit being used during execution of the arithmetic operation to provide a result the first extension bit and the second extension bit being used in a first manner when the arithmetic instruction is a preliminary instruction and the first extension bit and the second extension bit being used in a second manner when the arithmetic instruction is a non-preliminary instruction; selectively modifying the first extension bit to store a modified status information value corresponding to the result; and selectively modifying the second extension bit to store a modified sign value corresponding to the result.

The present invention will be understood by one skilled in the art from the detailed description below in conjunction with the accompanying drawings.

DETAILED DESCRIPTION OF A PREFERRED EMBODIMENT

TABLE OF CONTENTS

SECTION 1
Introduction 1.1 Key Features
1.2 Goals of the Association Engine Architecture
1.3 Conventions
SECTION 2
Functional Description 2.1 Association Engine System Overview
2.1.1 General
2.1.2 Mapping
2.1.3 General Data Flow
2.1.4 Data Flow
2.1.5 Initialization
2.1.6 Input Data
2.1.7 Partial Synapse Result Computation
2.1.8 Output Data
2.2 Association Engine Signal Description
2.2.1 Association Engine Pin Out
2.2.2 Association Engine Run/Stop Mode of Operation
2.2.3 Port Signals
North Data Port(ND[7:0])
North Control Output ($\overline{NCO}$)
North Control Input ($\overline{NCI}$)
South Data Port(SD[7:0])
South Control Output ($\overline{SCO}$)
South Control Input ($\overline{SCI}$)
East Data Port(ED[7:0])
East Control Output ($\overline{ECO}$)
East Control Input ($\overline{ECI}$)
West Data Port(WD[7:0])
West Control Output ($\overline{WCO}$)

-continued

TABLE OF CONTENTS

West Control Input ($\overline{WCI}$)
2.2.4 Host Access Control Lines
Read/Write Control (R/$\overline{W}$)
Data Enable ($\overline{EN}$)
Access Type (OP)
2.2.5 System Orchestration Lines
Run/Stop (R/$\overline{S}$)
Busy (BUSY)
2.2.6 Row and Column Signals
Row Signal ($\overline{ROW}$)
Column Signal ($\overline{COL}$)
2.2.7 Miscellaneous Signals
System Bus Clock (CLK)
System Reset ($\overline{RESET}$)
Interrupt ($\overline{INTR}$)
General Port I/O (PA[1:0])
Processor Status (PSTAT[2:0])
2.2.8 Test Signals
Test clock (TCK)
Test Data Input (TDI)
Test Data Output (TDO)
Test Mode Select (TMS)
Test Reset ($\overline{TRST}$)
2.2.9 D.C. Electrical Characteristics
2.2.10 Association Engine Pin Out
2.3 Association Engine Host Accessible Registers
2.3.1 Association Engine Identification Register (AIR)
2.3.2 Arithmetic Control Register (ACR)
2.3.3 Exception Status Register (ESR)
2.3.4 Exception Mask Register (EMR)
2.3.5 Processing Element Select Register (PESR)
2.3.6 Port Control Register (PCR)
2.3.7 Association Engine Port Monitor Register (APMR)
2.3.8 General Purpose Port Register (GPPR)
2.3.9 General Purpose Direction Register (GPDR)
2.3.10 IDR Pointer Register (IPR)
2.3.11 IDR Count Register (ICR)
2.3.12 IDR Location Mask Register (ILMR)
2.3.13 IDR Initial Offset Register (IOR)
2.3.14 Host Stream Select Register (HSSR)
2.3.15 Host Stream Offset Register (HSOR)
2.3.16 North-South Holding Register (NSHR)
2.3.17 East-West Holding Register (EWHR)
2.3.18 Offset Address Register #1 (OAR1)
2.3.19 Depth Control Register #1 (DCR1)
2.3.20 Offset Address Register #2 (OAR2)
2.3.21 Depth Control Register #2 (DCR2)
2.3.22 Interrupt Status Register #1 (ISR1)
2.3.23 Interrupt Mask Register #1(IMR1)
2.3.24 Interrupt Status Register #2 (ISR2)
2.3.25 Interrupt Mask Register #2 (IMR2)
2.3.26 Microsequencer Control Register (MCR)
2.3.27 Microsequencer Status Register (MSR)
2.3.28 Scalar Process Control Register (SPCR)
2.3.29 Instruction Register (IR)
2.3.30 Instruction Cache Line Valid Register (ICVR)
2.3.31 Program Counter (PC)
2.3.32 PC Bounds Register (PBR)
2.3.33 Instruction Cache Tag #0 (ICT0)
2.3.34 Instruction Cache Tag #1 (ICT1)
2.3.35 Instruction Cache Tag #2 (1CT2)
2.3.36 Instruction Cache Tag #3 (1CT3)
2.3.37 Stack Pointer (SP)
2.3.38 First Level Stack (FLS)
2.3.39 Repeat Begin Register (RBR)
2.3.40 Repeat End Register (RER)
2.3.41 Repeat Count Register (RCR)
2.3.42 Global Data Registers (G[0]–G[7])
2.3.43 Global Pointer Registers (P[0]–P[7])
2.3.44 Exception Pointer Table
2.3.45 Input Data Registers (IDR)
2.3.46 Vector Data Registers (V[0] through V[7])
2.3.47 Vector Process Control Register (VPCR)
2.3.48 Input Tag Registers (ITR)
2.3.49 Instruction Cache (IC)
2.3.50 Coefficient Memory Array (CMA)
2.4 Association Engine Microcode Accessible Registers
2.4.1 Input Data Register (IDR)

-continued

TABLE OF CONTENTS 2.4.2 Vector Engine Registers
Coefficient Memory Array (CMA)
Vector Data Registers (V[0]–V[7])
Vector Process Control Register (VPCR)
2.4.3 Microsequencer Control Registers
Instruction Register (IR)
Program Counter (PC)
Stack Pointer (SP)
First Level Stack (FLS)
Repeat Begin Register (RBR)
Repeat End Register (RER)
Repeat Count Register(RCR)
2.4.4 Scalar Engine Registers
Global Pointer Registers (P[0]–P[7])
Global Data Registers (G[0]–G[7])
Scalar Process Control Register (SPCR)
2.4.5 Association Engine Control Registers
Association Engine Identification Register (AIR)
Arithmetic Control Register (ACR)
Exception Status Registers (ESR)
Exception Mask Register (EMR)
Processing Element Select Register (PESR)
Port Control Register (PCR)
Association Engine Port Monitor Register (APMR)
General Purpose Port Register (GPPR)
General Purpose Direction Register (GPDR)
IDR Pointer Register (IPR)
IDR Count Register (ICR)
IDR Location Mask Register (ILMR)
IDR Initial Offset Register (IOR)
2.5 Association Engine Microcode Instruction Set Summary
2.5.1 Instruction Types
2.5.2 Notation Used
2.5.3 Microcode Instruction Formats
Data Formats
Register Selection
2.5.4 Stack Pointer Conventions
2.5.5 Accessing the IDR
2.5.6 Vector Process Control Register
2.5.7 Scalar Process Control Register
2.5.8 Signed verses Unsigned Operations
2.5.9 Saturating verses Non-saturating Operations
2.5.10 Association Engine Systems Control Operations
2.5.11 Vector Engine Data Movement
Clarification of the drotmov instruction
Clarification of the dsrot instruction
2.5.12 Vector Engine Data Operations
Summary of the Right Rotate and Left Shift instructions
Clarification of the Downward Shift Operations
Clarification of the vmin/vmax instructions
2.5.13 Vector Engine Conditional Operations
Effect of Conditional Instructions on the VT and VH bits
Summary of the Right Rotate and Left Shift instructions
2.5.14 Scalar Engine Data Movement
2.5.15 Scalar Engine Data Operations
2.5.16 Scalar Engine Program Flow Control Operations
2.5.17 Clarification of the repeat and repeate instructions
Change-of-flow at the end of a repeat loop
Vector Conditionals at the end of a repeat loop
2.5.18 Extension bits and performing Multi-byte Operations
2.5.19 Description of Multi-byte Operations
Multi-Byte Addition
Multi-Byte Subtraction
Multi-Byte Comparison
"VIF" dependence on xX0 and xX1
Multi-Byte Maximum
Multi-Byte Minimum
Multi-Byte Left Arithmetic Shifts
Multi-Byte Right Arithmetic Shifts
Multi-Byte Negation
Incrementing a Multi-Byte Pointer
Decrementing a Multi-Byte Pointer
2.5.20 Process Computation Control
2.5.21 Effect of the VPCR VH and VT Bits on PE processing
2.5.22 Instruction Execution Times
2.5.23 Association Engine Missing Instructions -continued

TABLE OF CONTENTS

SECTION 3
Association Engine Theory of Operation
3.1 Flow of Information and Organization
3.2 The Instruction Pipeline
3.2.1 Stalls in the Instruction Pipeline
3.2.2 Stall Priority in the Instruction Pipeline
3.3 Instruction and Data Memory
3.3.1 Instruction Caching
3.3.2 CMA and MMA mapping
3.3.3 Direct and Inverted Access to the CMA
3.3.4 Allocating CMA Space
Example #1: CMA used for Data Storage Only
Example #2: Instruction Cache, PC and CMA pages
Example #3: CMA used for Program and Data
Example #4: Program Shifted
Example #5: Adding a Jump Table to Example #4
Example #6: Adding a CMA Stack to Example #4
Example #7: Adding Vector and Scalar Storage to Example #4
Example #8: Bringing all the pieces together
3.4 Association Engine Initialization
3.5 Port Operation
3.5.1 Host Transfer Modes
Random Access Mode
Host Stream Access Mode
3.5.2 Association Engine Transfer Modes
Input indexing
Examples using the ILMR
Input Tagging
3.5.3 Host Memory Map for the Association Engine
3.6 Association Engine Operation
3.6.1 Association Engine Macro View
3.6.2 Detailed Description of Host and Association Engine interactions
Input Valid Bits
Fill Then Compute
Compute While Filling
Association Engine Interaction With The Association Engine'
3.6.3 Association Engine Micro View of Instruction Flow
3.6.4 Association Engine Exception Model
Reset Exception
Scalar Exceptions
Vector Exceptions
Port Error Exceptions
Interpreting Multiple Port Error Exceptions
3.6.5 Microcode Program Structure
Initialization and Looping
Multiple Loops
Semaphore passing between two Association Engines
Conditional Execution
3.7 Microcode Initiated Port Write Operations
3.8 Association Engine Bus Configurations
3.8.1 Association Engine Port Switches and Taps
3.8.2 Bus Port Collisions and Errors
Association Engine Collision Condition
Association Engine Contention Condition
Association Engine Interleave
Association Engine Switch Contention
3.8.3 Association Engine Ring Configuration
3.8.4 Two Dimensional Association Engine Configuration
SECTION 4
Association Engine Bus Operation
4.1 Association Engine Port Timing
4.1.1 Host Random Accesses
4.1.2 Host Random Address Transfer West to East
4.1.3 Host Random Address and Data Transfer North and South
4.1.4 Host Random Address/Data Transfer North/South with Early Termination
4.1.5 Host Stream Read
4.1.6 Host Stream Write Accesses
4.2 Association Engine Master Operations
4.2.1 Association Engine Write Operation All Valid Data
4.2.2 Association Engine Write Operation Partial Valid Data
4.2.3 Association Engine write Collision Timing
4.3 Miscellaneous Timing
4.3.1 Association Engine $\overline{\text{BUSY}}$ Output Timing
4.3.2 Association Engine write Timing with Run/Stop Intervention
4.3.3 Interrupt Timing -continued

TABLE OF CONTENTS

| | |
|---|---|
| 4.3.4 | Reset Timing |
| 4.3.5 | IEEE 1149.1 Test Access Port (TAP) Timing |
| SECTION 5 | |
| Overview of Selected Topics | |
| 5.1 | Saturation Protection |
| 5.2 | Communications Between Data Processors: Switch and Tap |
| 5.3 | Multi-Port Data Processor |
| 5.4 | Extended Length Operations in a Data Processor |
| 5.5 | Data movement Operations in a Data Processor |
| 5.5.1 | Instructions "dadd", "daddp", "dmin", "dminp", "dmax", and "dmaxp" |
| 5.5.2 | Instruction "dsrot" |
| 5.6 | Multi-Level Conditional Execution of Instructions |
| 5.6.1 | Instructions "vif", "velse", and "vendif" |
| 5.6.2 | Instructions "dskip" and "dskipe" |
| 5.6.3 | Instructions "repeat" and "repeate" |
| 5.7 | Data Processor Architecture |
| 5.8 | Loading Incoming Data into a Data Processor |
| 5.9 | Stalling Technique and Mechanism for a Data Processor |
| 5.10 | Maximum and Minimum Determinations |
| 5.10.1 | Instructions "colmax", "rowmax", "locmax", "colmin", "rowmin", and "locmin" |
| 5.10.2 | Instructions "vmaxp", "vmax", "vminp", and "vmin", "maxp", "max", "minp", and "min" |
| 5.11 | Inverted Access to the Coefficient Memory Array (CMA) 14 |

GLOSSARY

Association Engine: The Association Engine.

Association Engine': In systems containing more than one Association Engine, it is possible for each Association Engine to contain different microcode. The prime designation is used to indicate this difference in microcode.

Association Engines: The plural form of Association Engine. More than one Association Engine.

Association Engine Chain: A group of Association Engines that are linked together by the $\overline{xCO}/\overline{xCI}$ daisy-chain control signals.

bank: A group of Association Engines that process an input vector. Increasing the number of banks increases the number of output neurons. If one imagines that the Association Engines are arranged in an x-y matrix, a bank would be analogous to a row in the matrix. Compare this with the definition for slice.

broadcast: This term is synonymous with a Run mode Stream Write operation. That is, data is transferred in stream fashion (no externally transmitted addresses) to multiple Association Engines from a single source (be it an Association Engine or some external data source). Please notice that this term only applies to Run mode Stream Writes, not to Run mode Stream Reads. This is because during Run mode, data can only be written into an Association Engine or written out of an Association Engine, but data can not be read from an Association Engine. In order to read data from an Association Engine, the device must be placed into Stop mode ($R/\overline{S}=0$).

During Run mode operation ($R/\overline{S}=1$), the destination of the broadcast operation is the Input Data Register (IDR) of the receiving device(s). During Stop mode operation (when the signal $R/\overline{S}=0$), the destination of the broadcast operation is indicated by the LS[3:0] bit designation in the Host Stream Select Register (HSSR).

collision: An Association Engine collision occurs (Run mode only) when an external port access collides with a write microcode instruction. This condition is dependent on the tap settings for the port which contains the collision. The write microcode instruction is always aborted. Port error exception processing occurs when a collision is detected.

compute-while-filling: This is a method of filling the Input Data Register (IDR) with input data while allowing the microsequencer to overlap computations on the input data.

contention: An Association Engine contention occurs when two or more sources try to simultaneously access the IDR. Currently the different sources include: 1) one or more of the ports; 2) the vstorei, vwritel or writel instructions. This condition is primarily of concern during Run mode, and is dependent on the tap settings. Port error exception processing will occur when a contention is detected.

exception: An Association Engine exception (Run mode only) is one of several system events that can occur in a normal system. The types of exceptions that the Association Engine will respond to are overflow, divide by zero, and port error. An exception vector table is contained in the first part of instruction memory.

host: Any control mechanism external to the Association Engine which is responsible for the housekeeping functions of the Association Engine. These functions can include Association Engine initialization, input of data, handling of Association Engine generated interrupts, etc. . . .

Input frame: An entire set of input data. The amount of data necessary before an output can be generated. Through proper use of pipelining, input frames can be overlapped for greater throughput.

input indexing: The input capturing mechanism that allows contiguous sequence of input samples to be loaded into the Input Data Register (IDR).

input tagging: The input capturing mechanism that allows a non-contiguous sequence of input samples to be loaded into the Input Data Register (IDR)

input vector: The total number of input samples needed by the Association Engine subsystem to generate a result.

output function: The function that is applied to the output of each neuron in a feedforward neural network. This function usually takes the form of a sigmoid squashing function. This function can be performed by a single Association Engine when the partial synapse results from all other Association Engines have been collected. For a detailed description of how this is performed by a single Association Engine, please refer to Section 3.6.2.4 Association Engine Interaction With The Association Engine'.

partial synapse results: The results obtained by applying the propagation function to part of the input frame. If the total number of input samples into a network is less than 64 (the maximum number that a single Association Engine can handle), a single Association Engine could operate on the entire input frame (as it applies to a single neuron), and could therefore calculate the total synapse result.

If the total number of input samples is greater than 64, the Association Engine can only apply the propagation function to part of the input frame, and therefore the partial synapse results are calculated for each neuron. It is the responsibility of a single Association Engine to collect all of these partial synapse results together in order to generate a total synapse result for each neuron.

port: One of the four possible external bus ports on the Association Engine. The possibilities are the North, South, East, and West.

propagation function: The function that is used to calculate the output of a network. The simplest example is the sum of the products of the inputs and the connecting weights, i.e. $\Sigma I_i \times W_{ij}$ In an Association Engine system, the Association Engine performs a partial propagation function (since only part of the inputs are available to each Association Engine). It is the responsibility of a single Association Engine to collect the results from all of these partial Propagation Functions (also referred to as partial synapse results) and to total them to form a complete Propagation Function. For a detailed description of this function refer to Section 3.6.2.4 Association Engine Interaction With The Association Engine'.

saturation: Many of the arithmetic instructions on the Association Engine will cause the result to saturate, as opposed to instructions which allow the result to roll over. One of the advantages in having these two different modes of operation is during multi-byte operations, where the lesser-significant bytes use instructions which will not saturate (i.e. lesser significant bytes perform operations which cause their results to roll over), and the operation on the most significant byte will cause the results to saturate. Consider the following unsigned operation.

saturating: $FF+$02==>$FF (overflow is set)

non-saturating: $FF+$02==>$01 (overflow is set).

Please note that the saturation operates differently in signed mode. Please see Section 2.5.9 Saturating verses Non-saturating Operations for more details.

shadow register: A few of the Association Engine registers are used to specify initial values. These registers are equipped with hidden (or shadow) registers which are periodically with the initial value. Those Association Engine registers which have shadow register counterparts are: IPR, ICR, OAR1, DCR1, OAR2, DCR2. IPR and ICR are the primary registers used during Run mode Streaming operations. OAR1, DCR1, OAR2 and DCR2 are the primary registers used during Stop mode Streaming operations. The shadow register concept allows rapid re-initialization of the registers used during Streaming operations.

shelf: A generalized name for a single SIMD engine, and its associated coefficient values. When the Association Engine is used in a neural network application, the shelf can be viewed as a neuron. When the Association Engine is used in a fuzzy logic application, the shelf can be viewed as a fuzzy membership function.

SIMD: Single Instruction Multiple Data. This word is used as an adjective to describe the state control mechanism of the Association Engine. This word implies that there is a single instruction stream which coordinates the actions of all the ALU sections of the Association Engine.

SIMD Vector Engine: The ALU section of the Association Engine. In the Association Engine, there are 64 compute blocks which operate on data located in the Input Data Register (IDR) and in the Coefficient Memory Array (CMA). The results from these operations can be stored in the vector registers (V0–V7).

SIMD Scalar Engine: The state control portion of the Association Engine. The SIMD Scalar Engine reads instructions from the Instruction Cache (IC), and uses those instructions to control the operations performed in the SIMD Scalar Engine and SIMD Vector Engine.

slice: In an Association Engine subsystem which has more than one bank, a slice is the group of Association Engines that accepts the same portion of the input vector at the same time. Increasing the number of slices increases the number of inputs. If one imagines that the Association Engines are arranged in an x-y matrix, a slice would be analogous to a column in the matrix. Compare this with the definition for bank.

streaming: A mode of access that allows information to be "poured into" or "siphoned out of" the Association Engine subsystem without having to provide explicit addressing on the address bus. The address information instead comes from the OAR, DCR, and HSOR registers. This allows a more transparent growth of the Association Engine subsystem from the software point-of-view.

switch: An internal circuit that connects two opposing ports together. A delay of one clock cycle is added to the transmission of data when it passes through the switch.

tap: An internal circuit that allows the current read or write cycle (at a port) to access the IDR register location. This mechanism also allows the Association Engine to snoop a data transfer which may be passing through the Association Engine due to port switch connections.

Introduction (Section 1)

The Association Engine (Association Engine) is a single chip device developed by Motorola that will form a completely integrated approach to neural network, fuzzy logic and various parallel computing applications. This document will address the functional description and operation of the Association Engine as both a stand alone device and as part of a system consisting of multiple Association Engines. Implemented as a microcoded SIMD (single Instruction, multiple data) engine, the Association Engine will be flexible enough to support many of the existing neural network paradigms, fuzzy logic applications, and parallel computing algorithms with minimal host CPU intervention. This chip is being developed as a building block to be used by customers to address particular neural network and fuzzy logic applications during the early development stages. The long term goal is to integrate specific applications into appropriate MCUs using all or part of the Association Engine on the Inter Module Bus (IMB) for on-chip interconnection.

(1.1) Key Features

Scalable for single layer applications: the architecture is scalable in both the input frame width, and in the number of outputs.

Scalable for multiple layer applications: groups of Association Engines are able to be cascaded together seamlessly (minimal external interconnect logic), and pass inter-layer data with minimal CPU intervention.

Each Association Engine can communicate directly with a CPU/MCU while feeding another Association Engine.

Unique bus switch and tap structure for efficient data transfer.

Supports up to 64 8-bit inputs×64 outputs.

Modular design to allow a "custom fit" to your application.

Supports on-chip learning.

Supports Fuzzy Logic Algorithms.

Common CPU interface.

Powered by a microcoded SIMD engine for versatility.

Microcode programmable by user.

Supports standard interface protocol to allow direct connection to CPU or MCU.

Supports single clock read and write cycles (stream mode) from/to all internal locations.

Supports three clock read and write cycles (random mode) from/to all internal locations.

Association Engines can be chained to support an input data frame width of a maximum of 216-1 8-bit samples.

Each Processing Element contains dedicated ALU hardware to allow parallel calculation for all data simultaneously.

Supports IEEE 1149.1 Boundary Scan Architecture (JTAG).

(1.2) Goals of the Association Engine Architecture

Minimum Clock frequency: DC

Maximum Clock frequency: 20 MHz

Maximum Power Dissipation: 400 mw@5v 3.3v Operation

Package Type: 84 pin Leadless Chip Carrier (LCC)

Package Size: 28 mm×28 mm (1.3) Conventions

The conventions used by this document are as follows:

Byte-ordering—When describing a register set (in which more than one register is contained in that group), the register set will be written in array notation, with the most significant register first, and the least significant register last, as in IDR[63:0]. The entire set of 64 Input Data Registers will usually be referred to as IDR.

Bit-ordering—When describing groups of signal pins or groups of register bits, the most significant bit will have the largest number and the least significant bit will have the smallest number. Therefore, notation such as PSTAT[2:0] indicates that there are 3 PSTAT signal lines, the most significant of which is PSTAT[2].

Naming Conventions:

Signal names will appear in CAPITALIZED BOLD.

Bit names will appear in CAPITALIZED ITALIC.

Register names will appear in CAPITALIZED BOLD ITALIC.

Microcode instruction names will appear in lower-case bold.

Port Naming Conventions:

There are four ports labeled N, S, E, and W.

A signal that is a part of a port is preceded by an 'x'.

Therefore, notation such as xCI refers to all the xCI signals (NCI, SCI, ECI, and WCI).

FUNCTIONAL DESCRIPTION (Section 2)

(2.1) Association Engine System Overview (2.1.1) General

The following section gives a high level overview of the Association Engine operation. It also describes the concepts behind the data flow and pipelining which is supported by this chip. This document is written with the assumption that the reader has a general understanding of the types of applications for which this chip set is to be used. The Association Engine is designed as a general purpose computing engine that can be used effectively for the processing of parallel algorithms, fuzzy logic and neural networks. However, in the section which follows, the association between the architecture of neural networks and the architecture of the Association Engine is described because the basic neural network structure is relatively simple. It is also inherently scalable, which makes the scalability of the Association Engine easier to appreciate.

The understanding and implementation of fuzzy logic and neural networks tends to present some interesting and challenging problems. These problems are mainly due to the lack of standardization of terms and concepts, with most participants inventing and using their own definition of terms and concepts. For this reason, a brief discussion of mapping from traditional neural networks to the Association Engine chip would be helpful. This will be followed by a discussion on the data flow between the host (any intelligent source controlling the operation of the Association Engine chip) and the Association Engine chip, transfers between Association Engines, and transfers between layers in a multilayer neural network.

(2.1.2) Mapping

In order to better understand the capabilities and flexibility of the Association Engine chip, the mapping between traditional neural network architectures and the Association Engine architectures will be discussed. This discussion will focus on four separate examples of various complexity to help the reader gain this understanding. The numbers of inputs and outputs selected for these examples were arbitrary and were merely intended to convey a sense of size.

The Association Engine is organized to support up to 64 8-bit inputs and generate up to 64 outputs. For those applications requiring fewer than 64 inputs and fewer than 64 outputs, a single Association Engine is sufficient to implement the necessary structure. For applications exceeding these requirements (greater than 64 8-bit inputs and/or 64 outputs), varying numbers of Association Engines are required to implement the structure. The following examples are used to illustrate the different Association Engine organizations required to implement these applications.

EXAMPLE 1

A 42 Input by 35 Output Feedforward Network

FIGS. 2-1-1 through 2-1-3 depict a single layer feedforward network requiring 42 inputs and 35 outputs using traditional neural network representation, logical Association Engine representation, and physical Association Engine representation. This implementation requires only one Association Engine. The host transfers 42 bytes of data to the Association Engine, the propagation function is applied and the 35 outputs are generated. One Association Engine can support up to 64 outputs. In FIG. 2-1-1, and elsewhere in this document, it should be noted that the input layer does not perform any computation function. It simply serves as a distribution layer.

EXAMPLE 2

A 102 Input by 35 Output Feedforward Network

FIGS. 2-2-1 through 2-2-3 illustrate the traditional, logical, and physical representation of a feedforward network with 102 inputs and 35 outputs. As can be seen in FIG. 2-2-3, two Association Engines are required. The Association Engines are connected in series with the input data stream with Association Engine 0 handling data inputs 0–63 and Association Engine 1 handling data inputs 64–101. Association Engine 1 also performs the aggregation of the Partial Synapse Results (from Association Engine 0 and itself) and then generates the 35 outputs. Association Engine 0 and Association Engine 1 form a Bank. To ease microcode programming, it might be desirable to allocate a third Association Engine to perform the aggregation and output function.

EXAMPLE 3

A 42 Input by 69 Output Feedforward Network

FIGS. 2-3-1 through 2-3-3 show a feedforward network requiring 42 inputs and 69 outputs. This implementation requires two Association Engines. The Association Engines are connected in parallel with the input data stream and both Association Engines accepting the input data simultaneously. As can be seen in FIG. 2-3-3, Association Engine 0 and Association Engine 1 form a single Slice.

EXAMPLE 4

A 73 Input by 69 Output Feedforward Network

FIGS. 2-4-1 through 2-4-3 illustrate an implementation requiring 73 inputs and 69 outputs. This implementation requires four Association Engines to accomplish the task. In Slice 0, Association Engine 0 and Association Engine 2 are connected to handle input data 0–63. In Slice 1, Association Engine 1 and Association Engine 3 are connected to handle input data 64–72. Slice 0 is effectively connected in series with Slice 1 to handle the input data stream which is greater than 64 inputs. Association Engine 0 and Association Engine 1 are connected to form Bank 0 which is responsible for outputs 0–63. Association Engine 2 and Association Engine 3 are connected to form Bank 1 which is responsible for outputs 64–68.

EXAMPLE 5

A 63 Input by 20 Hidden by 8 Output Feedforward Network

FIG. 2-5-1 through FIG. 2-5-3 depict a two-layer feed-forward network. The Input Layer serves only as a distribution point for the input data to the Hidden Layer. The Hidden Layer is composed of 63 inputs and 20 outputs. The 20 outputs from the Hidden Layer are distributed evenly to all of the inputs of the Output Layer. The Output Layer consists of 20 inputs and 8 outputs. Association Engine 0 forms a single Bank (Bank 0) which implements the Input Layer and the Hidden Layer. These layers take the 63 input samples from the host, perform a network transform function on the data, and then transfer the 20 outputs to the Output Layer. Layer 3 is composed of one Bank (Bank 1). Bank 1 (Association Engine 1) operates on the 20 inputs supplied by the Hidden Layer, performs another network transform function on the data, and generates outputs 0–7. For a more detailed description of the Association Engine and its operation, refer to Section 3 Association Engine Theory of Operation.

(2.1.3) General Data Flow

The Association Engine is capable of being configured in a variety of ways, as illustrated in the previous examples. The flow of data from the simplest configuration (one Association Engine) to the more complex implementations is consistent. Data flows from the host to the Association Engine, from the Association Engine to the Association Engine prime (Association Engine'), and from the Association Engine' back to the host, or onto another layer for multi-layer applications. Although each Association Engine device has a unique number, the prime notation (Association Engine') is used to distinguish Association Engines with different microprogram contents or functions. It should be restated that the use of multiple Association Engines with different microcode is a very powerful feature, in that a single chip type can be used in a wide variety of applications and functions.

The Association Engine contains dedicated ports, labelled N, S, E, and W, for North, South, East, and West respectively. During Host access to the Association Engine array, the ports take on dedicated functions for supplying address and data information to the Association Engine/Host. Under program control, all ports use the same basic transfer protocol allowing them to be interconnected to one another when implementing inter-layer, or intra-layer, communications. The following section will give an overview of data flow through these ports. FIG. 2-6 will be the figure referenced in the data flow discussion.

(2.1.4) Data Flow

Each Association Engine in the subsystem receives address, data and control stimulus from the host system through an external interface circuit. All initialization, status monitoring, and input passes through this interface. In FIG. 2-6, the host interface is connected to the west and south ports. There are several programmable modes for transferring data between the Association Engines and the host, which will be described in detail in later sections. One data transfer mode may be more suitable than the others for accomplishing a specific function such as initialization, status checking, Coefficient Memory Array (CMA) set-up or inputting of operational data for the purposes of computation. This section of the document, with the exception of the discussion on the inputting of operational data, will not discuss the appropriate transfer mode for each function. The details of these transfer modes are discussed in Section 2.2 Association Engine Signal Description and Section 3 Association Engine Theory of Operation. The Association Engine also includes many other programmable features that will be discussed later in this document.

(2.1.5) Initialization

Prior to any operational data being input into the Association Engine, many of the major areas of the device must be initialized. Care has been taken in the definition of the default values for the Association Engine to insure that minimum effort is required by the host to place the Association Engine in an operational state. Refer to Section 3 Association Engine Theory of Operation for a more detailed definition of the areas requiring initialization by the host.

(2.1.6) Input Data

Each Association Engine in the subsystem is responsible for taking the appropriate number of Input Data Vectors, calculating the Partial Synapse Results for the neurons, and transferring the results to the associated Association Engine'. Input data vectors are typically transferred from the host to the Association Engines while the Association Engines are executing their micro programs. These modes of data streaming, along with the other modes of access are described in detail in Section 3.5.1 Host Transfer Modes and Section 3.5.2 Association Engine Transfer Modes.

The Association Engine subsystem shown in FIG. 2-6 supports an Input Data Vector stream of 256 bytes that can be viewed as 4 partial input vectors, as shown in FIG. 2-7. Each Association Engine supports 64 bytes of the Input Data Vector stream. Associated control signals and internal configurations on each Association Engine are responsible for determining when that Association Engine should accept its segment of the data from the host. Association Engine 0 & Association Engine 1 receive the first 64 bytes of the Input Vector (or Partial Input Vector #1), Association Engine 2 & Association Engine 3 receive Partial Input Vector #2, Association Engine 4 & Association Engine 5 receive Partial Input Vector #3, and Association Engine 6 & Association Engine 7 receive Partial Input Vector #4.

As stated before, each Association Engine can receive up to 64 input samples, and each Association Engine calculates up to 64 Partial Synapse Results. Association Engines can be chained together to allow for wider Input Data Vectors. A chain of one or more Association Engines must be connected to an Association Engine' to aggregate the Partial Synapse Results of all the Association Engines in that chain to form the output. A chain of Association Engines connected to a Association Engine' is called a Bank. Each Bank is capable of handling 64 neurons. In FIG. 2-6 there are 2 Banks, Bank 0 and Bank 1. The illustrated subsystem is therefore capable of handling 128 neurons.

In Bank 0, the first partial output value from Association Engine 0 is combined with the first partial output values from Association Engines 2, 4 and 6 to generate the output of the first neuron in that Bank. The aggregation of the total neuron output values is done inside the Association Engine 8'. All Partial Output Values (or Partial Synapse Results, for Neural Network Architectures) are passed from the Association Engines to the Association Engine', across the east/west ports.

(2.1.7) Partial Synapse Result Computation

The Association Engine contains a Single Instruction, Multiple Data (SIMD) computing engine capable of executing a wide variety of arithmetic and logical operations. All 64 Processing Elements compute their data values in lock-step. In most implementations, the Association Engines will be compute bound due to the complexity of the algorithms being supported. The Association Engine, due to its pipelined internal architecture, can hide a significant portion of the compute overhead in the input data transfer time. This is because the Association Engine can begin the compute function as the first sample of the Input Data Vector arrives and does not have to wait for the entire Input Data Vector to be received before starting. A microcode instruction set is available to the user for downloading into the microcode memory array to perform the computations on the input data (refer to Section 2.5 Association Engine Microcode Instruction Set Summary).

(2.1.8) Output Data

Once the Partial Synapse Result is computed for all 64 neurons (the compute function is done in parallel for all 64 neurons) the Partial Synapse Result for each of the 64 neurons is transferred from the Association Engine to the associated Association Engine' over the East-West Port under microprogram control. The Partial Synapse Results transferred from the Association Engine to the Association Engine' may vary in width due to the types of calculations performed or the precision of those calculations. Appropriate control lines, similar to the control lines for the host transfers, are used to sequence the flow of data from each Association Engine to the Association Engine'. As Association Engines complete the calculations for their associated data, they monitor these control lines and, at the appropriate time place their results on the bus. Depending on the size and complexity of the network, external isolation and buffering circuitry may be required for proper bus operation. In most instances though, the control signals used by the Association Engine and the Association Engine' to control the bus are sufficient for controlling this external circuitry. Once all the Partial Synapse Results are totaled together (in the Association Engine') the output function can be applied to the total.

Association Engine SIGNAL DESCRIPTION (2.2)

This section provides a description of the Association Engine input and output signal pins. These signals are classified into several different groups: Port Signals; Host Access Control Signals; System Orchestration Signals; Row and Column Signals; Miscellaneous Signals; and Test Signals. Table 2.1 gives a summary of the Association Engine pins.

Conventions used in this section are the same as those described in Section 1.3 Conventions.

(2.2.1) Association Engine Pin Out

A pin out of the Association Engine is provided in FIG. 2-8.

(2.2.2) Association Engine Run/Stop Mode of Operation

The Association Engine is designed to operate in one of two modes: Run mode or Stop mode. The mode is selected by the $R/\overline{S}$ signal. This signal determines whether the Association Engine is in Run mode ($R/\overline{S}$ at VDD) or Stop mode ($R/\overline{S}$=0). Depending on the mode of operation, the signals on the Association Engine behave differently. Table 2.2 describes the functionality for each mode. Refer to Section 4 Association Engine Bus Operation for specific timing information. Refer to Section 3.5 Port Operation for a description of different data transfers with the Association Engine.

Run mode is used to allow the Association Engine micro program to execute. Stop mode is used to allow external access to the Association Engine internal resources for initialization and debugging by the system host.

(2.2.3) Port Signals

The following describes the four port signal groups on the Association Engine. The four ports are labeled North, South, East, and West for their physical position when looking down on the Association Engine device.

(2.2.3.1) North Data Port(ND[7:0] (71))

These signals transfer address or data information dependent on the Run/Stop mode of operation. In Run mode, this bi-directional port drives as an output in response to the write north microcode instruction (writen, vwriten), and serves as an input when data is being transferred across the North-South ports of the chip. In Stop mode, this port is also bi-directional. If the OP signal indicates a Random Access transfer, and this device is selected ($\overline{ROW}$ and $\overline{COL}$ are both asserted), this port will receive the LSB of the Random Access Address, and will be immediately passed on to the South Port. If this device is not selected, any data received at this port (ND as input) will be passed immediately on to the South Port, and any data received at the South Port will be passed up to, and out of, ND (ND as output). Data values driven out of the Association Engine are enabled on the falling edge of the CLK signal. Address/Data values driven in to the Association Engine are latched on the rising edge of the CLK signal.

(2.2.3.2) North Control Output ($\overline{NCO}$ (73))

This output signal is used to indicate that valid data is being driven out the ND signal lines. This signal will transition on the falling edge of the CLK signal.

(2.2.3.3) North Control Input ($\overline{NCI}$ (75))

This input signal is used to indicate that valid address/data is being driven in on the ND signal lines. This signal will be latched on the rising edge of the CLK signal.

(2.2.3.4) South Data Port(SD[7:0]) (83)

These signals transfer address or data information dependent on the Run/Stop mode of operation. In Run mode, this bidirectional port drives as an output in response to the write south microcode instruction (writes, vwrites), and serves as an input when data is being transferred across the South-North ports of the chip. In Stop mode, this port is also bi-directional. If the OP signal indicates a Random Access transfer, and this device is selected ($\overline{ROW}$ and $\overline{COL}$ are both asserted), SD will either latch the Random Access Data (when $R/\overline{W}$=0) on the rising edge of CLK, or the Random Access Data will be driven out of SD (when $R/\overline{W}$=1) on the falling edge of CLK. If this device is not selected, any data received at this port (SD as input) will be passed immediately on to the North Port, and any data received at the North Port will be passed down to, and out of, SD (SD as output). Data values driven out of the Association Engine are enabled on the falling edge of the CLK signal. Address/Data values driven in to the Association Engine are latched on the rising edge of the CLK signal. Please see Section 2.3.14 Host Stream Select Register (HSSR) for information on how the HSP[1:0] bits can change the operation of this port during Stream Mode Accesses.

(2.2.3.5) South Control Output ($\overline{SCO}$ (85))

This output signal is used to indicate that valid address/data is being driven out the SD signal lines. This signal will transition on the falling edge of the CLK signal.

(2.2.3.6) South Control Input ($\overline{SCI}$ (89))

This input signal is used to indicate that valid data is being driven in on the SD signal lines. This signal will latched on the rising edge of the CLK signal.

(2.2.3.7) East Data Port(ED[7:0] (77))

These signals transfer address or data information depending on the Run/Stop mode of operation. In Run mode, this bi-directional port drives as an output in response to the write east microcode instruction (writee, vwritee), and serves as an input when data is being transferred across the East-West ports of the chip. In Stop mode, any data received at this port (ED as input) will be passed immediately on to the West Port, and any data received at the West Port will be passed over to, and out of, ED (ED as output). Data values driven out of the Association Engine are enabled on the falling edge of the CLK signal. Address/Data values driven in to the Association Engine are latched on the rising edge of the CLK signal. Please see Section 2.3.14 Host Stream Select Register (HSSR) for information on how the HSP [1:0] bits can change the operation of this port during Stream Mode Accesses.

(2.2.3.8) East Control Output ($\overline{ECO}$ (79))

This output signal is used to indicate that valid address/data is being driven out the ED signal lines. This signal will transition on the falling edge of the CLK signal.

(2.2.3.9) East Control Input ($\overline{ECI}$ (81))

This input signal is used to indicate that valid data is being driven in on the ED signal lines. This signal will latched on the rising edge of the CLK signal.

(2.2.3.10) West Data Port(WD[7:0] (91))

These signals transfer address or data information dependent on the Run/Stop mode of operation. In Run mode, this bi-directional port drives as an output in response to the write west microcode instruction (writew, vwritew), and serves as an input when data is being transferred across the West-East ports of the chip. In Stop mode, this port is also bidirectional. If the OP signal indicates a Random Access transfer, and this device is selected ($\overline{ROW}$ and $\overline{COL}$ are both asserted), this port will receive the MSB of the Random Access Address, and will be immediately passed on to the East Port. If this device is not selected, any data received at this port (WD as input) will be passed immediately on to the East Port, and any data received at the East Port will be passed over to, and out of, WD (WD as output. Data values driven out of the Association Engine are enabled on the falling edge of the CLK signal. Address/Data values driven in to the Association Engine are latched on the rising edge of the CLK signal.

(2.2.3.11) West Control Output ($\overline{WCO}$ (93))

This output signal is used to indicate that valid data is being driven out the WD signal lines. This signal will transition on the falling edge of the CLK signal.

(2.2.3.12) West Control Input ($\overline{WCI}$ (95))

This input signal is used to indicate that valid address/data is being driven in on the WD signal lines. This signal will latched on the rising edge of the CLK signal.

(2.2.4) Host Access Control Lines

The following signals are used in Stop mode to access resources inside the Association Engine. Host accesses can be either Random Accesses or Stream Accesses.

(2.2.4.1) Read/Write Control (R/$\overline{W}$ (65))

This input signal is used to control the direction of access to/from the Association Engine. If this signal is high, the access is a read (data is read from the Association Engine), and if this signal is low, the access is a write (data is written to the Association Engine). The R/$\overline{W}$ pin is latched internally on the rising edge of CLK.

(2.2.4.2) Data Enable ($\overline{EN}$ (67))

This active low input signal is the data enable for Host bus transfers. When this signal is asserted (along with the $\overline{ROW}$ and $\overline{COL}$ input), addresses are transferred or data is transferred to an Association Engine until the appropriate number of bytes/words have been transferred or $\overline{EN}$ is negated. The $\overline{EN}$ signal can be used to control the data rate of information flowing into and out of the Association Engine. By holding the $\overline{ROW}$, $\overline{COL}$ lines active and enabling/disabling the $\overline{EN}$ signal the rate of data transfer can be altered. The $\overline{EN}$ pin is latched on the rising edge of CLK.

(2.2.4.3) Access Type (OP) (94)

This input signal is used to indicate what type of Host Access (R/$\overline{S}$=0) is to be performed. The OP pin is latched internally on the rising edge of CLK.

Stream Access Mode is selected when OP=0. When operating in this mode, a starting address and a count is generated internally by using the OARx/DCRx register combination. This mechanism allows streams of data to be written into or read from the Association Engine system. By using a starting address (OARx) and a duration (DCRx) register, the stream of data can be fed to a chain of Association Engines without supplying addresses. The chain is formed by the interconnection of the xCI and xCO signals (see FIG. 2-9). All Association Engines have access to the same data. Direction of the Stream transfer is determined by R/$\overline{W}$. The internal address pointers are incremented automatically after each datum is loaded. Before a Stream Access can be performed on an array of Association Engines, the Host Stream Offset Register (HSOR) must be loaded. For more information on Streaming, refer to Section 3.5.1 Host Transfer Modes.

Random Access Mode is selected when OP=1. In this mode, an address is required for each read or write operation performed by the port. Addresses are presented on the west and north ports (MSbyte, lSbyte of the 16-bit address, respectively). Data is taken or presented (depending on read/write) on the south port.

(2.2.5) System Orchestration Lines

The following signals are used to coordinate the Association Engine system. Most notably the Run/Stop mode, and completion signals for multiple Association Engines.

(2.2.5.1) Run/Stop (R/$\overline{S}$) (80)

This input signal determines the mode of operation of the Association Engine. When this signal is high (VDD), Run mode is selected. When this signal is low (VSS), Stop mode is selected. The R/$\overline{S}$ pin is latched on the rising edge of CLK signal.

Stop mode is primarily for Host initialization and configuration of the Association Engine(s). Run mode is primarily for executing internal microcode and transferring data between Association Engines without host intervention.

(2.2.5.2) Busy ($\overline{BUSY}$) (78)

This active low, open drain output signal is used to indicate that the Association Engine is currently executing instructions. When the Association Engine has executed the done instruction or has completed the selected instruction in single step mode, the $\overline{BUSY}$ pin is negated. The $\overline{BUSY}$ signal is also negated whenever the $\overline{RESET}$ line is activated or the R/$\overline{S}$ signal transitions to the Stop mode. This output is used with an external pull up device to determine when all Association Engines have reached a "done" state. The $\overline{BUSY}$ pin is enabled on the falling edge of CLK signal.

(2.2.6) Row and Column Signals

The $\overline{ROW}$ and $\overline{COL}$ signals perform two different functions depending on the Run/Stop mode. In Run mode these signals are used to assist in minimum and maximum operations between multiple Association Engines. In Stop mode these signals are used to select an Association Engine device for Host transfers.

(2.2.6.1) Row Signal ($\overline{ROW}$ (82))

This active low bi-directional wire-OR'ed signal is used to both select an association Engine in a row and to assist in minimum and maximum functions under microprogram control.

In the Run mode, the $\overline{ROW}$ signal is used by the set of max and min microcode instructions to resolve maximum and minimum functions across chip boundaries among chips which share a common $\overline{ROW}$ line. During these instructions, a data bit from the register which is being tested is written to this wire-OR'ed signal. During the next half clock cycle, the signal is being sensed to see if the data read is the same as the data which was written. Obviously, performing a min or max across chip boundaries requires that the chips perform in lock-step operation (that is, the instructions on separate chips are executed on the same clock).

In the Stop mode the $\overline{ROW}$ signal is used as a chip select input to the Association Engine for the selection of the Association Engine (in a row) for Host accesses.

(2.2.6.2) Column Signal ($\overline{COL}$ (84))

This active low bi-directional wire-OR'ed signal is used to both select an Association Engine in a column and to assist in minimum and maximum functions under microprogram control.

In the Run mode, the $\overline{COL}$ signal is used by the set of max and min microcode instructions to resolve maximum and minimum functions across chip boundaries among chips which share a common $\overline{COL}$ line. During these instructions, a data bit from the register that is being tested is written to this wire-OR'ed signal. During the next half clock cycle, the signal is being sensed to see if the data read is the same as the data which was written. Again, performing a min or max across chip boundaries requires that the chips perform in lock-step operation (that is, the instructions on separate chips are executed on the same clock).

In the Stop mode the $\overline{COL}$ signal is used as a chip select input to the Association Engine for the selection of the Association Engine (in a column) for Host accesses.

(2.2.7) Miscellaneous Signals (2.2.7.1) System Bus Clock (CLK)

This input signal is the system clock for the entire network. All data transfers out of a chip using this clock will transfer output data on the falling edge of the clock and capture input data on the rising edge of the clock. Set up and hold times for all data and control signals are with reference to this clock. The synchronization of this signal across multiple Association Engines is critical to the performance of certain Association Engine instructions (particularly those instructions which are "externally visible", such as rowmin, rowmax, colmin, colmax, vwrite, write, etc.).

(2.2.7.2) System Reset ($\overline{RESET}$)

This active low input signal, connected to the internal system reset), is the system reset applied to all devices in the system. When asserted, it forces all devices to return to their default states. Reset is synchronized internally with the rising edge of CLK. Please see Section 4.3.4 Reset Timing for more information.

(2.2.7.3) Interrupt ($\overline{INTR}$ (66))

This active low, open drain output signal is used to inform the host system that an interrupt condition has occurred. Depending upon the bits that are set in the IMR1 and IMR2 registers, this signal could be asserted for a variety of reasons. Refer to Section 2.3.23 Interrupt Mask Register #1 (IMR1), Section 2.3.25 Interrupt Mask Register #2 (IMR2) and Section 4.3.3 Interrupt Timing for more information.

(2.2.7.4) General Port I/O (PA[1:0] (68))

These active high input/output signals are used for general input/output by the Association Engine microprogram. When these pins are programmed as inputs, data is latched on the rising edge of the CLK signal. When programmed as outputs, these signals enable data out on the falling edge of the CLK signal. These two pins are independently programmable as either inputs or outputs. Refer to Section 2.3.8 General Purpose Port Register (GPPR) for more information about I/O and data programming.

(2.2.7.5) Processor Status (PSTAT[2:0] (86))

These output signals continuously reflect the state of the Association Engine Instruction state. These output signals are driven out on the falling edge of the CLK signal. Refer to Table 2.3 for the possible values of the PSTAT[2:0] signals.

(2.2.8) Test Signals

The four test signals provide an interface that supports the IEEE 1149.1 Test Access Port (TAP) for Boundary Scan Testing of Board Interconnections.

(2.2.8.1) Test Clock (TCK)

This input signal is used as a dedicated clock for the test logic. Since clocking of the test logic is independent of the normal operation of the Association Engine, all other Association Engine components on a board can share a common test clock.

(2.2.8.2) Test Data Input (TDI)

This input signal provides a serial data input to the TAP and boundary scan data registers.

(2.2.8.3) Test Data Output (TDO)

This three-state output signal provides a serial data output from the TAP or boundary scan data registers. The TDO output can be placed in a high-impedance mode to allow parallel connection of board-level test data paths.

(2.2.8.4) Test Mode Select (TMS)

This input signal is decoded by the TAP controller and distinguishes the principle operations of the test-support circuitry.

(2.2.8.5) Test Reset ($\overline{TRST}$)

This input signal resets the TAP controller and IO.Ctl cells to their initial states. The initial state for the IO.Ctl cell is to configure the bi-directional pin as an input. For more information about the boundary scan chain please refer to Section 2.6.3 Data Registers.

(2.2.9) D.C Electrical Characteristics

Table 2.4 shows the Association Engine d.c. electrical characteristics for both input and output functions.

(2.2.10) Association Engine Pin Out

FIG. 2-10 details the pin out of the Association Engine package. Pins labeled "n.c." are no connect pins and are not connected to any active circuitry internal to the Association Engine.

(2.3) Association Engine Host Accessible Registers

The registers described in this section are those internal registers which are accessible during host mode accesses to the Association Engine (i.e. R/$\overline{S}$=0). These registers can be accessed using either Random Access Mode (OP=1) or Stream Access Mode (OP=0). However, the value in the Association Engine Identification Register can not be changed. See Table 2.6 for a list of the host accessible registers.

(2.3.1) Association Engine Identification Register (AIR)

The Association Engine Identification Register (AIR) 330 can be used by the Host, or the microcode, to determine the device type and size. Each functional modification made to this device will be registered by a decrement of this register (i.e. this device has an ID of $FF, the next version of this device will have and ID of $FE, etc.).

This register is positioned at the first of the Host and microcode memory map so that no matter how the architecture is modified, this register will always be located in the same position.

The AIR is a READ-ONLY register, and is accessible by the microcode instruction movfc. The AIR is illustrated in more detail in FIG. 2-11. Please see Section 2.4.5.1 Association Engine Identification Register (AIR) for more details.

(2.3.2) Arithmetic Control Register (ACR)

The Arithmetic Control Register (ACR) 172 controls the arithmetic representation of the numbers in the Vector and Scalar Engines. Table 2.7 provides more information about the ACR.

The SSGN and VSGN bits control whether numeric values during arithmetic operations are considered to be signed or unsigned in the Scalar and Vector Engines, respectively. These bits also control what type of overflow (signed or unsigned) is generated. The default value of these bits are 0, meaning that signed arithmetic is used in the Scalar and Vector Engines by default.

The ACR is accessible by the microcode instructions movci, movtc and movfc. The ACR is illustrated in more detail in FIG. 2-12. Please see Section 2.4.5.2 Arithmetic Control Register (ACR) for more details.

(2.3.3) Exception Status Register (ESR)

The Exception Status Register (ESR) 332 records the occurrence of all pending exceptions. The Association Engine Exception Model is flat (exception processing can not be nested; i.e. only one exception is processed at a time) and prioritized (higher priority exceptions are processed before lower priority exceptions). Each time this register is read by the host, the contents are cleared. Please compare this to the clearing of bits by the rte instruction, as described in Section 2.4.5.3 Exception Status Registers (ESR). Table 2.8 provides more information about the ESR.

The SVE bit indicates when an Overflow Exception has occurred in the Scalar Engine. The VVE bit indicates when an Overflow Exception has occurred in the Vector Engine. That is, if an overflow occurs in any of the 64 processing elements, this bit will be set.

The SDE bit indicates when a Divide-by-Zero Exception has occurred in the Scalar Engine. The VDE bit indicates when a Divide-by-Zero Exception has occurred in the Vector Engine. As with the VVE bit, the VDE bit reflects the Divide-by-Zero status of all 64 processing elements. If a Divide-by-Zero occurs in any of the 64 processing elements, the VDE bit will be set.

The PCE bit indicates if a PC Out-of-Bounds Exception has occurred. PC Out-of-Bounds occurs when the contents of the Program Counter (PC) are greater than the contents of the PC Bounds Register (PBR).

The IOE bit indicates when an Illegal Opcode has been executed by the Association Engine.

The PEE bit indicates when a Port Error Exception has occurred. The possible Port Error Exceptions are described in Section 3.6.4.5 Interpreting Multiple Port Error Exceptions and Table 3.6 Possible Port Error Exceptions.

The ICE bit indicates when an instruction-based IDR contention has occurred. This condition arises when a vstore, vwritel or writel instruction is executed at the same time that an external stream write attempts to load the IDR. This is also considered one of the Port Error Exceptions. The possible Port Error Exceptions are described in Section 3.6.4.5 Interpreting Multiple Port Error Exceptions and Table 3.6 Possible Port Error Exceptions.

For a more detailed description of exception processing, please see Section 3.6.4 Association Engine Exception Model. The ESR is a READ-ONLY register, and is accessible by the microcode instruction movfc. The ESR is illustrated in more detail in FIG. 2-13

(2.3.4) Exception Mask Register (EMR)

The Exception Mask Register (EMR) 334 allows the selective enabling (and disabling) of exception conditions in the Association Engine. When an exception is masked off, the corresponding exception routine will not be called. Table 2.9 provides more information about the EMR.

If the VVEM bit is set, an overflow condition in the Vector Engine will not produce an exception (i.e. exception processing will not occur). Vector Overflow is indicated by the VV bit in the VPCR of each processing element, and globally by the VVE bit in the ESR. By default, VVEM is clear, which means that exception processing will occur when an overflow condition exists in the Vector Engine.

The SDEM bit determines if a Divide-by-Zero condition in the Scalar Engine will cause a change in program flow. If the SDEM bit is set, and a Divide-by-Zero condition does occur in the Scalar Engine, no exception processing will occur. By default, SDEM is clear, which means that exception processing will occur when a Divide-by-Zero condition exists in the Scalar Engine.

The VDEM bit determines if a Divide-by-Zero condition in the Vector Engine will cause a change in program flow. If the VDEM bit is set, and a Divide-by-Zero condition does occur in the Vector Engine, no exception processing will occur. By default, VDEM is clear, which means that exception processing will occur when a Divide-by-Zero condition exists in the Vector Engine.

The PCEM bit determines if a PC Out-of-Bounds will result in exception processing. By default, PCEM is clear, which means that a PC Out-of-Bounds condition will cause exception processing to occur. Since PC Out-of-Bounds is considered to be a "near-fatal" operating condition, it is strongly suggested that this bit remain cleared at all time.

The IOEM bit determines if an Illegal Opcode in the instruction stream will result in exception processing. By default, IOEM is clear, which means that an Illegal Opcode condition will cause exception processing to occur. If this bit is set, Illegal Opcodes will simply overlooked, and no exception processing will occur.

The PEEM bit determines if a Port Error (during Run Mode) will cause exception processing to occur. By default, PEEM is clear, which means that all Port Errors will cause the Port Error Exception routine to be executed. If PEEM is set, all Port Errors will be ignored. This is not advisable.

The ICEM bit determines if a Instruction-based IDR Contention will cause exception processing to occur. By default, ICEM is clear, which means that all Instruction-based IDR Contentions will cause the Instruction-based IDR Contention Exception routine to be executed. If ICEM is set, all Instruction-based IDR Contentions will be ignored.

The EMR is accessible by the microcode instructions movci, movtc and movfc. Please see Section 2.4.5.4 Exception Mask Register (EMR) for more details. The EMR is illustrated in more detail in FIG. 2-14.

(2.3.5) Processing Element Select Register (PESR)

The Processing Element Select Register (PESR) 220 is used during all downward shifting instructions (drotmov, dsrot, dadd, daddp, dmin, dminp, dmax, and dmaxp). The value contained in the PESR indicates which processing element will supply the data which wraps to processing element #0. In essence, PESR indicates the end of the shift chain. The default value of this register is $3F, which indicates that all processing elements will be used in the downward shifting operations.

The PESR is accessible by the microcode instructions movci, movtc and movfc. Please see Section 2.4.5.5 Processing Element Select Register (PESR) for more details. The PESR is illustrated in more detail in FIG. 2-15.

(2.3.6) Port Control Register (PCR)

The Port Control Register (PCR) 52 controls how data flows into and through the Association Engine during Run mode (R/$\overline{S}$=1), and also controls how the Input Data Register is filled during Run mode. The PCR is illustrated in more detail in FIG. 2-16. Table 2.10 provides more information about the PCR.

In Run mode (R/$\overline{S}$=1), the first four bits of this register (NT 70, ET 68, ST 66, and WT 64) are the Tap bits, which control whether or not information written to a port is sent to the Input Data Register (IDR). If data is written by an external device to one of the ports during Run mode, and the Tap bit for that port is set, then the data written to the port will also be written to the IDR.

In Run mode (R/$\overline{S}$=1), the two switch bits (NSS 74 and EWS) 72 control whether information written to one port is written out the opposing port. For instance, if NSS=1, and data is streamed into the North Port, that data will be streamed out of the South Port one clock later. Likewise, if NSS=1 and data is streamed into the South Port, that data will be streamed out of the North Port one clock later.

It is important to note, if the North-South Switch is closed, and both the North Tap and the South Tap are closed, and data is written into the North Port, duplicate data will not be written into the IDR (i.e. the data written in the North Port will not propagate through the switch and then through the South Tap to the IDR).

The Tap and Switch settings are effective only during Run mode (R/S=1). When the Association Engine is stopped (R/$\overline{S}$=0), the $\overline{ROW}$, $\overline{COL}$, $\overline{EN}$ signals and address information determine the data's source/destination.

The Filling Mode Bit (FM) 76 controls how the IDR is filled during Run mode. When FM=0, Input Indexing is used to fill the IDR. When filling the IDR using Input Indexing, the IPR and ILMR determine where the input data is stored, the ICR determines how many bytes will be stored, and the IOR determines when the input data being broadcast is accepted. FIG. 2-17 shows the registers used to implement Input Indexing.

When FM=1, Input Tagging is used. Input Tagging utilizes the IPR and ILMR to determine where the Input Data is to be stored, the ICR determines how many bytes will be stored, and the ITR is used to determine when the input data being broadcast is accepted. FIG. 2-18 shows the registers used to implement Input Tagging.

Remember that when in Run mode, the data is transmitted from chip to chip using Broadcast data transfers, and the destination of these transfers is always the IDR.

Please see the discussion on Input Indexing and Input Tagging in Section 3.5.2.1 Input Indexing and Section 3.5.2.3 Input Tagging.

The PCR is accessible by the microcode instructions movci, movtc and movfc. Please see Section 2.4.5.6 Port Control Register (PCR) for more details.

(2.3.7) Association Engine Port Monitor Register (APMR)

The Association Engine Port Monitor Register (APMR) 336 is used to determine the cause of Port Error Exception in the Association Engine. When the PEE bit of ESR is set, these bits describe the cause of the Port Error Exception. Table 2.10 provides more information about the APMR.

The first four bits of this register (EW, ES, EE, and EN) indicate whether or not a Run mode write through the device was in progress when the error condition occurred (please remember that a Port Error Exception will be generated only during Run mode). The last four bits (IW, IS, IE, and IN) indicate if a microcode write was in progress when the error condition occurred.

Graphical examples of the Port Errors are shown in FIG. 2-20.

For a description of the error codes, please see Section 3.6.4.4 Port Error Exceptions and Section 3.6.4.5 Interpreting Multiple Port Error Exceptions.

The APMR is a READ-ONLY register, and is accessible by the microcode instruction movfc. Please see Section 2.4.5.7 Association Engine Port Monitor Register (APMR) for more details. The APMR is illustrated in more detail in FIG. 2-19.

(2.3.8) General Purpose Port Register (GPPR)

The General Purpose Port Register (GPPR) 338 is used with the General Purpose Direction Register (GPDR) to determine the state of the PA[1:0] signal pins. PA[1:0] is essentially a 2-bit parallel I/O port. This register acts as an interface to this 2-bit parallel I/O port and can either be used by the Host to set system wide parametric values, or can be used by the Association Engine to indicate state information. This register is not altered by the $\overline{RESET}$ signal.

The GPPR is accessible by the microcode instructions movci, movtc and movfc. Please see Section 2.4.5.8 General Purpose Port Register (GPPR) for more details. The GPPR is illustrated in more detail in FIG. 2-21.

(2.3.9) General Purpose Direction Register (GPDR)

The General Purpose Direction Register (GPDR) 340 is used with the General Purpose Port Register (GPPR) to determine the state of the PA[1:0] signal pins. This register controls the direction of each of the signal pins. Please see Table 2.12 for the definition of these bits. The default (or reset) condition of this register is set to $00 at reset, indicating that the PA[1:0] signals operate as inputs.

The GPDR is accessible by the microcode instructions movci, movtc and movfc. Please see Section 2.4.5.9 General Purpose Direction Register (GPDR) for more details. The GPDR is illustrated in more detail in FIG. 2-22.

(2.3.10) IDR Pointer Register (IPR)

The IDR Pointer Register (IPR) 132 is the register used to address the IDR for Broadcast operations during Run mode (R/$\overline{S}$=1). The value contained in this register indicates the starting IDR location to transfer to when the Broadcast transfer is initiated. The IPR can have values ranging from 0 (the first location in the IDR) to 63 (the last location in the IDR). The value of this register at reset is 0, indicating that the first IDR location to receive data during Run mode will be IDR[0].

The IPR register is shadowed by an internal version of the IPR register. This shadow register allows the initial value specified in the IPR to remain unmodified, while the value in the IPR shadow register is being modified to place data into the IDR. The contents of IPR shadow register are incremented each time data is loaded into the IDR. The amount by which the shadow register is incremented is dependent upon the contents of the ILMR register.

The IPR shadow register is loaded from the IPR under the following conditions:

1. When it is loaded;
2. When a done instruction is executed;
3. When the IDRC addressing mode is used; and
4. When the $\overline{RESET}$ signal is toggled (1–>0–>1).

Specifying IDRC as the source operand in a vector instruction clears the IDR valid bits as well as using the contents of the IDR as the vector source. Please refer to Table 2.36 for a list of the possible vector register sources.

Hardware limits: When an attempt is made to write past a boundary of the IDR, or when the normal incrementing the IPR shadow register would make it greater than $3f, an internal flag is set which indicates "IDR Full". All subsequent Run mode writes to the IDR (due to writel, vwritel or external writes) will be ignored. This flag is cleared each time a done instruction is executed, the IDRC addressing mode is used, or the $\overline{RESET}$ signal is asserted.

The IPR is analogous to the OAR1 register used for Host Mode Streaming operations. Also see Section 3.5.2.2 for how the ILMR effects IDR Input Indexing. The IPR is illustrated in more detail in FIG. 2-23.

For a description of how the IDR, IPR, ICR and ILMR work together during Run mode Input Indexing, please see the description of the FM bit in Section 2.3.6 Port Control Register (PCR). The IPR is accessible by the microcode instructions movci, movtc and movfc. Please see Section 2.4.5.10 IDR Pointer Register (IPR) for more details.

(2.3.11) IDR Count Register (ICR)

The IDR Count Register (ICR) 136 is the register used to determine the number of bytes accepted by the IDR during Run mode (R/$\overline{S}$=1) Stream Write operations. The ICR can have values ranging from 0 to 63, a value of 0 indicating 1 byte will be written into the IDR, and 63 indicating that 64 bytes will be written to the IDR. If it is necessary to load 0 bytes into the IDR, the port taps of the Port Control Register (PCR) can be opened. The ICR is used during both Input Indexing (PCR:FM=0) and Input Tagging (PCR.FM=1). The value of this register after reset is 63, indicating 64 bytes will be accepted into the IDR when a Run mode Stream Write begins.

The ICR register is shadowed by an internal version of the ICR register. This shadow register allows the initial value specified in the ICR to remain unmodified, while the value in the ICR shadow register is being modified to place data into the ICR. The contents of ICR shadow register are decremented each time data is loaded into the IDR. The amount by which the shadow register is decremented is dependent upon the contents of the ILMR register.

The ICR shadow register is loaded from the ICR under the following conditions:

1. When it is loaded;
2. When a done instruction is executed;
3. When the IDRC addressing mode is used; and
4. When the $\overline{RESET}$ signal is toggled (1–>0–>1).

Hardware limits: When an attempt is made to write past a boundary of the IDR, or when the normal decrementing the ICR shadow register would make it less than $00, an internal flag is set which indicates "IDR Full". All subsequent Run mode writes to the IDR (due to writel, vwritel or external writes) will be ignored. This flag is cleared each time a done instruction is executed, the IDRC addressing mode is used, or the $\overline{RESET}$ signal is asserted The ICR is analogous to the DCR1 register used for Stop mode Streaming operations. The amount by which the shadow register is decremented is controlled by the contents of the ILMR register. Also see Section 3.5.2.2 for how the ILMR effects IDR indexing.

For a description of how the IDR, IPR, ICR and ILMR work together during Run mode Input Indexing, please see the description of the FM bit in Section 2.3.6 Port Control Register (PCR). The ICR is accessible by the microcode instructions movci, movtc and movfc. Please see Section 2.4.5.11 IDR Count Register (ICR) for more details. The ICR is illustrated in more detail in FIG. 2-24.

(2.3.12) IDR Location Mask Register (ILMR)

The IDR Location Mask Register (ILMR) 134 determines how data is loaded into the IDR during Run mode (R/$\overline{S}$=1). During Random Access Mode, the IDR Pointer Register (IPR) is not used (each location in the IDR must be explicitly addressed). During Stream Write operations, the mask bits determine which internally-generated IDR address bits are "don't cared". The ILMR also functions as the indicator of how much the IDR Pointer Register (IPR) should be incremented when receiving Stream Write data.

The 2 rules which control the operation of the ILMR are as follows:

Bits of the ILMR act as "don't cares" on the internally generated address. This means that data is loaded into those IDR locations which are selected when the address is "don't cared". An ILMR value of 00110000 "don't cares" bits 4 and 5 of the IDR address, which means that the same data is sent to IDR locations 00000000, 00010000, 00100000 and 00110000.

The IPR is incremented by the location of the least significant "0" in the ILMR. That is, if the least significant 0 is in bit location 0, then the IPR will be incremented by $2^0$, or 1, every time data is placed into the IDR. If the least significant 0 is in bit location 3, then the IPR will be incremented by 8 each time.

Please see Section 3.5.2.2 Examples using the ILMR for examples using the ILMR. Also see Section 2.3.6 Port Control Register (PCR) for more detail on loading the IDR during Run mode.

The ILMR is accessible by the microcode instructions movci, movtc and movfc. Please see Section 2.4.5.12 IDR Location Mask Register (ILMR) for more details. The ILMR is illustrated in more detail in FIG. 2-25.

(2.3.13) IDR Initial Offset Register (IOR)

The Initial Offset Register (IOR) 130 is a Run mode only register (R/$\overline{S}$=1) which contains a count of the number of valid datums (i.e. the number of clock cycles) the Association Engine must wait before placing data to the IDR. For example, if IOR contained $0F, this device would let 15 data pass, and the 16th datum would be placed into the IDR at the location specified by the IPR and ILMR. Once this count has been satisfied, the contents of this register are ignored until the next Run mode Stream Write operation.

The IOR is accessible by the microcode instructions movci, movtc and movfc. Please see Section 2.4.5.13 IDR Initial Offset Register (IOR) for more details. The IOR is illustrated in more detail in FIG. 2-26.

(2.3.14) Host Stream Select Register (HSSR)

The Host Stream Select Register (HSSR) 100 allows the Host to define where and how Stream Mode operations affect the Association Engine during Stop mode (R/$\overline{S}$=0). Table 2.13 provides more information about the HSSR.

The first 4 bits (LS[3:0]) of the HSSR are used to select which logical space of the Association Engine data transfer will be sourced from, or written to, during Stream transfers. Since no explicit address is passed to the Association Engine during Stream Access, the access address is specified by the HSSR register, the Offset Address Registers (OAR1 and OAR2), and the Depth Control Registers (DCR1 and DCR2). Table 2.14 shows the locations defined by the LS bits. The HSSR is illustrated in more detail in FIG. 2-27.

The Host Stream Select Port bits (HSP[1:0]) control how data is transferred to and from this device during Host mode Stream operations. These bits operate much like the Switch and Tap bits in the Port Control Register (PCR), but are used only during Host mode accesses. These bits allow Host mode transfers without disturbing the runtime configuration of the Association Engine array (as defined by the Switch and Tap bits).

When HSP[1:0]=00, this device acts as though it has no information to present. The HSP bits work in conjunction with the $\overline{xCI}/\overline{xCO}$ control lines, and data will only be presented when these control lines are in the proper state for the transfer of data. The HSP bits do not control whether or not stream read data being presented at the North Port will be presented at the South Port, nor does it control whether or not stream read data being presented at the West Port will be presented to the East Port. This is simply a method for controlling where data originating from this device will be sent.

(default) When HSP[1:0]=01, Host Stream Data is transferred across the South Port. For Host Read operations, this device presents the data from all accessed locations to the South Port. For Host write accesses, this device receives all data from the South Port.

When HSP[1:0]=10, Host Stream Data is transferred across the East Port. For Host Read operations, this device presents the data from all accessed locations to the East Port. For Host write accesses, this device receives all data from the East Port.

HSP[1:0]=11 is reserved for future use. This encoding causes the Association Engine to perform identically to HSP[1:0]=00, but Motorola reserves the right to change this encoding at any time (i.e. please use HSP[1:0]=00, and do not rely on HSP[1:0]=11). Table 2.15 provides more information about the HSR bits.

(2.3.15) Host Stream Offset Register (HSOR)

The Host Stream Offset Register (HSOR) 222 is used to control Stream Write Access into an Association Engine during Stop mode (R/$\overline{S}$=0). The HSOR is illustrated in more detail in FIG. 2-28. The value contained in this 16-bit register indicates the delay between the time when the first piece of data reaches the device (one cycle after $\overline{xCI}$ is asserted) and when the device starts accepting data. The HSOR works with the DCRx registers to control both the data offset and the duration of the stream that is written into the Association Engine.

For example, given 4 Association Engines (with the values of HSOR and DCR1 as shown in FIG. 2-29) and a stream of 20 datums, the data would be placed into the Association Engines as shown in FIG. 2-29.

As a second example, it is possible to re-arrange the order in which the data is accepted by the Association Engines, thus seeming to re-arrange the order of the chips. And as FIG. 2-30 show, it is even possible for more than one Association Engine in a chain to accept the same data.

North-South Holding Register (NSHR) (2.3.16)

The North-South Holding Register (NSHR) 90 contains status and data regarding the most recent Broadcast transfer between the North and South Ports. Table 2.16 provides more information about the NSHR. The NSHR is illustrated in more detail in FIG. 2-31. The contents of the NSHR are updated each time data is written to the North or South Ports during Run mode (R/$\overline{S}$=1). When the Association Engine is placed into Stop mode (R/$\overline{S}$=0), this register contains the status of the most recent Run mode Stream Write between the North and South Ports. The contents of this register are altered when the North-South Switch (NSS) in the Port Control Register (PCR) is closed (PCR:NSS=1) and data is written to either the North or South Ports during Run mode. The contents of this register are independent of the setting of the North Tap (NT) and South Tap (ST) of the PCR.

The NSHR will not be altered if NSS=0 and data is written to the East or West Port. The contents of the NSHR are also independent of the setting of NT or ST in PCR.

The V bit of the NSHR indicates whether or not the data byte of the NSHR contains valid information.

The DIR bit indicates the data's direction. If the data is the result of a microcode writen, writes, vwriten or vwrites, this bit indicates from which port the data was written. If the data is the result of external data being written through this device, this bit will indicate from which port the data was written.

The SRC bit indicates whether or not the data contained in the NSHR was the result of a microcode writen, writes, vwriten or vwrites. If this bit is not set, the data is the result of an external write to one of the ports through this device.

(2.3.17) East-West Holding Register (EWHR)

The East-West Holding Register (EWHR) 92 contains status and data regarding the most recent Broadcast transfer between the East and West Ports. Table 2.17 provides more information about the EWHR. The EWHR is illustrated in more detail in FIG. 2-32. The contents of the EWHR are updated each time data is written to the East or West Ports during Run mode (R/$\overline{S}$=1). When the Association Engine is placed into Stop mode (R/$\overline{S}$=0), this register contains the status of the most recent Run mode Stream Write between the East and West Ports. The contents of this register are altered when the East-West Switch (EWS) in the Port Control Register (PCR) is closed (PCR:EWS=1) and data is written to either the East or West Ports during Run mode. The contents of this register are independent of the setting of the East Tap (ET) and West Tap (WT) of the PCR.

The EWHR will not be altered if EWS=0 and data is written to the East or West Port. The contents of the EWHR are also independent of the setting of ET or WT in PCR.

The V bit of the EWHR indicates whether or not the data byte of the EWHR contains valid information.

The DIR bit indicates the data's direction. If the data is the result of a microcode writee, writew, vwritee or vwritew, this bit indicates from which port the data was written. If the data is the result of external data being written through this device, this bit will indicate from which port the data was written.

The SRC bit indicates whether or not the data contained in the EWHR was the result of a microcode writee, writew, vwritee or vwritew (and internal write) or if the data is the result of an external write to one of the ports through this device.

(2.3.18) Offset Address Register #1 (OAR1)

Offset Address Register #1 (OAR1) 96 is used during Stop mode (R/$\overline{S}$=0) Stream Accesses to indicate the starting internal address with regards to the logical space, as defined by LS[3:0] of the HSSR. The OAR1 is illustrated in more detail in FIG. 2-33.

OAR1 is shadowed by an internal version of OAR1. This shadow register allows the initial value specified in OAR1 to remain unmodified, while the value in the OAR1 shadow register is being modified to place data into the Association Engine. The contents of the OAR1 shadow register are incremented each time data is loaded into the Association Engine.

The OAR1 shadow register is loaded from OAR1 under the following conditions:

1. When it is loaded;
2. When the Association Engine is selected for Stream Access;
3. When the $\overline{RESET}$ signal is toggled (1->0->1).

The one-dimensional arrays include the Input Data Registers (IDR), the Input Tag Registers (ITR), the Instruction Cache (IC), the Vector Data Registers (V[0] thru V[7]), and the Vector Process Control Registers (VPCR).

OAR1 is also used when performing Stream Mode Access into two-dimensional arrays. In this case, it is used to index into the first dimension of the array (the column index). The only two-dimensional array is the Coefficient Memory Array (CMA).

(2.3.19) Depth Control Register #1 (DCR1)

The contents of Depth Control Register #1 (DCR1) 97 are used during Stop mode ($R/\overline{S}$=0) Stream Access to all one-dimensional and two-dimensional arrays. The internal address generation logic uses the contents of DCR1 to determine the number of bytes to be transferred (in one of the logical spaces as defined by LS[3:0] of the HSSR) for Stream Transfers. The DCR1 is illustrated in more detail in FIG. 2-34.

DCR1 is shadowed by an internal version of DCR1. This shadow register allows the initial value specified in DCR1 to remain unmodified, while the value in the DCR1 shadow register is being modified to place data into the Association Engine. The contents of the DCR1 shadow register are decremented each time data is loaded into the Association Engine.

The DCR1 shadow register is loaded from DCR1 under the following conditions:

1. When it is loaded;
2. When the Association Engine is selected for Stream Access;
3. When the $\overline{RESET}$ signal is toggled (1–>0–>1).

For one-dimensional arrays, this register controls the number of locations that are written to or read from during a streaming operation before control is passed to the next Association Engine in the Association Engine chain. DCR1 is offset by one, so that DCR1=0 will stream exactly one byte, and DCR1=63 will stream 64 bytes. To have an Association Engine not participate in streaming operations, set HSSR:HSP[1:0]=00.

When streaming the entire Random Access Map, holes in the map where there are no useful registers are skipped. Therefore DCR1+OCR1 will not always equal the ending address in the entire Map case. The skipped addresses are listed in Table 2.18.

The reset value of this register is $14FF, which implies that if DCR1 is not altered before a streaming operation occurs, this Association Engine will accept or supply a stream of bytes that equals the size the Random Access Map minus the unused locations.

The one-dimensional arrays include the Input Data Registers (IDR), the Input Tag Registers (ITR), the Instruction Cache (IC), the Vector Data Registers (V[0] thru V[7]), and the Vector Process Control Registers (VPCR).

DCR1 is also used when performing Stream Mode Access into two-dimensional arrays. In this case, it is used to control the number of entries that are placed into each row. The only two-dimensional array is the Coefficient Memory Array (CMA).

For Stop mode ($R/\overline{S}$=0) Streaming Operations, the $\overline{xCO}$ signal is asserted when: 1) the number of datums specified by DCR1 and DCR2 have been transferred; or 2) when the internal address generator attempts to stream past the space defined by HSSR:LS[3:0].

(2.3.20) Offset Address Register #2 (OAR2)

Used with the two-dimensional array addressing only, Offset Address Register #2 (OAR2) 98, in conjunction with the OAR1 register, controls the first row location that is written to or read from during Host Mode ($R/\overline{S}$=0) Stream access. The reset value of this register is $0, implying that, if this register is not altered before a Stream operation occurs, a Stream Access into the CMA will begin with the first row (row #0). The maximum value of this register is 63 ($3F), due to the fact that the CMA is the largest (and only) two-dimensional array, and therefore only 64 locations in the y direction. Any value larger than $3F written to this register will result in a modulo-64 value.

OAR2 is shadowed by an internal version of OAR1. This shadow register allows the initial value specified in OAR2 to remain unmodified, while the value in the OAR2 shadow register is being modified to place data into the Association Engine. The contents of the OAR2 shadow register are incremented each time data is loaded into the Association Engine. The OAR2 is illustrated in more detail in FIG. 2-35.

The OAR2 shadow register is loaded from OAR2 under the following conditions:

1. When it is loaded;
2. When the Association Engine is selected for Stream Access;
3. When the $\overline{RESET}$ signal is toggled (1–>0–>1).

Please remember that OARx and DCRx are Stop mode only registers, and are not used during Run mode operation.

(2.3.21) Depth Control Register #2 (DCR2)

Used with two-dimensional arrays only, Depth Control Register #2 (DCR2) 99, in conjunction with DCR1, controls the number of locations in a two-dimensional array that can be written to or read from during a streaming operation before control is passed to the next Association Engine in the chain. The reset value of this register is $3F, or 63, which implies that if this register is not altered before a Stream transfer occurs to the CMA, all 64 rows (in a single column) of the CMA will be accessed. Control is passed to the next Association Engine in the Association Engine chain by asserting the $\overline{xCO}$ signal. Note that DCR2 is offset by one, so that DCR2=0 will access one row of the CAM. The DCR2 is illustrated in more detail in FIG. 2-36.

For Stop Mode ($R/\overline{S}$=0) Streaming Operations, the $\overline{xCO}$ signal is asserted when: 1) the number of datums specified by DCR1 and DCR2 have been transferred; or 2) when the internal address generator attempts to stream past the space defined by HSSR:LS[3:0].

In Stop mode ($R/\overline{S}$=0), OAR1, DCR1, OAR2 and DCR2 are transferred to shadow registers at the beginning of a Stream transfer (when $\overline{ROW}$ and $\overline{COL}$ of the Association Engine are selected). The values contained in these shadow registers are used until the Association Engine is de-selected. In other words, if the OAR or DCR registers are modified during a Stream operation, this change will not be reflected until the current transfer has terminated, and a new Stream operation is initiated.

DCR2 is shadowed by an internal version of DCR2. This shadow register allows the initial value specified in DCR2 to remain unmodified, while the value in the DCR2 shadow register is being modified to place data into the Association Engine. The contents of the DCR2 shadow register are decremented each time data is loaded into the Association Engine.

The DCR2 shadow register is loaded from DCR2 under the following conditions:

1. When it is loaded;
2. When the Association Engine is selected for Stream Access;
3. When the $\overline{RESET}$ signal is toggled (1–>0–>1).

Please remember that OARx and DCRx are Stop mode only registers, and are not used during Run mode operation.

For a description of how OAR1, DCR1, OAR2 and DCR2 are used during Stream Access Mode, please see Section 3.5.1.2 Host Stream Access Mode.

(2.3.22) Interrupt Status Register #1 (ISR1)

Interrupt Status Register #1 (ISR1) 342 can be used by the host to determine the cause of flow related interrupts generated by the Association Engine. The bits of the ISR1 have a one-to-one correspondence with the bits in Interrupt Mask Register #1 (IMR1). The bits of ISR1 are set regardless of the state of the corresponding (IMR1) bit. This allows the host to poll conditions, rather than having those conditions generate external interrupts. After ISR1 is read by the host, all bits are cleared. In this way, ISR1 contains any change in status since the last read. The ISR1 is illustrated in more detail in FIG. 2-37. Table 2.19 provides more information about the ISR1.

If the SVI bit is set, a microcode arithmetic operation in the Scalar Engine caused an overflow.

If the VVI bit is set, a microcode arithmetic operation in the Vector Engine caused an overflow.

If the SDI bit is set, a microcode division operation in the Scalar Engine has caused a Divide-by-Zero.

If the VDI bit is set, a microcode division operation in the Vector Engine has caused a Divide-by-Zero.

If the PCI bit is set, the Program Counter (PC) has exceeded its bounds and the Microsequencer has begun to execute in the data space. This mechanism is similar to a page exception of a microprocessor memory management unit.

If the IOI bit is set, an Illegal Opcode was detected in the instruction stream.

If the PEI bit is set, an error was detected during port operations. To determine the cause of the port error, the Association Engine Port Monitor Register (APMR) should be read.

If the ICI bit is set, an Instruction-based IDR Contention has occurred. This condition arises when a vstore, vwritel or writel instruction is executed at the same time that an external stream write attempts to load the IDR.

The bit values contained in this register, along with the bit values contained in Association Engine Interrupt Mask Register #1 (ISR1) will ultimately determine when and if an external interrupt is generated.

(2.3.23) Interrupt Mask Register #1 (IMR1)

Interrupt Mask Register #1 (IMR1) 344 works in conjunction with Interrupt Status Register #1 (ISR1) to enable or disable external interrupts. If an internal condition causes a bit to be set in ISR1, and the corresponding bit(s) in IMR1 are set, then an external interrupt will be generated. The IMR1 is illustrated in more detail in FIG. 2-38. Table 2.209 provides more information about the IMR1.

If SVIM is set, a Scalar Engine Overflow will not generate an external interrupt.

If VVIM is set, a Vector Engine Overflow will not generate an external interrupt.

If SDIM is set, a Scalar Engine Divide-by-Zero will not generate an external interrupt.

If VDIM is set, a Vector Engine Divide-by-Zero will not generate an external interrupt.

If the PCIM bit is set, PC Out-of-Bounds will not generate an external interrupt. Conversely, if the PCM bit is set, a PC Out-of-Bounds will generate an external interrupt.

If the IOIM bit is set, the execution of an Illegal Opcode will not generate an external interrupt.

If the PEIM bit is set, an error at a port will not generate an external interrupt. If the PEIM bit is not set, any port related error will generate an external interrupt. The default setting for the PEIM bit is 0. For a listing of the port conditions which could possibly cause an external interrupt, please see Table 3.6.

If the ICIM bit is set, an Instruction-based IDR Contention will not generate an external interrupt. If the ICIM bit is cleared, an Instruction-based IDR Contention will generate an external interrupt. This condition arises when a vstore, vwritel or writel instruction is executed at the same time that an external stream write attempts to load the IDR.

(2.3.24) Interrupt Status Register #2 (ISR2)

Interrupt Status Register #2 (ISR2) 346 can be used by the host to determine if a Scalar or Vector Engine arithmetic operation caused an interrupt condition. This register, combined with Interrupt Mask Register #2 (IMR2) will ultimately determine whether or not an external interrupt is generated. The ISR2 is illustrated in more detail in FIG. 2-39. Tables 2.21 and 2.22 provide more information about the ISR2.

Even though the bits of this register correspond to specific exception conditions of the Association Engine, it should be remembered that interrupt conditions are orthogonal to exception conditions.

If the HLTI bit is set, a halt instruction has been executed.

The SI[2:0] bits are set when an intr #n instruction is executed. An intr #6 software interrupt will set the SI[2:0] =110.

(2.3.25) Interrupt Mask Register #2 (IMR2)

Association Engine Interrupt Mask Register #2 (IMR2) 348 allows the host to mask Vector and Scalar arithmetic interrupts. If a bit in IMR2 is set, the corresponding interrupt condition will not cause an external interrupt to be generated. Likewise, for every bit in IMR2 which is clear, the corresponding condition will generate an external interrupt. The IMR2 is illustrated in more detail in FIG. 2-40. Tables 2.23 2.24 provide more information about the IMR2.

If the HLTM bit is set, the execution of a halt instruction will not generate an external interrupt. Conversely, if the HLTM bit is set, the execution of a halt instruction will generate an external interrupt.

The SIM[2:0] bits allow ranges of software interrupts to be masked off. The highest priority software interrupt is software interrupt #7, which is generated by the instruction intr #7. The lowest priority software interrupt is software interrupt #1, which is generated by the instruction interrupt #1.

(2.3.26) Microsequencer Control Register (MCR)

The Microsequencer Control Register (MCR) 188 controls how and when instructions are issued by the Microcode Sequencer. The MCR is illustrated in more detail in FIG. 2-41. Tables 2.25 and 2.26 provide more information about the MCR.

The SS bit allows a single instruction to be executed by the Microsequencer. The state of the SS bit is queried at the start of each instruction. If the state of SS changes during the execution of an instruction, its effect will not take place until the start of the next instruction. After each instruction is executed, the PC is incremented, and the $\overline{BUSY}$ signal is set active. The next instruction will not be executed until the R/$\overline{S}$ signal is toggled from 1->0->1.

The RSA bit can be used by the host to reset the Association Engine to a known state. The setting of this bit does not clear out the Coefficient Memory (CMA), nor does it affect the Instruction Cache (IC). Compare the setting of this bit with the operation of the restart instruction (it is different).

The STKF bit indicates the state of the stack in the CMA. If the stack is empty, then this bit has a value of 1. If the CMA stack contains at least one valid return address, STKF has a value of 0.

The FLSF bit indicates whether the FLS register currently contains a valid return address. If it does, FLSF bit will be 1, otherwise it will be 0.

The RELF bit indicates if a repeate loop has been initiated and is considered active. If it has, the RELF bit will be 1, otherwise it will be 0.

The RPLF bit indicates if a repeat loop has been initiated. If it has, the RPLF bit will be 1, otherwise it will be 0.

The ILF bit controls instruction execution in the microsequencer. When this bit is set, the microsequencer is effectively disabled, and toggling of the R/$\overline{S}$ signal will not advance the PC. The ILF bit is set by the Association Engine if a done or halt instruction is executed during Single Step mode. The allows multiple Association Engines with differing code sizes to synchronize, even while single stepping. While this bit is set, the Association Engine is still capable of accepting data into the IDR and transferring data across the ports. In order to allow another instruction to be executed, the ILF must be cleared.

The operation of the FLS and the stack along with FLSF and STKF bits may be more apparent with the example shown in FIG. 2-42.

When Code Block #1 is being executed, the FLS is considered empty (because the FLSF bit is 0) and the stack contains no return addresses.

When bsr C2 is executed, $0042 (the address following the bsr C2 instruction) is placed into the FLS, and the PC is set to the address of the label C2.

When bsr C3 is executed, $0082 is placed onto the stack. The STKF bit takes the LSbit position of the return address on the stack, thus the actual value on the stack is $0083. The PC is set to the address of the label C3.

When bsr C4 is executed, $00a2 is placed onto the stack The STKF bit takes the LSbit position of the return address on the stack, thus the actual value on the stack is $00a2. The PC is set to the address of the label C3.

When return is executed in Code Block #4, SP is first incremented, and the return address is pulled from the stack. The LSbit of the value pulled from the stack is the new value of STKF. Recall that STKF=0 means that the CMA still contains another return address, so the next return instruction will get the return address from the stack.

When return is executed in Code Block #3, SP is again incremented, and the return address is pulled from the stack. The LSbit of the value pulled from the stack is 1, which is the new value for STKF. When STKF=1, the next return instruction will get the return address from the FLS.

When return is executed in Code Block #2, the return address is pulled from the FLS (because FLSF:STKF=1:0). The FLSF is then cleared, which means that the FLS contents are invalid.

If a return is performed while FLSF is 0, the value contained in the FLS is placed into the PC, even though the FLS value is invalid.

(2.3.27) Microsequencer Status Register (MSR)

The Microsequencer Status Register (MSR) 350 reflects the current operational status of the Association Engine Microsequencer. The MSR is illustrated in more detail in FIG. 2-43. Tables 2.27 and 2.28 provide more information about the MSR.

The R bit indicates whether or not the microsequencer was stopped during the execution of an instruction when the Association Engine was placed in Stop mode (R/$\overline{S}$=0). If an instruction was being executed, the R bit will be set. Otherwise it will be cleared.

The EXE[2:0] bits reflect the current status of the PSTAT signal pins of the Association Engine. This allows the Host to determine the class of operation which was taking place when the Association Engine transitioned from Run mode (R/$\overline{S}$=1) to Stop mode (R/$\overline{S}$=0).

(2.3.28) Scalar Process Control Register (SPCR)

The Scalar Process Control Register (SPCR) 208 controls the flow of multi-byte arithmetic and logical operations, and can also be used to indicate the status of the most recent arithmetic operations. The SPCR is illustrated in more detail in FIG. 2-44. Table 2.29 provides more information about the SPCR.

The Scalar Extension Bits (SX[1:0]) are used to extend the precision of certain arithmetic instructions. For a description of how these bits are set, and how they are used, please see Section 2.5.19 Description of Multi-byte Operations.

The Scalar Overflow Bit (SV) and the Scalar Overflow Direction Bit (SD) are used to indicate both the occurrence of overflow in the previous arithmetic operation, and, if overflow occurred, the direction in which overflow was taken.

(2.3.29) Instruction Register (IR)

The Instruction Register(IR) 352 is a 16-bit register which is used to hold the instruction currently being executed. This register is not altered when $\overline{\text{RESET}}$ is applied to the Association Engine. The IR is illustrated in more detail in FIG. 2-45.

(2.3.30) Instruction Cache Line Valid Register (ICVR)

The Instruction Cache Line Valid Register (ICVR) 354 indicates the status of the Instruction Cache (IC) and Instruction Cache Tags (ICT0 to ICT3). The ICVR is illustrated in more detail in FIG. 2-46. Table 2.30 provides more information about the ICVR.

If ICV0 is set, Cache Line #0 contains valid instructions. If this bit is clear, the contents of Cache Line #0 are indeterminate.

If ICV1 is set, Cache Line #1 contains valid instructions. If this bit is clear, the contents of Cache Line #1 are indeterminate.

If ICV2 is set, Cache Line #2 contains valid instructions. If this bit is clear, the contents of Cache Line #2 are indeterminate.

If ICV3 is set, Cache Line #3 contains valid instructions. If this bit is clear, the contents of Cache Line #3 are indeterminate.

(2.3.31) Program Counter (PC)

The Program Counter (PC) 186 is a 16-bit register which indicates the location in the Microcode Memory Array (MMA) of the instruction currently being executed. Out of reset, the 16-bit address contained in the Exception Pointer Program Counter (EPPC) is loaded into the PC. The PC is illustrated in more detail in FIG. 2-47.

For a description on how the PC is used in conjunction with the Instruction Cache Tags (ICT0–ICT3), please see Section 3.3.4. For a more detailed description of how the MMA is defined in terms of the CMA, please see Section 3.3.2 CMA and MMA mapping. For more information on the Exception Pointer Table, please see Section 2.3.44 Exception Pointer Table.

(2.3.32) PC Bounds Register (PBR)

The PC Bounds Register (PBR) 356 is a 15-bit register which contains the address of the first non-instruction related address. During each instruction prefetch, the PC is checked against the PBR. If the PC is greater than the PBR, a PC Out-of-Bounds condition exists. If the PCEM bit of the EMR is set (default), then the ESR registers the condition, but no exception is taken. If PCEM=1, the condition is registered in ESR, and EPOB is placed into PC, and the PC Out-of-Bounds exception is taken. If the PC is less than the PBR, the instruction pointed by the PC is loaded into the microsequencer for execution. The PBR is illustrated in more detail in FIG. 2-48.

The PBR is useful during the debugging of algorithms, restricting the PC to a specific maximum value. This register is initialized out of $\overline{\text{RESET}}$ with a value of $FFFE, which indicates that all possible values for PC are valid (thus effectively disabling PC Bounds Checking).

(2.3.33) Instruction Cache Tag #0 (ICT0)

Instruction Cache Tag #0 (ICT0) 358 is used to determine which column of the CMA is currently loaded into Line #0 of the Instruction Cache (IC). The ICT0 is illustrated in more detail in FIG. 2-49.

To determine a cache hit or cache miss, ICT0 is compared against the MSByte of the PC before the execution of each instruction. If the MSByte of the PC does not match any of the tag registers, then a new line containing the next instruction (pointed to by the PC) must be loaded into the Instruction Cache.

If bits 7 and 6 of the PC are equal to 00, then the new line of instructions will be loaded into Instruction Cache Line #0 when there is a miss. ICT0 will be loaded with the MSByte of the PC, and the valid bit for Cache Line #0 (ICV0) in the Instruction Cache Valid Register (ICVR) will be set.

(2.3.34) Instruction Cache Tag #1 (ICT1)

Instruction Cache Tag #1 (ICT1) 360 is used to determine which column from the CMA is currently loaded into Line #1 of the Instruction Cache (IC). The ICT1 is illustrated in more detail in FIG. 2-50.

To determine a cache hit or cache miss, ICT1 is compared against the MSByte of the PC before the execution of each instruction. If the MSByte of the PC does not match any of the tag registers, then a new line containing the next instruction (pointed to by the PC) must be loaded into the Instruction Cache.

If bits 7 and 6 of the PC are equal to 01, then the new line of instructions will be loaded into Instruction Cache Line #1 when there is a miss. ICT1 will be loaded with the MSByte of the PC, and the valid bit for Cache Line #1 (ICV1) in the Instruction Cache Valid Register (ICVR) will be set.

(2.3.35) Instruction Cache Tag #2 (ICT2)

Instruction Cache Tag #2 (ICT2) 362 is used to determine which column from the CMA is currently loaded into Line #2 of the Instruction Cache (IC). The ICT2 is illustrated in more detail in FIG. 2-51.

To determine a cache hit or cache miss, ICT2 is compared against the MSByte of the PC before the execution of each instruction. If the MSByte of the PC does not match any of the tag registers, then a new line containing the next instruction (pointed to by the PC) must be loaded into the Instruction Cache.

If bits 7 and 6 of the PC are equal to 10, then the new line of instructions will be loaded into Instruction Cache Line #2 when there is a miss. ICT2 will be loaded with the MSByte of the PC, and the valid bit for Cache Line #2 (ICV2) in the Instruction Cache Valid Register (ICVR) will be set.

(2.3.36) Instruction Cache Tag #3 (IC3)

Instruction Cache Tag #3 (ICT3) 364 is used to determine which column from the CMA is currently loaded into Line #3 of the Instruction Cache (IC). The ICT3 is illustrated in more detail in FIG. 2-52.

To determine a cache hit or cache miss, ICT3 is compared against the MSByte of the PC before the execution of each instruction. If the MSByte of the PC does not match any of the tag registers, then a new line containing the next instruction (pointed to by the PC) must be loaded into the Instruction Cache.

If bits 7 and 6 of the PC are equal to 11, then the new line of instructions will be loaded into Instruction Cache Line #3 when there is a miss. ICT3 will be loaded with the MSByte of the PC, and the valid bit for Cache Line #3 (ICV3) in the Instruction Cache Valid Register (ICVR) will be set.

(2.3.37) Stack Pointer (SP)

The Stack Pointer (SP) 366 is a 16-bit register which defines the location in the Coefficient Memory Array (CMA) where subroutine return addresses are held, and where data local to subroutines is placed using the load/store instructions. The SP is illustrated in more detail in FIG. 2-53.

Upon $\overline{\text{RESET}}$, the Stack Pointer is loaded with the contents of the Exception Pointer Stack Pointer (EPSP), one of the registers located in the Exception Pointer Table. For more information on the Exception Pointer Table, please see Section 2.3.44 Exception Pointer Table.

(2.3.38) First Level Stack (FLS)

The First Level Stack (FLS) 368 allows quick execution of single-level subroutine calls. The value contained in FLS would normally be placed on the top of the stack when a jump to subroutine (jsr) instruction is executed. To eliminate the time necessary for stack manipulation (during the call and on the return), the return address is placed into the First Level Stack register. The FLS is illustrated in more detail in FIG. 2-54.

If two bsr instructions are made without an intervening return instruction, the second jsr is forced to store its return address on the stack (referenced by SP).

(2.3.39) Repeat Begin Register (RBR)

The Repeat Begin Register (RBR) 180 is used by the repeat and repeate instructions to allow rapid execution of the inner loop of programs. The RBR is illustrated in more detail in FIG. 2-55. When the repeat or repeate instruction is executed, a value of PC+2 is loaded into the RBR. At the end of the loop (when the value in the Repeat End Register (RER) matches the address of the instruction currently being executed), the Program Counter (PC) is loaded with the contents of the RBR.

Please refer to the repeat and repeate instructions in Section 2.5.16 Scalar Engine Program Flow Control Operations.

(2.3.40) Repeat End Register (RER)

The Repeat End Register (RER) 182 is used by the repeat and repeate instructions to allow rapid execution of the inner loop of programs. The RER is illustrated in more detail in FIG. 2-56. When the repeat or repeate instruction is executed, the address in the instruction which indicates the final instruction in the loop is loaded into the RER register. The value in this register is then compared against the address of the instruction currently being executed. If the comparison results in a match, the contents of the Repeat Count Register (RCR) is decremented, and if RCR is equal to zero, the repeat loop is exited. If RCR is not equal to zero, the contents of RBR is loaded into the Begin Counter (PC) and the loop goes through another iteration.

Please refer to the repeat and repeate instructions in Section 2.5.16 Scalar Engine Program Flow Control Operations.

(2.3.41) Repeat Count Register (RCR)

The Repeat Count Register (RCR) 184 is used by the repeat and repeate instructions to allow rapid execution of the inner loop of programs. The RCR is illustrated in more detail in FIG. 2-57. When the repeat(e) instruction is executed, the count value is loaded into the RCR register from the G register specified in the instruction (G[0]–G[7]). The RCR controls how many times the repeat(e) loop is executed. Each time the Repeat Pointer Register (RBR) matches the address of the currently executing instruction, the contents of RCR is decremented by 1. When RCR equals zero, the loop is exited.

Please refer to the repeat and repeate instructions in Section 2.5.16 Scalar Engine Program Flow Control Operations.

(2.3.42) Global Data Registers (G[0]–G[7])

The Global Data Registers (G[0]–G[7]) 302, located in the Scalar Processing Engine, are a set of general purpose data registers. The use of these registers is interchangeable, which means that these registers are not used by the Association Engine for anything other than general purpose data.

The Global Data Registers are actually padded by three empty locations, as shown in FIG. 2-58. This padding is to allow for future growth without requiring the memory map to change. It is considered a legal operation to write to these locations, and when they are read, these locations give $00.

(2.3.43) Global Pointer Registers (P[0]–P[7])

The Global Pointer Registers (P[0]–P[7]) 300, located in the Scalar Processing Engine, are multi-purpose. They can be used as data registers, in which case they operate exactly like the Global Data Registers. They can also be used as indirect pointers in instructions which use the indirect form of data access.

The Global Pointer Registers are actually padded by three empty locations, as shown in FIG. 2-59. This padding is to allow for future growth without requiring the memory map to change. It is considered a legal operation to write to these locations, and when they are read, these locations give $00.

(2.3.44) Exception Pointer Table

The registers of the Exception Pointer Table 370 as shown in FIG. 2-60 allow the Host to determine the exact response of the Association Engine in the event of an exception.

The Exception Pointer Table was placed into the Host Accessible Register Map so that small programs, small enough to fit entirely in the Instruction Cache (IC), could allocate the entire Coefficient Memory Array (CMA) for data storage.

EPPC - (Reset Initial Program Counter) - The value contained in this 16-bit register is loaded into the Program Counter (PC) when the Association Engine is brought out of reset.

EPSP - (Reset Initial Stack Pointer) - The value contained in this 16-bit register is loaded into the Stack Pointer (SP) when the Association Engine is brought out of reset.

EPSV - (Scalar Overflow Exception Pointer) - If an arithmetic overflow occurs within the Scalar Engine, and if the Scalar Overflow Exception Mask bit (SVEM) in the Exception Mask Register (EMR) is clear, then the contents of the EPSV are loaded into the PC on the next clock.

EPVV- (Vector Overflow Exception Pointer) - If an arithmetic overflow occurs within the Vector Engine, and if the Vector Overflow Exception Mask (VVEM) in the Exception Mask Register (EMR) is clear, then the contents of the EPVV are loaded into the PC on the next dock.

EPSZ - (Scalar Divide-by-Zero Exception Pointer) - If Divide-by-Zero occurs within the Scalar Engine, and if the Scalar Divide-by-Zero Exception Mask bit (SDEM) of the Exception Mask Register (EMR) is clear, the contents of the EPSZ will be loaded into the PC on the next clock.

EPVZ - (Vector Divide-by-Zero Exception Pointer) - If Divide-by-Zero occurs within the Vector Engine, and if the Vector Divide-by-Zero Exception bit (VDEM) of the Exception Mask Register (EMR) is clear, then the contents of the EPVZ will be loaded into the PC on the next dock.

EPOB - (PC Out-of-Bounds Exception Pointer) - If the Program Counter (PC) exceeds the value contained in the PC Bounds Register (PBR), and if the PC Out-of-Bounds Exception Mask bit (PCEM) of the Exception Mask Register (EMR) is clear, then the value contained in the EPOB will be loaded into the PC on the next clock.

EPIO - (Illegal Opcode Exception Pointer) - If an opcode which is not implemented on the current version of the Association Engine is decoded, and if the Illegal Opcode Exception Mask bit (IOEM) of the Exception Mask Register (EMR) is clear, then the contents of the EPIO are loaded into the PC on the next clock.

EPPE - (Port Error Exception Pointer) - If any of the Port Error Exceptions listed in Table 3.6 occur, and the Port Error Exception Mask bit (PEEM) of the Exception Mask Register (EMR) is clear, then the value contained in the EPPE will be loaded into the PC on the next clock.

Please see Section 2.3.4 Exception Mask Register (EMR) for more information on enabling and disabling exceptions.

All other exceptions are processed according to the flow diagram found in FIG. 2-61. When an exception is detected, the Microsequencer pushes the current value of the Program Counter (PC) onto the stack. The address corresponding to the exception is read from the Exception Pointer Table and loaded into the PC. The exception routine pointed to by the exception pointer is then executed. An exception routine is usually terminated with a rte instruction, which will cause the Microsequencer to retrieve the stacked PC value and return to the location previous to the exception condition.

If a second exception occurs before the first exception has been fully processed, the Association Engine will move to the idle state, effectively executing a nop instruction until the Association Engine is reset.

(2.3.45) Input Data Registers (IDR)

The Input Data Register (IDR) 18 is a 64-location array which holds the Run mode input data values. The IDR is illustrated in more detail in FIG. 2-62. The IDR is the only externally writable location during Run mode. If a tap bit in the Port Control Register (PCR) is set for a particular port, and data is written into that port, then the data will be placed into the IDR. Each location of the IDR is actually 9 bits wide: 8 bits are used to hold the actual data; and the 9th bit is a valid bit.

The Valid Input Data bit (VID bit) for IDR[0] is contained in PE[0]:VPCR, VID bit for IDR[1] is contained in PE[1]:VPCR. As each datum is written into an IDR location, the corresponding valid bit is set. The valid bits are used to control the execution of microcode instructions. If a location in the IDR is accessed (read) by a microcode instruction, and the corresponding valid bit is not set, the SIMD Control Block will "stall" until data is written into that IDR location by an external source.

During Stop mode ($R/\overline{S}$=0), the IDR can be loaded using either Random or Stream Access Modes. During Run mode ($R/\overline{S}$=1), data is transferred using Stream Access, and the IDR can be loaded using either Input Indexing or Input Tagging. The FM bit of the Port Control Register (PCR) is used to determine which method (Indexing or Tagging) is to be used.

For specifics on how the IDR can be loaded, please see Section 3.5.2 Association Engine Transfer Modes and Section 3.5.1 Host Transfer Modes. Please see Section 2.3.47 Vector Process Control Register (VPCR) for a description on the bits of the VPCR.

(2.3.46) Vector Data Registers (V[0] through V[7])

Each Processing Element in the Vector Engine contains a set of 8 Vector Data Registers (V[0]–V[7]) 128. The vector data registers are illustrated in more detail in FIG. 2-63. These registers can be used as temporary and resultant storage during computation. The use of these registers is interchangeable, which means that these registers are not used by the Association Engine for anything other than general purpose data.

(2.3.47) Vector Process Control Register (VPCR)

Each Processing Element of the Vector Engine contains a Vector Process Control Register (VPCR) 102 which controls the flow of multi-byte arithmetic and logical operations. The VPCR can also be used to indicate the status of the most recent arithmetic operations. The VPCR is illustrated in more detail in FIG. 2-64. Table 2.31 provides more information about the VPCR.

The Vector Extension Bits (VX[1:0]) are used to extend the precision of certain arithmetic instructions. For a description of how these bits are set, and how they are used by the microcode, please see Table 2.64 in Section 2.5 Association Engine Microcode Instruction Set Summary and Section 2.5.20 Process Computation Control.

The Vector Overflow Bit (VV) and the Vector Overflow Direction Bit (VD) are used to indicate both the occurrence of overflow in the previous arithmetic operation, and, if overflow occurred, the direction in which overflow was taken. For instructions which provide saturation protection, VV indicates if saturation occurred, while VD indicates which direction the saturation occurred. For a more complete description of how the VV and VD bits are set and used, please see Table 2.64 in Section 2.5 Association Engine Microcode Instruction Set Summary.

The Vector Conditional Bits (VT and VH) allow the conditional vif-velse-vif-vendif instructions to operate properly (and independently) on all processing elements. When the VT bit of a processing element is not set (VT =0), the entire shelf (processing element and its 64 CMA locations) is considered inactive. If the destination of an instruction is one of the Vector Registers (V[0]–V[7]) or the CMA, then the destination will not be updated. The VH bit allows the velse-vif part of the conditional structure to operate properly. This indicates whether or not the processing element has won a conditional if statement since the execution of the last vendif instruction.

The Valid Input Data Bit (VID) indicates whether the corresponding location in the Input Data Register (IDR) is valid. For example, if IDR[13] is written, then VID in processing element #13 is set (PE[13]:VID=1).

For a description of saturation, please see Section 2.5.9 Saturating verses Non-saturating Operations. For a review of the instructions which set the bits of the VPCR, please see Table 2.64.

(2.3.48) Input Tag Registers (ITR)

The Input Tag Registers (ITR) 138 provide a mechanism to control when data is written into the Input Data Registers (IDR) while in Run mode (R/$\overline{S}$=1). The ITR is illustrated in more detail in FIG. 2-65. The usage of the ITR is controlled by the FM bit in the Port Control Registers (PCR). When the FM bit is cleared, the IDR Initial Offset Register (IOR) is used, and when the FM bit is set, the ITR is used.

During Run Mode Data Broadcast, when FM is cleared, the Input Data Registers (IDR) will receive ascending, consecutive bytes from the data stream until control is passed to the next Association Engine. When using the ITR, the IDR can receive ascending, non-consecutive bytes from the input data stream. The values contained in the ITR specify the sample numbers that should be captured from the input sample stream.

The caveats for using the ITR are as follows:

1. The contents of the ITR are used only when transferring data in Run mode (R/$\overline{S}$=1).

2. The contents of the ITR only affect transfers to the IDR (i.e. the IDR is the implicit destination of chip-to-chip transfers during Run mode.

3. The ITR should contain ascending values; that is, the value contained in Tag #2 should be greater than the value contained in Tag #1, which should be greater than the value contained in Tag #0.

The maximum number of tag values is 64 (equal to the number of locations in the IDR).

This group of registers was not designed to support generalized chip-to-chip data transfers, but was designed to support non-fully-connected networks and networks that employ the concept of receptive fields.

To use the Input Tagging mode, the IPR register must first be loaded with $0, ICR register with $40 (or how many tags which are to be written), and Stream the tag values into the ITR. Once the tags have been loaded into the ITR, the FM bit of the PCR can be set, and this device will use the ITR during all Run Mode Broadcasts.

Please see Section 3.5.2.1 Input Indexing and Section 3.5.2.3 Input Tagging for a more detailed explanation.

(2.3.49) Instruction Cache (IC)

The Instruction Cache (IC) 20 is made up of 4 cache lines of 32 instruction words each. The IC is illustrated in more detail in FIG. 2-65-1. Each Instruction Cache Line has its own tag and valid bit. Each Cache line is loaded from the MMA as a vector, so that in a single clock cycle 32 instruction words can be loaded. (note: When the Coefficient Memory Array (CMA) space is used to hold instructions, that space is usually referred to as the Microcode Memory Array, or MMA).

For more information on the MMA and the Instruction Cache, please see Section 3.3.1 Instruction Caching.

(2.3.50) Coefficient Memory Array (CMA)

The Coefficient Memory Array (CMA) 14 is a 64×64 array which can contain network coefficients, microcode instructions and temporary data values. The CMA is illustrated in more detail in FIG. 2-66. Depending upon how the CMA is accessed by the Host, it can be viewed as either a two-dimensional array or as a linear array. The description which follows pertains only to the case when the Association Engine is in Stop mode (R/$\overline{S}$=0). For a description on how the CMA is accessed during Run mode (R/$\overline{S}$=1), please see the description of the CMA in Section 3.32 CMA and MMA mapping.

When the CMA is accessed using Random Access, the CMA appears as a linear array, with addresses ascending down the shelves of a single column. That is, the first column of the CMA contains the first 64 locations, the second column contains the second 64 locations, and so on.

When the CMA is accessed using Stream Access, locations can viewed as either a two-dimensional array, or as a linear array. If HSSR:LS[3:0]=0001, which indicates the CMA as the logical space to be accessed, then the CMA is accessed as a two-dimensional array. In this case OAR1 is used to indicate the offset into a particular shelf, OAR2 is used to indicate which shelf the access starts with, DCR1 is used to indicate how many CMA locations from each shelf will be accessed, and DCR2 is used to indicate how many shelves are accessed.

If HSSR:LS[3:0]=1111, indicating that the entire Random Access Space is to be accessed, then the CMA is treated as a linear array of 4096 locations.

The data contained in the CMA is used to transform the input data into the output data. It is also the data contained in the CMA which is altered when learning takes place. Each location is 8-bits wide, and 64 locations are associated with each shelf.

Association Engine Microcode Accessible Registers (2.4)

The registers described in this section are those registers that are accessible during the execution of the SIMD instruction set and therefore form a subset of the registers that are externally accessible by the host. For a complete description of the registers accessible by the host, please see Section 2.3 Association Engine Host Accessible Registers.

The number of registers accessible and modifiable by the SIMD instruction set fall into 5 groupings: Section 2.4.1

Input Data Register (IDR), Section 2.4.2 Vector Engine Registers, Section 2.4.3 Microsequencer Control Registers, Section 2.4.4 Scalar Engine Registers and Section 2.4.5 Association Engine Control Registers. The relationship between these groups of registers is shown in FIG. 2-67.

(2.4.1) Input Data Register (IDR)

The IDR is in a category by itself since it can be used as either a Vector Source (supplying 64 datums simultaneously to the processing elements) or as a Scalar Source (allowing all processing elements to access a single IDR location simultaneously)

The IDR contains the input vector for this Association Engine. This register can be accessed through microcode instructions that use the register indirect mode of addressing. That is, the indirect instructions use the contents of one of the Pointer Registers (P[0]–P[7]) to access the proper value in the IDR.

It is possible (through the use of the microcode instruction sequence), to access the IDR in one of two different ways. One way to access the IDR is to allow a single entry in the IDR to be seen by all processing elements of the SIMD Vector Engine simultaneously. This is a scalar access of the IDR. Another way to access the IDR is to view the IDR as vertically aligned with the processing elements, thus accessing it as a vector. In other words, IDR[0] would be associated with Processing Element #0, IDR[1] would be associated with Processing Element #1, etc. Using this method, the entire IDR must be filled before any computations begin, but once the IDR is filled, the entire IDR can be processed simultaneously. Each VPCR VID bit contains the valid status for each element in the IDR.

(2.4.2) Vector Engine Registers

Each of the registers described below can be found in each of the 64 Processing Elements of the Vector Engine. FIG. 2-68 and FIG. 2-41 illustrate the Vector Engine Registers.

(2.4.2.1) Coefficient Memory Array (CMA)

Each Processing Element can access a set of 64 (8-bit) CMA locations which are used to hold the mapping coefficients for each processing element. The CMA can be accessed indirectly by using the Global Pointer Registers (P[0])–P[7]). The syntax for this type of indirect addressing can be found in Section 2.5.3 Microcode Instruction Formats. It should also be noted that using register indirect addressing mode causes all processing elements to index the same CMA column. For more information on the CMA, please see Section 2.3.50.

(2.4.2.2) Vector Data Registers (V[0]–V[7])

Each Processing Element contains a set of 8 (8-bit) general purpose registers which can be used during the computational process. For more information on the Vector Data Registers, please see Section 2.3.46.

(2.4.2.3) Vector Process Control Register (VPCR)

The VPCR contains the condition/processing bits from the previous Vector ALU operation, as well as bits which control the loading of the destination register in the Vector Engine. For a list of these bits, please see Table 2.32. For more information on the VPCR, please see Section 2.3.47.

(2.4.3) Microsequencer Control Registers

Figures 2, 68:
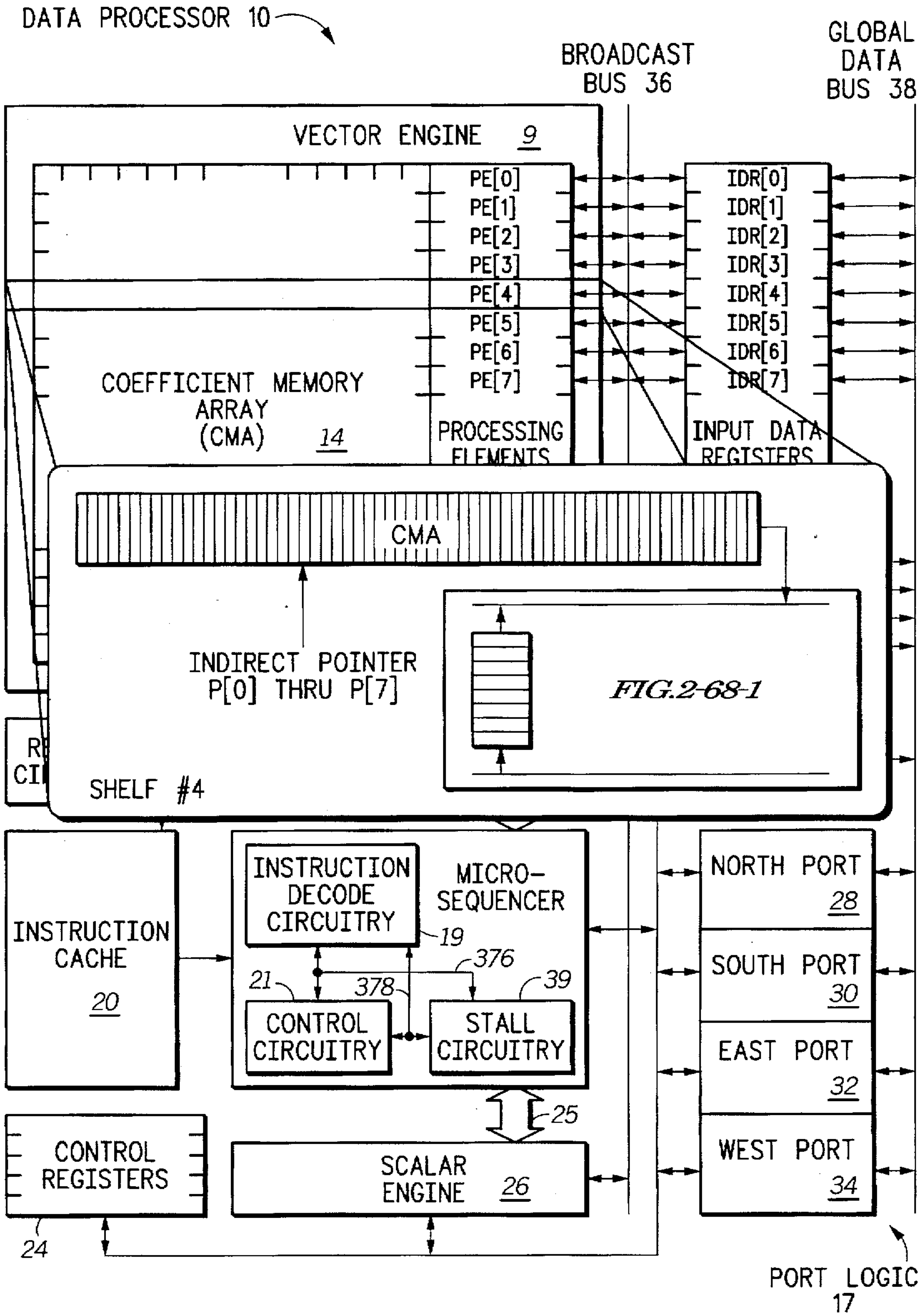
Figures 1, 2, 68:
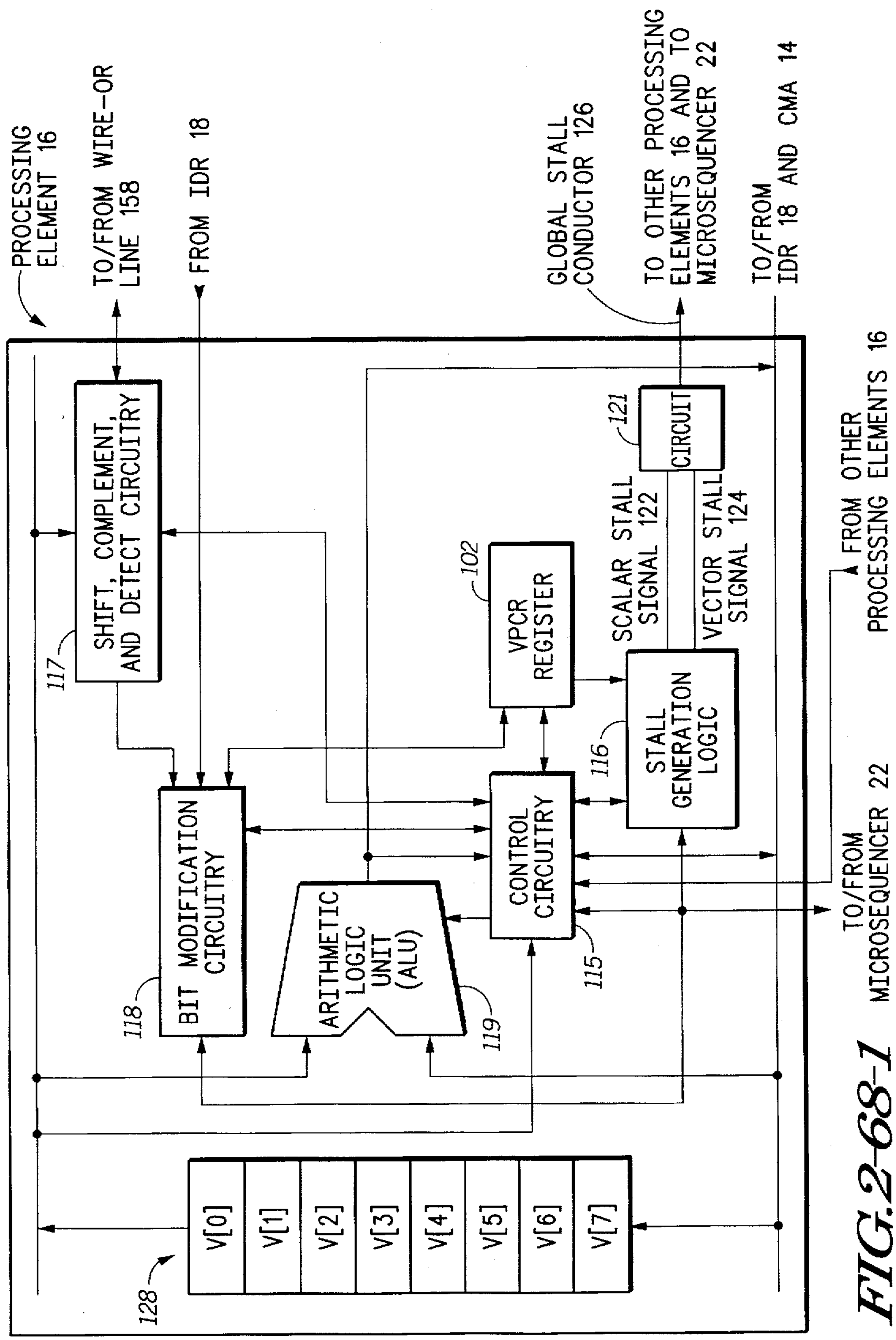
Figures 2, 69:
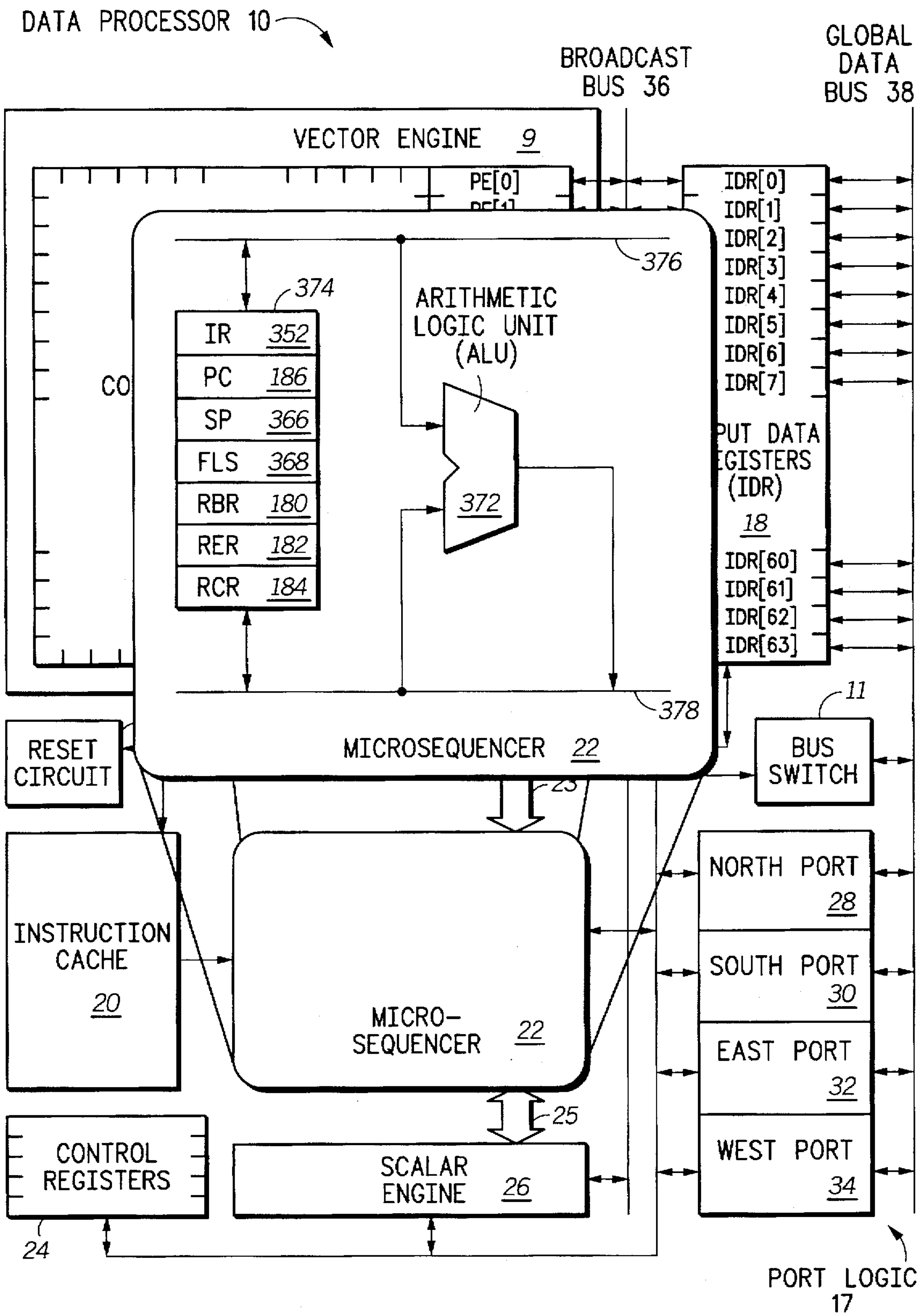

FIG. 2-69 illustrates the microsequencer registers.

(2.4.3.1) Instruction Register (IR)

This 16-bit register contains the microcode instruction currently being executed. This register is used when accessing instructions, and can not be used as an operand of an instruction.

(2.4.3.2) Program Counter (PC)

This 16-bit register holds the address of the current microcode instruction being executed. This address is used to obtain a new microcode instruction word from the Instruction Cache (IC). Every access into the CMA or IC (using the PC) is considered a byte access, and therefore the PC is always incremented by 2. For more information on the PC, please see Section 2.3.31.

(2.4.3.3) Stack Pointer (SP)

The SP is used to perform data stacking operations into the CMA. For subroutine operations, this register (along with the FLS) provides a mechanism for subroutine calls and returns. For load/store operations, this register is used as a base pointer for accessing the data operands. Note: Stacking operations are considered to be data movement operations, and are therefore stored in the CMA, not in the Instruction Cache. The SP always points to the first free location. When a pop instruction is performed, the SP is incremented and then the data access is performed. When a push instruction is performed, the data is first placed on the stack, and then the SP is decremented.

(2.4.3.4) First Level Stack (FLS)

The FLS holds the first level return PC for a subroutine call. The use of this register is to provide faster call and return access to subroutines which are only one-level deep. For nested subroutine calls, the return address of the first call is stored in the FLS, and all subsequent calls will have their return addresses pushed onto the stack (which is pointed to by the SP register). For more information on the FLS, please see Section 2.3.38.

(2.4.3.5) Repeat Begin Register (RBR)

The RBR is used during the execution of the repeat(e) instructions and holds the address of the instruction following the repeat(e). This register is automatically loaded when the repeat(e) instruction is executed. The contents of this register are loaded into the Program Counter (PC) when the bottom of the repeat(e) loop is reached (PC==RER). For more information on the RBR, please see Section 2.3.39.

(2.4.3.6) Repeat End Register (RER)

The RER is used during the execution of the repeat(e) instructions. The RER contains the address of the final instruction in the repeat(e) loop. If the Repeat Count Register (RCR) is not equal to 0, each time the PC==RER, the RCR is decremented and the PC is loaded with the value contained in RBR. For more information on the RER, please see Section 2.3.40.

(2.4.3.7) Repeat Count Register (RCR)

The RCR is used during the execution of the repeat(e) instructions. This register contains the number of times the repeat(e) loop is executed. When this register is loaded with 0, the instructions between the repeat(e) instruction and the address specified by RER, are skipped. For more information on the RCR, please see Section 2.3.41.

(2.4.4) Scalar Engine Registers

Figures 2, 70:
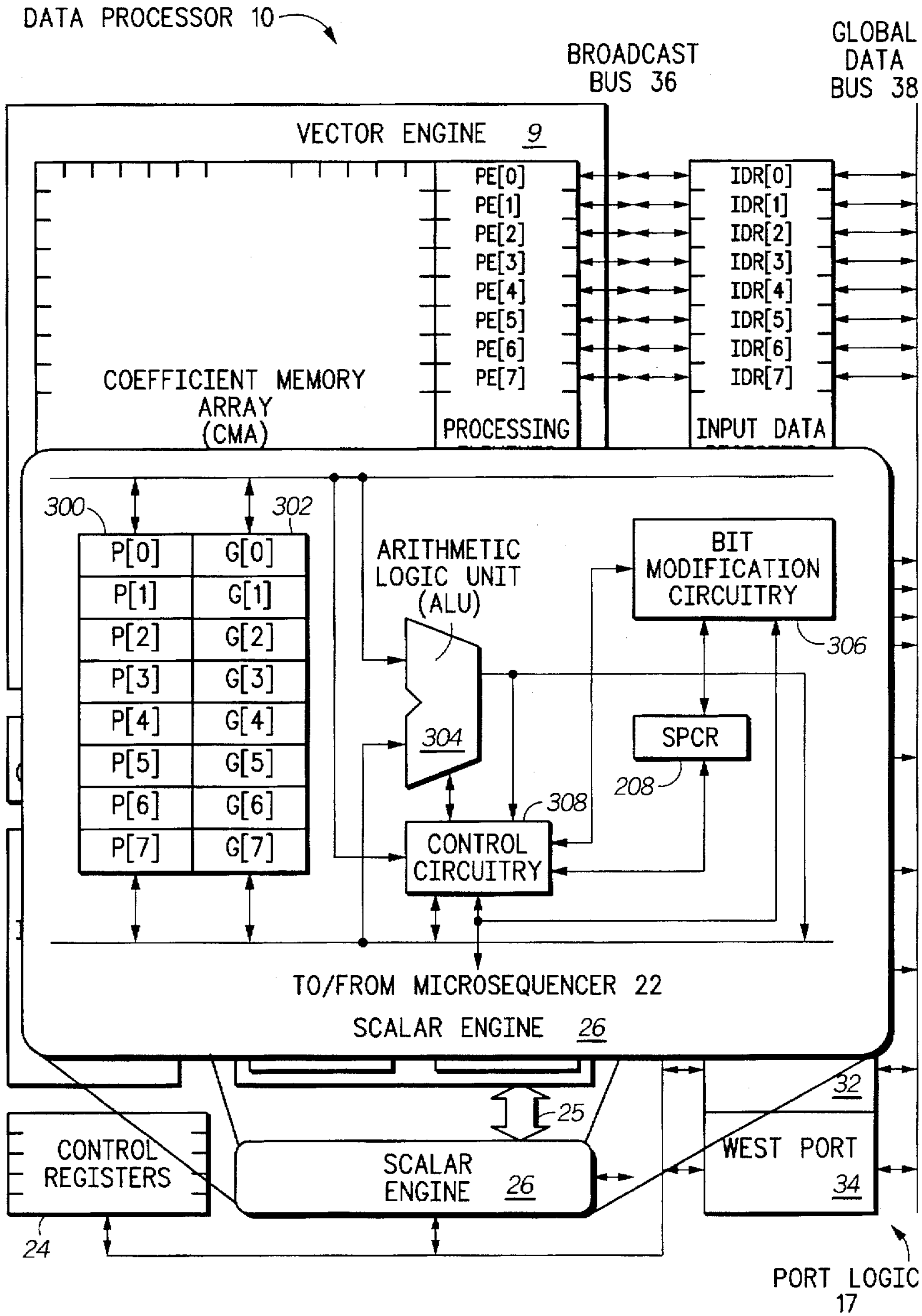

The SIMD Scalar Engine Registers are those registers which are accessible and modifiable by the SIMD Scalar Engine. FIG. 2-70 illustrates the scalar engine registers in more detail. The values contained in these registers affect the operation of all SIMD units. Since there is a single SIMD Scalar Engine for all 64 Processing Elements in the SIMI Vector Engines, there is only a single copy of each of the SIMD Scalar Engine Registers.

(2.4.4.1) Global Pointer Registers (P[0]–P[7])

This set of 8 (8-bit) registers can contain addresses which are used to select registers in the IDR or CMA. These registers can also be used as general purpose data registers for scalar arithmetic.

(2.4.4.2) Global Data Registers (G[0] –G[7])

A set of 8 (8-bit) general purpose data registers which can hold global computational values or they can hold data specific to a particular Processing Element of the SIMD Vector Engine.

(2.4.4.3) Scalar Process Control Register (SPCR)

The SPCR controls the flow of multi-byte arithmetic operations in the Scalar Engine. For a description of the bits contained in this register, please see Table 2.33.

(2.4.5) Association Engine Control Registers

Figures 2, 71:
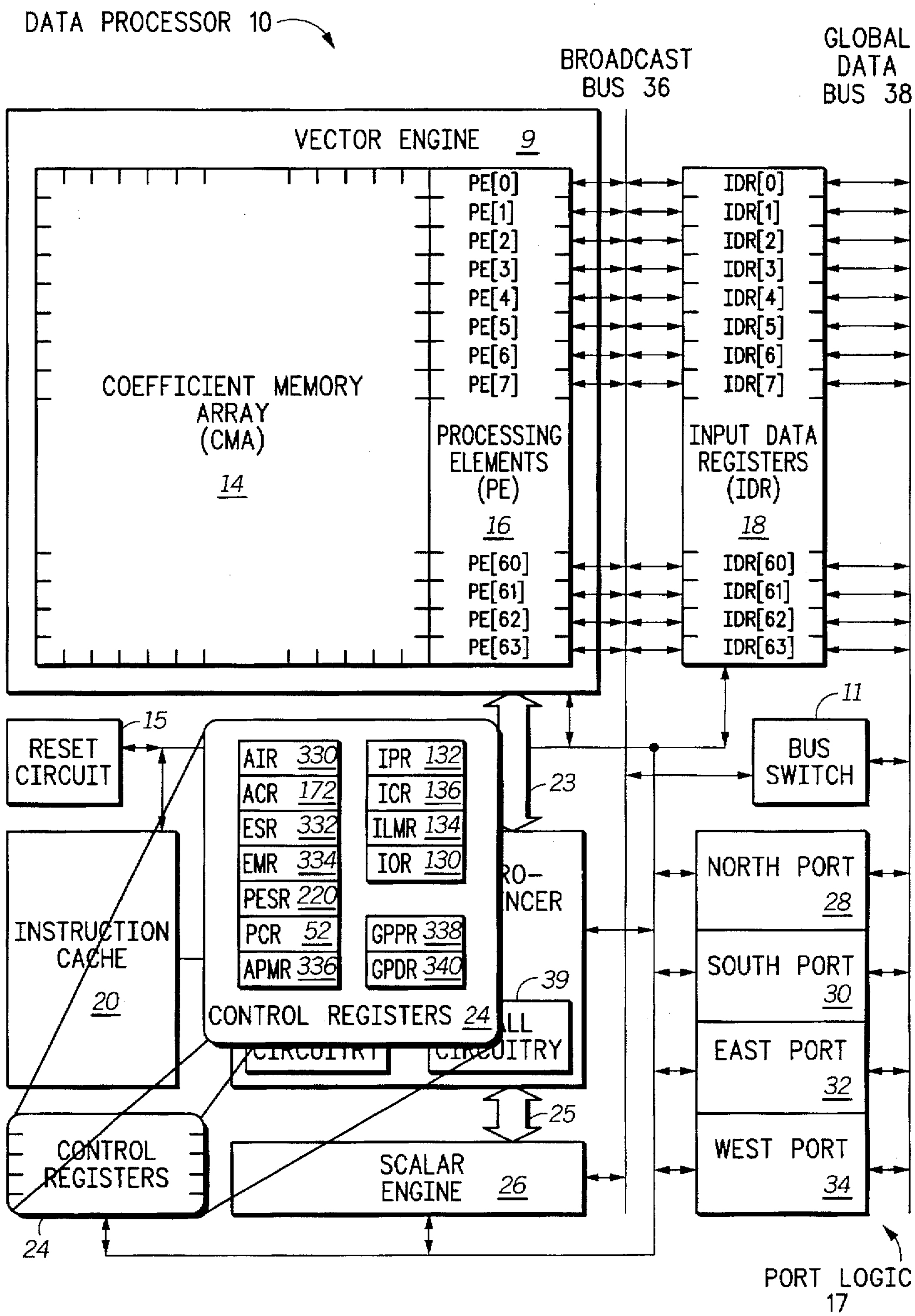

The descriptions which follow are those registers which are readable (R), or readable and writable (R/$\overline{W}$), using the movci, movtc and movfc instructions. The addresses used to access these registers is equivalent to the registers' Random Access Address found in Table 2.5. FIG. 2-71 illustrates the scalar engine registers in more detail.

(2.4.5.1) Association Engine Identification Register (AIR)

The AIR is a read-only register which contains a device identification number. Association Engine programs can determine the device type (and therefore the device's particular configuration). The address of this register when using the movfc instructions is $0. For more information on the AIR, please see Section 2.3.1.

(2.4.5.2) Arithmetic Control Register (ACR)

The ACR is used to control arithmetic operations in the Vector and Scalar Engines. The VSGN and SSGN bits control whether or not the Vector and Scalar Engines perform signed or unsigned arithmetic. The address of this register when using movci, movtc and movfc is $1. For more information on the ACR, please see Section 2.3.2.

(2.4.5.3) Exception Status Registers (ESR)

The bits of the Exception Status Register record the occurrence of all pending exceptions. The Association Engine Exception Model is flat (only one exception is processed at a time) and prioritized (higher priority exceptions are processed before lower priority exceptions).The PEE bit, when set, indicates a Port Error Exception has occurred. The IOE bit, when set, indicates an Illegal Opcode Exception has occurred. The PCE bit, when set, indicates a PC Out-of-Bounds Exception has occurred. The VDE and SDE bits, when set, indicate a Divide-by-Zero Exception has occurred in the Vector and Scalar Engines, respectively. The VVE and SVE bits, when set, indicate an Overflow Exception has occurred in the Vector and Scalar Engines, respectively. The address of this register when using movfc is $2. For more information on the ESR, please see Section 2.3.3.

When the rte instruction is executed, the bit corresponding to the exception being processed is cleared, if the corresponding mask bit in the EMR is clear. That is, the only way to clear a bit in the ESR is to execute an rte instruction (hopefully from inside the Exception Processing Routine). And the only way to get into the Exception Processing Routine is for: 1) an exception to occur; and 2) the corresponding mask bit in the EMR to be clear. This functionality allows exceptions to be "stacked" (where multiple exceptions can be pending, with only one being processed at any one time). This mechanism also allows the status of ignored exceptions to be retained.

(2.4.5.4) Exception Mask Register (EMR)

The Exception Mask Register allows the microcode to specify which exceptions are to be processed, and which exceptions are to be ignored. The PEEM bit, when set, indicates a Port Error will not generate an exception. The IOEM bit, when set, indicates an Illegal Opcode will not generate an exception. The PCEM bit, when set, indicates a PC Out-of-Bounds will not generate an exception. The VDEM and SDEM bits, when set, indicates a Divide-by-Zero in the Vector and Scalar Engines, respectively, will not generate an exception. The VVEM and SVEM bits, when set, indicates an Overflow in the Vector and Scalar Engines, respectively, will not generate an exception. This address of this register when using movci, movtc and movfc is $3. For more information on the EMR, please see Section 2.3.4.

(2.4.5.5) Processing Element Select Register (PESR)

The PESR controls the final processing element which participates in either a drotmov or dsrot instruction. The address of this register when using the movci, movtc and movfc is $4. For more information on the PESR, please see Section 2.3.5.

(2.4.5.6) Port Control Register (PCR)

The PCR controls the setting of the Switch and Tap positions on the 4 ports of the Association Engine. This register also allows the microcode to determine how the IDR is filled when data is transferred chip-to-chip in Run mode. The address of this register when using movci, movtc and movfc is $5. For more information on the PCR, please see Section 2.3.6.

(2.4.5.7) Association Engine Port Monitor Register (APMR)

The APMR allows the microcode to determine the cause of a Port Error. This register will generally only be used during exception processing. The address of this register when using movci, movtc and movfc instructions is $6. For more information on the APMR, please see Section 2.3.7.

(2.4.5.8) General Purpose Port Register (GPPR)

The GPPR is a 2-bit register which controls the state of the PA[1:0] signal pins. The address of this register when using the movci, movtc and movfc is $7. For more information on the GPPR, please see Section 2.3.8.

(2.4.5.9) General Purpose Direction Register (GPDR)

The GPDR controls the direction of the PA[1:0] signal pins. The address of this register when using the movci, movtc and movfc is $8. For more information on the GPDR, please see Section 2.3.9.

(2.4.5.10) IDR Pointer Register (IPR)

The IPR controls where data is placed in the IDR during data Broadcast. The reset value of this register is $00, which means that if data is Broadcast before this register is altered, the data will be placed into the IDR starting at locations IDR[0]. The address of this register when using movci, movtc and movfc is $9. For more information on the IPR, please see Section 2.3.10.

(2.4.5.11) IDR Count Register (ICR)

The ICR specifies the maximum number of data which will be received by this part during data Broadcast. The address of this register when using movci, movtc and movfc is $A. For more information on the ICR, please see Section 2.3.11.

(2,4,5,12) IDR Location Mask Register (ILMR)

The ILMR is used with the IPR to determine which IPR address bits are "don't cared". This allows data during a Broadcast to be replicated in the IDR. The address of this register when using the movci, movtc and movfc instructions is $C. For more information on the ILMR, please see Section 2.3.12.

(2.4.5.13) IDR Initial Offset Register (IOR)

The IOR allows data at the beginning of a Broadcast to be ignored. The reset value of this register is $0000, which means the IDR is loaded without ignoring any data at the beginning of the broadcast. Once the specified number of bytes are skipped, the bytes loaded into the IDR will represent a contiguous stream of data from the broadcast. This register is used during Run mode Stream Write operations only. More specifically, it is used only during Input Indexing mode (PCR:FM=0). Please compare this with Input Tagging (PCR:FM=1), described in Section 2.3.12. Since this is a 16-bit register, it must be addressed in two parts. When using movci, movtc and movfc instructions, address of the MSB of this register is $E, and the LSB is $F. For more information on the IOR, please see Section 2.3.13.

Association Engine MICROCODE INSTRUCTION SET SUMMARY (2.5)

This section describes the commands available to program the operation of the Association Engine. In Section 2.4 Association Engine Microcode Accessible Registers, the registers that are available to the Association Engine microcode programmer are described. In this section, the actual operations that can be performed using the registers are described.

(2.5.1) Instruction Types

The instructions form a set of tools to perform a variety of operations. A summary of the instructions and their types is given in Table 2.34.

(2.5.2) Notation Used

The notations shown in Table 2.35 are used throughout this section.

(2.5.3) Microcode Instruction Formats

This section describes the fields that are used to build microcode instructions for the Association Engine. For all monadic instructions (single operand instructions, such as bent sregD), the register specified serves as both the source and destination register for that instruction. For all dyadic instructions (two operand instructions, such as add sregS, sregD), the first register specified serves as one source of the operation, while the second register specified serves as both a source to the operation as well as the destination register for the operation.

(2.5.3.1) Data Formats

The basic data quantity for the Vector and Scalar Engines is a byte. The capability to extend this data size to multi-byte arithmetic is provided for, at the expense of speed. For other formats (like floating point formats) the user is required to use portions of the CMA for scratch storage.

(2.5.3.2) Register Selection

The vreg1, vreg2 and sreg fields define register sets in the Vector and Scalar Engines to be used in microcode operations. The names vreg1, vreg2 and sreg do not imply source or destination information. They are simply meant to convey groups of registers in the Vector and Scalar Engine. The set of registers conveyed by vreg1 is given in Table 2.36. The set of registers conveyed by vreg2 is given in Table 2.37. The set of registers conveyed by for sreg is given in Table 2.38.

(2.5.4) Stack Pointer Conventions

The Association Engine utilizes a stack pointer (SP) register for subroutine calls and exceptions processing. The conventions used for the SP register are given as follows. The SP register is decremented when data is placed on the stack and it is incremented when data is taken off the stack (i.e. bsr and return respectively). The current value of the stack pointer points to the first available location for stack operations (i.e. the SP points to an empty location).

(2.5.5) Accessing the IDR

The IDR can be addressed in 2 different ways. It can be addressed as 64 single byte scalar entities (scalar access), which means that a single byte in the IDR is broadcast to all Processing Elements. It can also be addressed as a single 64-byte vector entity (vector access), which means that byte #0 from the IDR is accessed by Processing Element #0, byte #1 of the IDR is accessed by Processing Element #1, . . . and byte #63 of the IDR is accessed by Processing Element #63.

When making a scalar access into the IDR (i.e. a single byte broadcast to all PEs), the instruction notation uses an indirect address pointer to index into the IDR (IDR[P0] or IDR[P0++], i.e. vmov IDR[P0], V[0]). This is accomplished by using a Broadcast Bus internal to the Association Engine. The contents of a single element of the IDR can be placed on this Broadcast Bus and accepted by all Processing Elements simultaneously.

When making a vector access into the IDR (i.e. as a 64 byte vector), the instruction notation does not use an indirect pointer register (IDR or IDRC, i.e. vmov IDR, V[0]). The Broadcast Bus is bypassed altogether, and each element of the IDR is simultaneously transferred to its corresponding Processing Element.

Figures 2, 72:
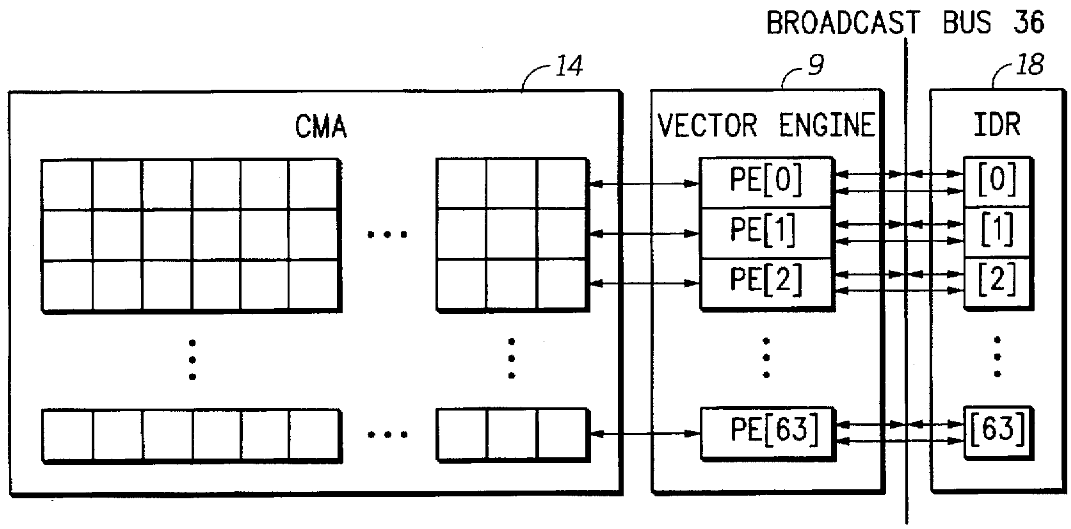

This flexibility eases the implementation of different algorithms. FIG. 2-72 shows the conceptual implementation of the IDR.

The IDR also has valid bits associated with each IDR location. This is to ensure that the Association Engine program does not operate on invalid data. The valid bit is set when the IDR location is written. When a scalar access is made into the IDR, the valid bit for the particular IDR location is used to determine the validity of the data. When a vector access is made into the IDR, each valid bit is compared with processing mask (VT bit) to determine if the IDR location is valid. To determine if the IDR itself is valid, all the valid IDR locations are combined together. So, if the processing mask is set then the valid bit is used with other valid PE/IDR locations as a check for validity for the entire vector. In either case, the Association Engine program will stall until the need IDR locations become valid.

(2.5.6) Vector Process Control Register

The Vector Process Control Register (VPCR) in each of the SIMD Processing Elements contains information about the results of instructions. Some instructions modify some or all of the VPCR bits, while others simply test the state of the VPCR bits or combinations of bits. Refer to Table 2.39 for a description of the VPCR bits.

(2.5.7) Scalar Process Control Register

The Scalar Process Control Register (SPCR) in the Scalar Engine contains information about the results of instructions. Some instructions modify some or all of the SPCR bits, while others simply test the state of the SPCR bits or combinations of bits. Refer to Table 2.40 for a description of each of the SPCR bits.

(2.5.8) Signed verses Unsigned Operations

The Arithmetic Control Register (ACR) bits SSGN and VSGN control some( instruction operations and how process control information (SPCR and VPCR) is generated. For multiplication and division the xSGN bit directly controls whether a signed (two's complement) or unsigned operation is performed. For addition, subtraction and multiplication the xSGN bit also controls how the overflow information is generated. For signed operations, the overflow bit (addition and subtraction) is defined as the exclusive OR of the carry in and out from the most significant bit position of the operation. For unsigned operations the overflow is defined as the carry out of the most significant bit position of the result.

(2.5.9) Saturating verses Non-saturating Operations

For those instructions which cause their results to saturate, the value at which the result saturates is dependent upon the sign (SSGN and VSGN) bit in the Arithmetic Control Register (ACR). For unsigned operations, the most positive saturating result will be $FF (255), and the smallest number will be $00 (0). For signed operations, the most positive saturating number will be $7F (127), and the smaller number will be $80 (−128). Please be aware that the saturation instructions sat and vsat do not result in an overflow (as is the case with other instructions which cause their operand to saturate).

(2.5.10) Association Engine Systems Control Operations

This section describes the instructions that control the Association Engine at a global level. Refer to Table 2.41 for a description of the Scalar Data microcode instructions.

(2.5.11) Vector Engine Data Movement

This section describes the instructions that perform basic vector engine data movement. Refer to Table 2.42 for a description of the Vector Engine Data Movement microcode instructions.

(2.5.11.1) Clarification of the drotmov instruction

Figures 2, 73:
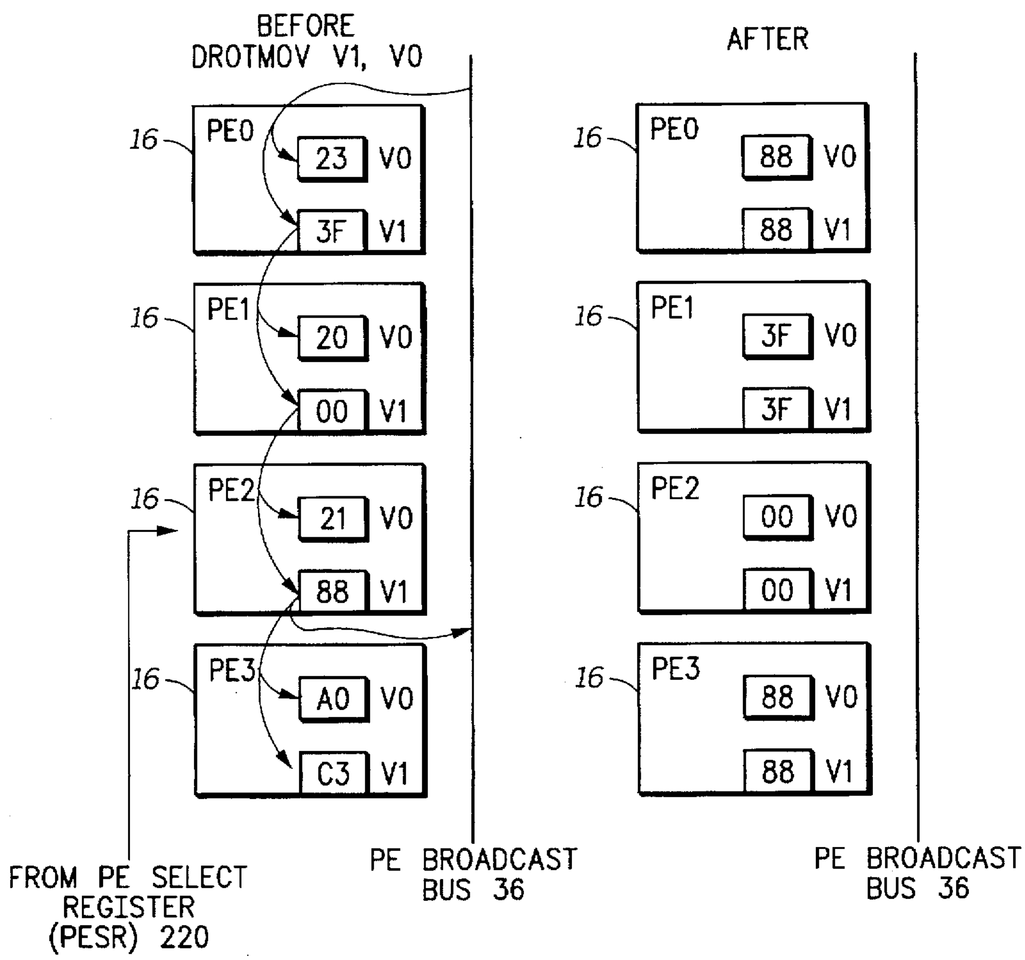

As was stated previously the drotmov instruction rotates a V register and then performs a vector move on the result. FIG. 2-73 illustrates the before and after case for a limited number of processing elements. In this example there are four PEs in FIG. 2-73. The PESR contains the value 2. This picks PE #2 as the wrap around element that will supply PE #0 with data. The arrows indicate the movement of data.

(2.5.11.2) Clarification of the dsrot instruction

The Association Engine contains a downward shifting instruction called dsrot. This instruction provides for reasonably efficient recursive-doubling-style algorithms and for other possible aggregation operations. This instruction performs sparse multi-place downward circular shifting. The instruction dsrot #N, vreg2 functions as follows:

Each PE copies the value passed from the PE above to a local register. The processing mask (VT-bit) is used in the normal manner to suppress result storing in any of the PEs.

If a PE has all ones in the N least significant bits of its PE number, it passes the value from its vreg2 register to the PE below. Otherwise, it passes along the value it receives from the PE above. If N=0, then every PE passes the value from the vreg2 register to the PE below. The processing mask (VT-bits) has no effect on which value a PE passes to its neighbor below. The last PE passes a value around to the first PE (PE number 0). in a circular fashion. Which PE functions as the last on in the chain is determined by the value in the PESR register.

For an example, Table 2.43 illustrates several results from the execution of several dsrot instructions. For this example assume that the PESR register contains the value 15. Table 2.43 describes these examples.

(2.5.12) Vector Engine Data Operations

This section describes the instructions that operate on the vector registers. It should be noted that the VSGN bit controls the result of the operation with respect to signed and unsigned operations. Refer to Section 2.5.8 Signed verses Unsigned Operations and Section 2.5.9 Saturating verses Non-saturating Operations for more information regarding signed/unsigned and saturating operations. Refer to Table 2.44 for a description of the Vector Data microcode instructions.

(2.5.12.1) Summary of the Right Rotate and Left Shift instructions

Table 2.45 provides a quick summary of the right rotate and left shift instructions available to the Association Engine programmer.

(2.5.12.2) Clarification of the Downward Shift Operations

The instructions dadd, daddp, dmin, dminp, dmax, and dmaxp combine downward shifting with computation to facilitate effecting recursive doubling style computing with aggregation operations expected to be most common in target applications. The "p" denotes a preliminary style of instruction where the non "p" types are ending instruction. Refer to Section 2.5.18 Extension bits and performing Multi-byte Operations for more information on preliminary and non-preliminary instruction types.

These instructions combine sparse multi-place downward circular shifting with arithmetic operations. The instruction dadd #N, vreg2 functions as follows:

Addition takes place only in half of the PEs, namely those with a one bit in position N of their respective PE numbers (counting the least significant bit as position 0). Each PE of this type adds the value passed from the PE above to its local vreg2 register. PEs not of this type leave their vreg2 register values unchanged. The processing mask (VT-bit) may be used in the normal manner to suppress the storing of results in any of the PEs which otherwise would modify their vreg2 registers.

If a PE has all ones in the N least significant bits of its PE number, it passes the value from its vreg2 register to the PE below. Otherwise, it passes along the value it receives from the PE above. If N=0, every PE passes the value from the vreg2 register to the PE below. The processing mask (VT-bits) has no effect on which value a PE passes to its neighbor below. Note that it does not matter whether or not the last PE passes a value around to the first PE, since a value passed into the first PE from above is never used, regardless of what #N value is specified.

For an example, the following table illustrates several results from the execution of several dadd instructions. For this example assume that their are 16 PEs. Table 2.43 describes these examples. Table 2.46 provides several examples of the dadd instruction.

(2.5.12.3) Clarification of the vmin/vmax instructions

Figures 2, 74:
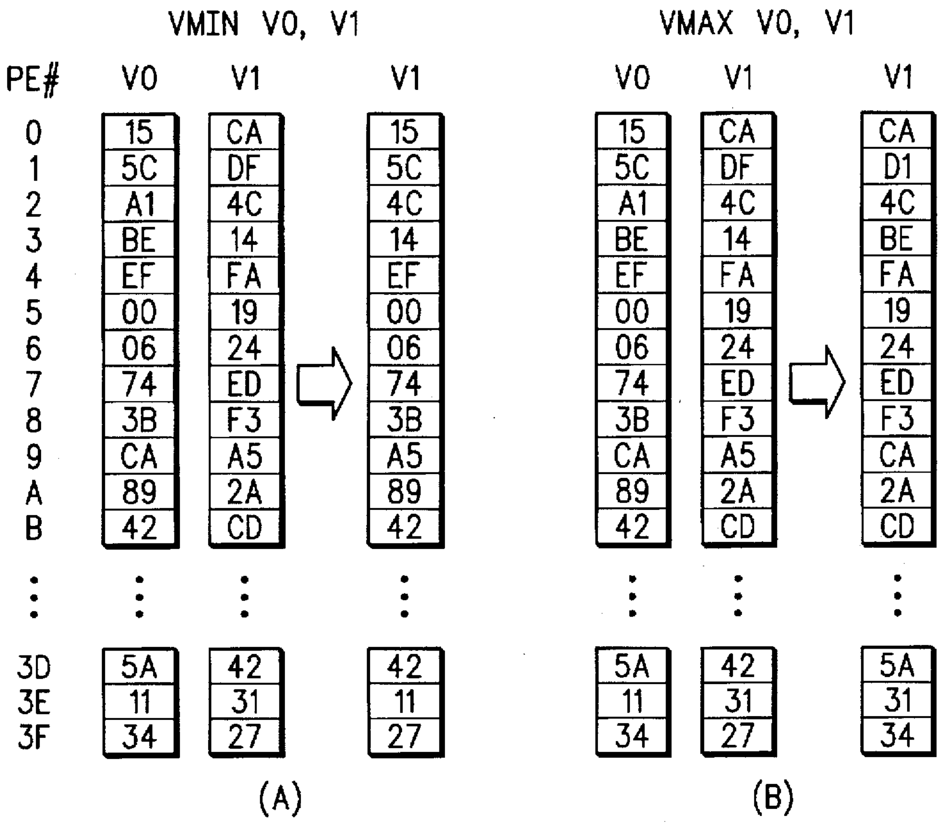

The vmin and vmax instructions are used to collectively combine 2 vectors into a single vector. The result of the vmin instruction, as shown in FIG. 2-74, is a combined vector containing the minimum elements from the two vectors specified in the instruction. Likewise, the result of the vmax instruction, as shown in FIG. 2-74, is a combined vector containing the maximum elements from the two vectors specified in the instruction.

Remember, as with all other vector operations the results will be stored if, and only if, the VT bit of that processing element is set.

(2.5.13) Vector Engine Conditional Operations

This section describes the instructions that perform conditional operations. Conditional operations use the VPCR VT and VH bits to control the execution of subsequent instructions in each of the Processing Elements. The VPCR VT bit is set when an vif instruction is evaluated to be TRUE, or when an vendif instruction is executed. The VT bit is cleared by the velse instruction if any previous vif (since the last vend if) evaluated to be TRUE. The VT bit, when cleared, prevents instructions from updating the vector destination or vector process control register.

The VPCR VH bit contains the history of the VT bit for an vif-velseif, or vif-velseif-velseif-vendif sequence. (note: The velseif instruction does not exist at the microcode level, but is simply a concatenation of the two instructions velse and vif). The VH bit is set on the execution of the velse instruction if the previous vif instruction evaluated TRUE. The VH bit is cleared on the execution of the vendif instruction.

Refer to Section 2.5.21 Effect of the VPCR VH and VT Bits on PE processing for a full description of the effects the VH and VT bits have on the execution of instructions. Refer to Section 3.6.5.4 Conditional Execution for example code segments that describe the conditional execution of instructions in the SIMD Vector Engine. Table 2.47 gives a brief description of the Conditional microcode instructions available.

(2.5.13.1) Effect of Conditional Instructions on the VT and VH bits

Figures 2, 75:
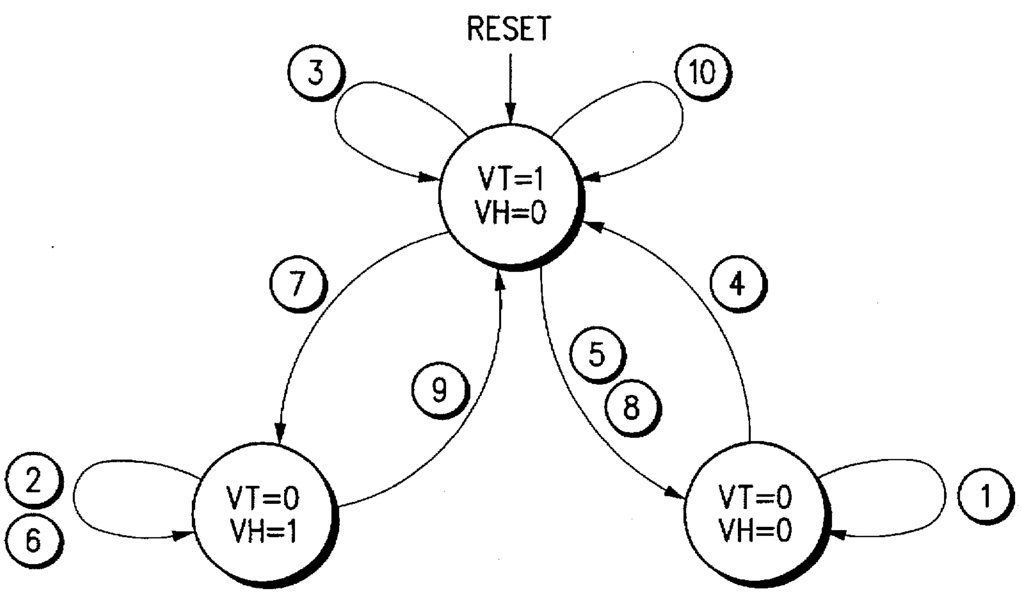
Figures 1, 3:
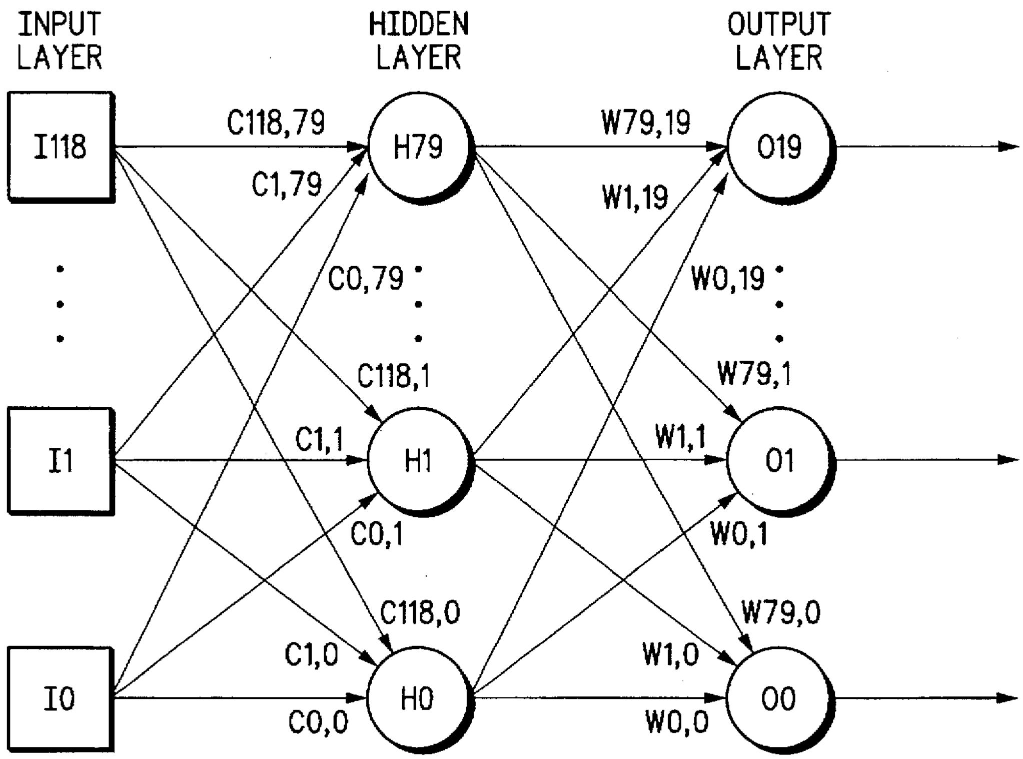
Figure 3:
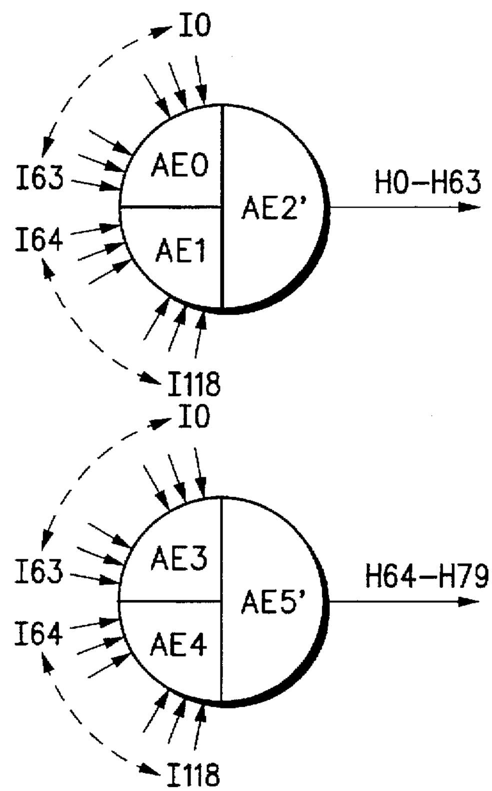
Figures 2, 3:
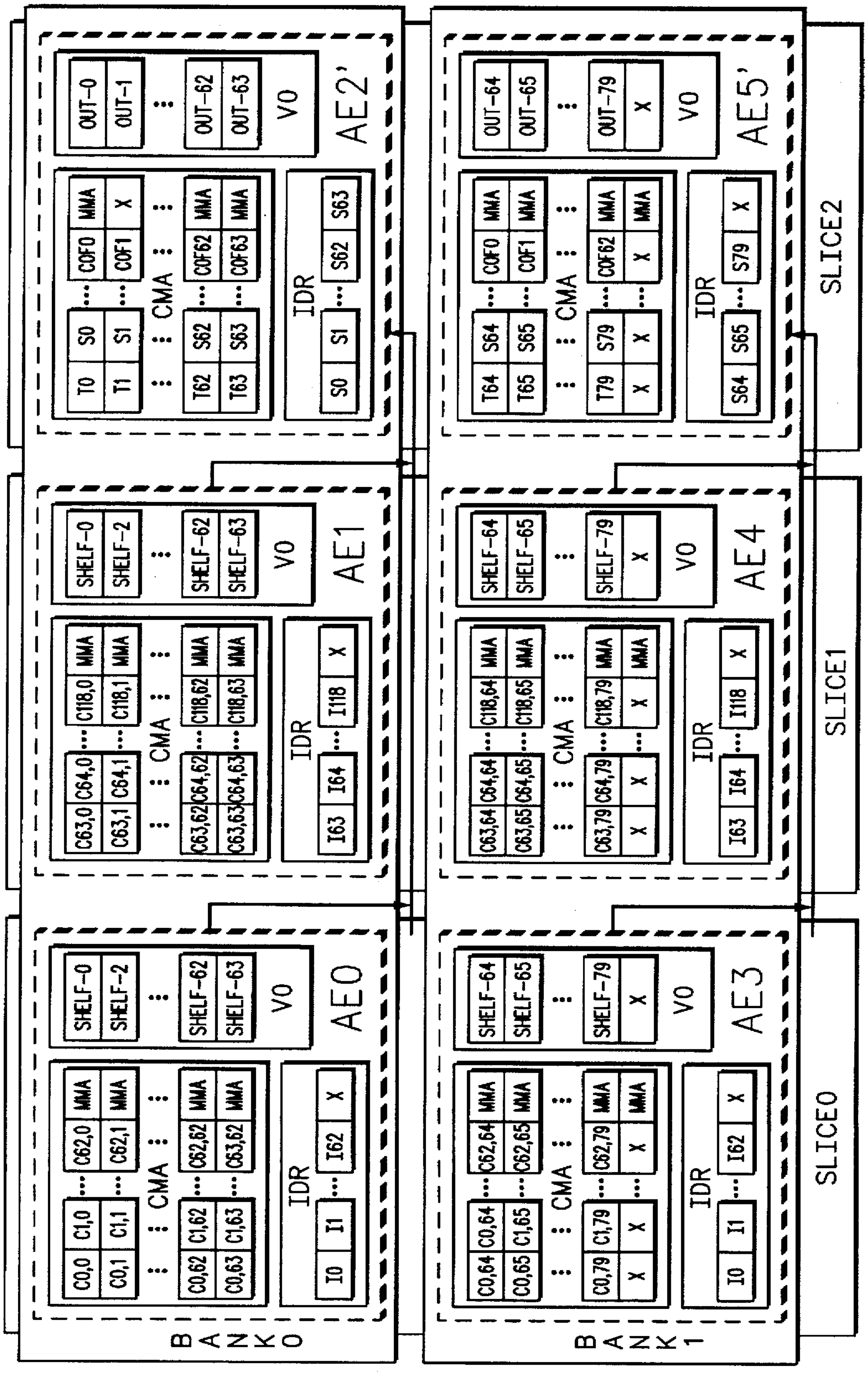
Figures 3, 4:
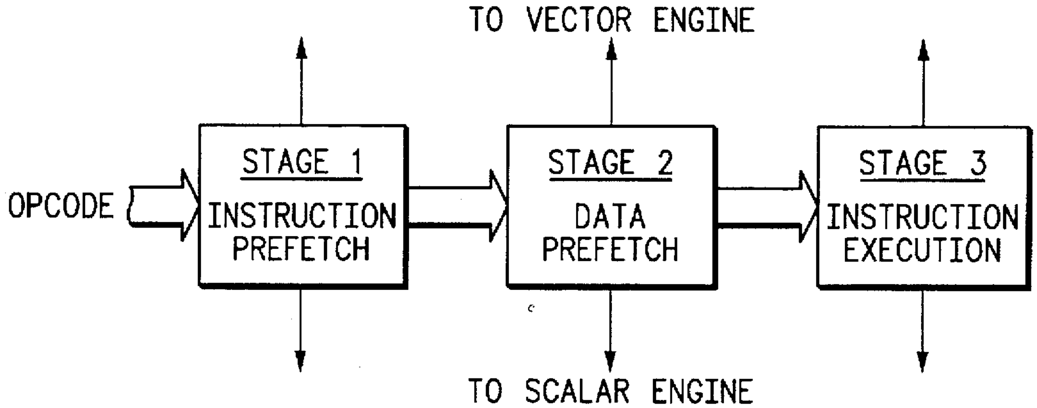
Figures 3, 4, 5:
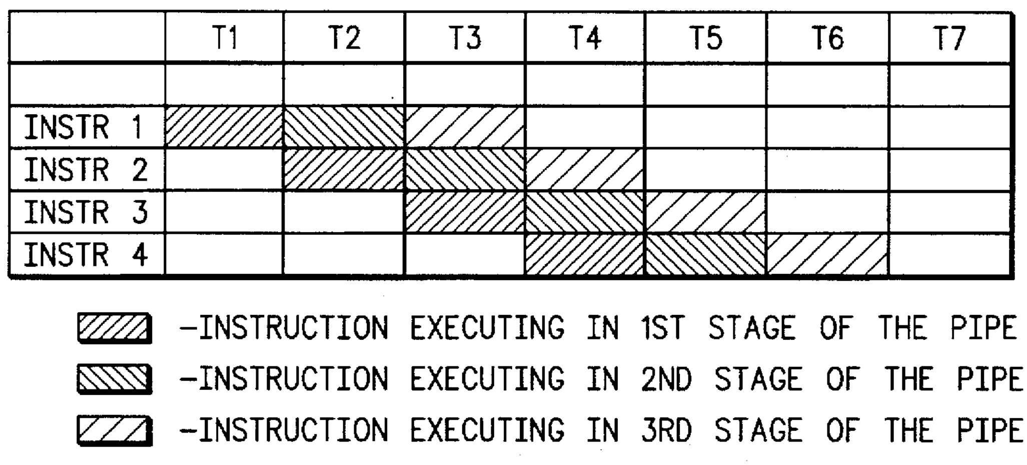
Figures 3, 4, 5, 6:
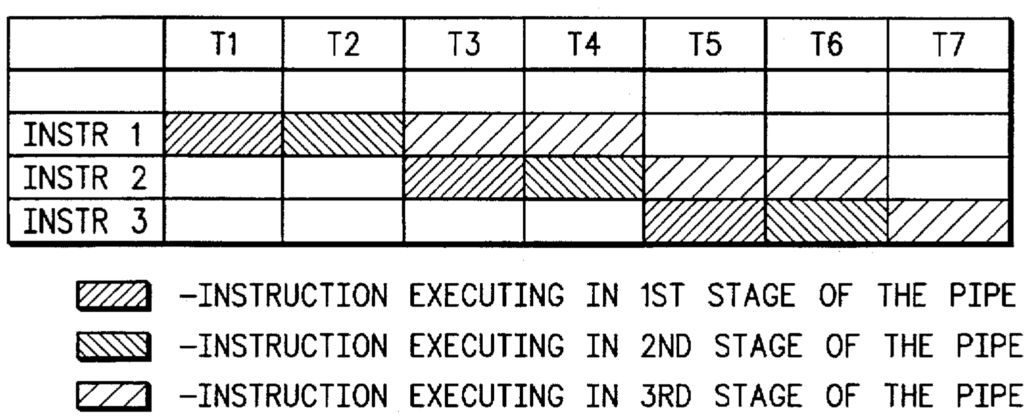
Figures 3, 4, 5, 6, 7, 8:
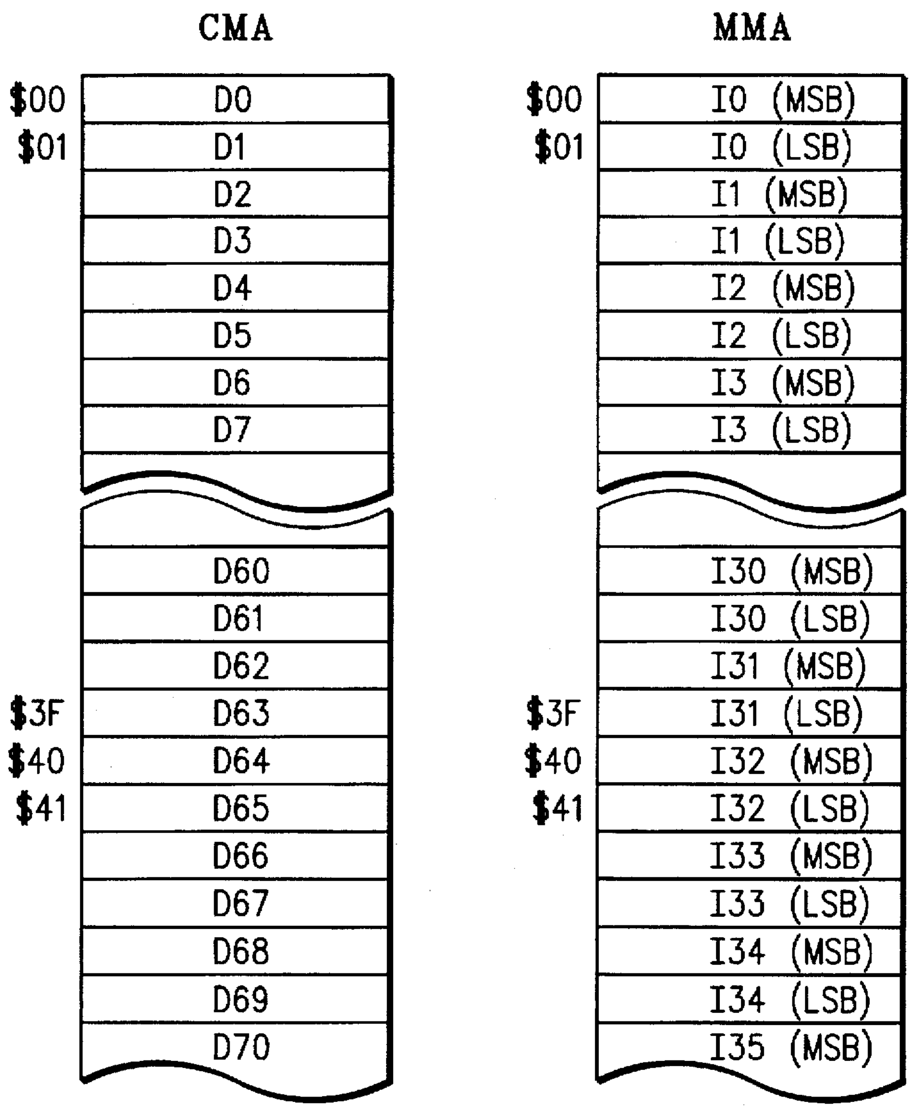
Figures 3, 4, 5, 6, 7, 8, 9:
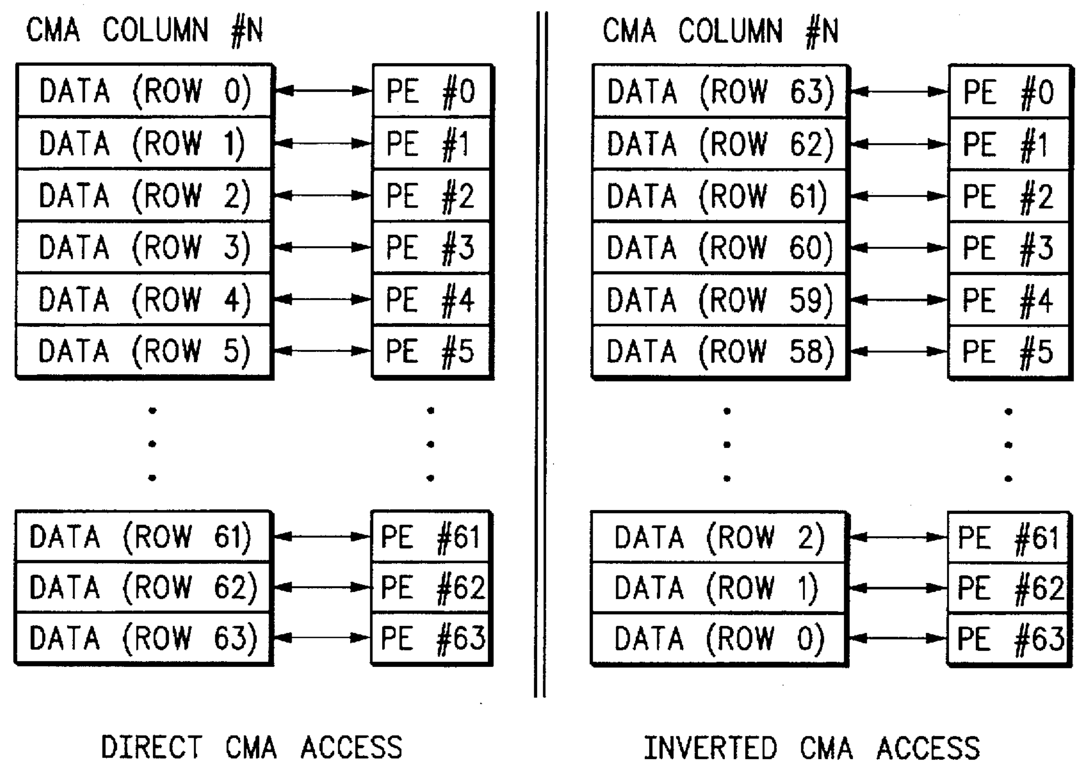
Figures 3, 4, 5, 6, 7, 8, 9, 10, 11, 12:
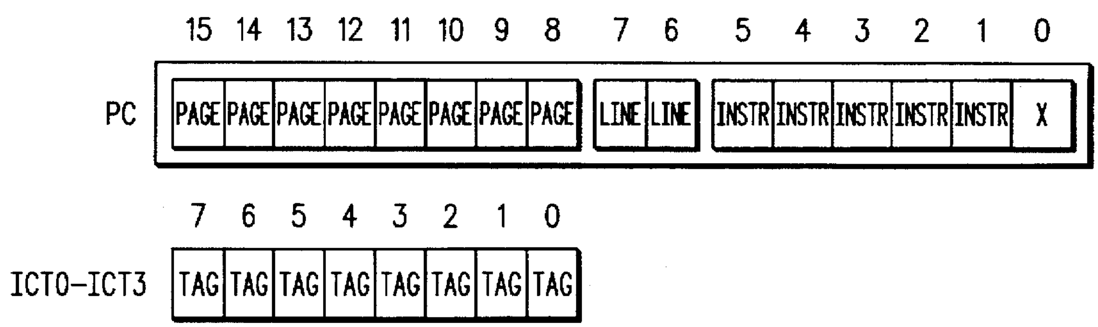
Figures 3, 4, 5, 6, 7, 8, 9, 10:
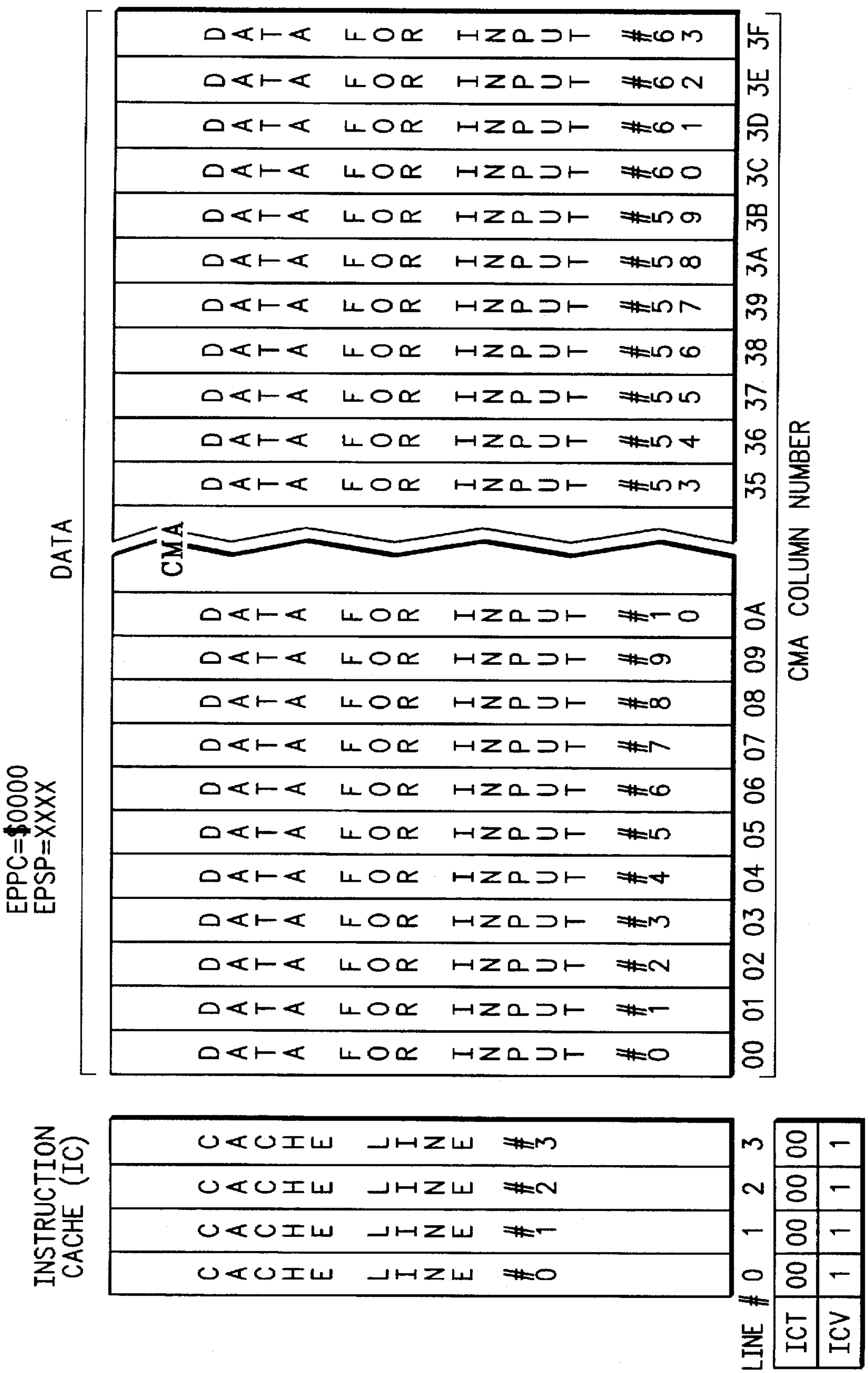
Figures 3, 4, 5, 6, 7, 8, 9, 10, 11:
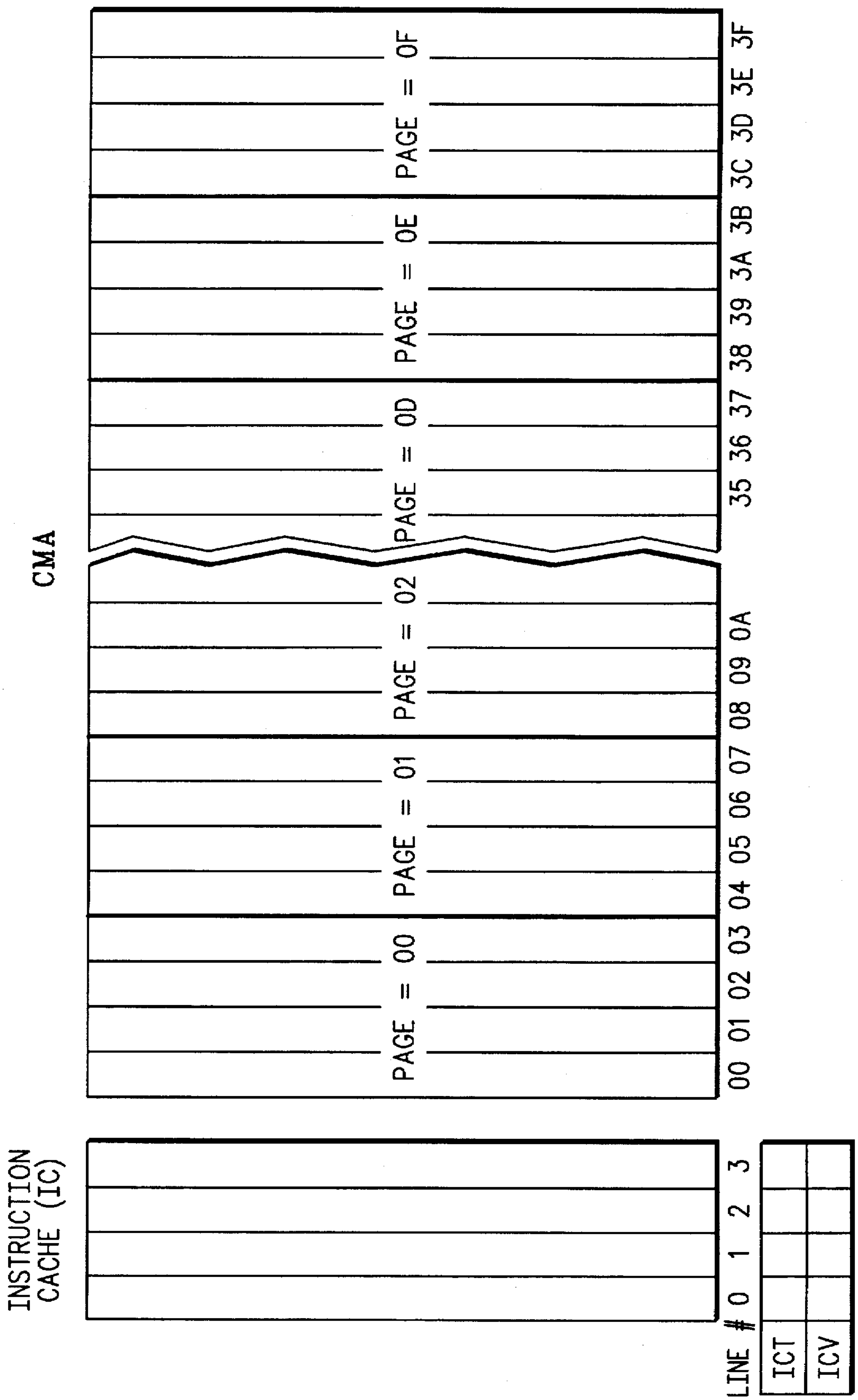
Figures 3, 4, 5, 6, 7, 8, 9, 10, 11, 12, 13:
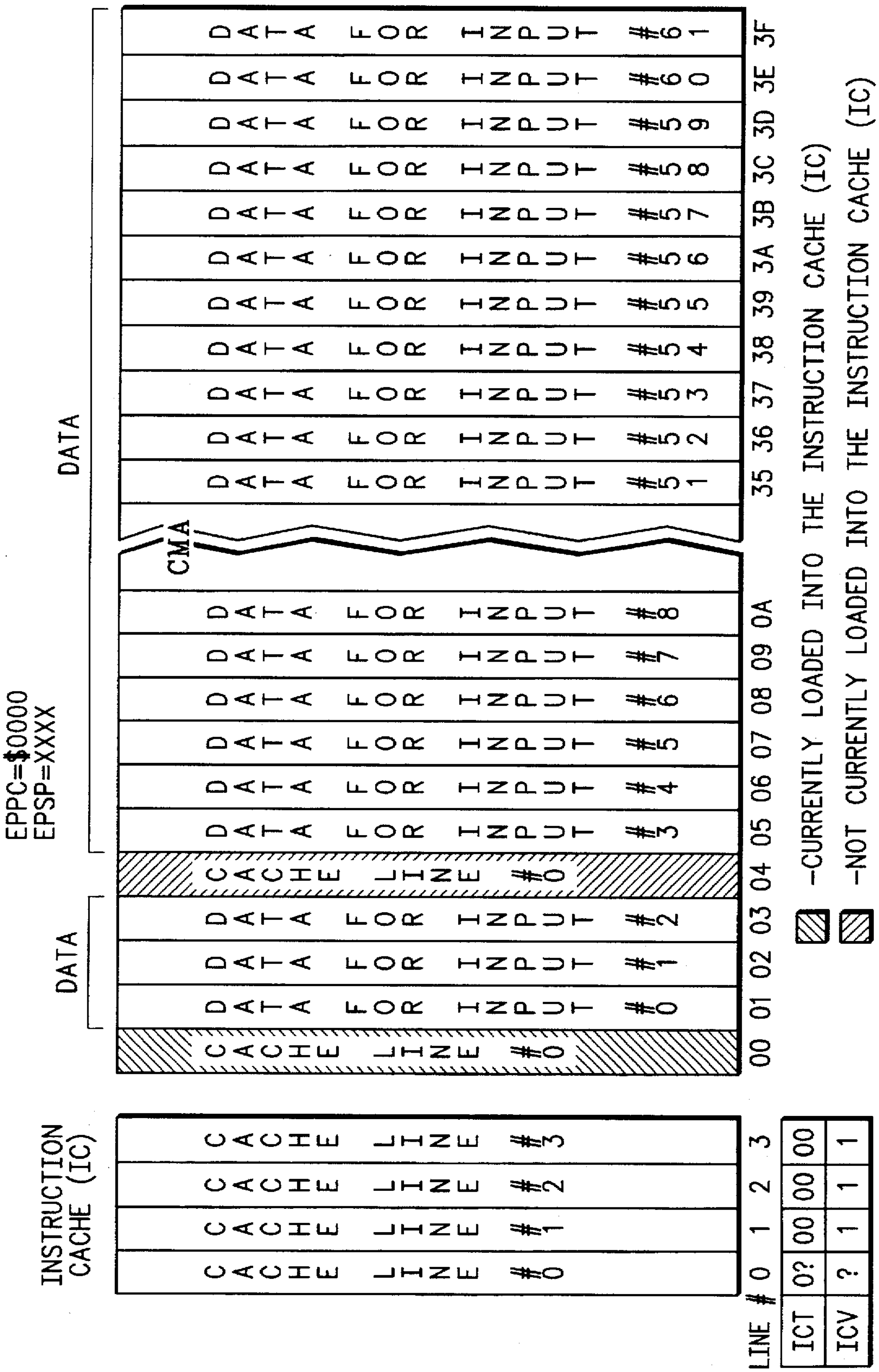
Figures 3, 4, 5, 6, 7, 8, 9, 10, 11, 12, 13, 14:
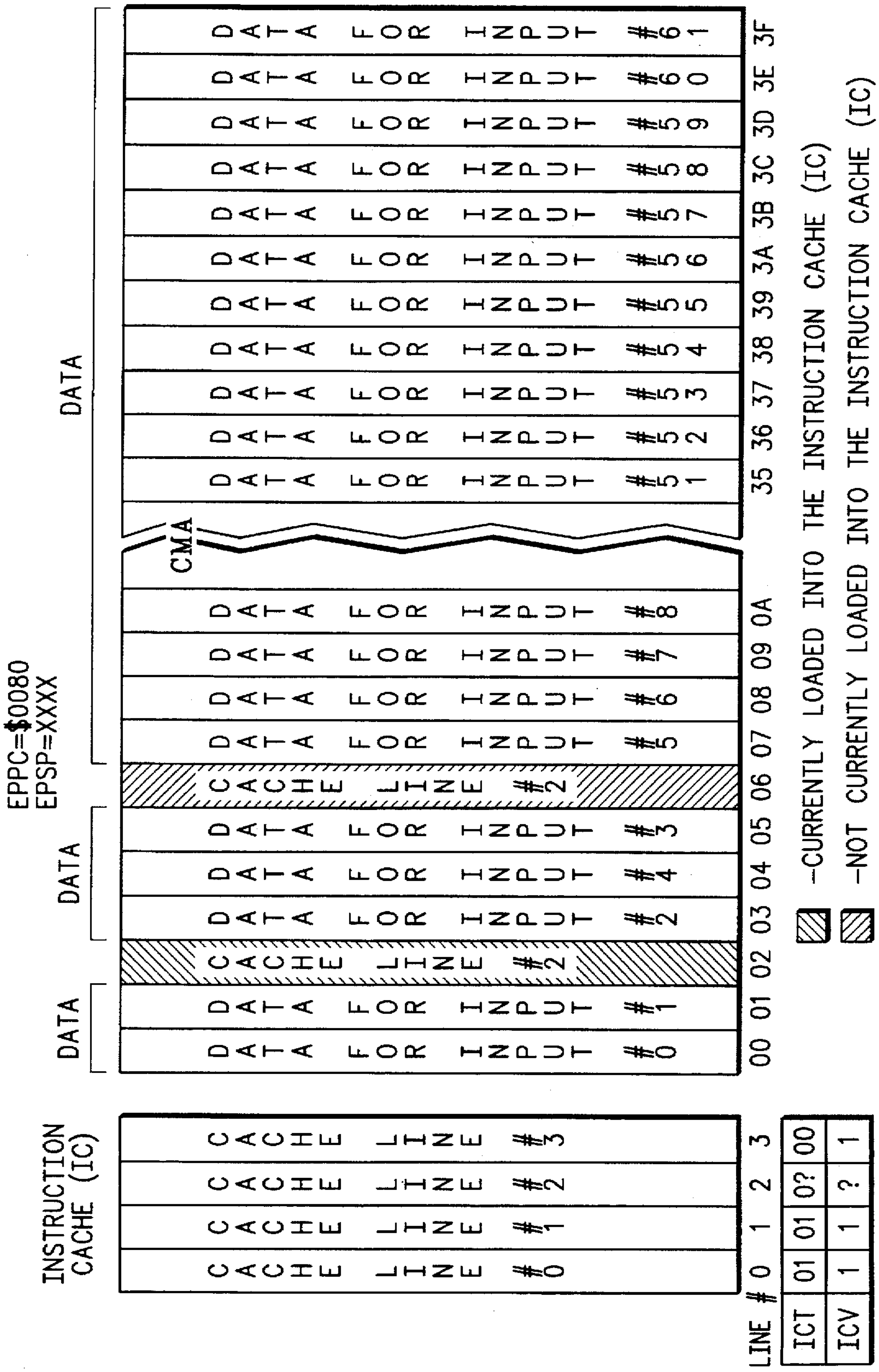
Figures 3, 4, 5, 6, 7, 8, 9, 10, 11, 12, 13, 14, 15:
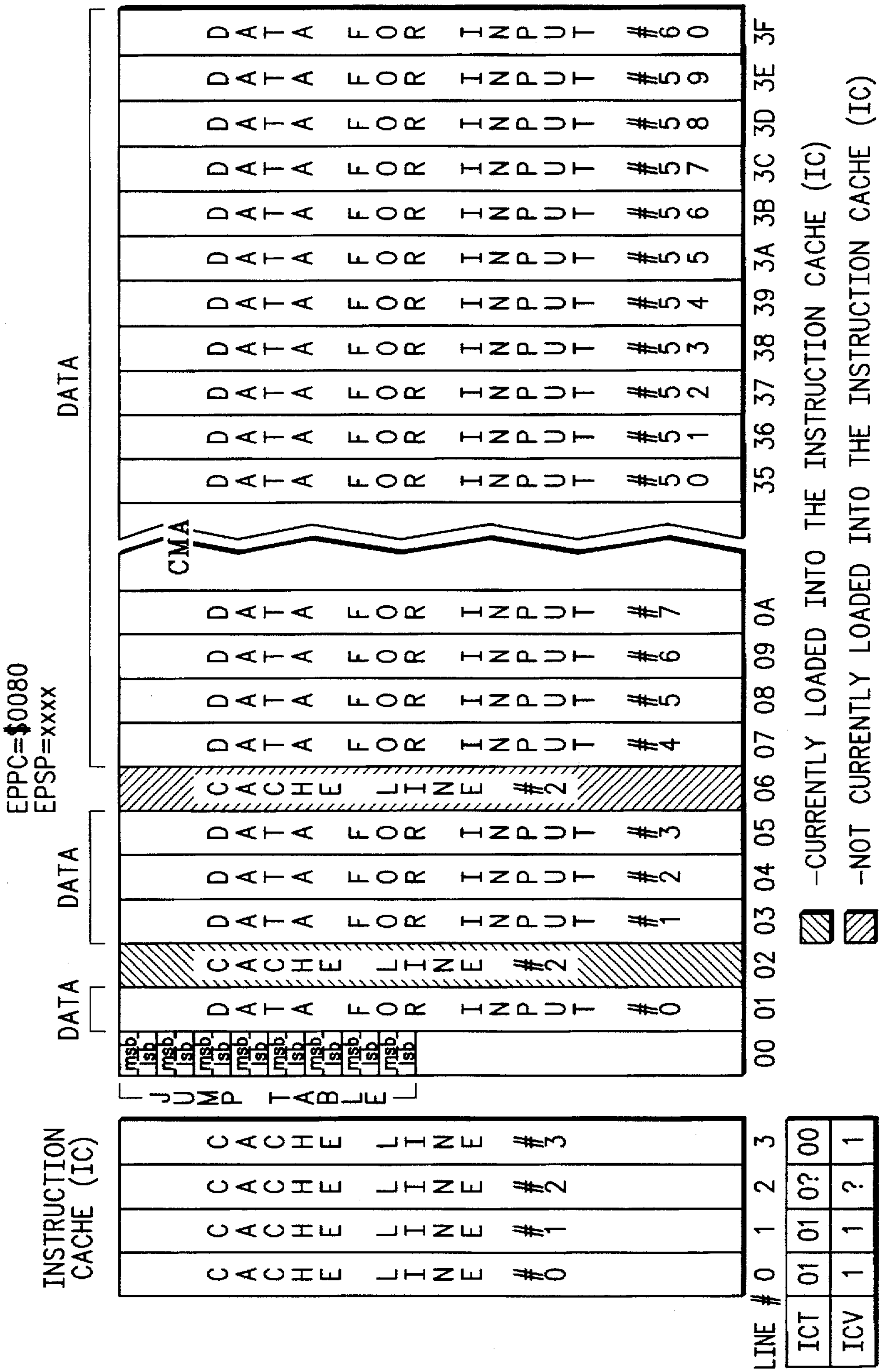
Figures 3, 4, 5, 6, 7, 8, 9, 10, 11, 12, 13, 14, 15, 16:
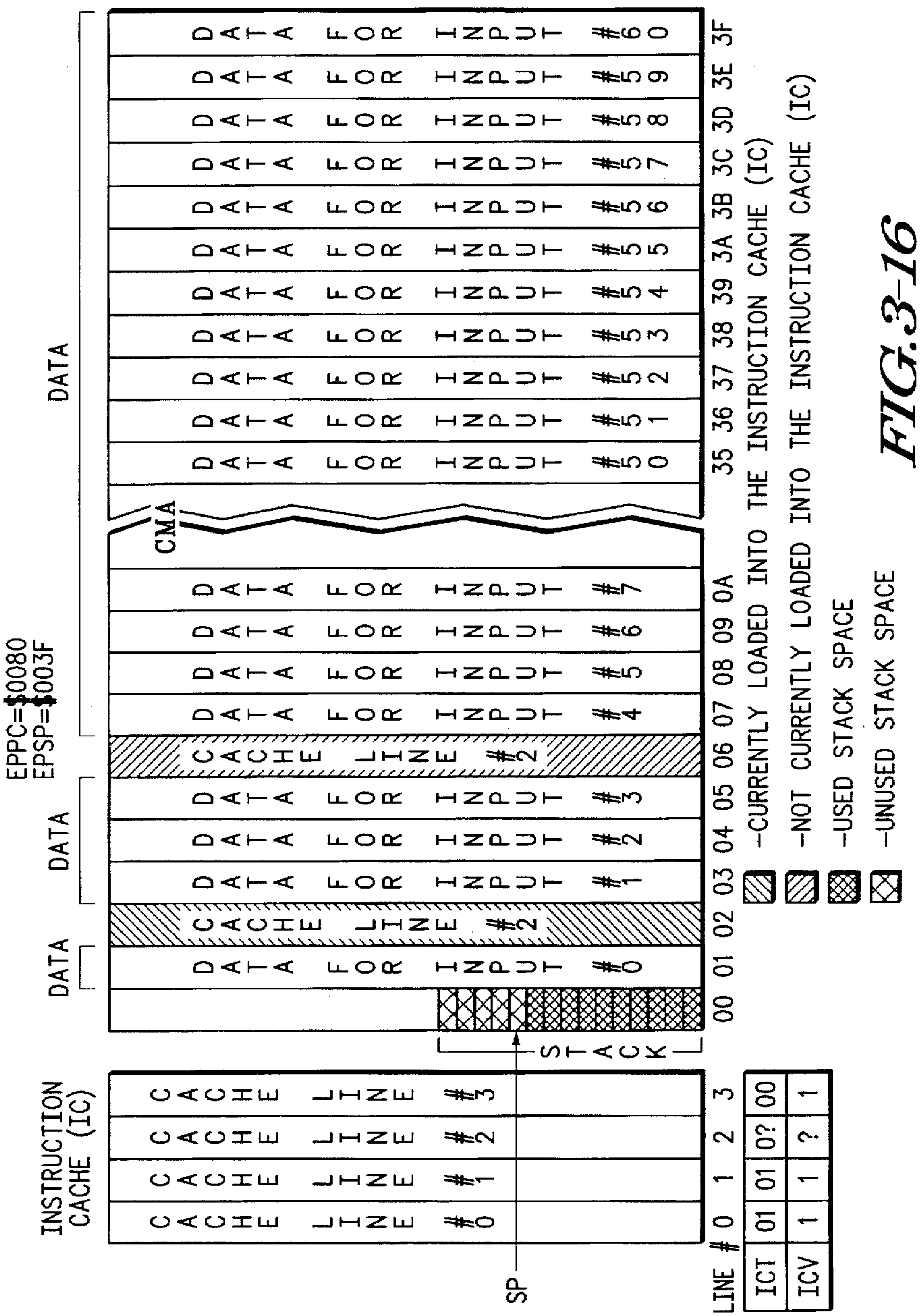
Figures 3, 4, 5, 6, 7, 8, 9, 10, 11, 12, 13, 14, 15, 16, 17:
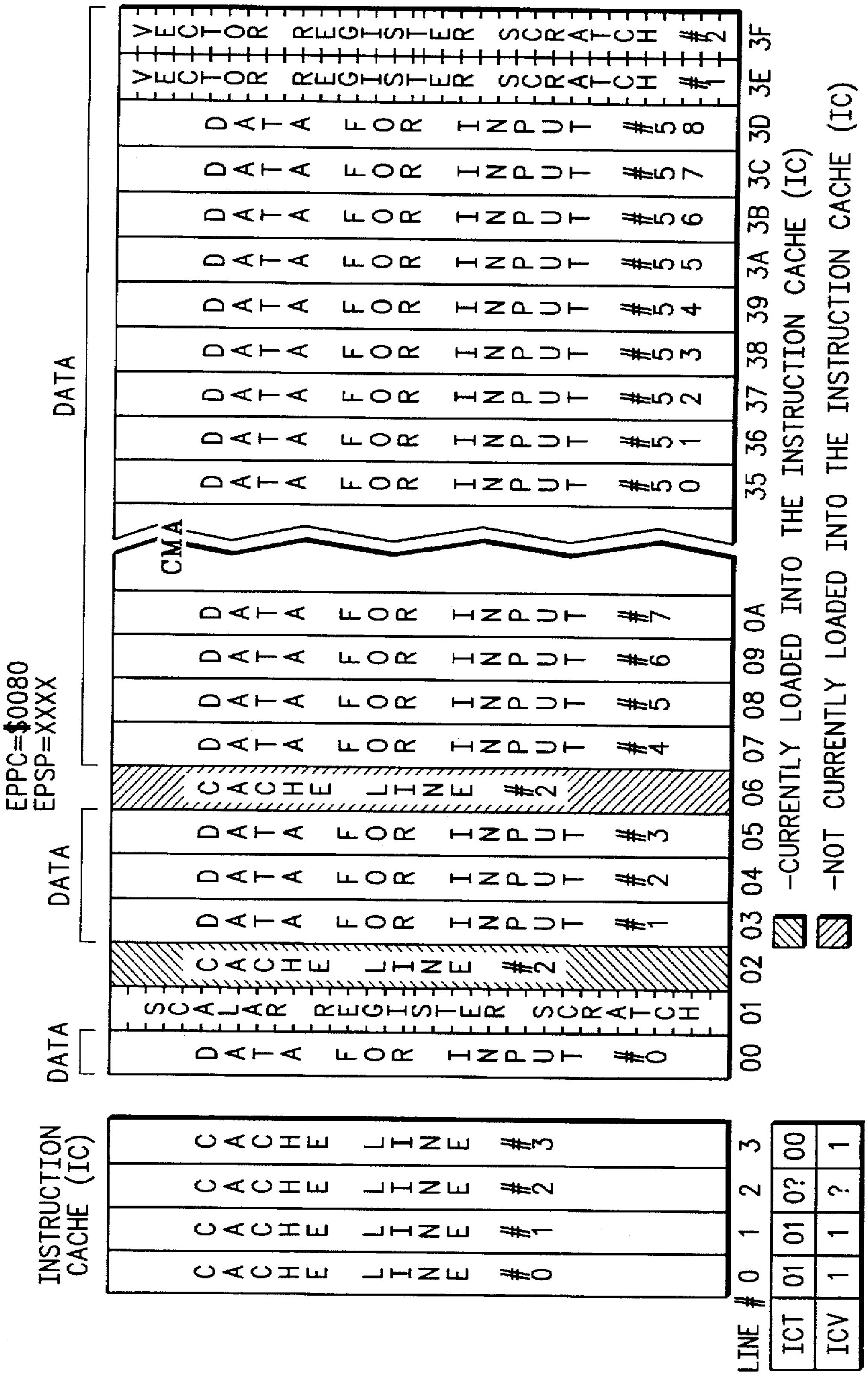
Figures 3, 4, 5, 6, 7, 8, 9, 10, 11, 12, 13, 14, 15, 16, 17, 18:
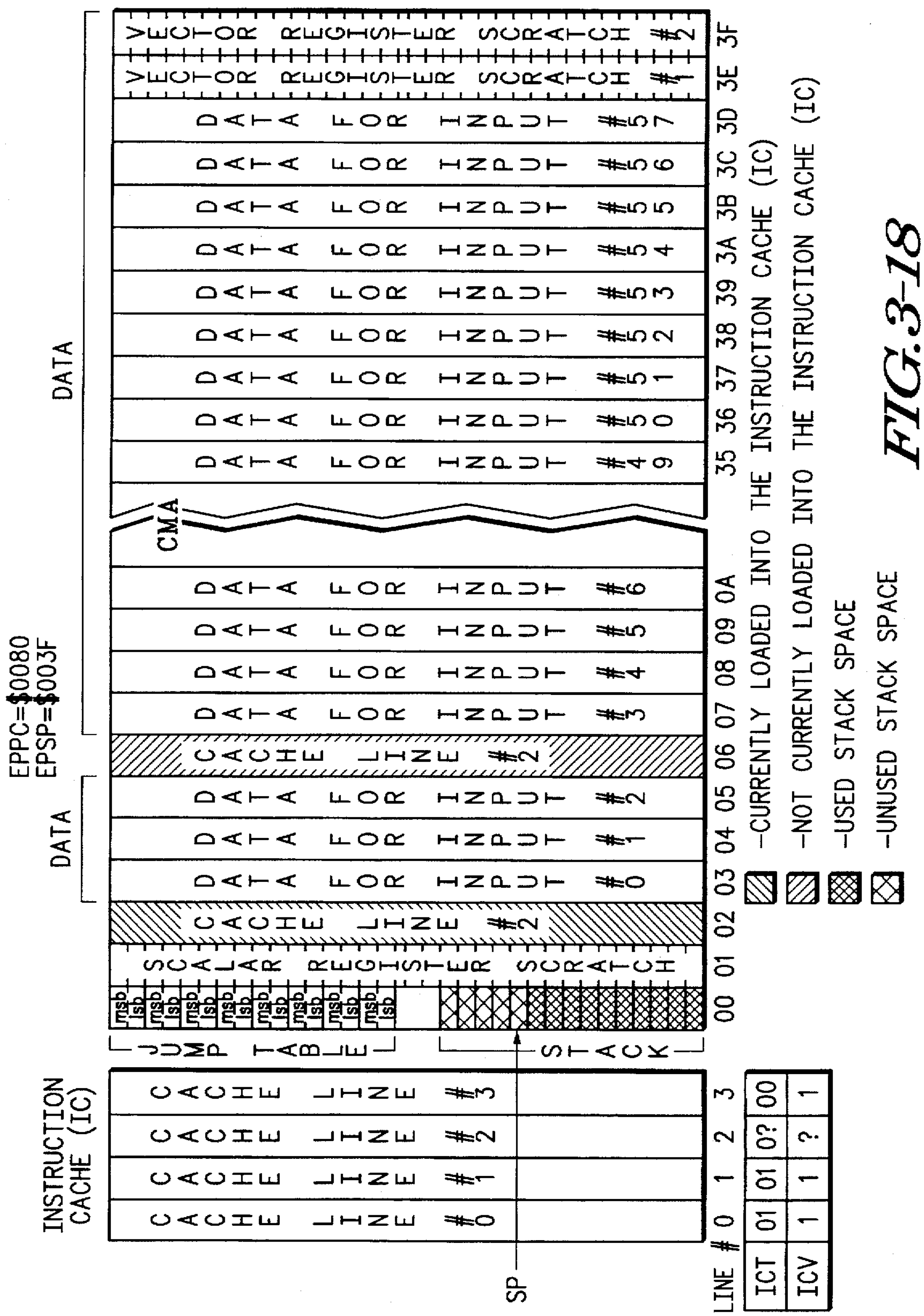
Figures 3, 4, 5, 6, 7, 8, 9, 10, 11, 12, 13, 14, 15, 16, 17, 18, 19:
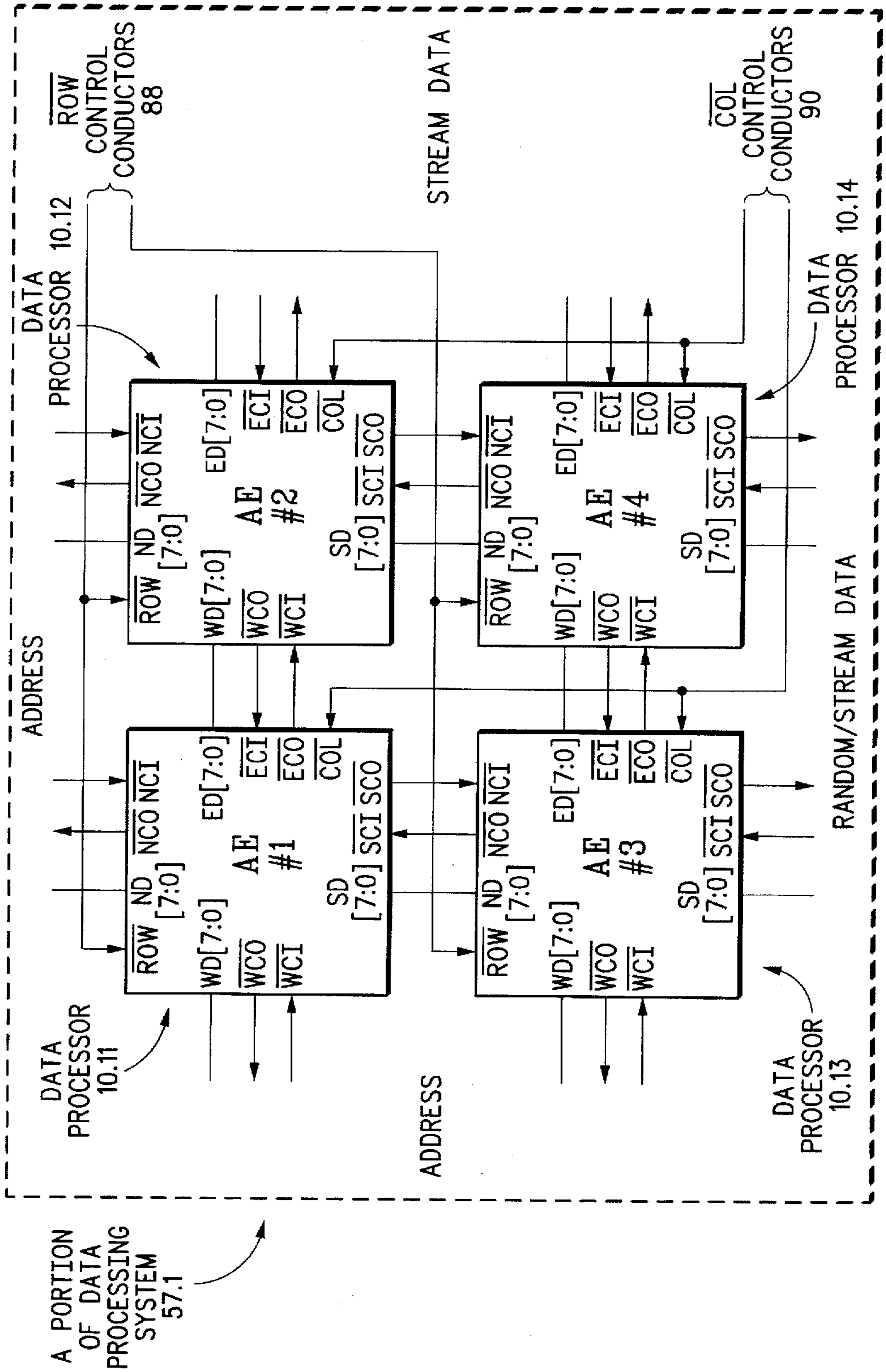
Figures 3, 4, 5, 6, 7, 8, 9, 10, 11, 12, 13, 14, 15, 16, 17, 18, 19, 20:
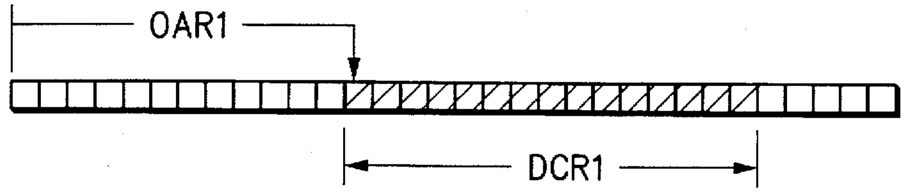
Figures 3, 4, 5, 6, 7, 8, 9, 10, 11, 12, 13, 14, 15, 16, 17, 18, 19, 20, 21:
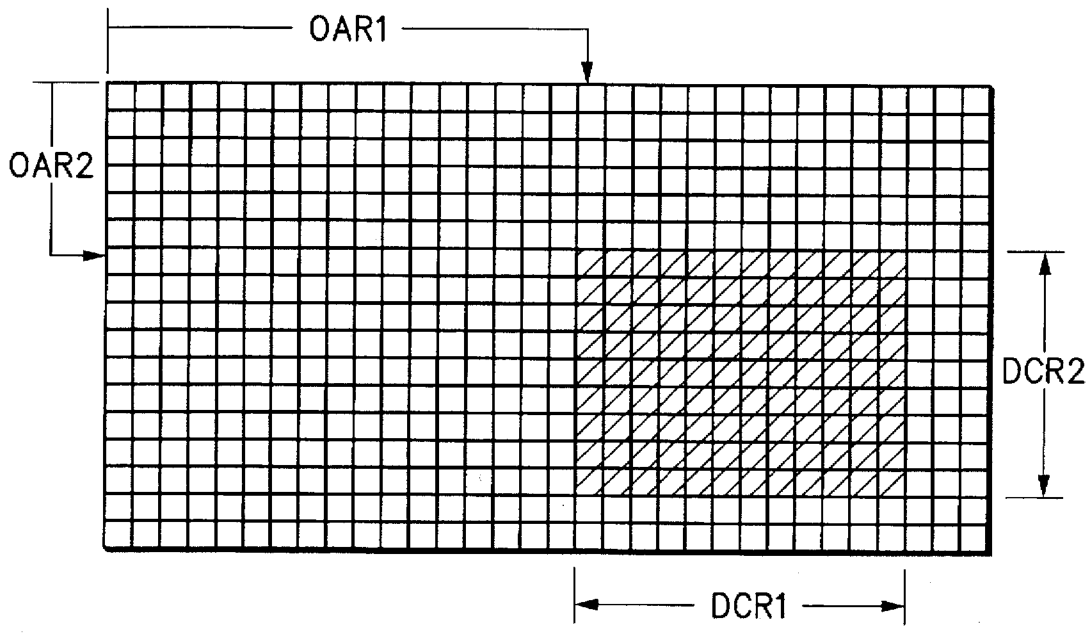
Figures 3, 4, 5, 6, 7, 8, 9, 10, 11, 12, 13, 14, 15, 16, 17, 18, 19, 20, 21, 22:
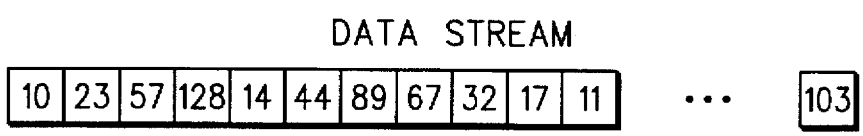
Figures 3, 4, 5, 6, 7, 8, 9, 10, 11, 12, 13, 14, 15, 16, 17, 18, 19, 20, 21, 22, 23:
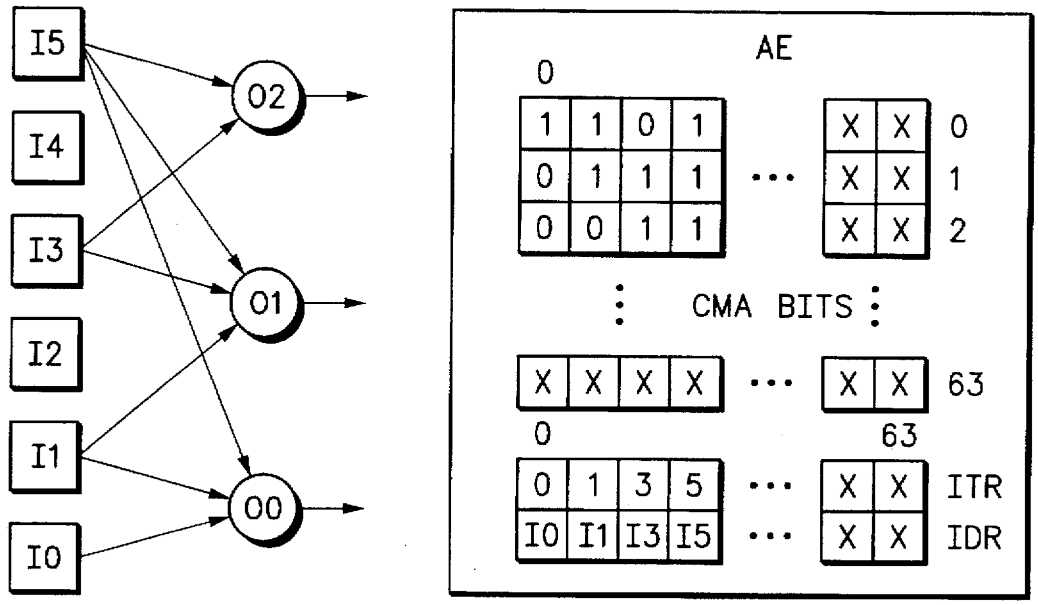
Figures 3, 4, 5, 6, 7, 8, 9, 10, 11, 12, 13, 14, 15, 16, 17, 18, 19, 20, 21, 22, 23, 24:
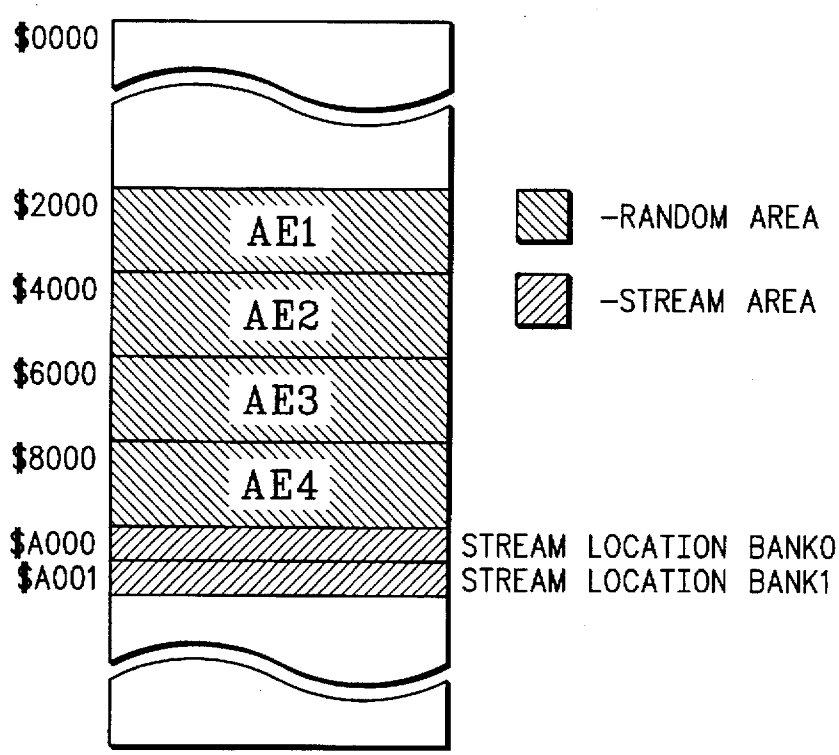
Figures 3, 4, 5, 6, 7, 8, 9, 10, 11, 12, 13, 14, 15, 16, 17, 18, 19, 20, 21, 22, 23, 24, 25:
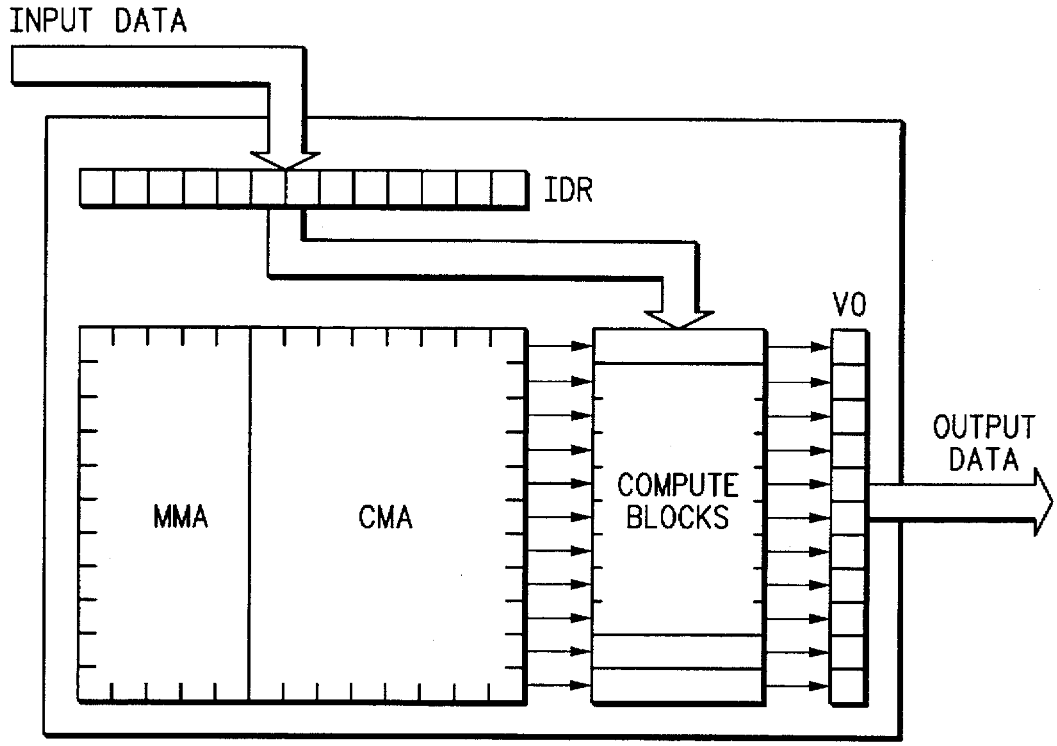
Figures 3, 4, 5, 6, 7, 8, 9, 10, 11, 12, 13, 14, 15, 16, 17, 18, 19, 20, 21, 22, 23, 24, 25, 26:
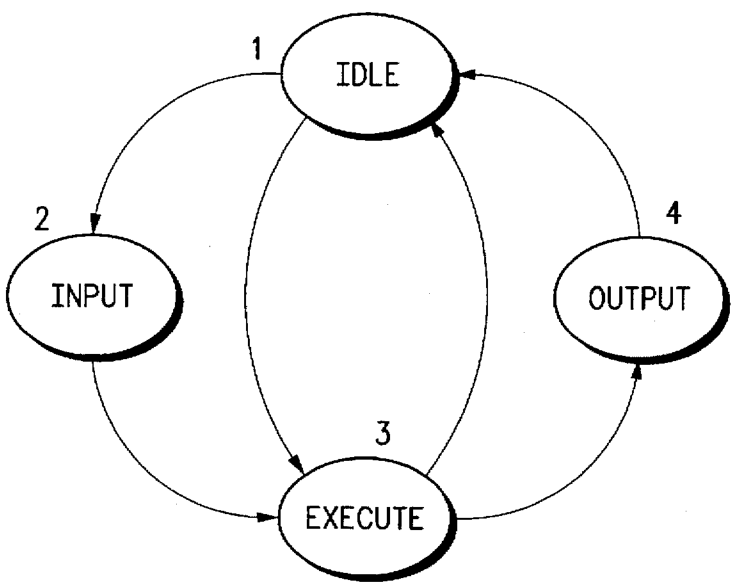
Figures 3, 4, 5, 6, 7, 8, 9, 10, 11, 12, 13, 14, 15, 16, 17, 18, 19, 20, 21, 22, 23, 24, 25, 26, 27:
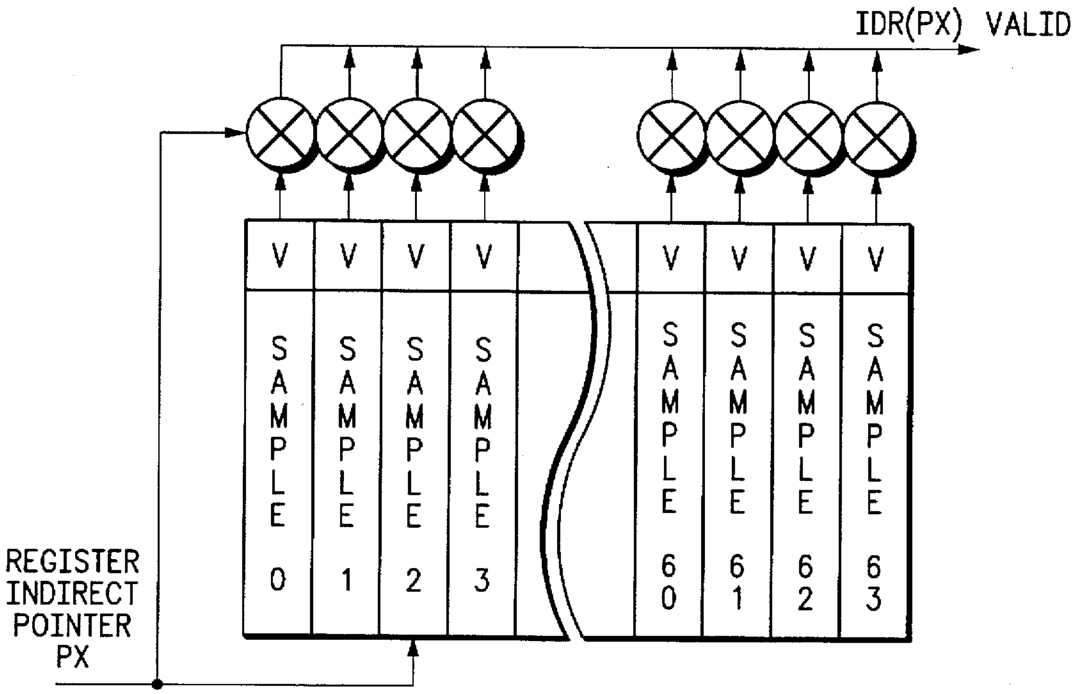
Figures 3, 4, 5, 6, 7, 8, 9, 10, 11, 12, 13, 14, 15, 16, 17, 18, 19, 20, 21, 22, 23, 24, 25, 26, 27, 28:
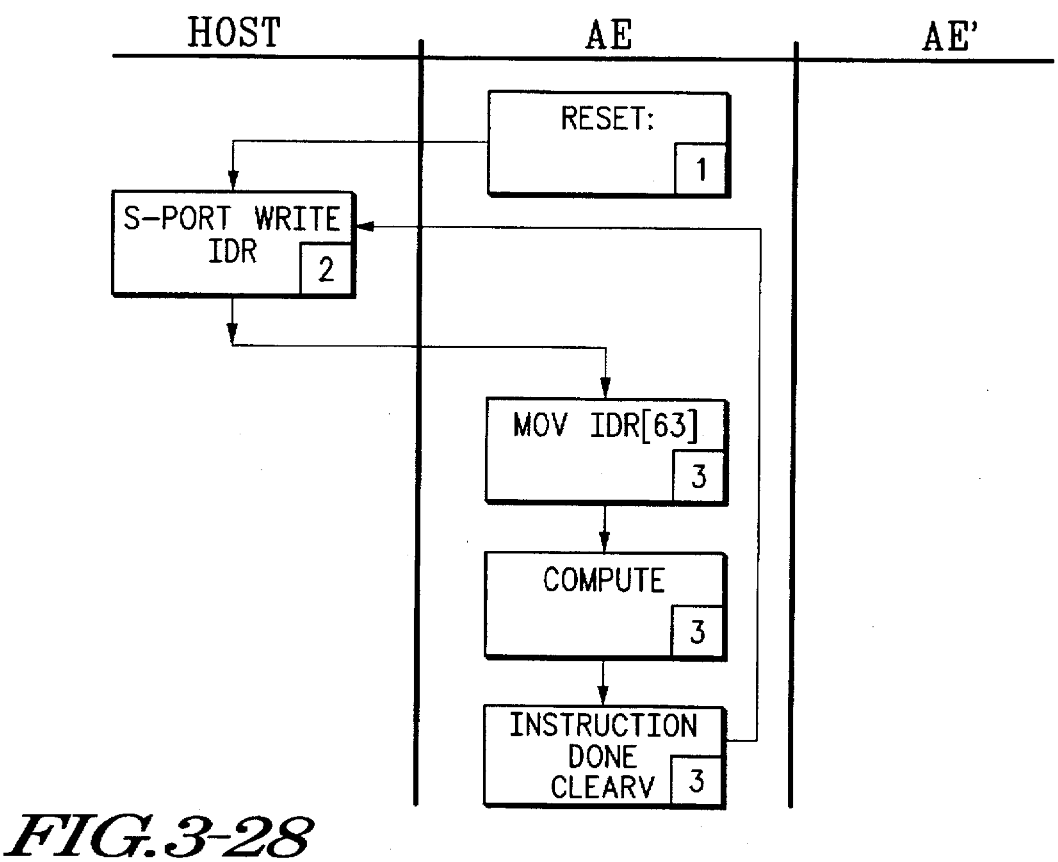
Figures 3, 4, 5, 6, 7, 8, 9, 10, 11, 12, 13, 14, 15, 16, 17, 18, 19, 20, 21, 22, 23, 24, 25, 26, 27, 28, 29:
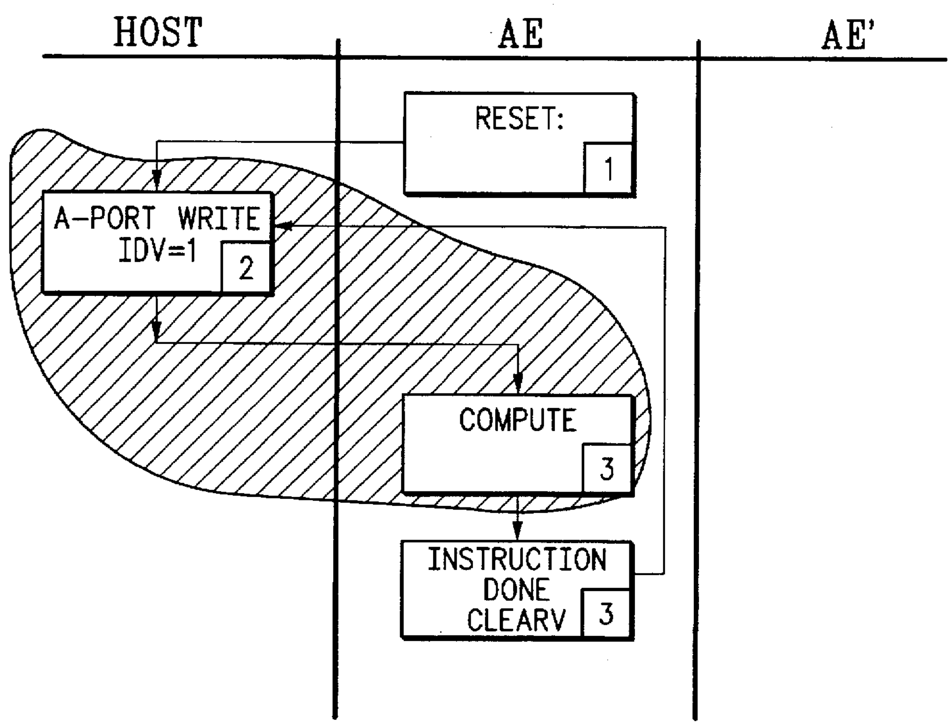
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31:
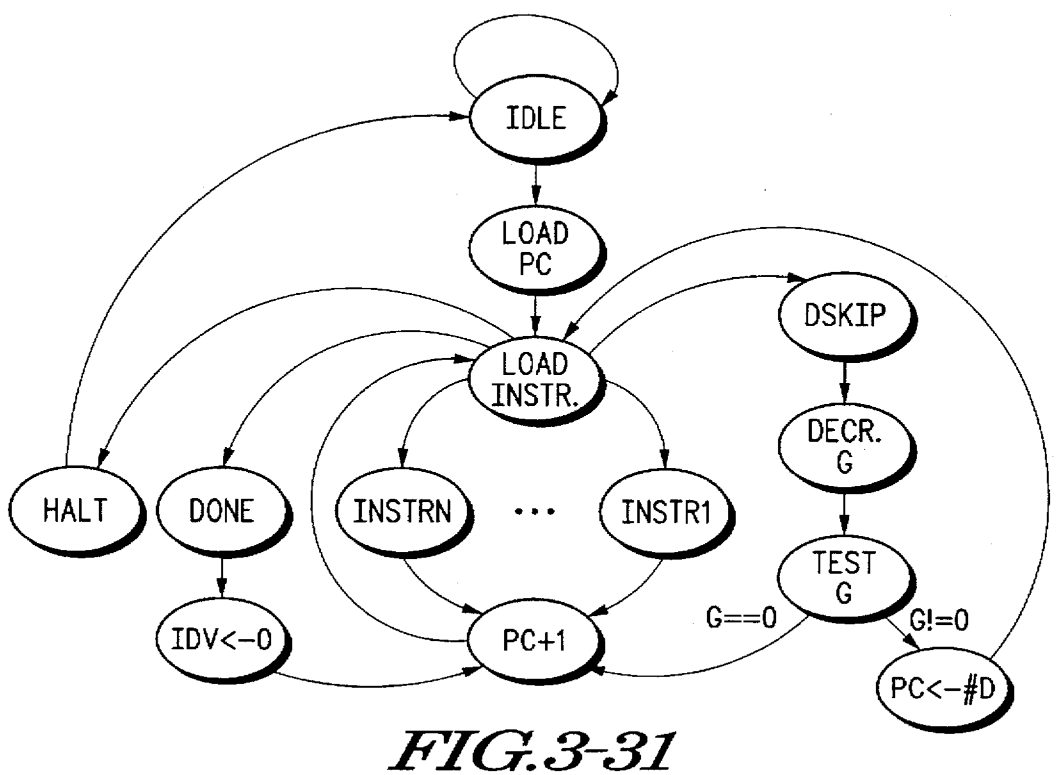
Figures 3, 4, 5, 6, 7, 8, 9, 10, 11, 12, 13, 14, 15, 16, 17, 18, 19, 20, 21, 22, 23, 24, 25, 26, 27, 28, 29, 30:
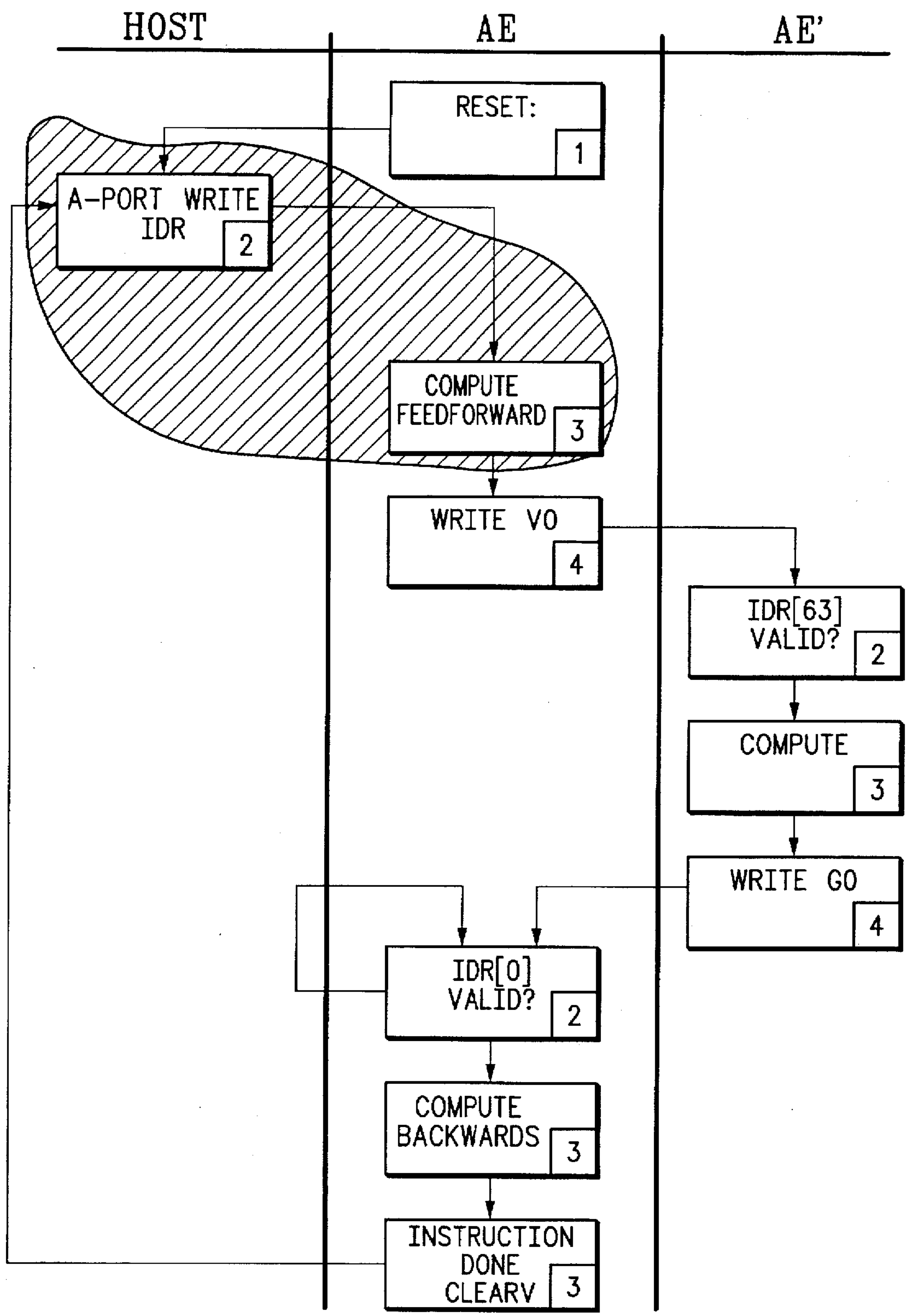
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
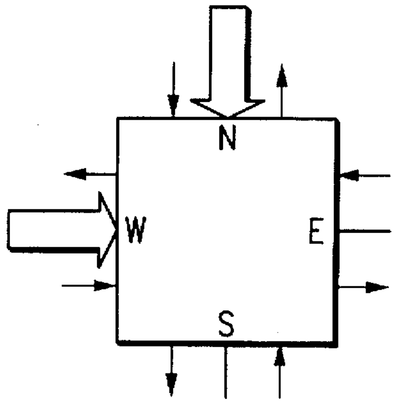
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
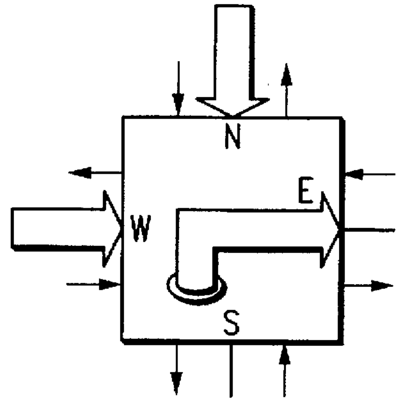
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
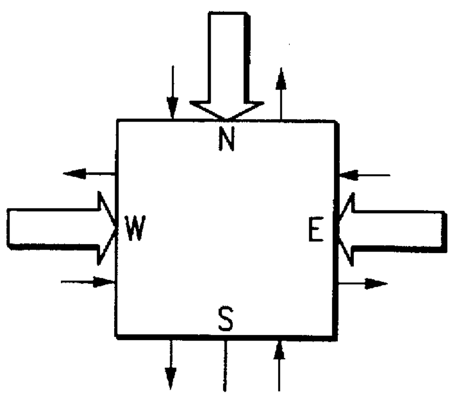
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
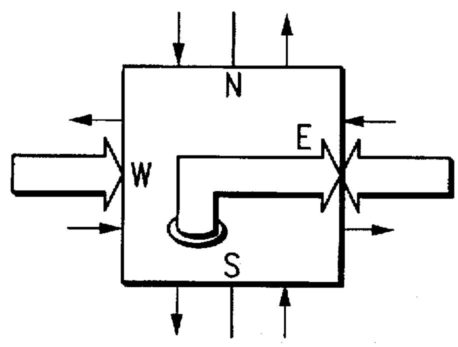
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
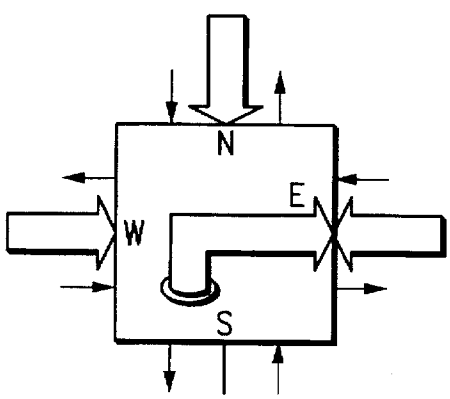
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
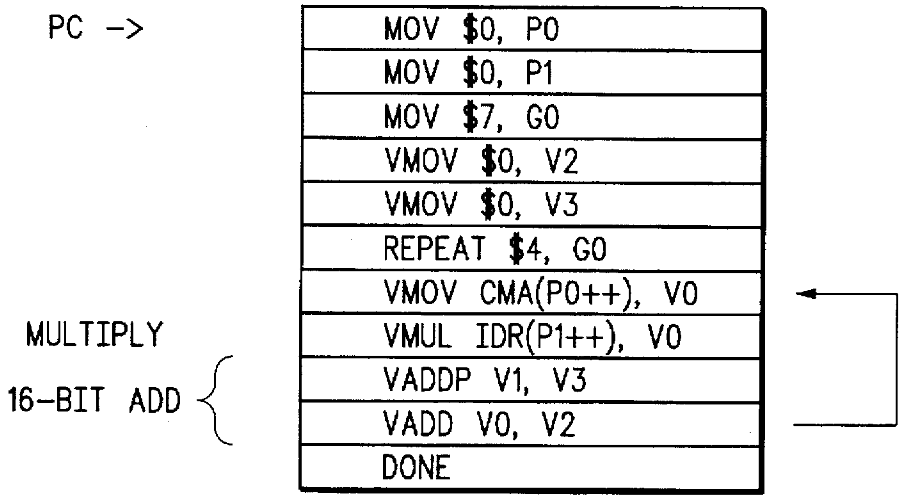
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
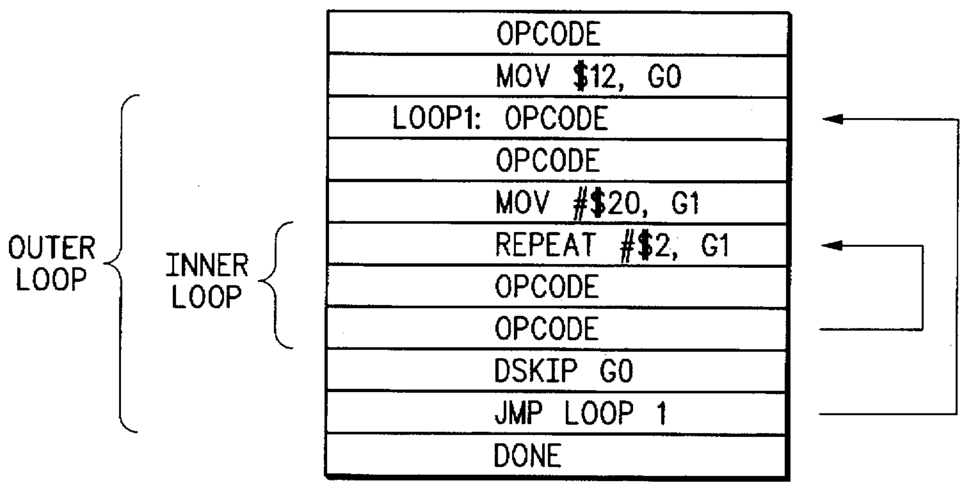
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
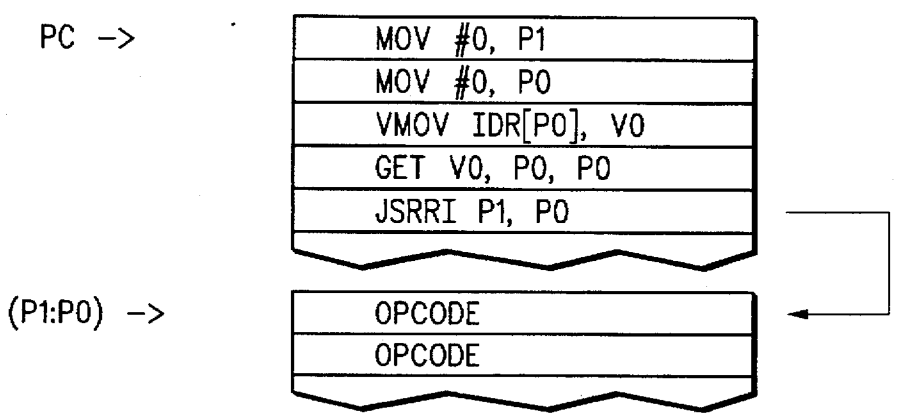
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
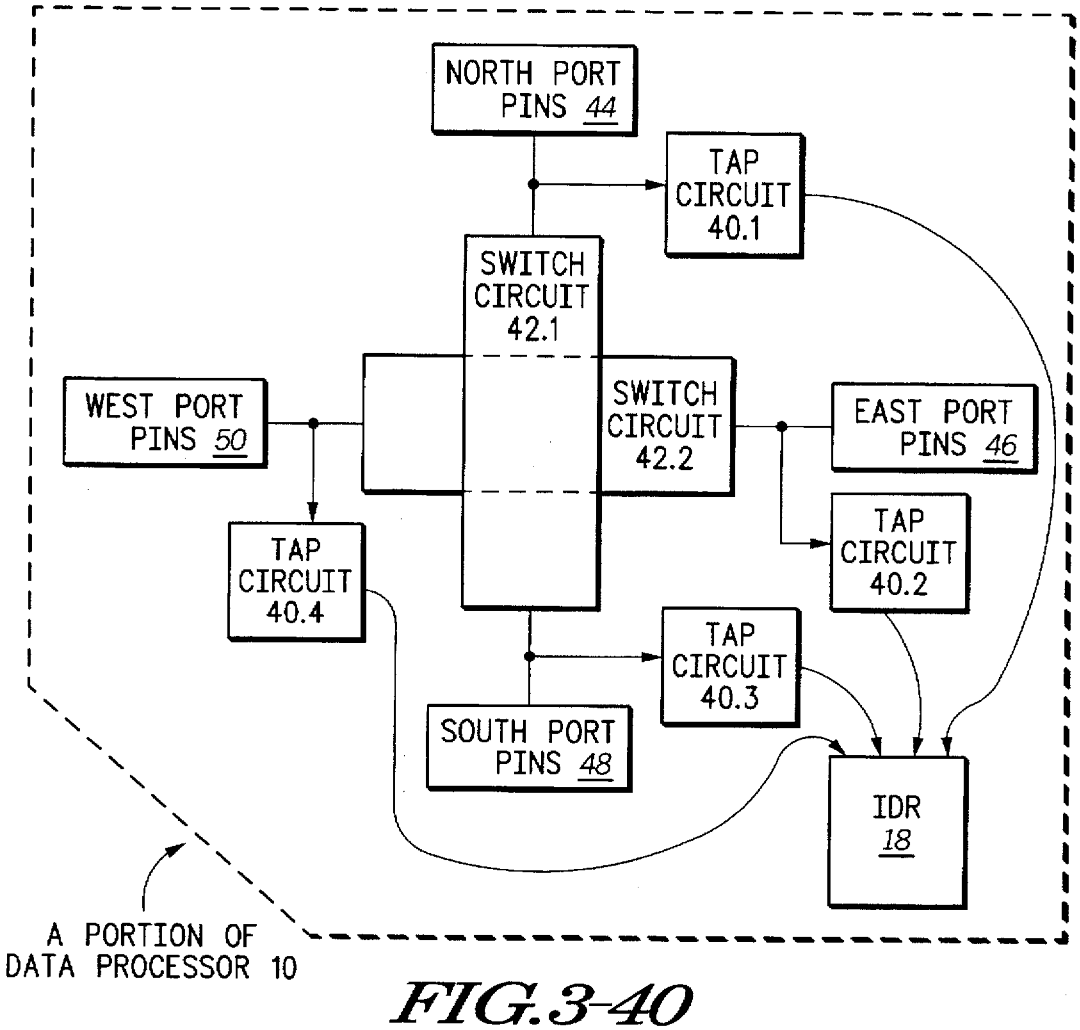
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
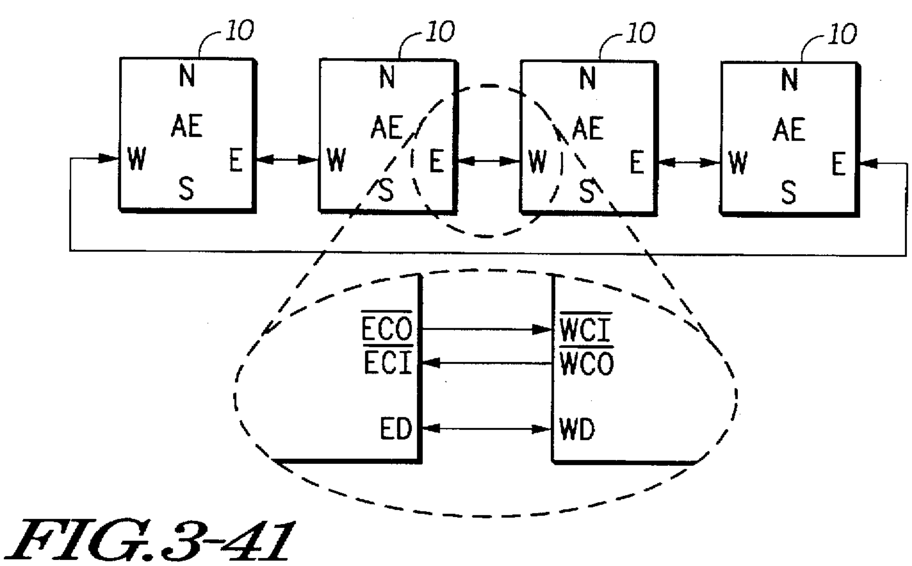
Figures 1, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
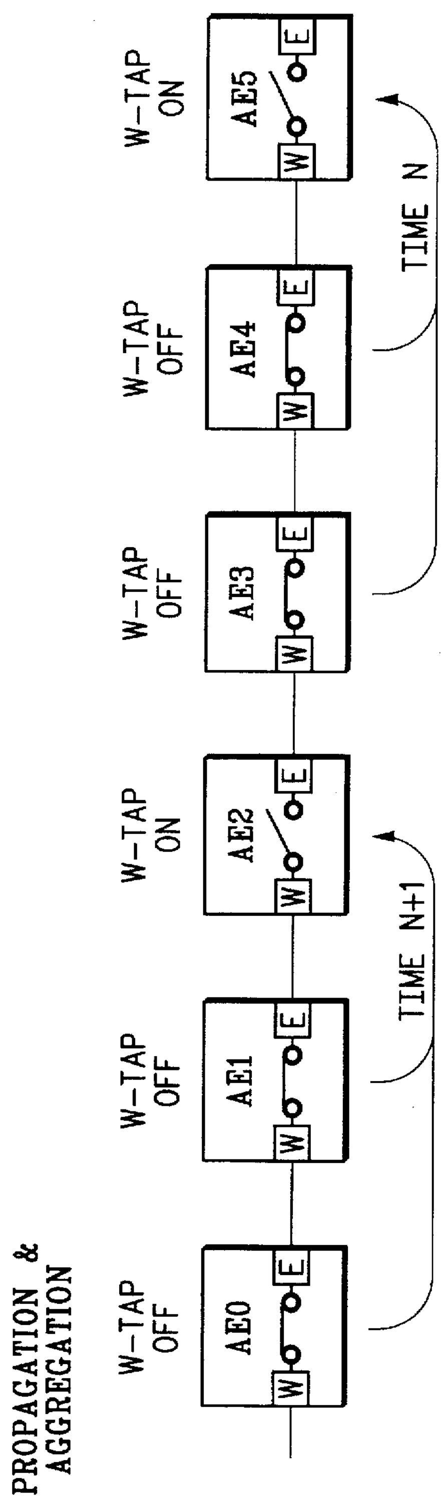
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
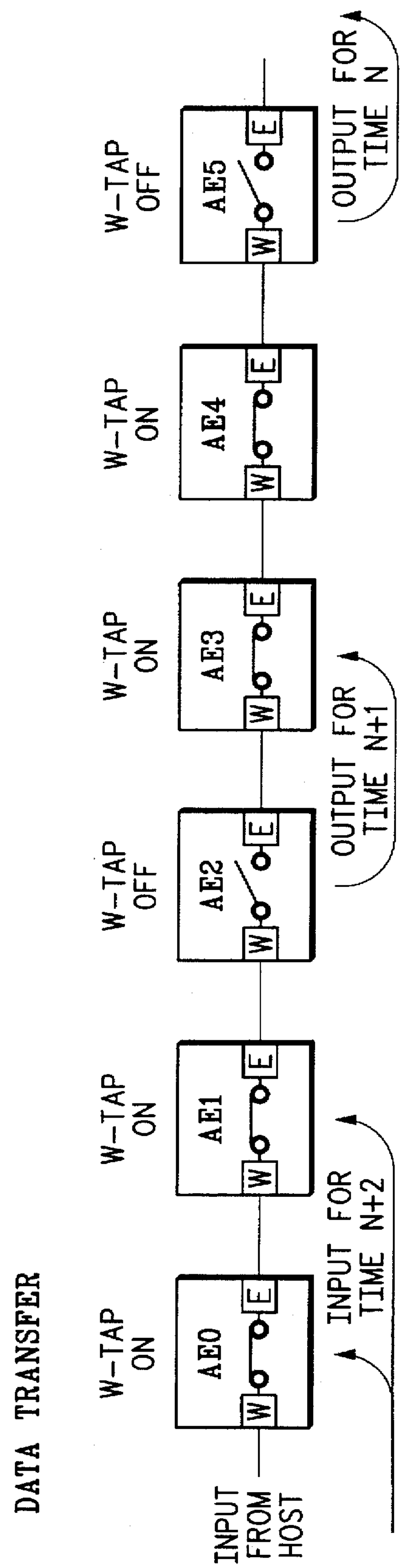
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
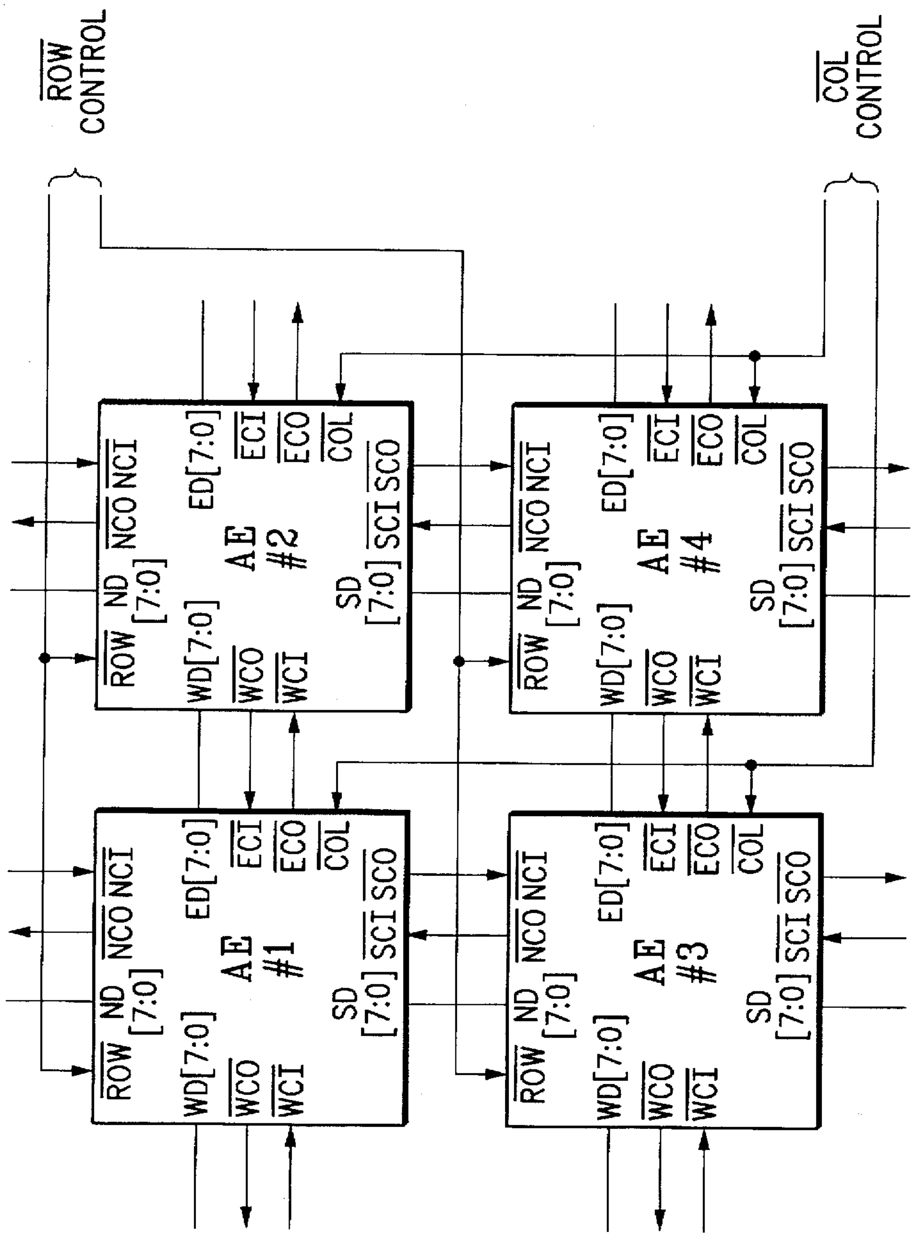
Figures 1, 4:
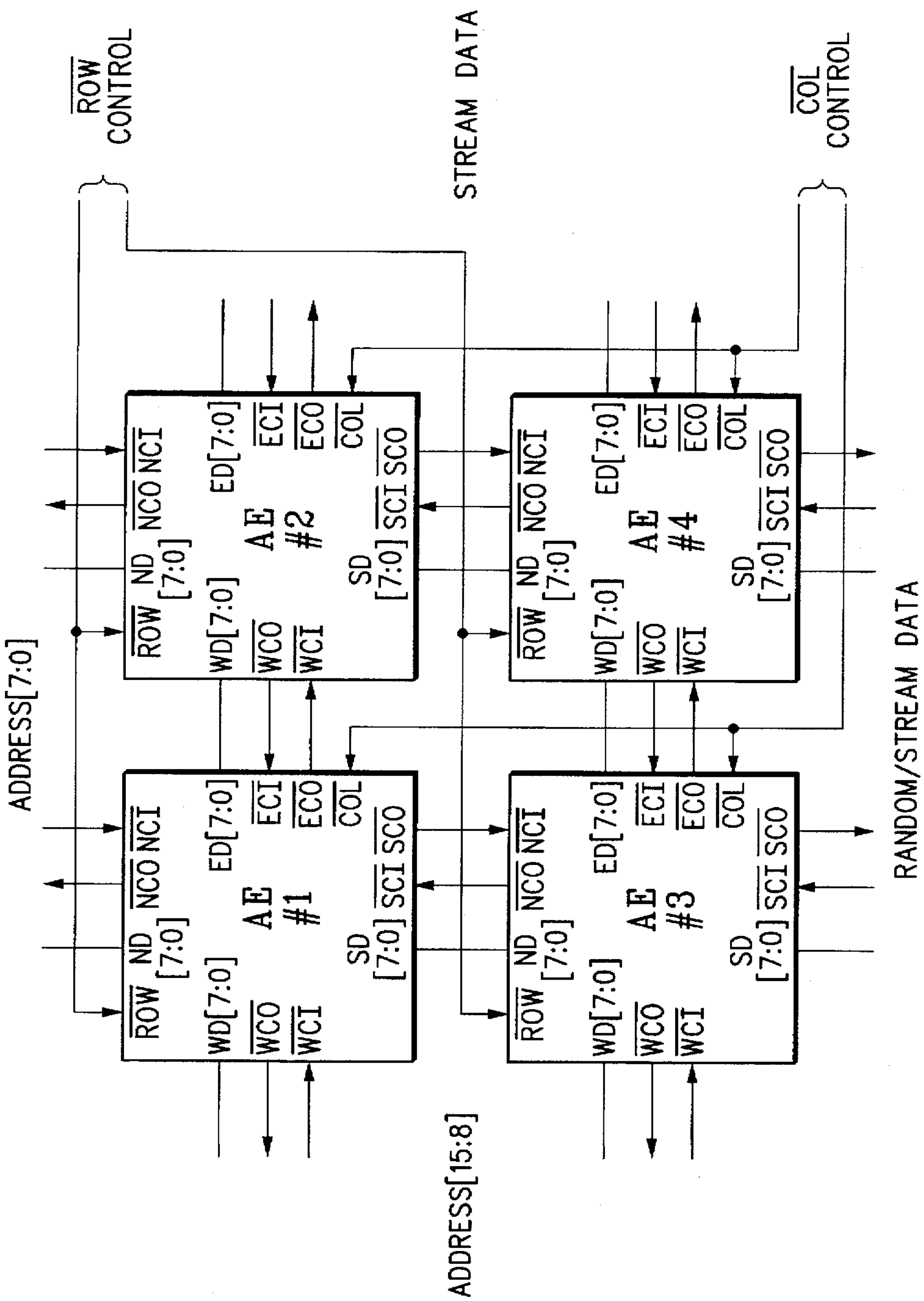
Figures 1, 2, 4:
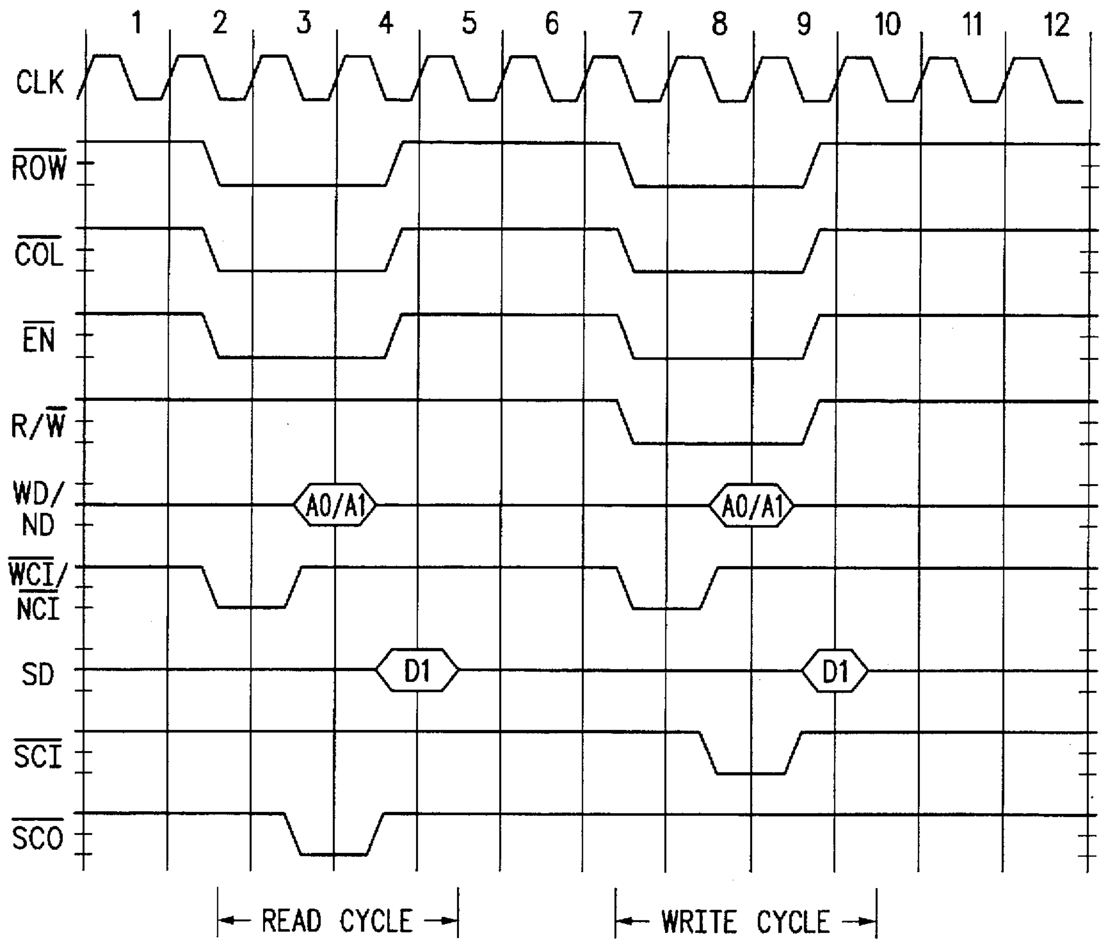
Figures 2, 4:
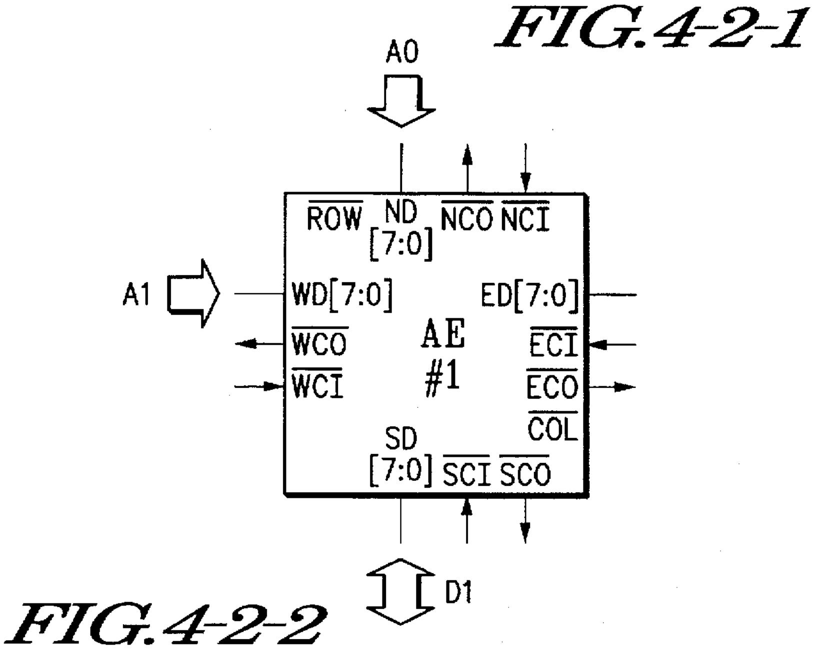
Figures 1, 3, 4:
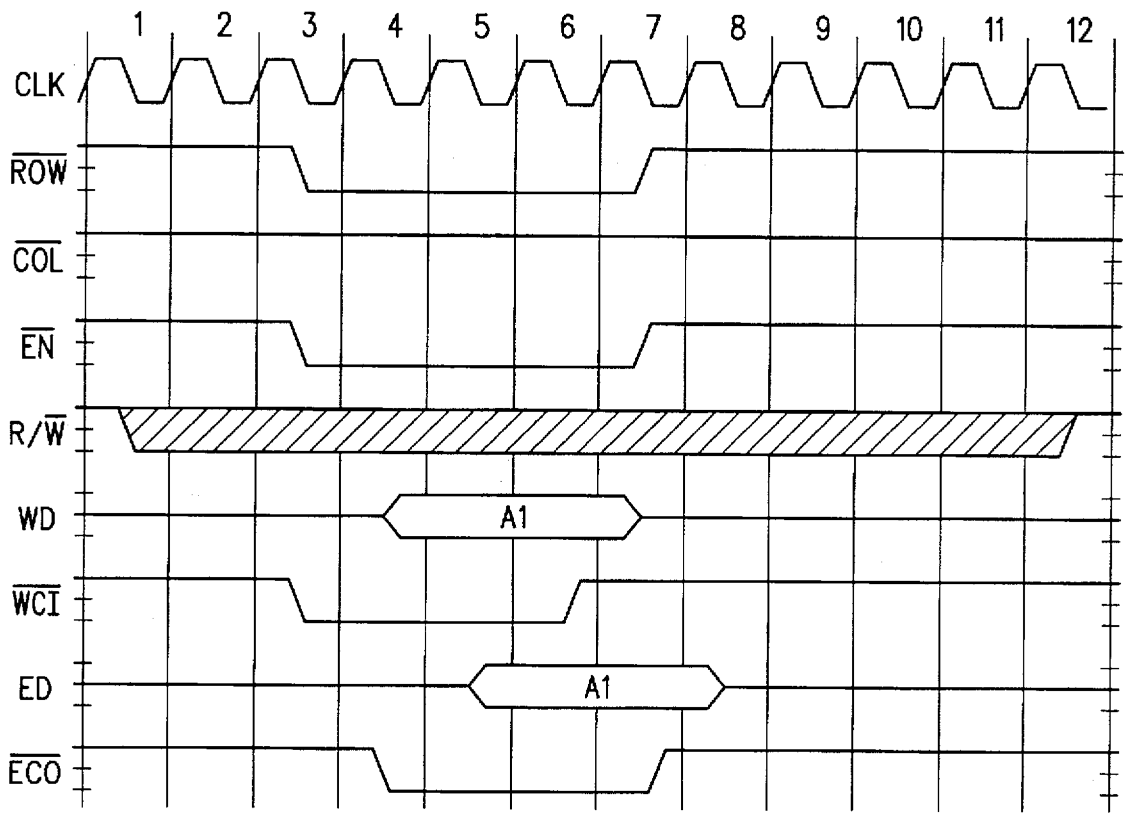
Figures 2, 3, 4:
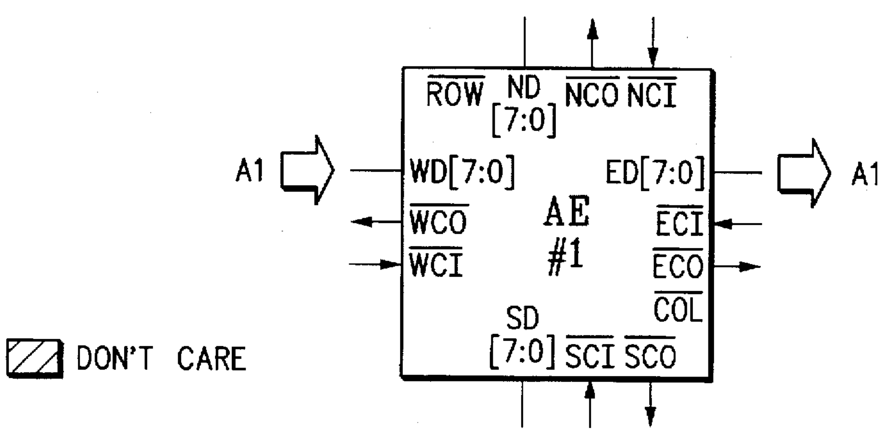
Figures 1, 4:
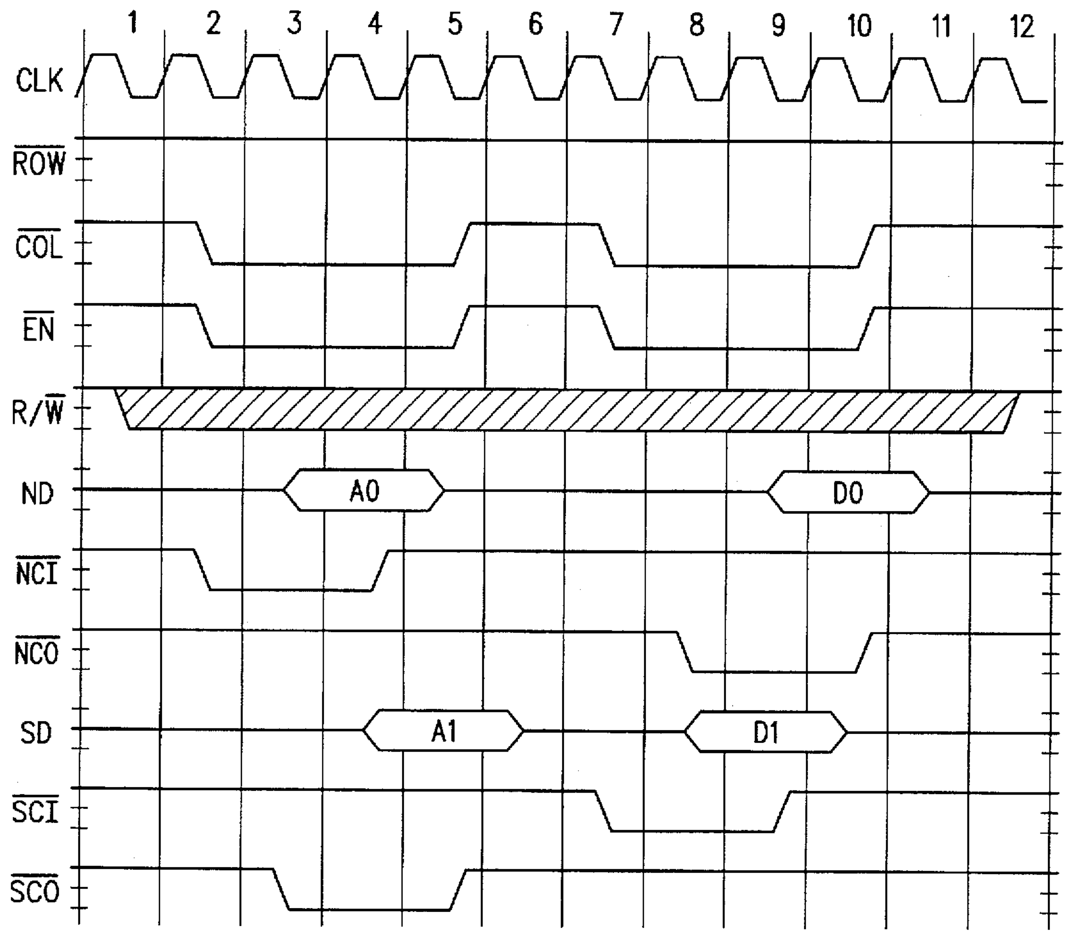
Figures 2, 4:
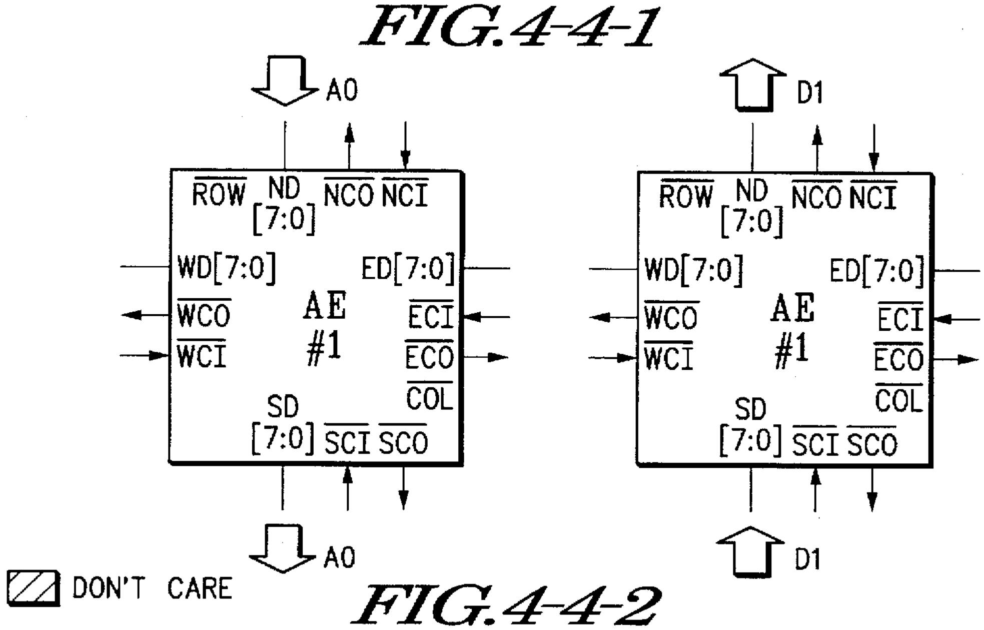
Figures 1, 4, 5:
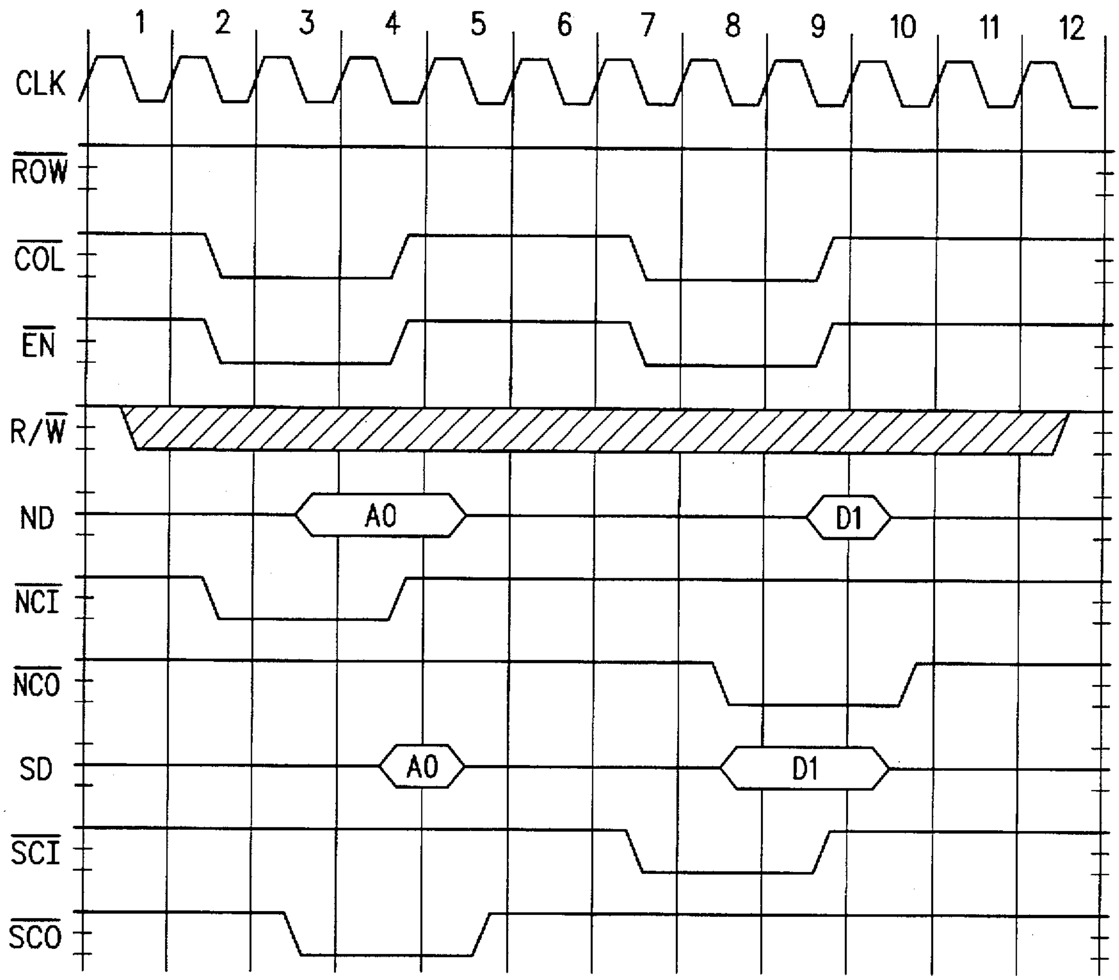
Figures 2, 4, 5:
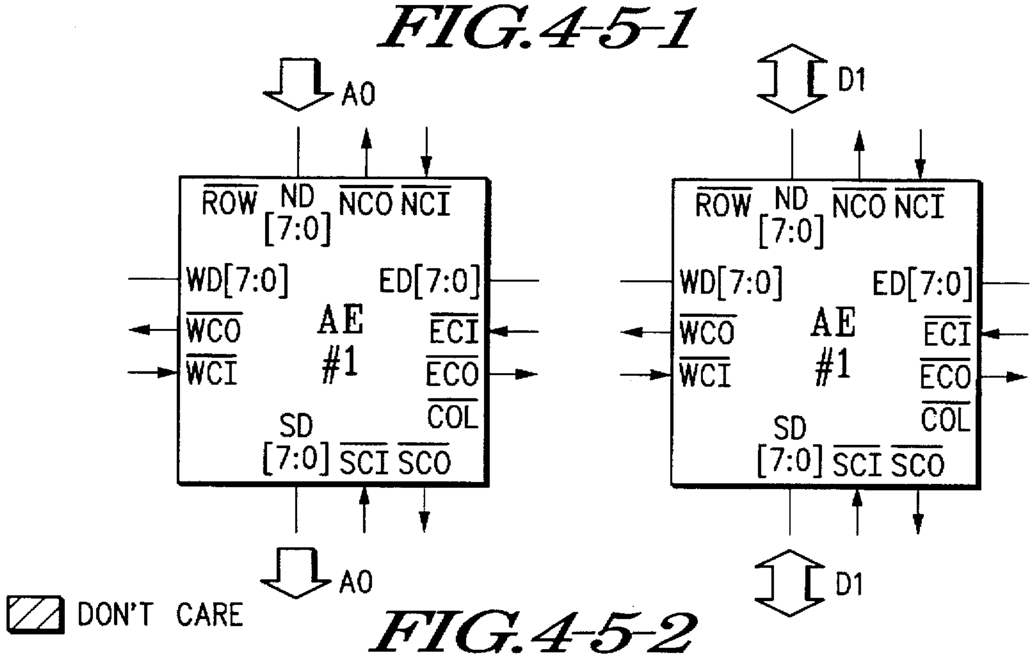
Figures 1, 4, 5, 6:
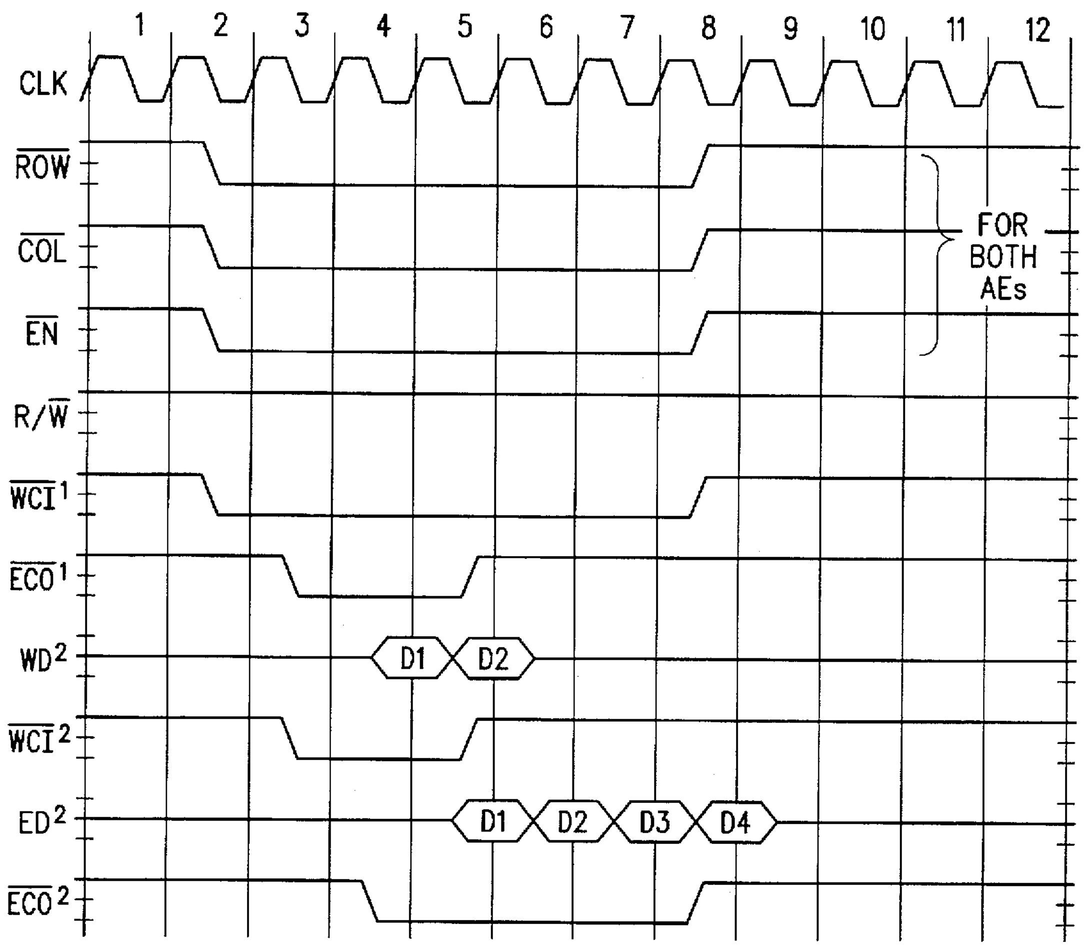
Figures 2, 4, 5, 6:
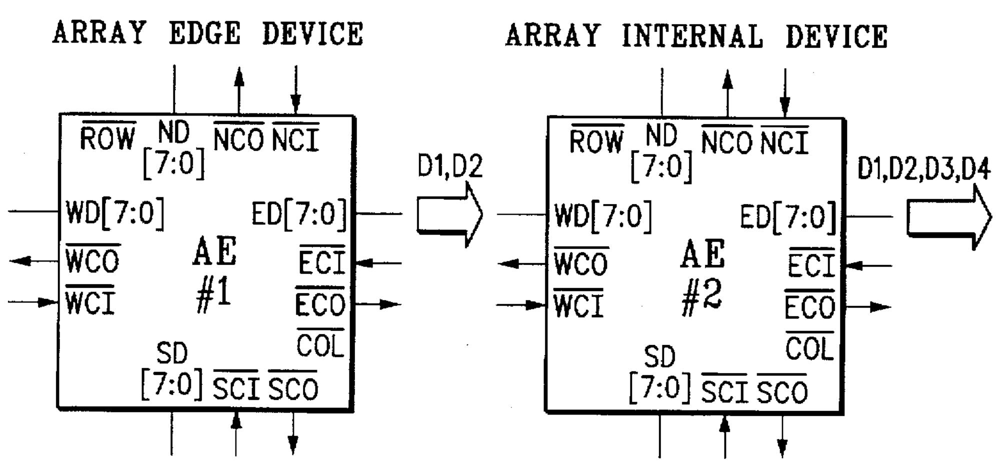
Figures 1, 4, 5, 6, 7:
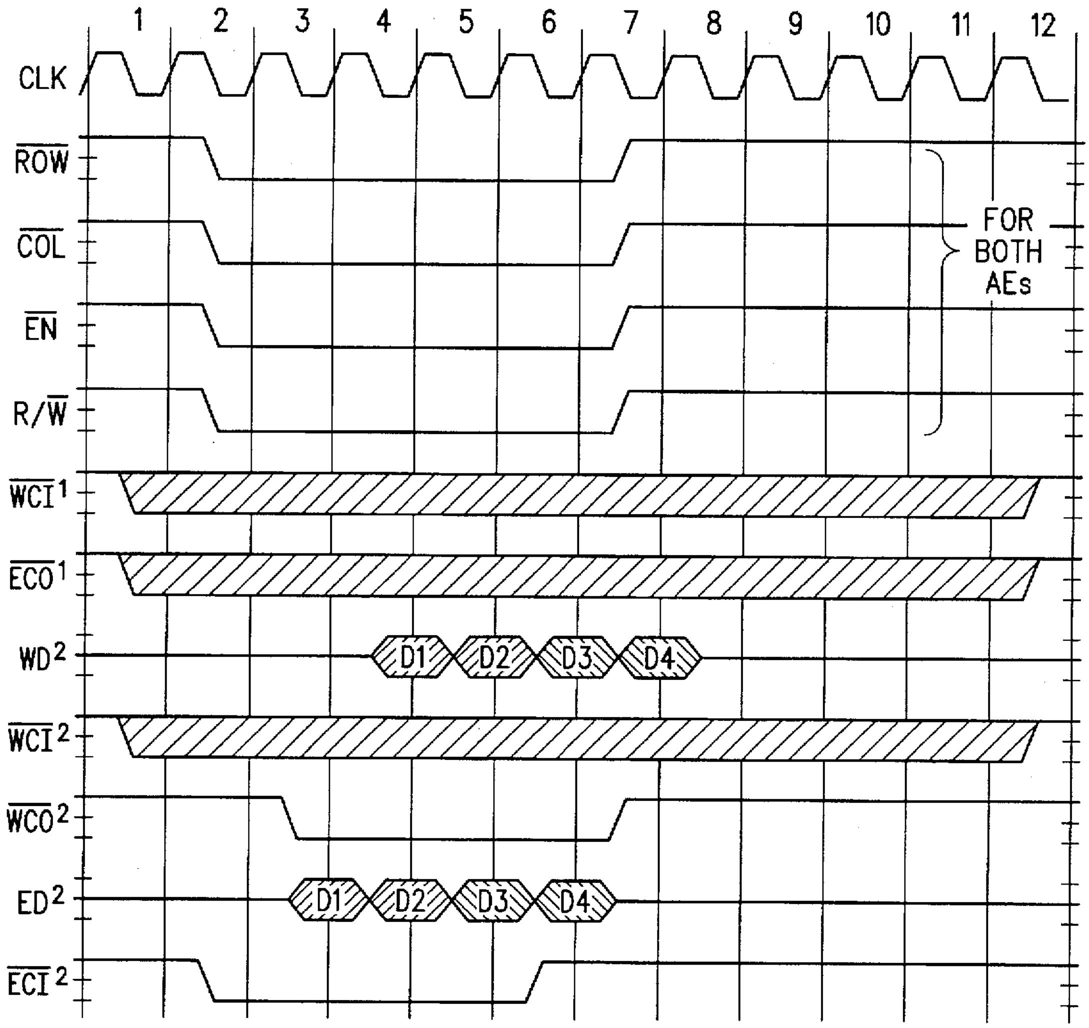
Figures 2, 4, 5, 6, 7:
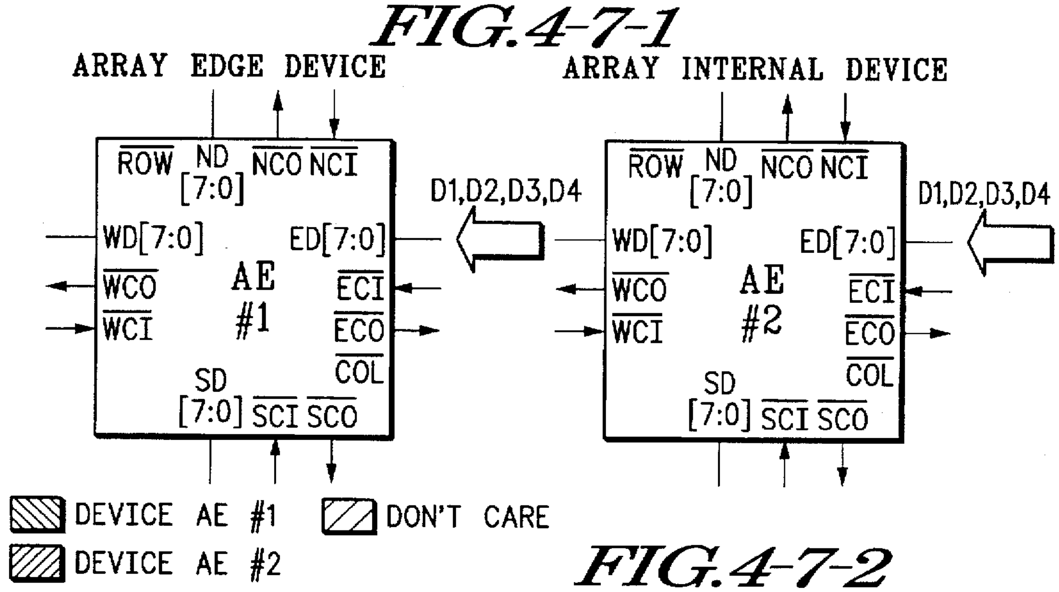
Figures 1, 4, 5, 6, 7, 8:
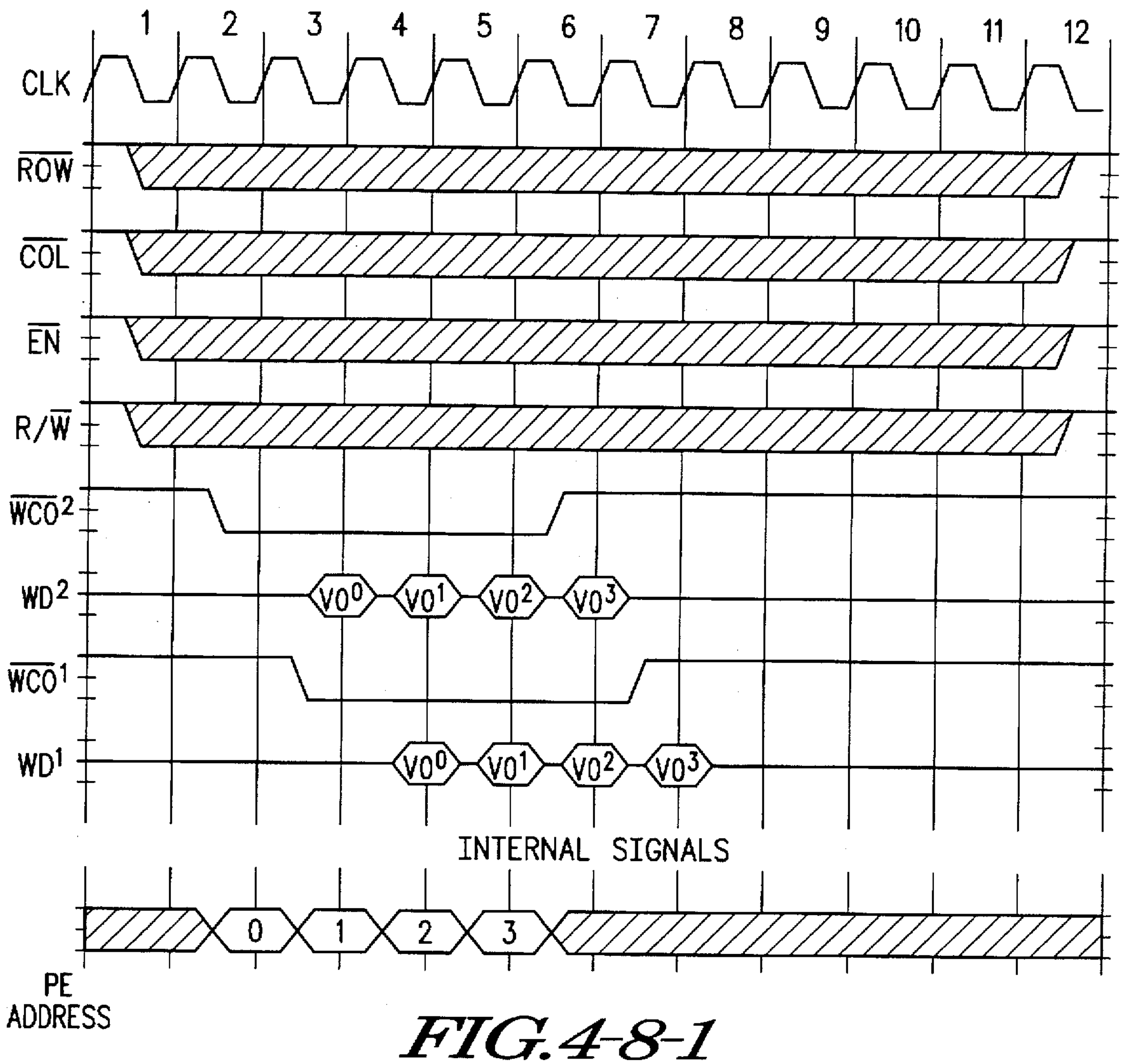
Figures 2, 4, 5, 6, 7, 8:
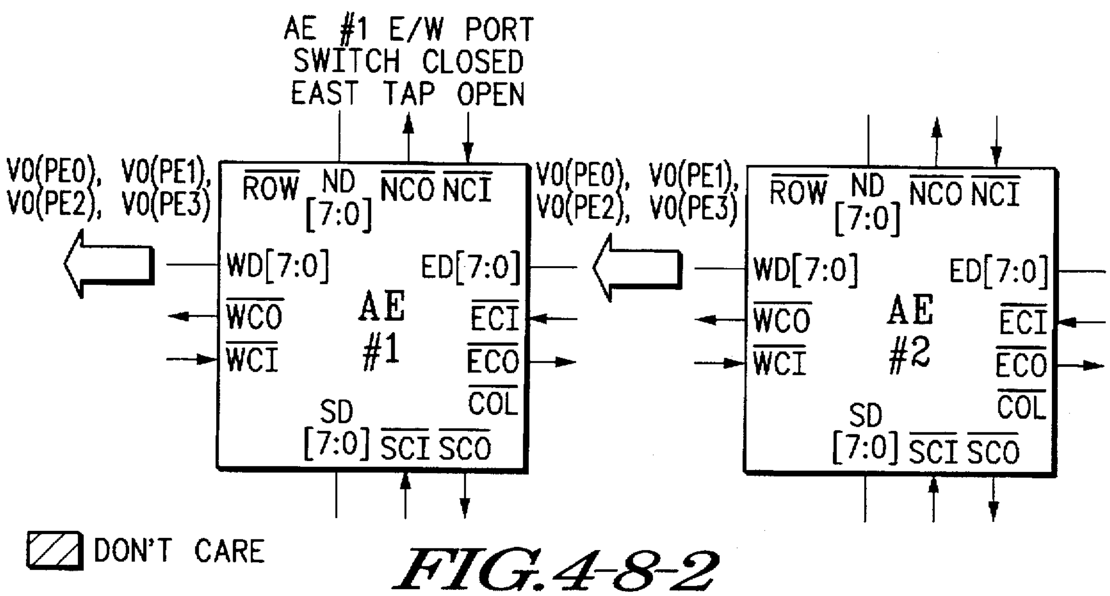
Figures 1, 4, 5, 6, 7, 8, 9:
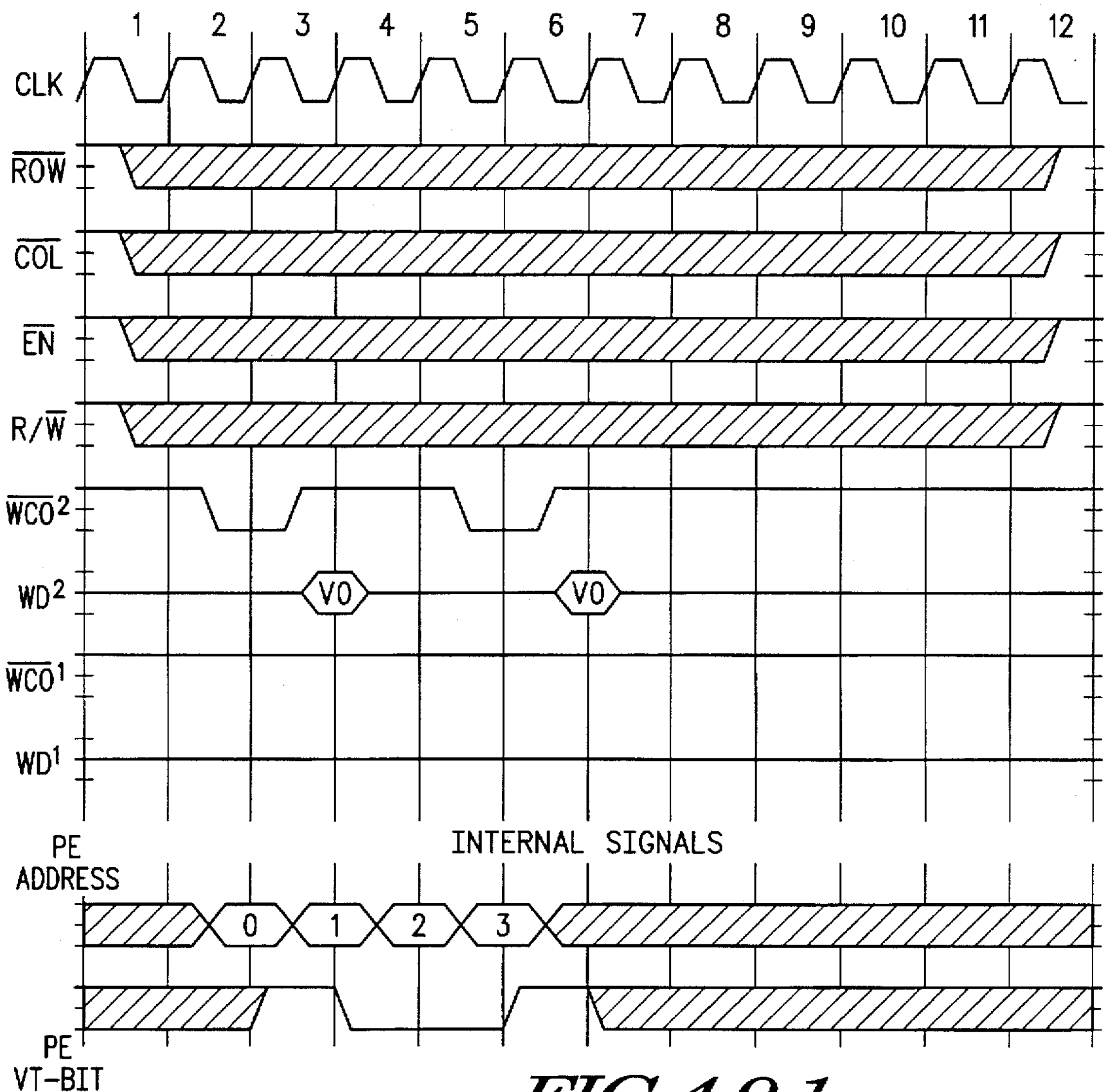
Figures 2, 4, 5, 6, 7, 8, 9:
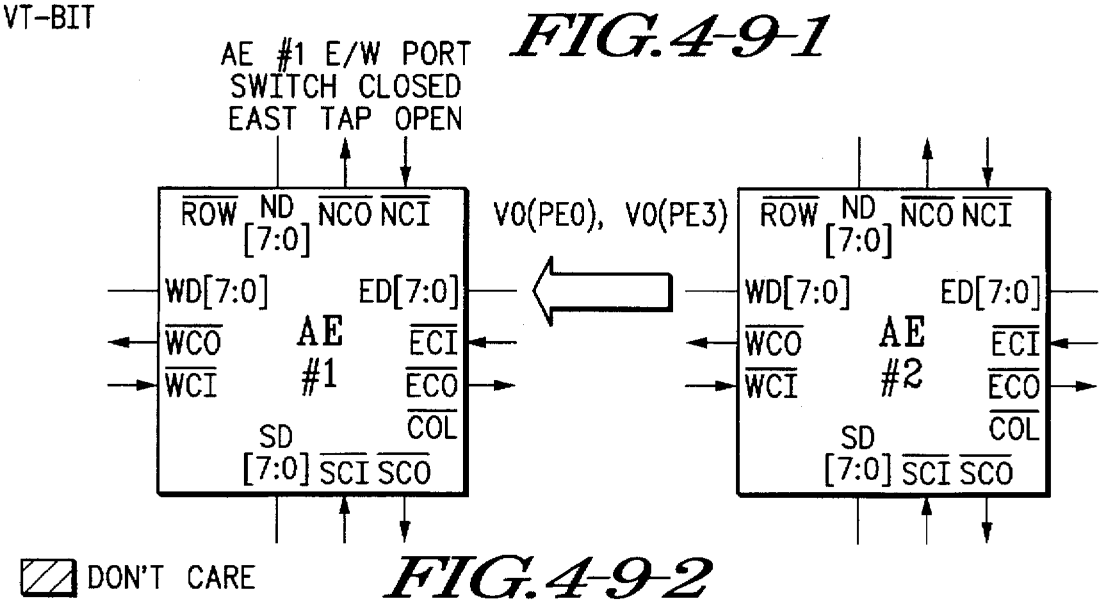
Figures 1, 4, 5, 6, 7, 8, 9, 10:
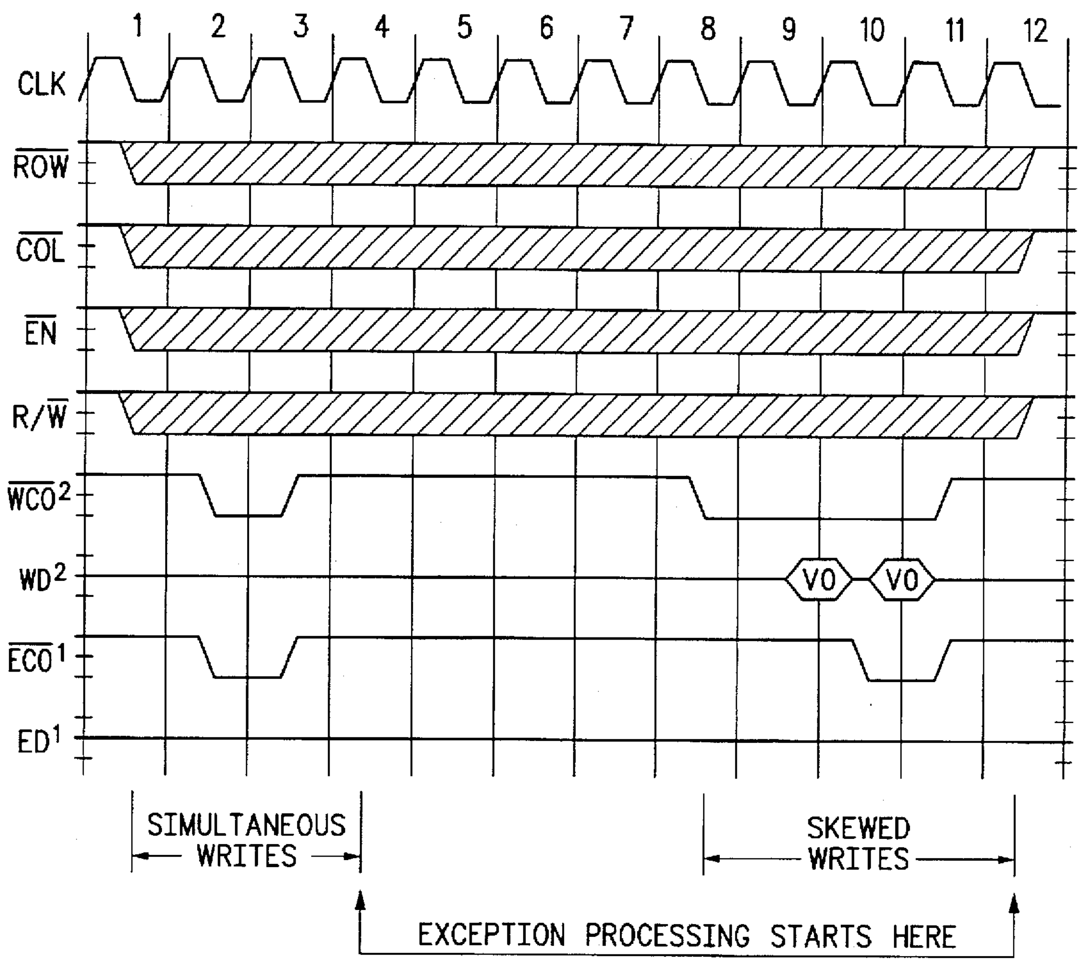
Figures 2, 4, 5, 6, 7, 8, 9, 10:
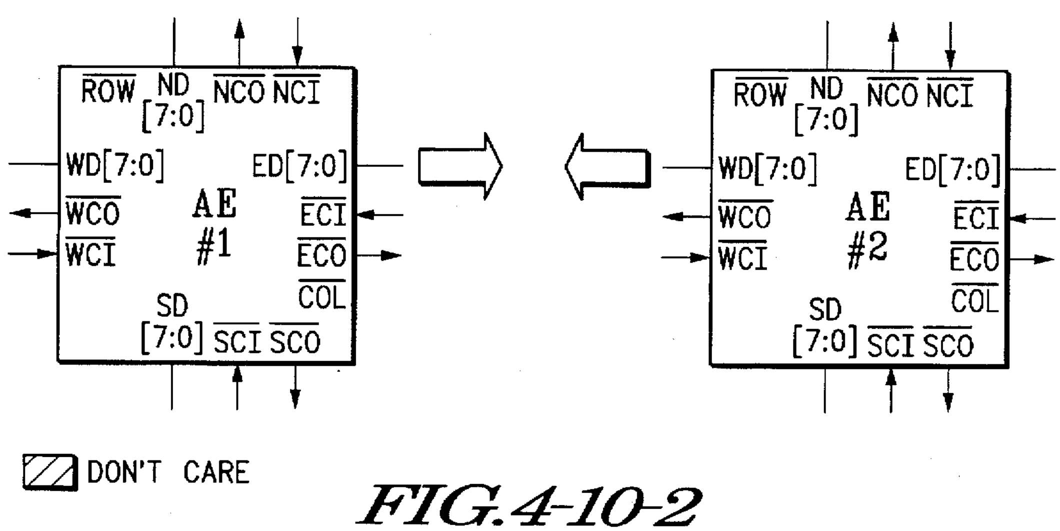
Figures 4, 5, 6, 7, 8, 9, 10, 11:
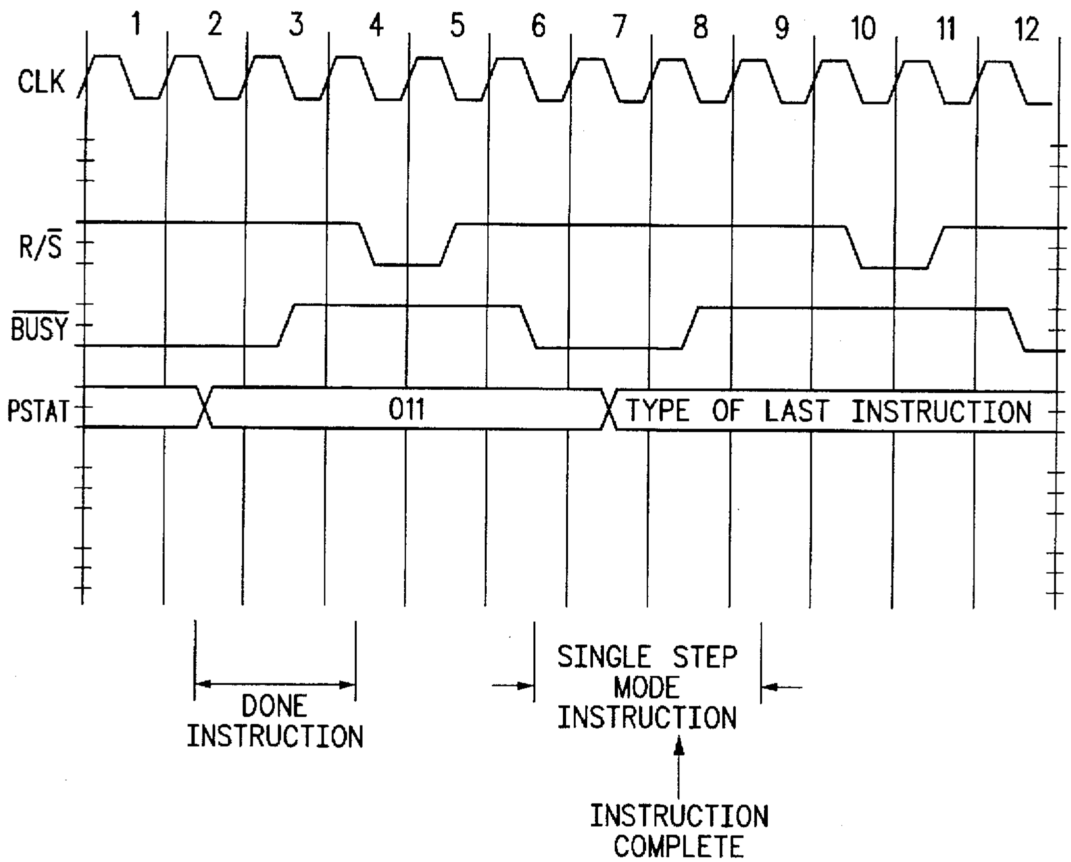
Figures 4, 5, 6, 7, 8, 9, 10, 11, 12:
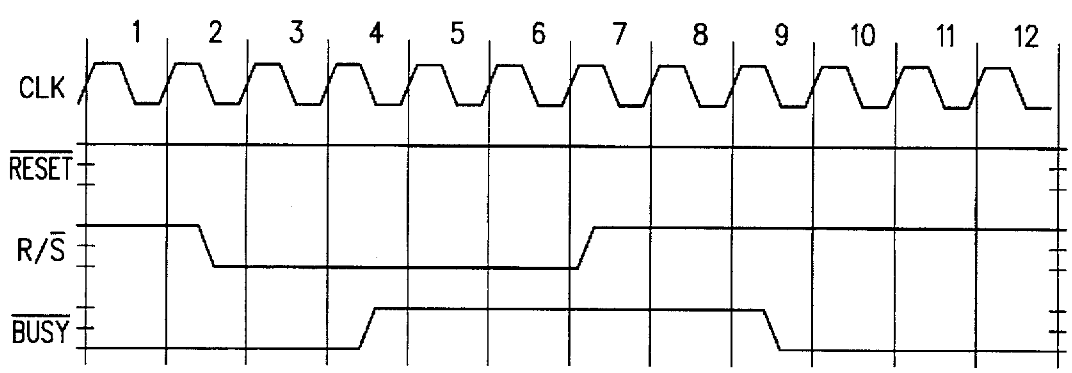
Figures 1, 4, 5, 6, 7, 8, 9, 10, 11, 12, 13:
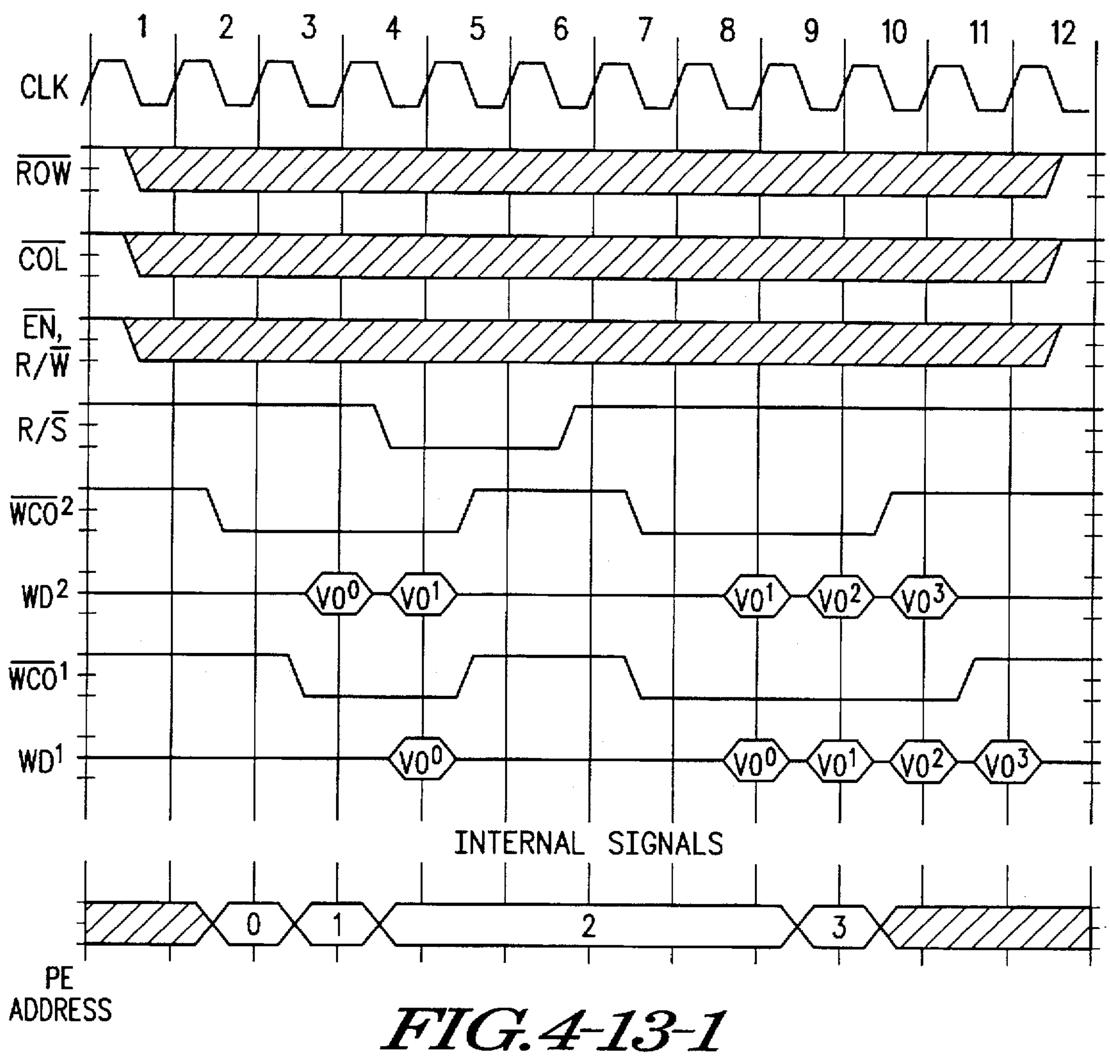
Figures 2, 4, 5, 6, 7, 8, 9, 10, 11, 12, 13:
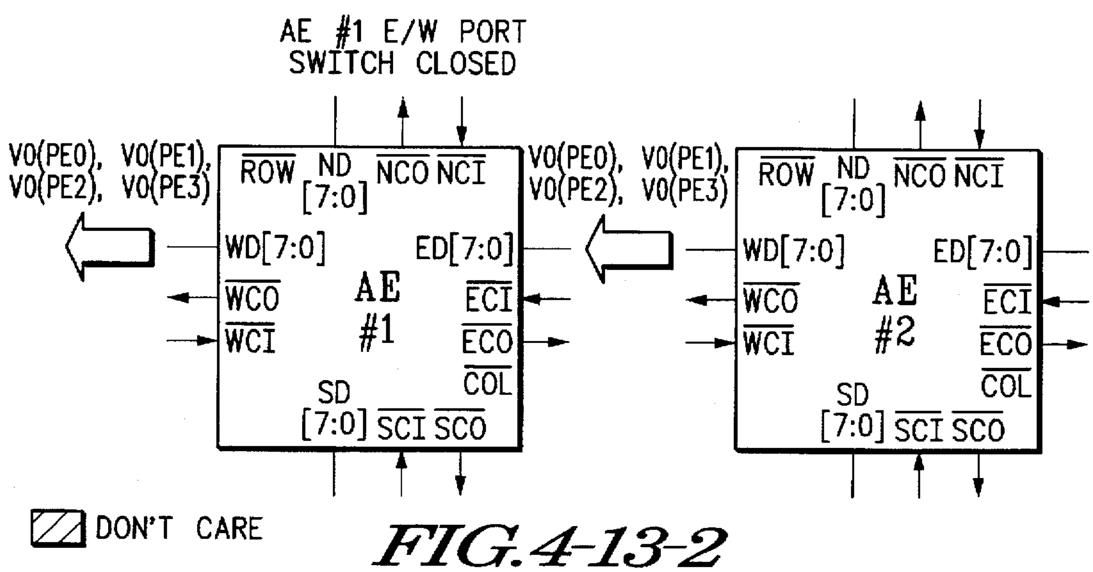
Figures 4, 5, 6, 7, 8, 9, 10, 11, 12, 13, 14:
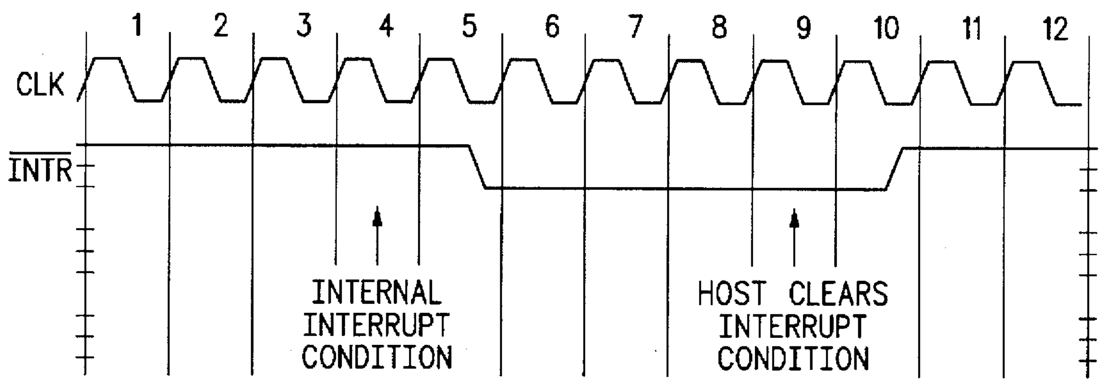
Figures 4, 5, 6, 7, 8, 9, 10, 11, 12, 13, 14, 15:
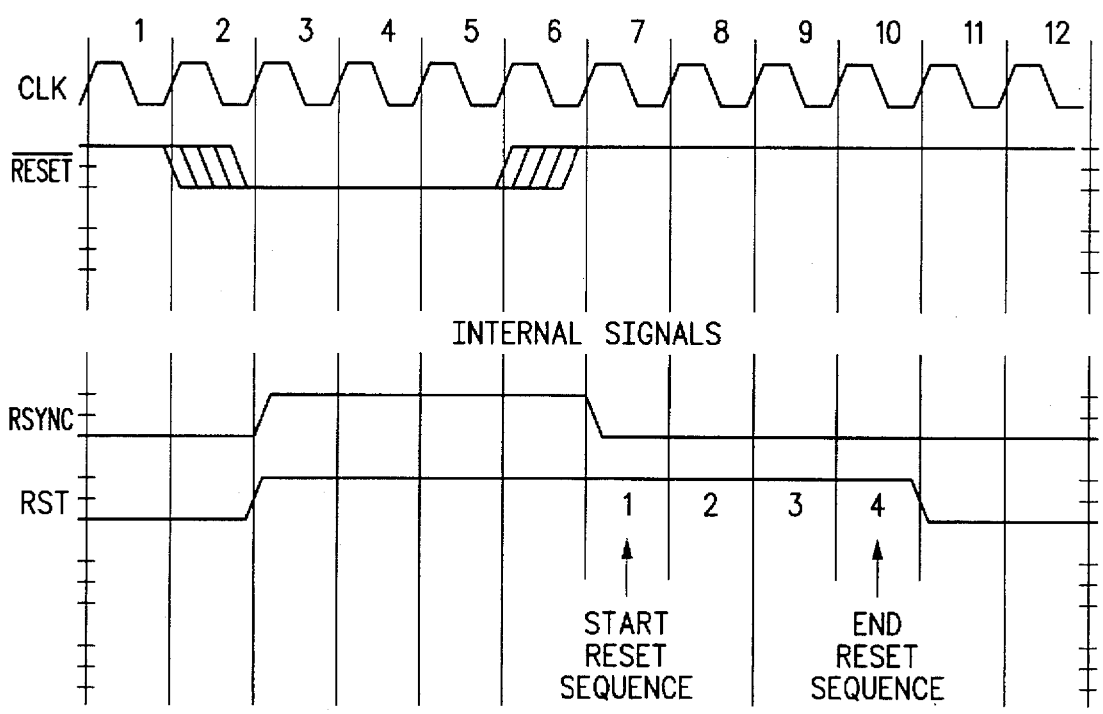
Figures 4, 5, 6, 7, 8, 9, 10, 11, 12, 13, 14, 15, 16:
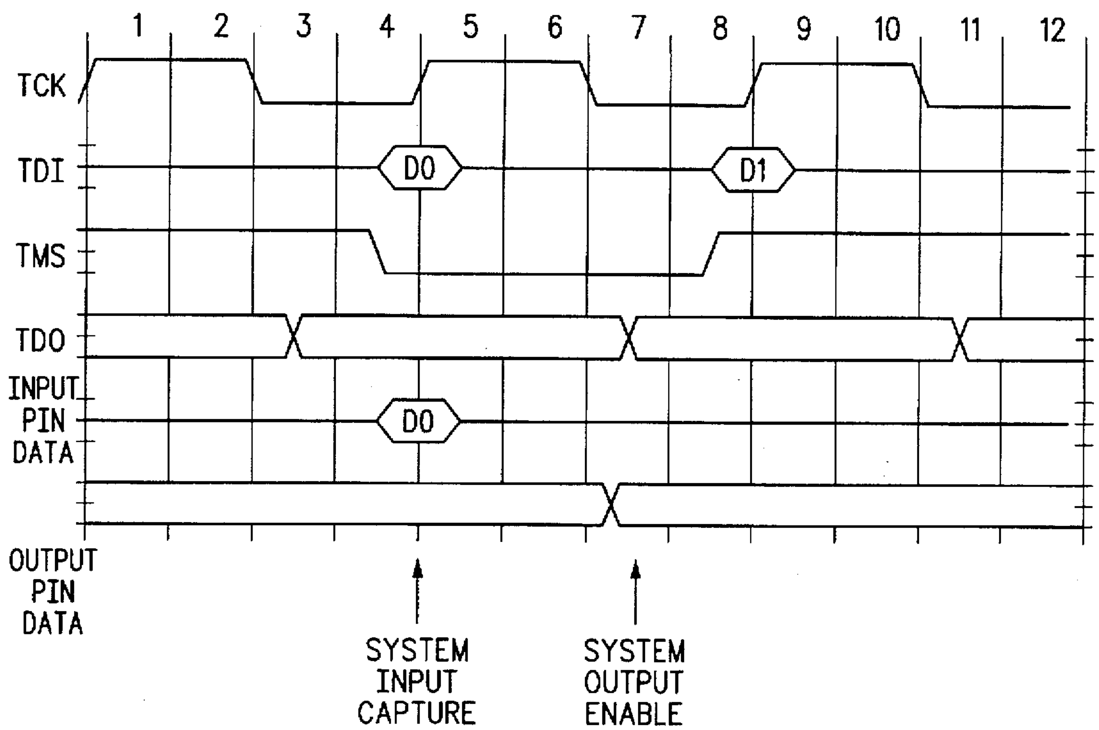
Figures 1, 5:
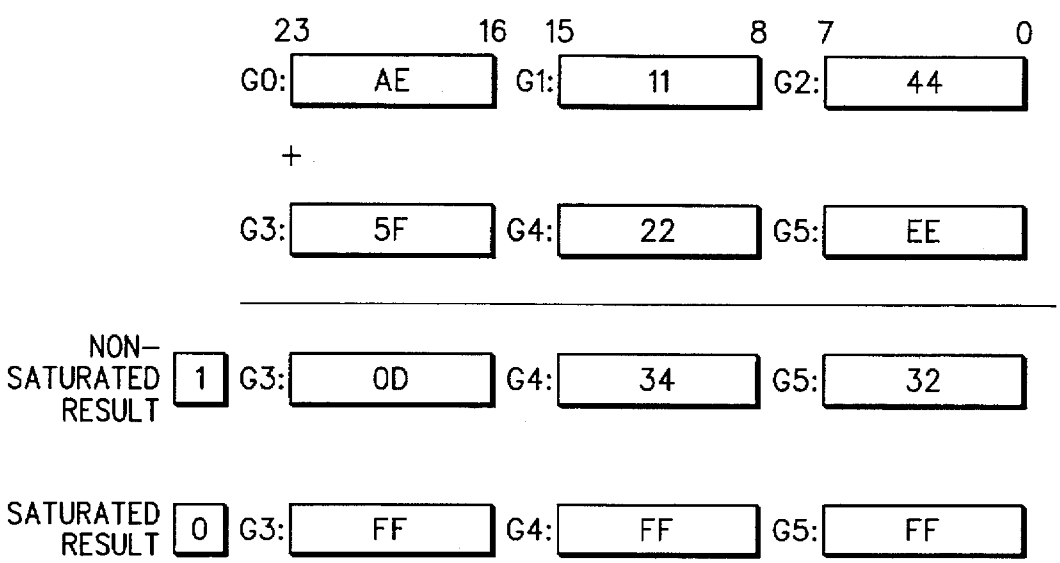
Figures 1, 2, 5:
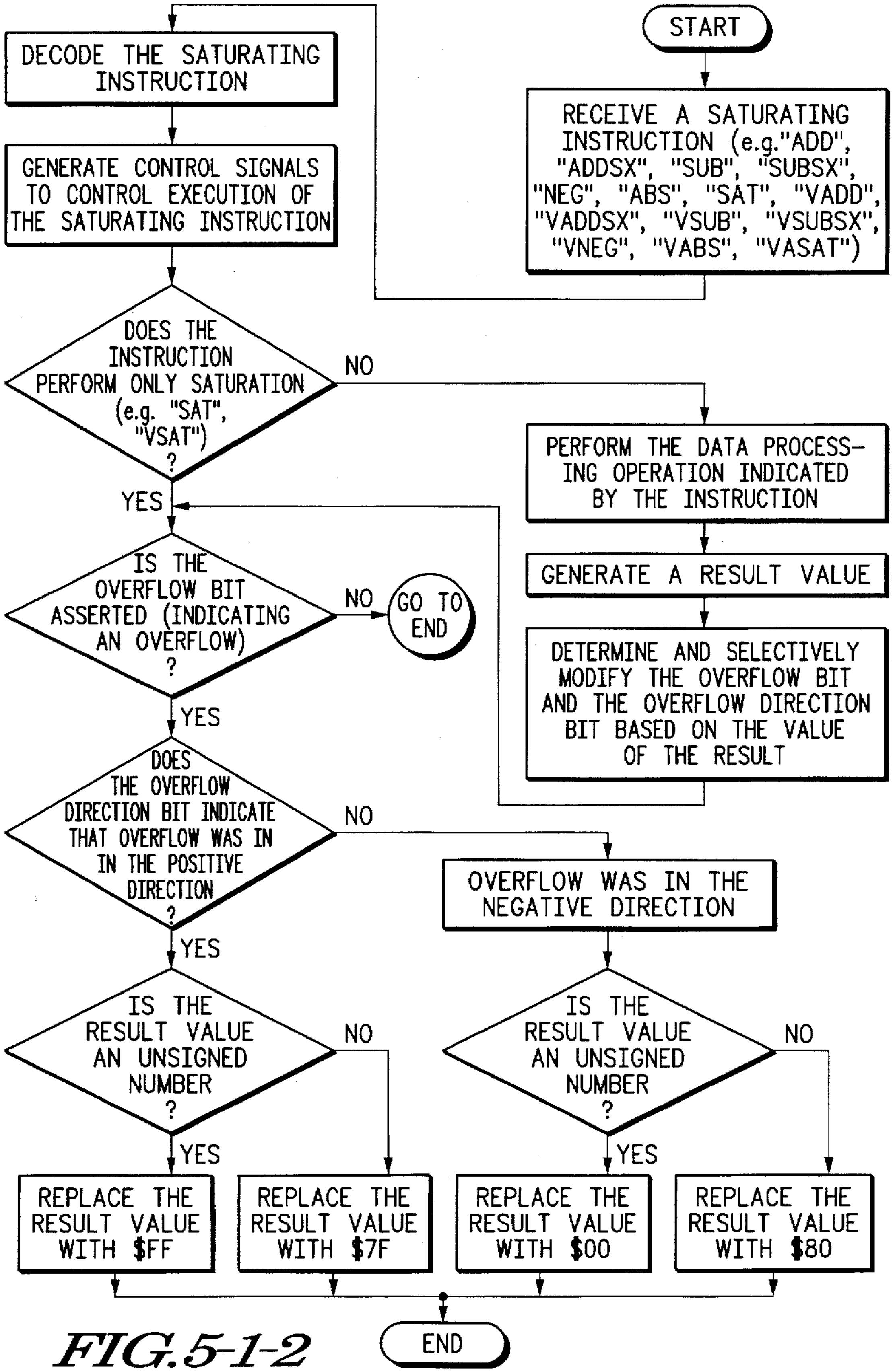
Figures 1, 2, 5:
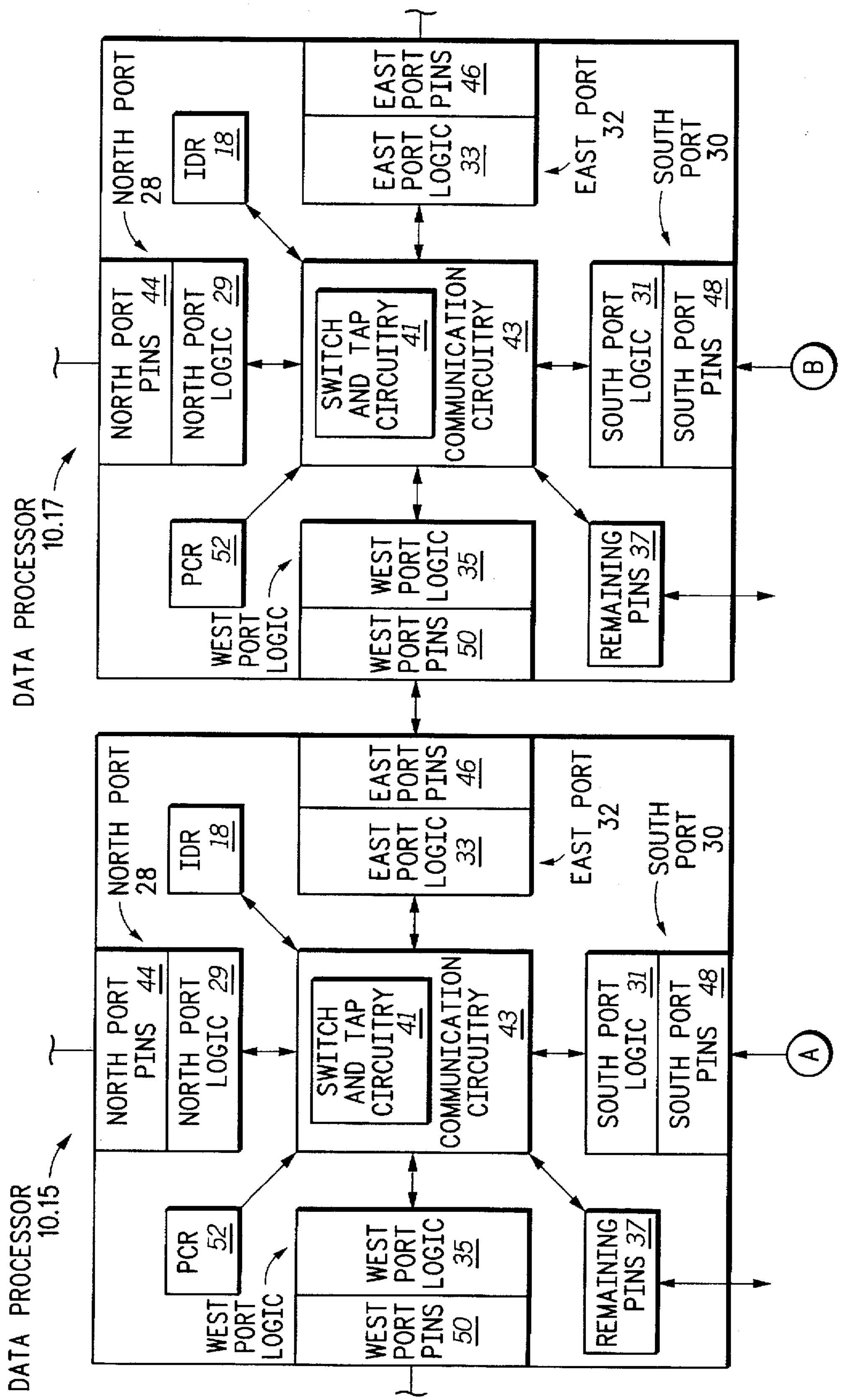
Figures 2, 5:
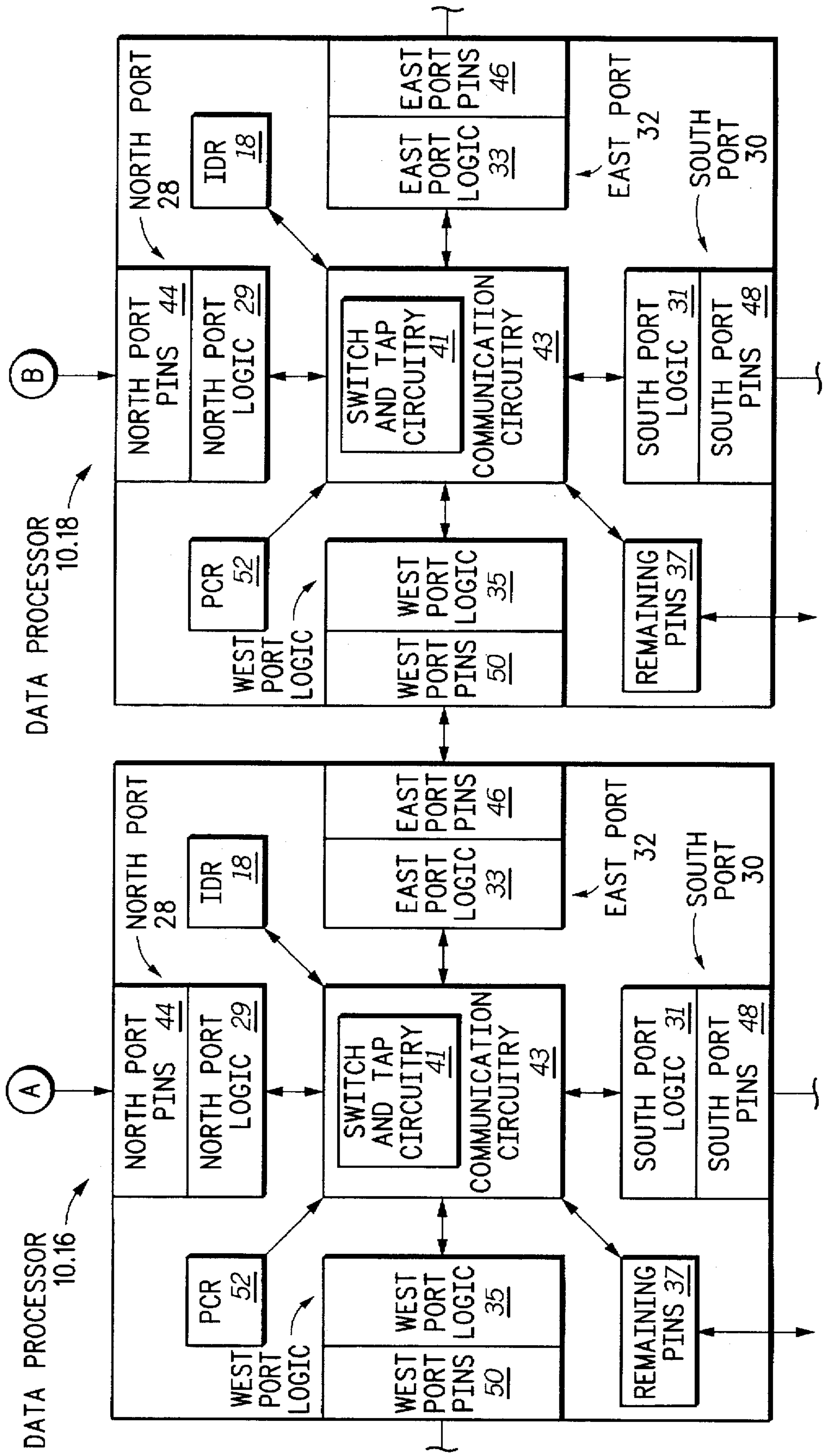
Figures 3, 5:
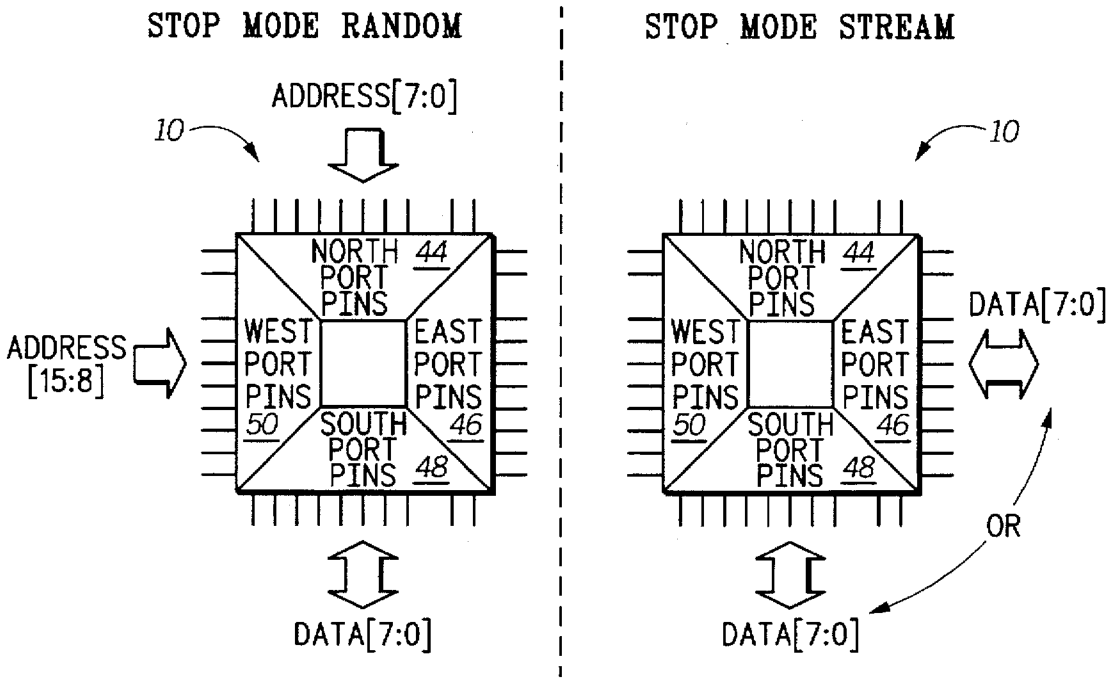
Figures 4, 5:
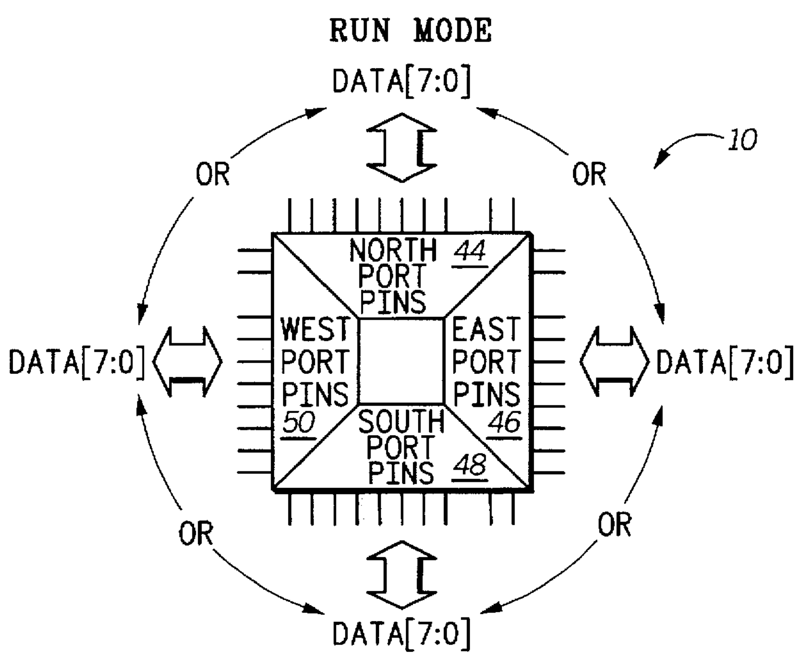
Figure 5:
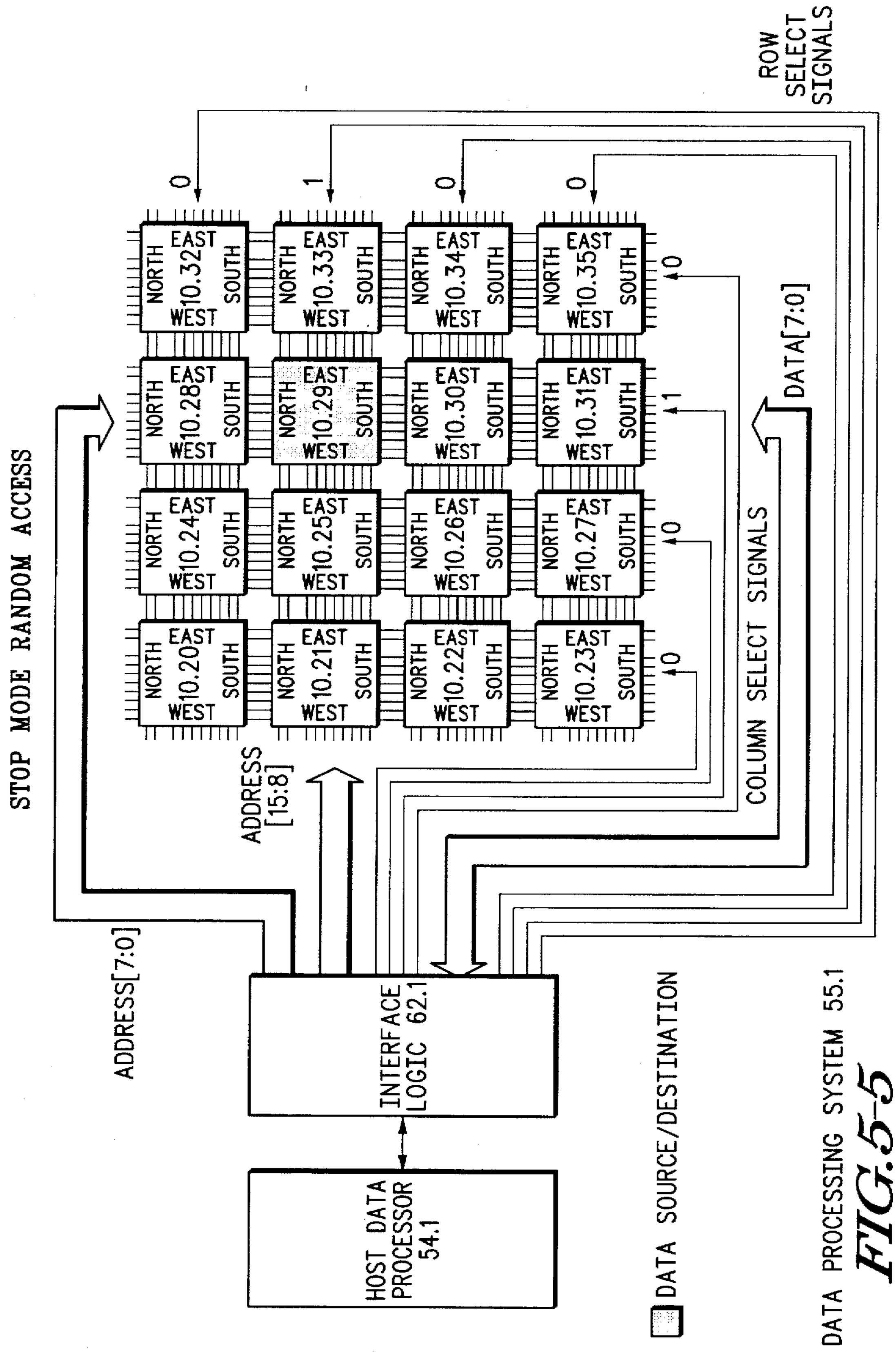
Figures 5, 6:
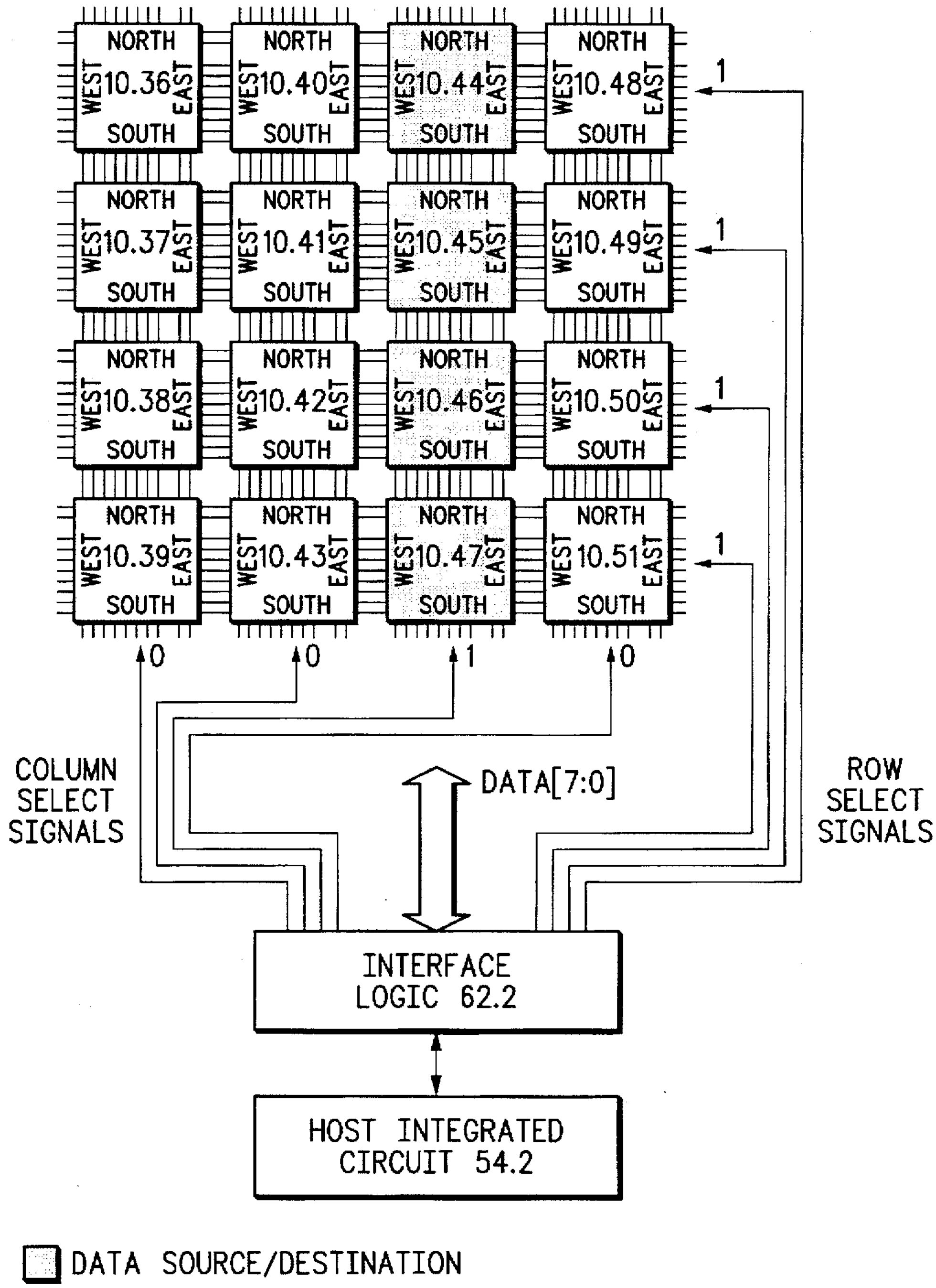
Figures 5, 6, 7:
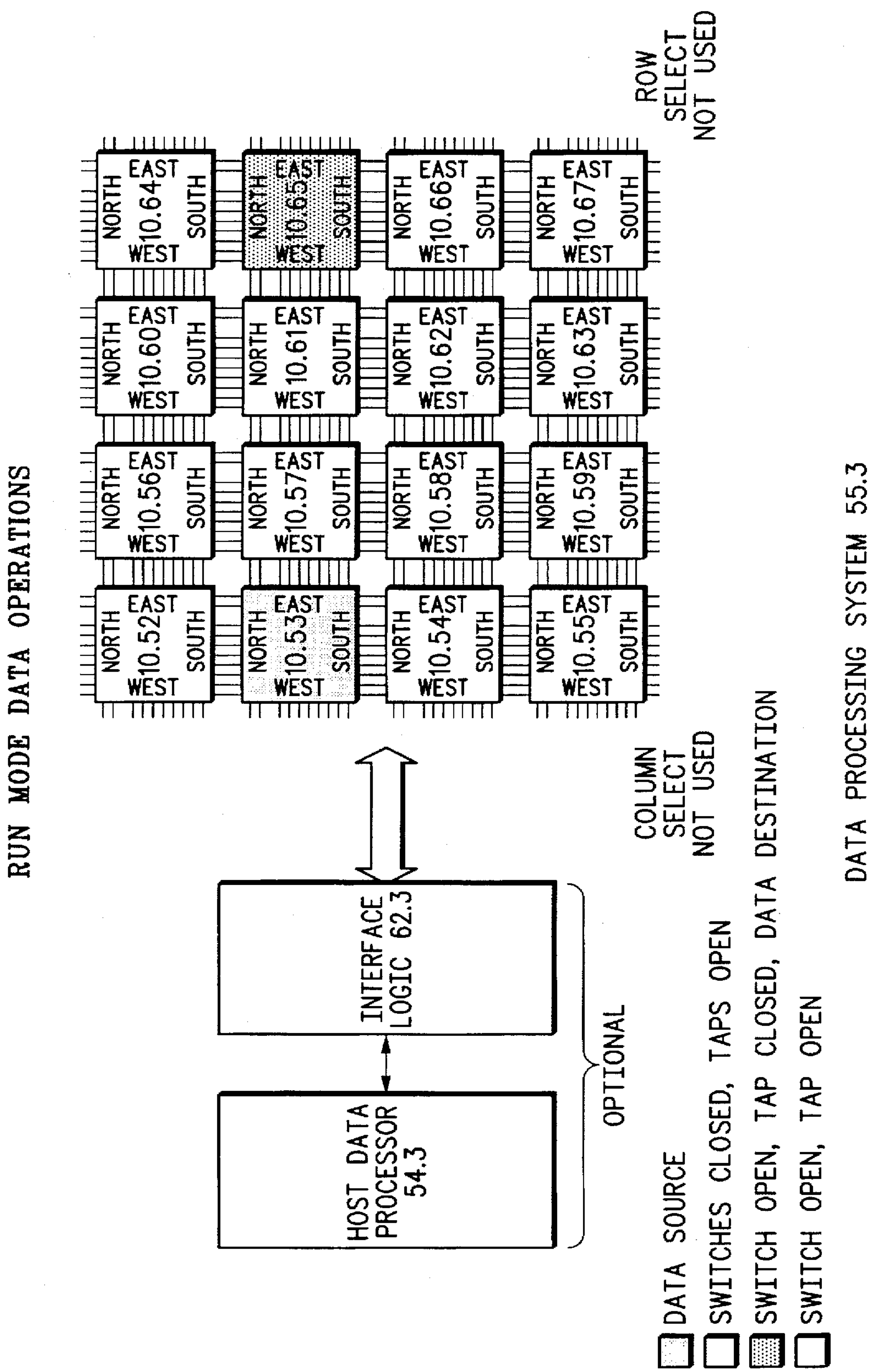
Figures 5, 6, 7, 8:
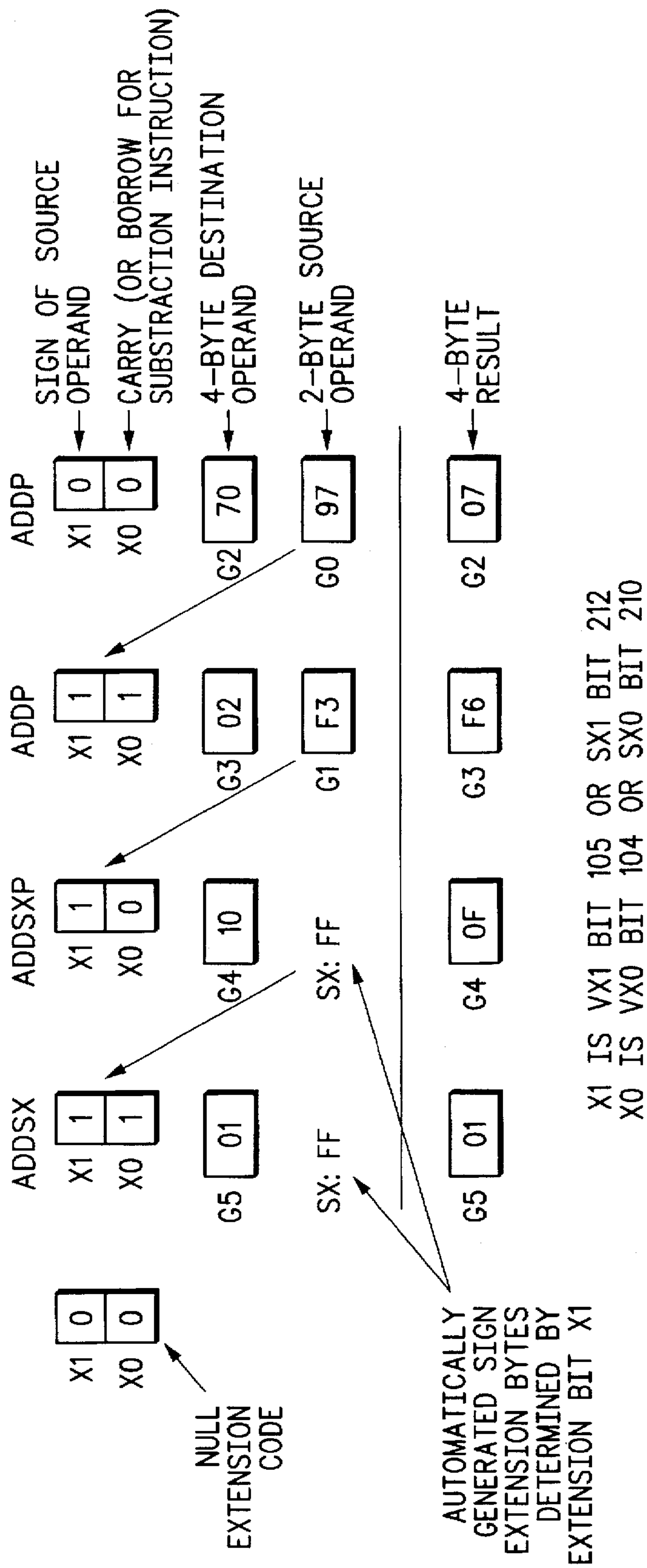
Figures 5, 6, 7, 8, 9:
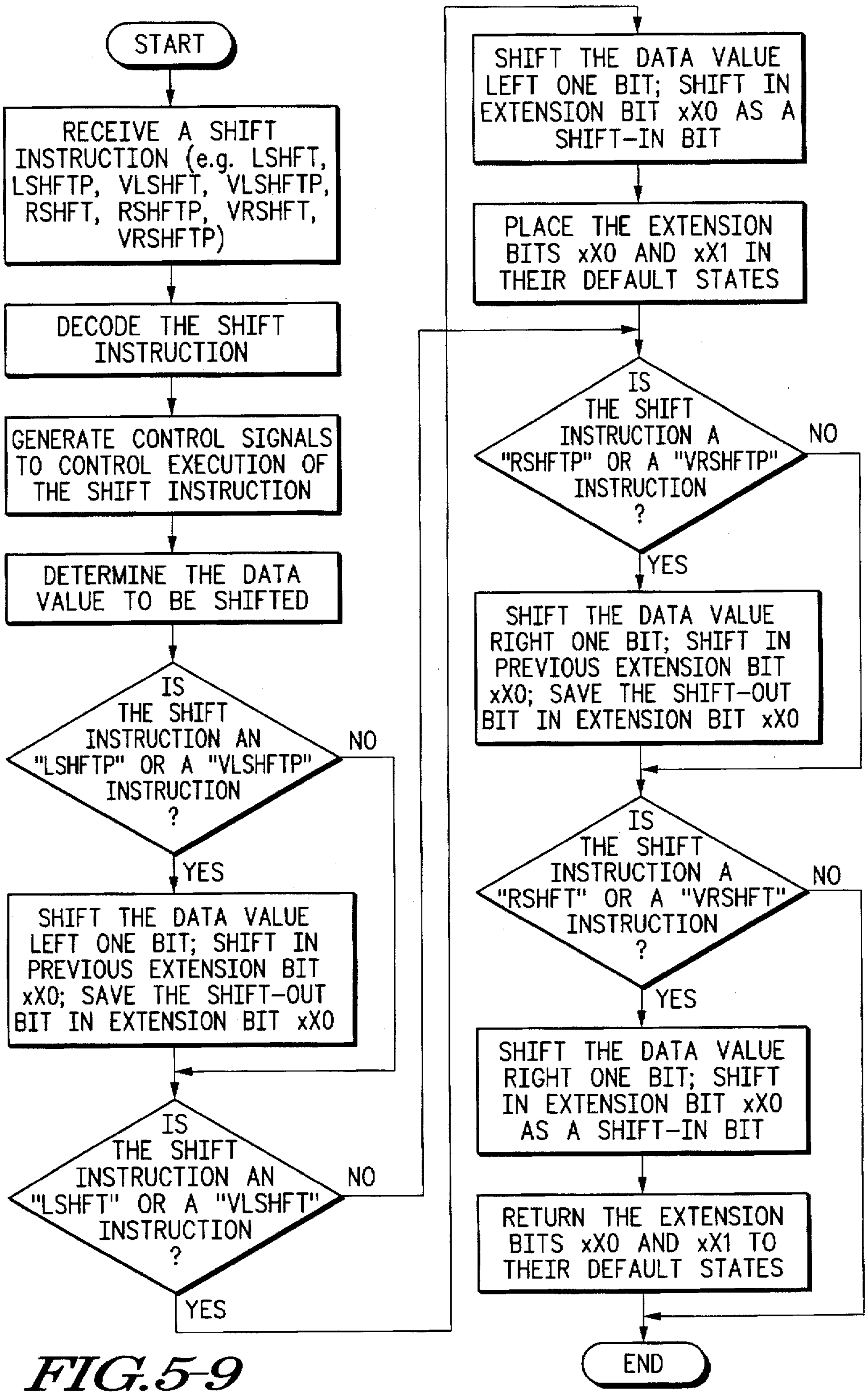
Figures 5, 6, 7, 8, 9, 10:
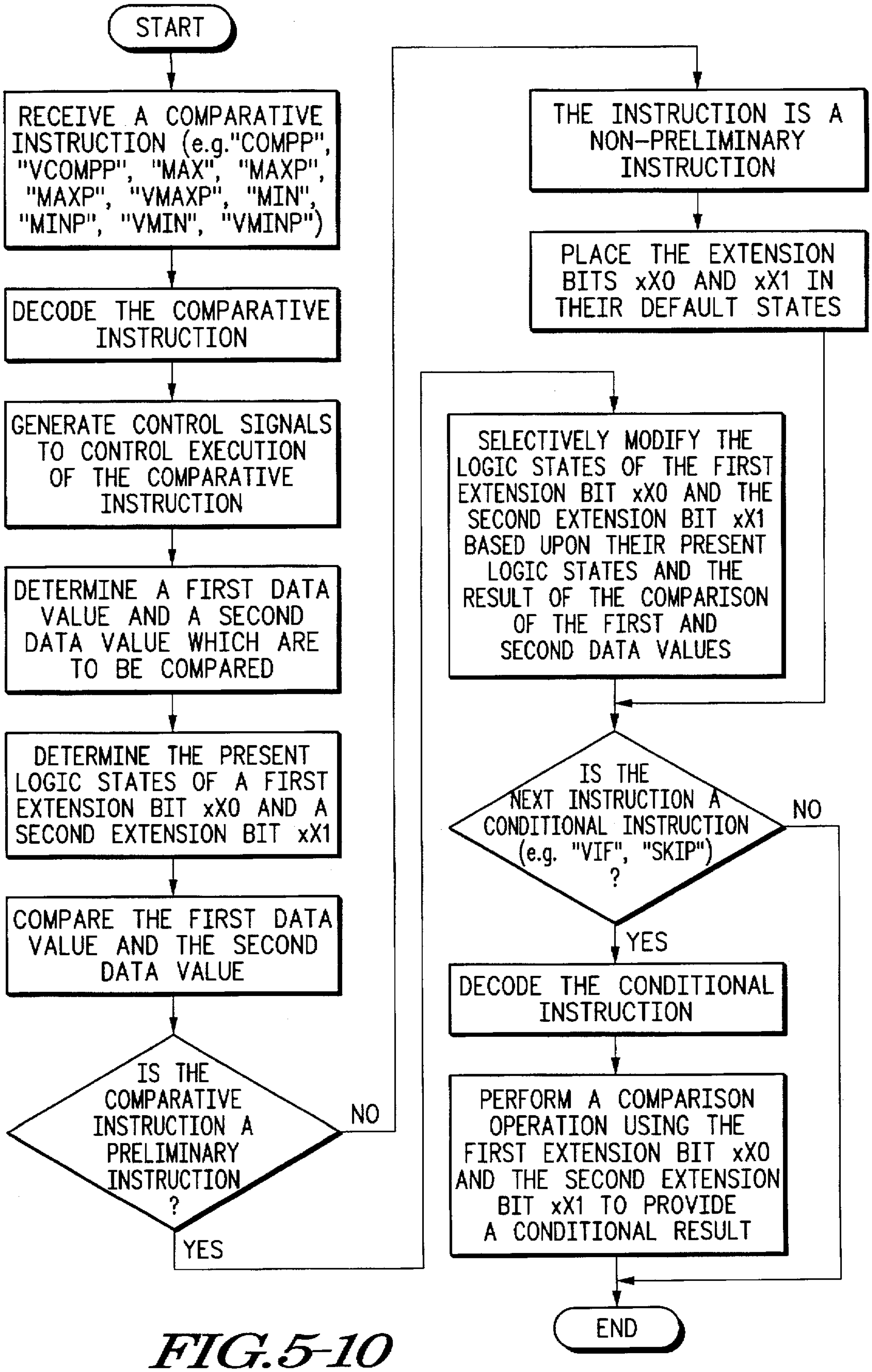
Figures 5, 6, 7, 8, 9, 10, 11:
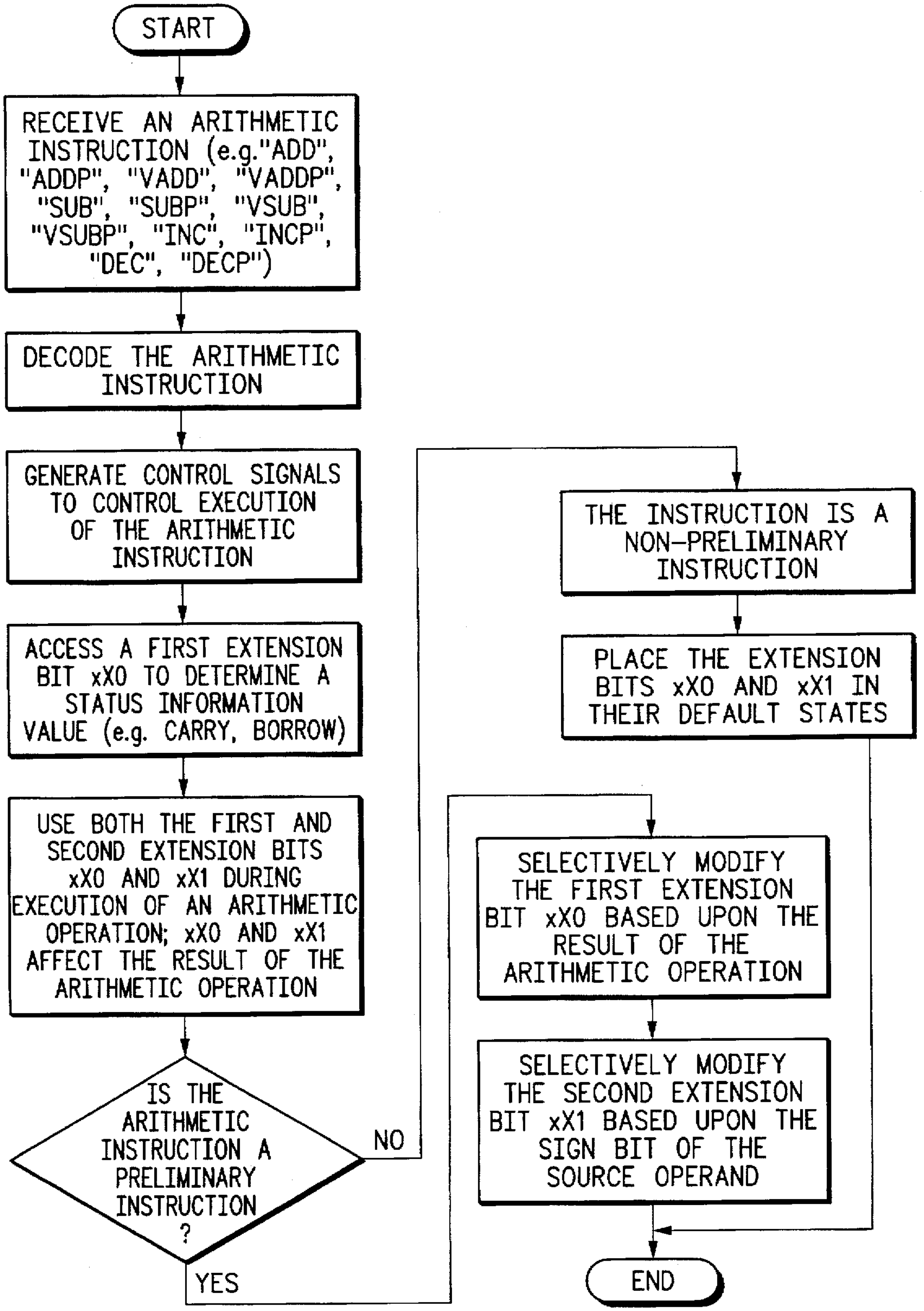
Figures 5, 6, 7, 8, 9, 10, 11, 12:
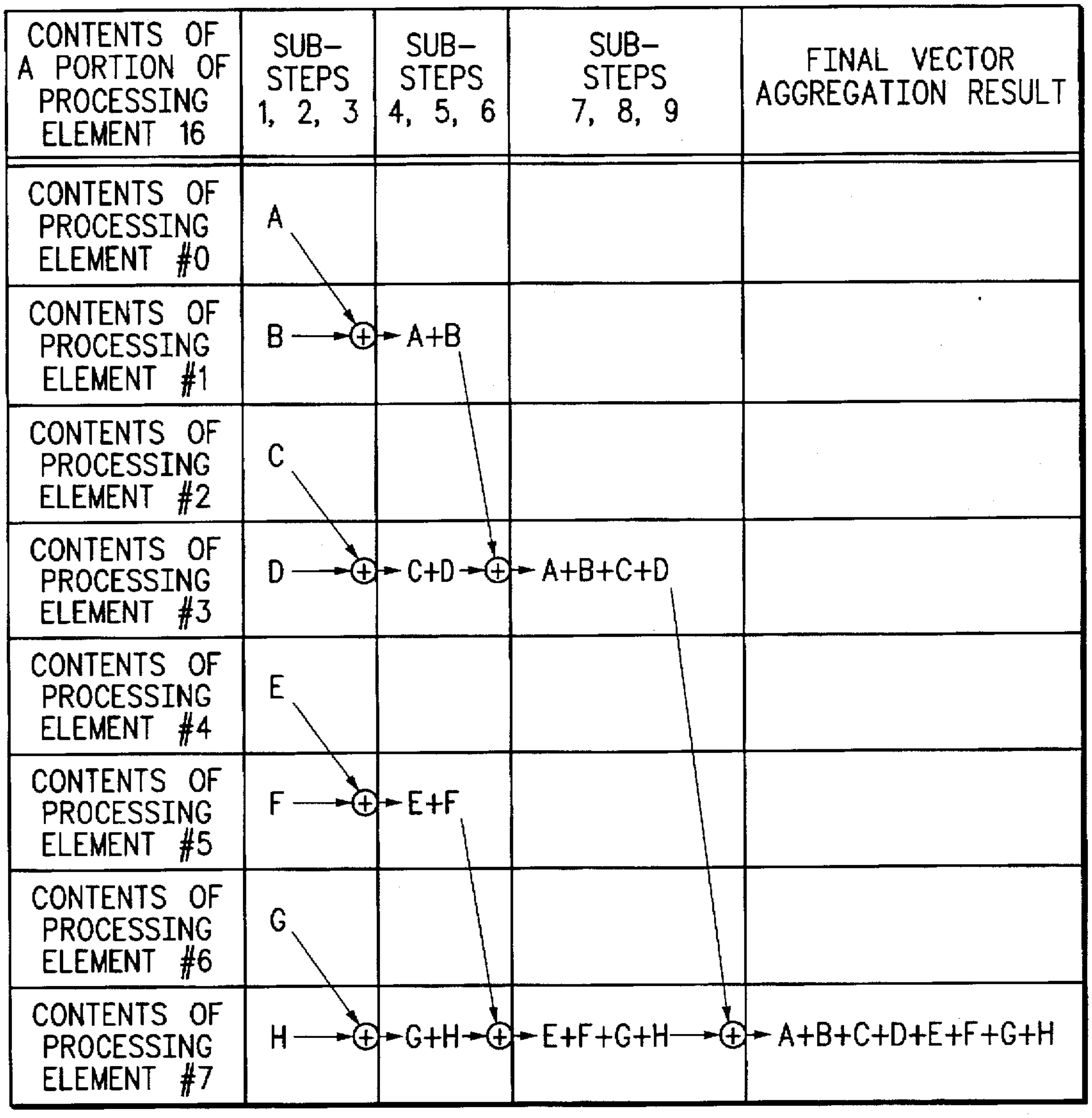
Figures 5, 6, 7, 8, 9, 10, 11, 12, 13, 14:
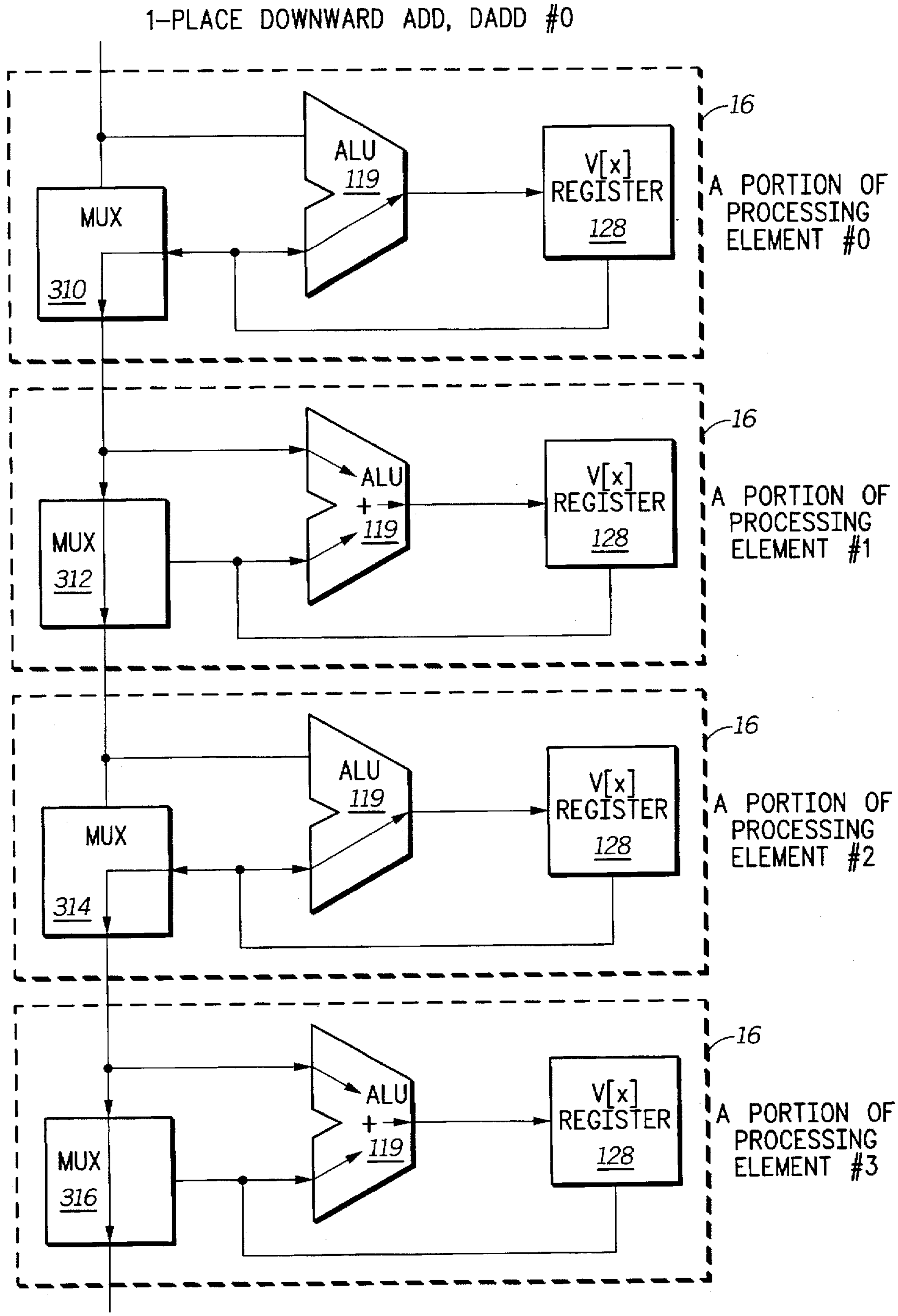
Figures 5, 6, 7, 8, 9, 10, 11, 12, 13, 14, 15:
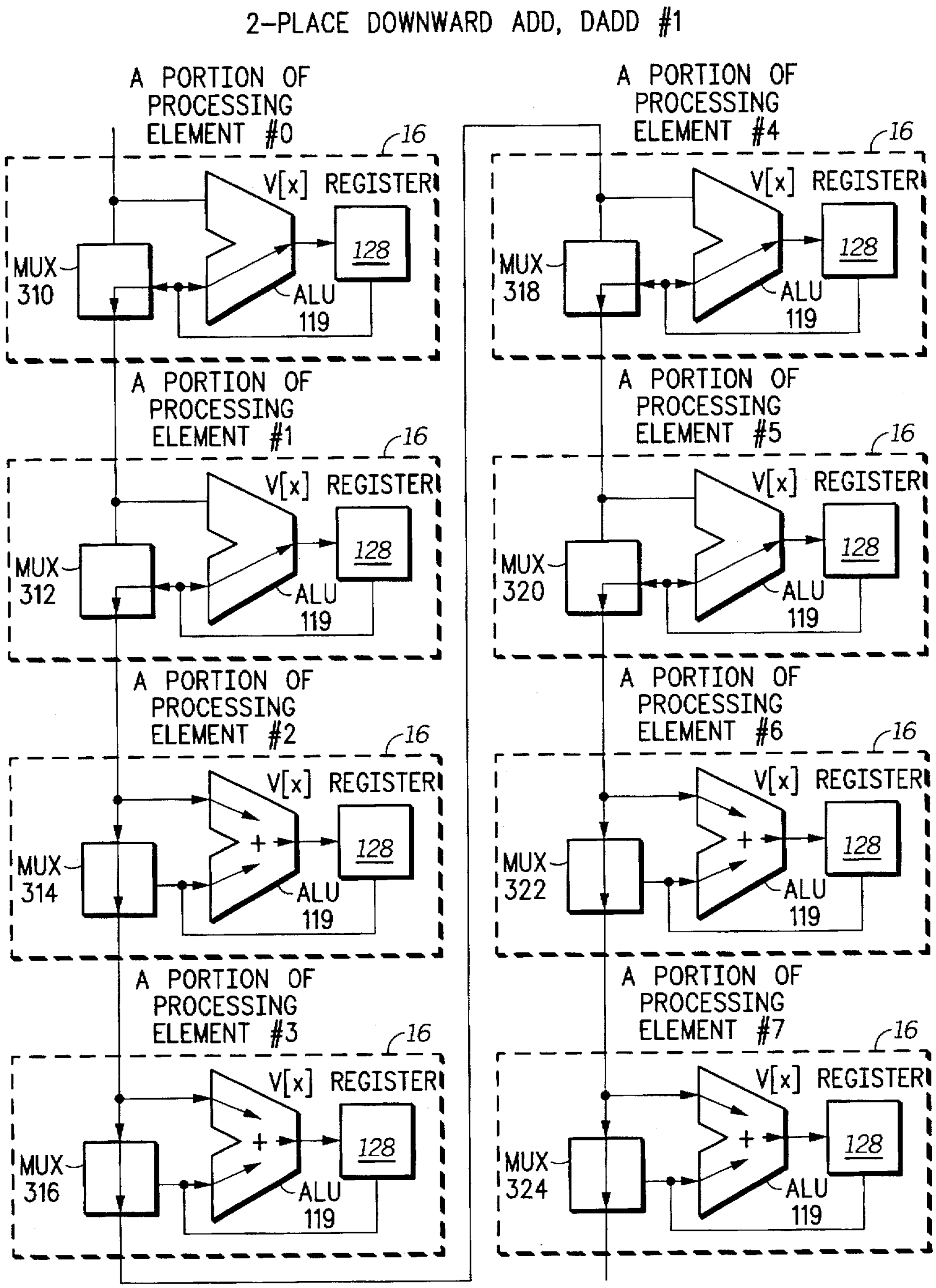
Figures 5, 6, 7, 8, 9, 10, 11, 12, 13, 14, 15, 16:
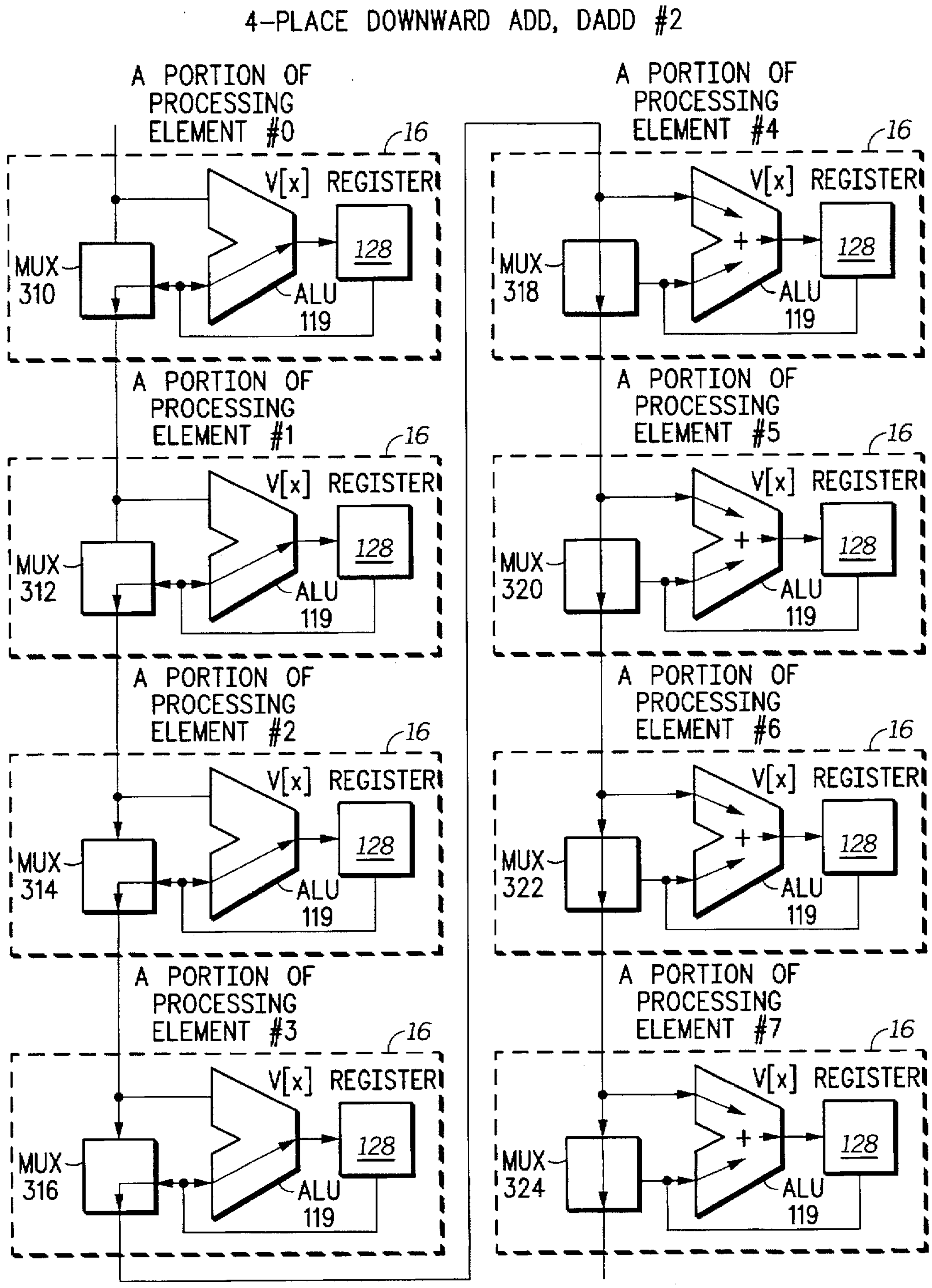
Figures 5, 6, 7, 8, 9, 10, 11, 12, 13, 14, 15, 16, 17:
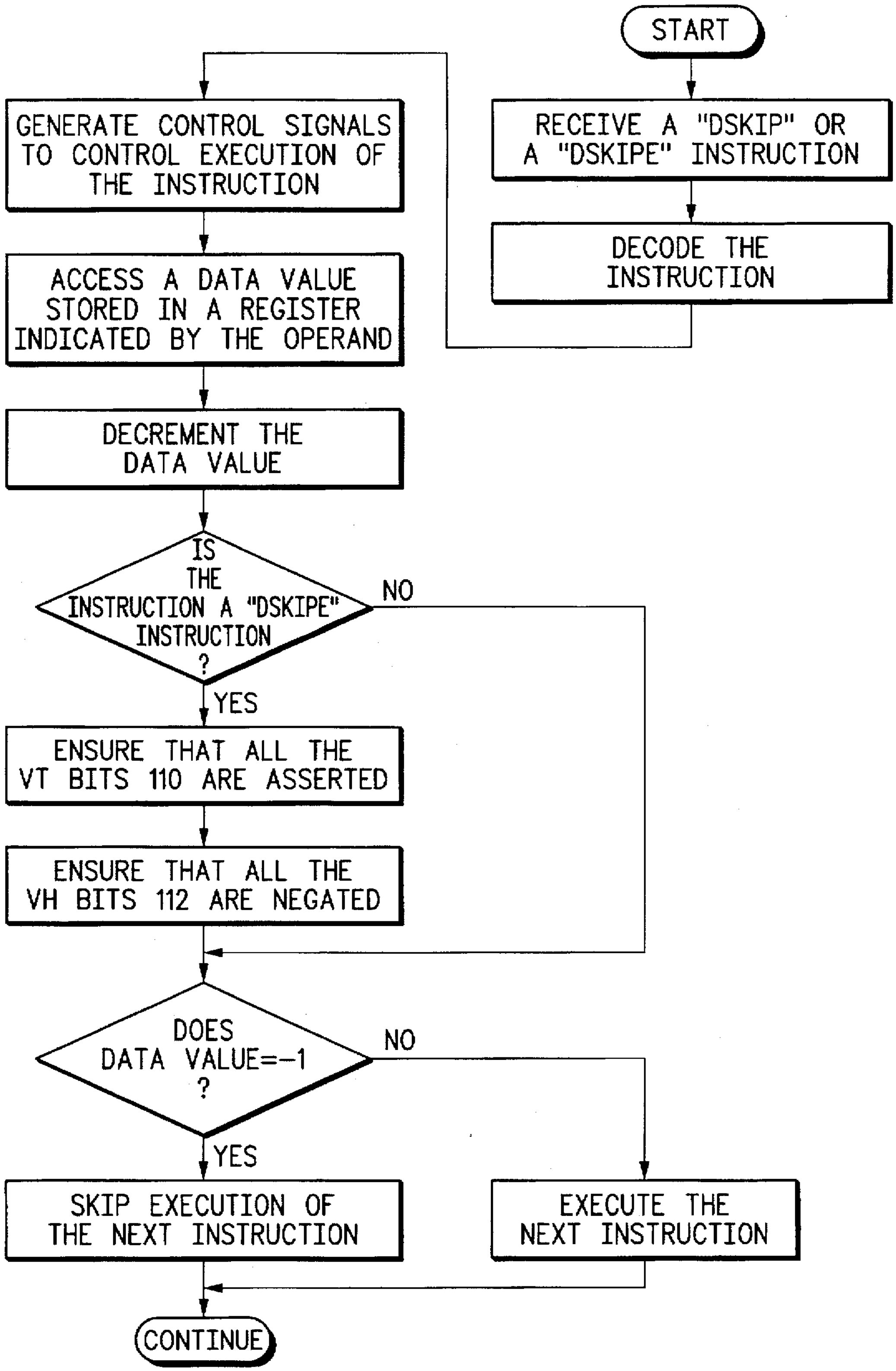
Figures 1, 5, 6, 7, 8, 9, 10, 11, 12, 13, 14, 15, 16, 17, 18:
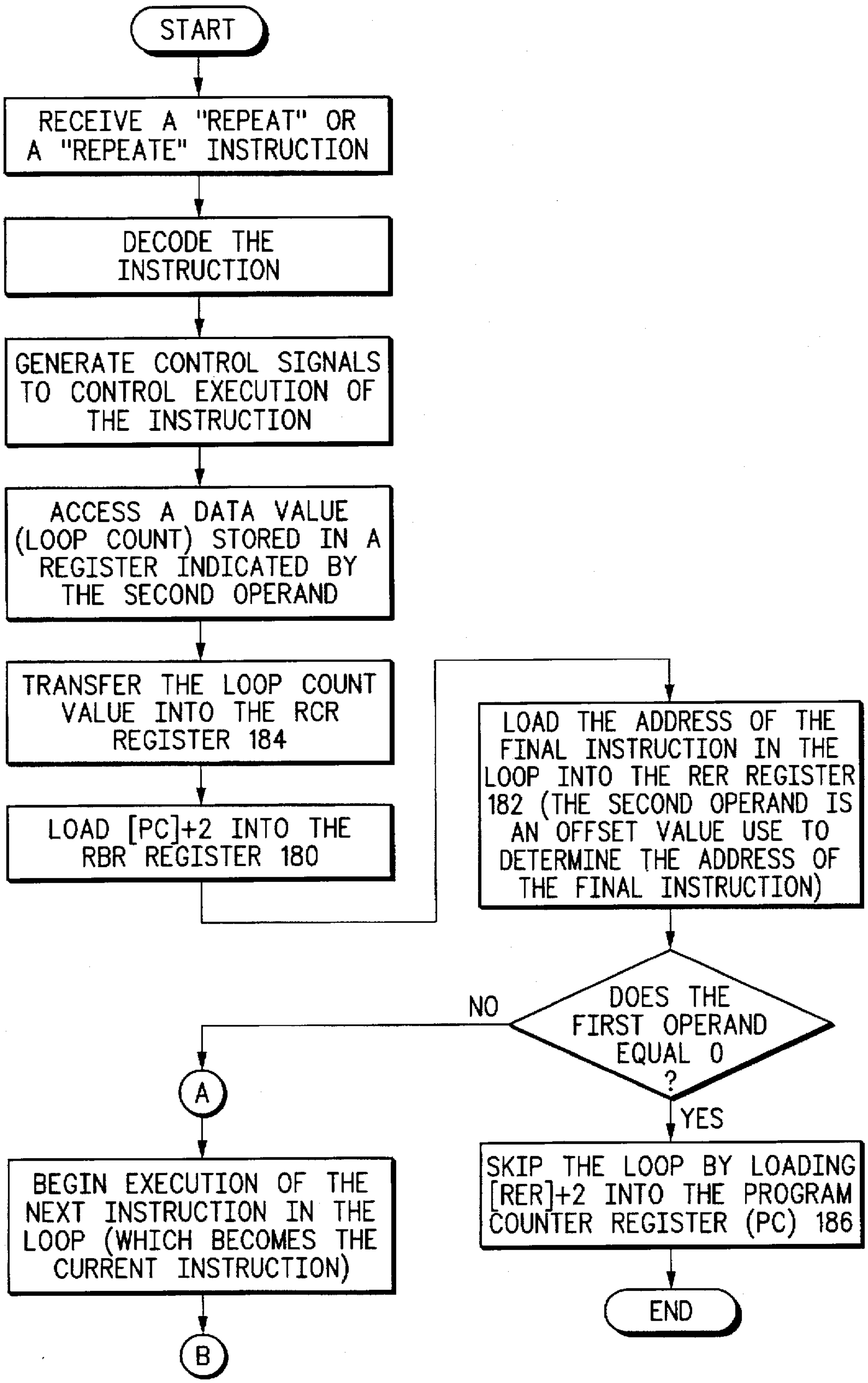
Figures 2, 5, 6, 7, 8, 9, 10, 11, 12, 13, 14, 15, 16, 17, 18:
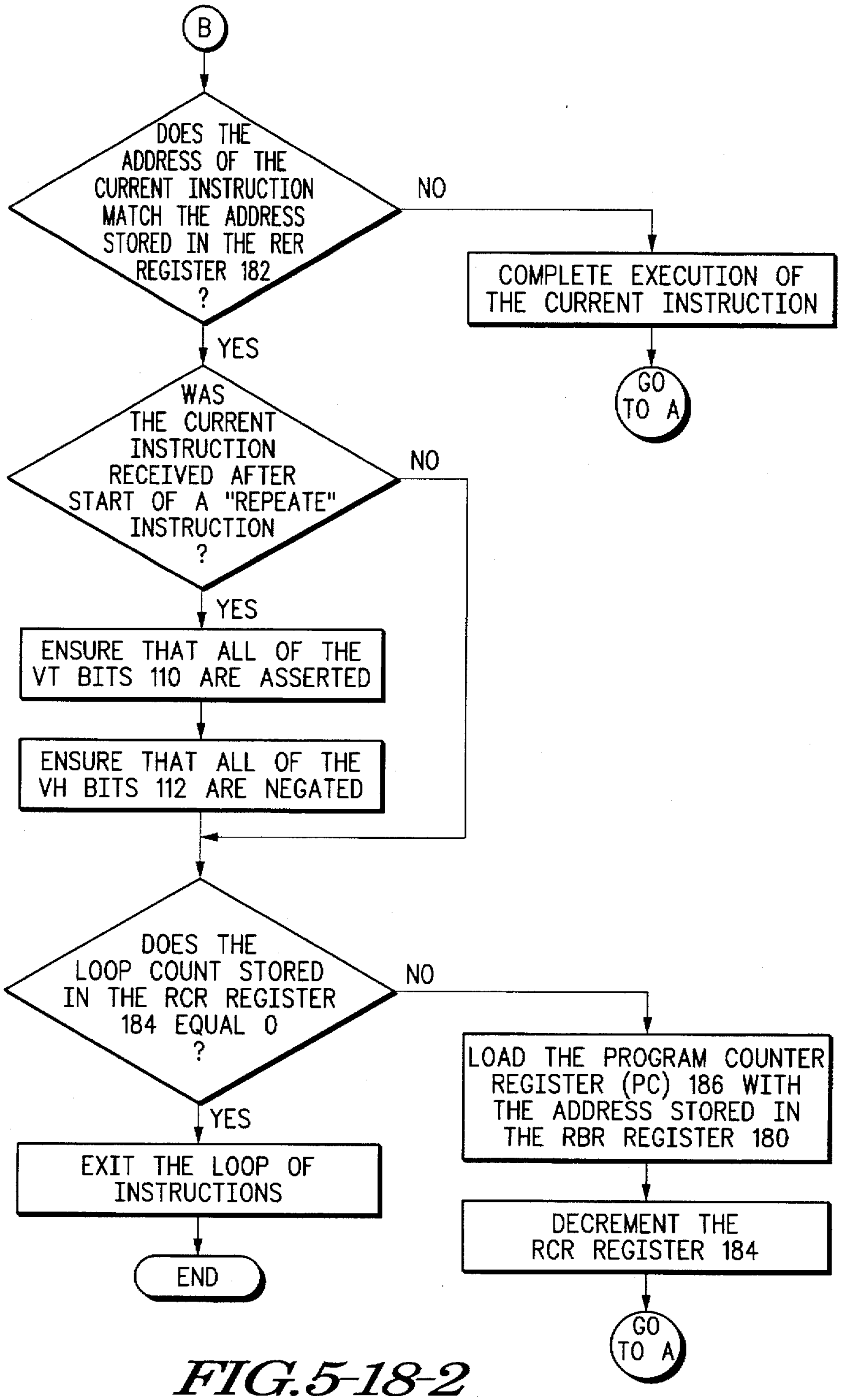
Figures 5, 6, 7, 8, 9, 10, 11, 12, 13, 14, 15, 16, 17, 18, 19:
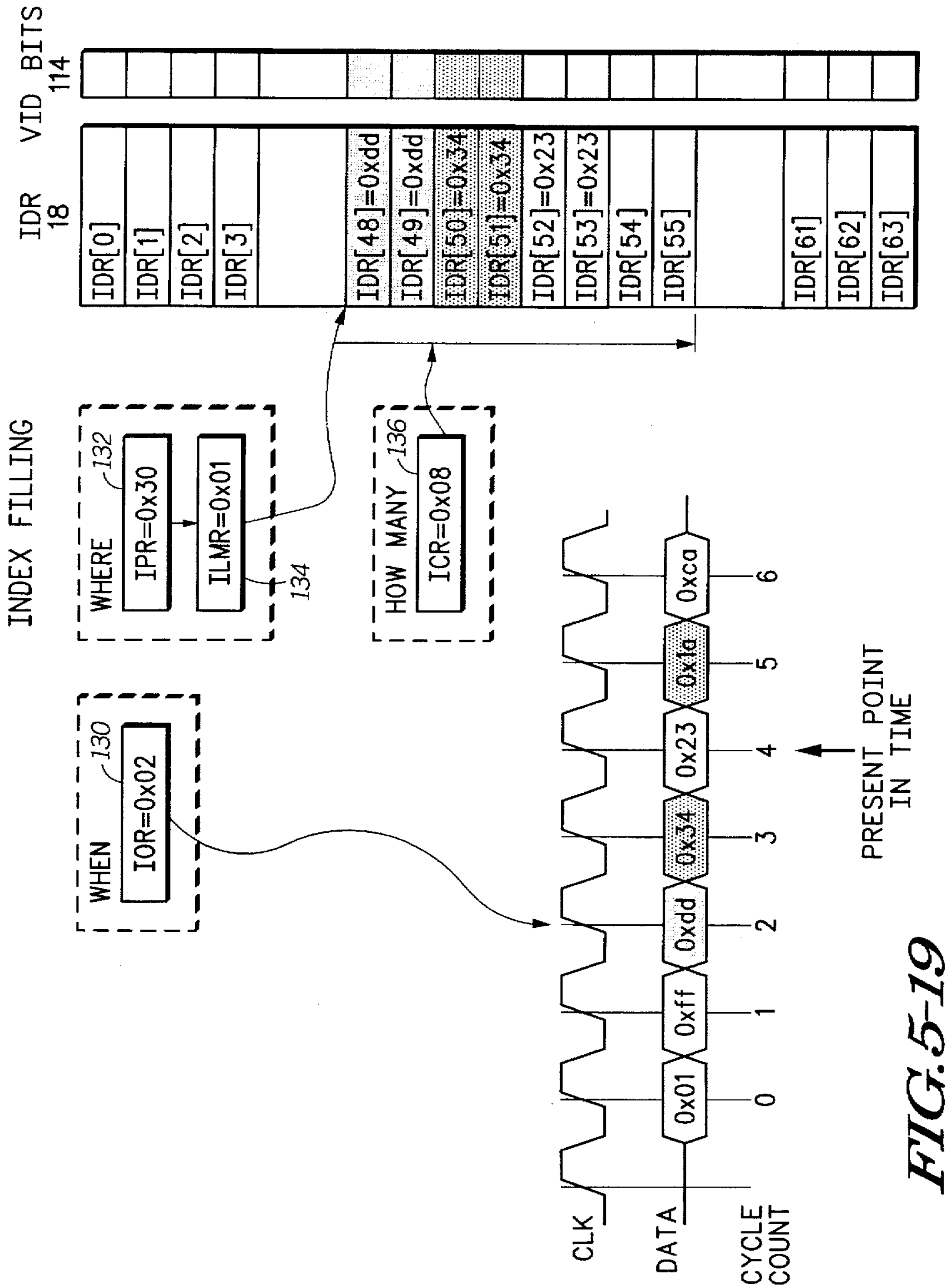
Figures 5, 6, 7, 8, 9, 10, 11, 12, 13, 14, 15, 16, 17, 18, 19, 20:
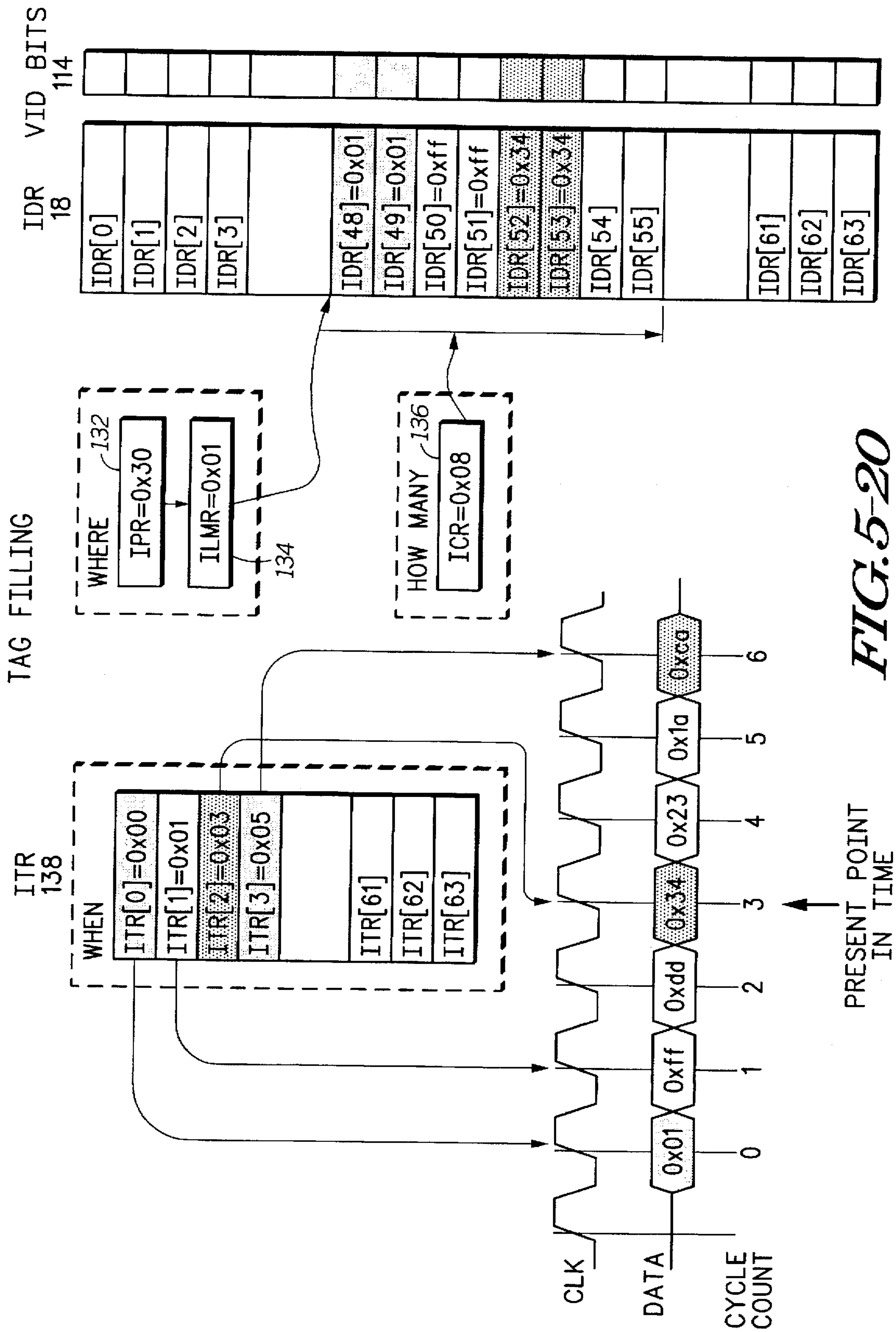
Figures 5, 6, 7, 8, 9, 10, 11, 12, 13, 14, 15, 16, 17, 18, 19, 20, 21:
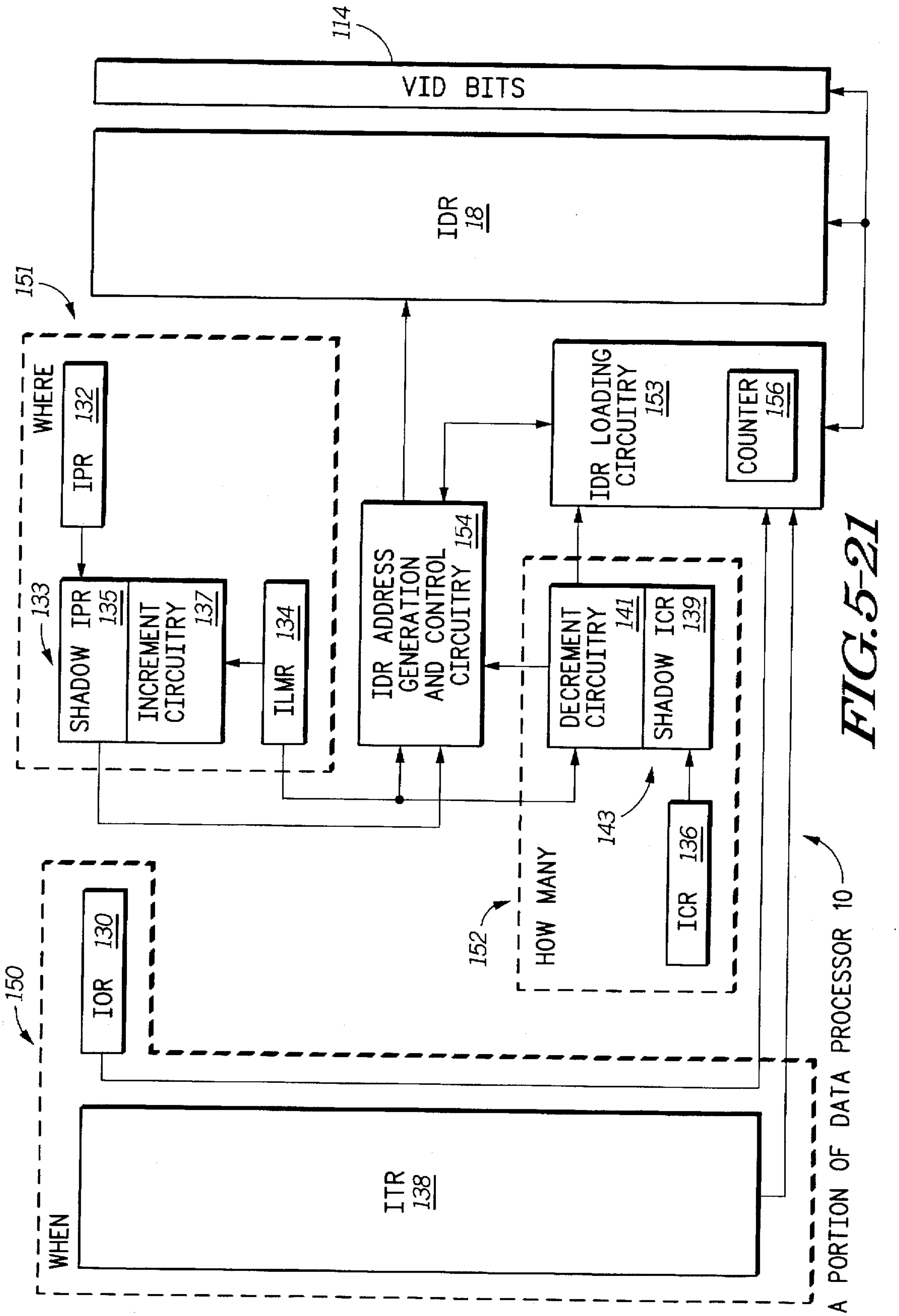
Figures 2, 5, 6, 7, 8, 9, 10, 11, 12, 13, 14, 15, 16, 17, 18, 19, 20, 21, 22:
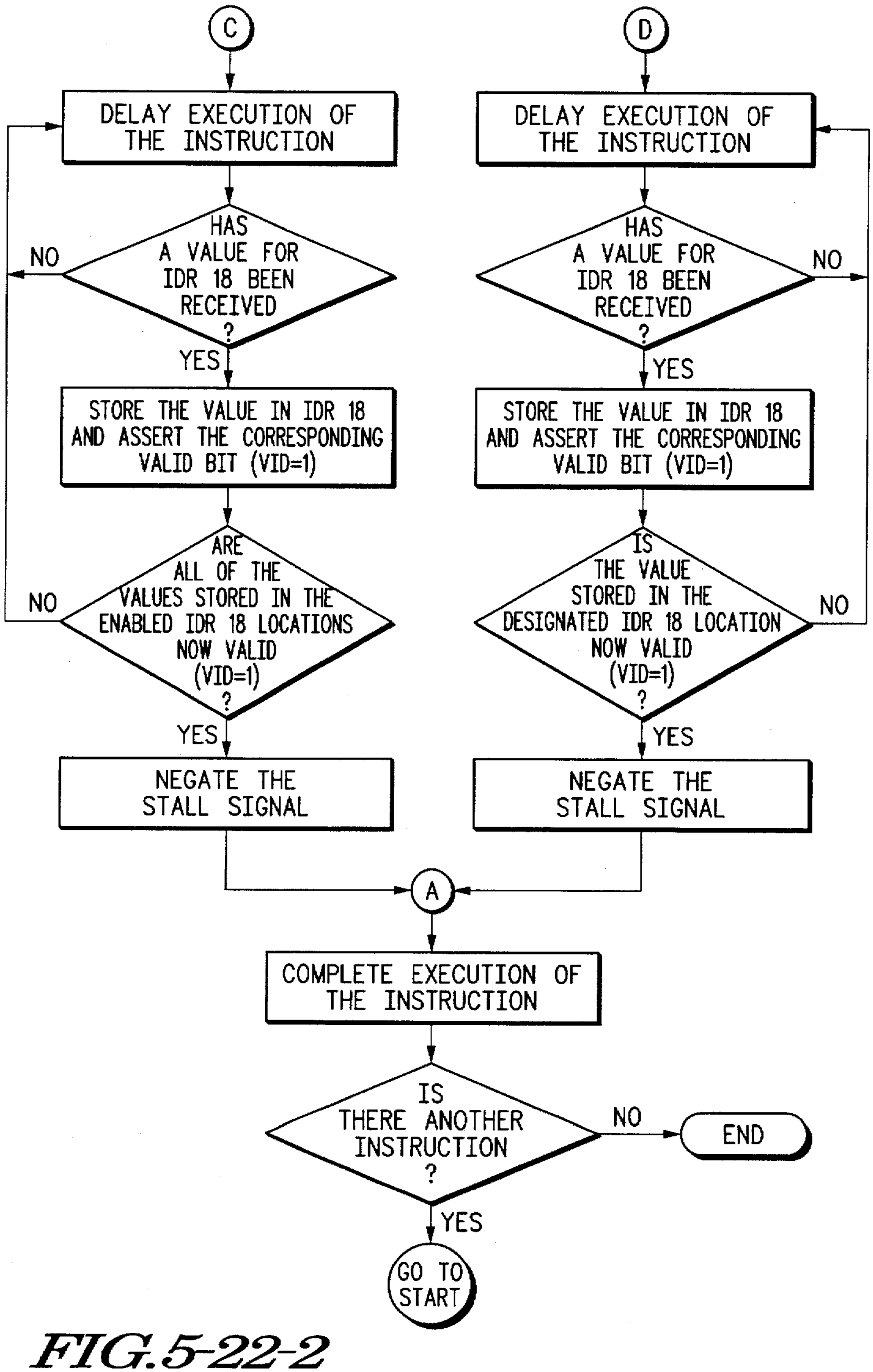
Figures 2, 5, 6, 7, 8, 9, 10, 11, 12, 13, 14, 15, 16, 17, 18, 19, 20, 21, 22:
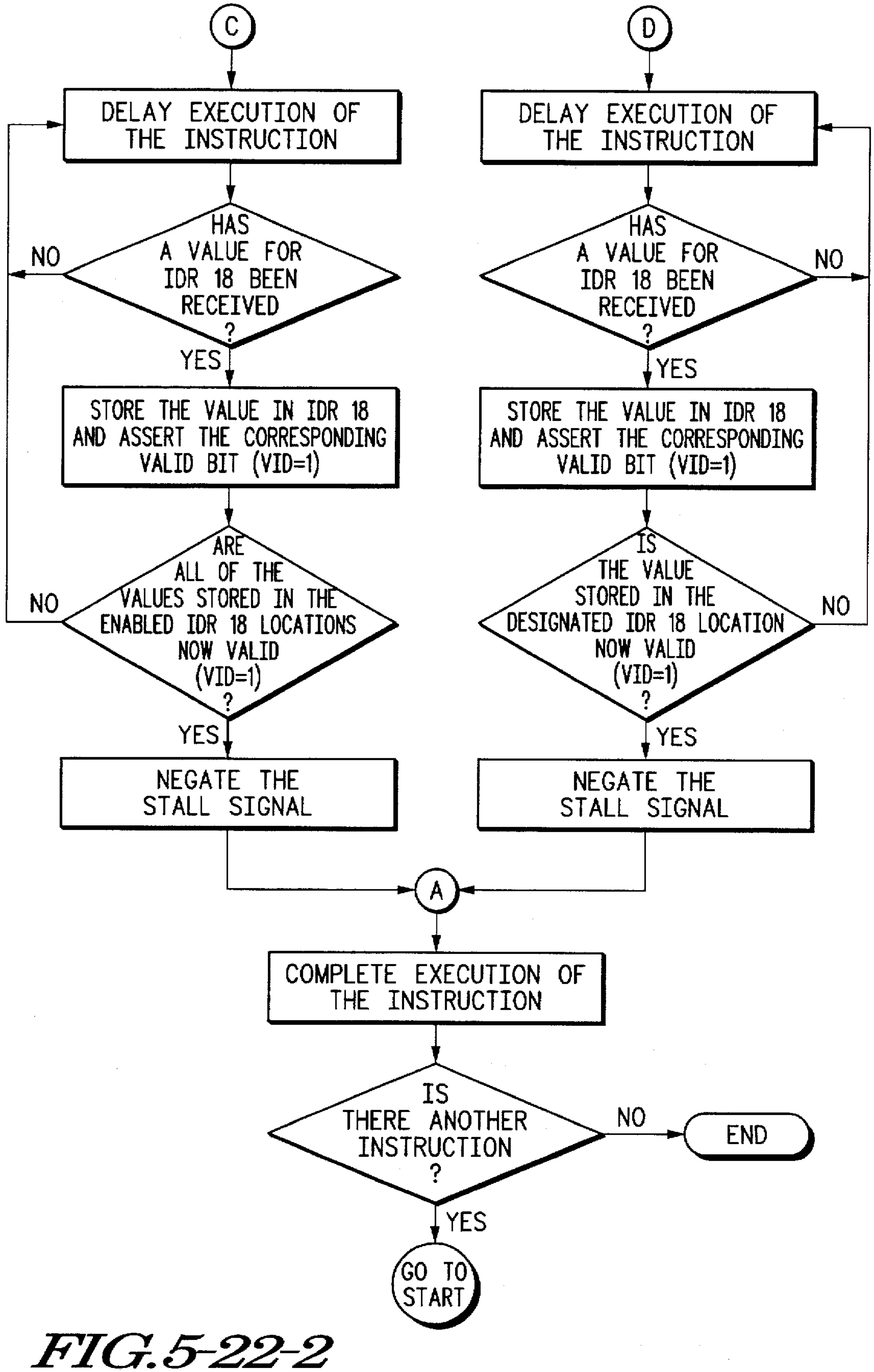
Figures 5, 6, 7, 8, 9, 10, 11, 12, 13, 14, 15, 16, 17, 18, 19, 20, 21, 22, 23:
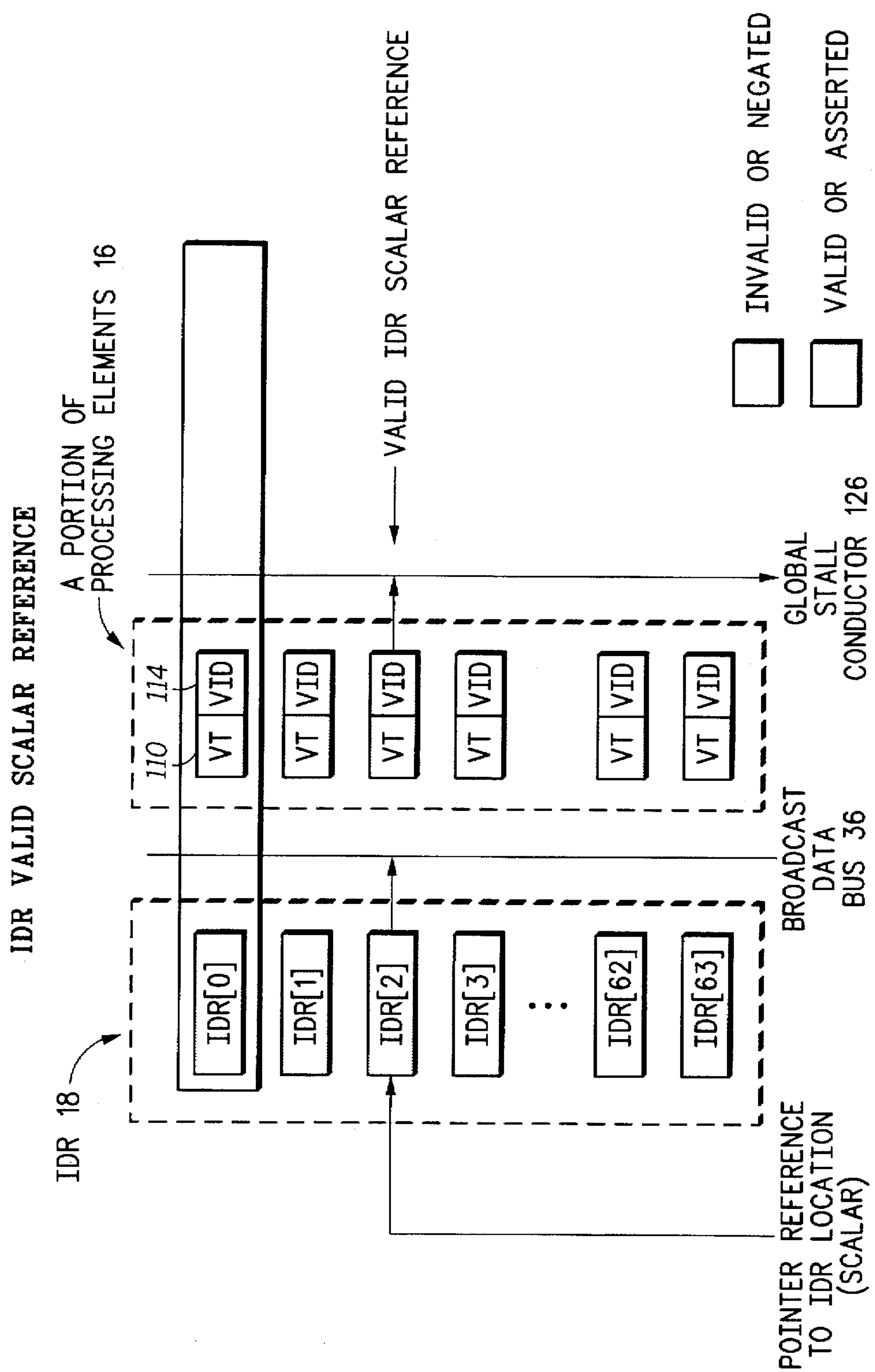
Figures 5, 6, 7, 8, 9, 10, 11, 12, 13, 14, 15, 16, 17, 18, 19, 20, 21, 22, 23, 24:
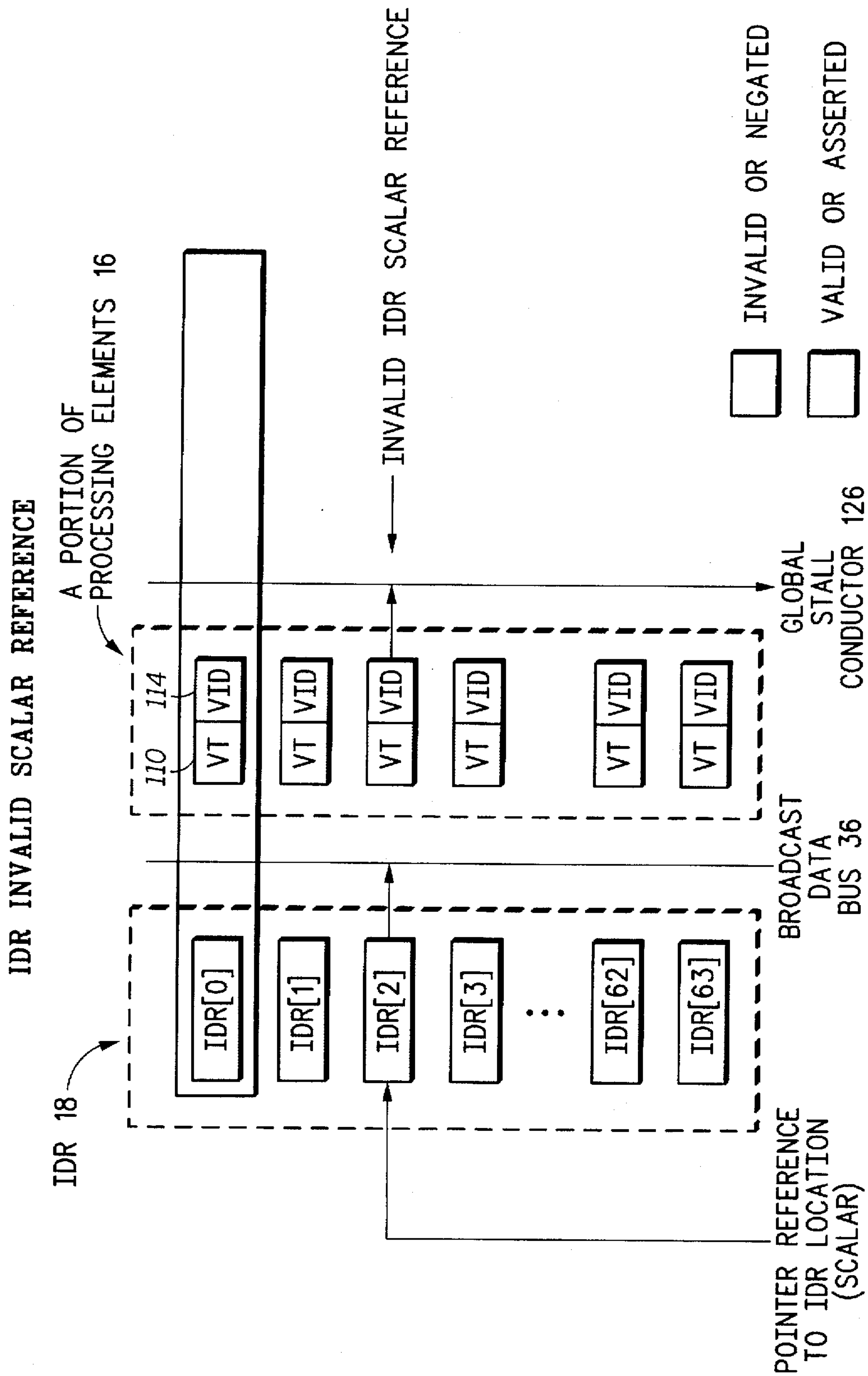
Figures 5, 6, 7, 8, 9, 10, 11, 12, 13, 14, 15, 16, 17, 18, 19, 20, 21, 22, 23, 24, 25:
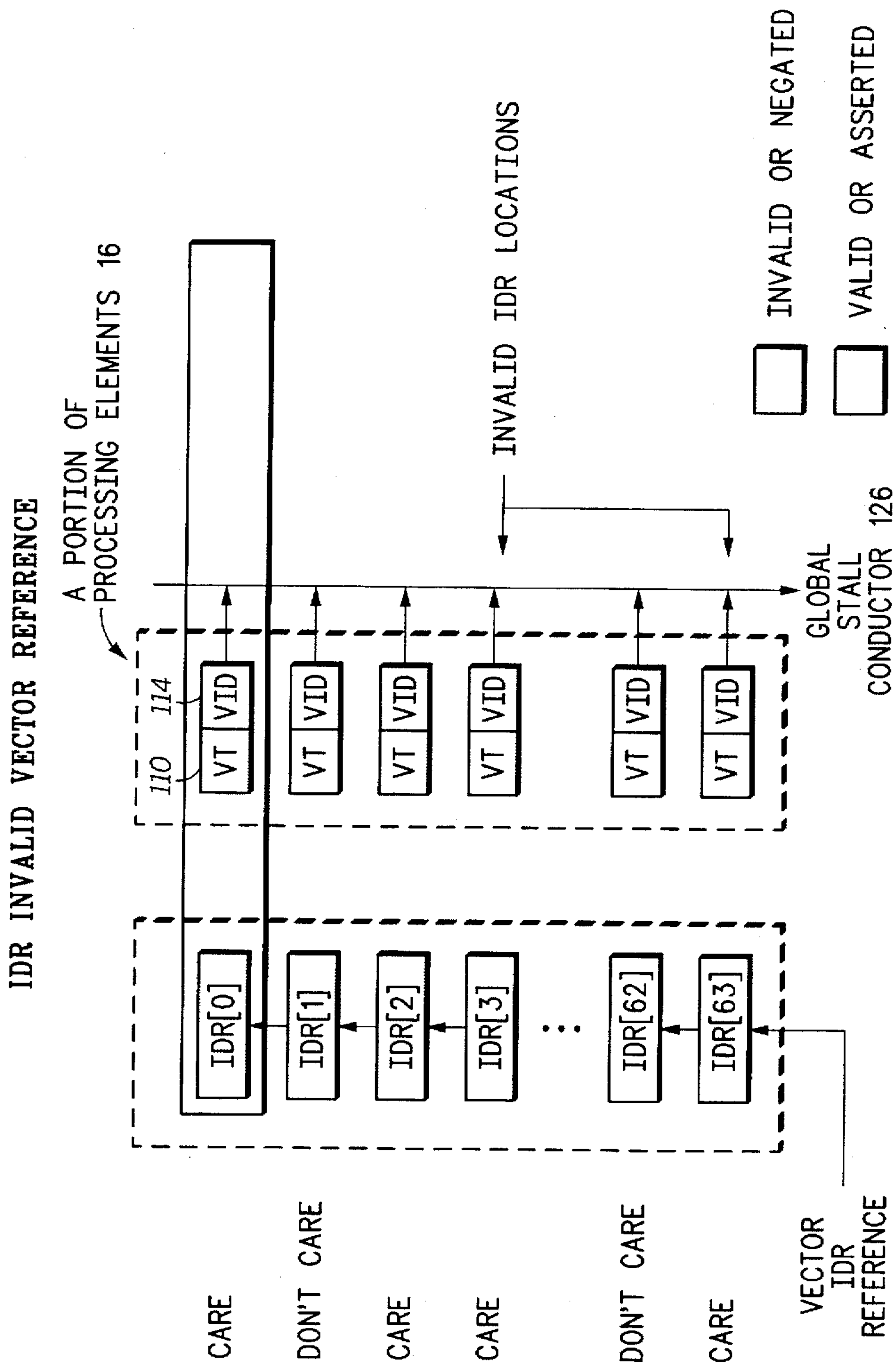
Figures 5, 6, 7, 8, 9, 10, 11, 12, 13, 14, 15, 16, 17, 18, 19, 20, 21, 22, 23, 24, 25, 26:
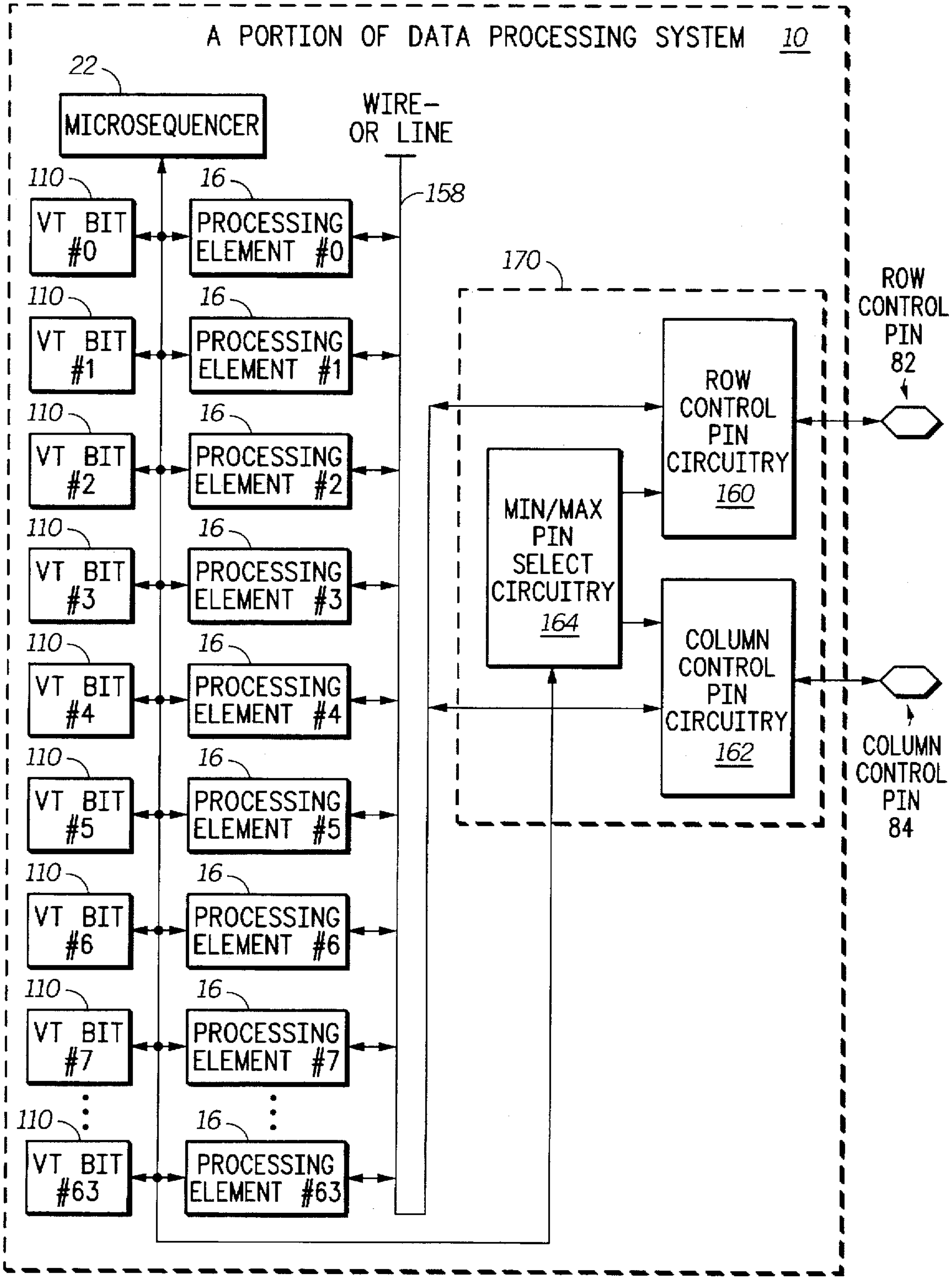
Figures 5, 6, 7, 8, 9, 10, 11, 12, 13, 14, 15, 16, 17, 18, 19, 20, 21, 22, 23, 24, 25, 26, 27, 28, 29:
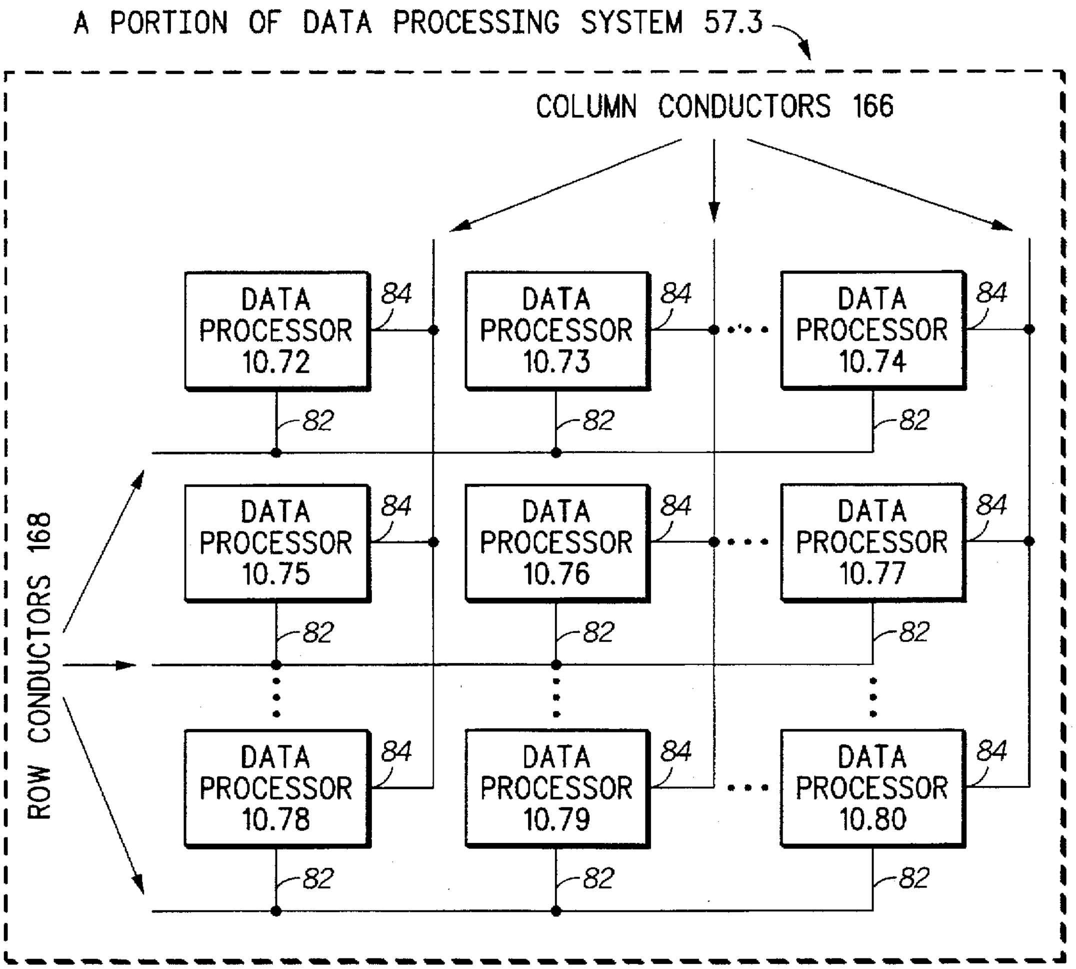
Figures 1, 5, 6, 7, 8, 9, 10, 11, 12, 13, 14, 15, 16, 17, 18, 19, 20, 21, 22, 23, 24, 25, 26, 27, 28, 29, 30:
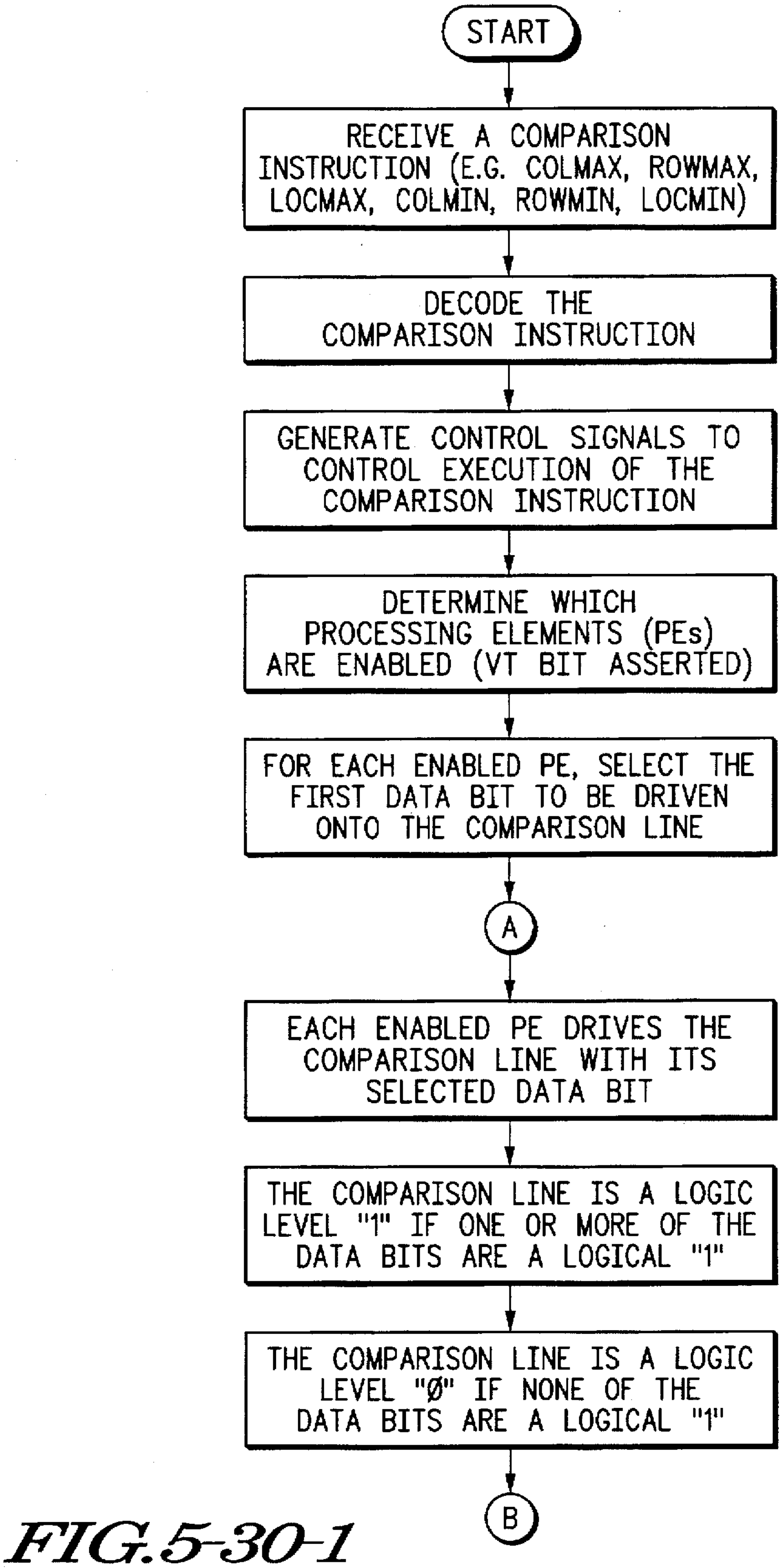
Figures 2, 5, 6, 7, 8, 9, 10, 11, 12, 13, 14, 15, 16, 17, 18, 19, 20, 21, 22, 23, 24, 25, 26, 27, 28, 29, 30:
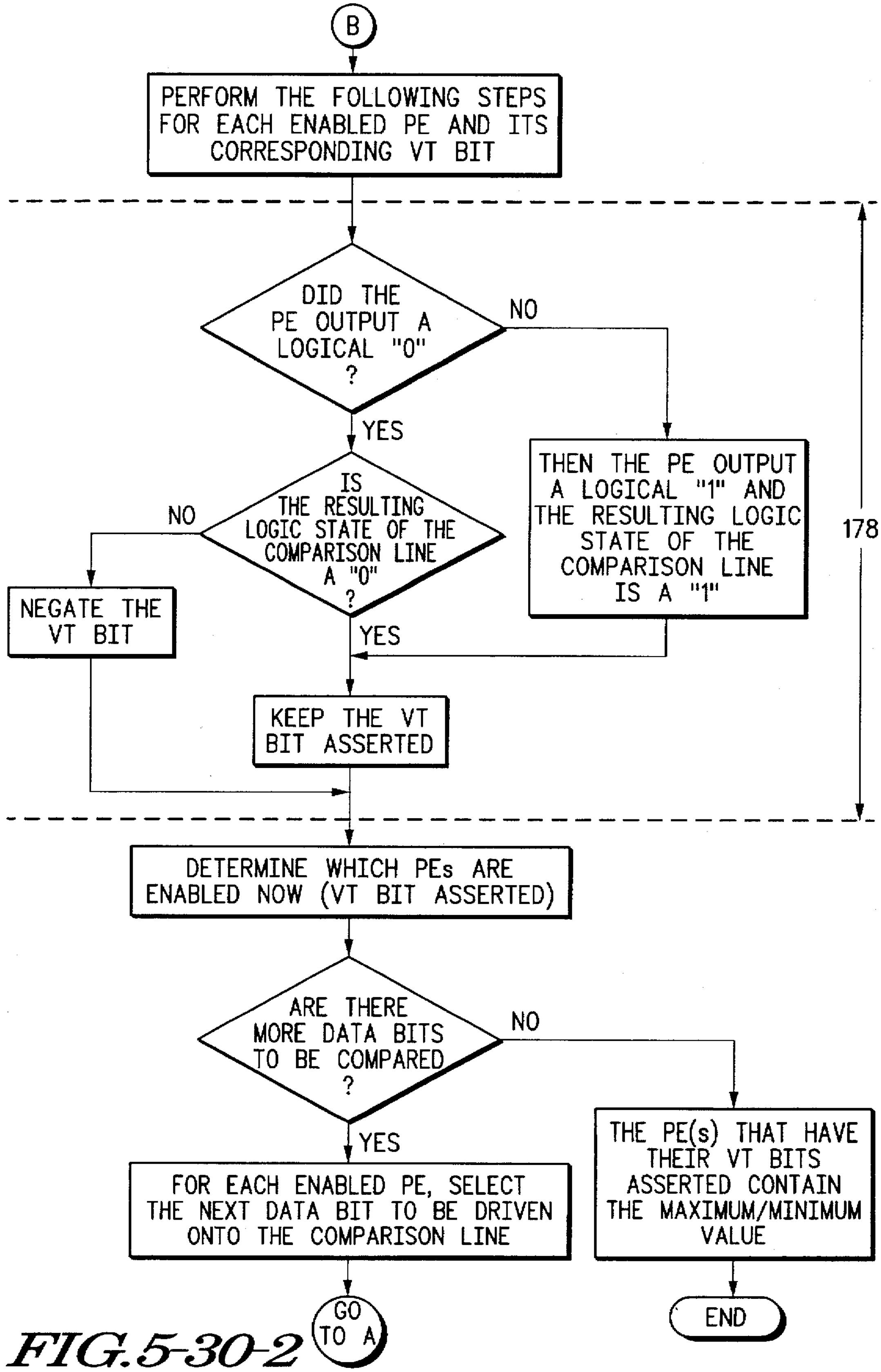
Figures 5, 6, 7, 8, 9, 10, 11, 12, 13, 14, 15, 16, 17, 18, 19, 20, 21, 22, 23, 24, 25, 26, 27, 28, 29, 30, 31:
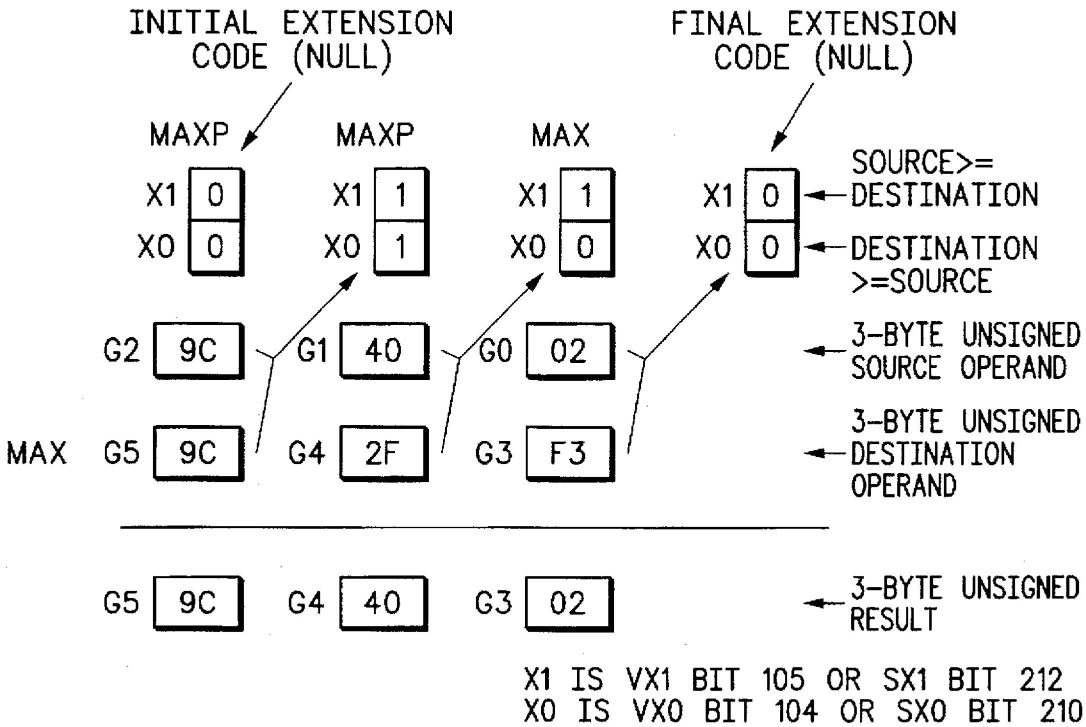
Figures 5, 6, 7, 8, 9, 10, 11, 12, 13, 14, 15, 16, 17, 18, 19, 20, 21, 22, 23, 24, 25, 26, 27, 28, 29, 30, 31, 32:
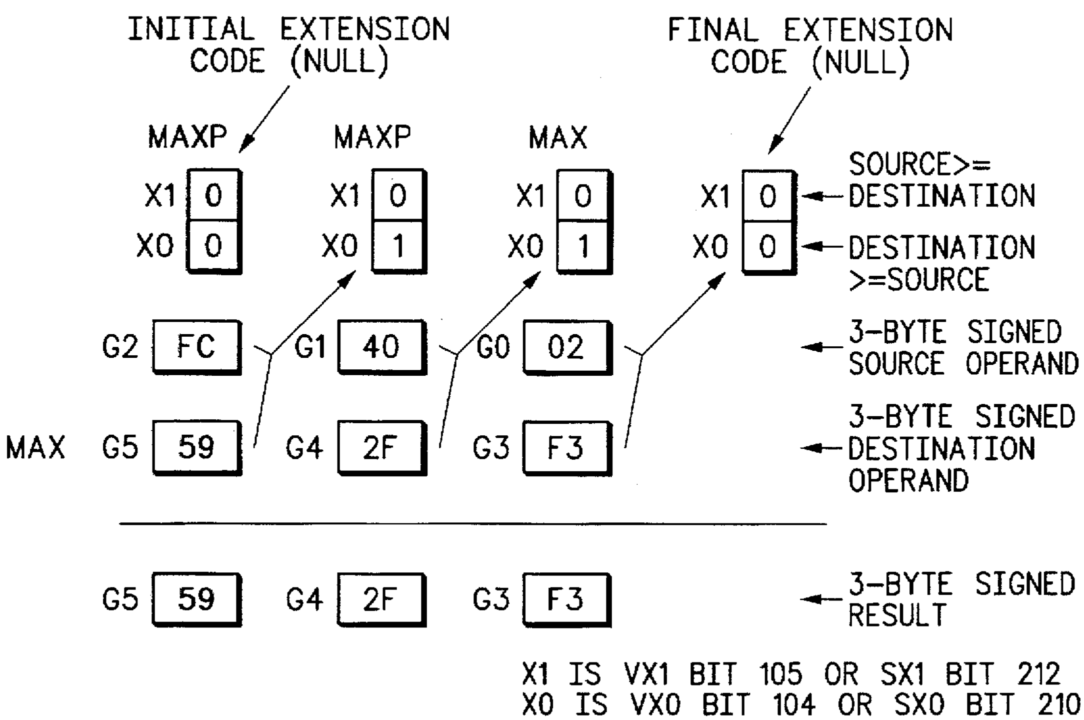
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33:
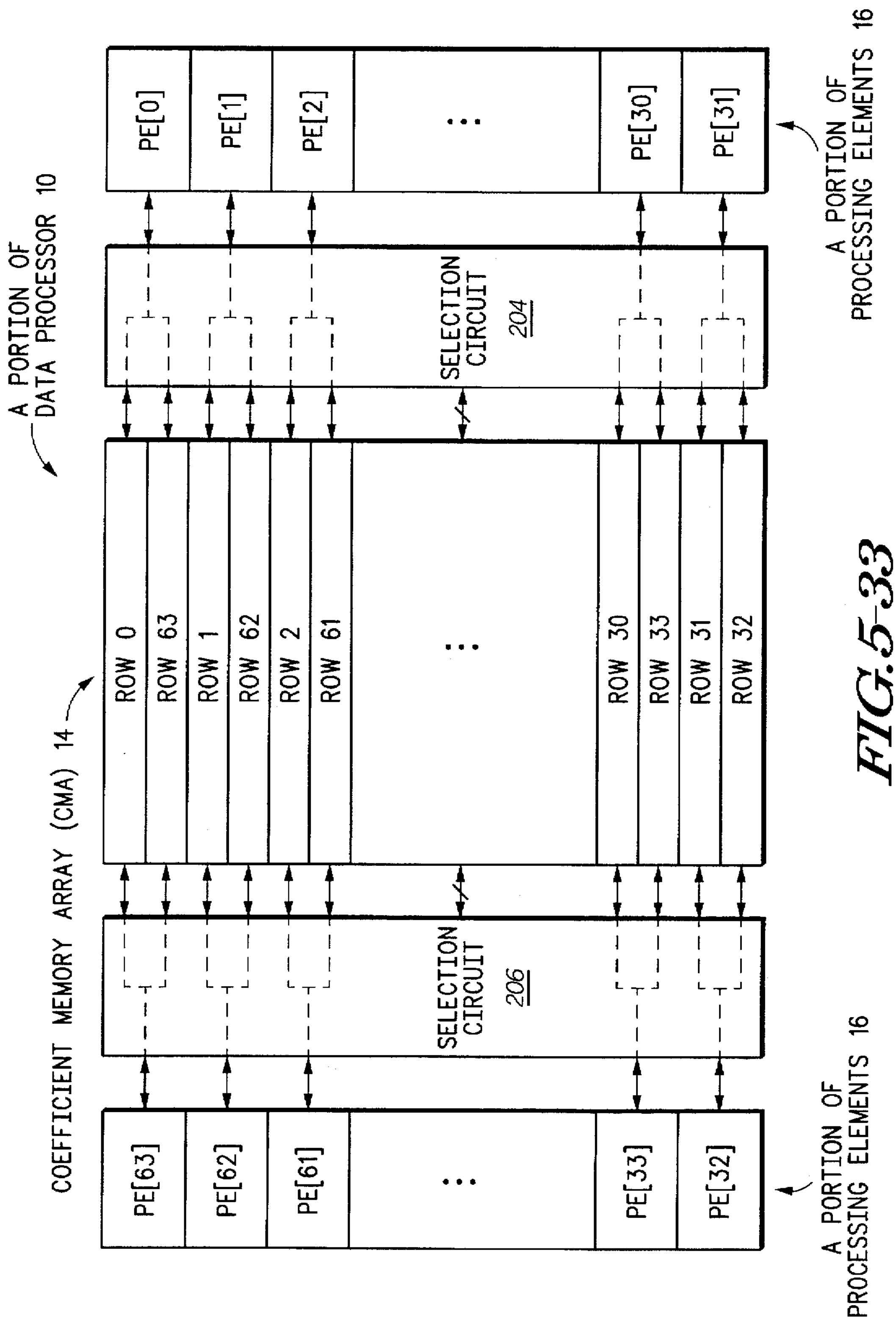
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
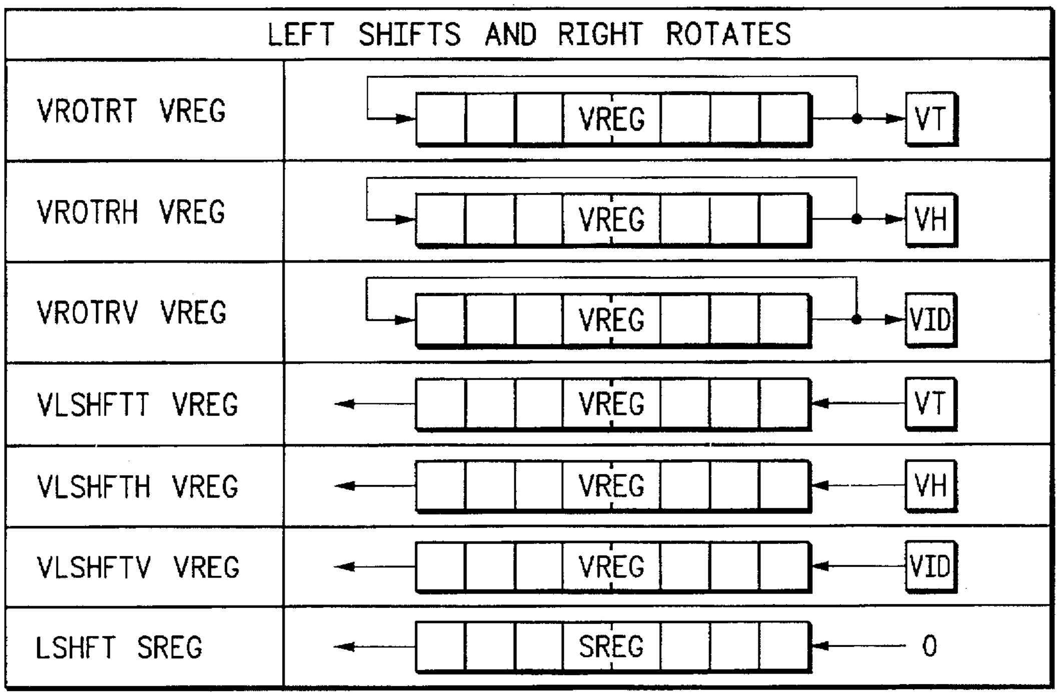

To clarify the functionality of the VT and VH bits, Table 2.48 and FIG. 2-75 show the next state transition table and the state transition diagram for the VT and VH bits respectively. Remember, the vif instruction is executed only if the VT bit is set. The velse and vendif instructions are executed independently of the VT bit. The reset or initial condition is VT=1; VH=0.

(2.5.13.2) Summary of the Right Rotate and Left Shift instructions

Table 2.49 provides a quick summary of the right rotate and left shift instructions available to the Association Engine programmer.

(2.5.14) Scalar Engine Data Movement

This section describes the instructions that perform basic scalar engine data movement. Refer to Table 2.50 for a description of the Scalar Engine Data Movement microcode instructions.

(2.5.15) Scalar Engine Data Operations

This section describes the instructions that operate on the scalar registers. It should be noted that Arithmetic Control Register (ACR) bits SSGN and VSGN control the result of instructions with respect to signed and unsigned values. Refer to Section 2.5.8 Signed verses Unsigned Operations and Section 2.5.9 Saturating verses Non-saturating Operations for more information regarding signed/unsigned and saturating operations. Refer to Table 2.51 for a description of the Scalar Data Microcode Instructions.

(2.5.16) Scalar Engine Program Flow Control Operations

This section describes the instructions that perform program control in the SIMD Scalar Engine. For instructions which must save off the PC (bsr, jsrmi and jsrri), a single level hardware stack is provided (FLS). If more than a single level of stacking is required, then space must be allocated in the CMA for a stack, and the next available stack location will be pointed to by the SP. Refer to Table 2.52 for a description of the Program Control Microcode Instructions.

(2.5.17) Clarification of the repeat and repeate instructions

The repeat and repeate instructions can give rise to boundary conditions when certain instruction types appear at the end of the loop (when the Micro-Sequencer is calculating whether it should loop another time, or whether it should execute the instruction immediately following the loop). The obvious interactions involve change of flow instructions (bra, bsr, jmpri, jmpmi, jsrri anti jsrmi). Less obvious interactions involve the vector conditional instruction (vif, velse and vendif). Each of these interactions will be explained below.

(2.5.17.1) Change-of-flow at the end of a repeat loop

Change-of-flow which occur at the end of a repeat loop are fairly straight-forward. The explicit change-of-flow (bra/jmpri/jmpmi or bsr/jsrri/jsrmi) will always be preferred to the implicit change-of-flow of the repeat loop. For the examples shown in FIG. 2-76 and FIG. 2-77, repeat could be replaced with repeate. In other words, the type of repeat loop is not crucial to these two examples.

(2.5.17.2) Vector Conditionals at the end of a repeat loop

The interaction of vector conditional instructions at the end of a repeat loop is not quite as obvious as the change-of-flow example described above. The interaction of concern is when the explicit modification of the VT and VH bits (due to instructions which occur at the end of the repeate loop) interfere with the implicit modification of the VT and VH bits (due to the implicit vendif at the end of a repeate loop).

In FIG. 2-79 and FIG. 2-80, vector conditional (those instructions which affect the VT and VH bits) is used as a placeholder for the following instructions: locmin, locmax, colmin, colmax, rowmin, rowmax, dskipe, vifxx, velse, vendif, vlshfth, vlshftt, vrotrh and vrotrv.

As was explained in Table 2.52, the repeate loop is identical to a repeat loop with a terminating vendif. This identity is shown in FIG. 2-78. (notice that the loop on the right-hand side is a repeate loop).

If a vector conditional instruction appears at the end of a repeat loop, the conditional instruction will affect the VT and VH as expected (it operates just as a vector conditional would inside the loop). This is shown in FIG. 2-79.

If a vector conditional instruction appears at the end of a repeate loop, the vendif implicit in the repeate loop will dominate, and it will be as though the vector conditional instruction was never executed. This is shown in FIG. 2-80.

(2.5.18) Extension bits and performing Multi-byte Operations

The Association Engine is designed to support single and multi-byte operations. It does this by saving extension information from the last operation performed. For any given operation there will be two basic types of instructions; preliminary instructions and ending instructions. Depending on the operation performed, the most significant byte may be operated on first or last. It should be noted that the final operations will saturate for computations where overflow is possible.

For single byte operations the Association Engine programmer can select either saturating (ending type) or non-saturating (preliminary type) instruction depending on the application. Care should be used when using the preliminary instructions for single byte operations so that the extension information produced by the preliminary instructions does not inadvertently effect subsequent instructions.

With regards to the extensions bits, the Association Engine instructions can be divided into three categories. The first category is where the extension bits are not used in the operation but are always cleared as a result of the operation. The second dass of instruction is one that uses the extension bits in the operation (carry in for example) and which sets the extension bits to reflect the result of the operation (carry out for example). The third class of operations are those that used the extension bits in the operation but always clear the extension bits as a result of the operation (saturating add, for example, will never produce a carry out). So, for the case of addition, subtraction, and shifting the extension information is always used in the operation. It is very important to ensure that the first operation of a multi-byte sequence starts off with the extension bits cleared. Otherwise an erroneous result might be produced.

(2.5.19) Description of Multi-byte Operations

The extension bits described in the following sections apply to both the scalar and vector process control registers. The operations described here are addition, subtraction, maximum, minimum, left shifting, right shifting, and negation. The following examples will also assume that two 24-bit quantities are being operated on (V0,V1,V2 and V3,V4,V5; V2 and V5 are the least significant bytes). In selected examples, an 8-bit operand is used with a 24-bit operand.

Also, in Tables 2.53 through 2.63, the terminology xX0 and xX1 are used as shorthand to refer to either the SX0 and SX1 bits in the Scalar Engine, or the VX0 and VX1 bits in the Vector Engine.

(2.5.19.1) Multi-Byte Addition

In the case of multi-byte addition the operations start with the least significant byte and work upward. For example (recall that the extension bits should start out as 00):

vaddp V2, V5
vaddp V1, V4
vadd V0, V3

The vadd instruction (which can saturate) will never generate a carry out, so the extension bits will be cleared at the end of the vadd instruction. But the extension information produced by the vaddp instruction is used to hold carry and sign information. The extension xX1 bit is used to hold the sign information of the sreg operand (this is used to support sign extended addition, which will be discussed later). The extension xX0 bit is used to hold carry information for the addition. Table 2.53 details the possible states for the extension bits.

If the user is concerned about the most significant vadd saturating, the vsat instruction can be used to alter the least significant bytes of the multi-byte result based on the last overflow and saturation direction information held in the process control register. The instructions:

vsat V4
vsat V5 would follow the vadd instruction to saturate the two less significant bytes of the destination register (if it occurred in the most significant add).

For cases where the operands are of different size (like adding a byte into a running total that is 24 bits) the addition with sign extend can be used. For example (Assume V0 is added to V3,V4,V5):

vaddp V0,V5
vaddsxp V4
vaddsx V3

Recall that the extension bits contain the information about the source operand of the last operation. The xX1 bit specifically is used by the vaddsxp instruction to determine how the previous operation should be signed extended If the xX1 bit was set, then the vaddsxp instruction would add in any carry information and use the value of $FF as the other argument to the addition. This; has the effect of sign extending the V0 value. Just like the vadd instruction, the vaddsx instruction will saturate the result (if the overflow bit is set) and clear the extension bits. Table 2.54 indicated the effects of the vaddsxp instruction to the extension bits.

As with the previous example if the most significant operation could saturate, the vsat instruction should be used to saturate the remaining bytes in the result.

(2.5.19.2) Multi-Byte Subtraction

In the case of multi-byte subtraction, the operations start with the least significant byte and work upward. For example (recall that the extension bits start out as 00):

vsubp V2, V5
vsubp V1, V4
vsub V0, V3

The vsub instruction (which can saturate) will never generate a borrow out, so the extension bits will be cleared at the end of the vsub instruction. But the extension information produced by the vsubp instruction is used to hold borrow and sign information. The extension xX1 bit is used to hold the sign information of the source operand (this is used to support sign extended subtraction, which will be discussed later). The extension xX0 bit is used to hold borrow information for the subtraction. Table 2.55 details the possible states for the extension bits.

If the user is concerned about the most significant vsub saturating, then the vsat instruction can be used to alter the least significant bytes of the multi-byte result based on the final overflow and saturation direction information held in the process control register. The instructions:

vsat V4
vsat V5 would follow the vsub instruction to saturate the two less significant bytes of the destination register (if it occurred in the most significant subtract).

For cases where the operands are of different size (like subtracting a byte from a running difference that is 24 bits) the subtraction with sign extend can be used. For example (Assume V0 is subtracted from V3,V4,V5):

vsubp V0,V5
vsubsxp V4
vsubsx V3

Recall that the extension bits contain the information about the source operand of the last operation. The xX1 bit specifically is used by the vsubsxp instruction to determine how the previous operation should be signed extended. If the xX1 bit was set, then the vsubsxp instruction would subtract any borrow information and use the value of $FF as the other argument to the subtraction. This has the effect of sign extending the V0 value. Just like the vsub instruction, the vsubsx instruction will saturate the result (if the overflow bit is set) and clear the extension bits. Table 2.56 indicates the effects of the vsubsxp instruction to the extension bits.

As with the previous example if the most significant operation could saturate, then the vsat instruction should be used to saturate the remaining byte; in the result.

(2.5.19.3) Multi-Byte Comparison

In the case of multi-byte comparison, the operations start with the most significant byte and work downward. In most cases, the desired result of a vector comparison is to set the processing mask (VT-bit). For scalar comparisons it is most likely that program flow changes will occur. In any case the comparison ends at the least significant byte with an vif or skip type instruction. For example (recall that the extension bits start out as 00):

vcompp V0, V3
vcompp V1, V4
vifeq V2, V5

The vcompp instruction uses the extension bits in a different manner than the add and subtract instructions. The extension bits are used to determine what the results of the last operation were and to determine whether more comparisons are required. Table 2.57 details the definition of the extension bits prior to and after the vcompp instruction.

At the end of the last vcompp instruction, a conditional vif (or skip) instruction is performed. The vif instruction will take the extension information and combine it with the desired comparison (if equal for example) and set or clear the processing mask (VT-bit) accordingly (or perform some change of flow).

(2.5.19.4) "VIF" dependence on xX0 and xX1

It is important to re-iterate that the vif and skip instructions are directly dependent upon the state of the X0 and X1 bits (SX0:SX1 for the scalar engine; VX0:VX1 for the Vector engine). This dependence is necessary to facilitate multi-byte comparisons. For this reason, most instructions clear the X0 and X1 bits. Please be aware of those instructions which do effect the X0 and X1 bits when using the vif and skip instructions.

(2.5.19.5) Multi-Byte Maximum

In the case of multi-byte maximum the operations start with the most significant byte and work downward. The operation of multi-byte maximum is very similar to multi-byte comparison. The result of the operation is different. The sreg register will be the maximum of the two operands. For example (recall that the extension bits start out as 00):

X vmaxp V0, V3
imnaxp V1, V4
vnmax V2, V5

The vmaxp instruction uses the extension bits in a different manner than the add and subtract instructions. The extension bits are used to indicate to the vmaxp instruction what action should be taken. The final maximum operation (the least significant byte) should use the vmax operation to ensure that the extension bits are placed back to their null state (00) and the last byte of data is moved (based on the comparison). Table 2.58 details the definition of the extension bits prior to and after the vmaxp instruction.

(2.5.19.6) Multi-Byte Minimum

In the case of multi-byte minimum the operations, start with the most significant byte and work downward. The operation of multi-byte minimum is very similar to multi-byte maximum. The result of the operation is different. The sreg register will be the minimum of the two operands. For example (recall that the extension bits start out as 00):

minp V0, V3
vminp V1, V4
vnmin V2, V5

The vminp instruction uses the extension bits in a different manner than the add and subtract instructions. The extension bits are used to indicate to the vminp instruction what action should be taken. The last minimum operation (the least significant byte) should use the vinin operation to ensure that the extension bits are placed back to their null state (00) and the last byte of data is moved (based on the comparison). Table 2.59 details the definition of the extension bits prior to and after the vminp instruction.

(2.5.19.7) Multi-Byte Left Shifts

In the case of multi-byte left shifts, the operations start with the least significant byte and work upward. For the case of the left shift operation there is no specific left shift preliminary instruction. For this function the add preliminary is used. For example (recall that the extension bits start out as 00):

vaddp V2, V2
vaddp V1, V1
vlshft V0

The first two operations shift the V2 and V1 registers left by one bit position saving the carry result in the extension bit xX0. In this case the extension bit xX1 is a don't care. The last instruction vlshft takes the extension information and shifts it into the last (most significant) byte and then clears out the extension bits to their null state (00).

(2.5.19.8) Multi-Byte Right Shifts

In the case of multi-byte right shifts, the operations start with the most significant byte and work downward. Like the cases before, the preliminary right shift instruction is used on the most significant byte and the normal right shift instruction is used for the last (least signifieant) byte. For example (recall that the extension bits start out as 00):

vrshftp V2
vrshftp V1
vrshft V0

The first two operations shift the V2 and V1 registers by one bit position saving the least significant bit result in the extension bit xX0. The xX1 extension bit is used to indicate to the instruction that possible sign extension is required (see Table 2.60). The last instruction, vrshft takes the extension information and shifts it into the last (least significant) byte and then clears out the extension bits to their null state (00). Thus with the last operation the least significant bit is discarded.

(2.5.19.9) Multi-Byte Negation

In the case of multi-byte negation the operations start with the least significant byte and work upward. For the lower byte, the preliminary negation instruction is used. For the last (most significant) byte, the normal negation instruction is used. It should be noted that negating the most negative number (−128) results in an overflow condition (127). The extension xX0 bit is used to hold borrow information from the negation and the X1 bit is don't cared. For example (recall that the extension bits start out as 00):

vnegp V2
vnegp V1
vneg V0

The vneg instruction (which can saturate) will never generate a borrow out so the extension bits will be cleared at the end of the vneg instruction. Table 2.61 details the possible states for the extension bits.

(2.5.19.10) Incrementing a Multi-Byte Pointer

In the case of multi-byte pointer addition the operations start with the least significant byte and work upward. For example (recall that the extension bits should start out as 00):

incp #3,P6
inc #0,P7

The inc instruction will never generate a carry out, so the extension bits will be cleared at the end of the inr instruction. But the extension information produced by the incp instruction is used to hold carry and sign information. The extension SX1 bit is used to hold the sign information of the sreg operand (this is used to support sign extended addition). Although the source operand is a constant field in the instruction the SX1 bit is cleared to be consistent with other Association Engine instructions. The SX1 bit is not used as an input to the inc or incp instructions. The extension SX0 bit is used to hold carry information for the addition. Table 2.53 details the possible states for the extension bits. Table 2.62 provides an extension bit description for an increment preliminary (incp).

(2.5.19.11) Decrementing a Multi-Byte Pointer

In the case of multi-byte pointer subtraction, the operations start with the least significant byte and work upward. For example (recall that the extension bits start out as 00):

decp #3, P6
dec #0, P7

The dec instruction will never generate a borrow out, so the extension bits will be cleared at the end of the dec instruction. But the extension information produced by the decp instruction is used to hold borrow and sign information. The extension SX1 bit is used to hold the sign information of the sreg operand (this is used to support sign extended addition). Although the source operand is, a constant field in the instruction the SX1 bit is set to be consistent with other Association Engine instructions. The SX1 bit is not used as an input to the dec or decp instructions. The extension SX0 bit is used to hold borrow information for the subtraction. Table 2.55 details the possible states for the extension bits. Table 2.63 provides an extension bit description for a decrement preliminary (decp).

(2.5.20) Process Computation Control

This section describes of how the VPCR/SPCR bits are effected by each of the instructions. Most operations take a source operand and an destination operand and perform the operation and store the result into the destination operand. Single operand operations take the destination operand and perform an operation on the destination operand, and the store the result in the destination operand. Table 2.64 lists each instruction and how it effects the process codes. Note that the VX[1:0], VT, VV, VD, and VH bits are in each of the Processing Elements, while the SX[1:0], SV, and SD bits is in the Scalar Engine Processor control register.

(2.5.21) Effect of the VPCR VH and VT Bits on PE processing

If the VT bit is set, the current instruction is allowed to update the destination register. If, however, if the VT bit is cleared, then the destination register is not updated. This blocking function also applies to updating the VPCR register bits. The function of the VH bit is to save the history of the VT bit and to control when the VPCR VT bit can be modified. So, by combining the VT and the VH bits, there is a hierarchy of control in the execution of instructions in the SIMD Vector Engines. Table 2.65 shows the effect that the VH and VT bits have on the execution of the Association Engine instructions.

(2.5.22) Instruction Execution Times

In this section a description of the cycle times for each of the instructions is given. Possible adjustments to these instruction times to account for multi-position or multi bit operations. Table 2.66 lists each instruction and how the cycle times can vary from a minimum to a maximum.

(2.5.23) Association Engine Missing Instructions

On the Association Engine there are several instructions that can perform two functions. These instructions are illustrated in Table 2.67.

Association Engine Theory of Operation (Section 3)

In this section, a more detailed description of the operation of the a Association Engine will be given. The main function of the Association Engine is to take input data and perform a user defined transfer function.

The major aspects of the Association Engine functionality is divided into logical parts.

Section 3.1 Flow of Information and Organization describes the flow of information through a typical feedforward network and provides the mapping of the network onto the Association Engine/Association Engine' architecture. Section 3.2. The Instruction Pipeline describes the basic mechanics of how instructions are fetched and executed. Section 3.3 Instruction and Data Memory describes how the primary memory of the Association Engine is arranged to hold both microcode, vector data, and scalar data. Section 3.4 Association Engine Initialization describes the issues involved with the set-up and initialization of the Association Engine. Issues such as minimal configuration and initialization are discussed. Section 3.5 Port Operation describes the port operating modes, and how the user of the Association Engine can control the transfer of data to and from the Association Engine from the host side. In addition, to support the different modes of data transfer, a description of the host memory map is given. Section 3.6 Association Engine Operation describes the SIMD Processing Elements and the control of computational functions. Included in this discussion is the macro and micro view of the Vector and Scalar Engines. Several descriptions of microcode program structures are also given. Section 3.7 Microcode Initiated Port Write Operations describes the operating modes for the transfer of the computed data from the Association Engine under microcode control to the supporting Association Engine' device. The two dimensional and one dimensional Association Engine configurations are discussed. Section 3.8 Association Engine Bus Configurations shows how multiple Association Engines can be arranged to solve problems and what error conditions to watch for when using Association Engine in an array structure.

(3.1) Flow of Information and Organization

Taking a high level approach, a neural network architecture can be mapped onto a set of Association Engine blocks to perform the required function. The information flow can also be considered a mapping function. FIG. 3-1 shows a typical fully connected feedforward neural network. To support many different types of neural network algorithms, another Association Engine (with different microcode) referred to as the Association Engine', can be used to take the Partial Synapse Values from the Association Engines and aggregate them to form the total neuron output.

In this network, the Input Layer (i) performs a distribution function only. There are 119 inputs to this network. The Hidden Layer(h) takes these inputs and applies the network coefficients $c_{ih}$ using a propagation function such as the sum of products: $\Sigma(i^*c_{ih})$. When describing the interconnection coefficients, the first subscript (i) denotes the input index or the "from" neuron and the last subscript (h) indicates the "to" neuron. The Hidden Layer performs an output function on the sum of products to generate the output from the Hidden Layer. In this example the Hidden Layer has 80 neurons. The Output Layer(o) takes the output from the Hidden Layer applying the networks coefficients who using a propagation function $\Sigma(h^*w_{ho})$. As in the Hidden Layer, the Output Layer performs an output function on the sum of products to generate the network outputs. The Output Layer in this example has 20 neurons. For an Association Engine architecture of 64 inputs and 64 outputs, the mapping of this example will require several Association Engines. FIG. 3-2 shows one possible mapping for the hidden layer in FIG. 3-1. In FIG. 3-2 Association Engine 0, Association Engine 1, and Association Engine 2' form Bank 0 and Association Engine 3, Association Engine 4, and Association Engine 5' form Bank 1. Similarly, Association Engine 0 and Association Engine 3 form, Association Engine 1 and Association Engine 4 form Slice 1 and Association Engine 2' and Association Engine 5' form Slice 2. In the mapping of the network shown in FIG. 3-1 it should be noted that both the Input Layer and the Hidden layer are mapped onto FIG. 3-2. The reason for this is that the Input Layer acts only as a distribution layer.

The flow of information for the Association Engine combination goes as follows: the first 63 input samples are loaded into the IDR of Slice 0. The remaining samples are loaded into the IDR of Slice 1. At the same time that Slice 1 is being loaded, Slice 0 can start the computation of the sum of products for its input samples.

After Slice 0 has completed the computation, it can transfer the Partial Synapse Results (which represents a vector subtotal) to the Association Engine'. After Slice 1 has transferred its subtotal, the Association Engine' Slice (Slice 2) can perform the output function and start the transfer of the Hidden Layer data to the Output Layer. An Association Engine' can support many Association Engines of the same bank.

In FIG. 3-2, Slice 2 shows that the Association Engine can be used as a different functional block (with different microcode). It also shows that the CMA can be used differently. The training vector is loaded into the CMA as T0 through T79. The S vector (SO through S79) is the totaled Partial Synapse Values for the Association Engines in Slice 0 and Slice 1. The COF values shown in Association Engine 2' and Association Engine 5' are used to perform squashing function on the synapse totals to generate the output of the network.

FIG. 3-3 shows a logical view of the Association Engine/Association Engine' units. Note that the Association Engine devices are responsible for the propagation of the outputs from the previous layer with the interconnect coefficients, and the Association Engine' device performs the aggregation and output function.

It should be pointed out that the mappings shown in FIG. 3-2 and FIG. 3-3 represent only one of the possible mappings of the network shown in FIG. 3-1. Slice 2 could be entirely removed, as described in Section 2.1 Association Engine System Overview, and the partial results could be accumulated into Slice 1.

(3.2) The Instruction Pipeline

The Association Engine implements the instruction sequencer with a three stage pipeline. This implies that each instruction must go through three different functional units to complete. This is illustrated in FIG. 3-4 and explained in a little more detail in Table 3.1

When the pipeline is filled, it is possible to ignore the time it takes for the instruction to pass through Stage 1 and Stage 2. In FIG. 3-5, the pipe is considered filled at time t3, and between t3 to t7, a new instruction is executed every clock). In other words, each instruction takes a minimum of 3 clocks cycles to complete, but using this particular pipeline, each instruction has an effective execution time of 1 clock.

Multi-cycle instruction timing is not much different than the single-cycle-timing shown in FIG. 3-5. However, since each instruction is responsible for performing a prefetch for an upcoming instruction, multi-cycle instructions will not perform a prefetch until they are one cycle from completing. Multi-cycle timing is illustrated in FIG. 3-6.

(3.2.1) Stalls in the Instruction Pipeline

Pipeline stalls are due to two different conditions: cache misses and resource conflicts.

Stalls in Stage #1 of the pipe are due entirely to cache misses (the condition where the address in the PC is not found in a valid cache line). Each stall injected into the pipe due to a cache miss injects another clock cycle into the execution times of the instructions currently in the pipe.

Stalls in Stage #2 are due to data dependencies, as shown in FIG. 3-7.

Indirect addressing modes (such as CMA[P1] found in FIG. 3-7) are processed in Stage #2 of the pipe. Both instructions shown in FIG. 3-7 are single cycle instructions, and when add go,v0 is being executed in Stage #3 of the pipe, the data prefetch of CMA[P1] is being performed in Stage #2. And here is where the problem arises. The pointer being used in Stage #2 of the pipe is being updated at the same time in Stage #3 of the pipe. Therefore, it is necessary to stall the pipe for a single clock until the update of the pointer (in Stage #3) is finished before that pointer is used.

Stalls in Stage #3 are directly related to the IDR valid bits (VID). If an instruction such as vadd IDR[P1],v0 points to an IDR location which has not yet been filled, a Stage #3 stall will be induced in the pipe until the referenced IDR location is filled (and the VID bit indicates that the IDR location is valid). Stage #3 stalls, since they depend upon an external source, do not last a specified number of clocks, and it is possible for the Association Engine to stall indefinitely if the external data source does not provide the Association Engine with the amount of data expected (ICR specifies how much data the Association Engine expects in Run mode). It is for this reason that Stage #3 stalls are externally visible on the PSTAT pins (PSTAT[2:0]=000 indicates Stage #3 pipe stalls). This indication is also equally visible in the EXE encodings of the Microsequencer Status Register (MSR:EXE[2:0]=000 indicates Stage #3 pipe stalls).

(3.2.2) Stall Priority in the Instruction Pipeline

If more than one stall occurs at the same time, the Table 3.2 determines the order in which the stalls are resolved.

(3.3) Instruction and Data Memory

The CMA in each Association Engine is used to hold both program instructions and program data. For that reason, both the terms CMA and refer to the same physical RAM called the CMA. When the Association Engine accesses data in this memory, it is referred to as the CMA. When the Association Engine accesses instructions in this memory, it is referred to as the MMA. The major distinction is the special addressing performed for MMA accesses.

For the case of the Association Engine 0, Association Engine 1, Association Engine 3 and Association Engine 4 in FIG. 3-2, there are two columns of the CMA which are allocated to the program store (MMA). Depending on the application, there may be more of the CMA used for MMA storage. It is up to the programmer to trade off data and instruction space based on the requirements of the application.

(3.3.1) Instruction Caching

Each Association Engine contains 128 words of instruction cache for fast access of instructions. The instruction cache is organized as four 32-word, direct mapped cache lines (each instruction word is 16 bits wide).

To determine a Cache Hit or Cache Miss, the Instruction Tags (ICT0 thru ICT3) are compared against bits 8 thru 15 of the PC before the execution of each instruction. If it is determined that the PC does not match any of the tag registers, then a new line containing the next instruction (pointed to by the PC) must be loaded into the Instruction Cache.

Bits 7 and 6 of the PC determine which cache line the instructions will be loaded into. Since the Instruction Cache is Direct Mapped, these two bits explicitly determine the cache line to be loaded. If bits 7 and 6 of the PC are 00, Cache Line #0 will be loaded. Likewise, if bits 7 and 6 of the PC are 01, then Cache Line #1 will be loaded. The Cache Tag Register (ICT0 thru IC3) corresponding to the Cache Line being loaded will be loaded with the most significant byte of the PC. Also, the corresponding Cache Line Valid bit in the Instruction Cache Valid Register (ICVR) will be set.

The loading of a cache line from the CMA causes a 1 clock delay in the execution of instructions. Once the instruction cache has been loaded, there is no time penalty incurred by simultaneous access of both data and instructions out of the CMA) except for cache misses. If the application can fit entirely into the cache, the entire CMA can be used for data storage. The application must ensure that the cache does not miss.

(3.3.2) CMA and MMA mapping

The mapping between the CMA space and the MMA space has been simplified when compared to earlier specified versions of the Association Engine. Since there is only 4K bytes of physical memory, instruction and data access can see the entire 4K space. It is up to the programmer to allocate and manage each region (instruction or data) in the 4K space. FIG. 3-8 illustrates the first 70 bytes of the 4K space as viewed as instruction or data space.

(3.3.3) Direct and Inverted Access to the CMA

The CMA is equipped with a mechanism which allows both Direct Access and Inverted Access to the CMA. FIG. 3-9 proves a pictorial representation of Direct and Inverted CMA access. During Direct Access into the CMA, PE #0 uses data from CMA row #0, PE #1 uses data from CMA row #1, etc. During Inverted Access to the CoA, PE #0 uses data from CMA row #63, PE #1 uses data from CMA row #62, etc . . . ).

All accesses into the CMA use either Pointer Indirect Addressing (CA[Pn]) or Pointer Indirect Post Increment (CMA[Pn++])D. In both of these addressing modes, the pointer register, Pn, is used to specify a column in the CMA. Since there are 64 columns in the CMA, only 6 bits of the pointer register (bits 5 thru 0) are needed to directly access every column. During direct accesses to the CMA, bit 6 of the pointer register is 0. Inverted access to the CMA is accomplished by setting bit 6 to a value of 1. Bit 7 of the pointer registers is not used.

This mechanism has the advantage of allowing processing elements access to 128 bytes of data. It also allows vectors to be "flipped" in a single clock, making upward shifts reasonable. An upward shift can be accomplished by the following code segment:

| ; Vector to be flipped is in the 5th Column of the CMA (0-based) | |
|---|---|
| movi #$44, p0 | ; $44 is 64 + 4 (i.e. set bit 6 of p0 and access ; column 5 (0-based)) |
| vmov CMA[p0], V0 | ; move "flipped" column 4 into v0 |
| drotmov v0, v0 | ; downward shift v0 by 1 PE |
| vstore v0,CMA[p0] | ; flip v0 and place back into column 4 of CMA |

This mechanism is valid for all data accesses into the CMA (read AND write accesses) but has no effect on instruction accesses into the CMA.

(3.3.4) Allocating CMA Space

The CMA is a set of memory locations to be allocated as necessary by the programmer. This section shows a few examples of how the CMA space can be configured in order to provide maximum flexibility to the programmer.

Given the descriptions found in Section 2.3 and Section 2.4, the CMA can either appear as 1024 contiguous memory locations, or it can appear as 64 8-bit memory locations per processing element. Both of these views are correct, but neither is complete without looking at how the CMA is used by the Association Engine during the execution of instructions.

In the examples which follow, Example #1 will be the simplest, and will be the starting point of our discussion. From there, each successive example will become increasingly complex, and will rely upon information contained in the previous examples. It is therefore wise to study each example carefully before proceeding.

(3.3.4.1) Example #1: CMA used for Data Storage Only

The first example as shown in FIG. 3-10 is the simplest of all configurations. This example assumes that 1) all computational data is held in the CMA; 2) the entire program resides inside the Instruction Cache (and therefore the program does not occupy any of the CMA space); 3) the instructions push, pop, bsr, jsrri, and jsrmi are not being used and exceptions are turned off (therefore the CMA does not need to contain a stack area); and 4) neither jsrmi nor jmpmi are being used (so the CMA does not need to contain a Jump Table).

Notice that the initial program counter (EPPC) is set to $0000, which will cause the Association Engine to begin execution of the program from the IC (assuming that ICT0 thru ICT4=$00, ICVR=$0F and PBR=$00). The initial value of the stack pointer (EPSP) is "don't cared" because this example does not make use of the stack.

(3.3.4.2) Example #2: Instruction Cache, PC and CMA pages

The Instruction Cache (IC) is a direct mapped cache which uses the CMA as its primary memory store. The IC consists of 4 lines, each line being equivalent to a single column in the CMA. The columns of the CMA can be grouped together in groups of 4, and each group of 4 columns is called a page (as shown in FIG. 3-11). The first column in each page corresponds to Cache Line #0, the second with Cache Line #1, the third with Cache Line #2 and the fourth with Cache Line #3.

When a column from the CMA is loaded into a line of the IC, the page number of that column is placed into the cache line's associated Cache Tag Register (ICT0 thru ICT3). Also, the Cache Tag Valid bit (ICV0 thru ICV3) associated with that line is set in the ICVR.

As shown in FIG. 3-12, he Program Counter (PC) is logically divided into 3 parts: the most significant 8 bits of the PC reflect the page of the current instruction; bits 7 and 6 of the PC correspond to the line of the current instruction; and bits 5 through 0 of the PC correspond to the current instruction within that line.

When an Instruction prefetch occurs, the upper 8 bits of the PC are compared to the IC Tag of the line indicated by PC bits 7 and 6 (ICTO through ICT3). If the proper cache tag does not equal PC bit 15 through 8, or if the Cache Valid bit for the appropriate line is not set (ICV0 through ICV3 of ICVR), then there is a cache miss, and the CAL column which contains the current PC is loaded into the IC line indicated by PC bits 7 and 6, and PC bits 15 through 8 are placed into the cache line tag specified by PC bits 7 and 6.

(3.3.4.3) Example #3: CMA used for Program and Data

This example looks at the case where the program is just slightly larger than the Instruction Cache (IC). In this case, part of the program must be kept in the CMA, but the majority of the program can reside in the IC. All other assumptions of the previous examples (regarding instructions and exceptions) still apply to this example.

The intended interpretation of the FIG. 3-13 (with regards to the IC) is that:

1) The program contains between 129 and 160 instructions (which is the equivalent of 5 cache lines);

2) The Association Engine has only 4 cache lines, so some of the "spill over" from the program has to be stored in the CMA.

Because the Association Engine uses a direct-mapped cache, it is known in advance which columns from the CMA will be swapped in and out of the IC. In this example, columns 00 and 04 both need to use Cache Line #0, but Cache Line #1, #2 and #3 will never be overwritten (and can therefore be placed directly into the IC) so no space in the CMA needs to be reserved for them.

(3.3.4.4) Example #4: Program Shifted

As a twist to the previous example, the program is moved forward by 128 bytes. This means the program will originate at $80 instead of $00 (remember, in the Association Engine the program does not have to begin at location $0000). Therefore the initial value of the program counter (EPPC) will be $0080. This also has the effect of shifting the program over by two columns in the CMA.

It is important to note from FIG. 3-14 that the cache line which will be replaced is now Cache Line #2 (instead of replacing Cache Line #0 as was done in the previous example). This means that Cache Lines #0, #1, and #3 will never be replaced. The initial value of the stack pointer (EPSP) is still don't cared, since none of the instructions which the stack and no exceptions are yet enabled.

(3.3.4.5) Example #5: Adding a Jump Table to Example #4

For memory indirect instructions, such as jsrmi and jmpmi, a jump table must be built in the first 128 bytes of the CMA. In this example, the jump table consists of 8 indirect, 16-bit addresses and is illustrated in FIG. 3-15.

Since the information contained in the jump table is considered data and not instruction, each time a jsrmi or jmpmi instruction is executed, the indirect address will be taken from the CMA, not from the instruction cache (in order for a "hit" to occur in the instruction cache, the Microsequencer must be performing; an instruction access). The table can be updated dynamically. However, if the jsrmi or jmpmi instruction is used, it will take at least one line in the CMA.

(3.3.4.6) Example #6: Adding a CMA Stack to Example #4

Applications requiring more than one level of stacking must allocate stack space in the CMA. A single stack location is provided by the First Level Stack (FLS), but any more necessitates the use of the CMA. As can be seen at the top of FIG. 3-16, the initial value of the stack pointer (EPSP) is $003f. This means that when the Association Engine comes out of reset, the first available CMA stack location will be at $3f.

FIG. 3-16 is trying to represent the state of the CMA stack at a time during the execution of a program. Several entries have been pushed onto the CMA stack (represented by the dark-shaded area) and some of the stack entrees have not yet been used (the cross-hatched area).

(3.3.4.7) Example #7: Adding Vector and Scalar Storage to Example #4

In applications requiring more than the 16 bytes of Scalar Storage (G0–G7,P0–P7), or requiring more that the 8 bytes of Vector Storage (V0–V7), the CMA can be employed to provide temporary storage for both types of data. See FIG. 3-17.

Column 01 is used for Scalar Storage, and columns $3e and $3f are used for Vector Storage.

(3.3.4.8) Example #8: Bringing all the pieces together

As a final example, all of the requirements from the previous examples have been combined. Included are the Jump Table, a CMA stack, space for 128 bytes of vector storage (2 columns), 64 bytes of scalar storage, space for 2 columns of program code and 58 64-byte vectors. See FIG. 3-18.

(3.4) Association Engine Initialization

Prior to any operational data being input to the Association Engine, the major areas of the device must be initialized. After the $\overline{\text{RESET}}$ signal has been asserted and then negated, all internal registers of the Association Engine defaults to the state specified in Section 2.3 Association Engine Host Accessible Registers. The internal locations that need to be initialized by the host are the Coefficient Memory Array (CMA), the Microcode Memory Array (MMA), and any other control functions desired (if the Association Engine program contains less than 128 instructions, the ICache, tag registers and valid bits will need to be initialized instead of the MMA). Care has been taken to ensure that the reset state of the control registers provides a state that requires minimal set up prior to network processing. Internally, the Microcode instruction set provides the capability to have an initialization section along with a looping section. See Section 3.6.3 Association Engine Micro View of Instruction Flow for more details.

The minimal initialization requirements include the Microcode Memory Array, and some miscellaneous control registers to manage the stream transfers of the ports.

(3.5) Port Operation

There are four ports incorporated on the Association Engine to facilitate efficient and parallel transfer of information for both the controlling host and the other systems components such as the Association Engine'. The ports are labelled N, S, E, and W for North, South, East, and West respectively. The Association Engine is designed to work in concert by using the ports to connect multiple Association Engines together. The Association Engine is also designed to be scalable in one and two dimensional arrays. For the descriptions that follow assume that the Association Engine system is built in a two dimensional array.

All configuration, status, input, and output values are accessible by the host through these ports. The Association Engine is designed to operate in one of two modes. The mode is selected by the R/$\overline{\text{S}}$ input. This input determines whether the Association Engine is in Run mode (R/$\overline{\text{S}}$ at VDD) or Stop mode (R/$\overline{\text{S}}$ at GND). Depending on the mode of operation, the ports on the Association Engine behave differently. Refer to Section 4 Association Engine Bus Operation for specific timing information. Refer to Section 2.2 Association Engine Signal Description for a description of different signals on the Association Engine.

Run mode is used to allow the Association Engine micro program to execute. Stop mode (also referred to as Host mode) is used to allow external access to the Association Engine internal resources for initialization and debugging by the system host. The ports can be used in Run mode as the connecting bus for neural network layer-to-layer communications or for interlayer communications between Association Engine devices.

(3.5.1) Host Transfer Modes

In Stop mode, the Association Engine supports two different types of transfer modes. They are Random and Stream Access. Under Random Access mode the host supplies address and data information to perform reads and writes. Under Stream mode, data is supplied by the host and the Association Engine devices internally generate the addresses for the locations accessed. Refer to Section 4.1 Association Engine Port Timing for detailed timing of the Association Engine bus port operations.

In an array of Association Engines there are two signals that are used as chip selects. These signals ($\overline{\text{ROW}}$ and $\overline{\text{COL}}$) provide a mechanism for selecting a single device out of an array of Association Engines.

For Random Access operations the $\overline{\text{ROW}}$ and $\overline{\text{COL}}$ signals are used to select a single Association Engine to access. Address information is presented to the west and north ports. The address information flows in an easterly and southerly direction until it converges on the device that is selected (i.e. $\overline{\text{ROW}}$ and $\overline{\text{COL}}$ both asserted). Data, on the other hand, travels in a northerly (write operations) or a southerly (read operation) direction from the selected device. For devices that have either $\overline{\text{ROW}}$ or $\overline{\text{COL}}$ (but not both) addresses or data is transferred in the vertical or horizontal direction depending on the $\overline{\text{ROW}}$ and $\overline{\text{COL}}$ assertions.

For Stream operations (addresses are generated internally) the data flows to and from the south or east edges of the array (but not both). This streaming operation basically fills or drains a column or row from the array. By using the $\overline{\text{ROW}}$ and $\overline{\text{COL}}$ lines, sub-sections can be selected to operate only on a portion of the array.

For the following descriptions on the Association Engine access modes refer to FIG. 3-19 for an illustration of the Association Engine array configuration.

(3.5.1.1) Random Access Mode

The descriptions for the port modes of operation are described at the pins of the Association Engine and not from the view of the host.

The Random Access Mode is designed to allow access to individual registers in the Association Engine. To access a register using Random Access Mode, the host places an address (WD, ND), data (SD) and control signals (OP, $\overline{\text{NCI}}$, $\overline{\text{WCI}}$, R/$\overline{\text{W}}$, $\overline{\text{EN}}$) enabling Random Access Mode on the particular ports. The address and control signals are latched internally and decoded to select a given register. On the next clock cycle, the data that is accessed will be transferred. For a write cycle the data will be latched on the rising edge of the CLK signal. For a read the data will be driven out the pins on the falling dock cycle. Refer to Table 2.5 for a list of the registers that can be accessed with the Random Access Mode.

(3.5.1.2) Host Stream Access Mode

Stream Access Mode allows the host to transfer large amounts of data into a set of Association Engines arranged in a chain, without having to address the internal registers. Stream Access Mode could be used to initialize the Association Engine, or to save the state of the Association Engine. To access a region using Stream Access Mode, the host places activates the control signals $\overline{\text{ROW}}$, $\overline{\text{COL}}$, $\overline{\text{EN}}$, R/$\overline{\text{W}}$ and $\overline{\text{WCI}}$ and receives data out of ED for East Port Stream Reads; activates the control signals $\overline{\text{ROW}}$, $\overline{\text{COL}}$, $\overline{\text{EN}}$, R/$\overline{\text{W}}$ and $\overline{\text{NCI}}$ and receives data out of ED for South Port Stream Reads; activates the control signals $\overline{\text{ROW}}$, $\overline{\text{COL}}$, $\overline{\text{EN}}$, R/$\overline{\text{W}}$ and $\overline{\text{ECI}}$ and places data on ED for East Port Stream Writes; or activates the control signals $\overline{\text{ROW}}$, $\overline{\text{COL}}$, $\overline{\text{EN}}$, R/$\overline{\text{W}}$ and $\overline{\text{SCI}}$ and places data on SD for South Port Stream Writes. The control signals are latched internally and decoded to select a given region. On the next clock cycle, the data that is accessed will start transferring. For a write cycle the data will be latched on the rising edge of the CLK signal. For a read the data will be driven out the pins on the falling clock cycle.

For streaming operation the Host Stream Select register (HSSR) controls which region of the Association Engine is streamed to. In Stream Access Mode the internal address is generated for the user. This is done with the OAR1 and OAR2 registers. The duration of the transfer is controlled by the DCR1 and DCR2 registers. In addition for stream writes, the Host Stream Offset Register (HSOR) controls the offset into the data stream, or the "when" to start filling.

At the start of a stream fill operation HSOR is loaded into a counter which is decremented for each byte of data in the stream. When the counter reaches zero, the Association Engine begins copying data from the stream into its memory. This mechanism allows Association Engines to be loaded with different, overlapping, or identical data in one stream write operation.

In the stream read operation, HSOR is not used. Instead, the $\overline{\text{xCI}}$ and $\overline{\text{xCO}}$ pins are used to signal the next Association Engine in a row or column to begin sending data. A stream read begins by asserting the west or north most Association Engine's $\overline{\text{xCI}}$ signal causing those Association Engines to begin sending data either east or south. When an Association Engine is finished, the next Association Engine in line is signaled and, in turn, tacks data on to the end of the stream.

The primary motivation for including the OAR and DCR registers in this architecture is to allow the stream reading or writing of the coefficients of a single neuron (which could span multiple Association Engines). This mechanism could also be used to stream read or write all coefficients in a Association Engine that pertains to a single input. Depending on the logical space accessed (HSSR) the DCR2 and OAR2 registers may or may not be used. For one dimensional registers like the IDR or V0, only DCR1 and OAR1 are used. FIG. 3-20 shows how the DCR1 and the OAR1 registers work for a one dimensional vector register.

In one dimensional Stream Access Mode the value in the OAR1 register is used as a starting address (inside the Association Engine). An internal counter (starting value of zero) is incremented for every byte copied from or written to the stream. When the counter equals the value in the DCR1 register, the Association Engine transitions from the filling state to the full state.

With stream mode there will always have to be an Association Engine that is first one in the chain. The Association Engine that is first in line will usually have the $\overline{\text{xCI}}$ input tied active giving it the right to control the data on the bus. Another thing to consider in stream mode is the interface logic that decodes the host address to Association Engine address. The interface logic needs to be able to assert all the control lines to all the Association Engines that form a chain for a stream operation. Typically, from the host side, the streaming operation will access data through a single host address which controls the stream operation on the Association Engine side. Refer to FIG. 3-24 for more information.

For two dimensional stream operations (CMA) a second set of registers is used to control the streaming accesses. These two registers are the OAR2 and DCR2 control registers. These registers are just like the OAR1 and DCR1 registers in that they provide a starting address (inside the Association Engine) and a count value. There is a separate internal counter (just like that for DCR1) for DCR2. FIG. 3-21 details the operation of the four streaming registers and how they can be used to control access into the CMA.

(3.5.2) Association Engine Transfer Modes

In Run mode the Association Engine can perform write operation out any of the four ports. This is under the control of the write instructions. The destination of the write operation (depending on port switches and tap) will be the IDR register of the devices along the direction of the write. For example, if an Association Engine wrote out the north port, the devices that share the same column (above) could possibly receive the data. The type of transfer performed by the write instruction is just like that of the Host Stream Mode Access. Because the IDR is the destination of the operation a different set of control registers determine when and where the data is written into the IDR register. The IDR can be loaded by either Input Indexing or Input Tagging.

With Input Indexing, the input data captured is a series of contiguous input samples. With Input Tagging, the input stream contains an implied sample count (the count starts from 0 and increases for each input sample). In the tagging capturing mechanism, there is an internal tag associated with each location in the IDR. The basic difference between the two mechanisms is the condition in which the IDR address register is incremented. Refer to Section 3.5.2.1 Input Indexing and Section 3.5.2.3 Input Tagging for detailed descriptions of this capture mechanism. In comparison, the description that follows will describe the first capturing mechanism (Input Indexing) as it pertains to Stream Access Mode.

(3.5.2.1) Input Indexing

The baseline method for loading the IDR with data is the Input Indexing method. Using this method of filling, the IDR is loaded with consecutive bytes starting at some cycle count. The IOR register contains a cycle count which indicates when data should be loaded into the IDR from the data stream. The IPR and ILMR registers determine where in the IDR the input samples are to be placed. The ICR register determines how many samples are loaded into the IDR.

The IPR and ICR registers are shadowed 1) When they are loaded; 2) When a done instruction is executed; 3) When the IDRC addressing mode is used; and 4) When the $\overline{\text{RESET}}$ signal is toggled (1->0->1).

The IPR register is used as an index into the IDR to determine the location of the next data sample. The ILMR register is used to mask (or don't care) bit positions in the IPR. This provides the flexibility of duplicating bytes in the IDR. For example, if the IPR contains $00 and the ILMR contains $03 then the first byte loaded into the IDR would be placed into locations $00, $01, $02, and $03. The next byte would be placed into $04, $05, $06, and $07 and so on. The IPR would be incremented by 4 for every sample so that the IPR points to the next free spot in the IDR.

Two concepts which might help in understanding how the IPR and the ILMR are used: the concepts of Primary Addressing and Secondary Addressing. When generating an internal address for accessing the IDR during Input Indexing mode, the IPR is responsible for maintaining the Primary Address. This Primary Address points to a single location in the IDR. When the contents of the IPR is combined with the contents of the ILMR, a set of Secondary Addresses are created. In Example #2: (ILMR=$3) and Example #3: (ILMR=$4) which follow, there are two different levels of shading in the graphical representations. The darkest shade of gray represents that data which is placed into the IDR using the Primary Address (IPR only). The lighter shade of gray represents that data which is placed into the IDR using the Secondary Address (IPR & ILMR).

(3.5.2.2) Examples using the ILMR

The rules for using the ILMR to load the IDR during Run Mode are reiterated here again:

Bits of the ILMR act as "don't cares" on the internally generated address. This means that data is loaded into those IDR locations which are selected when the address is "don't cared". For instance, an ILMR value of 00110000 "don't cares" bits 4 and 5 of the IDR address, which means that the same data is sent to IDR locations 00000000, 00010000, 00100000 and 00110000.

The IPR is incremented in proportion to the location of the least significant "0" in the ILMR. That is, if the least significant 0 is in bit location 0, then the IPR will be incremented by 20, or 1, every time data is placed into the IDR. If the least significant 0 is in bit location 3, then the IPR will be incremented by 8 each time.

In the three examples which follow, the data which is streamed into the Association Engine is specified in FIG. 3-22. Each box represents a single datum of 8-bits.

Example #1: ILMR=0

If ILMR=$00 (which is the case out of reset) and IPR=0, (pointing to IDR[0]), then each new datum which is to be loaded into the IDR will be placed into the next possible IDR location. A tabular representation of this data flow is found in Table 3.3

Example #2: ILMR=$3

If LMR=$3 (00000011) and IPR=0, (pointing to IDR[0]), then the first datum to be loaded into the IDR will go into IDR[0], IDR[1], IDR[2], and IDR[3], and the IPR will be incremented by 22 (4) so that the new IPR location is IDR[4]. The second datum to be loaded into the IDR will be loaded into IDR[4], IDR[5], IDR[6] and IDR[7], and again the IPR is incremented by 4. The IDR is completely loaded once 16 datums have been received. In Table 3.4, the Primary Address is represented with a dark shading, and the Secondary Address is represented with a light shading. A tabular representation of this data flow is found in Table 3.4

Example #3: ILMR=$4

If ILMR=$4 (00000100) and IPR=0, then the first datum to be loaded into the IDR will go to IDR[0] and IDR[4] and the IPR is incremented by 20 to location IDR[1]. The second datum to be loaded into the IDR will be loaded into IDR[1], IDR[5] and the IPR is incremented to location IDR[2]. In Table 3.5 the Primary Address is represented with a dark shading, and the Secondary Address is represented with a light shading. A tabular representation of this data flow is found in Table 3.5.

In Table 3.5, assume that the IPR starts at $00, and increments by 1 each time a new datum is placed into the IDR. (this data is represented by the heavily shaded entries in Table 3.5). The ILMR acts as an "address mask" to the IDR, and in this example, the value in the ILMR is $4, which causes bit 2 (counting from bit 0) to be "don't cared". This "don't caring" of the IDR address causes the lightly shaded data values to also be placed into the IDR.

The strange transition of data insertion between t3 and t4, and also between t7 and t8 is directly due to this don't caring. At both time t0 and t4, the effective IDR address is 00000x00 (combining an IPR value of 00000000 with an ILMR value of 00000100), so locations 00000000 and 00000100 are both written with the same data (10). Likewise, at time t1 and t5, the effective IDR address is 00000x01, so locations 00000001 and 00000101 are both written with the same data (23).

(3.5.2.3) Input Tagging

To provide additional flexibility, an Input Tag capture mechanism is provided. This mechanism is an alternative to Input Indexing for operations which load the IDR. This mechanism of capture is enabled by the Filling Mode (FM) bit in the Port Control Register (PCR). This capturing mechanism is used for loading the IDR for compute operations that require special neural network connections.

This capture mechanism allows the Association Engine to selectively grab input samples in randomly increasing order from the input stream. To access the IDR with this mechanism, the host first loads the ITR register with the tags that are to be used, then the host sets the value of the FM bit in the PCR to enable the ITR for IDR filling. The host places data and control information on one of the ports sending data to a chain of Association Engines. The control signals are latched internally and decoded. As data passes by the Association Engine, an internal counter is incremented. When the value of the count matches the current input tag value and the $\overline{xCI}$ input is active, the input sample is loaded into the IDR. This process continues until all input samples loaded into the IDR or the ICR count is reached or a tag value that is not in an ascending value is reached.

An example of using the Input Tagging capture mechanism is given in FIG. 3-23. This example shows a total Input Frame of 6 samples (some of which are not used) and an output layer of three neurons (of which not all connections are used). In this example only the CMA and ITR and IDR registers are shown for clarity. To implement this, the Input Tagging mechanism is used to load only those input samples which are required (note the values in the ITR as the count value of the input samples to capture). To ensure that the output neurons only use the coefficients that are required, the CMA holds a bit packed mask that is used to load into the Vector Engine Processing Mask bit (VT). This is used to load the VT bit to indicate which coefficients participate in the propagation function in the Vector Engine. The vlshftt microcode instruction is used to extract the bit packed mask bits and to shift them into the VT bit.

The input tag capture mechanism along with the Vector Engine Processing Mask bit (VT), provides a powerful way of implementing a neural network that is not fully connected or a paradigm that employs the concept of receptive fields.

(3.5.3) Host Memory Map for the Association Engine

In order for the host to access an internal location in the Association Engine, there must be some form of interface circuitry to decode the host bus signals and translate them into the appropriate control signals for the Association Engine. Although the interface logic is dependent on the particular host, the memory map for the host can be somewhat generic. In FIG. 3-24, one possible memory map is given.

FIG. 3-24 details the memory map for the bus detailed in FIG. 3-19. In this example there are four Association Engine devices. In FIG. 3-24, there are four 8 kilobyte regions, one for each of the random maps of the Association Engines. Beneath this 32 kilobyte region are the streaming locations. From the host side, stream operations look like transferring data to a single location.

The interface designer has the option of mapping the stream location to any address range that is desired. This allows a trade-off between interface logic and host address space to be made.

(3.6) Association Engine Operation

The Association Engine is essentially an 8-bit parallel processing array. It takes in an 8-bit input sample and operates on that input in parallel. Depending on the microcode written into the MMA, a variety of things can occur. This section will describe the macro and micro operations that occur after valid input data is deposited into the IDR. To facilitate this discussion, the block diagram of the Association Engine internal structure is given in FIG. 3-25. This block diagram shows that the CMA is accessed by the Vector Engines and can have parallel access to locations in the IDR register.

(3.6.1) Association Engine Macro View

The Association Engine can be in one of four states. These states are idle, input, execute, and output. Refer to FIG. 3-26 for the transition flow. The input state function has already been discussed in Section 3.5 Port Operation. For this discussion, assume that the input and execution states are distinct (there is a configuration for the Association Engine that allows the simultaneous inputting of data and the execution of the Vector Engine. This will be discussed in more detail later). After all the input samples are loaded into the IDR the Association Engine transitions to the execute state.

In the execute state, the Association Engine will operate on the input data and the coefficient data through a microcode routine. There may be as many different microcode routines as the user wants (until the MMA is filled up). The looping structure that is provided by the Scalar Engine allows the Association a Engine to perform microcode execution a fixed number of times based on the configuration of the system and the paradigm being implemented. The selection of which routine is executed is based on whether the Association Engine is in a feedforward or backward flow of information (this is discussed later in detail).

At the end of the loop, the Association Engine can enter the output state. At this point the Association Engine may start to transfer data on a port to the Association Engine'. The output state is generated when the Association Engine becomes a bus master by the execution of the write microcode instruction. So, strictly speaking, the output state is a subset of the execute state. It is illustrated here for the discussion of transferring data between Association Engine devices. After all the data has been transferred, the Association Engine enters the idle state. At this time the host may be signaled by an interrupt to indicate that the Association Engine (sub-system) is ready for another input vector. The host then accesses the Association Engine status registers to clear the status that the Association Engine has completed the output phase. The host supplies the next input vector and the process is repeated.

Depending on the microcode in the Association Engine', the Association Engine may enter the input/execute states from a Association Engine' command. This situation occurs when the Association Engine' has determined that a neuron's (or all neurons') coefficients require adjustment to facilitate learning. While the Association Engine is in the idle state, the Association Engine' sends a command to the Association Engine across a port to indicate some action. This action may be adjusting a neuron's coefficients, or adding a new neuron to the system. This command function can be accomplished in several ways. The Association Engine' can send a semaphore back to the Association Engine indicating what action is to be performed.

In the case where the Association Engine' transfers data back to the Association Engine there will be a transition to the input state and then to the execute state. The data sent back can be of two forms. First, it can be a vector's worth of data (like an error vector for back-propagation). Secondly, it could be a semaphore which would instruct the Association Engine to execute a certain routine. So a transition from the idle state to either the input or execute states is possible. At this point, one of the microcode routines (not the feedforward) is executed to perform some learning algorithm on the neuron coefficients.

(3.6.2) Detailed Description of Host and Association Engine interactions

In this section a description of the flow of actions between the host, Association Engine, and Association Engine' is given. This description will show several scenarios that describe host and Association Engine interactions only, and a situation where the Association Engine' participates.

There are two basic methods of inputting data to the Association Engine from the host. The first is fill-then-compute, and the other is compute-while-filling. The two filling methods are quite similar in the actions that the host performs, but differ in the order that they are performed. This methodology allows the user to determine the amount of parallelism between loading the IDR and the microcode computations.

(3.6.2.1) Input Valid Bits

The IDR register contains input data that the Vector Engine uses in the propagation function. Each register location in the IDR contains a valid bit.

These valid bits are set when the IDR location is written to. These valid bits can be cleared by one of three different mechanisms: 1) the $\overline{\text{RESET}}$ signal;; 2) the clearv instruction; and 3) the restart instruction. In Run mode, the Association Engine starts executing instructions. When an IDR location is referenced that is not valid the Vector Engine waits for valid input data. When it sees valid input data the Vector Engine performs the operations that are contained in the MMA. The Vector Engine uses the P[0]–P[7] registers to select the current input sample that is used. The P[0]–P[7] pointer also selects the valid bit so the Vector Engine can determine if the input sample is valid. It is the IDR valid bits that form the logic which controls the operation of the Vector Engine's action for valid data. FIG. 3-27 shows logically how IDR valid bits are built. The IDR valid bits are physically located in the Vector Process Control Register (VPCR) of each of the Processing Elements.

As was stated previously the P registers are used to select a single IDR location for the operation. The IDR register can also be used as a vector source. In this case a more complex rule is used to determine when the IDR register is valid. Instead of just looking at a single valid bit all the valid bits are used. To determine if the IDR register is valid a check is made between the valid bit and the associated PE VT-bit that corresponds to the IDR location. If the VT-bit is cleared (an inactive PE) then the state of the valid bit is a don't care. If on the other hand the VT-bit is set (an active PE) then the state of the valid bit is used to determine the validity of the IDR register. The Association Engine will wait until all valid locations (A set VT-bit and a set valid bit) are true before the operation is allowed to proceed.

In the following descriptions the number associated with each box in the flow diagram corresponds with the state number in FIG. 3-26. In the following flow diagrams, only the pertinent actions are described. It is assumed that the host, Association Engine and Association Engine' are all initialized to the desired state so only the relevant information is described in the flow diagrams. In the following diagrams refer to the bus interconnect structure given in FIG. 2-6

(3.6.2.2) Fill Then Compute

In this scenario, the host fills the IDR and then instructs the Vector Engine to perform the propagation function. The basic flow for a stand alone Association Engine system is shown in FIG. 3-28.

In this flow, the Association Engine starts in the reset state. The next step is performed by the host. The host then loads up the IDR register with data (remember that the location written to by the host will automatically set the valid bit for that location). The host then loads the last IDR location releasing the Association Engine microcode (remember that the Association Engine waits for valid data). The first move instruction in the Association Engine is used to hold off the Association Engine until the entire IDR is loaded. At this point the Association Engine starts computing data loaded into the IDR. At the end of the computation there is a done/clearv instruction. At this point, the Association Engine clears the valid bits and waits for the host. The host could use either a polling routine or an interrupt routine for the notification that the Association Engine is finished. At this point the host then writes the IDR with new input data and the flow continues as before.

If the application requires that the Association Engine operate on the input data multiple times (searching a window in the input vector) then the clearv instruction would be removed.

(3.6.2.3) Compute While Filling

In this scenario, the parallelism between the host and Association Engine is much greater than that in the fill-then-compute scenario. The basic flow for a stand alone Association Engine system is given in FIG. 3-29.

In this flow the Association Engine starts in the reset state. Since the IDR contains invalid data (the valid bits were cleared on reset and have not been loaded by the host yet), the Vector Engine is waiting for data. At this point, the host starts loading data into the IDR. Once the host has started loading the data into the IDR, the Vector Engine can start computing the propagation function. So, unlike the previous flows where the input and execute states were very distinct, this flow (compute-while-filling) causes the input and execute states overlap considerably. At the end of the computation, a done/clearv instruction is executed (which will clear the IDR valid bits). At this point the Association Engine waits for the host. The host could use either a polling routine or an interrupt routine for the notification that the Association Engine is finished.

(3.6.2.4) Association Engine Interaction With The Association Engine'

In this scenario a discussion of the Association Engine and Association Engine' interaction will be given. Recall that the Association Engine' is used to aggregate the partial synapse results from several Association Engines and to perform the output function on the resultant totals. This requires that the Association Engine "send" the output to the Association Engine' under some program control. Additionally the Association Engine' can send information back to the Association Engine (like adjusting a shelf coefficients or all the coefficients). The basic flow is given in FIG. 3-30.

In this flow the Association Engine starts in the reset state. Since the IDR contains invalid data (the valid bits were cleared on reset and have not been loaded by the host yet), the Vector Engine waits for data. At this point, the host starts loading data into the IDR. Once the host has started loading the data into the IDR, the Vector Engine can start computing the propagation function. At the end of the feedforward compute phase, a write instruction is executed in the Association Engine. This instruction sends the value in the V[0] register to the Association Engine'. In the Association Engine' there is a reference to the IDR. This reference causes the Association Engine' to wait until valid data is present in the IDR.

In the Association Engine', at the end of the routine, a write G0 is issued to communicate back to the Association Engine, that some action is to be performed. In the Association Engine the instruction loop waits for the Association Engine'. At that time, another routine could be selected that starts executing in the Association Engine. This routine could potentially adjust one or all of the coefficients in the Association Engine. Also, recall that the Association Engine' to Association Engine transfer is a broadcast type so all the Association, Engines receive what is transferred by the Association Engine'. At the end of this computation there is a done/clearv instructions. At this point the Association Engine clears the valid bits and waits for the host. The host could use either a polling routine or an interrupt routine for the notification that the Association Engine is finished.

(3.6.3) Association Engine Micro View of Instruction Flow

During the execution state of the Association Engine the Scalar Engine is issuing instructions to the Vector Engine. These instructions (see Section 2.5 Association Engine Microcode Instruction Set Summary) allow many different propagation and aggregation algorithms to be constructed. There is also the flexibility to perform fuzzification for fuzzy logic applications. This section will also describe the micro operation of the Scalar Engine.

The flow of the Scalar Engine microcode instructions can be graphically represented by FIG. 3-31. In FIG. 3-31, the halt, done, and dskip instructions have been illustrated.

In the Microsequencer there is a microcode program counter PC Out of reset, the value of the PC is loaded with the address contained in the EPPC register. The SP register is loaded with the address contained in the EPSP register. After the SP register is loaded, the first instruction is fetched. When the Association Engine starts microcode execution (when the indicated IDR location is empty and input starts being loaded), the microcode instructions in the MMA are accessed and executed. If the routine requests input data that has not arrived (an IDR location that has not yet been marked valid), the Microsequencer is stalled until valid data is placed into the IDR. Near the end of the feedforward routine, there is a dskip instruction which closes the loop. At the execution of the dskip instruction, the PC register is loaded with the PC value contained in the dskip instruction and the selected G register is decremented by one. This flow is continued until the G register is decremented to zero. At this time the Association Engine can exit (by using the done instruction) the execution state and enter the output state as previously described.

The selection of other Microcode routines, loaded in the MMA, is determined by possible commands sent back from Association Engine'. At the end of the feedforward computation and transfer of Partial Synapse Results to the Association Engine', the Association Engine' can indicate what action the Association Engine should take. In the Association Engine/Association Engine' command structure, the Association Engine' can indicate which routine to execute. The flow of these routines is identical to that of the feedforward routine. At the end of the routine, the Association Engine is ready to start another feedforward cycle.

(3.6.4) Association Engine Exception Model

There are several types of exceptions that can occur in the Association Engine. Some of them have to do with scalar instructions and some have to do with vector instructions. Others deal with the interactions of multiple Association Engines. This section will describe the different possible exceptions and how the Association Engine responds.

The Association Engine will respond to exceptions on instruction boundaries only. An exception to this rule is the Port Error Exceptions, in which the instruction (most likely a write type), is terminated as soon as the exception is detected.

Upon the detection of an exception, the Association Engine will perform three tasks. First, with the exception of the Reset exception, the Association Engine will place the current PC on the stack. The value of the PC will be the address of the next executable instruction. The Association Engine will then acquire the exception vector from the vector table located in the Exception Pointer Table (please see Section 2.3.44). Finally the Association Engine will initiate exception processing in the corresponding exception handler.

(3.6.4.1) Reset Exception

Reset exception processing will occur when two events are detected. The $\overline{\text{RESET}}$ line must be seen asserted and then negated and the R/$\overline{\text{S}}$ line must be in the Run mode. After these two events have occurred the Association Engine will start Reset exception processing. The Association Engine first marks the FLS register as empty indicating that there is no stored stack pointer values. Then the Association Engine will fetch the initial PC and the SP values from the EPPC and EPSP respectively, and will start execution at the first instruction accessed by the PC.

(3.6.4.2) Scalar Exceptions

There are two possible scalar exceptions: 1) scalar divide-by-zero and 2)arithmetic overflow. Both types of scalar exceptions can be masked by using the SDEM and SVEM bits in the EMR (Exception Mask Register).That is, exception processing can be enabled or disabled. For scalar exceptions, the FLS register is not used (even if it is empty). Upon detection the PC value is placed on the stack and the appropriate exception vector is fetched and the exception handler is executed. Upon completion of the exception routine and rte instruction will return the Association Engine to the normal instruction stream.

(3.6.4.3) Vector Exceptions

There two possible vector exceptions are 1) vector divide-by-zero and 2)arithmetic overflow. Both types of vector exceptions can be masked by using the VDEM and VVEM bits in the EMR (Exception Mask Register). That is, exception processing can be enabled or disabled. The vector exceptions are a little different from the scalar exceptions in that any one of the PE can cause the exceptions. It is the responsibility of the exception handler to determine the PE (or PEs) that caused the exception. For vector exceptions, the FLS register is not used (even if it is empty). Upon detection the PC value is placed on the stack and the appropriate exception vector is fetched and the exception handler is executed. Upon completion of the exception routine and rte instruction will return the Association Engine to the normal instruction stream.

(3.6.4.4) Port Error Exceptions

Port error exceptions can occur due to an instruction or a tap and switch configuration. There are four types of port error exceptions. These are IDR Contention, Port Collision, Port Interleave and Switch Exceptions. For all accesses the port error exception handler is called. It is up the exception handler to determine if the port error was due to one of the above four exceptions. By interrogating the APMR and PCR registers, the handler can determine the type of exception.

Interleave and Collision exceptions are a result of an internal write instruction with external data movement. Thus the PC value placed on the stack will point to the next executable instruction. For the case of contention, the Association Engine may or may not be executing instructions. It may be sitting at a done or halt instruction. Remember that the contention is a result of simultaneous writes into the Association Engine in Run mode. So the PC value may or may not be valid. Regardless of the state of the Association Engine on a contention exception the exception handler is called. Upon and rte instruction the previous state is restored (i.e. waiting on done or halt).

(3.6.4.5) Interpreting Multiple Port Error Exceptions

Table 3.6 shows all possible singular port error exceptions. If any other combination of bits exist in the PCR and APMR, it is due to multiple port error exceptions. In the following discussion, five examples of multiple port error exceptions are described.

When multiple port errors are present, the PCR should be used in conjunction with the APMR to determine the cause of errors. Port errors generate an internal exception state, which causes the PC and SP values to be pushed onto the stack, and the Port Exception Vector to be fetched the EPPE register. Port exceptions can occur only during Run Mode operation.

It is important to note that the PCR is a control register (reflecting the current tap and switch settings) and the APMR is a status register (reflecting the current data movement through the Association Engine). Using the APMR by itself is not sufficient to determine the cause of the Port Exception.

Another way to view Table 3.6 is to show which bits in the APMR are cared by the bits in the PCR. This list is incomplete, because Port Collision Exceptions are not dependent upon the bit settings of the PCR. Table 3.7 provides more information about the APMR.

Example #1: N-W IDR Contention

The first example involves a single error condition. As can be seen from the PCR settings in Table 3.8, the tap bits for the North and West ports are closed (the connection is made), and data is being written in simultaneously on both the A, North and West ports. This causes a contention for the IDR resource (they're both trying to write to the IDR at the same time), and the Association Engine enters the exception state. FIG. 3-32 illustrates the movement of data in Example #1.

Example #2: N-W IDR Contention/E Port Interleave

This example involves two different error conditions and is illustrated in FIG. 3-33. Table 3.9 illustrates the bits active in Example #2. As before the North and West tap bits are set, and the East-West Switch is set. An external write into both the North and West ports causes a N-W IDR Contention Exception. Since the E-W switch is closed, a simultaneous external write into the West port with a microcode initiated write to the East port causes an E Port Interleave Exception.

Example #3: N-W IDR Contention/E Switch Collision

In this example (see FIG. 3-34 and Table 3.10), the North and West tap bits are set, and the East-West Switch is set. Data is simultaneously written into the West, North and East Ports. As in the examples before, a simultaneous write to the North and West Ports, when the North and West taps bits are set, causes an IDR Contention Exception. Since the East-West Switch is closed, the simultaneous write into the East and West Ports causes an East-West Switch Contention.

Example #4: E Port Interleave/E Port Collision/E-W Switch Contention

In this example (see FIG. 3-35 and Table 3.11), the East-West Switch is set. External data is coming into the East and West Ports simultaneously with a microcode initiated write of data out of the East Port. Since the switch is closed, an external West Port write combined with an internal East Port write causes an East Port Interleave Exception. An internal East Port Write combined with an external East Port write generates an East Port Collision exception. And finally, with the East-West Switch dosed, the (external) East and West Port writes cause a East-West Switch Contention Exception.

Example #5: N-W IDR Contention/E Port Interleave/E Port Collision/E-W Switch Contention In this final example (see FIG. 3-36 and Table 3.12), the East-west Switch is set, as are the North and West tap bits. Data is being written out of the East port due to an internal generated write. A the same time, data is being written into the North, East and West ports. Since the switch is closed, the internal East Port write with the external West port write causes an Interleave Exception. The internal East Port write with the external East Port write causes the East Port Collision. The simultaneous external East and West Port with the East-West Switch set causes an East-West Switch Collision Exception. And the simultaneous external North and West Port writes, with the North and West taps bits set, causes the N-W IDR Collision Exception.

(3.6.5) Microcode Program Structure

In this section, the structure of several Microcode program segments will be given. The first routine will show initialization of internal registers and then show the transition into the looping section to calculate the synaptic function for all the neurons and synapses in the Association Engine block. The second routine will show an example of internal looping capability that is provided by the Association Engine. The third segment shows and describes the mechanism of semaphore passing between two Association Engines. The fourth routine segment shows and describes the mechanism of conditional execution in the Vector Engines. The final example is a code segment describing how reduced floating point routines can be constructed.

(3.6.5.1) Initialization and Looping

The first routine example is a simple sum of products function for the inputs loaded into the IDR and the coefficients loaded in the CMA array. Refer to FIG. 3-37. When the routine starts, instructions are used to initialize the PW[0] and P[1] pointers and to load the G[0] register. Note that these instruction are only executed once. This is because the repeat instruction initializes the loop with the loop start PC, end PC and count values (RBR, RER, and RCR values). This mechanism provides for an initialization section and a looping section in the microcode routine.

The loop contains the instructions used to perform a sum of products function. The first instruction moves the currently selected coefficient out of the CMA into the V0 register. Next, a multiply of the current input value with the V0 value is performed (remember that the P pointer selects which values to use and the ++ notation causes the contents of the pointer registers to be incremented at the end of the instruction). The next instruction adds the least significant byte of the product (in V1) to the V3 register. The next instruction adds the most significant byte in register V0 to the V2 register with the carry from the previous add. At the end of the last add instruction the PC equals the contents of the RER register. Upon this condition the RCR register is decremented and tested for zero if a non-zero value is a result the RBR register contents is transferred to the PC and the loop continues. At the end the RCR counter is zero and the execution falls through to the done instruction. At this time the Association Engine transitions from the execution state to the output state.

(3.6.5.2) Multiple Loops

The second routine shows an instruction segment that illustrates the internal looping capability given by the G registers. FIG. 3-38 shows a program that illustrates a double looping code segment. At the beginning of the code segment, a generic opcode is executed (just to pad the example). At the point the outer loop is to be executed, a new loop count is loaded into the G0 register. The inner loop is executed until the G1 counter reaches zero. At that time, the internal registers (RBR, RER, and RCR) are used to determine when the inner loop terminates. The loop continues with the outer loop dskip instruction until the outer loop count reaches zero and the done instruction is executed. The dskip instruction decrements the selected G register and then tests for a zero value in the G register. This style can be used to form multiple loops. Remember that the repeat instruction can only be one level (because there is only one copy of the RBR, RER, and RCR registers).

(3.6.5.3) Semaphore passing between two Association Engines

This section will provide a code segment that illustrates the use of semaphores between two (or more) Association Engines. The basic mechanism is to use the valid bits in the IDR to hold off instruction execution until the correct time. In this case the data that is passed is the address of another routine to execute. At the point an Association Engine needs a semaphore from another device the code that is to executed should clear the valid bits in the IDR register. Then the microcode accesses the IDR location that will be written. When another Association Engine performs a write microcode instruction to the IDR register the waiting Association Engine takes some form of action. FIG. 3-39 describes one such routine segment.

(3.6.5.4) Conditional Execution

The basic idea behind the conditional instructions is to clear (or set) the processing mask bit VT. It is this bit that controls the operation of microcode instructions in the processing elements (PE). In the example that follows four of the eight vector registers are tested and based on these tests certain processing elements execute instructions while others do not. The state information in Table 3.13 refers to the state numbers in FIG. 2-75. In this example assume that all PEs start out with VT=1 and VH=0. The first two opcodes (opcode 1 and opcode 2) are executed by all PEs. The vifeq V0,V4 instruction causes the VT bits to be cleared in PE2, PE3 and PE4. This causes opcode 3 to be executed only in PE1. The next velse instruction allows opcode 4 to be executed by PE2, PE3 and PE4. The vifeq V1,V4 causes PE2 VT bit to remain set while clearing PE3 and PE4 VT bits. Remember that PE1 has fallen out of the possible PE list that execute instructions. This action causes opcode 5 to be executed in PE2. The following velse instruction allows PE3 and PE4 to execute opcode 6. The vifeq V2,V4 instruction sets the VT bit in PE3 and clears the VT bit in PE4. This allows opcode 7 to be executed only in PE3. The velse instruction allows PE4 to execute the opcode 8 instruction. Finally the vendif instruction resets all the PEs back to their pre-vif state so PE1, PE2, PE3 and PE4 execute opcode 9. This is the basic, mechanism for performing vif-velse-vif-velse-vendif type of structures. Table 3.14 provides the contents of the processing element registers.

(3.7) Microcode Initiated Port Write Operations

When the Association Engine is in Run mode there are four identical ports that can facilitate efficient and parallel transfer of information for both the controlling host and the other systems components such as the Association Engine'. The Association Engine is designed to work in concert by using the ports to connect multiple Association Engines together. No external logic is required to connect multiple Association Engines together. Refer to Section 3.8 Association Engine Bus Configurations for some examples.

The port is designed to provide a simple mechanism for the Association Engines to transfer Partial Synapse Results to the Association Engine' for totalling. This transfer is inherently stream like and the amount of data is controllable by the Association Engine programmer. Recall that in Run mode all transfers are similar stream transfers from the host. The amount of data that is transferred is controlled by either the instruction (scalar write transfer on byte) or by the contents of a scalar register (vector writes start at PE(0) and end with PE(Pn) for example).

The direction of data transfer is always a write operation and is controlled by the write microcode instruction. The flow of information on the E/W bus goes as follows. When the Scalar Engine exits the computation state each device wants to send data to the Association Engine 4' device. For Association Engine 0 the write instruction is executed unconditionally. The Association Engine 1 device on the other hand needs to wait for Association Engine 0 (and so does Association Engine 2 and Association Engine 3). This mechanism allows coordination of data movement between several Association Engines on a row with an Association Engine' device. This monitoring mechanism is very similar to the semaphore passing example mentioned in Section 3.6.5.3 Semaphore passing between two Association Engines. It should be noted that data passing is not limited to east west transferred. While in Run mode data can be transferred in any of the four directions.

For systems that have unused neurons (a partially used Association Engine) the user is required to manage the values in the un-used location in order for them not to conflict with the normal operation of the neural network.

When the last Association Engine in a chain is finished transferring data the Association Engine' (which must know how many supporting Association Engines there are) the output phase of the Association Engines is complete. At this time the Association Engine' can indicate any action to be taken. The Association Engine/Association Engine' system should have a communication protocol that allows the Association Engine' to transfer command and data information back to the Association Engine if necessary.

(3.8) Association Engine Bus Configurations

This section will describe the idea behind the bus port switch and tap structure that allows the Association Engine to be used in many different bus configurations. This section will also describe various bus configurations that are possible with the Association Engine port capabilities.

(3.8.1) Association Engine Port Switches and-Taps

The Association Engine contains a flexible port switch and tap mechanism that allows data presented at one port to be passed along to another port (with a one clock cycle delay). The port switches are controlled by the NSS and EWS bits in the Association Engine Port Control Register (PCR). The tap bits are also controlled in this register. The tap control function allows data being presented on a port to be loaded into the IDR register in the chip. This allows the Association Engine the ability of just passing data along or passing data along while snooping or capturing it. It should be noted that the Run mode loading mechanisms are used to load the IDR. Refer to Section 2.3.6 Port Control Register (PCR) for more information. FIG. 3-40 shows a symbolic representation of this functionality.

(3.8.2) Bus Port Collisions and Errors

There are three general types of situations cases that can occur. Some of these situations are considered fatal and will cause the Scalar and Vector Engines to execute exception processing. Refer to Section 2.3.7 Association Engine Port Monitor Register (APMR) for the status that indicates this situations and Section 3.6.4.4 Port Error Exceptions for a more detailed description of exception processing with regards to port errors.

(3.8.2.1) Association Engine Collision Condition

Collisions occur when an external operation (that is writing into an Association Engine) collides with an internal write operation. Due to the timing of the control lines ( $\overline{xCI}$ and $\overline{xCO}$) there is sufficient time to detect the condition before any electrical damage can occur.

(3.8.2.2) Association Engine Contention Condition

Contention occur due to the settings of switch and taps inside a particular Association Engine. Contentions occur when two external accesses are performed to an Association Engine. Recall in Run mode the destination of all operations is the IDR so, two external write operations contend for the IDR.

(3.8.2.3) Association Engine Interleave

The interleave conditions is one in which data that is in transit (across a closed switch) gets interleaved with data coming from a write instruction. This situation occurs when multiple Association Engines get out of synchronization with respect to data transfers.

(3.8.2.4) Association Engine Switch Contention

The Switch Contention occurs when opposing ports are written to simultaneously with the connecting switch closed.

(3.8.3) Association Engine Ring Configuration

In this ring configuration, two ports are used to connect the Association Engines in a ring configuration. This is detailed in FIG. 3-41.

In the ring configuration the port switches can be used to isolate different sections of the ring to increase system parallelism. Recall the switch and tap control can be altered both by the host and by the microcode program. The ring configuration provides the capability of reconfigurability. In the ring structure, the microcode and the host can be constructed in a way as to allow the network to change with time. This dynamic reconfigurability is the main feature of this structure. Data to the ring could possibly be supplied by the north or south ports.

In FIG. 3-42 one possible ring configuration is presented. In this example there are 6 Association Engine devices connected in a feedforward network. Association Engine 0 through Association Engine 2 for the first layer and Association Engine 3 through Association Engine 5 for the second layer. As may be seen from this example there is the possibility of considerable parallelism for the computation and transfer of data. For the computation and aggregation phase of the process, the first layer can be processing the input samples for time n+1 while the second layer (Association Engine 3 through Association Engine 5) is computing the results for time n. Similarly, for the transfer of data, Association Engine 5 can be outputting the results from time n while Association Engine 2 is transferring data for time n+1 and the host inputting a new input frame for time n+2. In the example shown in FIG. 3-42, the switch and tap settings allow for the partitioning of layers and the tap setting to show how data flows in the switches (or which device is receiving data).

(3.8.4) Two Dimensional Association Engine Configuration

The Association Engine was designed for two dimensional interconnections. With four ports the interconnection of an Association Engine to its neighbors is analogous to the ring structure described previously. This provide both row and column reconfigurability depending on the application presented to the array. FIG. 3-43 illustrated a small two dimensional array of Association Engines.

Association Engine Bus Operation (Section 4)

This section describes the timing relationships of the Association Engine North, East, South and West Ports and is divided into three parts. The first part deals with timing particular to the Association Engine Host Accesses: (i.e. Random Access Timing and Stream Access Timing). The second part of this section deals with timing particular to the Association Engine as a master device in response to the write instructions. (Recall that the destination of these writes is always the IDR register of the receiving device). The third part deals with miscellaneous timing, such as done (and $\overline{BUSY}$), R/$\overline{S}$, $\overline{INTR}$, $\overline{RESET}$, and 1149.1 Test Port Timing. Table 4.1 provides a timing diagram quick reference.

(4.1) Association Engine Port Timing

The Association Engine ports constitute the principle interface between the host and the Association Engine subsystem. It is across these ports that all initialization information and data is passed. The Association Engine ports are fully synchronous, and use the CLK signal to clock transfers between the Association Engine and the host system. The behavior of the Ports is dependent on the R/$\overline{S}$ control line. It is this line that determines the type of accesses (Host or Association Engine Master) the Association Engine performs. When R/$\overline{S}$ is at a logic 1, the Association Engine is in Run mode; when the R/$\overline{S}$ signal is a logic 0 the Association Engine is in the Stop mode. Run mode is for Association Engine microprogram execution while Stop mode is for host accesses. Each Association Engine port is 8-bits wide which supports Random Access and Stream Access modes of operation. For certain operations, multiple ports participate in the access into/out of the Association Engine.

The general relationship between the port signals and the CLK signal is that all input and bidirectional input signals to the port are latched internally on the rising edge of the CLK signal. Conversely all outputs and bi-directional outputs are enabled on the falling edge of the CLK signal.

The transfer of data between the Association Engine and the host involves the following signals:

Data bus xD[7:0]

Control Signals (x$\overline{CI}$, x$\overline{CO}$, R/$\overline{W}$, OP, $\overline{EN}$, $\overline{COL}$, $\overline{ROW}$)

When the Association Engine is in Stop mode all the control signals are uni-directional while the data xD[7:0] signals are bi-directional. The host moves data to and from the Association Engine by issuing the control signals that utilizes a simple handshake protocol to insure correct movement of data. The R/$\overline{W}$ and OP lines control what type of operation is being performed, while the $\overline{EN}$, $\overline{ROW}$, and $\overline{COL}$ signals function as device selects and data routing control. The x$\overline{CI}$ and x$\overline{CO}$ lines, when active, indicate that valid data is on the data lines.

When the Association Engine is in Run mode the control signals $\overline{EN}$, OP, and R/$\overline{W}$ are "don't cared". The x$\overline{CI}$ and x$\overline{CO}$ lines perform the same function as they do in Stop mode. The signals $\overline{ROW}$ and $\overline{COL}$ are now bi-directional and participate in the max and min instructions. Only write operations (data flowing out of the Association Engine master) are allowed. The data transfer is under the control of the write instructions. Under microprogram control, a write instruction is issued which transfers data out an Association Engine port to the IDR of the neighboring Association Engine device. Depending upon the tap and switch settings, the data written will flow through and/or be deposited in the neighboring device.

The Association Engine device is designed to work in a two dimensional array. Refer to FIG. 41 for the following descriptions. For Random mode Accesses, address information flows from the north and west sides of the array to the device which has both $\overline{ROW}$ and $\overline{COL}$ signals active. Devices that have either $\overline{ROW}$ or $\overline{COL}$ active (but not both) participate in address/data movement but do not supply data themselves. The data accessed flows to/from he south edge to the selected device (both $\overline{ROW}$ and $\overline{COL}$ active).

For Stream accesses, data can flow from either the south or east edges (but not both). In this case a column or row is selected to stream to/from. Recall that for stream operations no address is required (it is generated internally) so data flows to/from the selected devices to the south or east side of the array.

The following paragraphs describe the bus cycles for Random and Stream Modes of operation for both host and Association Engine bus cycles. Refer to Section 1.3 Conventions for a description of the notation used in the following paragraphs.

(4.1.1) Host Random Accesses

FIG. 4-2 illustrates the timing for a Host Random Access Mode read and write operation. Recall that for Random Access that address information flows into the Association Engine from the north and west ports and data flow into or out of the south port. The following flow describes the sequence of operations that occur (OP==1).

Clock Cycle 2

R/$\overline{W}$, $\overline{ROW}$, $\overline{COL}$, OP, and $\overline{EN}$ signals are asserted to indicate that a Random Access Read is to occur. The $\overline{WCI}$ and $\overline{NCI}$ signals are asserted to indicate that address information will be presented in the next clock cycle.

Cock Cycle 3

At the beginning of the cycle, the previously mentioned control signals are latched internally and decoded to enable latching of the address information driven onto the north and west ports. Also the $\overline{SCO}$ is driven out indicating that data will be enabled in the next clock cycle.

Clock Cycle 4

At the beginning of the clock cycle, the address is latched internally and the location accessed so that the data read can be driven out on the falling edge of the CLK signal. Also, the $\overline{SCO}$ signal is negated on the falling edge of the CLK signal.

Clock Cycle 5

On the falling edge of the CLK signal, the data driven out the SD signal is tri-stated.

Clock Cycle 6

The Ports are inactive.

Clock Cycle 7

R/$\overline{W}$, $\overline{ROW}$, $\overline{COL}$, OP, and $\overline{EN}$ signals are asserted to indicate that a Host Random Access Write is to occur. The $\overline{WCI}$ and $\overline{NCI}$ signals are asserted to indicate that address information will be presented in the next clock cycle.

Clock Cycle 8

At the beginning of the cycle, the previously mentioned control signals are latched internally and decoded to enable latching of the address information driven onto the north and west ports. Also the $\overline{SCI}$ is asserted indicating that data will be valid in the next clock cycle.

Clock Cycle 9

At the beginning of the dock cycle, the address and $\overline{SCI}$ information are latched internally and the location accessed so that the data written can be latched in on the falling edge of the CLK signal.

Clock Cycle 10

On the falling edge of the CLK signal, the data driven in on the SD signal is tri-stated.

(4.1.2) Host Random Address Transfer West to East

FIG. 4-3 illustrates the timing for a Host Random Access Mode address transfer. This type of transfer occurs when a device being accessed shares the same row as the selected device. Recall that for Random Access the address information flows into the Association Engine from the north and west ports and data flows into or out of the south port. The following flow describes the sequence of operations that occur (OP=1).

Clock Cycle 3 $\overline{ROW}$, OP, and $\overline{EN}$ signals are asserted to indicate that a Random Access Mode transfer is to occur. For this device the $\overline{COL}$ signal is inactive. Address A1 is driven onto the WD lines so that it can be latched in on the next rising edge of the CLK signal. The source of this address can be another Association Engine device (internal to the array) or the Host driving address information to an Association Engine edge device. The $\overline{WCI}$ signal is asserted to indicate that address information will be presented in the next dock cycle.

Clock Cycle 4

At the beginning of the cycle the previously mentioned control signals are latched internally and decoded to enable latching of the address information driven onto the west port. Also the $\overline{ECO}$ is driven out indicating that data will be enabled in the next clock cycle.

Clock Cycle 5

Address information that was latched at the beginning of the cycle is driven out on ED signals on the falling edge of the CLK signal.

Clock Cycle 6

Address information that was latched at the beginning of the cycle is driven out on the falling edge of the CLK signal. The $\overline{WCI}$ input is negated indicating that address information on the WD is no longer valid.

Clock Cycle 7

Control signals $\overline{ROW}$, $\overline{EN}$ and address information WD are negated indication that the next cycle is the last cycle in the transfer. Control signal $\overline{ECO}$ negates in response to the $\overline{WCI}$ signal negating in the previous cycle.

Clock Cycle 8

On the falling edge of the CLK signal the data driven out the ED signals is tri-stated.

(4.1.3) Host Random Address and Data Transfer North and South

FIG. 4-4 illustrates the timing for two cases in Host Random Access Mode transfers. The first case (clock cycles 2 through 6) is the one where the device shares the same column as the device selected. In this case address information flows downward from the north to south ports. In the second case (clock cycles 7 though 11) the device still shares the same column but data is passed upward or downward. As far as the Association Engine devices are concerned, the type of information passed (address or data) and the direction are purely determined by the $\overline{NCI}$ or $\overline{SCI}$ signals. The following flow describes the sequence of operations that occur (OP=1).

Clock Cycle 2

$\overline{COL}$, OP, and $\overline{EN}$ signals are asserted to indicate that a Random Access Mode transfer is to occur. For this device the $\overline{ROW}$ signal is inactive. Address A0 is driven onto the ND lines so that it can be latched in on the next rising edge of the CLK signal. The source of this address can be another Association Engine device (internal to the array) or the Host driving address information to an Association Engine edge device. The $\overline{NCI}$ signal is asserted to indicate that address information will be presented in the next clock cycle.

Clock Cycle 3

At the beginning of the cycle, the previously mentioned control signals are latched internally and decoded to enable latching of the address information driven onto the north port. Also the $\overline{SCO}$ is driven out indicating that data will be enabled in the next clock cycle.

Clock Cycle 4

Address information that was latched at the beginning of the cycle is driven out on the SD signals on falling edge of the CLK signal. The $\overline{NCI}$ input is negated indicating that address information on the ND is no longer valid.

Clock Cycle 5

Control signals $\overline{ROW}$, $\overline{EN}$ and address information ND are negated indication that the next cycle is the last cycle in the transfer. Control signal $\overline{SCO}$ negates in response to the $\overline{NCI}$ signal negating in the previous cycle.

Clock Cycle 6

On the falling edge of the CLK signal, the data driven out the SD signal is tri-stated.

In the following description, the data is described as flowing upward (write operation). For a read operation, the timing of the data read would look like the address timing just described in clock cycles 2 through 6.

Clock Cycle 7

$\overline{COL}$, OP, and $\overline{EN}$ signals are asserted to indicate that a Random Access Mode transfer is to occur. For this device the $\overline{ROW}$ signal is inactive. Data D1 is driven onto the SD lines so that it can be latched in on the next rising edge of the CLK signal. The source of this data can be another Association Engine device (internal to the array) or the Host driving data information to an Association Engine edge device. The $\overline{SCI}$ signal is asserted to indicate that data information will be presented in the next clock cycle.

Clock Cycle 8

At the beginning of the cycle, the previously mentioned control signals are latched internally and decoded to enable latching of the data information driven onto the south port. Also the $\overline{NCO}$ is driven out indicating that data will be enabled in the next clock cycle.

Clock Cycle 9

Data information that was latched at the beginning of the cycle is driven out on the ND signals on falling edge of the CLK signal. The $\overline{SCI}$ input is negated indicating that data information on the SD is no longer valid.

Clock Cycle 10

Control signals $\overline{ROW}$, $\overline{EN}$ and data information on SD are negated indication that the next cycle is the last cycle in the transfer. Control signal $\overline{NCO}$ negates in response to the $\overline{SCI}$ signal negating in the previous cycle.

Clock Cycle 11

On the falling edge of the CLK signal, the data driven out the ND signals is tri-stated.

(4.1.4) Host Random Address/Data Transfer North/South with Early Termination

FIG. 4-5 illustrates the timing for the two cases described in Section 4.1.3 Host Random Address and Data Transfer North and South. The difference here is that the $\overline{EN}$ signal is used to terminate the transfers early. The previous case had a longer $\overline{EN}$ time. The reason for this difference is because, for an array of Association Engines, the time that it takes the two components of the address and the data to converge on the selected device ($\overline{ROW}$ and $\overline{COL}$ asserted) can be lengthy. Depending on the complexity of the external control hardware, a board can save access time (into the array) by adding more functionality to the $\overline{EN}$ driver logic. The simple case is to time all accesses to the worst case time. This time would be the time to access the upper most right device in the Association Engine array. The following describes the differences between FIG. 4-4 and FIG. 4-5.

Clock Cycle 4

Address information that was latched at the beginning of the cycle is driven out on the SD signals on falling edge of the CLK signal. The $\overline{NCI}$ input is negated indicating that address information on the ND is no longer valid. Control signals $\overline{ROW}$, $\overline{EN}$ and address information ND are negated indicating that the next cycle is the last cycle in the transfer.

Clock Cycle 5

Control signal $\overline{SCO}$ negates in response to the $\overline{NCI}$ signal negating in the previous cycle. On the falling edge of the CLK signal, the data driven out the SD signals is tri-stated.

Clock Cycle 9

Data information that was latched at the beginning of the cycle is driven out on the ND signals on falling edge of the CLK signal. The $\overline{SCI}$ input is negated indicating that data information on the SD is no longer valid. Control signals $\overline{ROW}$, $\overline{EN}$ are negated indicating that the next cycle is the last cycle in the transfer.

Clock Cycle 10

Data information on SD and control signal $\overline{NCO}$ negates in response to the $\overline{SCI}$ signal negating in the previous cycle. On the falling edge of the CLK signal, the data driven out the ND signals is tri-stated.

(4.1.5) Host Stream Read

FIG. 4-6 illustrates the timing for a Host Stream Access Mode read. Stream read transfers take data from a chain of devices that have both $\overline{ROW}$ and $\overline{COL}$ signals asserted. In the case described below the two devices share the same $\overline{ROW}$ signal. The "end" devices is assumed to be at the Association Engine array edge. To initiate the stream access, the device at the edge (device #1) is required to have the west port stream control input $\overline{WCI}$ asserted when the $\overline{EN}$ signals asserts. This indication tells that particular Association Engine that it is the first in the line for streaming.

The Association Engine device has internal control register bits HSSR:HSP[1:0] to control the direction of streaming. Streaming can occur through the south (HSP[1.0]=01) or east (HSP[1:0]=10) ports, but not both. The flow described below assumes that each of the two Association Engine devices will stream out two bytes of information (i.e. DCR1=02). To simplify the discussion, signals in this description are labeled with superscripts. This is to indicate what device the signal is associated with. For example, \X\TO(WCI$^1$) is the $\overline{WCI}$ input associated with device #1. The following flow describes the sequence of operations that occur (OP==0).

Clock Cycle 2

R/$\overline{W}$, $\overline{ROW}$, $\overline{COL}$, OP, and $\overline{EN}$ signals are asserted to indicate that a Stream Access Read is to occur. The $\overline{WCI}^1$ signal is asserted to indicate that Association Engine #1 is the first in the chain for streaming.

Clock Cycle 3

At the beginning of the cycle, the previously mentioned control signals are latched internally and decoded to enable data to be driven onto the east port. Also the $\overline{ECO}^1$ ($\overline{WCI}^2$) is driven out indicating that data will be enabled in the next clock cycle.

Clock Cycle 4

At the beginning of the clock cycle the $\overline{WCI}^2$ information is latched internally in preparation for data in the next clock cycle. Association Engine #2 asserts the \X\TO($\overline{ECO}^2$) signal on the falling edge of the CLK signal in response to $\overline{WCI}^2$ being latched. Association Engine #1 drives data out on $ED^1$ on the falling edge of the CLK signal.

Clock Cycle 5

At the beginning of the cycle, Association Engine #2 latches data from Association Engine #1 and transfers it to the east port where it's data is driven out on the falling edge of the CLK signal. Association Engine #1 negates the $\overline{ECO}^1$ signal, indicating to Association Engine #2 that Association Engine #1 has completed its stream transfer (Association Engine #1 is empty). On the falling edge of the CLK signal, Association Engine #1 drives the last piece of data on the $ED^1$ signal lines.

Clock Cycle 6

At the beginning of the cycle, Association Engine #2 latches the next piece of data from Association Engine #1 and drives in onto the $ED^2$ signals on the falling edge of the CLK signal. Also at the beginning of the cycle, Association Engine #2 latches the $\overline{WCI}^2$ input and decodes it to determine that Association Engine #2 is now the supplier of data in the stream. Association Engine #2 now keeps the $\overline{ECO}^2$ signal asserted (now indicating that Association Engine #2 is supplying data).

Clock Cycle 7

On the falling edge of the CLK signal, Association Engine #2 supplies the first of its data to the stream transfer.

Clock Cycle 8

On the falling edge of the CLK signal, Association Engine #2 supplies the second of its data to the stream transfer. Also on the falling edge of the CLK signal, the $\overline{ECO}^2$ line is negated to indicate that the next clock cycle will be the last of the data from Association Engine #2. The $\overline{ROW}$, $\overline{COL}$, $\overline{EN}$ signals are also negated in this cycle to indicate that the next clock cycle is the last.

Clock Cycle 9

On the falling edge of the CLK signal, the data driven in on the $ED^2$ signal is tri-stated.

Depending on the complexity of the logic that controls the array of Association Engines the termination of the stream transfer can be handled in two ways. The first requires the control logic to know the duration of the stream so that the $\overline{EN}$, $\overline{ROW}$, $\overline{COL}$, etc. control signals can be negated at the correct time. The second uses the $\overline{ECO}$ (or $\overline{SCO}$) signals at the right (or bottom) edge of the array as an indication that the stream can be terminated.

(4.1.6) Host Stream Write Accesses

FIG. 4-7 illustrates the timing for a Host Stream Write Access timing. Recall that a stream write operation can supply data to be duplicated in each Association Engine device (depending on the state of the HSOR register). Its main intent is to supply unique data to each Association Engine. Stream write transfers send data to a chain of devices that have both $\overline{ROW}$ and $\overline{COL}$ signals asserted. In the case described below, the two devices share the same $\overline{ROW}$ signal. In the case of stream write transfers the flow of data is uni-directional. In the case for stream writes it is not until the $\overline{ECI}$ signal is asserted (indicating that valid data is at ED signals) before data is written. So, in the case for a stream write, $\overline{ECI}$ and $\overline{WCO}$ ($\overline{SCI}$, $\overline{NCO}$ for north south transfers) stream controls signals are involved, and not the $\overline{ECO}$ and $\overline{WCI}$ ($\overline{SCO}$, $\overline{NCI}$) signals.

The Association Engine device has internal control register bits HSSR:HSP[1:0] which control the direction of streaming. Stream writes can occur through the South (HSP [1:0]=01) or East (HSP[1:0]=10) ports, but not both. The flow described below assumes that each of the two Association Engine devices will receive two bytes of information. The HSOR register in the first device (Association Engine #2) contains the value 0x0000, while the HSOR in the second device (Association Engine #1) contains the value 0x0002. Depending on the internal settings of the OAR/DCR registers and the host stream select register, the particular Association Engine may load only a fraction of the data transmitted. To simplify the discussion signals in this description are labeled with superscripts to indicate with which device the signal is associated. For example, $\overline{WCI}^1$ is the $\overline{WCI}$ input associated with device #1. The following flow describes the sequence of operations that occur (OP==1).

Clock Cycle 2

R/$\overline{W}$, $\overline{ROW}$, $\overline{COL}$, OP, and $\overline{EN}$ signals are asserted to indicate that a Stream Write Access is to occur. Also, $\overline{ECI}^2$ is asserted to indicate that data to be written will be valid in the next clock cycle.

Clock Cycle 3

At the beginning of the cycle, the previously mentioned control signals are latched internally and decoded. Data to be driven onto the east port $ED^2$ is presented to Association Engine #2. Also, $\overline{WCO}^2$ is asserted at the falling edge of the CLK signal in response to the $\overline{ECI}^2$ being asserted in the previous clock cycle. Device Association Engine #2 HSOR now matches the internal counter that has been counting valid data (its value is zero for this device). Association Engine #2 is now armed to accept data until the DCR count reaches zero.

Clock Cycles 4 and 5

Association Engine #2 drives data onto the $WD^2$ lines to Association Engine #1. The next piece of data is driven on the $ED^2$ line.

Clock Cycle 6

At the beginning of the cycle, Association Engine #2 latches the next piece of data. Also, control signal $\overline{ECI}^2$ is negated indicating that the last piece of data will be presented on the $ED^2$ line in the next clock cycle. Device Association Engine #1 HSOR now matches the internal counter that has been counting valid data. Association Engine #1 is now armed to accept data until the DCR count reaches zero.

Clock Cycle 7

At the beginning of the cycle, Association Engine #2 latches the next piece of data. Also, control signals $\overline{ROW}$, $\overline{COL}$, $\overline{EN}$, R/$\overline{W}$, and $\overline{WCO}^2$ are negated indicating that the stream write will terminate in the next clock cycle.

Clock Cycle 8

At the beginning of the clock cycle, the last piece of data is latched by Association Engine #2 and stored internally.

(4.2) Association Engine Master Operations

Under the control of Association Engine microcode, the Association Engine can write data out of any one of the four ports. This is limited to Association Engine write operations only (data flows out of an Association Engine into another). This is controlled by the set of write microcode instruction. These write cycles are the only possible transfers and the destination of the write operations is always the IDR register.

The Association Engine can only perform microcode write operations in Run mode. This is because that write operations are initiated by an instruction. When the Association Engine is in Run mode the control signals $\overline{EN}$, OP, and R/$\overline{W}$ are "don't cared". The $\overline{xCI}$ and $\overline{xCO}$ lines perform the same function as they did in the previous examples. The signals $\overline{ROW}$ and $\overline{COL}$ are now are bi-directional and participate in the max and min vector instructions. Only write operations (data flowing out of the master) are allowed. The data transfer is under control of the write type instructions.

To avoid any electrical damage due to rampant microprogram operation or timing mismatch, the Association Engine will always drive out the $\overline{xCO}$ lines one clock cycle prior to driving data. This ensures that simultaneous write operations or mismatched write operations can be detected prior to any electrical contention on the bus.

Depending on the Association Engine internal settings of the switches and taps, data presented may either 1) be transferred across a closed switch, 2) be blocked from transfer by an open switch, 3) place data into the IDR register with a closed tap, or 4) not effect the IDR register due to an open tap.

The general relationship between the port signals and the CLK signal is that all input and bi-directional input signals to the port are latched internally on the rising edge of the CLK signals. Conversely all outputs and bi-directional outputs are enabled on the falling edge of the CLK signal.

The transfer of data on the port between Association Engines or the Host and a running Association Engine involves the following signals:

Data bus xD[7:0]

Control Signals $\overline{xCI}$ and $\overline{xCO}$ (4.2.1) Association Engine Write Operation All Valid Data FIG. 4-8 illustrates the timing for a four byte transfer between Association Engine #2 and Association Engine #1. The length of the write instruction is controlled by a value in one of the scalar data registers. For this example, the value contained in this scalar data register is 4. The actual instruction being performed could be vwritew V0, G0. Also, Association Engine #1 has the east/west switch closed so that data presented to the east port is passed along to the west port. For Association Engine #1, the east tap is open so that the data presented to the device only flows through Association Engine #1, and does not change any of its the internal IDR locations.

Clock Cycle 2

Association Engine #2 asserts the $\overline{WCO}^2$ output on the falling edge of the CLK signal in response to the execution of the write instruction. This action indicates that data will be presented on the $WD^2$ output in the next clock cycle.

Clock Cycle 3

Association Engine #2 drives the value of the V0 register in PE #0 out to the $WD^2$ lines in the falling edge of the CLK signal. Also, Association Engine #1 asserts $\overline{WCO}^1$ on the falling edge of the CLK signal in response to $\overline{ECI}^1$ being latched and decoded in the previous clock cycle.

Clock Cycles 4 and 5

In these clock cycles, data is latched at the beginning of the clock cycle, passed through, and driven out on the falling edge of the CLK signal.

Clock Cycle 6

In response to the write instruction terminating (the write which was initiated in Association Engine #2) the $\overline{WCO}^2$ line is negated at the falling edge of the CLK signal. Also, the last piece of data is driven on the output of Association Engine #2 ($WD^2$).

Clock Cycle 7

In response to the $\overline{ECI}^1$ signal, Association Engine #1 negates the $\overline{WCO}^1$ signal at the falling edge of the CLK signal and drives out the last piece of data.

(4.2.2) Association Engine Write Operation Partial Valid Data

FIG. 4-9 illustrates the timing for a two byte transfer between Association Engine #2 and Association Engine #1. The length of the write instruction is controlled by a value in one of the scalar data registers. For this example, the value contained in the scalar data register is 4. The actual instruction being performed could be vwritew V0, G0. The reason that only two bytes are transferred is that two of the four PEs have their VT bits cleared (indicating that they will not supply data due to invalid data). Also, Association Engine #1 has the east/west switch open so that data presented to the east port is not passed along to the west port. For Association Engine #1, the east tap is closed so that the data that is presented to the device only write to the IDR of Association Engine #1. Note that the IDR of Association Engine #1 will have the first two locations written from this operation. The effect of gaps in the writing process from the source has the effect of packing the data bytes at the destination.

Clock Cycle 2

Association Engine #2 asserts the $\overline{WCO}^2$ output on the falling edge of the CLK signal in response to the execution of the write instruction. This action indicates that the data will be presented on the $WD^2$ output in the next clock cycle.

Clock Cycle 3

Association Engine #2 drives the value of the V0 register in PE #0 out to the $WD^2$ lines in the falling edge of the CLK signal. Also, the $\overline{WCO}^2$ signal is negated in response to the internal state so that the next PE has its VT bit cleared.

Clock Cycle 4

$WD^2$ is tri-stated on the falling edge of the CLK signal.

Clock Cycle 5

$\overline{WCO}^2$ is asserted on the falling edge of the CLK signal in response to an active PE with the data to be sent out the next clock cycle.

Clock Cycle 6

In response to the write instruction terminating (which was initiated in Association Engine #2) the $\overline{WCO}^2$ line is negated at the falling edge of the CLK signal. Also, the last piece of data is driven on the output of Association Engine #2 ($WD^2$).

(4.2.3) Association Engine write Collision Timing

FIG. 4-10 illustrates the timing for an Association Engine Collision on one of the ports. There are two possible types of collisions. The first type is concerned with two Association Engines simultaneously performing write operations. In this case the $\overline{xCI}$ signals (which lead the data by one clock cycle) both go active. This state ($\overline{ECI}$ and $\overline{ECO}$ both active for example) is an indication that a port collision has occurred. The second type occurs when a port write operation is under way and a write instruction is executed out the same port. In this case, data is being driven onto the port but the $\overline{xCI}$ signals are again used to detect the collisions prior to any electrical damage.

When a port collision is detected (by both Association Engines), exception processing is performed by both devices (even if one was halted and data was just passing through). The collision exception vector is fetched and exception processing for the collision is started and appropriate status bits are set.

Clock Cycles 2 and 3

These two clock cycles indicate a simultaneous port collision.

Clock Cycles 8 through 11

These clock cycles indicate a write in progress and another write being performed.

(4.3) Miscellaneous Timing

The remaining signals on the Association Engine deal with done, Run/Stop, interrupt, reset and user test functions. The following diagrams provide the timing for these features.

Done indications (which assert the $\overline{BUSY}$ signal) can come from one of two sources. First, the done instruction when executed negates the $\overline{BUSY}$ signal and holds the Association Engine at the current PC location. This is like the halt instruction but it has the added effect of negating the $\overline{BUSY}$ output. Secondly, the $\overline{BUSY}$ signal will negate at the end of the current instruction if the Association Engine is in the single step mode of operation. (See FIG. 4-11.)

The R/$\overline{S}$ signal tells the Association Engine what state the device is in, either Run mode (R/$\overline{S}$=1) or Stop mode (R/$\overline{S}$=0). For the case that data is "in transit" and the R/$\overline{S}$ line transitions to the Stop state, data is held in internal locations so that the transfer can be restarted where it left off. Also, if an instruction is currently executing when the R/$\overline{S}$ signal transitions from Run mode to Stop mode ($1 \rightarrow 0$), sufficient state information will be retain so as to resume execution when the Association Engine is returned to Run mode (R/$\overline{S}$=1).

Association Engine interrupts can be generated by any number of internal conditions, refer to Section 2.3.22 Interrupt Status Register #1 (ISR1) and Section 2.3.24 Interrupt Status Register #2 (ISR2) for more information on interrupt events.

The reset sequence of the Association Engine requires 4 clock cycles to perform internal initialization functions.

The Association Engine also contains a user accessible test port that allows a wide variety of board test features. This test port is IEEE 1149.1 compatible. The reader is referred to the IEEE 1149.1 document for details on operation of the test port.

(4.3.1) Association Engine $\overline{BUSY}$ Output Timing

FIG. 4-12 illustrates the timing for the Association Engine $\overline{BUSY}$ signal. The first case illustrates the done instruction. The second case illustrates the completion of an instruction is single step mode. The $\overline{BUSY}$ line is intended as an open drain output so that an external pull up can bring this output to a high voltage when all Association Engines have executed a done instruction.

Clock Cycle 2

On the falling edge of the CLK signal, the PSTAT lines indicate that a scalar instruction is being executed.

Clock Cycle 3

On the falling edge of the CLK signal, the $\overline{BUSY}$ is negated in response to the done instruction being executed.

Clock Cycle 4

Some external device transitions the R/$\overline{S}$ line from Run to Stop.

Clock Cycle 5

At the beginning of the cycle, the R/$\overline{S}$ input is decoded to be active. This has the effect of asserting the $\overline{BUSY}$ output.

Clock Cycle 6

At the beginning of the cycle, the R/$\overline{S}$ line is decoded in the Run state. This has the effect of restarting the Association Engine at the instruction just after the done instruction.

Clock Cycle 7

On the falling edge of the CLK signal, the PSTAT lines indicate that some instruction is being executed.

Clock Cycle 8

On the falling edge of the CLK signal, the $\overline{BUSY}$ signal is negated indicating that the current instruction has completed.

Clock Cycles 10 and 11

The Association Engine is restarted when the $R/\overline{S}$ line transitions from Run to Stop to Run. This enables the next instruction to be executed.

(4.3.2) Association Engine write Timing with Run/Stop Intervention

FIG. 4-13 illustrates the timing for the Association Engine write operation with the Association Engines stopped in the middle of the operation.

Clock Cycle 2

Association Engine #2 asserted the $\overline{WCO^2}$ output on the falling edge of the CLK signal in response to the execution of the write instruction. This action indicates that data will be presented on the $WD^2$ output in the next clock cycle.

Clock Cycle 3

Association Engine #2 drives the value of the V0 register in PE #0 out to the $WD^2$ lines in the falling edge of the CLK signal. Also, Association Engine #1 asserted $\overline{WCO^1}$ on the falling edge of the CLK signal in response to $\overline{ECI^1}$ being latched and decoded in the previous clock cycle.

Clock Cycle 4

Data is latched at the beginning of this clock cycle, passed through, and driven on the out on the falling edge of the CLK signal. Also, an external device asserts the $R/\overline{S}$ signal to indicate that Stop mode should be entered.

Clock Cycle 5

At the beginning of the cycle, the $R/\overline{S}$ signals is decoded as being asserted. On the falling edge of the CLK signal, all $\overline{WCO}$ outputs negate, and all WD outputs tri-state.

Clock Cycle 6

The external device negates the $R/\overline{S}$ input.

Clock Cycle 7

At the beginning of the cycle, the $R/\overline{S}$ input is decoded as being negated. On the falling edge of the CLK signal, the $\overline{WCO}$ outputs are assert indicating that the data will be presented in the next clock cycle.

Clock Cycle 8

Association Engine #1 presents V0 from PE #0 (it was held internally when the $R/\overline{S}$ went to Stop mode) on $WD^1$ again, and Association Engine #2 presents V0 from PE #1 again to $WD^2$ on the falling edge of the CLK signal.

Clock Cycle 9

Data is latched at the beginning of this clock cycle, passed through, and driven on the out on the falling edge of the CLK signal.

Clock Cycle 10

In response to the write instruction terminating (Association Engine #2) the $\overline{WCO^2}$ line is negated at the falling edge of the CLK signal. Also, the last piece of data is driven on the output of Association Engine #2 ($WD^2$).

Clock Cycle 11

In response to the $\overline{ECI^1}$ signal, Association Engine #1 negates the $\overline{WCO^1}$ signal at the falling edge of the CLK signal and drives out the last piece of data.

(4.3.3) Interrupt Timing

FIG. 4-14 illustrates the timing for the Association Engine interrupt generation. The following flow describes the sequence of event to generate and have the host clear an interrupting condition.

Clock Cycle 4

On the falling edge of the CLK signal, some internal Association Engine condition becomes true that will generate an interrupt. This is usually the setting of a status bit in the AICR. Refer to Section 2.3.22 Interrupt Status Register #1 (ISR1) and Section 2.3.24 Interrupt Status Register #2 (ISR2) for more information.

Clock Cycle 5

On the falling edge of the CLK signal, the $\overline{INTR}$ signal is asserted to indicate to the host that an interrupting condition has occurred. Refer to Section 2.3.23 Interrupt Mask Register #1 (LMR1) and Section 2.3.25 Interrupt Mask Register #2 (IMR2) for more information on masking interrupts.

Clock Cycles 7 through 8

This timing diagram assumes that the host requires two cycles to respond to the interrupt.

Clock Cycle 9

On the rising edge of the CLK signal (early in the cycle), the host accesses the Interrupt Status Register (ISR) to clear out the interrupting condition. This is usually done with the Random Access Mode of operation as shown in FIG. 4-2.

Clock Cycle 10

On the falling edge of the CLK signal, the INTR output is negated to indicate that the interrupting condition has been cleared or disabled.

(4.3.4) Reset Timing

FIG. 4-15 illustrates the timing for a reset sequence for the Association Engine. The reset sequence is used by the Association Engine to initialize internal register to their default state. The following flow describes the events in the reset sequence. For warm resets, the $\overline{RESET}$ signal is required to be asserted for at least three clock cycles. For cold resets, the $\overline{RESET}$ signal is required to asserted for at least three clock cycles after the power stabilizes. The $\overline{RESET}$ signal input has a hi-gain synchronizer to determine the state of the pin at the rising edge of the CLK signal.

Clock Cycle 2

During this clock cycle, the $\overline{RESET}$ input signal may fall. In order for the internally synchronized version of the $\overline{RESET}$ signal to be asserted in clock cycle #3, the $\overline{RESET}$ input must be asserted sometime prior to the rising edge of the CLK signal.

Clock Cycle 3

If the $\overline{RESET}$ input meets the set-up time requirements for the rising edge of the CLK signal, then the internally synchronized version of the $\overline{RESET}$ input (rsync) will assert. This event starts the system reset sequence by asserting the rst signal.

Clock Cycle 6

The $\overline{RESET}$ input negates sometime in clock cycle #6 and must be negated by the rising edge of the CLK signal to cause the internally synchronized version to negate also.

Clock Cycle 7

If the $\overline{RESET}$ input meets the set-up time requirements for the rising edge of the CLK signal, then the internally synchronized version of the $\overline{RESET}$ input (rsync) will negate. Note that this negation starts the internal reset sequence.

Clock Cycle 10

At the end of the reset sequence, the internal system reset (rst) is negated and the Association Engine system is ready to start the user initialization.

(4.3.5) IEEE 1149.1 Test Access Port (TAP) Timing

FIG. 4-16 illustrates the timing of the user accessible test port. This test port is based on the IEEE 1149.1 standard. The user is referred to the IEEE 1149.1 document for a detailed description of the internal state and state transitions which control the operation of the 1149.1 interface. The timing diagram shown here describes the relationship between the TAP and system pins with respect to the TCK clock signal.

Clock Cycles 4 and 8

All TAP inputs (TDI, TMS) and system inputs (and bi-directional inputs) are latched on the rising edge of the TCK signal.

Clock Cycles 3, 7, and 11

All TAP outputs (TDO) and system outputs (and bi-directional outputs) are enabled on the falling edge of the TCK signal.

Overview of Selected Topics (Section 5)

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The term "bus" will be used to refer to a plurality of signals which may be used to transfer one or more various types of information, such as data, addresses, control, or status. The symbol "$" or the symbol "0x" preceding a number indicates that the number is represented in its hexadecimal or base sixteen form. Likewise, the symbol "H" following a number indicates that the number is represented in its hexadecimal or base sixteen form. The symbol "%" preceding a number indicates that the number is represented in its binary or base two form.

Data processor 10 is capable of storing an instruction, but the manner in which one or more instructions are stored can vary. For example, for storing instructions, data processor 10 may have an instruction cache 20 (see FIG. 2-67), or data processor 10 may have an on-board memory (e.g. CMA 14) of any type, such as Random Access Memory (RAM) or Read Only Memory (ROM). Alternately, data processor 10 may receive instructions from an external source and may briefly store the received instructions in a buffer or latch circuit so that the instruction can be decoded. Thus the storing of an instruction may be permanent, temporary, or extremely brief.

In the figures, multiple data processors 10 in the same figure may be designated using reference numbers 10.1, 10.2, 10.3, etc., (for an example, see FIG. 2-6). Data processors 10.1, 10.2, 10.3, etc. may be identical in terms of both hardware and software, may be identical as to hardware but different as to software, or may be different as to both hardware and software. The term 10.*x* will be used to refer to any one of the data processors 10.1, 10.2, 10.3, etc. Note also that the term "Association Engine" or "AE" is used to refer to data processor 10.*x*.

Likewise, various embodiments of data processing system 55 will be designated as 55.1, 55.2, 55.3, etc., (for an example, see FIG. 2-6). The term 55.*x* will be used to refer to any one of the data processing systems 55.1, 55.2, 55.3, etc. Various embodiments of data processing system 57 will be designated as 57.1, 57.2, 57.3, etc. The term 57.*x* will be used to refer to any one of the data processing systems 57.1, 57.2, 57.3, etc.

Referring to FIG. 2-6, note that data processing system 57 can be a portion of data processing system 55, or data processing system 57 can stand alone as a complete system itself. Thus any data processing system 57 can also be a portion of data processing system 55. Most applications use an external CPU 54, but it is not required. CPU 54 may have on-board memory (not shown) and thus there may be no need for RAM 56, ROM 58, and disk 60. In addition, if CPU 54 is capable of directly interfacing to the data processors 10.*x*, then interface logic 62 may not be needed. Conductors 61 are used to couple various east and west ports of data processors 10.*x*. Conductors 63 are used to couple various north and south ports of data processors 10.*x*.

Referring to Section 2.5 and Table 2.34, the terms microcode, instruction, and microcode instruction are used interchangeably in this specification when referring to the instructions listed in Table 2.34. The instructions listed in Table 2.34 are the instructions which are used by a software programmer to program data processor 10 at the assembly language level.

(5.1) Saturation Protection

Certain instructions in the present invention are "saturating" instructions. Referring to Section 2.5.9, Section 2.5.19.1, and the definition of saturation in the Glossary, the terms "overflow" and "saturation" are discussed. "Overflow" refers to a situation in which the value to be stored in a register exceeds the maximum value which the register can store (e.g. attempting to store %100000001 in an 8-bit register). "Saturation" or "saturation protection" refers to a method of handling overflow situations in which the value in the register is replaced with an upper or lower boundary value, for example $FF for an 8-bit unsigned maximum boundary value.

Referring to FIG. 5-1-2, in the illustrated embodiment of the present invention, certain non-preliminary scalar instructions are also saturating instructions, namely "add", "addsx", "sub", "subsx", "neg", and "abs". Likewise, certain non-preliminary vector instructions are also saturating instructions, namely "vadd", "vaddsx", "vsub", "vsubsx", "vneg", and "vabs". These saturating instructions always saturate if there is an overflow (i.e. if the SV bit 214 is asserted for scalar saturating instructions, and if the VV bit 106 is asserted for vector saturating instructions). The SV bit 214 is located in the Scalar Process Control Register (SPCR) 208 (see FIG. 2-44). The VV bit 106 is located in the Vector Process Control Register (VPCR) 102 (see FIG. 2-64).

For a saturating scalar instruction, the result of the arithmetic operation is replaced by either an upper bound or a lower bound when an overflow value, SV bit 214, is asserted. A corresponding overflow direction bit, SD bit 216 located in the SPCR register 208, determines whether the overflow was in the positive or negative direction. The direction of the overflow determines which boundary value, the upper bound or the lower bound, is used to replace the result of the data processing operation. A sign bit, SSGN bit 174 located in the Arithmetic Control Register (ACR) 172, indicates whether the number is signed or unsigned. Whether the number is signed or unsigned determines the values of the upper and lower bounds.

For a saturating vector instruction, the result of the arithmetic operation is replaced by either an upper bound or a lower bound when an overflow value, VV bit 106, is asserted. A corresponding overflow direction bit, VD bit 108 located in the VPCR register 102, determines whether the overflow was in the positive or negative direction. The direction of the overflow determines which boundary value, the upper bound or the lower bound, is used to replace the result of the data processing operation. A sign bit, VSGN bit 176 located in the Arithmetic Control Register (ACR) 172, indicates whether the number is signed or unsigned. Whether the number is signed or unsigned determines the values of the upper and lower bounds.

The "sat" and "vsat" instructions are special saturating instructions that do nothing but perform saturation. The "sat" and "vsat" instructions are especially useful for extended length arithmetic operations. Generally, one or more preliminary instructions followed by a single non-preliminary instruction are used to perform an extended length arithmetic operation. If the non-preliminary instruction is a saturating instruction, then the one byte of the multi-byte result which is produced by the non-preliminary saturating instruction has already been adjusted if there was an overflow. However, the remaining bytes of the multi-byte result contain an incorrect value if the result has saturated. The "sat" and "vsat" instructions provide saturation protection for multi-byte arithmetic operations.

FIG. 5-1-1 illustrates an example in which the "sat" instruction can be used to perform saturation protection for registers in the scalar engine 26. The "vsat" instruction performs the same saturation protection function for registers in the vector engine 9. The example illustrated in FIG. 5-1-1 assumes that the goal of the instructions is to add the 3-byte data value stored in register group (G0,G1,G2) to the 3-byte data value stored in register group (G3,G4,G5) so that the 3-byte result stored in register group (G3,G4,G5) will saturate if overflow occurs.

```
addp G2, G5     ; add preliminary G2 to G5
                ;   (non-saturating add operation)
addp G1, G4     ; add preliminary G1 to G4
                ;   (non-saturating add operation)
add G0, G3      ; add non-preliminary to G0 to G3
                ;   (saturating add operation)
sat G4          ; perform saturation protection on G4
                ;   (corrects the value in G4 based on overflow)
sat G5          ; perform saturation protection on G5
                ;   (corrects the value in G5 based on overflow)
```

At the end of execution of the "add G0, G3" instruction, the register group (G3,G4,G5) contains a partially saturated result, and the overflow value SV bit 214 indicates that there was an overflow. The corresponding overflow direction bit, SD bit 216, indicates that the overflow was in the positive direction. The sign bit, SSGN bit 174, indicates in this example that the number is unsigned. The "sat G4" instruction uses the overflow value, the overflow direction bit, and the sign bit to determine that saturation has occurred in the positive direction and that the upper bound value $FF must be stored in register G4 to replace the incorrect result $34. The "sat G5" instruction uses the overflow value, the overflow direction bit, and the sign bit to determine that saturation has occurred in the positive direction and that the upper bound value $FF must be stored in register G5 to replace the incorrect result $32.

(5.2) Communications Between Data Processors: Switch and Tap

Referring to FIG. 3-40 and FIG. 2-67, a switch 42 allows data to flow through data processor 10, and a tap 40 allows data to be received and latched by data processor 10. Referring to FIG. 2-6, taps and switches can be used to provide scalability in systems using an array of data processors 10. A switch allows data being transferred to cross a data processor 10 without internal intervention by data processor 10. A tap allows data arriving at a port of data processors 10 to be copied into the Input Data Register (IDR) 18 of a data processor 10.

In order for two (or more) data processors 10 to communicate, where the data processors 10 are not adjacent neighbors in the array, the switches linking the data processors 10 must be closed (i.e. in a conducting mode). Thus switches allow one data processor 10 to send data to another data processor 10 without the data processors between the two communicating data processors 10 being involved. In the preferred embodiment, the taps allow a data processor 10 to capture data arriving at any port.

Note that the number of ports (North, South, East, and West), the number of switches (42.1 and 42.2), and the number of taps (40.1, 40.2, 40.3, and 40.4) are independent of each other. Alternate embodiments of the present invention can have various numbers of ports, switches, and taps. For example, a data processor 10 may have fewer or more ports, each port does not have to have a tap, and a port may be coupled to multiple switches. Each switch can operate independently of taps and other switches, and each tap can operate independently of switches and other taps.

Although the switches illustrated in the preferred embodiment are bi-directional, uni-directional switches could also be used. For example, two uni-directional switches could be used in place of one bi-directional switch. If uni-directional switches are used, an additional control bit may be added which could be used to determine the direction of the flow of data. The switches can be implemented using any type of analog or digital circuitry, for example, combinational or sequential logic. The specific circuitry required to actually build a switch and a tap is known to one of average skill in the art.

In the illustrated embodiment, when a switch is in a conducting mode (connected), digital data is transferred from one end of the switch to the other end of the switch; thus, data can be passed from one port to another port through the switch. When a switch is in a non-conducting mode (disconnected), digital data is not transferred from one end of the switch to the other end of the switch; thus, data cannot be passed from one port to another port through the switch.

Referring to FIG. 2-16, Table 2.10, and FIG. 2-67, the Port Control Register (PCR) 52 contains control bits which are used to control the switches and taps. Bits 0–6 of PCR 52 can be changed by a system reset, by certain instructions executed by data processor 10, and by host accesses from an external processor (e.g. CPU 54 in FIG. 2-6). Note that the digital data itself which is being transferred does not need to contain any routing information. Thus, the digital data itself does not need to indicate which data processor(s) 10 should receive and latch the digital data.

Note that a software program can dynamically modify bits 0–6 of PCR 52 while data processor 10 executes instructions. The software program can either be an internal program within data processor 10, located in instruction cache 20 or in an on-board memory (not shown), or it can be an external program located in either CPU 54, RAM 56, ROM 58, or disk 60. Note that data processor 10 does not have to execute any instructions or exert any active control in order for the transfer of data between ports to take place.

The control bits in PCR 52 allow the communications structure of data processor 10 to be changed for various system configurations, and to be changed dynamically while data processor 10 is executing instructions. Thus the switch and tap architecture provides the user with the capability of reconfiguring an array of data processors 10 entirely through software, without the need to change a single hardwire connection or hardware conductor.

Referring to FIG. 3-40, north port pins 44 may be selectively coupled to south port pins 48 by way of switch circuit 42.1, and west port pins 50 may be selectively coupled to east port pins 46 by way of switch circuit 42.2. North port pins 44 may be selectively coupled to Input Data Registers (IDR) 18 by way of tap circuit 40.1. East port pins 46 may be selectively coupled to Input Data Registers (IDR) 18 by way of tap circuit 40.2. South port pins 48 may be selectively coupled to Input Data Registers (IDR) 18 by way of tap circuit 40.3. West port pins 50 may be selectively coupled to Input Data Registers (IDR) 18 by way of tap circuit 40.4.

(5.3) Multi-Port Data Processor

Referring to FIG. 5-2-1, FIG. 5-2-2, FIG. 5-3, FIG. 5-4, FIG. 5-5, FIG. 5-6, and FIG. 5-7, a data processor 10 can be in one of two modes of operation: namely "Stop" mode and "Run" mode. Note that "Stop" mode may also be called "Host" mode. In the illustrated embodiment of the present invention, the mode of operation is selected by an input to data processor 10. The logic level on the R/$\overline{S}$ integrated circuit pin 80 (see FIG. 2-8) is used to determine whether data processor 10 is in Stop mode or Run mode. In Stop mode, all of the registers within data processor 10 which can be accessed externally are available for external access; and data processor 10 is not executing instructions. In Run mode, all of the registers within data processor 10 which can be accessed externally are unavailable for external access, except for the IDR register 18 (see FIG. 2-67); and data processor 10 is capable of fetching, decoding, and executing instructions.

The North, South, East, and West ports in the illustrated embodiment serve different purposes and function differently depending upon the mode of operation. Likewise, some signals and some integrated circuit pins serve different purposes and function differently depending upon the mode of operation (see Table 2.2).

In Run mode, switches and taps rather than row and column select signals are used to control communications through the ports. In the illustrated embodiment of the present invention, switches 42.1 and 42.2, along with taps 40.1, 40.2, 40.3, and 40.4, (see FIG. 3-40) are used to allow data processor 10 to communicate with other external data processors 10 and/or with host data processor 54 in Run mode. In the illustrated embodiment, the $\overline{ROW}$ integrated circuit pin 82 and the $\overline{COL}$ integrated circuit pin 84 (see FIG. 2-8) are not used to receive column or row select signals in Run mode.

In Stop mode, row and column select signals rather than switches and taps are used to control communications through the ports. In the illustrated embodiment, a column select signal is received by $\overline{COL}$ pin 84 and a row select signal is received by $\overline{ROW}$ pin 82. In the illustrated embodiment of the present invention, switches 42.1 and 42.2, along with taps 40.1, 40.2, 40.3, and 40.4, (see FIG. 3-40) are not used in Stop mode.

In Stop mode, data processor 10 uses the column select signal and the row select signal to determine whether or not to pass through information, and whether or not to store or source information. If neither its row select pin nor its column select pin is asserted, data processor 10 will not even pass through information. However, if only one of its row select pin ($\overline{ROW}$ pin 82) or its column select pin ($\overline{COL}$ pin 84) is asserted, data processor 10 may pass through information, but will not store or act as the original source of any information. And if both its row select signal and its column select signal are asserted, data processor 10 may pass through information and may also store or act as the original source of information.

When data processor 10 is in Stop mode, there are two access modes which can be selected: namely Random access mode and Stream access mode. The access modes determine the manner in which resources internal to data processor 10 may be accessed. In the illustrated embodiment of the present invention, the access mode is selected by an input to data processor 10. The logic level on the OP integrated circuit pin 94 (see FIG. 2-8) is used to determine whether data processor 10 is in Random access mode or Stream access mode.

In Random access mode, an address must be externally supplied to data processor 10 in order to designate which single internal address location within data processor 10 is being accessed. The externally supplied address is received by data processor 10 at both the North and West ports. In the illustrated embodiment, the Random access mode is used to access only one data processor 10 at a time.

In Stream access mode, no address is externally supplied to data processor 10. Instead, data processor 10 must internally generate one or more addresses for the information transfer. Also, when data processor 10 is in Stream access mode, any number of bytes of data may be transferred to or from data processor 10 as a "stream" of data. In the illustrated embodiment, the Stream access mode can be used to access one or more data processors 10 at a time.

Several registers may serve a special function or may only be used when data processor 10 is in Stop mode. In the illustrated embodiment of the present invention, Offset Address Register #1 (OAR1) 96, Offset Address Register #2 (OAR2) 98, Depth Control Register #1 (DCR1) 97, Depth Control Register #2 (DCR2) 99, Host Stream Select Register (HSSR) 100, and Host Stream Offset Register (HSOR) 222 are used when data processor 10 is in the Stop mode of operation and in the Stream access mode.

(5.4) Extended Length Operations in a Data Processor

A common problem in data processors is the need to perform arithmetic computations on data values which are wider, i.e. have more bits, than can be accommodated by the available Arithmetic Logic Unit (ALU) circuitry in one ALU cycle. For example, it is not uncommon for a data processor to be required to add two 32-bit data values using a 16-bit ALU. Prior art data processors typically support such extended arithmetic by providing a single "carry" or "extension" bit and by providing two versions of computation instructions in order to specify whether or not the carry bit is used as an input to the instruction (e.g., "add" and "add with carry", "subtract" and "subtract with borrow", "shift right" and "shift right with extension", etc.). This traditional approach is adequate for a limited repertoire of operations, but it does not efficiently support other extended length operations. An approach was needed which would efficiently support an expanded repertoire of extended length operations.

Some examples of extended length operations not adequately supported by prior art single-extension-bit methods are as follows: (1) addition of two 2's complement numbers having different lengths (where the shorter number must be sign extended); (2) subtraction of two 2's complement numbers having different lengths (where the shorter number must be sign extended); (3) computing the minimum of two extended length numbers (either signed or unsigned); (4) computing the maximum of two extended length numbers (either signed or unsigned); (5) comparing two extended length numbers (either signed or unsigned) and using the result to control conditional branching or other conditional action; and (6) computing extended length pseudo-random numbers.

An approach was needed which would efficiently support an expanded repertoire of extended length operations. The present invention efficiently supports an expanded repertoire of extended length operations, as well as supporting add, subtract, and shift operations. The present invention involves new instructions executed by a data processor, as well as circuitry in the data processor for implementing the new instructions.

The present invention uses new instructions for performing extended length operations. A new instruction may actually be implemented using two versions of the instruction, namely a "preliminary" version of the instruction and a "non-preliminary" version of the instruction. In the present invention, different versions of a new instruction are used to determine how extension bits are modified as a result of the instruction; the different versions of an instruction are not used to determine whether or not a single extension bit will be used as an input. Note that in the prior art, different versions of an instruction were used to specify whether or not a single extension bit was used as input to, not an output from, the instruction. In addition, the new instructions use two extensions bits, where each extension bit may serve a different function for different instructions. There is no fixed carry or borrow bit; there is no fixed shift extension bit.

Referring to FIG. 2-44, Table 2.29, FIG. 2-64, and Table 2.31, in one embodiment data processor 10 has two extension bits, namely X0 and X1. Note that the terms "X0" and "xX0" are used interchangeably to represent either the SX0 bit 210 located in the Scalar Process Control Register (SPCR) 208 in scalar engine 26, or the VX0 bit 104 located in the Vector Process Control Register (VPCR) 102 in vector engine 9. Likewise, note that the terms "X1" and "xX1" are used interchangeably to represent either the SX1 bit 212 located in the SPCR register 208 in scalar engine 26, or the VX1 bit 105 located in the VPCR register 102 in vector engine 9.

Most of the instructions executed by data processor 10 unconditionally clear both extension bits X0 and X1 to their default state (logic state zero in the illustrated embodiment), signifying "null" extension data. However, certain instructions called "preliminary" instructions may selectively modify the extension bits. An extended length computation typically uses one or more preliminary instructions. Each preliminary instruction selectively modifies the extension bits to produce extension data for the subsequent instruction. Normally, a series of one or more preliminary instructions is followed by one non-preliminary instruction. The non-preliminary instruction returns the extension bits to their default or negated state, which in the illustrated embodiment is a zero logic state.

Both the preliminary instructions and the non-preliminary instructions use the extension bits as inputs, but are designed to disregard as an input the default extension bit code %00. The interpretation of extension data depends on the kind of extended length operation being performed, as will be explained herein below. The various categories of extended operations, and thus the new instructions, will be discussed. For purposes of illustration, it will be assumed that the ALU is one byte wide. However, it is important to note that the same extension methods could apply to an ALU of any width.

Addition and subtraction operations will now be discussed. For addition and subtraction operations, extension bit X0 represents carry or borrow information; extension bit X1 represents the sign bit of the source operand for the preliminary instruction producing the extension data. This sign information in extension bit X1 may be used by subsequent "add sign extension" instructions to sign extend the shorter number in order to correctly complete the addition of two 2's complement signed numbers having different lengths.

FIG. 5-8 illustrates the execution of a series of four instructions, "addp", "addp", "addsxp", and "addsx", which are used to perform an addition operation using two 2's complement signed numbers having different lengths. FIG. 5-8 illustrates the addition of a 2-byte number contained in registers pair (G1,G0) to a 4-byte number contained in the 4-register group (G5,G4,G3,G2). The result of the addition operation is placed in register group (G5,G4,G3,G2). The 4-instruction code sequence is executed by data processor 10 in the following order.

```
addp G0, G2     ; add preliminary G0 to G2
                ;   (generates extension bits)
addp G1, G3     ; add preliminary G1 to G3
                ;   (generates extension bits)
addsxp G4       ; add sign extension preliminary to G4
                ;   (generates ext. bits)
addsx G5        ; add sign extension to G5
                ;   (clears extension bits)
```

The resulting computation is illustrated in FIG. 5-8 using sample values. Initially, the two extension bits X0 and X1 are assumed to have been negated or placed in their default state by a preceding non-preliminary instruction. Note that extension bit X0 acts as a carry bit for addition operations and as a borrow bit for subtraction operations. Extension bit X1 reflects the sign bit or most significant bit of the source operand of the preliminary instruction generating it. The "addp" instructions ignore their incoming X1 bits and use the X0 bit as a carry input. The X1 output of the second "addp" instruction reflects the sign bit of the shorter source operand located in register G1. This sign information in extension bit X1 is used by the "addsxp" instruction to select the appropriate sign extension value, namely $FF in the illustrated example, as opposed to $00. The "addsxp" instruction leaves extension bit X1 unchanged so that the subsequent "addsx" instruction likewise can select the correct sign extension value.

Referring to Section 2.5.9, Section 2.5.19.1, and the definition of saturation in the Glossary, the terms "overflow" and "saturation" are discussed. "Overflow" refers to a situation in which the value to be stored in a register exceeds the maximum value which the register can store (e.g. attempting to store $1FF in an 8-bit register). "Saturation" refers to a method of handling overflow situations in which the value in the register is replaced with an upper or lower boundary value, for example $FF for an 8-bit unsigned maximum boundary value.

The non-preliminary instructions "add" and "vadd" are saturating instructions and the preliminary instructions "addp" and "vaddp" are non-saturating instructions. For a scalar "add" instruction, the result of the addition operation is replaced by either an upper bound or a lower bound when an overflow value, the SV bit 214 located in SPCR register 208, is asserted. A corresponding overflow direction bit, SD bit 216 located in the SPCR register 208, determines whether the overflow was in the positive or negative direction. The direction of the overflow determines which boundary value, the upper bound or the lower bound, is used to replace the result of the data processing operation. A sign bit, SSGN bit 174 located in the Arithmetic Control Register (ACR) 172, indicates whether the number is signed or unsigned. Whether the number is signed or unsigned determines the values of the upper and lower bounds.

For a vector "vadd" instruction, the result of the addition operation is replaced by either an upper bound or a lower bound when an overflow value, the VV bit 106 located in VPCR register 102, is asserted. A corresponding overflow direction bit, VD bit 108 located in the VPCR register 102, determines whether the overflow was in the positive or negative direction. The direction of the overflow determines which boundary value, the upper bound or the lower bound, is used to replace the result of the data processing operation. A sign bit, VSGN bit 176 located in the Arithmetic Control Register (ACR) 172, indicates whether the number is signed or unsigned. Whether the number is signed or unsigned determines the values of the upper and lower bounds.

Minimum and maximum operations will now be discussed. For minimum and maximum operations, multi-byte computation begins with the most significant byte and proceeds through the least significant byte. During multi-byte minimum and maximum operations, the two extension bits are used to distinguish the following conditions: (1) the source operand has already been found to exceed the destination operand so the results of any subsequent comparisons of less significant bytes are irrelevant; (2) the destination operand has already been found to exceed the source operand so the results of any subsequent comparisons of less significant bytes are irrelevant; and (3) the source and destination operands are identical thus far in their high order bytes, so the comparison of less significant bytes must continue in order to determine which operand is greater.

Comparisons and conditional tests will now be discussed. For tests based on multi-byte comparisons, computation begins with the most significant byte and proceeds through the least significant byte. The extension bits are used to distinguish the same three conditions as for minimum and maximum operations. In some embodiments of the present invention, a single type of compare preliminary instruction may be used together with several different types of non-preliminary conditional instructions to test different conditional action criteria, such as equal to, greater than, less than, etc.

Pseudo-random number generation will now be discussed. For pseudo-random number generation operations, assuming a right-shifting linear feedback shift register type of technique, multi-byte computation begins with the most significant byte and proceeds through the least significant byte using preliminary instructions. Then at the end, one non-preliminary instruction execution is needed to perform final adjustment of the most significant bit of the most significant byte. During the pseudo-random number computation, one extension bit acts as a carry bit for the multi-byte right shift operation, and the other extension bit indicates whether the "ones tally" operation has thus far encountered an odd or even number of ones. Alternatively, an equivalent left-shifting linear feedback shift register type of technique could be used with multi-byte computation proceeding from the least significant byte through the most significant byte. In this case, the final adjustment to the least significant bit could be performed by an "add" instruction as the ending non-preliminary instruction.

FIG. 5-9, FIG. 5-10, and FIG. 5-11 illustrate steps involved in the execution of various preliminary and non-preliminary instructions. Alternate embodiments of the present invention may have more, fewer, or different preliminary and non-preliminary instructions. FIG. 5-9 illustrates steps involved in the execution of certain shift instructions. FIG. 5-10 illustrates steps involved in the execution of certain comparative instructions. FIG. 5-11 illustrates steps involved in the execution of certain arithmetic instructions. Note that in the illustrated embodiment of the present invention, the left shift preliminary instruction "lshftp" is implemented using the add preliminary instruction "addp".

(5.5) Data movement Operations in a Data Processor

A common problem in data processors using vectors is the need to calculate the sum, or total, of the elements of a vector. In some applications, only a scalar result (i.e. the total of all vector elements) is required. In other applications, a vector of cumulative sums must be calculated. The need for combining vector elements into a single overall aggregate value or into a vector of cumulative partial aggregates is not limited to addition. Other aggregation operations, such as minimum and maximum, are also required for some applications. A more effective technique and mechanism for combining vector elements into a single overall aggregate value is required.

Like the prior art, the present invention computes the total sum of the elements of the vector; in addition, the present invention simultaneously computes the vector of cumulative sums. Note that in the present invention, the total sum of the elements of the vector is the final component of the cumulative sum vector. The present invention uses fast, SIMD-style (single-instruction multiple-data style) parallel computing in a manner which has cost-performance advantages over the prior art. The invention involves new instructions and the associated circuitry for implementing the new instructions.

In the prior art, there is a parallel algorithm called "recursive doubling" for calculating the sum of the elements of a vector. FIG. 5-12 (prior art) illustrates how this recursive doubling algorithm may be implemented to calculate the sum of the elements of a vector having eight elements. Note that processing element #0 starts out storing the value "A", processing element #1 starts out storing the value "B", processing element #2 starts out storing the value "C", processing element #3 starts out storing the value "D", processing element #4 starts out storing the value "E", processing element #5 starts out storing the value "F", processing element #6 starts out storing the value "G", and processing element #7 starts out storing the value "H".

Still referring to FIG. 5-12, illustrated in the second column from the left, the vector elements are grouped into pairs and a first set of intermediate sums is computed for each pair. This first set of intermediate sums is computed simultaneously with parallel processing hardware. Illustrated in the third column from the left, the first set of intermediate sums are similarly paired and summed, producing a second set of intermediate sums, one for each group of four original vector components. Illustrated in the fourth column from the left, the second set of intermediate sums are similarly paired and summed, producing one total sum of the elements of the vector, namely "A+B+C+D+E+F+G+H".

When this prior art recursive doubling algorithm is programmed to run on a classical SIMD-style parallel computer, each step of the algorithm may require the following substeps: [substep #1] make a copy of the vector of sums resulting from the previous step (or of the original vector if this is the first step); [substep #2] shift this copy of the vector $2^{(i-1)}$ places relative to the unshifted copy of the vector (note that "i" is the step number; note that this shifting is by $2^{(i-1)}$ vector element positions, not by $2^{(i-1)}$ bit positions within each element); and [substep #3] perform a vector addition by adding the unshifted copy of the vector to the shifted copy. Referring to FIG. 5-12, the first step of the algorithm requires the three substeps 1, 2, and 3. The second step of the algorithm requires the three substeps 4, 5, and 6. And the third step of the algorithm requires the three substeps 7, 8, and 9.

However, this prior art recursive doubling algorithm has the following disadvantages. Firstly, several instructions are required for each step of the algorithm (as illustrated in FIG. 5-12). Secondly, a second vector register or some equivalent vector temporary space is consumed by the duplicate vector copy produced in substep #1 above. Thirdly, in a classical SIMD processor, the vector shift operation in substep #2 above either requires $2^{(i-1)}$ sequential steps, or else requires that the processing elements communicate through a relatively expensive interconnection network capable of performing multi-place shifts in a single step. And lastly, most prior art recursive doubling algorithm produces only the grand total (i.e. the total sum of the elements of the vector), but not the vector of cumulative sums required for some applications.

The present invention implements a useful technique and mechanism for performing data movement operations for vector operands. The technique and mechanism is also capable of optionally combining data movement operations with various types of computations.

In the illustrated embodiment of the present invention, the following instructions are used to perform various data movement operations for vector operands: "dadd", "daddp", "dmin", "dminp", "dmax", "dmaxp", "dsrot", and "drotmov". See Table 2.42, FIG. 2-73, and Section 2.5.11.1 for information regarding the "drotmov" instruction. See Table 2.42, Table 2.43, and Section 2.5.11.2 for information regarding the "dsrot" instruction. See Table 2.44, Table 2.46, and Section 2.5.12.2 for information regarding the "dadd", "daddp", "dmin", "dminp", "dmax", and "dmaxp" instructions.

(5.5.1) Instructions "dadd", "daddp", "dmin", "dminp", "dmax", and "dmaxp"

The present invention overcomes the disadvantages of the prior art recursive doubling algorithm by providing a new SIMD computer instruction called "downward add", having the mnemonic "dadd". The "dadd" instruction contains two fields, one specifying the amount of downward shifting and the other specifying a vector register number (see Table 2.44).

Referring to FIG. 5-13, FIG. 5-14, FIG. 5-15, and FIG. 5-16, the instruction "dadd #N, vreg2" functions in the following manner. Addition takes place only in half of the processing elements (PEs) 16, namely those with a one in bit position "N" of their respective processing element numbers (counting the least significant bit position as 0). Each processing element of this type adds the value passed from the processing element above to its local Vector Data Register 128 (see FIG. 2-63). The notation V[x] and Vn are both used to represent any of the Vector Data Registers 128. Processing elements not of this type leave their V[x] Register values unchanged. The processing mask, VT bits 110 (see FIG. 2-64 and Table 2.31), may be used in the normal manner to suppress result storing in any of the processing elements which otherwise would modify their V[x] Registers 128. Multiplexers (MUXs) 310, 312, 314, 316, 318, 320, 322, and 324 are used to select whether a processing element 16 acts as the source of the data value being transferred, or whether a processing element 16 instead passes on the data value it received.

If a processing element 16 has all ones in the "N" least significant bits of its processing element number, it passes the value from its V[x] Register to the processing element below. If a processing element 16 has a one in bit position "N", it passes along the value it receives from the processing element above. If [11]"N" is equal to zero, then every processing element passes the value from its V[x] Register 128 to the processing element below. The VT bits 110 have no effect on which value a processing element passes to its neighbor below. Note that it does not matter whether or not the last processing element passes a value around to the first processing element, since a value passed into the first processing element from above is never used, regardless of what "N" value is specified.

If a processing element [#(x+1)] does not store the result of its computation (i.e. it has zero in bit position "N"), then the processing element [#x] may either pass data through from above, i.e. from processing element [#(x−1)], or may source data from its V[x] register 128. Thus some processing elements are required to pass data through, some processing elements are required to source data, and other processing elements can do either due to the fact that the processing element below has zero in bit position "N".

The following example illustrates how four applications of the "dadd" instruction to a Vector Data Register 128, V[0], effectively replaces a 16-element vector with the cumulative totals of its original elements. Observe that "M" applications of the "dadd" instruction are sufficient to total any $2^M$ element subvectors starting on a $2^M$ processing element boundary. Note also that these same M applications of the "dadd" instruction are sufficient to total any subvector of fewer than $2^M$ consecutive elements starting on a $2^M$ boundary. Finally, note that a "processing mask", namely the VT bits 110 in the illustrated embodiment, may be used to suppress element modification at the bottom of a $2^M$ element group without affecting computation results above those elements within the group.

INSTRUCTIONS dadd #0, V0
dadd #1, V0
dadd #2, V0
dadd #3, V0

| PE# | initial value | after dadd #0 | after dadd#1 |
|---|---|---|---|
| 0000 | x0 | x0 | x0 |
| 0001 | x1 | (x0) + x1 | x0 + x1 |
| 0010 | x2 | x2 | (x0 + x1) + x2 |
| 0011 | x3 | (x2) + x3 | (x0 + x1) + x2 + x3 |
| 0100 | x4 | x4 | x4 |
| 0101 | x5 | (x4) + x5 | x4 + x5 |
| 0110 | x6 | x6 | (x4 + x5) + x6 |
| 0111 | x7 | (x6) + x7 | (x4 + x5) + x6 + x7 |
| 1000 | x8 | x8 | x8 |
| 1001 | x9 | (x8) + x9 | x8 + x9 |
| 1010 | x10 | x10 | (x8 + x9) + x10 |
| 1011 | x11 | (x10) + x11 | (x8 + x9) + x10 + x11 |
| 1100 | x12 | x12 | x12 |
| 1101 | x13 | (x12) + x13 | x12 + x13 |
| 1110 | x14 | x14 | (x12 + x13) + x14 |
| 1111 | x15 | (x14) + x15 | (x12 + x13) + x14 + x15 |

| PE# | after dadd#2 |
|---|---|
| 0000 | x0 |
| 0001 | x0 + x1 |
| 0010 | x0 + x1 + x2 |
| 0011 | x0 + x1 + x2 + x3 |
| 0100 | (x0 + x1 + x2 + x3) + x4 |

-continued

| | |
|---|---|
| 0101 | (x0 + x1 + x2 + x3) + x4 + x5 |
| 0110 | (x0 + x1 + x2 + x3) + x4 + x5 + x6 |
| 0111 | (x0 + x1 + x2 + x3) + x4 + x5 + x6 + x7 |
| 1000 | x8 |
| 1001 | x8 + x9 |
| 1010 | x8 + x9 + x10 |
| 1011 | x8 + x9 + x10 + x11 |
| 1100 | (x8 + x9 + x10 + x11) + x12 |
| 1101 | (x8 + x9 + x10 + x11) + x12 + x13 |
| 1110 | (x8 + x9 + x10 + x11) + x12 + x13 + x14 |
| 1111 | (x8 + x9 + x10 + x11) + x12 + x13 + x14 + x15 |

| PE# | after dadd#3 |
|---|---|
| 0000 | x0 |
| 0001 | x0 + x1 |
| 0010 | x0 + x1 + x2 |
| 0011 | x0 + x1 + x2 + x3 |
| 0100 | x0 + x1 + x2 + x3 + x4 |
| 0101 | x0 + x1 + x2 + x3 + x4 + x5 |
| 0110 | x0 + x1 + x2 + x3 + x4 + x5 + x6 |
| 0111 | x0 + x1 + x2 + x3 + x4 + x5 + x6 + x7 |
| 1000 | (x0 + x1 + x2 + x3 + x4 + x5 + x6 + x7) + x8 |
| 1001 | (x0 + x1 + x2 + x3 + x4 + x5 + x6 + x7) + x8 + x9 |
| 1010 | (x0 + x1 + x2 + x3 + x4 + x5 + x6 + x7) + x8 + x9 + x10 |
| 1011 | (x0 + x1 + x2 + x3 + x4 + x5 + x6 + x7) + x8 + x9 + x10 + x11 |
| 1100 | (x0 + x1 + x2 + x3 + x4 + x5 + x6 + x7) + x8 + x9 + x10 + x11 + x12 |
| 1101 | (x0 + x1 + x2 + x3 + x4 + x5 + x6 + x7) + x8 + x9 + x10 + x11 + x12 + x13 |
| 1110 | (x0 + x1 + x2 + x3 + x4 + x5 + x6 + x7) + x8 + x9 + x10 + x11 + x12 + x13 + x14 |
| 1111 | (x0 + x1 + x2 + x3 + x4 + x5 + x6 + x7) + x8 + x9 + x10 + x11 + x12 + x13 + x14 + x15 |

Note that the data movement among processing elements 16 which is used for the "dadd" instruction does not require a complex interconnection network and does not require slow multiple executions of single-place shifts. Since the instruction "dadd #N, Vn" only requires every ($2^N$)th element to be copied to the $2^N$ processing elements below, a simple nearest neighbor communication scheme among processing elements 16 is sufficient. Each processing element may accept data passed to it from its neighboring processing element above. And each processing element passes to its neighbor below either data from that processing element's local storage (i.e. Vector Data Register 128), or a copy of the data received from the processing element above. The microsequencer 22 (see FIG. 2-67) determines how much propagation delay time to allow for each instruction. Note that the longest downward propagation path is proportional to $2^N$, and "N" is received by microsequencer 22 in a field of the "dadd" instruction.

The "dadd" instruction can be extended to handle multi-word vector elements and/or saturating arithmetic. Note that the preliminary instruction "daddp" performs shifts and adds in the same manner as described above for the non-preliminary instruction "dadd". The "dmin", "dminp", "dmax", and "dmaxp" instructions function in the same manner as the "dadd" instruction, except the computations performed are minimum or maximum comparisons rather than additions. See Table 2.44, Table 2.46, and Section 2.5.12.2 for further information regarding the "dadd", "daddp", "dmin", "dminp", "dmax", and "dmaxp" instructions.

(5.5.2) Instruction "dsrot"

The "dadd" instruction combines vector addition with downward rotation (i.e., shifting of vector elements across processing elements 16) to facilitate efficient recursive-doubling-style summing. Similar instructions can be provided for other commonly used aggregation operations, such as minimum and maximum, but it is not practical to anticipate and provide separate instructions for all possible aggregation operations that future users might want. For additional flexibility, a "downward sparse rotate" instruction, "dsrot", was provided in order to allow the user to program reasonably efficient recursive-doubling-style algorithms for other possible aggregation operations. This instruction performs sparse multi-place downward circular shifting.

Referring to Table 2.42, Section 2.5.11.2, and Table 2.43, the instruction "dsrot #N, vreg2" functions in the following manner. Each processing element 16 copies the value passed from the processing element above to its local Vn register. The processing mask, VT bits 110, may be used in the normal manner to suppress result storing in any of the processing elements. If a processing element has all ones in the "N" least significant bits of its processing element number, it passes the value from its Vector Data Register (Vn) 128 (see FIG. 2-63) to the processing element below; otherwise, it passes along the value it receives from the processing element above.

If "N" equals zero, then every processing element passes the value from its Vn register to the processing element below. The VT bits 110 have no effect on which value a processing element passes to its neighbor below. The last processing element passes a value around to the first processing element in circular fashion. Which processing element 16 functions as the last one in the chain is specified by Processing Element Select Register (PESR) 220 (see FIG. 2-15).

The following examples illustrate the functionality performed by the "dsrot" instruction with a circular chain of sixteen processing elements.

| PE# | initial value | after dsrot #0, Vn |
|---|---|---|
| 0000 | x0 | x15 |
| 0001 | x1 | x0 |

-continued

| | | |
|---|---|---|
| 0010 | x2 | x1 |
| 0011 | x3 | x2 |
| 0100 | x4 | x3 |
| 0101 | x5 | x4 |
| 0110 | x6 | x5 |
| 0111 | x7 | x6 |
| 1000 | x8 | x7 |
| 1001 | x9 | x8 |
| 1010 | x10 | x9 |
| 1011 | x11 | x10 |
| 1100 | x12 | x11 |
| 1101 | x13 | x12 |
| 1110 | x14 | x13 |
| 1111 | x15 | x14 |

| PE# | initial value | after dsrot #1, Vn |
|---|---|---|
| 0000 | x0 | x15 |
| 0001 | x1 | x15 |
| 0010 | x2 | x1 |
| 0011 | x3 | x1 |
| 0100 | x4 | x3 |
| 0101 | x5 | x3 |
| 0110 | x6 | x5 |
| 0111 | x7 | x5 |
| 1000 | x8 | x7 |
| 1001 | x9 | x7 |
| 1010 | x10 | x9 |
| 1011 | x11 | x9 |
| 1100 | x12 | x11 |
| 1101 | x13 | x11 |
| 1110 | x14 | x13 |
| 1111 | x15 | x13 |

| PE# | initial value | after dsrot #2, Vn |
|---|---|---|
| 0000 | x0 | x15 |
| 0001 | x1 | x15 |
| 0010 | x2 | x15 |
| 0011 | x3 | x15 |
| 0100 | x4 | x3 |
| 0101 | x5 | x3 |
| 0110 | x6 | x3 |
| 0111 | x7 | x3 |
| 1000 | x8 | x7 |
| 1001 | x9 | x7 |
| 1010 | x10 | x7 |
| 1011 | x11 | x7 |
| 1100 | x12 | x11 |
| 1101 | x13 | x11 |
| 1110 | x14 | x11 |
| 1111 | x15 | x11 |

| PE# | initial value | after dsrot #3, Vn |
|---|---|---|
| 0000 | x0 | x15 |
| 0001 | x1 | x15 |
| 0010 | x2 | x15 |
| 0011 | x3 | x15 |
| 0100 | x4 | x15 |
| 0101 | x5 | x15 |
| 0110 | x6 | x15 |
| 0111 | x7 | x15 |
| 1000 | x8 | x7 |
| 1001 | x9 | x7 |
| 1010 | x10 | x7 |
| 1011 | x11 | x7 |
| 1100 | x12 | x7 |
| 1101 | x13 | x7 |
| 1110 | x14 | x7 |
| 1111 | x15 | x7 |

The "dsrot" instruction provides only the data movement portion of "recursive doubling" style aggregation. However, by using the "dsrot" instruction in conjunction with vector computation, it is possible to write software instruction routines to perform any desired aggregation operation. Note that the "dsrot" instruction can be implemented with the same inexpensive nearest neighbor communication scheme as can be used to implement the "dadd" and "daddp" instructions.

In addition, note that a special case of the "dsrot" instruction can be used to perform dense (as opposed to sparse) rotation, in which all vector element values move. The instruction "dsrot #0, Vn" performs a one-place downward rotation on all elements of vector register Vn. Multi-place downward rotation of all vector elements can be performed by executing this instruction multiple times. Dense rotation operations of this type are useful for certain applications. Note that in alternate embodiments of the present invention, upward shifts could be used in place of downward shifts.

(5.6) Multi-Level Conditional Execution of Instructions (5.6.1) Instructions "vif", "velse", and "vendif"

The present invention enables the conditional execution of instructions to be implemented in a straightforward manner which requires a minimal amount of circuitry, but which nevertheless allows a great deal of software flexibility. Three conditional instructions types are used, namely "vif", "velse", and "vendif". The letter "v" at the beginning of the instruction name indicates that the instruction is a vector instruction. The "vif" instruction type is actually a set of instructions having a mnemonic form of "vif" and including a conditional test. The set of "vif" instructions includes the following individual instructions:

| "vif" instructions | condition |
|---|---|
| "vifeq" | if equal |
| "vifge" | if greater than or equal to |
| "vifgt" | if greater than |
| "vifle" | if less than or equal to |
| "viflt" | if less than |
| "vifne" | if not equal to |
| "vifnv" | if no overflow |
| "vifv" | if overflow |

For a listing of all of the conditional instructions, see Table 2.47. In alternate embodiments of the present invention, more, less, or different conditions could be included in the "vif" type of instruction. Also, in alternate embodiments of the present invention, additional or different conditional instructions types could be used.

The present invention also uses two bits within each processing element 16, namely the VT bit 110 and the VH bit 112. The VT bit 110 and the VH bit 112 are both located in the Vector Process Control Register (VPCR) 102. The VPCR register 102 is illustrated in FIG. 2-64, and is described in Table 2.31 and the text in Section 2.3.47. Alternate embodiments of the present invention may use more than one bit (VT bit 110) to represent an enable value or mask value. Likewise, alternate embodiments may use more than one bit (VH bit 112) to represent a history value. The VH bit 112 is called the history value or history bit because it indicates the history or prior logic states of the VT bit 110.

Table 2.48 illustrates the next state transition table for VT bits 110 and VH bits 112 resulting from execution of "vif", "velse", and "vendif" instructions. The column labeled $Q_n$ represents the current logic state of VT bit 110 and VH bit 112 before the specified conditional instruction is executed (see the rightmost column for the specified conditional instruction). The column labeled $Q_{n+1}$ represents the next logic state of VT bit 110 and VH bit 112 at the conclusion of execution of the specified conditional instruction (see the rightmost column for the specified conditional instruction). The state transition numbers listed in the leftmost column correspond to the ten circled state transitions illustrated in FIG. 2.75.

FIG. 2-75 illustrates the state transition diagram for VT bit 110 and VH bit 112 resulting from execution of "vif", "velse", and "vendif" instructions. Note that execution of the "vif" instructions is dependent upon the current logic state of the VT bits 110. The conditional test which is part of the "vif" instructions is performed individually by each processing element 16. A processing element 16 only participates in execution of a "vif" instruction if the VT bit 110 for that processing element 16 was asserted when the conditional instruction began to execute. Note that the "velse" and "vendif" instructions execute independently of the current logic state of the VT bit 110.

The combination of the enable value (VT bit 110) and the history value (VH bit 112) allows software programming constructs to be implemented at the circuitry level. For example, a high-level software construct using "if", "elseif", "else", and "endif" high-level software commands can be implemented at the circuitry level using the "vif", "velse", and "vendif" instructions along with the enable value (VT bit 110) and the history value (VH bit 112). Each processing element 16 participates in only one of the "if", "elseif", and "else" portions of software instructions. The history value indicates whether or not the processing element 16 has participated in one of the prior "if" or "elseif" portions of software instructions. Note that if the "if" and "else" constructs are used without the "elseif" construct, the VH bit 112 is not required.

For implementing most common high-level constructs, the first instruction in a sequence will be one of the "vif" instructions and the last instruction in the sequence will be an "vendif" instruction. A simple sequence may have only one "velse" instruction between the "vif" instruction and the "vendif" instruction. A more complex sequence may have multiple "velse"-"vif" instruction pairs followed by a "vendif" instruction as illustrated in the example in Table 3.13.

Note that "vif", "velse", and "vendif" instructions can be nested by using general purpose registers to hold sequential copies of the VT bits 110 and the VH bits 112. Referring to Table 2.47, the left shift instructions "vlshftt" and "vlshfth" and the right rotate instructions "vrotrt" and "vrotrh" can be used to stack and unstack sequential copies of the VT bits 110 and the VH bits 112.

Certain other instructions also contain an implied "vendif" construct. For example, the "repeat" and "repeate" instructions also modify the VT bits 110 and the VH bits 112. And the "dskip" and "dskipe" instructions also modify the VT bits 110 and the VH bits 112. Table 2.65 illustrates which instructions execute independently of the logic states of the VT bits 110 and the VH bits 112, and which instructions are dependent upon the logic states of the VT bits 110 and/or the VH bits 112.

Table 3.13, Table 3.14, and Section 3.6.5.4 in the text illustrate an example of the conditional execution of instructions using the "vif", "velse", and "vendif" instructions in conjunction with the VT bits 110 and the VH bits 112.

(5.6.2) Instructions "dskip " and "dskipe"

Table 2.52 briefly defines the operation of the "dskip" and "dskipe" instructions. The "dskip" instruction decrements the contents of a designated scalar register and causes execution of the next instruction to be skipped if the new contents of the scalar register is $FF (which is equivalent to the two's complement representation of decimal negative one). The "dskipe" instruction performs the same steps as the "dskip" instruction. In addition, the "dskipe" instruction performs the same steps as an "vendif" instruction, namely: (1) ensure that the VT bits 110 are asserted; and (2) ensure that the VH bits 112 are negated. FIG. 5-17 illustrates a flow chart of the steps performed during execution of the "dskip" and "dskipe" instructions.

The "dskipe" instruction executes the same steps as the "dskip" instruction; but in addition, the "dskipe" instruction executes the same steps as the "vendif" instruction, namely setting the VT bits 110 and negating the VH bits 112. Thus the "dskipe" instruction takes care of ensuring that the VT bits 110 and the VH bits 112 have been returned to their default or reset state. Thus by using the "dskipe" instruction instead of the "dskip" instruction, the VT bits 110 and the VH bits 112 can be returned to their default state. Using a "dskipe" instruction removes the need for executing a "vendif" instruction before a "dskip" instruction. In many applications, the next instruction after a "dskip" or "dskipe" instruction will be an instruction which makes a change in the program flow (e.g. a jump instruction). And it is often necessary to ensure that the VT bits 110 and the VH bits 112 are returned to their default state before a change in the program flow is made.

Although the present invention adjusts the data value in the scalar register by decrementing the data value, alternate embodiments of the present invention may use other various methods of adjustment. For example, an arithmetic unit may be used to either add or subtract an adjust value. The adjust value may be a number other than one. For example, the adjust value may be a power of two or may be a negative number. Alternately, an incrementer could be used instead of a decrementer. The data value could be incremented until it matched a predetermined value. Although the predetermined value in the illustrated embodiment is a decimal negative one in two's complement form ($FF in hexadecimal), any predetermined value could have been used. For example, zero could have been used as the predetermined value. In addition, the comparison test may be a less than or equal to test rather than just an equality test. Likewise, the comparison test may be a greater than or equal to test rather than just an equality test.

(5.6.3) Instructions "repeat" and "repeate"

Table 2.52 defines the operation of the "repeat" and "repeate" instructions. The "repeat" and "repeate" instructions cause the subsequent "N" instructions to be skipped, or cause the subsequent "N" instructions to be executed "M" times as a loop of instructions.

Referring to FIG. 5-18-1, FIG. 5-18-2, FIG. 2-76 through FIG. 2-80, and Section 2.5.17, the "repeat" and "repeate" instructions cause the same steps to be performed, with the following exception. The "repeate" instruction causes an implied "vendif" instruction to be added as the last instruction in the loop. Thus each time the last explicit instruction in the loop finishes execution, all of the VT bits 110 and all of the VH bits 112 are cleared. Thus at the end of the loop of instructions, the "repeate" instruction causes the VT bits 110 and the VH bits 112 to be returned to their default or reset state.

Note that there are several ways to implement an explicit or implied "vendif" instruction. For example, regardless of their present logic state, all of the VT bits 110 may be forced to the asserted logic state and all of the VH bits 112 may be forced to the negated logic state. Alternately, only those VT bits 110 which are not presently asserted may be forced to the asserted logic state, and all of the VH bits 112 which are not presently negated may be forced to the negated state.

Referring to FIG. 2-41, the Microsequencer Control Register (MCR) 188 has a RELF bit 198 and a RPLF bit 200. The RELF bit 198 indicates whether or not a "repeate" loop is currently being executed. The RPLF bit 200 indicates whether or not a "repeat" loop is currently being executed.

In the illustrated embodiment of the present invention, the following registers are used to implement loops initiated by the "repeat" and "repeate" instructions: (a) Repeat Begin Register (RBR) 180 (see FIG. 2-55); (b) Repeat End Register (RER) 182 (see FIG. 2-56); and (c) Repeat Count Register (RCR) 184 (see FIG. 2-57). In alternate embodiments of the present invention, more registers, fewer registers, or different registers may be used to store parameters required to perform loops initiated by the "repeat" and "repeate" instructions.

(5.7) Data Processor Architecture

Some applications, such as fuzzy logic, neural networks, and other parallel, array oriented applications tend to utilize some data processing tasks that are best performed by SISD processors, as well as some data processing tasks that are best performed by SIMD processors. The present invention combines some of the advantages of SISD (Single Instruction Single Data) processors as well as some advantages of SIMD (Single Instruction Multiple Data) processors.

Referring to FIG. 2-67, data processor 10 has a single microsequencer 22 which is capable of supplying control signals to vector engine circuitry 9 and to scalar engine circuitry 26. When a vector instruction is being executed, microsequencer 22 provides control signals to vector engine 9; when a scalar instruction is being executed, microsequencer 22 provides control signals to scalar engine 26. Data processor 10 is only capable of executing one instruction at a time, thus data processor 10 does not execute vector and scalar instructions concurrently. However, in some embodiments of the present invention, a small amount of instruction overlap may be permitted due to pipelining.

Referring to FIG. 2-67, vector engine 9, Input Data Registers (IDR) 18, reset circuit 15, instruction cache 20, microsequencer 22, control registers 24, scalar engine 26, north port 28, south port 30, east port 32, and west port 34 are all bi-directionally coupled to each other by way of the conductors labeled bus 13. Bus switch 11 is coupled between global data bus 38 and broadcast bus 36. Microsequencer 22 is bi-directionally coupled to vector engine 9 by way of bus 23 in order to transfer control and status information. Microsequencer 22 is bi-directionally coupled to scalar engine 26 by way of bus 25 in order to transfer control and status information. Referring to FIG. 2-67 and FIG. 2-69, microsequencer 22 has instruction decode circuitry 19, control circuitry 21, stall circuitry 39, registers 374, and Arithmetic Logic Unit (ALU) 372, all of which are bi-directionally coupled to each other by way of conductors 376 and conductors 378.

In the present invention, a single data processor 10 on a single integrated circuit is capable of executing both scalar instructions and vector instructions using a single on-board microsequencer 22. This single data processor 10 on a single integrated circuit is also capable of functioning without any control from an external processor. In fact, if data processor 10 included an on-board ROM which contained a sequence of instructions that formed a complete software program, data processor 10 could function as the sole data processor being used in an application.

(5.8) Loading Incoming Data into a Data Processor

Many fuzzy logic, neural networks, and other parallel, array oriented applications require a flexible data storage technique which allows an integrated circuit to select and store incoming data in a variety of patterns. It is desirable for the integrated circuit receiving the data, not the device transmitting the data, to select the appropriate bits of data and store them in the desired arrangement within the integrated circuit. It is also desirable to minimize the software overhead required for selecting and storing incoming data. Although this data storage technique is of considerable use in neural network applications, it may also be used in a wide variety of other applications.

In one embodiment of the present invention, data processor 10 provides two filling modes for storing information into the Input Data Registers (IDR) 18. The first filling mode, called the Index Filling Mode (also called the Input Indexing Mode), is illustrated in FIG. 2-17 and FIG. 5-19. The second filling mode, called the Tag Filling Mode (also called the Input Tagging Mode), is illustrated in FIG. 2-18 and FIG. 5-20. FIG. 5-21 illustrates circuitry which is used to implement the filling modes for IDR 18.

The Filling Mode Bit (FM) 76, located in the PCR register 52 (see FIG. 2-16 and Table 2.10), determines which filling mode is used. Alternate embodiments of the present invention may have more, fewer, or different modes, and may use one or more control bits to select which mode is used. In one embodiment of the present invention, the filling modes are used when data processor 10 is in the "Run" mode of operation; and the filling modes are not used when data processor 10 is in the "Stop" mode of operation. During the Run mode of operation, data is transferred from one data processor 10.*x* to another data processor 10.*x* using broadcast data transfers. The destination of a broadcast data transfer is always the IDR 18 of the receiving data processor 10.*x*.

The Index Filling Mode is used to load consecutive or sequential data inputs into IDR 18. FIG. 2-17 and the accompanying text describe how one embodiment of the present invention uses four control values to coordinate the filling of IDR 18 in Index Filling Mode. In the illustrated embodiment, each of the four control values is located in a different register. Alternate embodiments of the present invention may use more, fewer, or different control values. In addition, the control values may be provided in a different manner than as control values stored in registers.

FIG. 5-19 corresponds to FIG. 2-17 and illustrates an example of a stream of data values which are being received by data processor 10 at one of its ports. The IDR Initial Offset Register (IOR) 130 contains Initial Offset bits (10 bits) 140 which specify a timing value. The timing value determines when during the data stream the IDR Register 18 will start to receive and store data values. In one embodiment of the present invention, the IOR register 130 contains a clock cycle time value that counts the valid data bytes being received at a port and acts as an enabling device when the count in the IOR register 130 is matched by the number of valid data bytes which have been received at the port.

The IDR Pointer Register (IPR) 132 contains Pointer bits (PTR bits) 142 which specify a pointer value. The pointer value affects where in IDR 18 the incoming data is to be stored. The IDR Count Register (ICR) 136 contains Count bits (CNT bits) 146 which specify a count value. The count value affects how many bytes are stored in IDR 18. The IDR Location Mask Register (ILMR) 134 contains Mask bits (M bits) 144 which specify a mask value. The mask value affects how data values are loaded into IDR 18.

Referring to FIG. 5-21, one embodiment of the present invention uses a Shadow IPR register 135 and a Shadow ICR register 139. The shadow registers allow the IPR register 132 and the ICR register 136 to continue to store whatever value the user programmed. At the beginning of an IDR filling operation, the value stored in IPR register 132 is loaded into the Shadow IPR register 135 and the value stored in the ICR 136 register is loaded into the Shadow ICR register 139. The values stored in the Shadow IPR register 135 and the Shadow ICR register 139 can then be modified during the data filling of IDR 18, while the initial values stored in the IPR register 132 and the ICR 136 register are not modified. Circuitry 133 includes the Shadow IPR register 135 and increment circuitry 137. Circuitry 143 includes Shadow ICR register 139 and decrement circuitry 141.

The Shadow IPR register 135 always points to the next free IDR 18 location. The value from the ILMR register 134 is logically combined with the value from the Shadow IPR register 135 in order to determine which locations are written in IDR 18. For example, if the mask value in ILMR register 134 is $00, then one location in IDR 18 is written during the IDR filling operation. If the mask value in ILMR register 134 is $01, then the next two available locations in IDR 18 will receive and store the same data value. The count value in ICR register 136 determines how many data values will be stored in IDR 18. However, when determining how many data values will actually be stored, the greater of the count value or the mask value will determine how many data values will actually be written into IDR 18. Note that one incoming data value can be written to more than one IDR 18 location as is illustrated in FIG. 5-19.

The Tag Filling Mode is used to load non-sequential data inputs into IDR 18. Instead of using the one timing value stored in the IDR Initial Offset Register (IOR) 130, the Tag Filling Mode uses a set of registers called the Input Tag Registers (ITR) 138. Each ITR Register 138 contains a set of ITR bits 148, and each set of ITR bits 148 specifies a timing value. Each timing value determines when during the incoming data stream the IDR 18 will receive and store a data value. Thus the ITR Register 138 allows data processor 10 to designate a particular order in which incoming data values are to be selectively stored in IDR Register 18. FIG. 5-20 corresponds to FIG. 2-18 and illustrates an example of a stream of data values which are being received by data processor 10 at one of its ports.

Referring to FIG. 5-21, in one embodiment of the present invention, as incoming data is received by one of the ports of data processor 10, a counter 156 is incremented. When the value in counter 156 matches the current value in the ITR bits 148, then the incoming data value is loaded into IDR 18. This process is continued until all input samples are loaded into IDR 18, or until the count value contained in ICR Register 136 is reached. Note that in one embodiment of the present invention, an underflow condition from decrement circuitry 141 is used as a control input signal to IDR address generation and control circuitry 154.

The IDR address generation and control circuitry 154, along with the IDR loading circuitry 153, perform the function of coordinating the loading of the IDR register 18. The IDR address generation and control circuitry 154 generates addresses for IDR 18 locations which are to store incoming data values. Circuitry 150 is generally used to specify "when" the IDR Register 18 is loaded; circuitry 151 is generally used to specify "where" in IDR Register 18 the incoming data value will be stored; and circuitry 152 is generally used to specify "how many" data values will be stored in IDR Register 18.

In one embodiment of the present invention, there are sixty-four ITR Registers 138, and each ITR Register 138 is capable of storing a two byte value. Like the IOR Register 130, the ITR Register 138 determines when the input data being broadcast is selected and stored into an IDR 18 location. The other three registers, the IDR Pointer Register (IPR) 132, the IDR Count Register (ICR) 136, and the IDR Location Mask Register (ILMR) 134 all serve the same purpose for both filling modes. Note that the Tag Filling Mode provides a powerful way of implementing a neural network that is not fully connected, or a paradigm that employs the concept of receptive fields.

(5.9) Stalling Technique and Mechanism for a Data Processor

FIG. 5-22-1 and FIG. 5-22-2 illustrate a data coherency technique which ensures data coherency and synchronization for both vector and scalar instructions. This data coherency technique allows coordination between the internal execution of an instruction in data processor 10 and the loading of registers by a source external to data processor 10.

In one embodiment of the present invention the Input Data Registers (IDR) 18 can be used as an input vector to data processor 10. Both scalar and vector operations can be performed using IDR 18. The addressing mode of the operand determines whether the operation is a scalar operation or a vector operation (see Section 2.5.5). A stalling mechanism is used to ensure data coherency. The stalling mechanism allows an instruction that references IDR 18 to wait until all valid data inputs have been placed into IDR 18.

See FIG. 2-68 for an illustration of a shelf and the processing element 16 within each shelf. Note that in the illustrated embodiment of the present invention, the VT bit 110 and the VID bit 114 are both located in the Vector Process Control Register (VPCR) 102 within each processing element 16. Other embodiments of the present invention may use alternate arrangements, such as locating the VT bit 110 and the VID bit 114 as part of IDR 18.

In the illustrated embodiment, there is a one-to-one correspondence between each IDR 18 location and each processing element 16. Thus for each processing element 16 there is a corresponding enable value (VT bit 110) and a corresponding validity value (VID bit 114). In alternate embodiments of the present invention, the enable value may be more than a single enable bit (VT bit 110), and the validity value may be more than a single valid bit (VID bit 114). Also, note that when an instruction performs a write operation with IDR 18 as the destination, only the IDR 18 locations which have their corresponding VT bit 110 asserted are actually written. Thus the VT bits 110 can either be considered as enable values which enable the processing elements 16 which have their respective VT bits 110 asserted, or as mask values which mask out or disable the processing elements 16 which have their respective VT bits 110 negated.

FIG. 5-23 through FIG. 5-25 illustrate some examples of the use of this data coherency technique. FIG. 5-23 and FIG. 5-24 illustrate the response of data processor 10 to a scalar instruction which requires an access to IDR 18. FIG. 5-23 illustrates a case in which data processor 10 does not stall, and FIG. 5-24 illustrates a case in which data processor 10 does stall. FIG. 5-25 illustrates the response of data processor 10 to a vector instruction which requires an access to the Input Data Registers (IDR) 18 and which causes data processor 10 to stall.

In FIG. 5-23, the scalar instruction accesses an IDR location, namely IDR[2] in this example, which has its valid bit asserted (i.e. VID bit 114 is a logical one for processing element #2). An asserted valid bit indicates that the value stored in the corresponding IDR location is valid and can be used during execution of the scalar instruction. Thus the valid data is already available and execution of the scalar instruction can continue. The Global Stall Signal 126 remains negated, indicating to microsequencer 22 that execution of the scalar instruction can continue without any delay. Note that the corresponding enable value, VT bit 110, is not used for scalar instructions.

However, in FIG. 5-24, the scalar instruction accesses an IDR 18 location, namely IDR[2] in this example, which has its valid bit negated (i.e. VID bit 114 is a logical zero for processing element #2). A negated valid bit indicates that the value stored in the corresponding IDR location is not valid and cannot be used during execution of the scalar instruction. Thus data processor 10 must delay execution of the scalar instruction until an external data source has written a valid data value to IDR[2] by way of the ports. The Global Stall Signal 126 is asserted, indicating to microsequencer 22 that execution of the scalar instruction must be delayed until valid data is received.

Once again, note that the corresponding enable value, VT bit 110, is not used for scalar instructions. In some embodiments of the present invention, the external data source can write directly to the VID bit 114, and thus place the VID bit 114 in its asserted state even without writing to IDR 18. Note that the external data source may be a host processor 54 or another data processor 10.*x*.

In FIG. 5-25, the instruction accessing IDR 18 is a vector instruction. The enable values, VT bits 110, are now used. The enable value (VT bit 110) for each processing element 16 determines whether or not that processing element 16 participates during execution of the vector instruction. If the VT bit 110 is negated, then that particular processing element 16 does not participate. Therefore any IDR 18 location which has its enable value negated does not participate, and its validity value is not relevant (i.e. is labeled "don't care"). However, any IDR 18 location which has its enable value asserted does participate, and its validity value is relevant (i.e. is labeled "care"). So in FIG. 5-25, processing elements #1 and #62 do not participate because their VT bits 110 are negated; and processing elements #0, #2, #3, and #63 do participate because their VT bits 110 are asserted.

Continuing with FIG. 5-25, the validity values (VID bits 114) are now used. The vector instruction attempts to access every IDR 18 location which has its VT bit 110 asserted. However, several IDR 18 locations, namely IDR[3] and IDR[63] is this example, are participating but do not yet contain valid data. Thus the VID bits 114 remain negated for processing elements #3 and #63. As a consequence, processing elements #3 and #63 assert their respective vector stall signals 124 (see FIG. 2-68-1). The assertion of any stall signal from any one processing element 16 results in the global stall conductor 126 being placed in its asserted state. In one embodiment of the present invention, the global stall conductor 126 is used in a wire-OR or wire-AND configuration.

In the particular embodiment of the present invention which is illustrated in FIG. 2-68-1, stall generation logic 116 generates two local stall signals, namely scalar stall signal 122 and vector stall signal 124. Scalar stall signal 122 and vector stall signal 124 are logically combined by circuit 121 to produce the global stall signal 126. In the illustrated embodiment, the scalar stall signal 122 is used when the operation utilizing the processing elements 16 is referencing a scalar, and the vector stall signal 124 is used when the operation utilizing the processing elements 16 is referencing a vector. Alternate embodiments of the present invention may generate the global stall signal 126 in a different manner.

The assertion of the signal carried by the global stall conductor 126 indicates to microsequencer 22 that data processor 10 should stall and delay the execution of the present vector instruction until valid data is received and stored in IDR[3] and IDR[63]. Data processor 10 then stalls. Once valid data is received and stored in IDR[3], the VID bit 114 for processing element #3 is asserted and the vector stall signal 124 for processing element #3 is negated. And once valid data is received and stored in IDR[63], the VID bit 114 for processing element #63 is asserted and the vector stall signal 124 for processing element #63 is negated. There are no longer any processing elements 16 asserting a vector stall signal 124, and thus the global stall conductor 126 is returned to its negated state.

Note that if each one of the processing elements 16 which has its VT bit 110 asserted also has its VID bit 114 asserted, none of the processing elements 16 would assert a vector stall signal 124, and the global stall conductor 126 would remain in its negated state. In this case, the IDR 18 locations corresponding to each of the participating processing elements 16 already contain valid data and there is no need to stall.

Regarding the assertion and negation of the VID bits 114, different embodiments of the present invention may use choose from among a wide variety of mechanisms for altering the VID bits 114. Alternate embodiments of the present invention may use one or more of the following mechanisms. First, certain instructions or instruction types may directly alter the VID bits 114. Second, addressing modes may cause the VID bits 114 to be altered. For example, in one embodiment of the present invention, there are two special addressing modes for vector instructions in which IDR 18 is the source register. When the "IDR" addressing mode is used, the VID bits 114 are not affected by the execution of the vector instruction. On the other hand, when the "IDRC" addressing mode is used, the VID bits 114 are negated by the execution of the vector instruction. Third, a reset of data processor 10 may cause the VID bits 114 to be altered. Fourth, a write access to an IDR 18 location may be used to assert the corresponding VID bit 114. Fifth, a write access directly to the VID bits 114 may be used to alter their logic state. Other mechanisms for affecting the VID bits 114 may also be used.

(5.10) Maximum and Minimum Determinations (5.10.1) Instructions "colmax", "rowmax", "locmax", "colmin", "rowmin", and "locmin"

For fuzzy logic, neural networks, and other parallel, array oriented applications, a simple and fast technique and mechanism is needed to allow maximum and minimum determinations to be made for both vector and scalar operands. The technique and mechanism should be able to handle a variable number of data values which have to be compared. In addition, the technique and mechanism should be able to perform maximum and minimum determinations across the boundaries of integrated circuits. Often it is important to determine the location of the minimum or maximum value as well as the value itself. Although this technique for minimum and maximum determinations is of considerable use in neural network applications, it may also be used in a wide variety of other applications.

In one embodiment of the present invention, data processor 10 is capable of executing one or more "colmax", "rowmax", or "locmax" instructions in order to perform a maximum determination. Likewise, data processor 10 is capable of executing one or more "colmin", "rowmin", or "locmin" instructions in order to perform a minimum determination. Alternate embodiments of the present invention may have more, less, or different comparison instructions.

Referring to FIG. 5-26, a comparison line or comparison conductor, labeled wire-OR line 158, is coupled to each processing element 16 in vector engine 9. Each processing element 16 has a corresponding VT bit 110 located in the Vector Process Control Register (VPCR) 102 within each processing element 16 (see FIG. 2-68, FIG. 2-64, and Table 2.31 for information on the VT bits 110). Although FIG. 5-26 illustrates sixty-three processing elements 16, alternate embodiments of the present invention could use any number of processing elements 16. The min/max pin select circuitry 164, the row control pin circuitry 160, and the column control pin circuitry 162 are used to selectively couple the comparison conductor 158 to each of the illustrated integrated circuit pins, namely the row control pin $\overline{\text{ROW}}$ 82 and the column control pin $\overline{\text{COL}}$ 84. Thus circuit 170 generally serves the purpose of a switch for selectively coupling and decoupling comparison conductor 158 to the integrated circuit pins 82 and 84.

FIG. 5-30-1 and FIG. 5-30-2 illustrate steps which are performed when a comparison instructions is executed. In one embodiment of the present invention, the particular opcode of the comparison instruction itself determines whether or not one of the $\overline{\text{COL}}$ pin 84 and the $\overline{\text{ROW}}$ pin 82 is to be coupled to the comparison conductor 158. For example, in the illustrated embodiment, the "colmax" and "colmin" instructions couple only the $\overline{\text{COL}}$ pin 84 to the comparison conductor 158, the "rowmax" and "rowmin" instructions couple only the $\overline{\text{ROW}}$ pin 82 to the comparison conductor 158, and the "locmax" and "locmin" instructions couple neither pin to the comparison conductor 158.

Referring again to FIG. 5-26, the microsequencer 22 decodes the comparison instruction and determines which pin, if any, should be coupled to the comparison conductor 158 for that particular instruction. The microsequencer 22 then sends control signals to the min/max pin select circuitry 164. The min/max pin select circuitry 164 uses these control signals to selectively determine whether to assert or negate the control signal to the row control pin circuitry 160 and the control signal to the column control pin circuitry 162. When the row control pin circuitry 160 receives an asserted control signal from the min/max pin select circuitry 164, the row control pin circuitry 160 couples the comparison conductor 158 to the $\overline{\text{ROW}}$ pin 82. When the column control pin circuitry 162 receives an asserted control signal from the min/max pin select circuitry 164, the column control pin circuitry 162 couples the comparison conductor 158 to the $\overline{\text{COL}}$ pin 84.

As a result, the comparison conductor 158 can be coupled to integrated circuit pins of other data processors 10.*x*, as illustrated in FIG. 5-29. Thus the internal comparison conductors 158 can be coupled to an external comparison conductor, such as column conductors 166 and row conductors 168. So comparisons can be performed both within an integrated circuit, as well as across the pin boundaries of multiple integrated circuits.

FIG. 5-27 and FIG. 5-28 illustrate an example of the execution of a "locmax" instruction. In FIG. 5-27, the first column indicates an arbitrary 8-bit value which is initially stored in each processing element. In this particular example, the initial value of the enable bit (VT bit 110) is zero for processing elements #8 through #63. Thus only processing elements #0 through #7 are enabled and participate in the execution of the instruction.

As the first step, each enabled processing element, which in this example is processing elements #0 through #7, places its first data bit on the wire-OR line 158. In the illustrated embodiment of the present invention, the first data bit is always the most significant bit (MSB) of the data value stored in each processing element, and each subsequent bit is the remaining next most significant bit. However, alternate embodiments of the present invention may use a different scheme for the ordering and selection of data bits.

Since the comparison conductor 158 in the illustrated embodiment is a wire-OR line, the comparison line 158 will remain in a zero logic state unless a logic level one is driven on the line. Note that a wire-AND line could alternately be used. For a wire-AND line, the line would remain in a one logic state unless a logic level zero is driven on the line. FIG. 5-28 illustrates the resulting logic state of the wire-OR line 158 after each step, i.e. after each group of data bits is placed on the wire-OR line 158.

For the "locmax" instruction, each processing element compares the logical value it placed on the wire-OR line 158 with the actual resulting logic state of the line. Referring to FIG. 2-68-1, shift, complement, and detect circuitry 117 performs this function. If the processing element placed a logical zero on the line and read back a zero, then the VT bit 110 of that processing element remains asserted. Likewise, if the processing element placed a logical one on the line and read back a one, then the VT bit 110 of that processing element remains asserted. However, if the processing element placed a logical zero on the line and read back a one, then the VT bit 110 of that processing element is negated and that processing element, which is now disabled, no longer participates in the execution of the comparison instruction. Note that with a wire-OR line it is not possible for a processing element to place a logical one on the line and read back a zero.

In the example illustrated in FIG. 5-27, the most significant bit of each data value stored in processing elements #0 through #7 is a logical zero. Thus each enabled processing element places a logic zero on the wire-OR line 158. Thus the wire-OR line 158 remains in a zero logic state. Each processing element compares the value it placed on the line (zero in this case) with the actual resulting value of the line (also zero in this case). Because each processing element placed a logical zero on the line and read back a zero, the VT bit 110 of each processing element remains asserted. The value of the VT bit 110 for each processing element is illustrated in the second column of FIG. 5-27. Thus after the first step, the value of the VT bit 110 for each processing element remains a logical one.

As the second step, each enabled processing element, which in this example is still processing elements #0 through #7, places its second data bit, the next most significant bit, on the wire-OR line 158. Each processing element compares the logical value it placed on the wire-OR line 158 with the actual resulting logic state of the line. Because processing elements #0, #2, #3, #4, and #6 placed a logical one on the line and read back a one, the VT bits 110 of these processing elements remain asserted. However, because the processing elements #1, #5, and #7 placed a logical zero on the line and read back a one, the VT bits 110 of these processing elements are negated. Thus processing elements #0, #2, #3, #4, and #6 remain enabled, and processing elements #1, #5, and #7 are now disabled and no longer participate in the execution of the comparison instruction. The value of the VT bit 110 for each processing element after each wire-OR step is illustrated in the second column of FIG. 5-27.

The desired value of VT bits 110 after the last wire-OR step is illustrated in the rightmost column in FIG. 5-27. The desired results in the rightmost column match the actual results illustrated under step eight in the middle column. Because processing elements #2 and #4 both contain the maximum value, %0101000 in this case, it is desired that at the end of the instruction only the VT bits 110 for processing elements #2 and #4 should be asserted. In this manner, the comparison instruction can be used to disable all processing elements which do not contain the maximum value. The VT bits 110 can be used to determine the location of the processing element(s) containing the maximum value. And the maximum value itself can be retrieved from any of the processing elements that have their VT bits 110 asserted at the end of the comparison instruction.

In the illustrated embodiment of the present invention, the number of wire-OR steps is programmable. A bit field in the instruction is used to designate the number of wire-OR steps. For example, if each processing element has a data value "N" bits wide, then by programming the bit field in the instruction, a user can select that anywhere from 1 to "N" bits be compared. Alternate embodiments of the present invention may use a register bit field or a default value instead of an instruction bit field to designate the number of bits to be compared.

Referring to FIG. 2-68-1, bit modification circuitry 118 is coupled to shift, complement, and detect circuitry 117. The shift, complement, and detect circuitry 117 detects when the processing element has placed a logical zero on the line and has read back a one. The shift, complement, and detect circuitry 117 then asserts a control signal to the bit modification circuitry 118. When the bit modification circuitry 118 receives this asserted control signal, the bit modification circuitry 118 negates the VT bit 110. Note that control and status signals are transferred between control circuitry 115 and microsequencer 22. Also note that control circuitry 115 generates control signals which are used to control processing element 16.

The example illustrated in FIG. 5-27 and FIG. 5-28 dealt with the execution of a "locmax" instruction using unsigned data values. Variations of this mechanism and technique can be used to carry out instructions which operate on either signed or unsigned numbers, and which locate either maximum or minimum values. To locate the maximum of a vector of signed numbers, the above procedure can be used with one additional step. Assuming that the signed numbers are represented in 2's complement form, the most significant bit of each signed number is a sign bit. The sign bit of each signed number must be complemented before it is placed on the wire-OR line 158.

The minimum of a vector of signed numbers can be located in a like manner by complementing all bits. And the minimum of 2's complement signed numbers can be located by complementing all bits except the sign bit. Referring to FIG. 2-68-1, shift, complement, and detect circuitry 117 is coupled to microsequencer 22 in order to receive control information regarding which, if any, data bit(s) output to wire-OR line 158 must be complemented. Shift, complement, and detect circuitry 117 then performs any complementing that is required.

In the illustrated embodiment of the present invention, a control register bit field is used to determine whether a comparison instruction will treat the data values being compared as signed or unsigned values. Referring to FIG. 2-12, Arithmetic Control Register (ACR) 172 contains a Scalar Signed/Unsigned bit (SSGN) 174 and a Vector Signed/Unsigned bit (VSGN) 176. The VSGN bit 176 is used to determine whether the vector data values used during a comparison instruction will be considered to be signed or unsigned numbers.

Although the illustrated embodiment of the present invention can only handle a maximum width of eight data bits per comparison instruction, vector data values wider than eight bits can be handled by executing the comparison instruction more than once, starting with the most significant byte. Note that alternate embodiments of the present invention may handle data values that are more or less than eight bits wide.

The example illustrated in FIG. 5-27 and FIG. 5-28 dealt with the execution of a "locmax" instruction. The execution of a "rowmax" instruction would be similar to that of a "locmax" instruction except that the comparison conductor 158 would additionally be coupled to the $\overline{\text{ROW}}$ pin 82. And the execution of a "colmax" instruction would be similar to that of a "locmax" instruction except that the comparison conductor 158 would additionally be coupled to the $\overline{\text{COL}}$ pin 84.

Likewise, the execution of a "rowmin" instruction would be similar to that of a "locmin" instruction except that the comparison conductor 158 would additionally be coupled to the $\overline{\text{ROW}}$ pin 82. And the execution of a "colmin" instruction would be similar to that of a "locmin" instruction except that the comparison conductor 158 would additionally be coupled to the $\overline{\text{COL}}$ pin 84.

Referring to FIG. 5-29, the wire-OR line 158 used for comparison operations may be used only internal to data processors 10.*x*, or may be connected through an integrated circuit pin to an external wire-OR line for multi-chip operations. Data processor 10.*x* supports multi-chip maximum or minimum location operations across any rows or columns of data processors 10.*x* in a two dimensional array as illustrated in FIG. 5-29. Multiple wire-OR lines 166 and 168 are used. Generally there is one external wire-OR line for each row and one external wire-OR line for each column.

In the present embodiment, each data processor 10.*x* has one $\overline{\text{ROW}}$ pin 82 for coupling to one wire-OR row line 168, and one $\overline{\text{COL}}$ pin 84 for coupling to one wire-OR column line 166. These column conductors 166 and row conductors 168 serve as wire-OR lines for the row and column oriented multi-chip operations performed when the data processors 10.*x* execute instructions in the Run mode of operation. Note that the $\overline{\text{ROW}}$ pin 82 and the $\overline{\text{COL}}$ pin 84 have a different function in the Stop mode of operation. In the Stop mode of operation, the $\overline{\text{ROW}}$ pin 82 and the $\overline{\text{COL}}$ pin 84 are used in a manner similar to chip selects.

(5.10.2) Instructions "vmaxp", "vmax", "vminp", and "vmin", "maxp", "max", "minp", and "min"

For fuzzy logic, neural networks, and other parallel, array oriented applications, a simple and fast technique and mechanism is needed to allow maximum and minimum determinations to be made for both vector and scalar operands. The technique and mechanism should be able to perform maximum and minimum determinations for both signed (2's complement) and unsigned numbers. Also, the technique and mechanism should be able to perform maximum and minimum determinations for extended length (multi-byte) operands. Although this technique for minimum and maximum determinations is of considerable use in neural network applications, it may also be used in a wide variety of other applications.

Referring to FIG. 2-67, vector engine 9 is involved in the execution of the vector maximum and vector minimum instructions, namely "vmaxp", "vmax", "vminp", and "vmin". Table 2.44 describes the vector maximum and vector minimum instructions. Table 2.36 lists which registers can be used as the source register (i.e. "$vreg1_S$"), and Table 2.37 lists which registers can be used as the destination register (i.e. "$vreg2_D$"). Section 2.5.12.3 and Table 2.74 also discuss the vector maximum and vector minimum instructions.

Referring to FIG. 2-68 and FIG. 2-68-1, the comparison portion of the vector maximum and vector minimum instructions is performed by Arithmetic Logic Unit (ALU) 119. Because the comparison function is performed by the same ALU 119 that is used for add, subtract, and compare instructions, little additional circuitry is required for the minimum and maximum instructions. Note that in alternate embodiments of the present invention, any type of comparator circuitry could be used to perform the comparison function.

A sign bit, VSGN bit 176 located in the Arithmetic Control Register (ACR) 172, determines whether the data values used by the vector maximum and minimum instructions will be treated as signed or unsigned numbers. Vector engine 9 has two extension bits, namely VX0 bit 104 and VX1 bit 105 located in the Vector Process Control Register (VPCR) 102. These two extension bits are used to support extended length operations, including extended length minimum and maximum operations. The two extension bits are normally cleared to the default state, except during extended length computations.

Referring to FIG. 2-67, scalar engine 26 is involved in the execution of the scalar maximum and scalar minimum instructions, namely "maxp", "max", "minp", and "min". Table 2.51 describes the vector maximum and vector minimum instructions. Table 2.38 lists which registers can be used as the source register (i.e. "$sreg_S$") and as the destination register (i.e. "$sreg_D$").

Referring to FIG. 2-70, the comparison portion of the scalar maximum and scalar minimum instructions is performed by Arithmetic Logic Unit (ALU) 304. Because the comparison function is performed by the same ALU 304 that is used for add, subtract, and compare instructions, little additional circuitry is required for the minimum and maximum instructions. Note that in alternate embodiments of the present invention, any type of comparator circuitry could be used to perform the comparison function.

A sign bit, SSGN bit 174 located in the Arithmetic Control Register (ACR) 172, determines whether the data values used by the scalar maximum and minimum instructions will be treated as signed or unsigned numbers. Scalar engine 26 has two extension bits, namely SX0 bit 210 and SX1 bit 212 located in the SPCR register 208. These two extension bits are used to support extended length operations, including extended length minimum and maximum operations. The two extension bits are normally cleared to the default state, except during extended length computations.

FIG. 5-10 illustrates steps which are performed by data processor 10 during execution of various comparative instructions, including the vector and scalar minimum and maximum instructions.

In the present invention, only one instruction is required in order to compute the minimum or maximum of two single-byte operands. For example, the single instruction "min G0, G1" can be used to compute the minimum of two single-byte operands which are stored in registers G0 and G1 (see G[n] registers 302 in FIG. 2-70). Note that the result, i.e. the lesser of the two values, is stored in register G1. Note also that the extension bits SX0 210 and SX1 212 were required to be in their default state, %00 in the illustrated embodiment, before the instruction was begun.

The following steps are performed during the "min" instruction. ALU 304 compares the two data values using either signed or unsigned arithmetic, as specified by the SSGN bit 174. ALU 304 subtracts the source data value from the destination data value. ALU 304 generates a borrow value which indicates whether or not the subtraction operation required a borrow. If the subtraction result is a negative value, then the borrow value is asserted. If the subtraction result is a positive value, then the borrow value is negated.

ALU 304 outputs the borrow value on a borrow signal which is received by control circuitry 308. Control circuitry 308 then sends one or more control signals to a multiplexer (not shown) at the output of ALU 304, directing ALU 304 to select the lesser data value as the result. The result, i.e. the lesser data value, is then transferred to and stored in the destination register. Since the "min" instruction is a "non-preliminary" instruction, it unconditionally clears the extension bits SX0 210 and SX1 212 to the default state. Control circuitry 308 and bit modification circuitry 306 are used to change the logic state of the bits in the Scalar Process Control Register (SPCR) 208.

A series of one or more preliminary instructions, followed by a single non-preliminary instruction, is generally used to compute the minimum or maximum value of extended length operands. For example, the following series of instructions can be used to compute the minimum of two 3-byte numbers in source register group (G2,G1,G0) and destination register group (G5,G4,G3). Note that the result, i.e. the lesser of the two 3-byte values, is stored in register group (G5,G4,G3). Note also that the extension bits SX0 210 and SX1 212 were required to be in their default state before the first instruction "minp G2, G5" was begun.

| | |
|---|---|
| minp G2, G5 | ; min preliminary G2 to G5 (generates extension bits) |
| minp G1, G4 | ; min preliminary G1 to G4 (generates extension bits) |
| min G0,G3 | ; min G0 to G3 (returns extension bits to default state) |

Note that preliminary instructions "minp" are applied to the most significant bytes and that a non-preliminary instruction "min" is applied to the final least significant byte. The first instruction, "minp G2, G5" uses the fact that the extension bits SX0 210 and SX1 212 are in the default state at the beginning of the instruction in order to determine that it is handling the most significant byte. Consequently, the "minp G2, G5" instruction compares G2 to G5 using either signed or unsigned numbers as specified by the SSGN bit 174.

The "minp G2, G5" instruction selects the smaller operand byte as the result and selectively modifies the extension bits SX0 210 and SX1 212 to indicate the result of the comparison (see Table 2.59). If the data value stored in register G2 is less than the data value stored in register G5, then register G2 is selected as the result and the extension bits SX0 210 and SX1 212 are selectively modified to equal %01. If the data value stored in register G2 is greater than the data value stored in register G5, then register G5 is selected as the result and the extension bits SX0 210 and SX1 212 are selectively modified to equal %10. If the data value stored in register G2 equals the data value stored in register G5, then either data value is selected as the result and the extension bits SX0 210 and SX1 212 are selectively modified to equal %11.

The second instruction, "minp G1, G4" uses the fact that the extension bits SX0 210 and SX1 212 are not in the default state at the beginning of the instruction in order to determine that it is not handling the most significant byte.

If the incoming value of the extension bits SX0 210 and SX1 212 is %01, then the determination has already been made that the 3-byte value stored in register group (G2,G1,G0) is less than the 3-byte data value stored in register group (G5,G4,G3). Thus, the data value stored in register G1 is selected as the result and the extension bits SX0 210 and SX1 212 remain %01.

If the incoming value of the extension bits SX0 210 and SX1 212 is %10, then it has already been determined that the 3-byte value stored in register group (G2,G1,G0) is greater than the 3-byte value stored in register group (G5,G4,G3). Thus, the data value stored in register G4 is selected as the result and the extension bits remain %10.

If the incoming value of the extension bits SX0 210 and SX1 212 is %11, then the data value stored in register G1 is compared to the data value stored in G4 using unsigned arithmetic. Note that this byte is not the most significant byte and thus does not contain a sign bit even if the 3-byte number is signed. The "minp G1, G4" instruction selects the smaller data value as the result and selectively modifies the extension bits SX0 210 and SX1 212 to %01, %10, or %11, depending upon the result of the comparison (see Table 2.59).

The final instruction, "min G0, G3", is a non-preliminary instruction and it functions in the same manner as the preceding "minp G1, G4" instruction, except that it returns the extension bits SX0 210 and SX1 212 to their default state %00.

Although the example described above utilizes the scalar instructions "min" and "minp", the same steps would be performed within each enabled processing element 16 for vector instructions "vmin" and "vminp".

For computations determining a maximum value, scalar instructions "max" and "maxp", and vector instructions "vmax" and "vmaxp" are used. The functioning of the maximum instructions is very similar to the functioning of the minimum instructions, except that the greater data values rather than the lesser data values are selected as the result to be stored in the destination register.

FIG. 5-31 illustrates an example of a series of instructions which can be used to compute the maximum of two 3-byte unsigned numbers in source register group (G2,G1,G0) and destination register group (G5,G4,G3). Note that the result, i.e. the greater of the two 3-byte values, is stored in register group (G5,G4,G3). Note also that the extension bits SX0 210 and SX1 212 were required to be in their default state before the first instruction "maxp G2, G5" was begun. Also note that the sign bit SSGN 174 was equal to %1, thus indicating that the data values are to be treated as unsigned numbers.

| | |
|---|---|
| maxp G2, G5 | ;max preliminary G2 to G5 (generates extension bits) |
| maxp G1, G4 | ;max preliminary G1 to G4 (generates extension bits) |
| max G0, G3 | ;max G0 to G3 (returns extension bits to default state) |

FIG. 5-32 illustrates an example of a series of instructions which can be used to compute the maximum of two 3-byte signed numbers in source register group (G2,G1,G0) and destination register group (G5,G4,G3). Note that the result, i.e. the greater of the two 3-byte values, is stored in register group (G5,G4,G3). Note also that the extension bits SX0 210 and SX1 212 were required to be in their default state before the first instruction "maxp G2, G5" was begun. Also note that the sign bit SSGN 174 was equal to %0, thus indicating that the data values are to be treated as signed (2's complement) numbers.

| | |
|---|---|
| maxp G2, G5 | ;max preliminary G2 to G5 generates extension bits) |
| maxp G1, G4 | ;max preliminary G1 to G4 (generates extension bits) |
| max G0, G3 | ;max G0 to G3 (returns extension bits to default state) |

(5.11) Inverted Access to the Coefficient Memory Array (CMA) 14

Referring to FIG. 2-67 and FIG. 5-33, in the illustrated embodiment of the present invention, the Coefficient Memory Array (VH) 14 is an array of byte-wide storage circuits arranged in sixty-four rows and sixty-four columns. Alternate embodiments of the present invention may have a different number of rows and a different number of columns. Each processing element 16 is coupled to one row in VH 14 at a time, thus allowing each processing element 16 to access sixty-four bytes of information at a time.

To minimize the semiconductor area required by the VH 14 and the processing elements 16, the processing elements 16 are physically split into two portions. The first portion of processing elements 16 is physically located on a first side of VH 14. The second portion of processing elements 16 is physically located on a different side of VH 14 (see FIG. 5-33).

By alternating the rows of VH 14 as illustrated in FIG. 5-33, it is possible to physically couple each processing element 16 to an additional row of memory. Thus each processing element 16 can access twice as many memory locations. Each memory location corresponds to one of the byte-wide storage circuits. In addition, half of the processing elements 16 (i.e. one of the two portions) can be removed without affecting the interface between the VH 14 and the processing elements 16. Also, communication between processing elements 16 is improved in that processing element PE[n] can swap data with processing element PE[63−n]. For example, processing element PE[0] can swap data with processing element PE[63]; and processing element PE[30] can swap data with processing element PE[33].

A selection circuit 204 is coupled between VH 14 and a portion of processing elements 16 which includes PE[0] to PE[31]. A selection circuit 206 is coupled between VH 14 and a portion of processing elements 16 which includes PE[32] to PE[63]. Selection circuit 204 and selection circuit 206 are used to select which one of two rows will be coupled to and accessed by each processing element 16.

Due to the physical layout of the rows in VH 14, processing element PE[0] can be coupled to row 63 in VH 14 with very little routing of electrical conductors, thus minimizing the semiconductor area required. Processing element PE[n] is capable of accessing it's own corresponding memory row (row n); and processing element PE[n] is also capable of accessing the memory row corresponding to processing element PE[63−n] (row 63−n).

Memory accesses use a pointer value in a pointer register in the scalar engine to select which column of VH 14 to access (see Global Pointer Registers PW[0]–P[7] 300 in FIG. 2-59 and FIG. 2-70). The pointer value is valid from 0 to 127. The most significant bit (bit 6 in the illustrated embodiment) is used to select between the corresponding row and the non-corresponding row. If the most significant bit is negated, the corresponding row is used by processing element 16. And if the most significant bit is asserted, the non-corresponding row is used by processing element 16. The corresponding row for processing element PE[n] is row "n", and the non-corresponding row for processing element PE[n] is row "63−n". Simultaneous writes to the same memory location are avoided because all of the processing elements 16 will write to their corresponding row, or all of the processing elements 16 will write to their non-corresponding row.

From the viewpoint of a programmer, the non-corresponding row can be used as a way to reverse a vector. When processing elements 16 write byte values to one or more columns in their non-corresponding rows, and then read the byte values from the same one or more columns in their corresponding rows, a vector reversal has occurred. Processing element PE[63] now stores the value which was initially stored in processing elements PE[0], and processing element PE[0] now stores the value which was initially stored in processing elements PE[63]. The fact that processing elements 16 can access either corresponding rows or non-corresponding rows in CMA 14 is particularly useful in conjunction with data movement operations (e.g. downshifting operations) and the fact that the VT bits 110 can be used as enable bits.

We claim:

1. A method of executing an arithmetic instruction in a data processor, comprising the steps of:

receiving the arithmetic instruction the arithmetic instruction being associated with a source operand and a destination operand;

decoding the arithmetic instruction to provide a plurality of control signals;

accessing a first extension bit from a first storage location during execution of the arithmetic instruction, the first extension bit providing a status information value;

accessing a second extension bit from a second storage location during execution of the arithmetic instruction, the second extension bit providing a sign value corresponding to the source operand of the arithmetic instruction;

executing an arithmetic operation in response to the plurality of control signals, both the first extension bit and the second extension bit being used during execution of the arithmetic operation to provide a result the first extension bit and the second extension bit being used in a first manner when the arithmetic instruction is a preliminary instruction and the first extension bit and the second extension bit being used in a second manner when the arithmetic instruction is a non-preliminary instruction;

selectively modifying the first extension bit to store a modified status information value corresponding to the result; and selectively modifying the second extension bit to store a modified sign value corresponding to the result.

2. The method of claim 1 wherein the arithmetic operation is one of a preliminary addition operation and a non-preliminary addition operation, the preliminary addition operation modifying both the first extension bit and the second extension bit to reflect the result, the non-preliminary addition operation placing both the first extension bit and the second extension bit in a default state.

3. The method of claim 2 wherein the first extension bit is a carry value.

4. The method of claim 2 wherein the preliminary addition operation is a non-saturating addition operation and the non-preliminary addition operation is a saturating addition operation, wherein:

a result of the non-preliminary addition operation is replaced by one of an upper bound and a lower bound when an overflow value corresponding to the result is in an asserted state and the data processing instruction is the non-preliminary addition instruction; and the result of the data processing operation is not replaced when the overflow value corresponding to the result is in the asserted state and the data processing instruction is the preliminary addition instruction.

5. The method of claim 2 further comprising the steps of:

modifying the source operand using the second extension bit;

adding the source operand to the destination operand to generate the result;

modifying the first extension bit to indicate if the result modified the carry value when the arithmetic operation is the preliminary addition operation; and placing both the first extension bit and the second extension bit in the default state when the arithmetic operation is the non-preliminary addition operation.

6. The method of claim 5 wherein the source operand is modified using the second extension bit when a bit width of the source operand is a portion of a first data value which has a bit width which is smaller than a bit width a portion of the destination operand.

7. The method of claim 1 wherein the arithmetic operation is one of a preliminary subtraction operation and a non-preliminary subtraction operation, the preliminary subtraction operation modifying both the first extension bit and the second extension bit to reflect the result, the non-preliminary subtraction operation placing both the first extension bit and the second extension bit in a default state.

8. The method of claim 7 wherein the first extension bit is a borrow value.

9. The method of claim 8 further comprising the steps of:

modifying the source operand using the second extension bit;

subtracting the source operand from the destination operand to generate the result;

modifying the first extension bit to indicate if the result modified the borrow value when the arithmetic operation is the preliminary subtraction operation; and placing both the first extension bit and the second extension bit in a default state when the arithmetic operation is the non-preliminary subtraction operation.

10. A method of executing a comparative instruction in a data processor, comprising the steps of:

receiving the comparative instruction where the comparative instruction is one of a preliminary comparative instruction and a non-preliminary comparative instruction, the comparative instruction being associated with a source operand and a destination operand;

decoding the comparative instruction to provide a first plurality of control signals;

accessing a first extension bit from a first storage location and a second extension bit from a second storage location during execution of the comparative instruction;

comparing the source operand with the destination operand in response to the first plurality of control signals, both the first extension bit and the second extension bit being selectively used during execution of the comparative operation to provide a result; and selectively modifying the first extension bit and the second extension bit to indicate a current result of the step of comparing the source operand with the destination operand.

11. The method of claim 10 wherein the first extension bit and the second extension bit are selectively modified to indicate a comparative relationship between the destination operand and the source operand used during execution of the comparative instruction.

12. The method of claim 11 further comprising the steps of:

receiving a conditional instruction;

decoding the conditional instruction to provide a second plurality of control signals; and executing a comparison operation in response to the conditional instruction, the comparison operation using the first extension bit and the second extension bit to indicate a conditional result of the comparison operation.

13. The method of claim 11 wherein the preliminary comparative instruction selectively modifies both the first extension bit and the second extension bit to reflect the result, and wherein the non-preliminary comparative instruction places both the first extension bit and the second extension bit in a default state.

14. The method of claim 11 wherein the first and the second extension bits are selectively modified to indicate one of a following condition:

i) the destination operand is greater than the source operand;

ii) the destination operand is less than the source operand; and iii) the destination operand is equal to the source operand.

15. The method of claim 11 wherein the first and the second extension bits are both placed in a default state subsequent to the step of comparing the source operand with the destination operand when the comparison instruction is a non-preliminary instruction.

16. A method of executing a comparative instruction in a data processor, comprising the steps of:

receiving the comparative instruction, the comparative instruction being associated with a source operand and a destination operand;

decoding the comparative instruction to provide a first plurality of control signals;

accessing a first extension bit from a first storage location and a second extension bit from a second storage location during execution of the comparative instruction;

comparing the source operand with the destination operand in response to the first plurality of control signals, both the first extension bit and the second extension bit being selectively used during execution of the comparative operation to provide a result; and selectively modifying the first extension bit and the second extension bit to indicate a current result of the step of comparing the source operand with the destination operand, wherein the first and second extension bits are both placed in a default state subsequent to the step of comparing the source operand with the destination operand when the comparative instruction is a non-preliminary instruction.

* * * * *